US011952164B1

(12) United States Patent
Zabaleta et al.

(10) Patent No.: US 11,952,164 B1
(45) Date of Patent: Apr. 9, 2024

(54) RESEALABLE CONTAINER LID AND ACCESSORIES INCLUDING METHODS OF MANUFACTURE AND USE

(71) Applicant: PowerCan Holding, LLC, Fort Lauderdale, FL (US)

(72) Inventors: Daniel A Zabaleta, Weston, FL (US); Sam D Hackett, Fort Lauderdale, FL (US); Daniel Edward Livezey, Feasterville, PA (US); Joseph D. Bulso, Canton, OH (US); William Allen Hibbs, Jr., Bolivar, OH (US)

( * ) Notice: Subject to any disclaimer, the term of this patent is extended or adjusted under 35 U.S.C. 154(b) by 209 days.

(21) Appl. No.: 17/223,221

(22) Filed: Apr. 6, 2021

Related U.S. Application Data

(60) Continuation of application No. 16/035,583, filed on Jul. 13, 2018, now Pat. No. 10,968,010, which is a
(Continued)

(51) Int. Cl.
*B65D 17/28* (2006.01)
*B65D 41/04* (2006.01)
(Continued)

(52) U.S. Cl.
CPC ....... *B65D 17/4014* (2018.01); *B65D 17/401* (2018.01); *B65D 41/04* (2013.01);
(Continued)

(58) Field of Classification Search
CPC .. B65D 17/4014; B65D 41/04; B65D 47/305; B65D 2251/0015; B65D 2517/002;
(Continued)

(56) References Cited

U.S. PATENT DOCUMENTS

| | | | |
|---|---|---|---|
| 253,075 | A | 1/1882 | Lyon |
| 986,847 | A | 3/1911 | Nair et al. |

(Continued)

FOREIGN PATENT DOCUMENTS

| | | | |
|---|---|---|---|
| AU | 2012244852 | B2 | 7/2014 |
| CA | 476789 | | 9/1951 |

(Continued)

OTHER PUBLICATIONS

PCT/US2022/044747 WIPO Search Report dated Jan. 12, 2023.

(Continued)

*Primary Examiner* — James N Smalley
(74) *Attorney, Agent, or Firm* — Allen D Hertz, P. A.; Allen D. Hertz

(57) ABSTRACT

A container assembly including a body and a lid, the lid comprising a rotational and axial guide feature extending radially from a radially interior surface of a lid sidewall. The rotational and axial guide feature is designed to provide axial translation/retention of an accessory when the accessory is rotationally engaged with the lid sidewall. The container and accessory can include an interface that creates a gas impervious/liquid impervious seal therebetween. The seal can be provided between sealing surfaces of the container and the accessory. The lid can include or exclude a bottom wall. The lid can include a score line defining a tear panel in the bottom wall, wherein the tear panel can provide an opening through the bottom wall when the score line is fractured.

24 Claims, 238 Drawing Sheets

Related U.S. Application Data continuation-in-part of application No. 15/494,498, filed on Apr. 22, 2017, now Pat. No. 10,427,832, which is a division of application No. 15/056,216, filed on Feb. 29, 2016, now Pat. No. 9,637,269, which is a continuation-in-part of application No. 14/665,102, filed on Mar. 23, 2015, now Pat. No. 9,272,819, which is a division of application No. 13/787,012, filed on Mar. 6, 2013, now Pat. No. 8,985,371, which is a continuation-in-part of application No. 13/572,404, filed on Aug. 10, 2012, now Pat. No. 8,844,761, said application No. 14/665,102 is a continuation-in-part of application No. 29/491,268, filed on May 19, 2014, now Pat. No. Des. 752,978, which is a division of application No. 13/787,012, filed on Mar. 6, 2013, now Pat. No. 8,985,371, which is a continuation-in-part of application No. 13/572,404, filed on Aug. 10, 2012, now Pat. No. 8,844,761, said application No. 15/494,498 is a continuation-in-part of application No. 29/560,269, filed on Apr. 5, 2016, now Pat. No. Des. 795,693, which is a continuation-in-part of application No. 29/491,268, filed on May 19, 2014, now Pat. No. Des. 752,978, which is a division of application No. 13/787,012, filed on Mar. 6, 2013, now Pat. No. 8,985,371, which is a continuation-in-part of application No. 13/572,404, filed on Aug. 10, 2012, now Pat. No. 8,844,761, said application No. 15/494,498 is a continuation-in-part of application No. 29/560,269, filed on Apr. 5, 2016, now Pat. No. Des. 795,693, which is a continuation-in-part of application No. 15/056,216, filed on Feb. 29, 2016, now Pat. No. 9,637,269, which is a continuation-in-part of application No. 14/665,102, filed on Mar. 23, 2015, now Pat. No. 9,272,819, which is a division of application No. 13/787,012, filed on Mar. 6, 2013, now Pat. No. 8,985,371, which is a continuation-in-part of application No. 13/572,404, filed on Aug. 10, 2012, now Pat. No. 8,844,761, application No. 17/223,221 is a continuation-in-part of application No. 29/777,334, filed on Apr. 5, 2021, which is a continuation-in-part of application No. 29/777,331, filed on Apr. 5, 2021, which is a continuation-in-part of application No. 29/777,270, filed on Apr. 5, 2021, which is a continuation-in-part of application No. 16/035,583, filed on Jul. 13, 2018, now Pat. No. 10,968,010, which is a continuation-in-part of application No. 15/494,498, filed on Apr. 22, 2017, now Pat. No. 10,427,832, which is a division of application No. 15/056,216, filed on Feb. 29, 2016, now Pat. No. 9,637,269, which is a continuation-in-part of application No. 14/665,102, filed on Mar. 23, 2015, now Pat. No. 9,272,819, which is a division of application No. 13/787,012, filed on Mar. 6, 2013, now Pat. No. 8,985,371, which is a continuation-in-part of application No. 13/572,404, filed on Aug. 10, 2012, now Pat. No. 8,844,761.

(51) Int. Cl.
*B65D 47/24* (2006.01)
*B65D 47/30* (2006.01)

(52) U.S. Cl.
CPC ......... *B65D 47/243* (2013.01); *B65D 47/305* (2013.01); *B65D 2251/0015* (2013.01); *B65D 2517/002* (2013.01); *B65D 2517/0041* (2013.01); *B65D 2517/0043* (2013.01); *B65D 2517/0062* (2013.01); *B65D 2517/0082* (2013.01); *B65D 2517/5091* (2013.01); *Y10S 220/906* (2013.01)

(58) Field of Classification Search
CPC .... B65D 2517/0041; B65D 2517/0062; B65D 2517/0082; B65D 2517/5091
See application file for complete search history.

(56) References Cited

U.S. PATENT DOCUMENTS

| | | | |
|---|---|---|---|
| 1,596,367 | A | 8/1926 | Miller |
| 1,602,126 | A | 10/1926 | Russell |
| 1,687,887 | A | 10/1928 | Pletcher |
| 1,691,276 | A | 11/1928 | Freundt |
| 1,696,388 | A | 12/1928 | Curtis |
| 1,765,383 | A | 6/1930 | Punte |
| 1,798,246 | A | 3/1931 | Braner |
| 2,004,964 | A | 6/1935 | Behr et al. |
| 2,026,304 | A | 12/1935 | Joseph |
| 2,038,524 | A | 4/1936 | Carvalho |
| 2,102,666 | A | 12/1937 | Annen |
| 2,112,231 | A | 3/1938 | Speidel et al. |
| 2,117,407 | A | 5/1938 | Davis |
| 2,128,959 | A | 9/1938 | Nicholls |
| 2,207,564 | A | 7/1940 | Wackman |
| 2,303,205 | A | 11/1942 | Frankenberg |
| 2,337,456 | A | 12/1943 | Draper |
| 2,349,587 | A | 5/1944 | Herbert |
| 2,359,775 | A | 10/1944 | Mcmanus et al. |
| 2,384,810 | A | 9/1945 | Calleson |
| 2,409,788 | A | 10/1946 | Osborne |
| 2,419,616 | A | 4/1947 | White |
| 2,426,550 | A | 8/1947 | Coyle |
| 2,430,036 | A | 11/1947 | Thornburgh et al. |
| 2,505,641 | A | 4/1950 | Howe |
| 2,661,863 | A | 4/1950 | Howe |
| 2,559,658 | A | 7/1951 | Pottle |
| 2,602,565 | A | 7/1952 | Fdiek |
| 2,661,862 | A | 12/1953 | Howe |
| 2,679,878 | A | 6/1954 | Stine |
| 2,683,579 | A | 7/1954 | Stanley |
| 2,706,065 | A | 4/1955 | Saul |
| 2,997,199 | A | 8/1961 | Ramon |
| 3,026,507 | A | 4/1962 | Gaggini |
| 3,029,507 | A | 4/1962 | Gaggini |
| 3,142,409 | A | 7/1964 | Ross |
| 3,176,872 | A | 4/1965 | Zundel |
| 3,191,564 | A | 6/1965 | Fraze |
| 3,225,957 | A | 12/1965 | Huth |
| 3,253,727 | A | 5/1966 | Hart |
| 3,255,917 | A | 6/1966 | Fraze |
| 3,270,544 | A | 9/1966 | Maeder et al. |
| 3,303,960 | A | 2/1967 | Fraze |
| 3,349,949 | A | 10/1967 | Brown |
| 3,349,950 | A | 10/1967 | Wanderer |
| 3,361,291 | A | 1/1968 | Fraze |
| 3,409,168 | A | 11/1968 | Chmielowiec |
| 3,439,640 | A | 4/1969 | Fraze |
| 3,439,833 | A | 4/1969 | Fraze |
| 3,446,389 | A | 5/1969 | Brown |
| 3,460,711 | A | 8/1969 | Al-Roy |
| 3,480,175 | A | 11/1969 | Khoury |
| 3,520,441 | A | 7/1970 | Fitzgerald |
| 3,601,273 | A | 8/1971 | Kutcher |
| 3,638,597 | A | 2/1972 | Fraze |
| 3,643,833 | A | 2/1972 | Fraze et al. |
| 3,688,718 | A | 9/1972 | Schrecker |
| D224,963 | S | 10/1972 | Saunders |
| 3,726,432 | A | 4/1973 | Gentile |
| 3,752,353 | A | 8/1973 | Slade |
| D229,824 | S | 1/1974 | Erickson |
| 3,795,342 | A | 3/1974 | Ashton |
| 3,812,646 | A | 5/1974 | Baldyga et al. |
| 3,812,991 | A | 5/1974 | Wurt |
| 3,844,443 | A | 10/1974 | Cudzik |
| 3,856,184 | A | 12/1974 | Luviano |

(56) References Cited

U.S. PATENT DOCUMENTS 3,871,314 A 3/1975 Stargell
3,877,604 A 4/1975 Brown
3,880,318 A 4/1975 Fraze
3,910,453 A 10/1975 Kneusel
D238,150 S 12/1975 Cudzik
3,924,777 A 12/1975 Peyser
3,938,693 A 2/1976 Patel et al.
3,952,911 A 4/1976 Bozek et al.
3,967,752 A 7/1976 Cudzik
3,973,921 A 8/1976 Ward et al.
D243,231 S 2/1977 Smith
4,007,848 A 2/1977 Snyder
4,007,851 A 2/1977 Walker
4,042,144 A 8/1977 Henning
4,054,229 A 10/1977 Arfert
4,065,025 A 12/1977 Potts
4,078,695 A 3/1978 Potts
4,094,435 A 6/1978 Kennedy
4,098,058 A 7/1978 Carrigan et al.
4,116,360 A 9/1978 McKernan et al.
4,116,361 A 9/1978 Stargell
4,122,971 A 10/1978 Potts
4,172,532 A 10/1979 Palsson
4,182,460 A 1/1980 Holk
4,197,956 A 4/1980 Murayama
4,262,815 A 4/1981 Klein
4,286,728 A 9/1981 Fraze et al.
D263,803 S 4/1982 Fraze
4,332,332 A 6/1982 Ingemann
4,386,713 A 6/1983 Baumeyer
4,399,925 A 8/1983 Fundom
4,411,707 A 10/1983 Brennecke et al.
D273,846 S 5/1984 Fraze
4,476,987 A 10/1984 Nolan
D277,826 S 3/1985 Brown, Sr.
4,561,561 A 12/1985 Ichikawa et al.
4,567,746 A 2/1986 Fraze et al.
4,574,975 A 3/1986 Cudzik et al.
4,679,699 A 7/1987 Malsbury et al.
4,685,849 A 8/1987 LaBarge et al.
4,705,186 A 11/1987 Barrash
4,711,611 A 12/1987 Fraze
4,717,039 A * 1/1988 Ayyoubi .............. B65D 47/265 220/253
4,723,687 A 2/1988 Kutterer
4,726,489 A 2/1988 Padovani
4,732,031 A 3/1988 Bulso, Jr. et al.
4,793,510 A 12/1988 Arfert et al.
4,809,861 A 3/1989 Wilkinson
4,821,912 A 4/1989 Wells
4,823,537 A 4/1989 Duke
RE32,927 E 5/1989 Taylor
4,865,215 A 9/1989 Wells
4,872,597 A 10/1989 Hanafusa
4,880,131 A 11/1989 Gallagher et al.
4,928,244 A 5/1990 La Barge
4,928,844 A 5/1990 La Barge
H803 H 8/1990 Sherrington
4,946,063 A 8/1990 Heyes et al.
4,982,862 A 1/1991 La Barge
5,052,576 A 10/1991 Budenbender
5,078,290 A 1/1992 Ochs
5,121,851 A 6/1992 Lyon et al.
5,125,212 A 6/1992 Smyth
5,138,858 A 8/1992 Johnson et al.
5,207,341 A 5/1993 Yeager
D337,521 S 7/1993 McNulty
D338,621 S 8/1993 Balson
5,240,138 A 8/1993 Gallagher
5,248,053 A 9/1993 Lundgren
5,292,025 A 3/1994 Dubreul
5,293,765 A 3/1994 Nussbaum
D348,137 S 6/1994 Campbell
5,339,977 A 8/1994 Schormair et al.
5,356,030 A 10/1994 Budenbender
5,381,924 A * 1/1995 Kiefel ................ A47G 19/2272 215/229
D355,735 S 2/1995 Shaffer
D356,456 S 3/1995 Henry
5,421,480 A 6/1995 Cudzik
5,443,175 A 8/1995 Kelly
5,507,406 A 4/1996 Urciuoli et al.
5,511,920 A 4/1996 Artrip
5,529,202 A 6/1996 Shamis
5,582,319 A 12/1996 Heyes
5,605,244 A 2/1997 Bradshaw
D382,481 S 8/1997 McEldowney
D387,987 S 12/1997 Neiner
5,692,633 A 12/1997 Gordon
5,704,240 A 1/1998 Jordan
5,711,447 A 1/1998 Plester
5,713,235 A 2/1998 Diekhoff
5,718,352 A 2/1998 Diekhoff
5,772,799 A 6/1998 Sun et al.
5,779,086 A 6/1998 Barrash
5,778,723 A 7/1998 Diekhoff
5,785,198 A 7/1998 Credle
D397,062 S 8/1998 Hollington
5,799,775 A 9/1998 Spring
5,806,707 A 9/1998 Boehm et al.
5,816,428 A 10/1998 Plester
5,820,016 A 10/1998 Stropkay
5,822,843 A 10/1998 Diekhoff
5,875,906 A 3/1999 Price et al.
5,881,593 A 3/1999 Bulso, Jr. et al.
5,911,551 A 6/1999 Moran
5,947,315 A 9/1999 Valyi et al.
5,947,318 A 9/1999 Palm
D415,026 S 10/1999 Turner
D415,425 S 10/1999 Turner
5,975,322 A 11/1999 Reid
6,010,026 A 1/2000 Jordan et al.
6,010,028 A 1/2000 Jordan et al.
D424,438 S 5/2000 Turner
6,065,634 A 5/2000 Brifcani et al.
6,082,944 A 7/2000 Bachmann
6,102,225 A 8/2000 Lynn
6,105,807 A 8/2000 McCrossen
6,123,212 A 9/2000 Russell et al.
D434,983 S 12/2000 Hurst
6,164,472 A 12/2000 Folchini
6,174,274 B1 1/2001 Hawkins et al.
6,202,872 B1 3/2001 Smeyak et al.
6,206,222 B1 3/2001 Cudzik
6,216,904 B1 4/2001 Cagan
6,234,338 B1 5/2001 Searle
6,301,766 B1 10/2001 Kollé
D452,155 S 12/2001 Stodd
6,330,954 B1 12/2001 Turner et al.
6,332,551 B1 12/2001 Copeland
6,450,358 B1 9/2002 Berro
6,460,723 B2 10/2002 Nguyen et al.
D470,050 S 2/2003 Renz
D471,453 S 3/2003 Stodd
6,575,325 B2 6/2003 Dickie et al.
D476,889 S 7/2003 Fields
6,609,634 B2 8/2003 De Laforcade et al.
6,626,310 B2 9/2003 Taha
6,626,314 B1 9/2003 McHenry et al.
D480,304 S 10/2003 Stodd
6,651,833 B2 11/2003 Sciarini
6,688,487 B2 2/2004 Oakes et al.
6,729,495 B2 5/2004 Gardiner
6,739,471 B2 5/2004 Goetz et al.
6,779,677 B2 8/2004 Chupak
6,877,941 B2 4/2005 Brifeani et al.
6,889,862 B2 5/2005 Vaughan
6,910,598 B2 5/2005 Goetz et al.
6,959,830 B1 11/2005 Kanou et al.
6,981,601 B2 1/2006 Laveault et al.
7,014,060 B2 3/2006 Richardson
D518,885 S 4/2006 Stout, Jr.
D525,127 S 7/2006 Cogley
7,100,789 B2 9/2006 Nguyen

(56) References Cited

U.S. PATENT DOCUMENTS 7,147,123 B2 12/2006 Yamashita
D559,680 S 1/2008 Jacober et al.
7,344,041 B2 3/2008 Heinicke et al.
D587,118 S 2/2009 Sadiq
7,500,376 B2 3/2009 Bathurst et al.
7,500,577 B2 3/2009 Wichelhaus
7,555,927 B2 7/2009 Hanafusa et al.
7,743,635 B2 6/2010 Jentzsch
7,798,357 B2 9/2010 Hanafusa et al.
7,823,740 B2 11/2010 Perra
7,824,750 B2 11/2010 Takegoshi et al.
7,841,222 B2 11/2010 Cook et al.
7,861,874 B2 1/2011 Cook et al.
7,891,517 B2 2/2011 Simmons
7,905,130 B2 3/2011 Marshall et al.
7,918,359 B2 4/2011 Paris et al.
7,918,363 B2 4/2011 Morabito et al.
7,942,028 B2 5/2011 Gillest et al.
D639,164 S 6/2011 Walsh
D641,239 S 7/2011 Ramsey
D641,622 S 7/2011 Fields
8,016,148 B2 9/2011 Walsh
D647,400 S 10/2011 Fields
8,037,728 B2 10/2011 Hosoi
D649,049 S 11/2011 Relds
D651,452 S 1/2012 Hillebrenner
D653,109 S 1/2012 Stammen
8,091,402 B2 1/2012 Hanafusa et al.
8,210,377 B2 7/2012 Martin et al.
8,215,513 B1 7/2012 Grissom
8,302,768 B2 11/2012 Sibley
8,328,041 B2 12/2012 Brifcani
8,336,726 B2 12/2012 Ramsey et al.
8,336,728 B2 12/2012 Forrest
8,360,266 B2 1/2013 Adams et al.
D681,176 S 4/2013 Chacko
D684,470 S 6/2013 Concin et al.
8,474,634 B1 7/2013 Branson et al.
8,496,131 B2 7/2013 Forrest et al.
8,534,490 B2 9/2013 Chapin
8,556,106 B1 10/2013 Bayat et al.
D692,757 S 11/2013 Concin et al.
D692,758 S 11/2013 Concin et al.
D696,113 S 12/2013 Stein
8,608,007 B2 12/2013 Seo
8,613,369 B2 12/2013 Kitto
8,622,230 B2 1/2014 Grissom
8,720,717 B2 * 5/2014 Kaanta ................. B65D 51/243
81/3.4
D706,908 S 6/2014 Knapp
D708,943 S 7/2014 Van Goolen
D708,944 S 7/2014 Van Goolen
8,844,761 B2 9/2014 Zabaleta et al.
8,863,947 B2 10/2014 Sibley
8,866,617 B2 10/2014 Kurosawa et al.
8,939,311 B2 1/2015 Christopoulos et al.
8,985,371 B2 3/2015 Zabaleta et al.
9,016,504 B2 4/2015 McClung
D728,757 S 5/2015 Graham
D730,734 S 6/2015 Rapparini
9,145,239 B2 9/2015 Wohlgenannt
9,162,796 B2 10/2015 Bratsch
9,228,684 B2 1/2016 Knapp
9,265,287 B2 2/2016 Sims et al.
9,272,819 B1 3/2016 Zabaleta et al.
D752,978 S 4/2016 Zabeleta et al.
9,339,864 B2 5/2016 Hosoi
D761,398 S 7/2016 Murphy
D767,329 S 9/2016 Mock
D770,895 S 11/2016 Brown
9,493,274 B2 11/2016 Ledun et al.
9,505,527 B1 11/2016 Campbell
D777,034 S 1/2017 Sill
9,550,604 B2 1/2017 Burleson, Jr.
9,555,936 B2 1/2017 Martindale
D782,907 S 4/2017 Sowieja
9,617,043 B2 4/2017 McGirr et al.
D786,673 S 5/2017 Moffat
9,637,269 B1 5/2017 Zabaleta et al.
9,676,524 B2 6/2017 Conley et al.
D792,220 S 7/2017 Simons
D793,861 S 8/2017 Siegel
D795,693 S 8/2017 Zabeleta
D798,656 S 10/2017 Steel
D799,215 S 10/2017 Pacha
9,821,926 B2 11/2017 Robinson et al.
9,868,564 B2 1/2018 McGirr et al.
9,878,821 B2 1/2018 Sibley
D809,868 S 2/2018 Eyal
D812,474 S 3/2018 Rust
D813,606 S 3/2018 O'Nan
9,938,043 B2 4/2018 Chasteen et al.
10,040,593 B2 8/2018 Ross et al.
D828,753 S 9/2018 Zabaleta
10,095,901 B1 10/2018 Fogarty
10,124,941 B2 11/2018 Sibley et al.
10,214,323 B2 2/2019 Conley et al.
10,232,990 B2 3/2019 Sang et al.
D860,716 S 9/2019 Abante et al.
10,427,832 B1 10/2019 Zabaleta et al.
10,486,864 B2 11/2019 Van Goolen
D871,133 S 12/2019 Bullock et al.
10,494,152 B2 12/2019 Ramsey
10,513,375 B2 12/2019 Karll
10,519,016 B2 12/2019 Kelly et al.
10,597,205 B2 3/2020 Sibley et al.
10,875,076 B2 12/2020 Scott
10,926,925 B2 2/2021 Seiders et al.
D916,590 S 4/2021 Albright
D917,281 S 4/2021 Will
D917,282 S 4/2021 Albright
D917,283 S 4/2021 Albright
D917,284 S 4/2021 Albright
10,968,010 B1 4/2021 Zabaleta et al.
11,130,606 B2 9/2021 Ross et al.
D959,981 S 8/2022 Stammen
D976,704 S 1/2023 Stammen
D977,971 S 2/2023 Stammen
D997,720 S 9/2023 Stammen
2001/0003292 A1 6/2001 Sun et al.
2001/0037668 A1 11/2001 Fields
2001/0040167 A1 11/2001 Flecheux et al.
2002/0008109 A1 * 1/2002 Hirota ................... B65D 51/20
220/709
2002/0030053 A1 3/2002 Copeland
2003/0051445 A1 3/2003 Martin et al.
2003/0116521 A1 6/2003 Chupak
2003/0213709 A1 11/2003 Gibler et al.
2003/0213803 A1 11/2003 Chasteen
2004/0089629 A1 * 5/2004 Villaescusa ........ B65D 17/4012
220/709
2004/0159662 A1 8/2004 Johnson
2004/0256386 A1 12/2004 LaFortune
2005/0008458 A1 1/2005 Keech et al.
2005/0029264 A1 2/2005 Werth
2005/0039416 A1 2/2005 Hidding
2005/0067365 A1 3/2005 Hanafusa et al.
2005/0115969 A1 6/2005 Mizuma
2005/0127077 A1 6/2005 Chupak
2005/0150889 A1 7/2005 Perra
2006/0011633 A1 1/2006 Cook et al.
2006/0163253 A1 7/2006 Steadman
2007/0017089 A1 1/2007 Hosoi
2007/0045318 A1 3/2007 Gibson et al.
2007/0062952 A1 3/2007 Kobayashi et al.
2007/0170184 A1 7/2007 Canedo
2007/0249424 A1 10/2007 Marshall et al.
2007/0266755 A1 11/2007 Cook et al.
2008/0011702 A1 1/2008 Walsh
2008/0047922 A1 2/2008 Olson et al.
2008/0053997 A1 3/2008 Perra
2008/0099480 A1 5/2008 Chang
2008/0110922 A1 5/2008 Sines
2008/0168818 A1 7/2008 Gillest et al.

(56) References Cited

U.S. PATENT DOCUMENTS

| | | | | |
|---|---|---|---|---|
| 2008/0237235 | A1 | 10/2008 | Morabito | |
| 2009/0026201 | A1 | 1/2009 | Hall et al. | |
| 2009/0045158 | A1 | 2/2009 | Suriol | |
| 2009/0200306 | A1 | 8/2009 | Breunig | |
| 2009/0211329 | A1 | 8/2009 | Hanafusa et al. | |
| 2009/0236353 | A1 | 9/2009 | Martin et al. | |
| 2009/0261101 | A1 | 10/2009 | Forrest | |
| 2010/0051576 | A1 | 3/2010 | Tran et al. | |
| 2010/0059516 | A1 * | 3/2010 | Parker | B65D 17/401 220/268 |
| 2010/0065528 | A1 | 3/2010 | Hanafusa et al. | |
| 2010/0126992 | A1 | 5/2010 | Phillips | |
| 2010/0133275 | A1 | 6/2010 | Phillips | |
| 2010/0264109 | A1 | 10/2010 | Pedraza et al. | |
| 2010/0294768 | A1 | 11/2010 | Ramsey et al. | |
| 2010/0320207 | A1 | 12/2010 | Sjogren | |
| 2011/0036839 | A1 | 2/2011 | Gardner | |
| 2011/0036840 | A1 | 2/2011 | Zakai | |
| 2011/0056945 | A1 | 3/2011 | Ramsey | |
| 2011/0062106 | A1 | 3/2011 | Caspar | |
| 2011/0100946 | A1 | 5/2011 | Perra | |
| 2011/0114649 | A1 | 5/2011 | Adams et al. | |
| 2011/0168709 | A1 | 7/2011 | Wells | |
| 2011/0174639 | A1 | 7/2011 | Sibley | |
| 2011/0226636 | A1 | 9/2011 | Petti | |
| 2011/0232423 | A1 | 9/2011 | Raymond | |
| 2011/0278255 | A1 | 11/2011 | Forrest et al. | |
| 2012/0012586 | A1 | 1/2012 | Rinder et al. | |
| 2012/0031913 | A1 | 2/2012 | Moore et al. | |
| 2012/0037631 | A1 | 2/2012 | Weist | |
| 2012/0055925 | A1 | 3/2012 | Van Goolen | |
| 2012/0061263 | A1 | 3/2012 | Sibley | |
| 2012/0064468 | A1 | 3/2012 | Sibley | |
| 2012/0138621 | A1 | 7/2012 | Bratsch | |
| 2012/0199548 | A1 | 8/2012 | Kitto | |
| 2012/0228294 | A1 | 9/2012 | Grissom | |
| 2012/0273490 | A1 | 11/2012 | Jensen | |
| 2013/0082055 | A1 | 4/2013 | Ramsey et al. | |
| 2013/0199017 | A1 | 8/2013 | Kurosawa et al. | |
| 2013/0200034 | A1 | 8/2013 | Kaanta | |
| 2013/0240527 | A1 | 9/2013 | Philippe | |
| 2014/0042164 | A1 | 2/2014 | Zabaleta | |
| 2014/0238994 | A1 | 8/2014 | Christopoulos et al. | |
| 2014/0262870 | A1 | 9/2014 | Sims et al. | |
| 2014/0263150 | A1 | 9/2014 | Robinson et al. | |
| 2014/0305942 | A1 | 10/2014 | Van Goolen | |
| 2015/0013416 | A1 | 1/2015 | Hosoi | |
| 2015/0108132 | A1 | 4/2015 | McGirr et al. | |
| 2015/0136776 | A1 | 5/2015 | Chasteen et al. | |
| 2015/0190003 | A1 | 7/2015 | Kelaher | |
| 2015/0210438 | A1 | 7/2015 | Ledun et al. | |
| 2015/0225107 | A1 | 8/2015 | Ross et al. | |
| 2015/0321789 | A1 | 11/2015 | McGirr et al. | |
| 2016/0016700 | A1 | 1/2016 | Stevens | |
| 2016/0107796 | A1 | 4/2016 | Sibley | |
| 2016/0166473 | A1 | 6/2016 | Young | |
| 2016/0244213 | A1 | 8/2016 | Conley et al. | |
| 2017/0129644 | A1 | 5/2017 | Jobges | |
| 2017/0174398 | A1 | 6/2017 | Cox | |
| 2017/0197241 | A1 | 7/2017 | Ellefson | |
| 2017/0355495 | A1 | 12/2017 | Martin et al. | |
| 2017/0355583 | A1 | 12/2017 | Kelly et al. | |
| 2018/0002065 | A1 | 1/2018 | Thielen | |
| 2018/0044071 | A1 | 2/2018 | Conley et al. | |
| 2018/0044155 | A1 | 2/2018 | Ross et al. | |
| 2018/0134460 | A1 | 5/2018 | Ramsey | |
| 2018/0148237 | A1 | 5/2018 | Sibley et al. | |
| 2018/0186524 | A1 | 7/2018 | Sang et al. | |
| 2018/0221936 | A1 | 8/2018 | Scott | |
| 2019/0031388 | A1 | 1/2019 | Ross et al. | |
| 2019/0039791 | A1 | 2/2019 | Seiders et al. | |
| 2019/0061995 | A1 | 2/2019 | Albright | |
| 2019/0084728 | A1 | 3/2019 | Bonfoey et al. | |
| 2019/0112096 | A1 | 4/2019 | Gogola | |
| 2019/0233182 | A1 | 8/2019 | Sibley et al. | |
| 2019/0291914 | A1 | 9/2019 | Albright | |
| 2019/0315535 | A1 | 10/2019 | Karll | |
| 2019/0351473 | A1 | 11/2019 | Stammen | |
| 2020/0031529 | A1 | 1/2020 | Van Goolen | |
| 2020/0156139 | A1 | 5/2020 | Ross et al. | |
| 2021/0362992 | A1 | 11/2021 | Ferranti et al. | |
| 2022/0016691 | A1 | 1/2022 | Scott | |
| 2023/0021579 | A1 | 1/2023 | Zabaleta | |

FOREIGN PATENT DOCUMENTS

| | | | | |
|---|---|---|---|---|
| CA | 2929949 | A1 | 5/2015 | |
| CA | 2665477 | A1 | 10/2015 | |
| CN | 103781568 | B | 11/2015 | |
| CN | 110615174 | B | 5/2022 | |
| DE | 29914655 | U1 * | 11/1999 | A47G 19/2222 |
| DE | 102006051409 | A | 4/2008 | |
| DE | 102006051409 | A1 | 4/2008 | |
| EP | 0414249 | A2 | 2/1991 | |
| EP | 0740971 | A1 | 11/1996 | |
| EP | 0828663 | B1 | 12/1999 | |
| EP | 1154934 | B1 | 4/2004 | |
| EP | 1669299 | A1 | 6/2006 | |
| EP | 2269914 | A1 * | 1/2011 | B65D 51/007 |
| EP | 2269914 | A1 | 5/2011 | |
| EP | 2269914 | A1 | 5/2011 | |
| EP | 2086700 | B1 | 11/2011 | |
| EP | 2212215 | B1 | 2/2012 | |
| EP | 2662295 | A1 | 11/2013 | |
| EP | 2662296 | A1 | 11/2013 | |
| EP | 2555988 | A1 | 6/2014 | |
| EP | 2253396 | B1 | 12/2014 | |
| EP | 2825334 | A1 | 1/2015 | |
| EP | 2692657 | B1 | 10/2016 | |
| GB | 2297076 | A | 7/1998 | |
| GB | 2537370 | B | 8/2019 | |
| JP | 2004210403 | A | 7/2004 | |
| JP | D1214756 | | 8/2004 | |
| JP | 2005096843 | A | 4/2005 | |
| JP | 3665002 | B2 | 6/2005 | |
| JP | 2005263230 | A | 9/2005 | |
| JP | 2005280768 | A | 10/2005 | |
| JP | 4173388 | B2 | 10/2008 | |
| JP | 2010036986 | A | 2/2010 | |
| JP | 5090290 | B2 | 12/2012 | |
| JP | 5151314 | B2 | 2/2013 | |
| JP | 5290569 | B2 | 9/2013 | |
| JP | 2013244996 | A | 12/2013 | |
| JP | D1579294 | | 6/2017 | |
| JP | D1579295 | | 6/2017 | |
| JP | D1594206 | | 1/2018 | |
| JP | D1594408 | | 1/2018 | |
| JP | D1678521 | | 2/2021 | |
| JP | D1678522 | | 2/2021 | |
| KR | 301119524.0000 | | 7/2021 | |
| KR | 301125985.0000 | | 9/2021 | |
| KR | 301125987.0000 | | 9/2021 | |
| NL | 1029298 | C1 | 8/2005 | |
| NL | 1027703 | C1 | 6/2006 | |
| NL | 1028568 | C1 | 9/2006 | |
| NL | 2001544 | C2 | 10/2009 | |
| NL | 1043564 | B1 | 9/2021 | |
| NL | 1043660 | B1 | 10/2022 | |
| WO | WO1999032363 | A1 | 11/1998 | |
| WO | WO2002083516 | A1 | 10/2002 | |
| WO | WO2004056667 | A1 | 7/2004 | |
| WO | WO2006009483 | A2 | 1/2006 | |
| WO | 2007054568 | A1 | 5/2007 | |
| WO | WO2007054568 | A1 | 5/2007 | |
| WO | WO2008/053014 | | 5/2008 | |
| WO | WO2009115377 | A1 | 9/2009 | |
| WO | WO2009151325 | A1 | 12/2009 | |
| WO | WO2010117009 | A1 | 10/2010 | |
| WO | WO2011025327 | A2 | 3/2011 | |
| WO | WO2011078057 | A1 | 6/2011 | |
| WO | WO2011124552 | A1 | 10/2011 | |
| WO | WO2012112051 | A2 | 8/2012 | |
| WO | WO2012133391 | A1 | 10/2012 | |
| WO | WO2012144490 | A1 | 10/2012 | |

(56) References Cited

FOREIGN PATENT DOCUMENTS

| | | | |
|---|---|---|---|
| WO | WO2017123502 | A1 | 7/2017 |
| WO | 2017151419 | A1 | 9/2017 |
| WO | WO2018060889 | A1 | 4/2018 |

OTHER PUBLICATIONS

Customized Logo 401# Stretch Tin Can Lids for Food and Wine Paper Tube, curiousexpeditions.org, 2 pages. Found online Nov. 11, 2015 at http://papercanspackaging.sell.curiousexpeditions.org/iz6fge2df-customised-logo-401-stretch-tin-can-lids-for-food-and-wine-paper-tube-images.

Gold Candle Jars Timplate 307# Stretch Metal Can Lids, curiousexpeditions.org, 2 Pages. Found online Nov. 11, 2015 at http://papercanspackaging.sell.curiousexpeditions.org/iz6fge2dc-gold-candle-jars-tinplate-307-images.

* cited by examiner

RESEALABLE CONTAINER LID AND ACCESSORIES INCLUDING METHODS OF MANUFACTURE AND USE

CROSS-REFERENCE TO RELATED APPLICATIONS

This Non-Provisional Patent Application is:

A. is a Continuation of U.S. Non-Provisional Utility patent application Ser. No. 16/035,583, filed on 13 Jul. 2018 (scheduled to Issue as U.S. Pat. No. 10,968,010 on Apr. 6, 2021),
   wherein U.S. application Ser. No. 16/035,583 is a Continuation In Part claiming the benefit of U.S. Non-Provisional Utility patent application Ser. No. 15/494,498, filed on 22 Apr. 2017 (Issued as U.S. patent Ser. No. 10/427,832 on Oct. 1, 2019),
   wherein U.S. application Ser. No. 15/494,498 is a Divisional Patent Application claiming the benefit of U.S. Non-Provisional Utility patent application Ser. No. 15/056,216, filed on 29 Feb. 2016 (Issued as U.S. Pat. No. 9,637,269 on May 2, 2017),
   wherein U.S. application Ser. No. 15/056,216 is a Continuation In Part claiming the benefit of U.S. Non-Provisional Utility patent application Ser. No. 14/665,102, filed on 23 Mar. 2015 (Issued as U.S. Pat. No. 9,272,819 on Mar. 1, 2016),
   wherein U.S. application Ser. No. 14/665,102 is a Divisional Patent Application claiming the benefit of U.S. Non-Provisional Utility patent application Ser. No. 13/787,012, filed on 6 Mar. 2013 (Issued as U.S. Pat. No. 8,985,371 on 24 Mar. 2015),
   wherein U.S. application Ser. No. 13/787,012 is a Continuation-In-Part claiming the benefit of U.S. Non-Provisional Utility patent application Ser. No. 13/572,404, filed on 10 Aug. 2012 (Issued as U.S. Pat. No. 8,844,761 on 30 Sep. 2014);

B. wherein U.S. application Ser. No. 14/665,102 is a Continuation In Part claiming the benefit of U.S. Non-Provisional Design patent application Ser. No. 29/491, 268, filed on 19 May 2014 (Issued as U.S. Pat. D752, 978 on 30 Sep. 2014),
   wherein U.S. application Ser. No. 29/491,268 is a Divisional Patent Application claiming the benefit of U.S. Non-Provisional Utility patent application Ser. No. 13/787,012, filed on 6 Mar. 2013 (Issued as U.S. Pat. No. 8,985,371 on 24 Mar. 2015),
wherein U.S. application Ser. No. 13/787,012 is a Continuation-In-Part claiming the benefit of U.S. Non-Provisional Utility patent application Ser. No. 13/572, 404, filed on 10 Aug. 2012 (Issued as U.S. Pat. No. 8,844,761 on 30 Sep. 2014);

C. wherein U.S. application Ser. No. 15/494,498 is a Continuation In Part claiming the benefit of U.S. Non-Provisional Design patent application Ser. No. 29/560, 269, filed on 5 Apr. 2016,
   wherein U.S. application Ser. No. 29/560,269 is a Continuation In Part claiming the benefit of U.S. Non-Provisional Design patent application Ser. No. 29/491,268, filed on 19 May 2014, (Issued as U.S. Design Pat. D752,978 on Apr. 5, 2016),
   wherein U.S. application Ser. No. 29/491,268 is a Divisional Patent Application claiming the benefit of U.S. Non-Provisional Utility patent application Ser. No. 13/787,012, filed on 6 Mar. 2013 (issued as U.S. Pat. No. 8,985,371 on 24 Mar. 2015),
   wherein U.S. application Ser. No. 13/787,012 is a Continuation-In-Part claiming the benefit of U.S. Non-Provisional Utility patent application Ser. No. 13/572,404, filed on 10 Aug. 2012 (Issued as U.S. Pat. No. 8,844,761 on 30 Sep. 2014);

D. wherein U.S. application Ser. No. 15/494,498 is a Continuation In Part claiming the benefit of U.S. Non-Provisional Design patent application Ser. No. 29/560, 269, filed on 5 Apr. 2016 (Issued as U.S. Pat. D795,693 on Aug. 9, 2017),
   wherein U.S. application Ser. No. 29/560,269 is a Continuation In Part claiming the benefit of U.S. Non-Provisional Utility patent application Ser. No. 15/056,216, filed on 29 Feb. 2016 (Issued as U.S. Pat. No. 9,637,269 on May 2, 2017),
   wherein U.S. application Ser. No. 15/056,216 is a Continuation In Part claiming the benefit of U.S. Non-Provisional Utility patent application Ser. No. 14/665,102, filed on 23 Mar. 2015 (Issued as U.S. Pat. No. 9,272,819 on Mar. 1, 2016),
   wherein U.S. application Ser. No. 14/665,102 is a Divisional Patent Application claiming the benefit of U.S. Non-Provisional Utility patent application Ser. No. 13/787,012, filed on 6 Mar. 2013 (Issued as U.S. Pat. No. 8,985,371 on 24 Mar. 2015),
   wherein U.S. application Ser. No. 13/787,012 is a Continuation-In-Part claiming the benefit of U.S. Non-Provisional Utility patent application Ser. No. 13/572,404, filed on 10 Aug. 2012 (Issued as U.S. Pat. No. 8,844,761 on 30 Sep. 2014); and E. is a Continuation In Part claiming the benefit of U.S. Non-Provisional Design patent application Ser. No. 29/777,334, filed on 5 Apr. 2021,
   wherein U.S. application Ser. No. 29/777,334 is a Continuation In Part claiming the benefit of U.S. Non-Provisional Design patent application Ser. No. 29/777,331, filed on 5 Apr. 2021,
   wherein U.S. application Ser. No. 29/777,331 is a Continuation In Part claiming the benefit of U.S. Non-Provisional Design patent application Ser. No. 29/777,270, filed on 5 Apr. 2021,
   wherein U.S. application Ser. No. 29/777,270 is a Continuation In Part claiming the benefit of U.S. Non-Provisional Utility patent application Ser. No. 16/035,583, filed on 13 Jul. 2018 (scheduled to Issue as U.S. Pat. No. 10,968,010 on Apr. 6, 2021);
   all of which are incorporated by reference herein.

TECHNICAL FIELD

The present invention relates to a resealable lid and cap combination for a container, including the structure, method of manufacturing, and method of use thereof. In general, the resealable lid is assembled to a container such as an aluminum beverage can. The resealable lid includes one or more rotational and axial guide features formed on an interior surface of a container lid sidewall between a seaming panel and a lower edge. The one or more rotational and axial guide features translates a rotational motion into an axial motion as the container cap or other accessory is assembled to the container lid.

BACKGROUND OF THE PRESENT INVENTION

The beverage and can industries have long sought to create a can that is both economical to produce and convenient for use by consumers. In the past, beverage cans were provided with a "pull tab" which the consumer would grab by a ring, and pull until the tab was removed from the can. This created a problem in that the tab became disposable waste for which the consumer was responsible to ensure proper disposal. Often the consumer failed to properly dispose of the tab, thereby creating not only litter, but also a safety issue, in that the tabs could be swallowed by small children. Moreover, the edges of the pull tab were sharp enough that they could, if mishandled, cut the fingers or hands of the consumer or anyone else who handled a loose pull tab. As a result of these problems, the industry moved in the direction of a tab that stayed on the can after opening, thereby preventing both litter and any sharp edges from coming into contact with consumers.

The present state of the art is to have a "stay on" tab that is attached to the can lid by a rivet formed in the can lid next to the opening. The opening is formed by a score line, or frangible "kiss cut" which breaks when the tab is pulled up by the consumer. The score line, when broken, produces a hinged flap that stays connected to the can lid, but inside the can.

Beverage cans with stay on tabs suffer from at least the following deficiencies. First, they are not resealable, so that once the consumer opens the beverage; the contents are subject to loss of carbonation, and the influx of foreign material due to the contents being open to the surrounding environment. Secondly, in order to form the rivet which is used to secure the stay on tab to the beverage lid, the lid needs to be made of a different material, typically an aluminum alloy that is stronger than the aluminum alloy used to make the sides and bottom of the can. Further, the tab itself is typically made of a different alloy than the sides and lid, reflecting the need for a still stronger, typically stiffer material. As a result, recycling of the aluminum beverage can is problematic because the different materials need to be separated. The use of three different materials also tends to add complexity, and expense, to the finished container.

A need exists for improved beverage containers that are resealable, cost effective to produce, and "green" in terms of avoiding waste and facilitating the recycling of aluminum cans. Concurrently, a need exists for improved methods for manufacturing beverage containers that result in faster production time, lower production costs, and improved products.

BRIEF DESCRIPTION OF THE PRESENT INVENTION

A container has a sidewall and integrally formed bottom. The container is preferably a beverage container, but could be adapted to any suitable container. A top lid includes a socket integrally formed therein; the socket including a generally cylindrical sidewall and a bottom wall. A score line formed in the bottom wall defines a tear panel which forms an opening into the can when the score line is fractured and the tear panel is bent inward or removed. A cap is fitted in the socket and has a sidewall which is formed with cam surfaces. The cam surfaces, formed as grooves or slots, cooperate with bosses or detents formed in the cylindrical sidewall of the socket. The design of the cam surfaces and associated bosses translate the rotational motion of the cap into linear motion, wherein the linear motion fractures the score line and opens the tear panel. As the cap moves downwardly, a protrusion formed on the lower surface of the cap impinges on the periphery of the score line, fracturing the score line and subsequently pushing the tear panel into the can.

Once opened, the cap can be re-fitted into the socket, so that the cam surfaces engage the detents, and are rotated to achieve a sealing position, whereby the contents of the can are protected from the ambient atmosphere. This will result in the prevention of spillage, the loss of carbonation, and the prevention of foreign objects from entering the can. The user can opt to discard the cap and/or container once the entire contents of the can are consumed.

Preferably, the container is a beverage container, commonly referred to as a "can," but the same principals described above could be used for other types of containers, including bottles made of various materials, including plastic, paper, metal (such as aluminum), cartons, cups, glasses, etc. In one particularly preferred embodiment, the container can be an aluminum can with a body manufactured of an aluminum alloy material, and a container lid being manufactured of the same aluminum alloy material as the container. The cap can be made of a plastic material of sufficient hardness that the cam surfaces do not deform during opening and closing operations, a metal, or any other suitable material.

In accordance with one embodiment of the present invention, the invention consists of a resealable beverage container lid assembly comprising:

- a lid for a beverage container, comprising:
  - a substantially planar member having a peripheral edge;
  - a socket formed near the peripheral edge of the planar member and having a cylindrical sidewall and a bottom wall;
  - a score line disposed in the bottom wall of the socket and defining a tear panel, wherein the score line is located inward from the cylindrical sidewall, defining an annular surface between the score line and the cylindrical sidewall providing a seating arrangement segment, and whose start and end do not meet to define a hinge for the tear panel;
  - a hinge section defined by ends of the score line, wherein the hinge section extends between the tear panel and the annular surface maintaining attachment of the tear panel to the planar member when the score line is fractured;
- a cap having a bottom surface extending across a lower edge of a cylindrical sidewall, the cap movably disposed in the socket, locating the cap bottom surface adjacent to the bottom wall of the socket, the cap comprising a pointed projection extending downward from the cap bottom surface and disposed offset to a center axis of the cap, wherein when the cap is assembled in the socket, the pointed projection extends downwardly into the socket and is disposed immediately above the score line; and
- an earn feature for driving the cap between opening, removal and resealing positions relative to the score line, the earn feature comprising at least one earn surface in cooperative engagement with a cam feature, wherein the earn feature translates a rotational motion into a linear motion substantially perpendicular to a plane defined by the rotational motion,
- wherein the lid is adapted to be assembled to a container body by joining the peripheral edge of the planar member to a top edge of a sidewall of the container body creating a sealed beverage container.

In a second aspect, the container body is substantially cylindrical and the bottom wall is integrally formed with the sidewall.

In another aspect, the container body is substantially cylindrical and the bottom wall is contiguous with the sidewall.

In yet another aspect, the container body is generally tubular and the bottom wall is contiguous with the sidewall.

LID—General Design

In yet another aspect, the container lid includes a container lid bottom wall, a sidewall extending generally perpendicular to and circumscribing a peripheral edge of the bottom wall, and a seaming panel (alternatively referred to as a lid and container joining formation) formed about a free end of the sidewall.

In yet another aspect, the container lid sidewall is contiguous with the peripheral edge of the container lid bottom wall.

In yet another aspect, the container lid includes a countersink formed between the container lid bottom wall and the container lid sidewall.

In yet another aspect, the container lid includes a chuck shoulder formed between the container lid sidewall and the seaming panel.

In another aspect, the bottom wall, the sidewall and the lid are all made of a same material.

In yet another aspect, the bottom wall, the sidewall and the lid are all fabricated from one planar sheet of material.

In yet another aspect, the material is selected from a group of materials, the group of materials comprising:

a. Metal,
b. Aluminum alloy,
c. Steel alloy,
d. Tin,
e. Plastic,
f. Nylon,
g. Polyvinyl chloride (PVC),
h. Polyethylene terephthalate (PETE or PET),
i. Thermoplastic elastomer (TPE),
j. High-Density Polyethylene (HDPE),
k. Polypropylene (PP),
l. Polycarbonate.

In yet another aspect, at least one of the bottom wall, the sidewall, the seaming panel, and the lid is made of an aluminum alloy.

In yet another aspect, the bottom wall, the sidewall, the seaming panel and the lid are all made of the aluminum alloy.

LID—Socket

In yet another aspect, the lid includes a socket extending downwardly into an interior space of the container body, the socket having a sidewall and a bottom wall. The cap including a sidewall and a bottom wall, and wherein the cap is adapted to fit into the socket.

In yet another aspect, the socket of the container lid is formed within the planar base panel of the container lid.

In yet another aspect, the socket of the container lid is located proximate a circumferential edge of the container lid.

In yet another aspect, the entire peripheral edge of the socket of the container lid is off-centered respective to a seaming panel (alternatively referred to as a lid and container joining formation) or a circumferential edge of the container lid.

In yet another aspect, the entire peripheral edge of the socket of the container lid is concentrically located respective to the seaming panel or the circumferential edge of the container lid.

In yet another aspect, a peripheral edge wall of the socket of the container lid is located between a seaming panel and a peripheral countersink.

In yet another aspect, the peripheral edge wall of the socket of the container lid is arranged being substantially vertically oriented.

In yet another aspect, the peripheral edge wall of the socket of the container lid is arranged being substantially vertically oriented, the peripheral edge wall further comprising at least one earn feature.

In yet another aspect, the socket additionally includes an assembly element for assembling and retaining a secondary component to the container lid.

In yet another aspect, the assembly element formed within the socket is located within the sidewall of the socket.

In yet another aspect, the assembly element formed within the sidewall of the socket is provided in a form of a cam track.

In yet another aspect, the assembly element formed within the sidewall of the socket is provided in a form of a cam engaging projection.

In yet another aspect, the container lid sidewall and the socket sidewall are distinct from one another.

In yet another aspect, the container lid sidewall and the socket sidewall are the same.

LID—Drive Features

In yet another aspect, the lid further comprising a socket adapted to receive the cap and an earn feature, wherein the earn feature includes elements formed on opposing cylindrical surfaces of the socket and cap.

In yet another aspect, the earn feature can be a boss feature that slideably engages with a cam surface, multiple boss features that slideably engages with multiple cam surfaces, a ramp surface engaging with a mating surface, multiple ramp surfaces engaging with one or more surfaces, a first ramp surface engaging with a second ramp surface, multiple first ramp surfaces engaging with multiple second ramp surfaces, a first threaded surface engaging with a second threaded surface, a pair of first threaded surfaces engaging with a pair of second threaded surfaces, a plurality of first threaded surfaces engaging with a like plurality of second threaded surfaces, and the like.

In yet another aspect, the threaded surfaces can be formed having a helical thread shape.

In yet another aspect, each earn surface is formed on an outer cylindrical surface of the cap, and projections are formed on the inner cylindrical surface of the socket, wherein each earn surface is adapted to engage the projections whereby rotational movement of the cap imparts translational movement to the cap.

In yet another aspect, the first drive system for driving the cap into operable engagement with the tear panel, thereby pushing the tear panel into the can to form an opening in the lid; and a second drive system, operable in response to the first drive system, to increase the engagement between the cap and the tear panel, wherein the cap includes a sharp projection formed in a center of the bottom wall of the cap, and the socket includes a score line formed in a center of the bottom wall of the socket, in juxtaposition to the sharp projection when the cap is positioned in the socket.

In yet another aspect, the second drive means includes a second linear motion drive mechanism, capable of converting rotational motion of the cap into a separation force applied upon the tear panel.

In yet another aspect, the first linear motion drive mechanism includes first and second cam structures, formed respectively on the cap cylindrical sidewall and socket cylindrical sidewall.

In yet another aspect, the second linear motion drive mechanism includes third and fourth cam structures, formed respectively on the cap bottom wall and the socket bottom wall.

In yet another aspect, the first cam structure includes a groove formed in the cap cylindrical sidewall, and the second cam structure includes at least one projection formed on the socket cylindrical sidewall.

In yet another aspect, the third cam structure includes at least one cap ramp and the fourth cam structure includes at least one socket ramp in sliding engagement with the at least one cap ramp.

In yet another aspect, the at least one cap ramp includes three ramps arranged peripherally around the cap bottom wall, in sliding engagement with the at least one socket ramp.

In yet another aspect, the cap second linear drive mechanism element is a first series of ramps, and the mating socket second linear drive mechanism element is a second series of ramps, wherein each ramp of the first series of ramps and each associated ramp of the second series of ramps are in sliding engagement with one another.

In yet another aspect, at least a portion of the ramp is configured to be an embossed feature, extending downward from the bottom surface of the cap.

In yet another aspect, at least a portion of the ramp is configured to be a debossed feature, extending upward from the bottom surface of the cap.

In yet another aspect, at least a portion of the ramp is configured to be an embossed feature, extending downward from the bottom surface of the cap.

In yet another aspect, at least a portion of the ramp is configured to be an embossed feature, extending downward from the bottom surface of the cap and a second portion of the ramp is configured to be a debossed feature, extending upward from the bottom surface of the cap.

In yet another aspect, the opening process includes a mechanism enabling the cap to distally separate from the container lid upper surface, thus separating the sealing element from the upper surface of the cap receiving socket bottom wall, eliminating any friction between the sealing element and the associated mating surface.

In yet another aspect, separation of the sealing element and the associated mating surface enables depressurization of the pressurized contents within container to eliminate missiling.

In yet another aspect, the earn feature can be formed using an elastomer applied to the container lid.

In yet another aspect, the earn feature can be formed using the elastomer applied to the socket wall of the container lid.

In yet another aspect, the earn feature can be formed by dispensing the elastomer onto the socket wall of the container lid.

In yet another aspect, the earn feature can be formed by dispensing the elastomer onto the socket wall of the container lid and using a mating earn feature of the cap to shape the dispensed elastomer into a desired shape creating the earn feature. The formed elastomer remains bonded to the socket sidewall of the container lid.

In yet another aspect, the earn feature can be formed by dispensing the elastomer onto the socket wall of the container lid and using a mating earn feature of the cap to shape the dispensed elastomer into a desired shape creating the earn feature. The formed elastomer remains bonded to at least a portion of a countersink, the socket sidewall, a chuck wall, and/or at least a portion of the seaming panel of the container lid.

In yet another aspect, the earn feature can be formed by dispensing the elastomer onto the socket wall of the container lid and using a mating earn feature of the cap to shape the dispensed elastomer into a desired shape creating the earn feature, wherein the earn feature has a thread shape.

In yet another aspect, the earn feature can be formed by dispensing the elastomer onto the socket wall of the container lid and using a mating earn feature of the cap to shape the dispensed elastomer into a desired shape creating the earn feature, wherein the earn feature includes a plurality of like threaded shapes.

In yet another aspect, the elastomer can be dispensed onto any existing container lid, including a currently commercially available Stay On Tab (SOT) design.

LID—Score Line

In yet another aspect, the score line is adapted to define a pathway for initiating and propagating a fracture defining a tear panel from the container lid planar based bottom or socket bottom wall.

In yet another aspect, the score section is formed upon the container lid planar base bottom.

In yet another aspect, the score section is formed upon an exterior surface of the container lid planar base bottom.

In yet another aspect, the score section is formed upon an interior surface of the container lid planar base bottom.

In yet another aspect, the score section is formed upon at least one of an exterior surface of the container lid planar base bottom and an interior surface of the container lid planar base bottom.

In yet another aspect, the score section is formed upon a socket bottom wall, wherein the socket is formed within the container lid planar base bottom.

In yet another aspect, the score section is concentric with respect to the container lid socket sidewall.

In yet another aspect, the score section is located off-center with respect to the container lid socket sidewall.

In yet another aspect, a portion of the score section is formed within an incisor pathway channel.

In yet another aspect, a portion of the score section is formed on a sidewall of the incisor pathway channel.

In yet another aspect, a portion of the score section is formed on a radial portion of the sidewall of the incisor pathway channel.

In yet another aspect, a portion of the score section is formed on an end portion of the sidewall of the incisor pathway channel.

In yet another aspect, the score line is a first score line and further comprising a central piercing formation located proximate the center of the lower end of the cap, a second score line formed in the middle of the tear panel and juxtaposed the central piercing element, wherein a downward motion of the cap causes the central piercing element to pierce the center of the tear panel to release internal pressure and thereby facilitate breaking of the first score line by the pointed projection.

In yet another aspect, the score section is formed having a pair of score grooves; the pair of score grooves is arranged substantially parallel to one another.

In yet another aspect, the score section is formed having a pair of score grooves; the pair of score grooves is joined to one another at one end.

In yet another aspect, the score section is formed having a pair of score grooves; the pair of score grooves is joined to one another at one end by a loop formation.

In yet another aspect, the score line is shaped initiating at a looped segment and having a pair of line segments extending from each end of the looped segment, the pair of line segments extending in a like direction generally following a peripheral edge of the socket bottom wall.

In yet another aspect, the score line is shaped initiating at a looped segment and having a pair of line segments extending from each end of the looped segment, the pair of line segments extending in a like direction generally following a peripheral edge of the socket bottom wall, wherein the pointed projection is in alignment with a center of the looped segment of the score line.

In yet another aspect, the score line is includes at least two intersecting lines, and wherein the sharp projection is juxtaposed at the intersection between the two lines.

In yet another aspect, the score line is formed in an "S" shape.

In yet another aspect, the score line is formed in an "S" shape, defining a pair of tear panels.

In yet another aspect, the score line is formed in an "S" shape, defining a pair of tear panels, wherein each end of the score line defines a respective hinge for the respective tear panel.

In yet another aspect, the score line is adapted to define a hinge section.

In yet another aspect, the container lid further comprising a hinge section defined by ends of the score line, wherein the hinge section extends between the tear panel and the annular surface maintaining attachment of the tear panel to the planar member when the score line is fractured.

In yet another aspect, the score line is formed using a single score forming step.

In yet another aspect, the score line is formed using multiple score forming steps.

In yet another aspect, the score line is formed using multiple score forming steps, wherein an intersection between ends of the first score segment formed by the first score forming step and the second score segment formed by a subsequent score forming step is facilitated by including an enlarged score area located at the intersection between the first score segment and the second score segment.

In yet another aspect, the enlarged score area adjoining two (2) separately formed score line segments is employed to perform at least one function of initiating and propagating the fracture of the score line.

In yet another aspect, the multiple score line process employs registration features formed within the container lid to maintain registration accuracy between the first score forming step and each subsequent score forming step.

In yet another aspect, the score line can be reinforced by applying a sealant material on at least one side of the material having the score line. The reinforced score line can be formed partially extending through the score receiving substrate or extend completely through the score receiving substrate.

In yet another aspect, the enlarged score area adjoining two (2) separately formed score line segments, includes a thinned material fracture section located upon a same surface as the score line, and a broader compression formed concave surface located on an opposite side of the score receiving substrate, wherein the combination ensures a desired movement of material during the forming process. The process is adapted to form the scoring fracture initiation or propagation section by the traversing displacement of the material.

In yet another aspect, the enlarged score area adjoining two (2) separately formed score line segments can be of any suitable shape, including circular, oval, oblong, square, rectangular, diamond, hexagonal, octagonal, or any other suitable shape.

In yet another aspect, at least one end of the score line includes an outward arched segment, wherein the outward arched segment is adapted to direct any additional fracturing away from the hinge formation.

In yet another aspect, both ends of the score line include outward arched segments, wherein the outward arched segments are adapted to direct any additional fracturing away from the hinge formation.

In yet another aspect, the score line can be arranged providing a counter-clockwise driven opening, having score line fracture initiating location on a left side of the tear panel and a hinge located on a right side.

In yet another aspect, the score line can be arranged providing a clockwise driven opening, having score line fracture initiating location on a right side of the tear panel and a hinge located on a left side.

In yet another aspect, the cap includes an upper end and a lower end, and the tear panel is shaped defining a flap that opens when the pointed projection is driven downwardly by the earn feature to impinge upon the score line.

In yet another aspect, the container lid includes at least one score line, wherein the score line is of a shape that defines a tear panel.

In yet another aspect, the container lid includes at least one score line, wherein the score line is of a shape that defines a hinge associated with the tear panel.

In yet another aspect, the container lid includes at least one score line, wherein the score line is of a shape that enables removal of the tear panel.

In yet another aspect, the container lid includes at least one score line, wherein the score line is of a shape that circumscribes a peripheral edge of the container lid bottom wall, enabling removal of the tear panel, wherein the tear panel is a majority or the entire bottom wall.

LID—Reinforcement Section

In yet another aspect, the container lid further comprising a reinforcement section formed within a bottom wall of the socket of the container lid.

In yet another aspect, the container lid further comprising a reinforcement structure located about a peripheral edge of the container lid planar base bottom.

In yet another aspect, the container lid further comprising a reinforcement structure that is formed as an embossed feature extending upward into a void within the socket cavity.

In yet another aspect, the container lid further comprising a reinforcement structure that is formed as a debossed feature extending downward away from the void within the socket cavity.

In yet another aspect, the container lid further comprises a reinforcement structure that is formed having both the embossed feature extending upward into the void within the socket cavity and the debossed feature extending downward away from the void within the socket cavity.

In yet another aspect, the container lid further comprises a reinforcement structure that is formed on the planar base bottom, outward of the score line.

In yet another aspect, the container lid further comprises a reinforcement structure that is formed on the container lid planar base bottom, outward of the score line.

In yet another aspect, the reinforcement structure includes features that are employed for translation of a radial motion into at least one of an axial motion and an axial force.

In yet another aspect, the reinforcement structure includes features that are employed to induce a torsional force upon the tear panel to rotate or bend the tear panel away from the container lid planar base bottom.

In yet another aspect, the reinforcement structure is adapted to distribute the fracturing force applied by the cap onto the tear panel to propagate the bifurcation fracturing of the score line.

In yet another aspect, the reinforcement structure includes guide features acting as a pathway for an incisor during rotation of the cap respective to the container lid.

In yet another aspect, the reinforcement structure includes guide features acting as an incisor pathway channel providing clearance for the incisor during rotation of the cap respective to the container lid.

In yet another aspect, the incisor pathway channel is formed as an initial step in the formation of the container lid.

In yet another aspect, the incisor pathway channel is formed following the formation of a majority of the features of the container lid.

In yet another aspect, the incisor pathway channel includes at least one indexing formation. The indexing formation can be formed during the process used for forming a length of the incisor pathway channel or formed separately. The indexing formation is integral with at least one end of the incisor pathway channel; preferably having one formed at each end of the incisor pathway channel. The at least one indexing formation can be employed to provide registration between the container lid and tooling during the container lid fabrication process.

In yet another aspect, the indexing formation is formed prior to the formation of the incisor pathway channel.

In yet another aspect, the indexing formation is formed subsequent to the formation of the incisor pathway channel.

In yet another aspect, the reinforcement structure can be employed for nesting of at least one feature provided on the cap.

In yet another aspect, the container lid can include a reinforcement structure formed about the socket sidewall.

In yet another aspect, the container lid can include a reinforcement structure formed about an upper edge of the socket sidewall.

In yet another aspect, the container lid can include a reinforcement structure formed about the seaming panel of the container lid.

In yet another aspect, the container lid can include a reinforcement structure formed about a lower portion of the seaming panel of the container lid.

In yet another aspect, the container lid can include a reinforcement structure formed about the seaming panel of the container lid, wherein the reinforcement feature is employed to retain a cylindrical shape of the container lid sidewall.

In yet another aspect, the container lid can include a reinforcement structure formed about the lower portion of the seaming panel of the container lid, wherein the reinforcement structure is employed as a support for a respective seating feature of a seaming chuck.

In yet another aspect, the container lid can include a reinforcement structure formed about the lower portion of the seaming panel of the container lid, wherein the reinforcement structure is employed to provide planar support for the respective seating feature of the seaming chuck.

In yet another aspect, the container lid can include a reinforcement structure formed about a bottom edge of the socket sidewall.

In yet another aspect, the container lid can include a reinforcement structure formed about a bottom edge of the socket sidewall, wherein the reinforcement feature is a countersink.

In yet another aspect, the exclusion of the countersink enhances the ability of the container lid to funnel any residual beverage volume back towards an opened tear panel, returning the residual beverage volume to an interior of the container.

In yet another aspect, the replacement of the countersink with a frustum shaped transition between the cylindrical sidewall and the bottom wall of the container lid enhances the ability of the container lid to funnel any residual beverage volume back towards an opened tear panel, returning the residual beverage volume to an interior of the container.

LID—Stay On Tab (SOT)

In yet another aspect, the container lid can be a commonly commercially available Stay on Tab (SOT) container lid design.

In yet another aspect, the container lid can include a tab assembled to the bottom wall by a rivet.

In yet another aspect, the container lid can include a tab assembled to the bottom wall by an integral rivet, the integral rivet being formed using material of the bottom wall.

In yet another aspect, the tab is located and designed to fracture the score line when pivoted from a parallel orientation towards a perpendicular orientation relative to a plane of the bottom wall, then subsequently bends the tear panel away from the bottom panel.

In yet another aspect, the pull tab rivet is located within the tear panel, wherein the pull tab and rivet in conjunction with the tear panel are separated from the container lid when the score line is fractured and the tear panel is removed from the container lid.

In yet another aspect, the container lid bottom wall can include reinforcing formations to maintain a desired shape.

In yet another aspect, the tear panel portion of the container lid bottom wall can include reinforcing formations to maintain a desired shape.

In yet another aspect, the container lid bottom wall can include formations to improve ergonomic accessibility to at least one feature.

In yet another aspect, the container lid bottom wall can include formations to improve ergonomic accessibility to the tab.

In yet another aspect, the container lid bottom wall can include formations to stabilize the tab to maintain the tab in a correct position. This ensures the tab remains in the correct position when subjected to handling, packaging, transport, sale, and storage; until opening.

CAP—General Design

In yet another aspect, the cap is fabricated from a single sheet of planar material.

In yet another aspect, the cap is fabricated using at least one metal forming process. The at least one metal forming process can include a stamping process, a sheering process, a drawing process, a wall ironing process, a metal pinching process, a rolling process, and the like.

In yet another aspect, the cap is fabricated using at least one molding process. The at least one molding process can include an injection molding process, a vacuum molding process, a blow molding process, a thermoforming process, an over-molding process, a slush molding process, a transfer molding process, a pressure molding process, and the like.

In yet another aspect, the cap is fabricated using a molding process. The molding process can include a wax or resin impregnated with the molding material.

In yet another aspect, the cap is fabricated using a molding process. The molding process making a part that can include a wax or resin coating on the molded material.

In yet another aspect, the cap is fabricated using a molding process. The molding process making a part that can include a plastic lining on the molded material.

In yet another aspect, the cap is fabricated using a machining process.

In yet another aspect, the cap is fabricated using a molding process.

In yet another aspect, the cap is fabricated using a casting process.

In yet another aspect, a cap planar traversing wall, a sidewall, and a grip feature are all made of a same material.

In yet another aspect, the cap planar traversing wall, the sidewall, and the grip feature are all fabricated from one planar sheet of material.

In yet another aspect, the material is selected from a group of materials, the group of materials comprising:

a. Metal,
b. Aluminum alloy,
c. Steel alloy,
d. Tin,
e. Plastic,
f. Nylon,
g. Polyvinyl chloride (PVC),
h. Polyethylene terephthalate (PETE or PET),
i. Thermoplastic elastomer (TPE),
j. High-Density Polyethylene (HDPE),
k. Polypropylene (PP), and
l. Polycarbonate.
m. Waxed or resin impregnated paper/organic fiber pulp
n. Waxed or resin coated paper/organic fiber pulp
o. Plastic lined paper/organic fiber pulp In yet another aspect, at least one of the cap planar traversing wall, the sidewall, and the grip feature is made of an aluminum alloy.

In yet another aspect, the cap planar traversing wall, the sidewall, and the grip feature are all made of the aluminum alloy.

In yet another aspect, the cap can include at least one cap reinforcement structure.

In yet another aspect, the cap reinforcement structure can be formed as a gripping element.

In yet another aspect, the cap reinforcement structure can be formed as a sidewall.

In yet another aspect, the cap reinforcement structure can be formed as a countersink.

In yet another aspect, the cap reinforcement structure can be formed as an incisor deboss panel.

In yet another aspect, the cap reinforcement structure can be formed as at least one ramp.

In yet another aspect, the cap reinforcement structure can be formed as a tamper indicator.

CAP—Grip

In yet another aspect, the cap includes at least one grip.

In yet another aspect, the cap further comprising a grip element formed in the upper end of the cap.

In yet another aspect, the grip element is formed having a debossed shape, wherein the debossed shape extends downward from the cap planar traversing wall.

In yet another aspect, the grip element is formed having an embossed shape, wherein the embossed shape extends upward from the cap planar traversing wall.

In yet another aspect, the grip element is formed having a pinched shape.

In yet another aspect, the grip element is formed having a pinched dome shaped upward extending projection.

In yet another aspect, the grip element is formed having a cylindrical shape.

In yet another aspect, the grip element is formed having a cylindrical shaped cavity, wherein the cylindrical shaped grip element cavity is a deboss extending downward from the cap planar traversing wall.

In yet another aspect, the grip element is formed having a cylindrical shaped formation, wherein the cylindrical shaped grip element formation is an emboss extending upward from the cap planar traversing wall.

In yet another aspect, the cylindrical shaped grip element formation includes a peripheral edge grip enhancing formation.

In yet another aspect, the grip element is formed having a bar or linear shape.

In yet another aspect, the cap includes at least one feature for receiving an implement.

In yet another aspect, wherein the at least one feature for receiving the implement includes at least one bar shaped element.

In yet another aspect, wherein the at least one feature for receiving the implement includes a pair of bar shaped elements spatially arranged to receive the implement.

In yet another aspect, the cap includes at least one feature for receiving an implement, wherein the implement is a coin.

In yet another, the grip element is formed having a cylindrical shape extending axially upward from a container cap planar transversing surface.

In yet another, the grip element is formed having a cylindrical shape extending axially upward from a container cap planar transversing surface, a peripheral edge of the grip element being radially inward of the peripheral edge of the of the container cap.

In yet another, the grip element is formed having a cylindrical shape extending axially upward from a container cap planar transversing surface, a peripheral edge of the grip element having a diameter that is substantially equivalent to a diameter of the peripheral edge of the of the container cap.

In yet another, the grip element is formed having a cylindrical shape extending axially upward from a container cap planar transversing surface, a peripheral edge of the grip element being radially outward of the peripheral edge of the of the container cap.

In yet another, the cylindrical shape extending axially upward from the container cap planar transversing surface further comprises an upper surface extending across a distal peripheral edge of the cylindrical shaped sidewalls of the grip feature.

In yet another, the cylindrical shape extending axially upward from the container cap planar transversing surface further comprises the upper surface extending across the distal peripheral edge of the cylindrical shaped sidewalls of the grip feature, the grip feature defining a hollow interior.

In yet another, the grip element includes a cylindrical shaped sidewall extending axially and an upper surface extending generally radially, the upper surface being contiguous with a distal peripheral edge of the cylindrical shaped sidewalls of the grip feature, the cylindrical shaped sidewall and the upper surface collectively forming a hollowed container cap.

In yet another, the cylindrical shape extending axially upward from the container cap planar transversing surface terminating at the distal peripheral edge of the cylindrical shaped sidewall of the grip feature.

In yet another, the cylindrical shape extending axially upward from the container cap planar transversing surface terminating at the distal peripheral edge of the cylindrical shaped sidewall of the grip feature, the grip feature, A combination of an interior surface of the cylindrically shaped sidewall and the exterior (upper) surface of the container cap planar transversing surface defining a hollow exterior.

In yet another, the combination of the interior surface of the cylindrically shaped sidewall and the exterior (upper) surface of the container cap planar transversing surface defining a hollow exterior, when inverted define a cup.

In yet another aspect, a measurement scale can be provided on the interior surface of the cylindrically shaped sidewall, enabling the container cap to be used as a measuring cup.

In yet another aspect, the grip element can include a series of grip enhancing features.

In yet another aspect, the grip enhancing features can be a series of axially oriented bosses.

In yet another aspect, the grip element can extend to a diameter that is substantially equal to or greater than a diameter of a finished seam of the resealable container lid, as assembled to a container body.

In yet another aspect, the container cap can be designed to remain below chime of the container lid when the container cap is assembled to the container lid.

In yet another aspect, the container cap can be designed to remain above chime of the container lid when the container cap is assembled to the container lid.

In yet another aspect, the container cap can be designed to remain below chime of the container lid when the container cap is assembled to the container lid in a first configuration and, in a modified configuration, the container cap can extend above chime of the container lid when the container cap is assembled to the container lid.

In yet another aspect, the grip element can include a living hinge, enabling the grip element to pivot between a stored (low profile) configuration and an in use (extended substantially upright) configuration.

In yet another aspect, the grip feature can be designed to receive at least one of:

- a tangential force (such as on an exterior surface of a cylindrical sidewall),
- a direct force (such as on a bar shaped grip), and
- a torsional force (such as on the pivoting grip feature).

In yet another aspect, an earn feature can be formed on an exterior surface of the grip cylindrical sidewall proximate a lower (free) edge thereof.

In yet another aspect, the cap is designed to include a clearance for features of the container lid, the container lid features being on the exterior side of the container lid.

In yet another aspect, features of the container lid, the container lid located on the exterior side of the container lid can include the tab, the tab rivet, reinforcement formations, and the like.

In yet another, the container cap comprising the cylindrically shaped sidewall and the exterior (upper) surface of the container cap planar transversing surface defining a hollow interior, enables storage of goods therein, when the container cap is assembled to the container lid.

CAP— Piercing Element

In yet another aspect, the cap includes a piercing element or incisor extending downward from a bottom surface of the cap.

In yet another aspect, the incisor is formed using a molding process.

In yet another aspect, the incisor is formed using a molding process that is accomplished during the formation of the cap.

In yet another aspect, the incisor is formed using a metal forming process.

In yet another aspect, the incisor is formed as a debossed feature.

In yet another aspect, the incisor includes a leading edge, a trailing edge and a bottom surface.

In yet another aspect, the leading edge of the incisor is adapted to initiate a fracture of the score line.

In yet another aspect, the incisor is formed using a metal forming process that is accomplished during the formation of the cap.

In yet another aspect, the incisor is integral with a secondary feature, wherein the secondary feature extends downward from the cap bottom surface.

In yet another aspect, the incisor is integral and located within with a secondary feature, wherein the secondary feature extends downward from the cap bottom surface.

In yet another aspect, the secondary feature being a platform.

In yet another aspect, the secondary feature being a debossed section.

In yet another aspect, the secondary feature being a grip formation.

In yet another aspect, the incisor extends downward from a bottom surface of the secondary feature.

In yet another aspect, the secondary feature is a ramp or other load generating and/or distributing formation.

In yet another aspect, the incisor is a ramp or other load generating formation.

In yet another aspect, the incisor is located concentrically respective to the peripheral edge of the cap.

In yet another aspect, the incisor is located off-center respective to the peripheral edge of the cap.

In yet another aspect, the incisor is located in rotational registration with at least a portion of the score line.

In yet another aspect, the incisor is located in rotational registration with a thinned or fracture initiation feature of the score line.

In yet another aspect, the incisor is located in a position on the cap, wherein the incisor intersects a portion of the score line during a rotational motion of the cap respective to the container lid.

In yet another aspect, the incisor is located in registration with the score line, wherein the incisor applies a fracturing force to the score line as the cap is axially positioned towards the container lid.

In yet another aspect, the cap can include a plurality of incisors.

In yet another aspect, the cap can include a plurality of incisors, wherein each of the plurality of incisors is located enabling ambiguity of initial assembly of the cap onto the container lid.

CAP—Tamper Feature

In yet another aspect, cap includes tamper evidence feature.

In yet another aspect, the tamper evidence feature of the cap is provided as a frangible skirt circumscribing a peripheral edge of the cap.

In yet another aspect, the cap has an upper end having a peripheral edge, and the cap includes a skirt formed along the peripheral edge, the skirt including an opened indicating feature for visually indicating when beverage container has been opened.

In yet another aspect, the opened indicating feature includes score lines formed radially outwardly at spaced intervals along the skirt, wherein the score lines are broken to allow movement of the skirt when the cap moves downwardly.

In yet another aspect, the tamper indicator can be formed as an embossed dome shaped upward projection.

In yet another aspect, the embossed dome shaped upward projection operates by allowing a flexure in a direction opposite to the domed shape when unsupported. The flexibility enables the tamper indicator to report, similar to a clicking device.

In yet another aspect, the embossed dome shaped upward projection functions employing a mechanically supported configuration.

In yet another aspect, the embossed dome shaped upward projection can further include a downward projecting probe or operating element to provide support to the embossed dome shaped upward projection.

In yet another aspect, the downward projecting probe or operating element is adapted to contact the opposing surface of the container lid bottom wall. The downward projecting probe contacts the opposing surface of the container lid bottom wall. When the interior volume within the container is pressurized, the contained pressure stiffens the container lid bottom wall. Thus, in a sealed configuration, the downward projecting probe contacting the stiffened container lid bottom wall retains the tamper indicator in an upward shape. When the integrity of the container is compromised, the pressure is equalized within the interior volume of the container, thus no longer providing stiffness to the container lid bottom wall. Thus, in a compromised configuration, the downward projecting probe contacting the unsupported container lid bottom wall no longer retains the tamper indicator in an upward shape, enabling the tamper indicator to flex. The flexibility enables the tamper indicator to report, similar to a clicking device.

In yet another aspect, the embossed dome shaped upward projection functions employing a pneumatically supported configuration.

In yet another aspect, the pneumatically supported configuration employs a vacuum formed within the container. In a vacuum support configuration, the safety indicator is normally drawn towards the interior of the container.

In yet another aspect, the pneumatically supported configuration employs a pressure formed within the container. In a pressure support configuration, the safety indicator is normally forced away from the interior of the container.

In yet another aspect, the embossed dome shaped upward projection is concentrically located respective to a peripheral edge of the cap.

In yet another aspect, the embossed dome shaped upward projection is located off centered respective to a peripheral edge of the cap.

In yet another aspect, the tamper indicator would be formed using a fabrication process compatible with the method(s) used for manufacturing the cap.

In yet another aspect, the downward projecting probe or operating element of the tamper indicator can alternatively be an upward projecting probe extending upward from the cap receiving socket bottom wall of the container lid.

In yet another aspect, the container cap can be fabricated of a transparent or translucent material, enabling the user to visually inspect for a breach of the can tear panel from the bottom wall of the container lid.

In yet another aspect, the container cap can be fabricated of a transparent or translucent material, enabling the user to visually inspect for breach of the bottom wall of the container lid.

CAP and LID Assembly—Retention Features

In yet another aspect, the container lid includes a detent feature for securing the cap in a first position associated with pre-opening, and a second position associated with post-opening.

In yet another aspect, the cam track is configured to include a locking detent segment.

In yet another aspect, the locking detent segment is designed to retain the cap from rotating in a reverse direction following an initial assembly of the cap to the cap receiving socket within the container lid.

In yet another aspect, the cap is retained in a container pre-opened position by locating each socket sidewall cam engaging projections within each respective cam track, with each socket sidewall cam engaging projections being located following the respective embossed cam surface lower detent. Further rotation in an opening direction is hindered by an upward sloping cam groove surface segment.

In yet another aspect, the cam track includes features to retain the cap within the cap receiving cavity, while enabling an opening sequence, a dispensing configuration, as a sealing configuration. This can be accomplished by including a downward directed segment at an opposite end of the cam track.

In yet another aspect, the cam track can include at least one of an upper detent and a downward directed segment at an upper distal end thereof, wherein the at least one of an upper detent and a downward directed segment is adapted to curtail any further rotational motion of the cap, thus retaining the cap within the cap receiving cavity of the container lid.

In yet another aspect, the cap is retained in a container pre-opened position by locating the incisor against an end wall of an incisor pathway channel to limit rotation in an opening direction and locating each cam follower past a locking detent segment of each associated cam track to limit rotation in a reverse direction.

In yet another aspect, the detent feature is associated with the cam feature.

In yet another aspect, the pre-opening position is associated with functions of storage and transport, and the post-opening position is associated with resealing.

In yet another aspect, the detent feature includes at least a portion of the earn feature.

In yet another aspect, the cam feature includes earn elements formed on the cap which engage earn followers formed in the cylindrical sidewall of the lid, and the detent feature include detents formed in the cam elements which cooperate with the cam followers to hold the cap in the pre-opening and post opening positions.

In yet another aspect, the sealing element is secondarily employed as a retention element to retain a rotational relationship between the cap and the container lid.

CAP and LID Assembly—Sealing Formation

In yet another aspect, a seal is formed between the container lid and the cap, more specifically; the seal is formed between an annular seal provided on a bottom surface of the cap and a respective sealing surface located on the upper surface of the container lid bottom wall.

In yet another aspect, the sealing surface located on the upper surface of the container lid bottom wall extends between the vertical socket wall and the fractured score line.

In yet another aspect, the sealing feature provided on the cap is concentrically located respective to a peripheral edge of the cap.

In yet another aspect, the sealing feature provided on the cap is located off centered respective to a peripheral edge of the cap. The sealing feature would be located on the cap to encompass the score line about the tear panel when the cap is rotated into a sealing position in the container lid.

In yet another aspect, the sealing feature provided on the cap is teardrop shaped.

In yet another aspect, the sealing feature provided on the cap is located off centered respective to a peripheral edge of the cap and teardrop shaped.

In yet another aspect, a seal is formed between the container lid and the cap, more specifically; the seal is formed between an annular seal element carried by an annular surface circumscribing a peripheral edge of the planar traversing wall of the cap and a mating surface formed on the container lid. The mating section is formed on an annular surface circumscribing a peripheral edge of the socket bottom wall of the container lid.

In yet another aspect, a seal is formed between the container lid and the cap, more specifically; the seal is formed between an annular seal provided on a frustum shaped surface circumscribing an outer peripheral edge of the cap and a mating section formed on the container lid. The mating section is formed having a frustum shape and is located interposed between the container lid seaming panel and the vertical socket sidewall.

In yet another aspect, the container lid contains a frustum shaped sidewall section, the frustum shaped sidewall section extending between the chuck shoulder and the seaming panel.

In yet another aspect, the container lid contains a frustum shaped sidewall section, the frustum shaped sidewall section extending between the chuck shoulder and the vertical socket sidewall.

In yet another aspect, the container lid contains a frustum shaped cap seal engaging annular section, the frustum shaped cap seal engaging annular section extending between the peripheral edge of the bottom wall and a lower edge of the vertical socket sidewall.

In yet another aspect, the cap and lid form a seal between the seating arrangement of the socket and the lower surface of the cap.

In yet another aspect, the cap and lid form a seal between an upper surface of the substantially planar member and a contacting surface of a flange extending radially outward from a peripheral edge about the cap.

In yet another aspect, the cap fits substantially within the socket, and the cam feature comprises earn surfaces formed in one of the cylindrical sidewalls of the socket and the cap, and at least one projection formed in the other of the cylindrical sidewalls of the socket and the cap.

In yet another aspect, the pliant sealing element can be carried by one of the cap or the container lid.

In yet another aspect, the pliant sealing element can be located between the cap and the container lid.

In yet another aspect, the pliant sealing element can be an independent component of the container lid assembly, wherein the pliant sealing element would be located between the cap and the container lid.

In yet another aspect, the cap includes a substantially axially extending pliant annular seal that is designed to engage with an interior surface of the countersink of the container lid.

In yet another aspect, the cap includes a substantially axially extending pliant annular seal that is designed to engage with an interior surface of the countersink of the container lid, wherein the pliant property of the material enables the substantially axially extending pliant annular seal to flex and create a reliable seal.

In yet another aspect, the substantially axially extending pliant annular seal is integral with the container cap.

In yet another aspect, the cap includes a generally radially extending pliant annular seal that is designed to engage with an outer peripheral surface of the bottom wall of the container lid, wherein the pliant property of the material enables the generally radially extending pliant annular seal to flex and create a reliable seal.

In yet another aspect, the generally radially extending pliant annular seal extends in a radially inward direction from the container cap, In yet another aspect, the generally radially extending pliant annular seal is integral with the container cap.

In yet another aspect, the cap includes the substantially axially extending pliant annular seal and the generally radially extending pliant annular seal.

In yet another aspect, the substantially axially extending pliant annular seal and the generally radially extending pliant annular seal are integral with the container cap.

In yet another aspect, the cap includes a generally axially extending pliant annular seal that is designed to engage with a frustum shaped interior surface of the peripheral edge of bottom wall of the container lid.

In yet another aspect, the container lid comprising the frustum shaped interior surface is exclusive of a countersink.

In yet another aspect, the generally axially extending pliant annular seal extends from the container cap in a slightly radially inward direction.

In yet another aspect, the generally axially extending pliant annular seal extends axially, with a change in direction, where a distal segment extends in a slightly radially inward direction.

In yet another aspect, the cap includes a generally axially extending pliant annular seal that is designed to engage with an interior surface of the countersink of the container lid, wherein the pliant property of the material enables the substantially axially extending pliant annular seal to flex and create a reliable seal.

In yet another aspect, the substantially axially extending pliant annular seal is integral with the container cap.

In yet another aspect, the container cap further comprises at least one radial sealing ring formed circumscribing an exterior cylindrical sidewall of the container cap.

In yet another aspect, each of the at least one radial sealing ring is formed extending partially radially outward from the exterior cylindrical sidewall of the container cap.

In yet another aspect, each of the at least one radial sealing ring is integrally fabricated with the container cap.

In yet another aspect, each of the at least one radial sealing ring is integrally fabricated with the container cap, wherein the container cap is of a moldable material.

In yet another aspect, each of the at least one radial sealing ring is integrally fabricated with the container cap, wherein the container cap is of a moldable material, the moldable material being one of: plastic, nylon, rubber, silicone, and the like.

In yet another aspect, wherein the material used to fabricate the at least one radial sealing ring and the material used to fabricate the container cap can be different from one another.

In yet another aspect, each of the at least one radial sealing ring is integrally fabricated with the container cap, wherein the container cap is of a moldable material, wherein plastic properties of the material enable flexure of the at least one radial sealing ring.

In yet another aspect, each of the at least one radial sealing ring is integrally fabricated with the container cap, wherein the container cap is of a molded plastic.

In yet another aspect, each of the at least one radial sealing ring is integrally fabricated with the container cap, wherein the container cap is of a molded plastic, wherein plastic properties of the material enable flexure of the at least one radial sealing ring.

In yet another aspect, each of the at least one radial sealing ring is formed extending partially axially from the exterior cylindrical sidewall of the container cap in a direction towards a bottom of the cap.

In yet another aspect, the container cap further comprises a series of radial sealing rings formed circumscribing the exterior cylindrical sidewall of the container cap.

In yet another aspect, the container cap further comprises a series of radial sealing rings formed circumscribing the exterior cylindrical sidewall of the container cap, wherein one radial sealing ring partially overlaps an adjacent radial sealing ring.

In yet another aspect, the at least one radial sealing ring seal engages with a generally axially oriented interior surface of the container lid.

In yet another aspect, the at least one radial sealing ring seal engages with an interior of the seaming panel of the container lid.

In yet another aspect, the at least one radial sealing ring seal engages with an interior of the chuck wall of the container lid.

In yet another aspect, the at least one radial sealing ring seal engages with an interior of the cylindrical sidewall of the container lid.

In yet another aspect, an elastomer is disposed within the countersink.

In yet another aspect, a lower edge of the cap engages with the elastomer disposed within the countersink to seal the container.

In yet another aspect, engagement between the elastomer disposed upon the interior surface of the cylindrical sidewall of the container lid and the threaded exterior sidewall of the container cap forms a seal.

In yet another aspect, an elastomeric sealant material is disposed upon a bottom surface of the container cap; a peripheral edge of the elastomeric sealant material forms an annular sealing feature, wherein the annular sealing feature engages with a peripheral edge of the bottom wall of the container lid.

In yet another aspect, wherein the elastomeric sealant material is applied to the cap, adhesively bonded to the cap, overmolded into the cap, mechanically retained in position, and the like.

In yet another aspect, the elastomeric sealant material is disposed upon the entire bottom surface of the container cap.

In yet another aspect, the cap further comprises a generally radially directed peripheral seal adapted to seal against the container lid cylindrical sidewall to deter dust and other contaminants from collecting within the threaded area of the container lid and the container lid countersink.

CAP and LID Assembly—Container Body Seaming

In yet another aspect, the seaming panel of the container lid is joined or seamed to an upper, free edge of the container body.

In yet another aspect, the seaming panel of the container lid is joined or seamed to an upper, free edge of the container body using a two operation progressive roller that circumscribes the seaming panel.

In yet another aspect, the seaming process employs a two operation progressive roller and a seaming chuck.

In yet another aspect, the first operation roller creates a cover hook, where the seaming panel of the container lid hooks around the upper and outer edge of the container body seaming panel or flange (upper free edge), initiating the seam.

In yet another aspect, the second operation roller compresses the rolled, initiated seaming panel, finalizing the seaming process.

In yet another aspect, the seaming chuck seats against chuck wall and chuck shoulder of the container lid. The chuck wall is formed in a generally axial direction. The chuck shoulder is formed in a generally radial direction.

In yet another aspect, the seaming chuck is designed to exclusively contact the container lid.

In yet another aspect, the seaming chuck is designed to exclusively contact the container lid, wherein the seaming chuck includes a cavity which provides clearance between the seaming chuck and features of the container cap, when the container cap is assembled to the container lid during the seaming process.

In yet another aspect, the seaming chuck is designed to properly located and retain the container lid in position on the container body throughout the seaming process.

In yet another aspect, the seaming chuck provides a radial registration with the seaming chuck and the container body by contact between the seaming chuck and the generally axially directed sidewall of the container body (or container cap when included) throughout the seaming process.

In yet another aspect, the seaming chuck provides an axial registration with the seaming chuck and the container body by contact between the seaming chuck and the chuck shoulder of the container body (or container cap when included) throughout the seaming process.

In yet another aspect, the seaming chuck is employed as an anvil for the seaming roller throughout the seaming process.

In yet another aspect, the seaming chuck is designed to contact the container cap, wherein the forces respective to the seaming chuck are passed through the container cap onto the container lid.

In yet another aspect, the seaming roller includes a clearance for the container cap.

In yet another aspect, the seaming roller is designed to provide a seaming function exclusive of any contact with the container cap.

In yet another aspect, the container lid seaming panel is assembled to the container body seaming flange.

In yet another aspect, the container lid seaming panel is assembled to the container body seaming flange using a roll forming process.

In yet another aspect, the container lid seaming panel is assembled to the container body seaming flange using a roll forming process in conjunction with a compression process. The roll forming process can be completed using any suitable roll forming process. In one exemplary method, at least one roller is rotated about a stationary assembly. In a second exemplary method, the assembly is rotated about at least one stationary roller. In a third exemplary method, the assembly is rotated about at least one rotating roller.

In yet another aspect, the container lid seaming panel is assembled to the container body seaming flange using a step of applying an axial compression force to the container lid. The axial compression force application process can be completed using any suitable roll forming process.

In yet another aspect, the container lid seaming panel is assembled to the container body seaming flange using a step of applying an axial compression force to the container lid using a frustum shaped mating surface between a seaming chuck and the container lid seaming panel.

In yet another aspect, the container lid seaming panel is assembled to the container body seaming flange using a step of applying an axial compression force to the container lid by applying a compression force from the respective seating feature provided on the seaming chuck and a seaming chuck shoulder formed about an interior surface of the container lid sidewall. The respective seating feature can alternatively be referred to as a planar driving surface.

In yet another aspect, the seaming chuck can further comprise a cavity formed extending inward from a seaming chuck bottom surface, wherein the seaming chuck bottom surface cavity provides clearance for features of the container lid assembly.

In yet another aspect, the seaming chuck can further comprise a cavity formed extending inward from a seaming chuck bottom surface, wherein the seaming chuck bottom surface cavity provides clearance for features of the container lid assembly, which includes the container lid and the container cap.

In yet another aspect, the container lid seaming panel can be assembled to the container body seaming flange using a bonding process.

In yet another aspect, the container lid is adapted for deformation during subjection to and resulting from a retort process.

In yet another aspect, a tamper indicator actuator (or similar feature) ensures and maintains sufficient separation between the resealable container cap substantially horizontally oriented traversing wall (more specifically, the incisor) and the cap receiving socket bottom wall to avoid premature fracturing of the score line during subjection to the retort process.

In yet another aspect, during the retort process, the vertical sidewall of the container lid deforms inward, pinching the cam tracks against the respective cam followers of the resealable container cap. This configuration retains the cap within cap receiving socket of the container lid while subjected to the retort process.

CAP and LID Assembly—General Features

In accordance with another variant of a resealable container lid assembly in accordance with the present invention the resealable container lid assembly includes:

- a container lid comprising:
  - a vertical sidewall having a cylindrical shape extending between an upper peripheral edge and a lower peripheral edge,
  - a seaming panel formed about the vertical sidewall upper peripheral edge, the seaming panel being adapted to assembly to the container lid to a comestible container,
  - a container lid rotational and axial guide feature integral with the vertical sidewall, and
  - a container lid seal engaging surface;
- a container lid sealing cap comprising:
  - a resealable container cap generally horizontally oriented traversing wall,
  - a resealable container cap cylindrical sidewall arranged generally perpendicular to the resealable container cap generally horizontally oriented traversing wall, the resealable container cap cylindrical exterior sidewall having a cylindrical shape, sized to rotationally engage with an interior surface of the container lid vertical sidewall,
  - a grip feature adapted to receive a force to cause a rotational motion of the container lid sealing cap,
  - a sealing cap rotational and axial guide feature integral with the cap vertical sidewall, and
  - a sealing element arranged to engage with the container lid seal engaging surface;
  - wherein the container cap is inserted into an interior volume defined by the container lid vertical sidewall,
  - wherein the sealing element engages with the container lid seal engaging surface when the sealing cap rotational and axial guide feature is rotationally engaged with the container lid rotational and axial guide feature.

In another aspect, the sealing cap rotational and axial guide feature is one of:

a) an at least one cam follower, and b) an at least one cam track; and wherein the container lid rotational and axial guide feature is the other of:

a) the at least one cam follower, and b) the at least one cam track.

In yet another aspect, wherein the container lid seal engaging surface is a frustum shaped surface formed within the container lid vertical sidewall, wherein the cap sealing element is arranged having a frustum shaped surface adapted to engage with the frustum shaped surface of the container lid seal engaging surface.

In yet another aspect, the resealable container lid assembly is further configured to include:

a container lid further comprising:

a countersink formed about the lower peripheral edge of the vertical sidewall, the countersink having a generally "U" shape, a cap receiving socket bottom wall extending radially inward from an inner upper edge of the countersink, and a score line formed within the cap receiving socket bottom wall, the score line arranged in a shape defining a tear panel and a tear panel hinge, wherein the container lid vertical sidewall, the countersink, and the cap receiving socket bottom wall collectively define a cap receiving socket; and a container lid sealing cap further comprising:

an incisor extending downward from a bottom surface of the resealable container cap generally horizontally oriented traversing wall, wherein the container cap is inserted into the cap receiving socket, wherein the sealing cap rotational and axial guide feature and the container lid rotational and axial guide feature are adapted to at least one of:

a) axially translate the resealable container cap within the cap receiving socket when the resealable container cap is rotated respective to the container lid, and b) generate an axial force between at least one feature integral with the bottom surface of the cap receiving socket bottom wall and a mating feature integral with the cap receiving socket bottom wall.

wherein the incisor is adapted to initiate a fracture of the score line during rotation of the sealing cap within the cap receiving socket.

In yet another aspect, the container lid further comprising an incisor pathway channel formed within the cap receiving socket bottom wall, the incisor pathway having a semi-circular embossed shape with one end located at least one of proximate a fracture initiation region of the score line and overlapping the fracture initiation region of the score line.

In yet another aspect, the container lid sealing cap further comprising an incisor platform formed extending downward from the bottom surface of the resealable container cap generally horizontally oriented traversing wall, the incisor extending downward from the incisor platform, the container lid further comprising at least one raised feature adapted to engage with the incisor platform to propagate fracturing of the score line during rotation of the container lid sealing cap within the cap receiving socket.

In yet another aspect, the container lid sealing cap further comprising an incisor platform formed extending downward from the bottom surface of the resealable container cap generally horizontally oriented traversing wall, the incisor extending downward from the incisor platform, the container lid further comprising at least one raised feature, adapted to engage with the incisor platform to propagate fracturing of the score line during rotation of the container lid sealing cap within the cap receiving socket, wherein at least of portion of the at least one raised feature is formed within the tear panel, providing rigidity to the tear panel.

In yet another aspect, the container lid sealing cap further comprising an incisor platform formed extending downward from the bottom surface of the resealable container cap generally horizontally oriented traversing wall, the incisor extending downward from the incisor platform, the container lid further comprising at least one raised feature, adapted to engage with the incisor platform to propagate fracturing of the score line during rotation of the container lid sealing cap within the cap receiving socket.

In yet another aspect, wherein at least one of:

the incisor is adapted to fold the tear panel away from the cap receiving socket bottom wall, and an incisor platform is adapted to fold the tear panel away from the cap receiving socket bottom wall, wherein the incisor platform extends downward from the bottom surface of the resealable container cap generally horizontally oriented traversing wall.

In yet another aspect, the container lid sealing cap further comprises a tamper indicator, wherein the tamper indicator is adapted to inform a consumer when a resealable container assembly comprising the container lid has been breached.

In yet another aspect, the cap sealing element is one of:

a) a sealing gasket carried by a bottom surface of the resealable container cap generally horizontally oriented traversing wall, b) a sealing gasket carried by an annular surface of the bottom surface of the resealable container cap generally horizontally oriented traversing wall, or c) a frustum shaped surface formed within the resealable container cap cylindrical sidewall.

In yet another aspect, the incisor includes a leading edge, a trailing edge, and a bottom edge.

In yet another aspect, the leading edge of the incisor is adapted to initiate a fracture of the score line during rotation of the sealing cap within the cap receiving socket.

CAP and LID Assembly—Miscellaneous Features

In yet another aspect, at least one of the container lid and the cap include indicia presenting operating instructions for operating the container lid and cap assembly.

In yet another aspect, the operating indicia includes instructions for at least one of opening, dispensing, and closing the cap upon the container lid.

The cap may be included with the container or offered as a separate implement, being sold separately from the beverage container, and re-useable after washing.

In yet another aspect, the cap can include a child's sip cup top configuration, enabling the beverage container be converted into a child's sip cup.

In yet another aspect, the cap can include a baby bottle "nipple" formation to convert the beverage container into a baby bottle.

In yet another aspect, the cap can include a baby bottle "nipple" formation to convert the beverage container into a baby bottle. In accordance with this variant, the contents of the container could be infant formula.

In yet another aspect, the cap can include an axially actuated resealable sports bottle dispensing mechanism to convert the beverage container into a sports bottle.

In yet another aspect, the cap can include a rotationally actuated resealable bottle dispensing mechanism. The rotationally actuated resealable bottle dispensing mechanism can be provided in a form factor of a spout.

In yet another aspect, the cap can include a straw gasket for retaining a straw within a sealed cap. The cap can be a two piece configuration (resembling a mason jar styled two piece cap) enabling a straw aperture to remain in a rotational relationship with the dispensing aperture during assembly of the cap to the container lid.

In yet another aspect, the two piece configuration includes an earn feature disposed therebetween, wherein the earn feature translates a rotation of an outer two piece cap configuration ring into an axial motion of the inner, non-rotating center sealing two piece cap component. The axial motion engages and maintains a seal between the cap and the container lid.

In yet another aspect, the cap includes the straw gasket for retaining a straw within a sealed cap includes a pliant straw retention and sealing element. The pliant straw retention and sealing element is preferably designed having an elongated, tubular shape.

In yet another aspect, the cap includes a projection that is adapted to extend into the dispensing aperture of the breached container lid.

In yet another aspect, the cap includes a concentric projection that is adapted to extend into the dispensing aperture of the breached container lid.

In yet another aspect, the cap includes an off-centered projection that is adapted to extend into the dispensing aperture of the breached container lid.

In yet another aspect, the off-centered projection can be employed to maintain a rotational position of the two piece cap center component respective to the container lid during assembly of the two piece cap to the container lid.

In yet another aspect, the shape of the tubular container body sidewall could be one of any number of shapes including:

a. Cylindrical,
b. Spherical,
c. Conical,
d. Polygonal, or
e. Contoured tubular (examples of contoured tubular sidewalls include: COKE bottle/BUDWEISER BOWTIE can/HEINEKEN Keg Can).

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Figure 42:
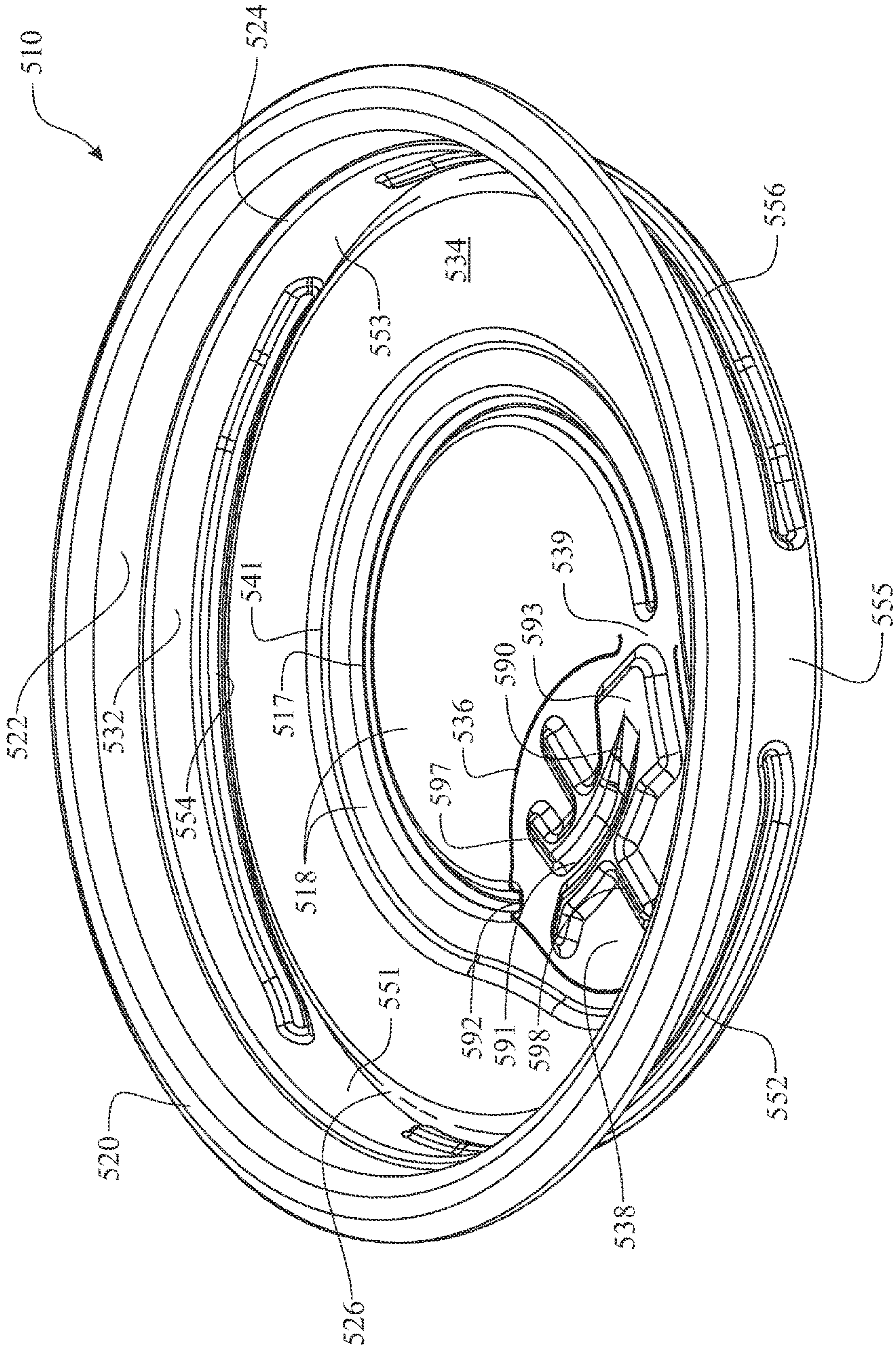
FIG. 42 presents a top isometric view introducing another embodiment of a container lid, wherein the illustrated embodiment includes a deeper container lid sidewall defining the socket, the container lid further introducing a series of ramps to create and propagate a fracture of a score line defining a tear panel and bending of the tear panel.
Figure 45:
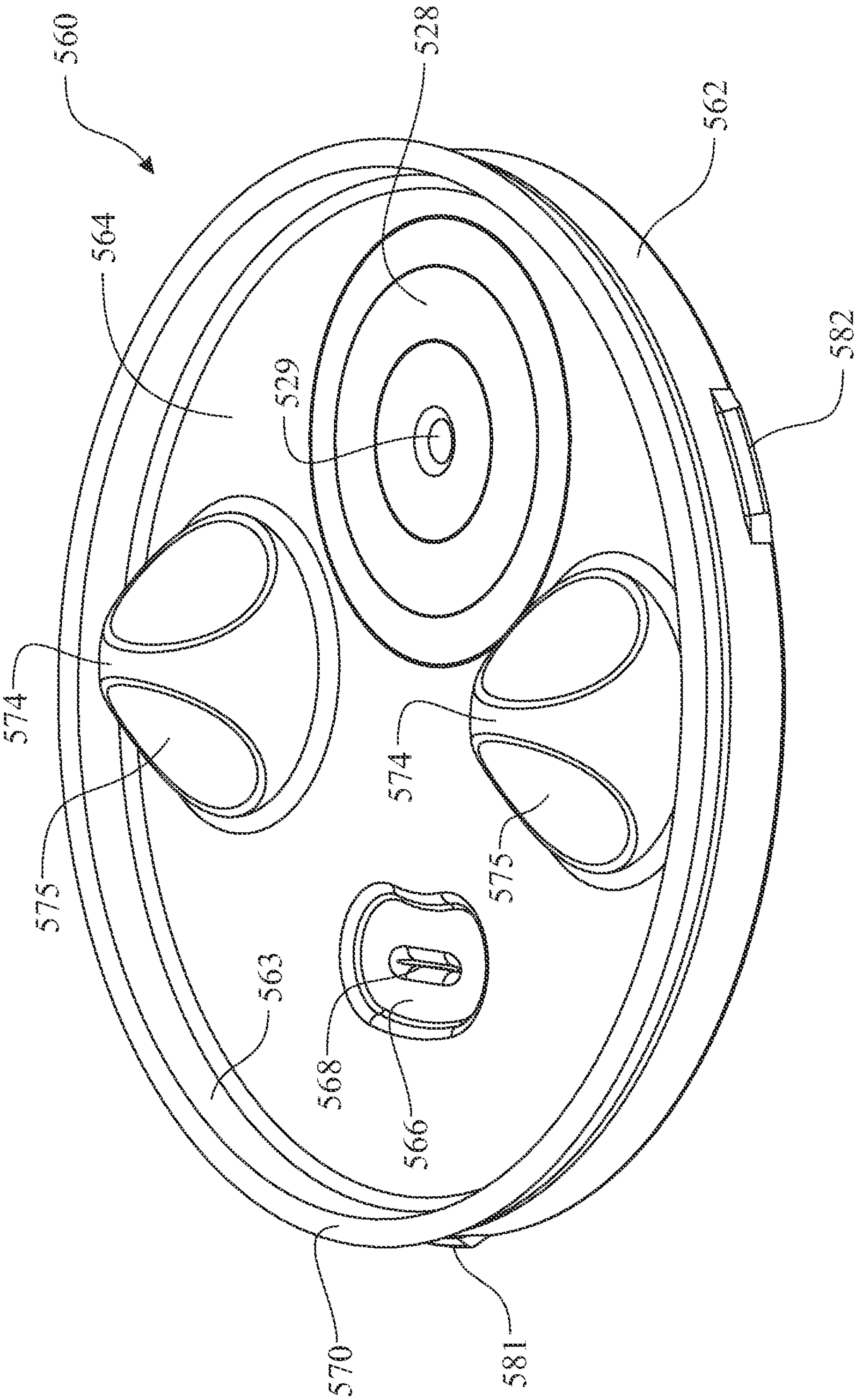
FIG. 45 presents a top isometric view introducing a cap for use with the container lid introduced in FIG. 42, the cap being formed from a planar sheet of raw material, the exemplary cap introducing: a safety feature, a pair of finger grips, cam following lugs, and a formed offset incisor.
Figure 113:
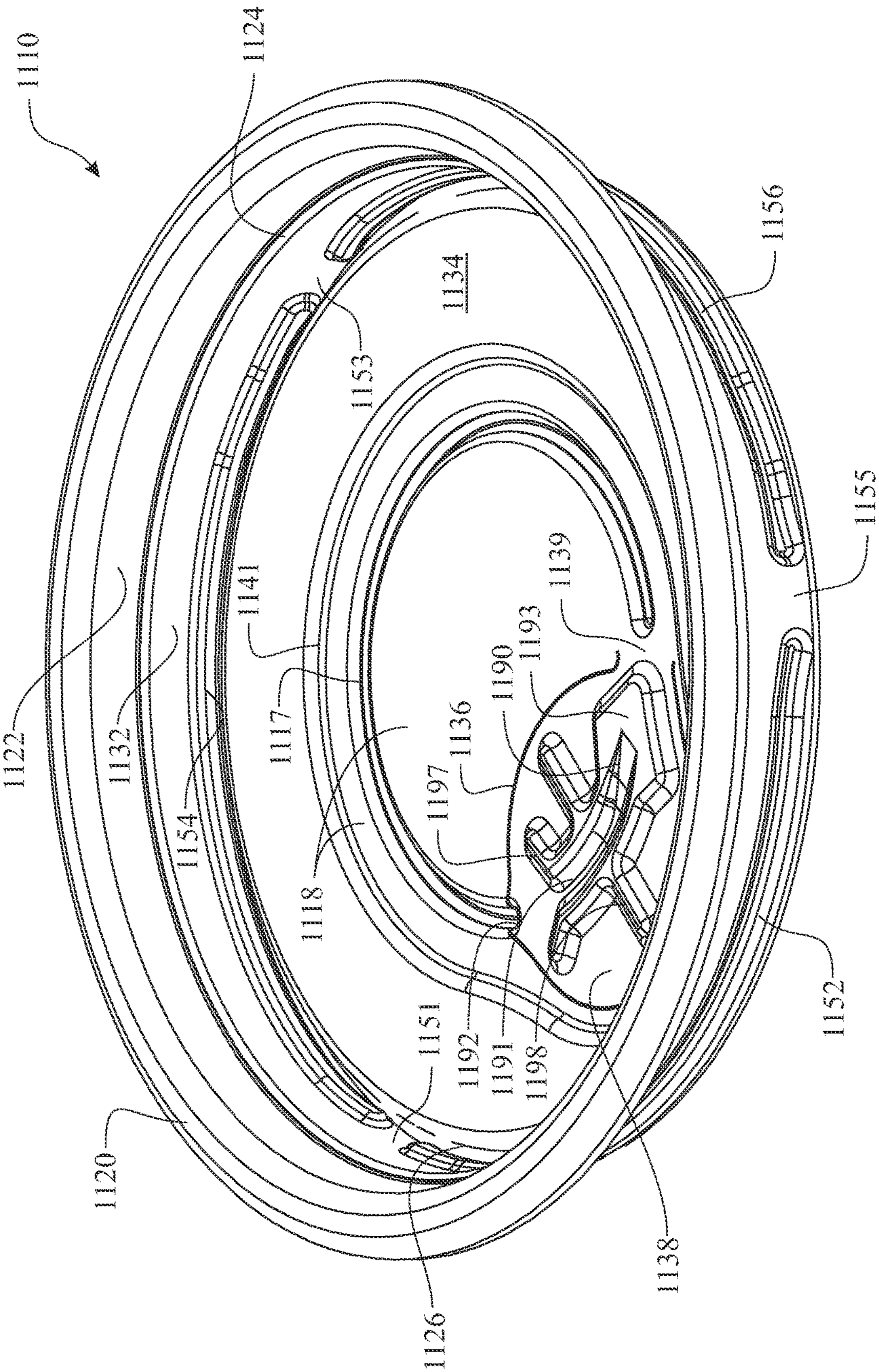
FIG. 113 presents a top isometric view introducing a variant of the container lid originally introduced in FIG. 42, wherein the variant of the container lid is adapted to retain the cap and container lid as an assembly throughout the use thereof.
Figure 114:
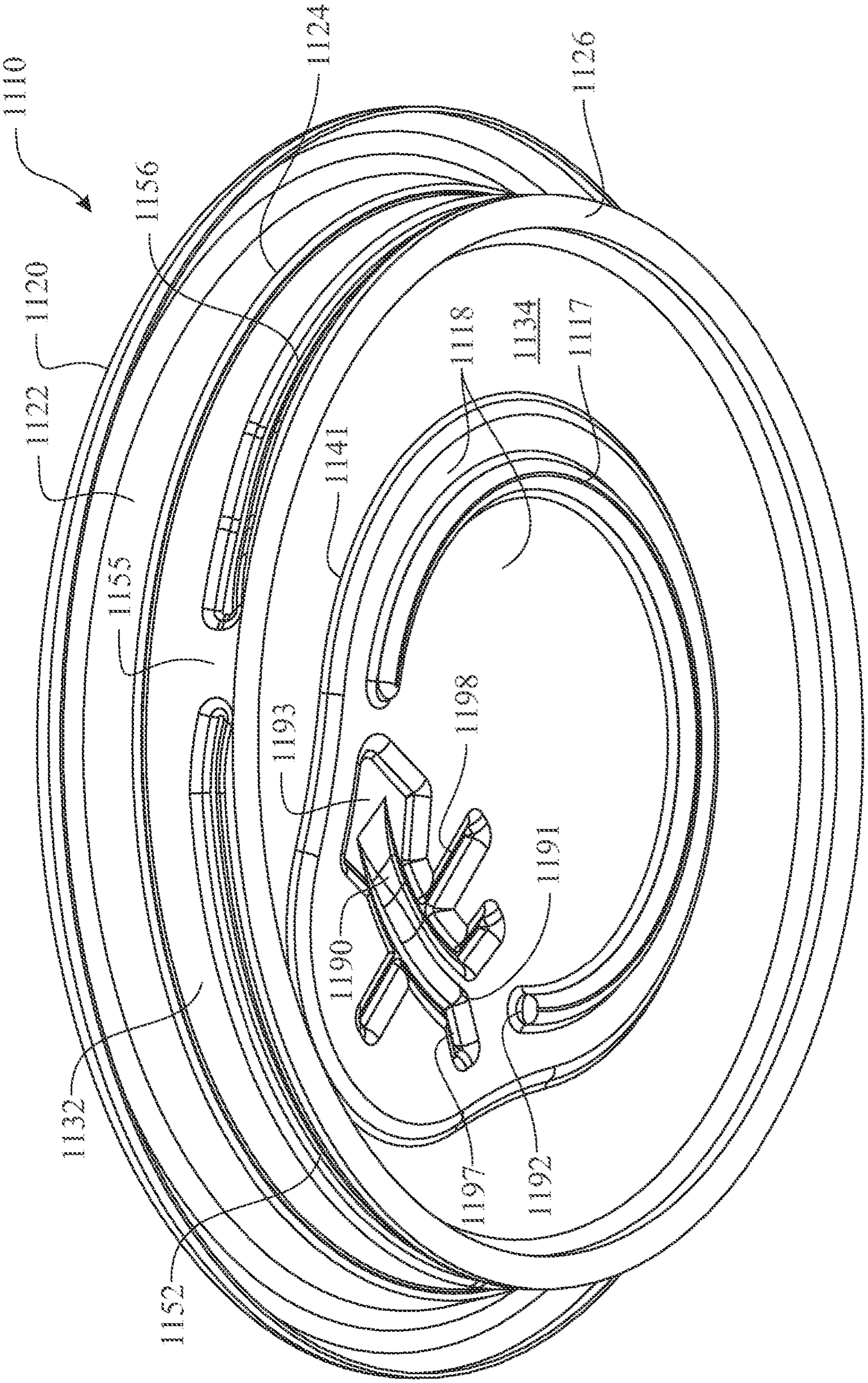
FIG. 114 presents a bottom isometric view of the container lid introduced in FIG. 106.
Figure 115:
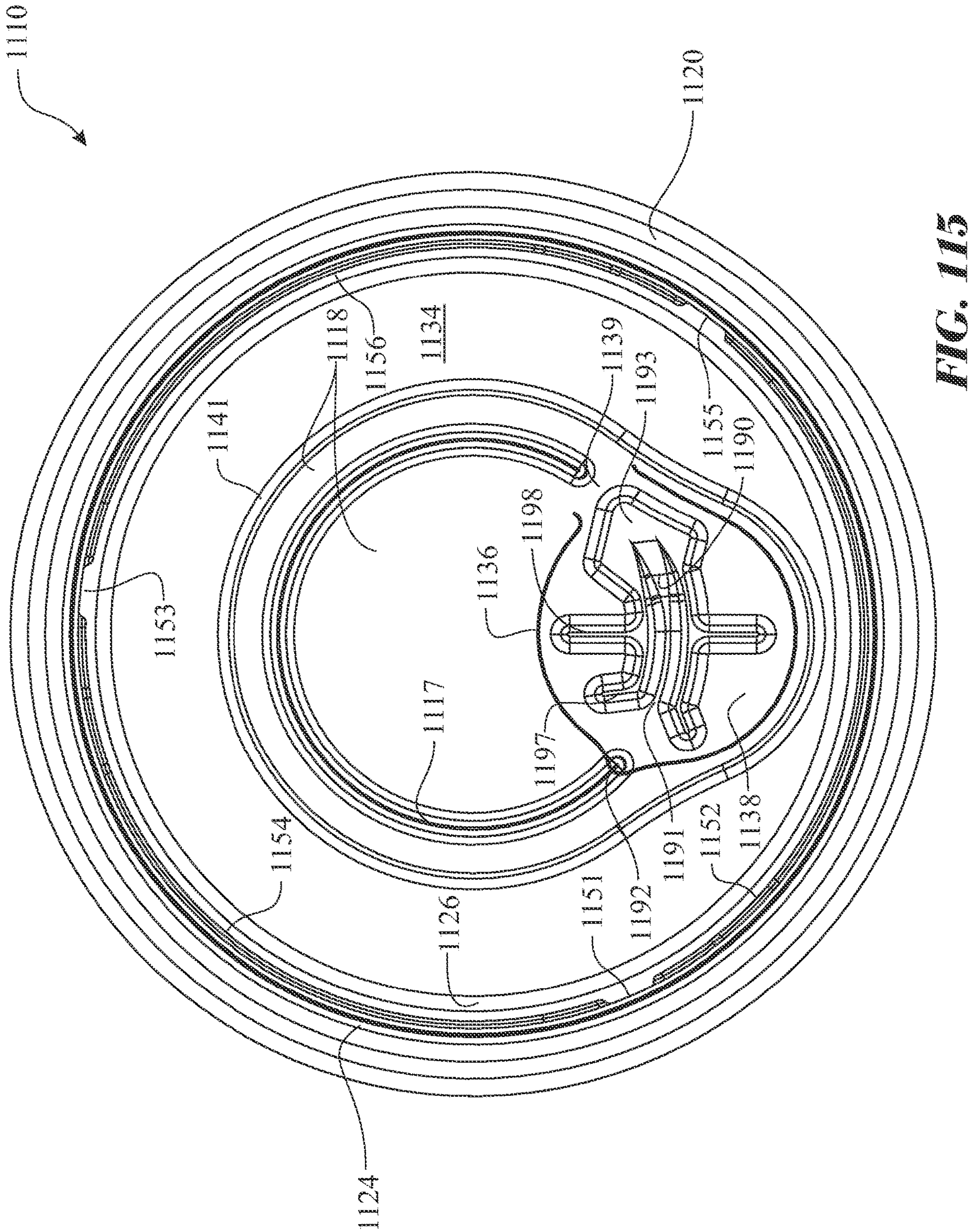
FIG. 115 presents a top plan view of the container lid introduced in FIG. 113.
Figure 116:
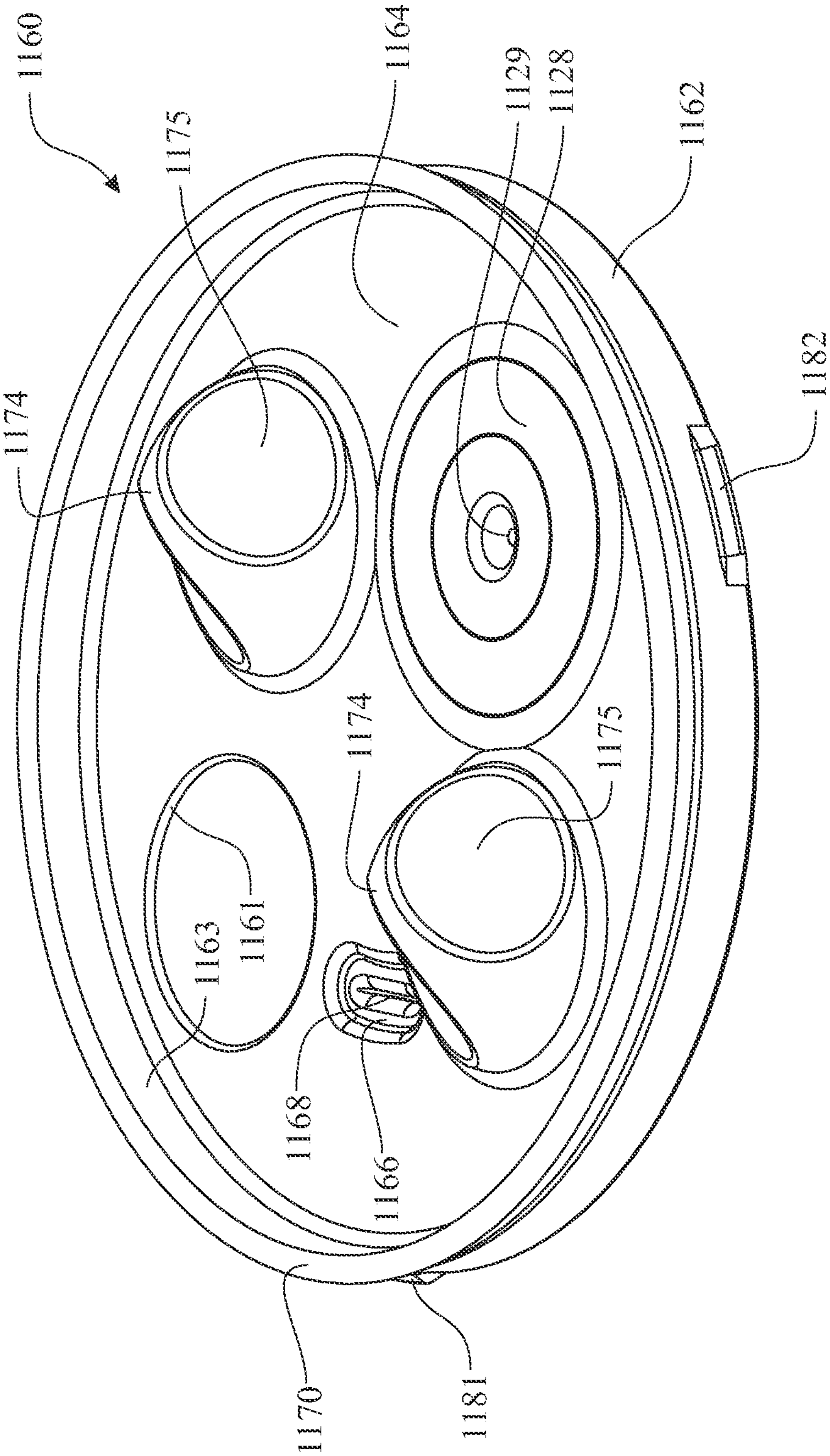
FIG. 116 presents a top isometric view introducing a cap for use with the container lid introduced in FIG. 113, the cap being formed from a planar sheet of raw material, the exemplary cap is similar to the cap introduced in FIG. 45, further comprising a drink dispensing aperture.
Figure 117:
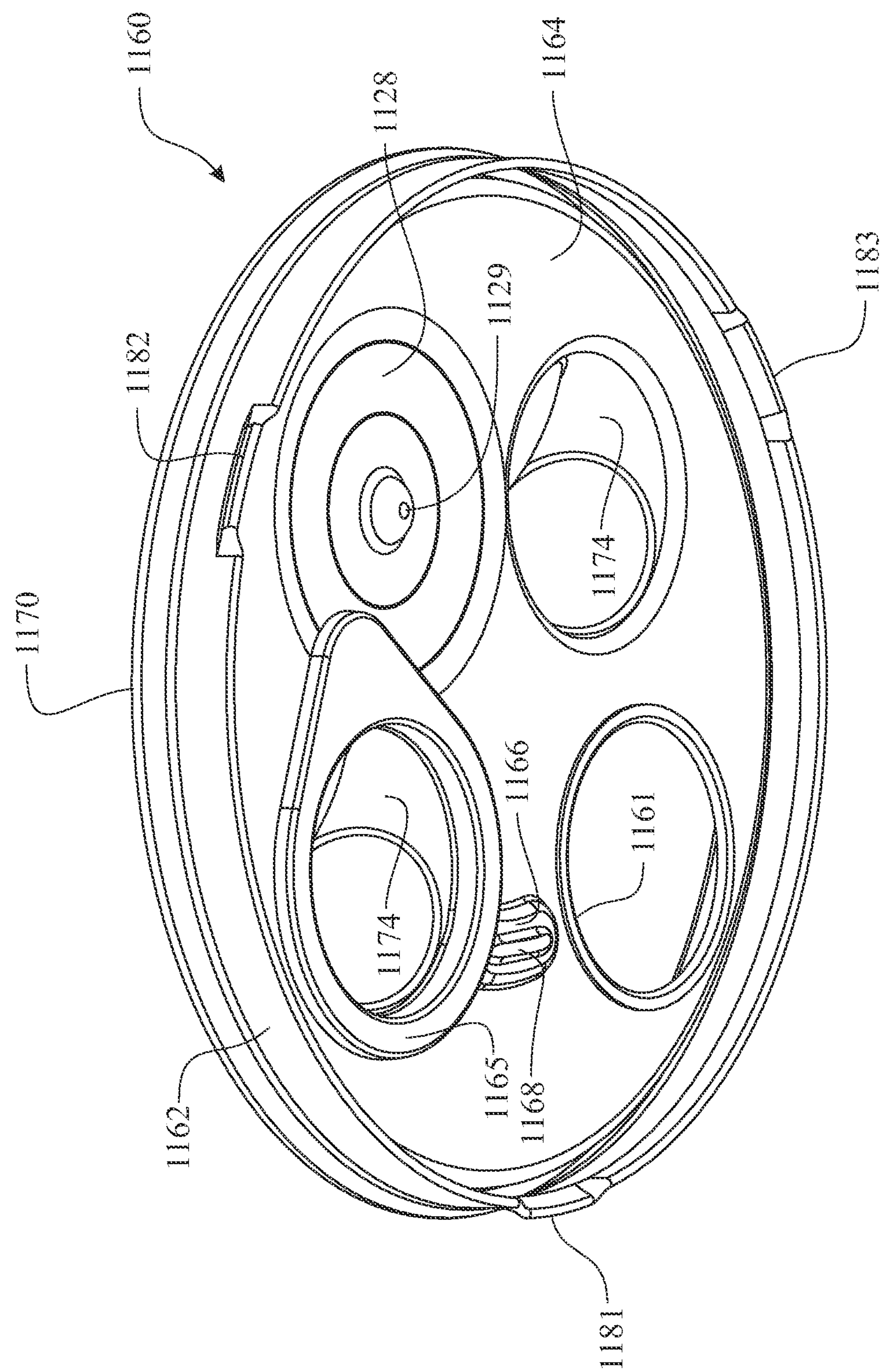
Figure 118:
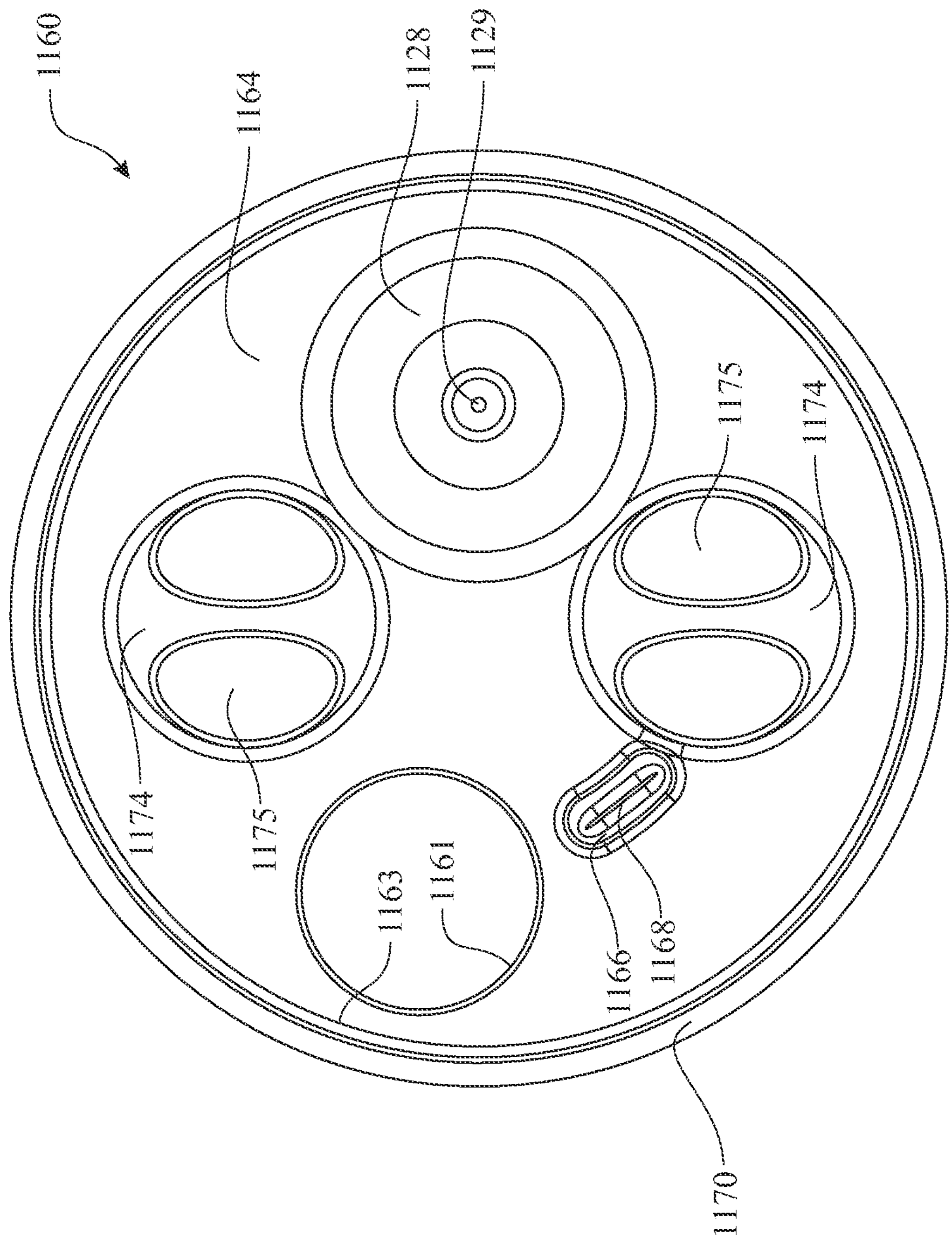
Figure 119:
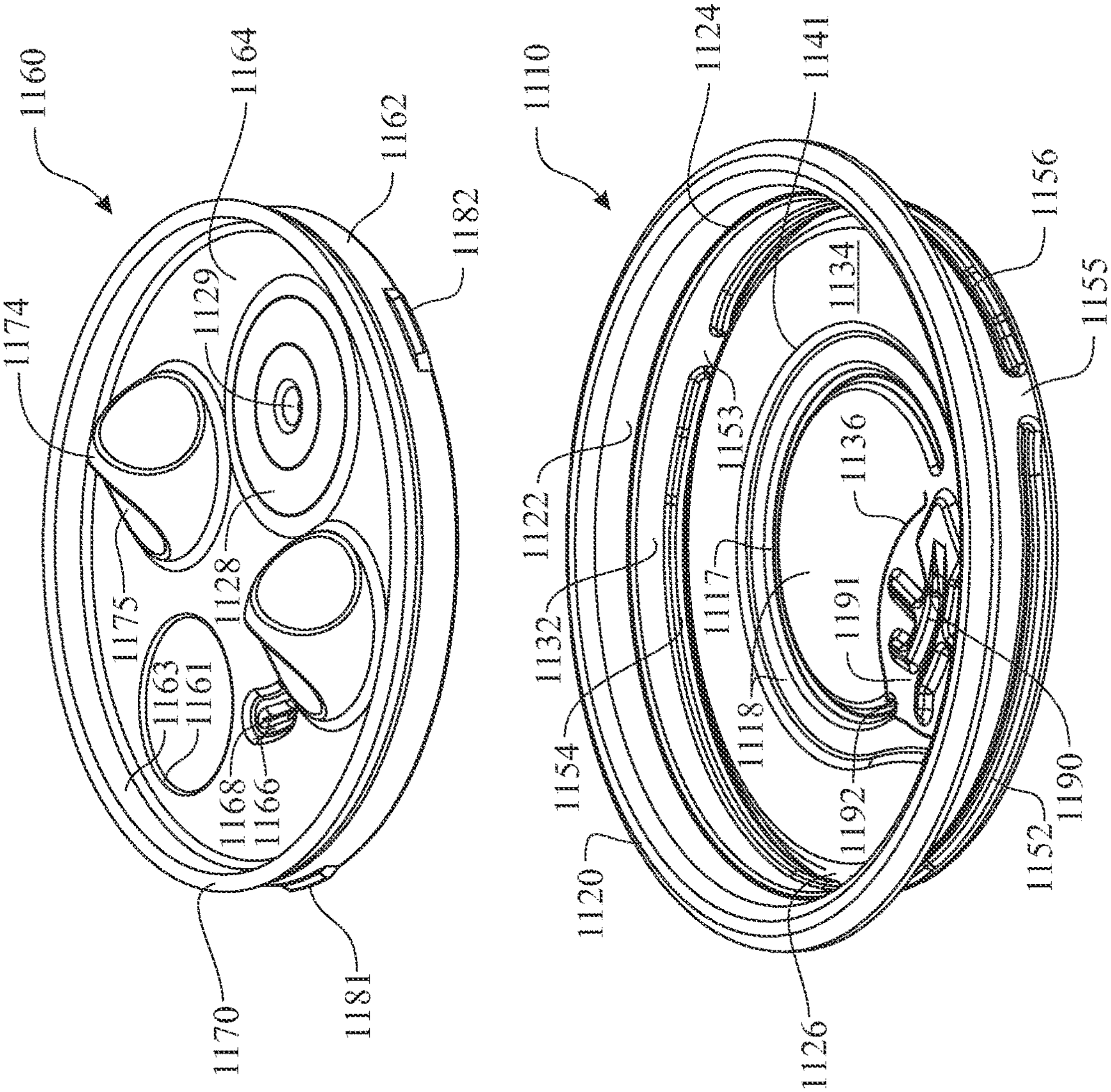
Figure 120:
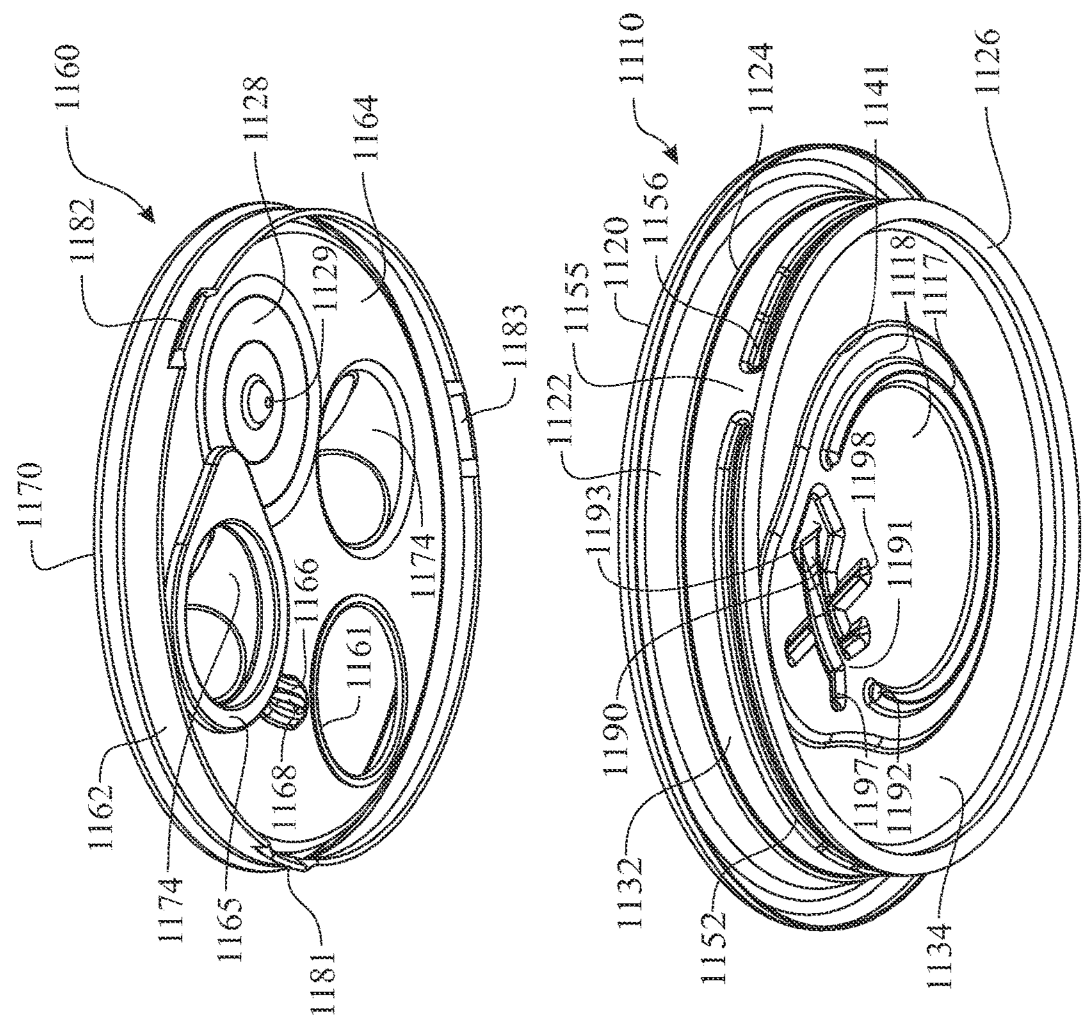
Figure 121:
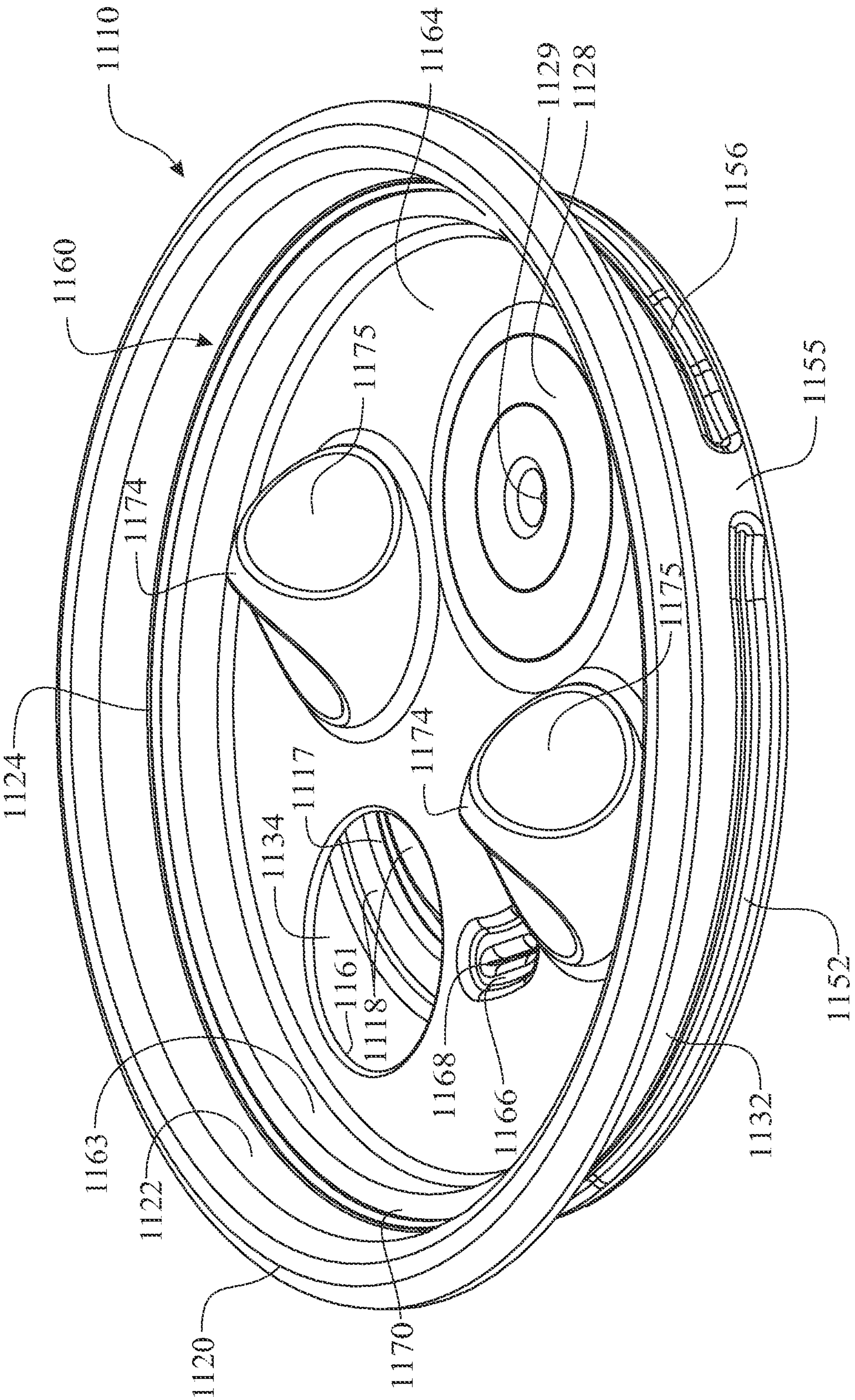
Figure 122:
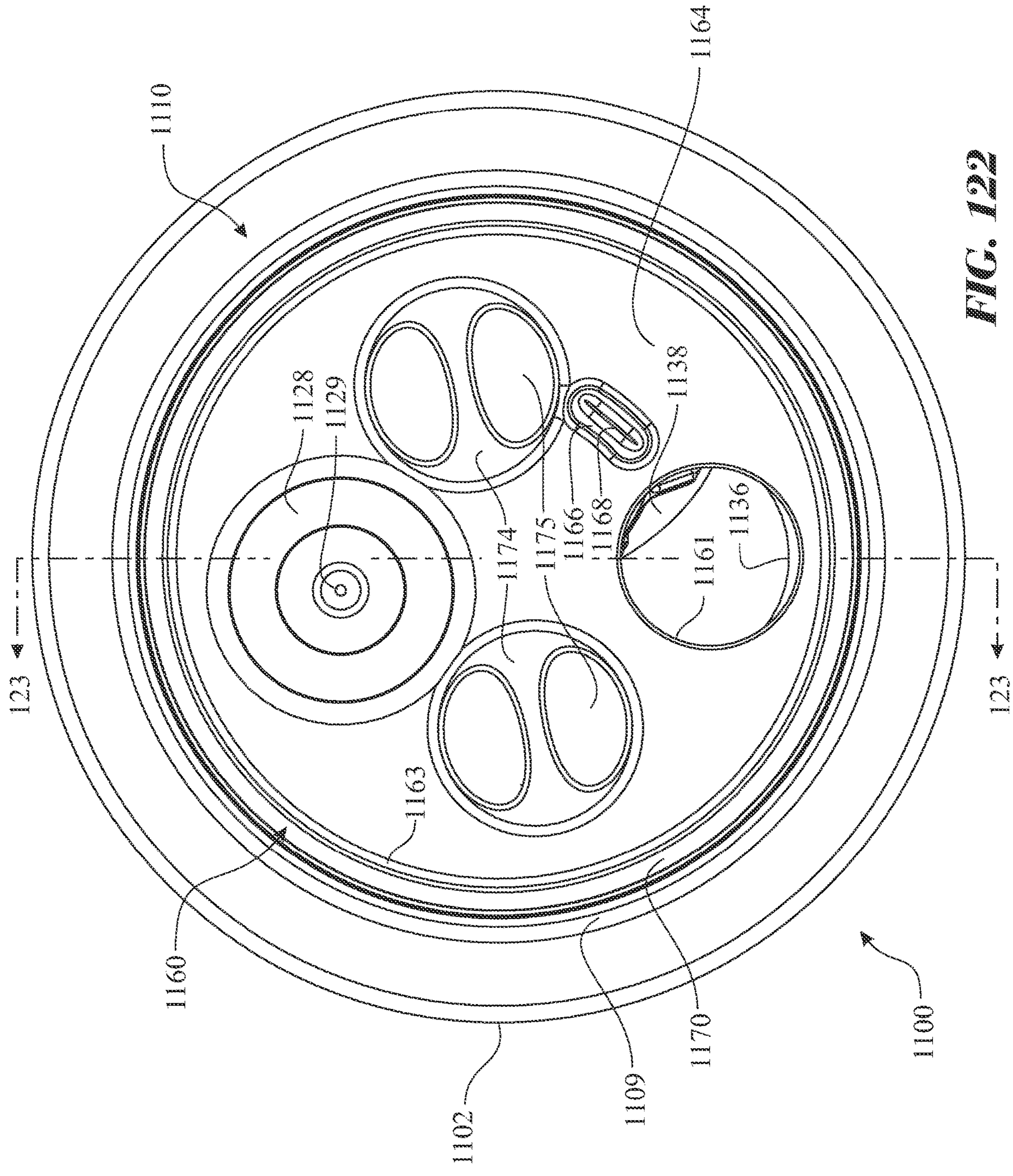
Figure 123:
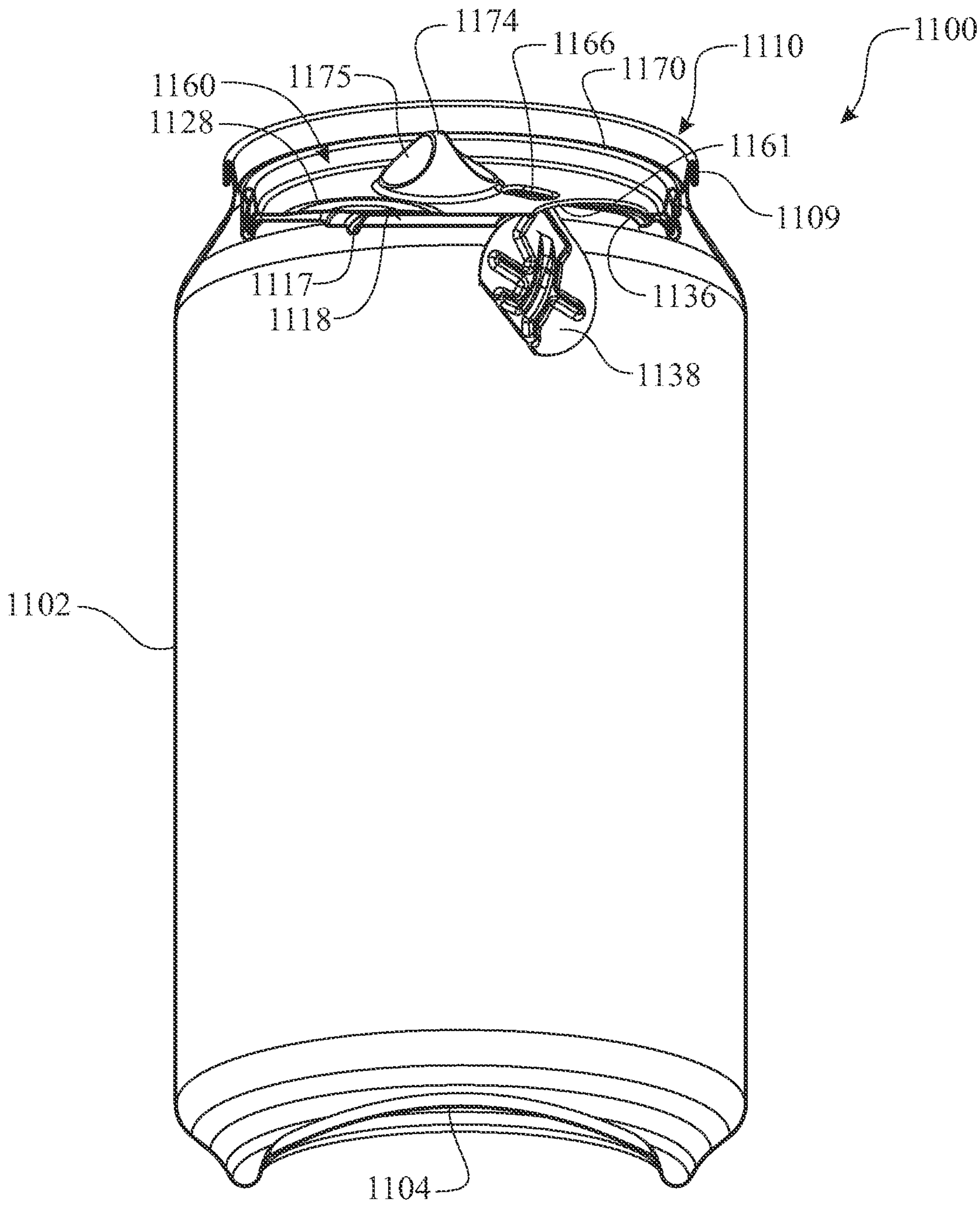
Figure 124:
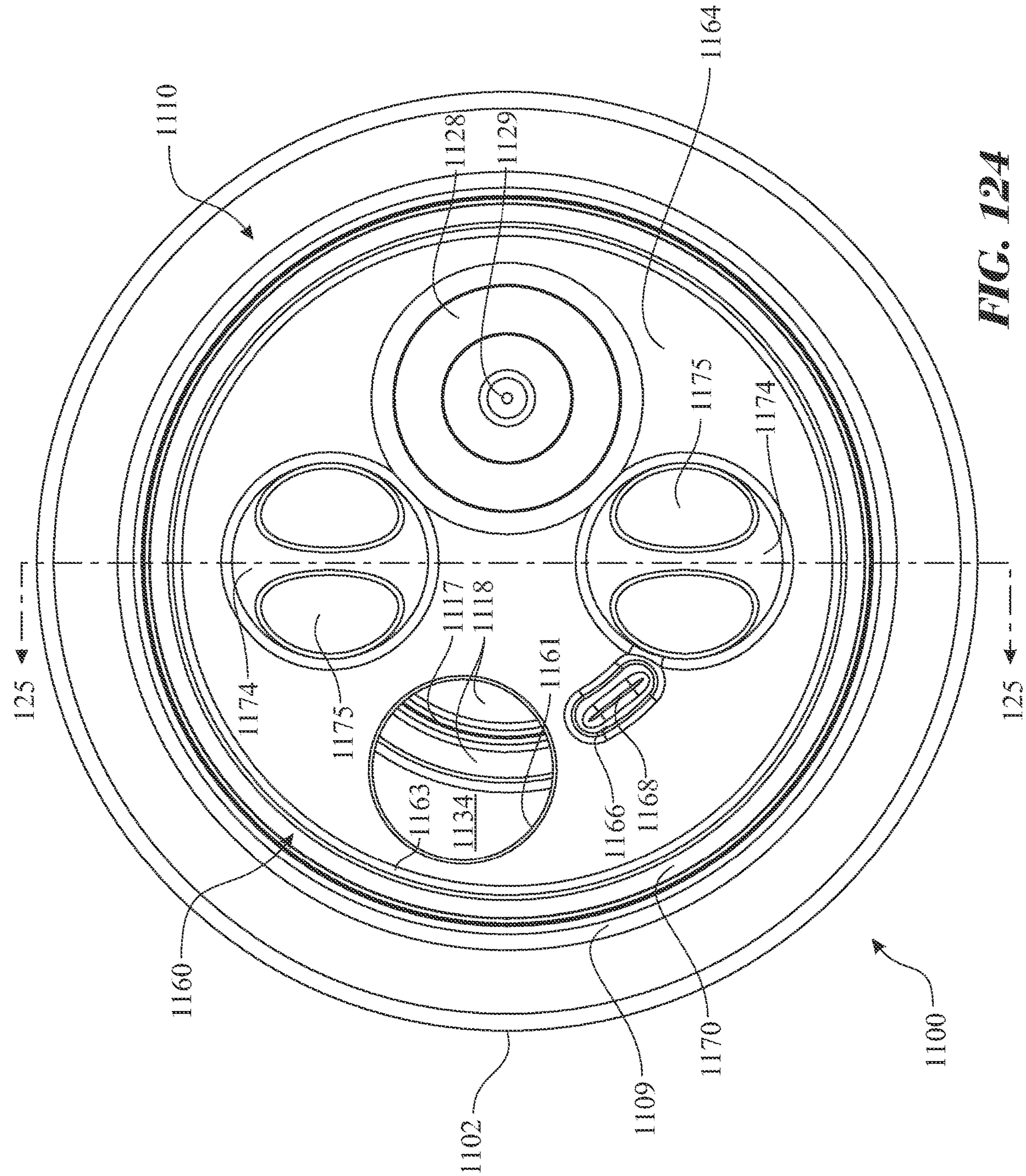
Figure 125:
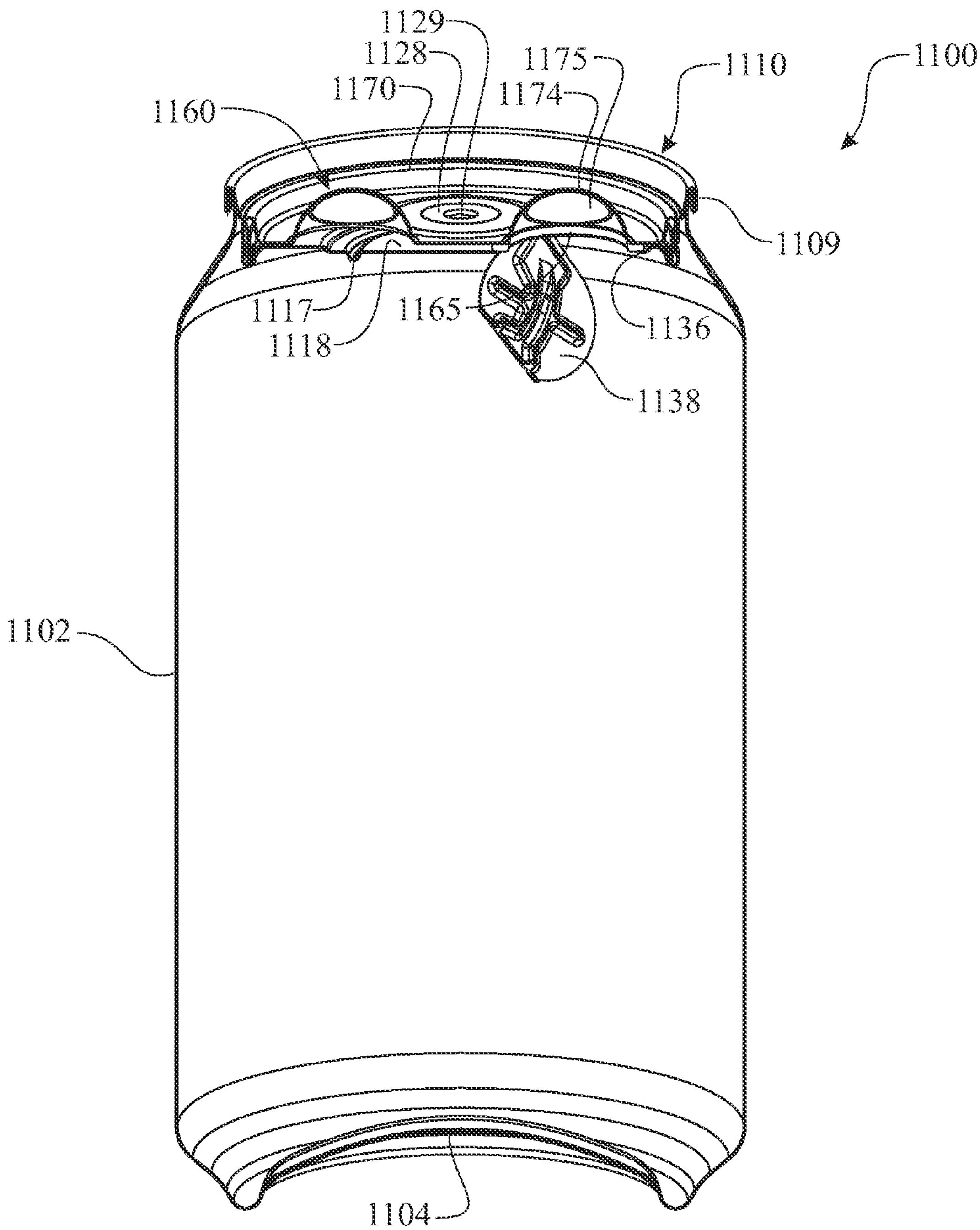
Figure 126:
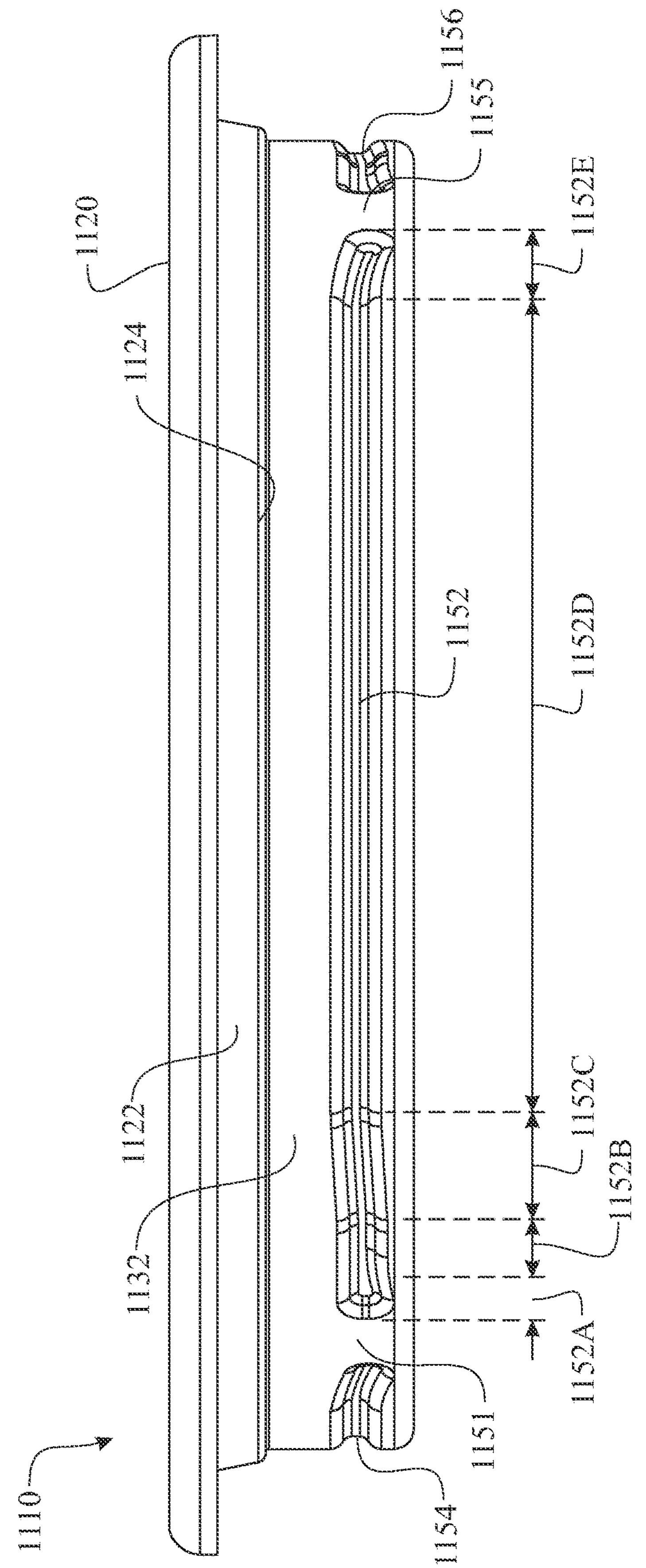
Figure 127:
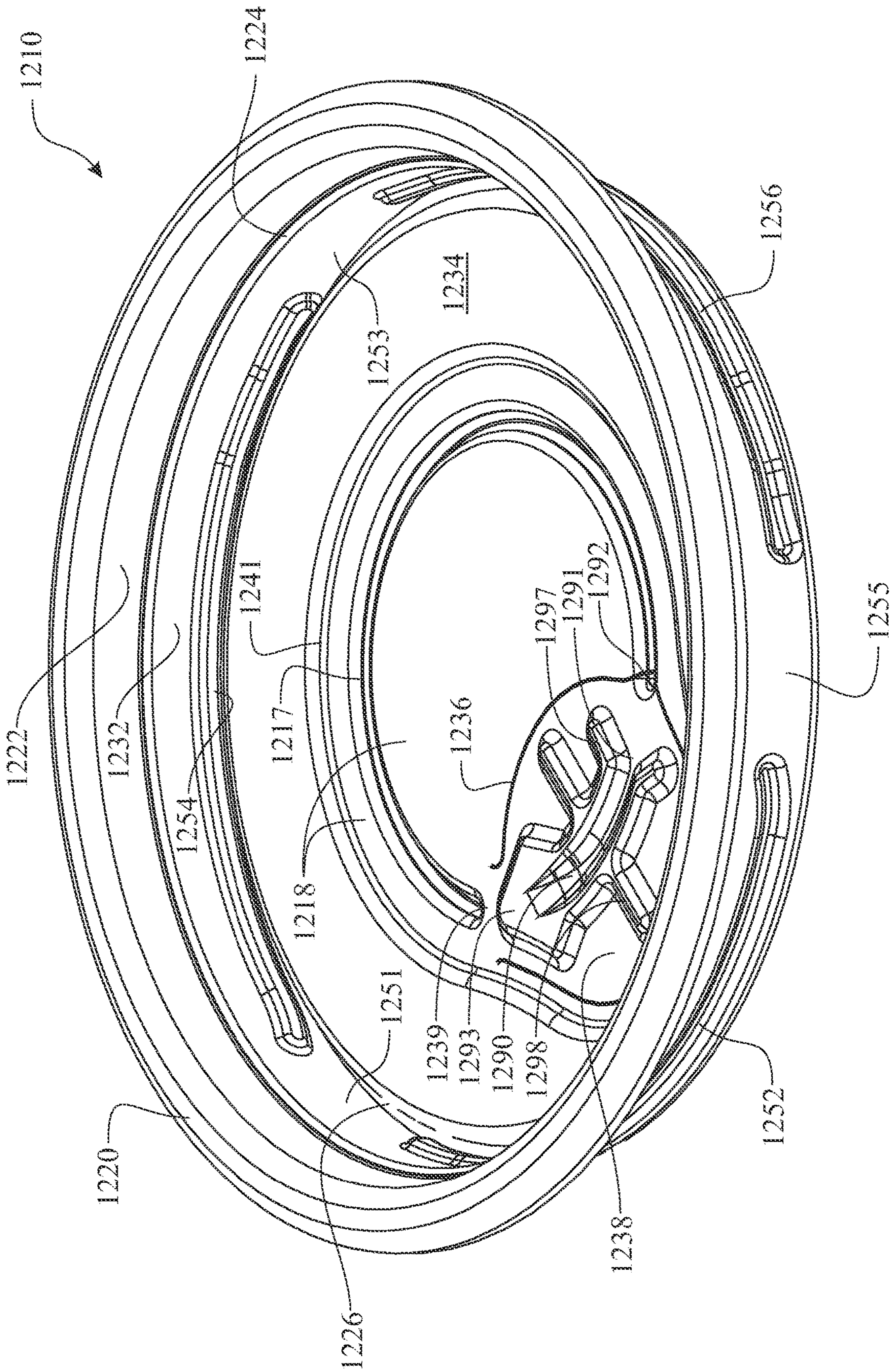
Figure 128:
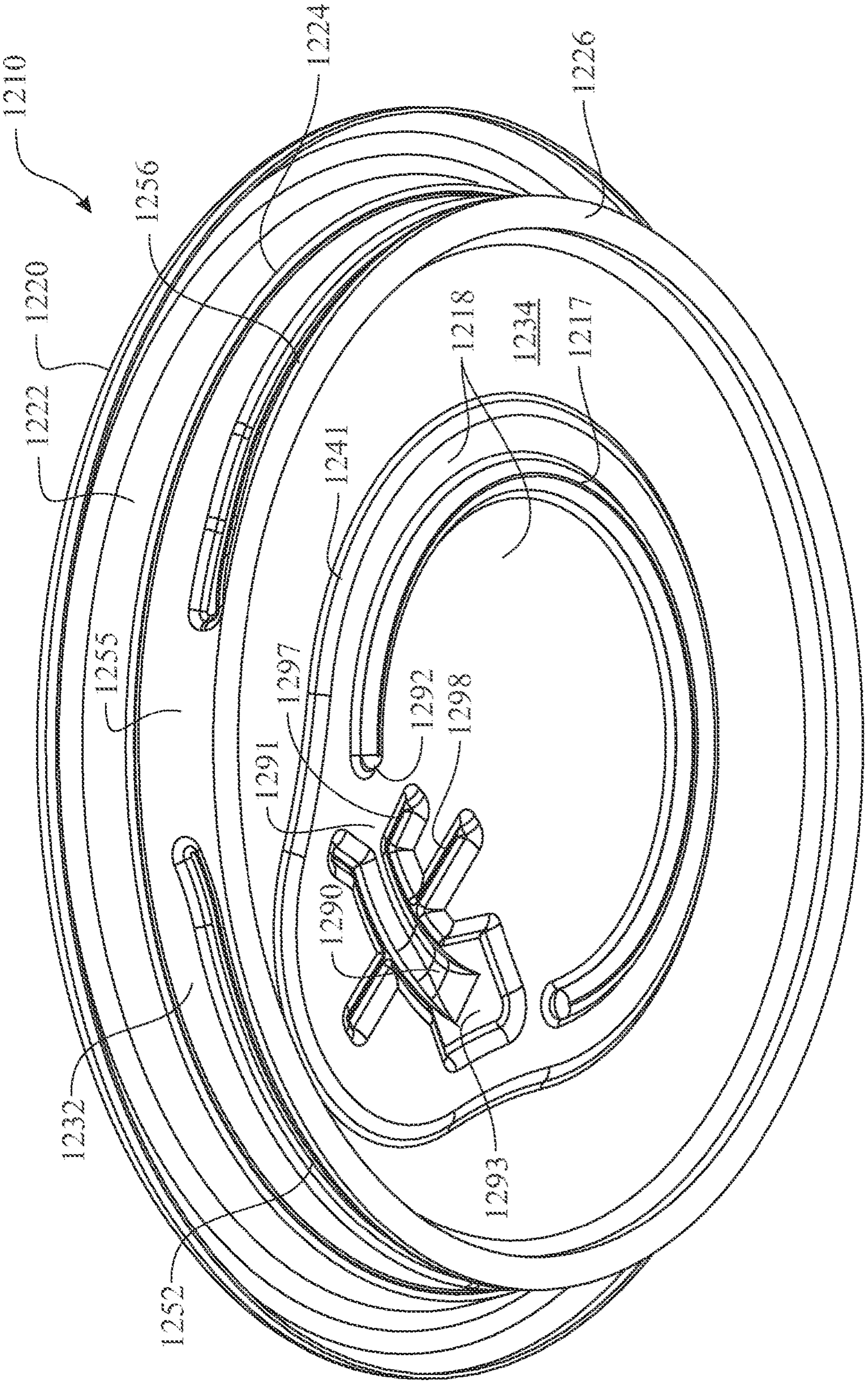
Figure 129:
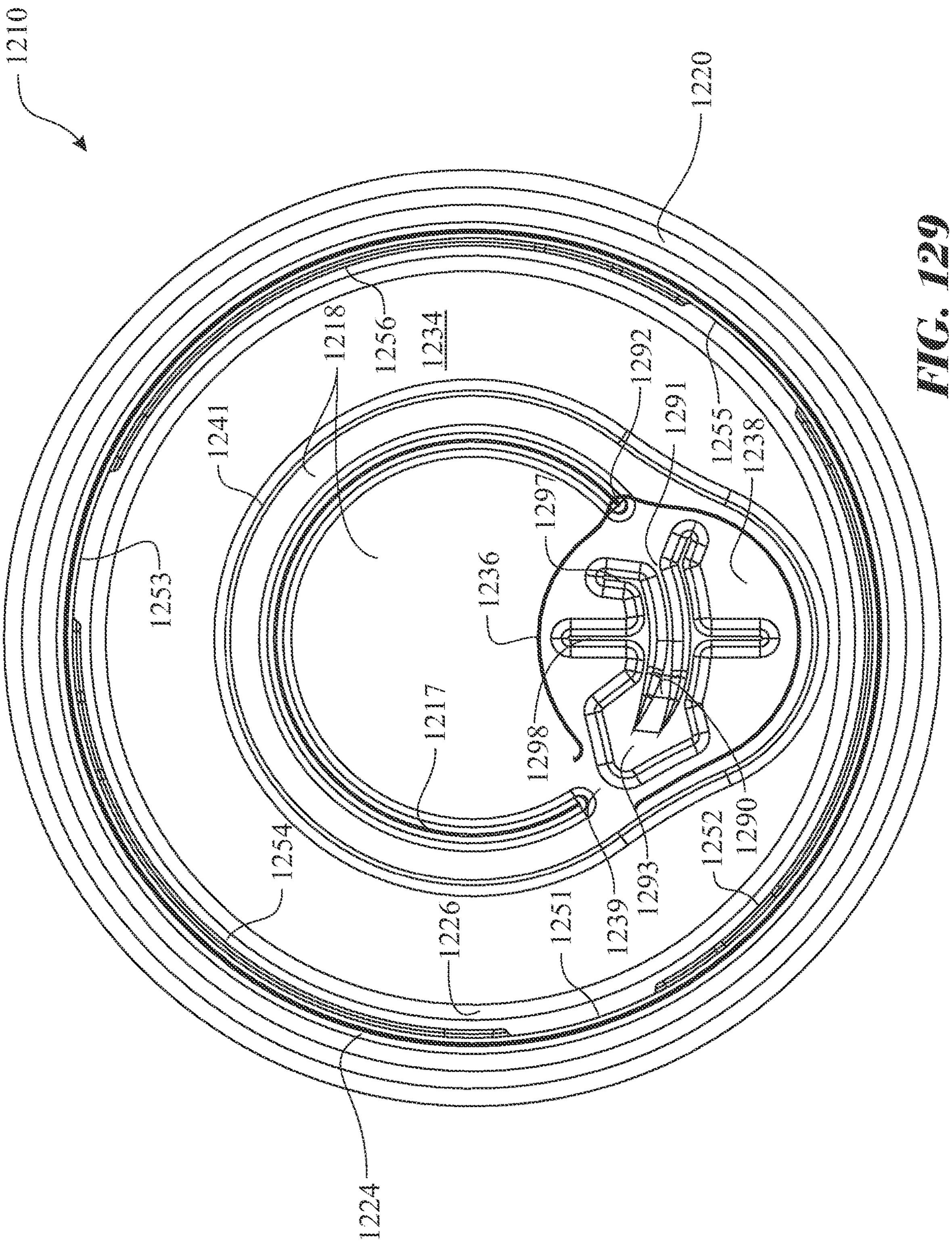
Figure 130:
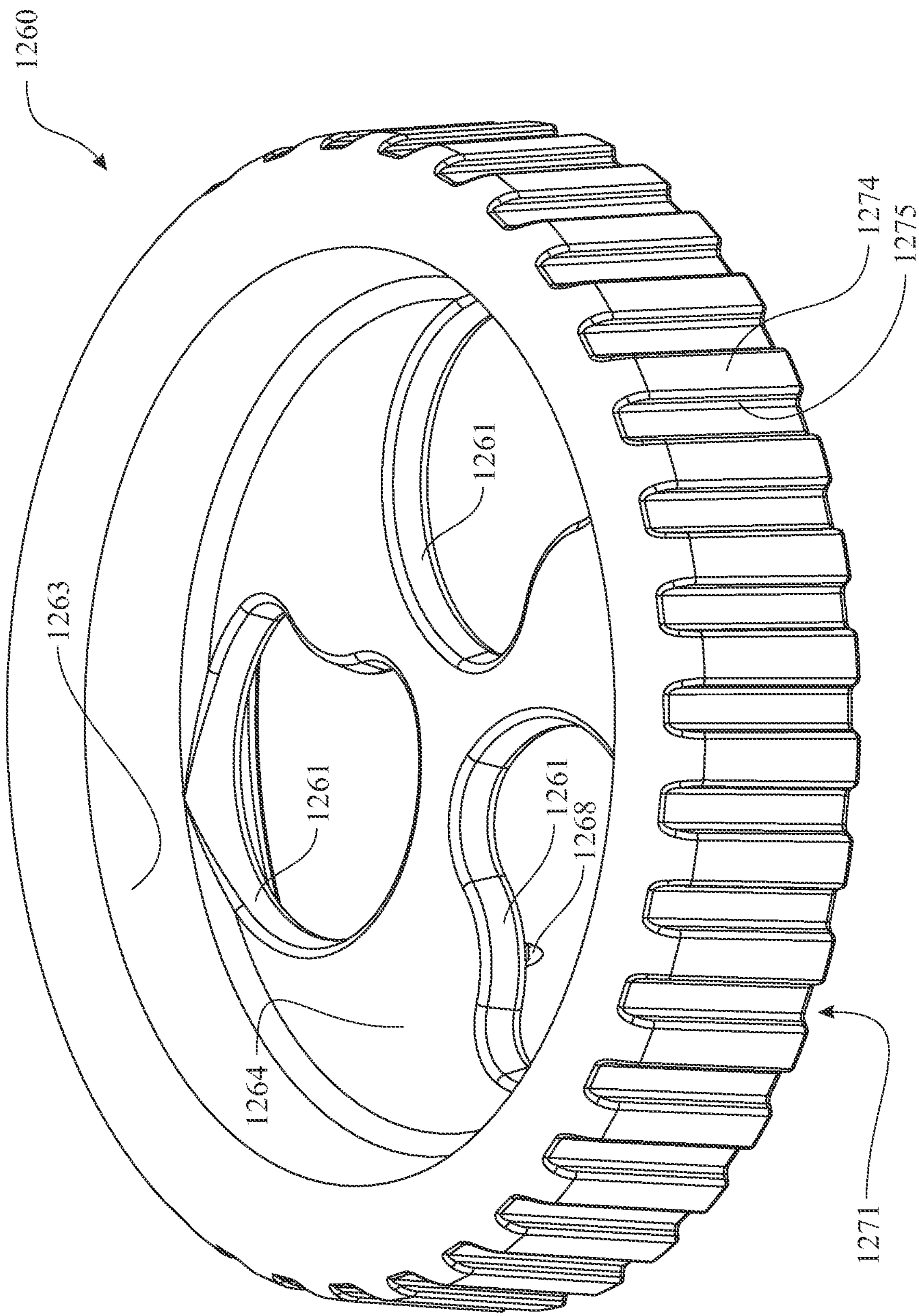
Figure 131:
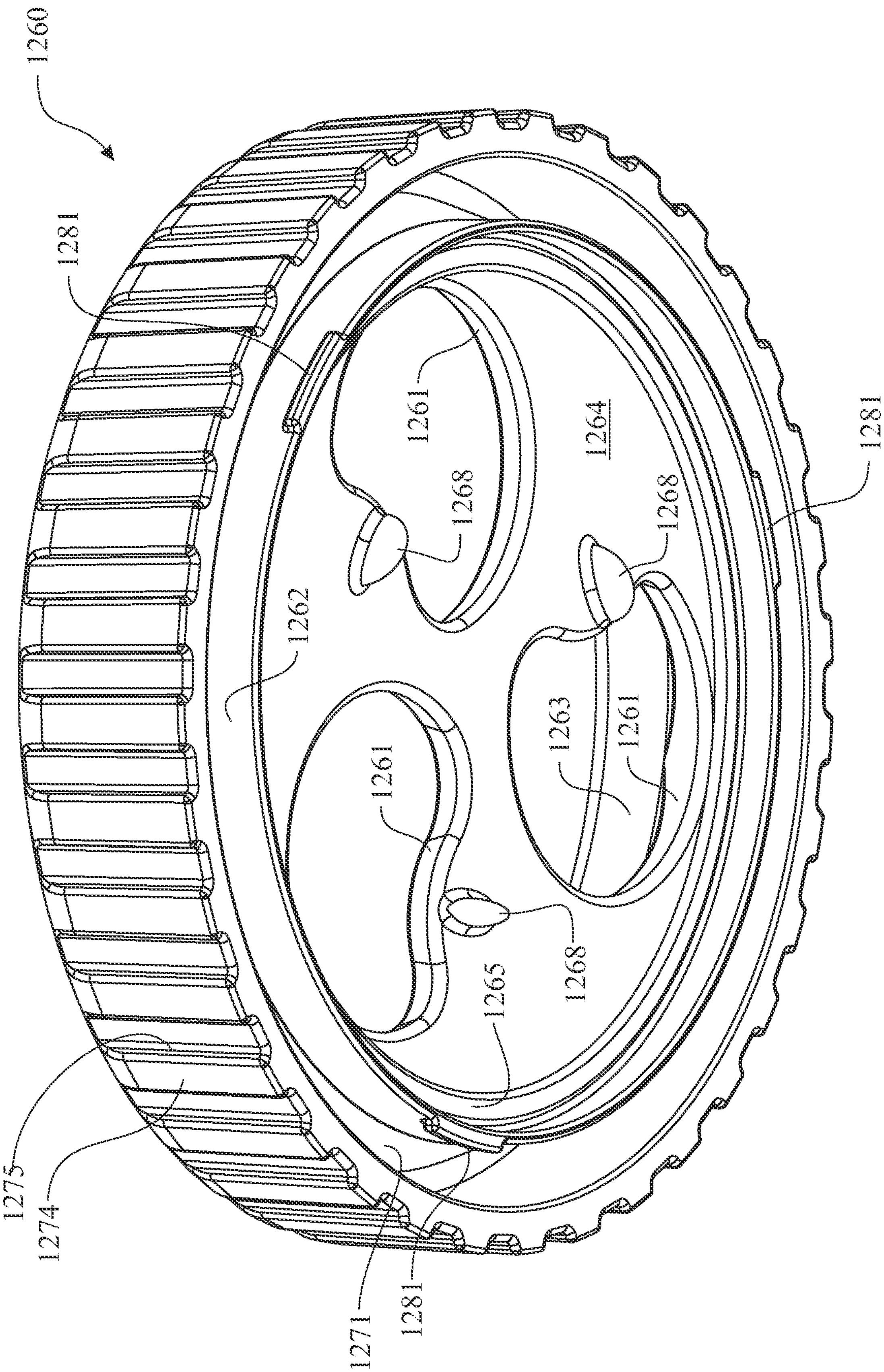
Figure 132:
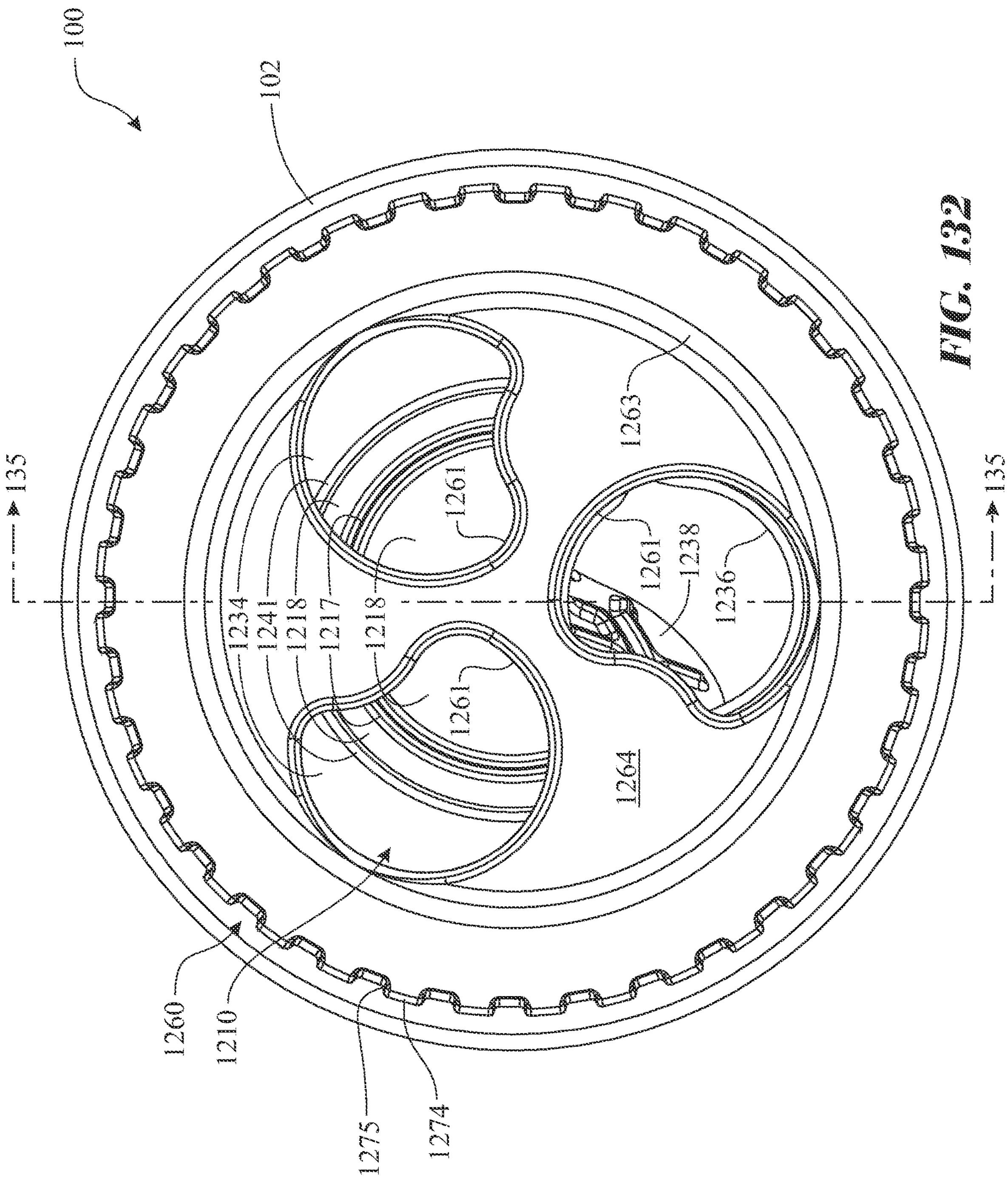
Figure 133:
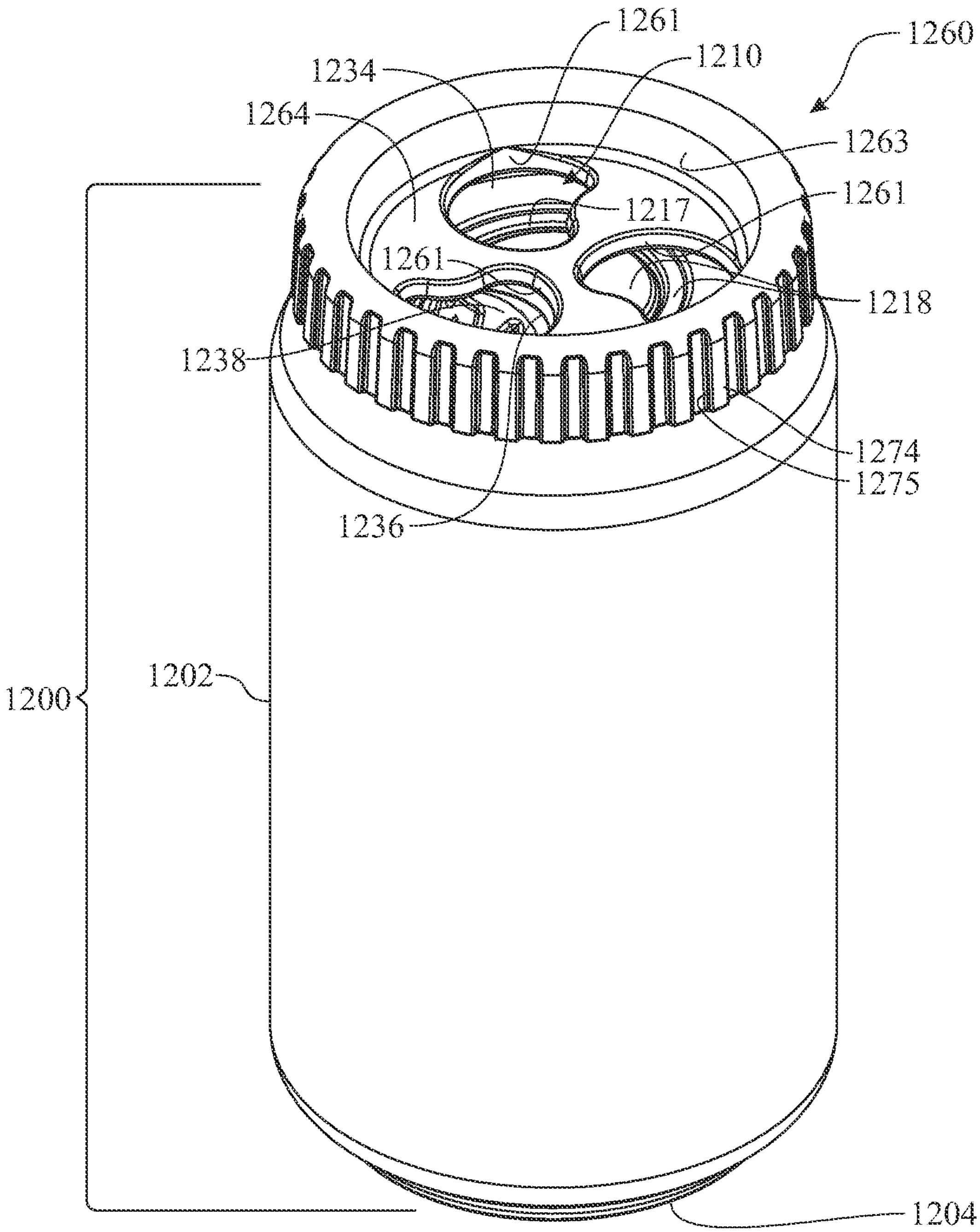
Figure 134:
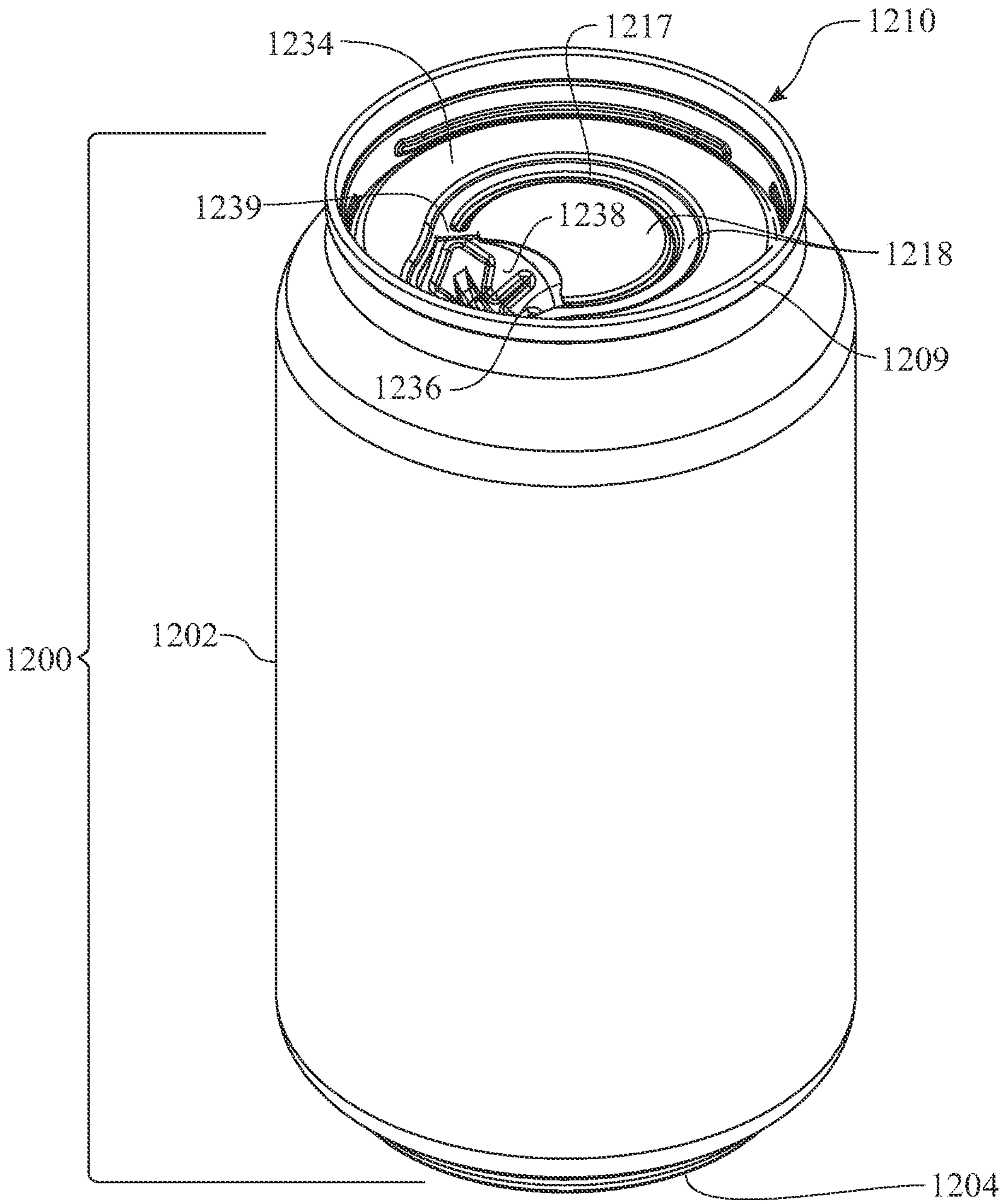
Figure 135:
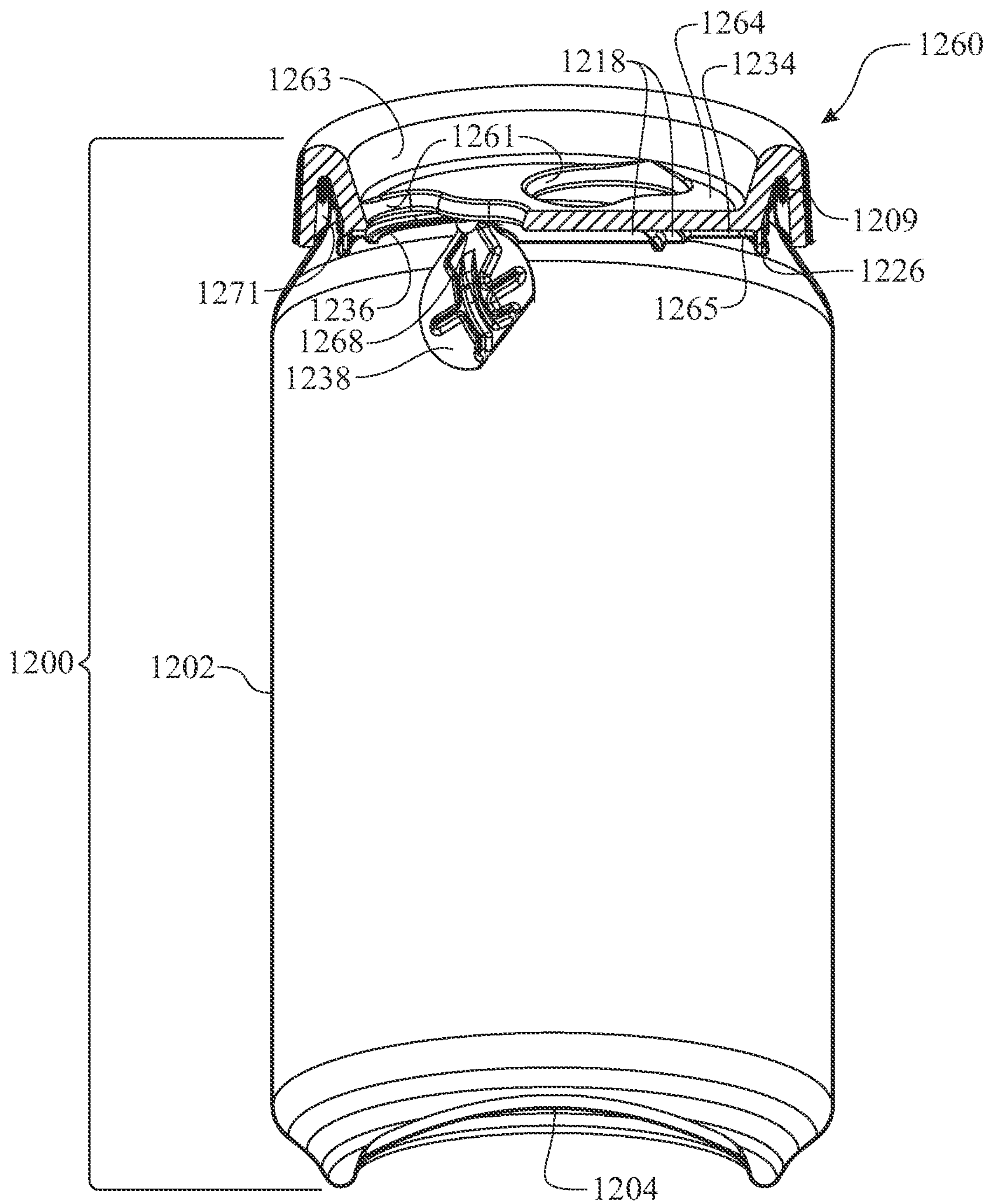
Figure 136:
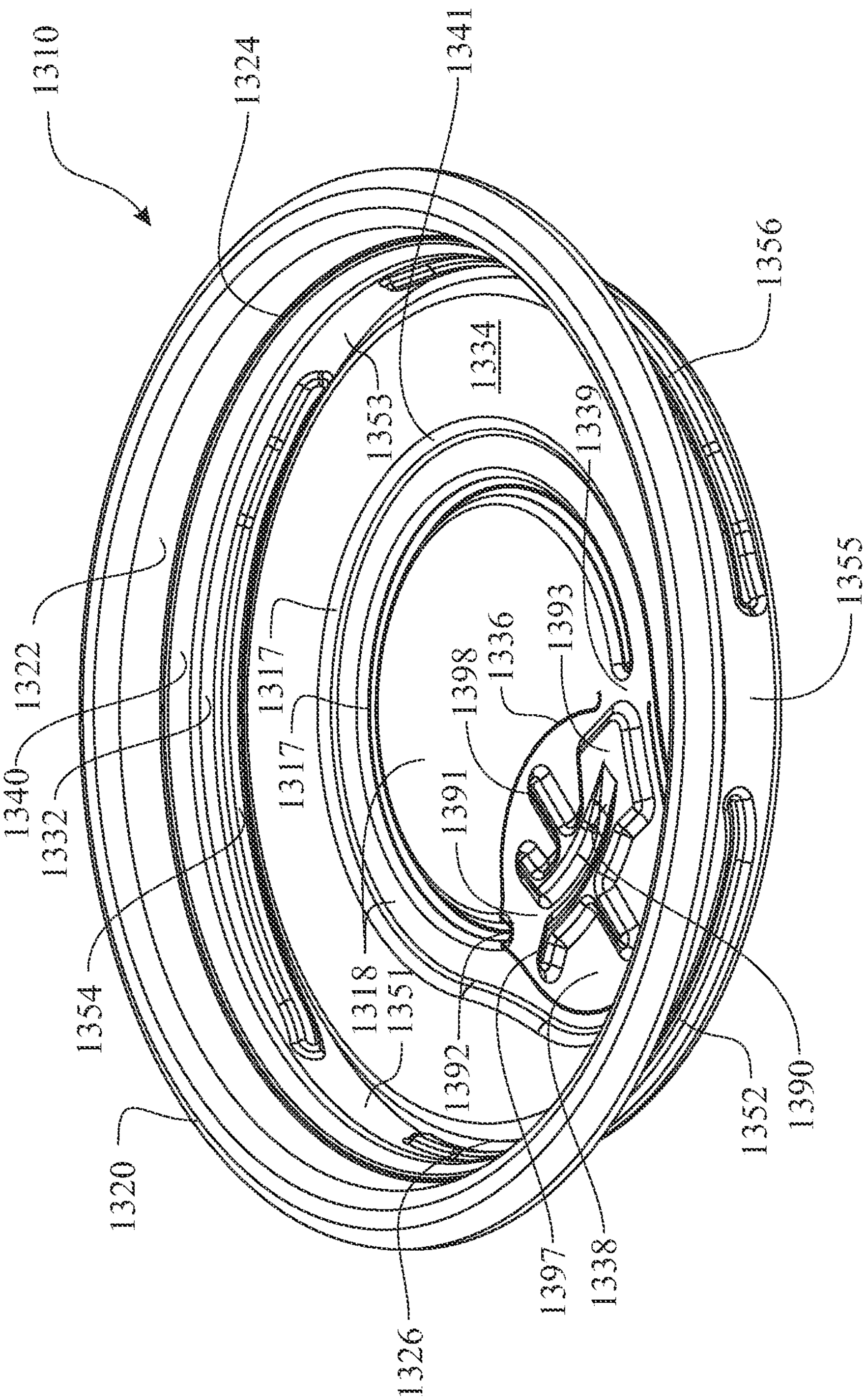
Figure 137:
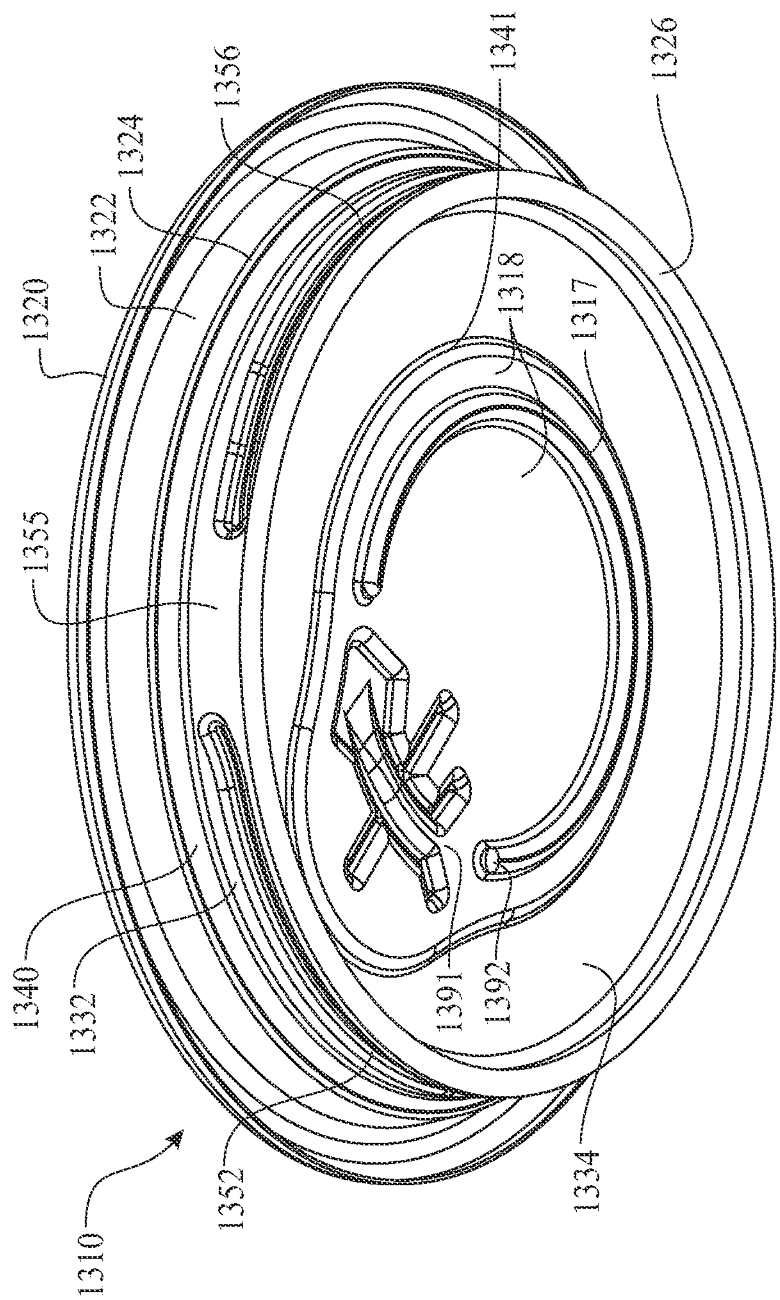
Figure 138:
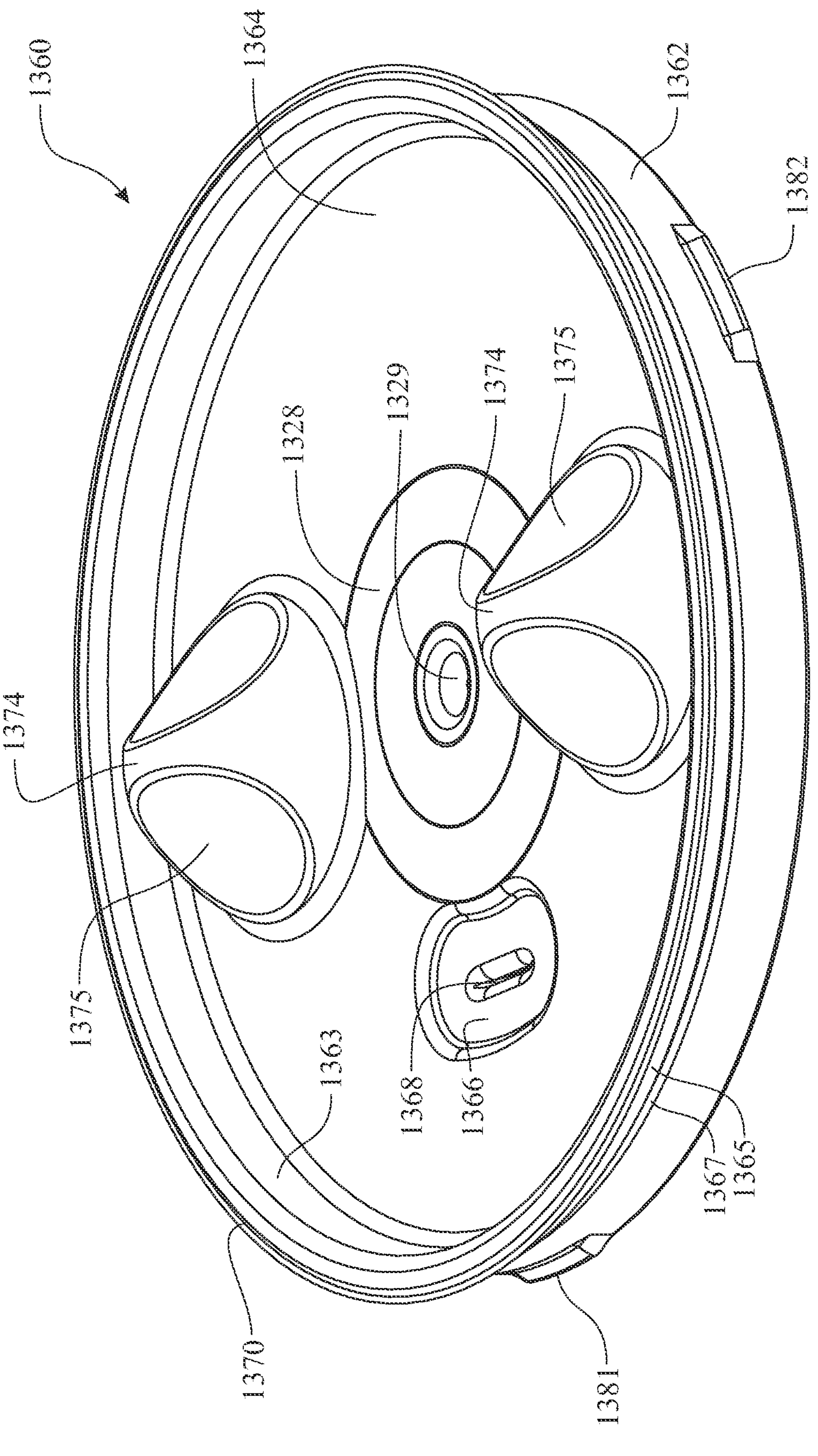
Figure 139:
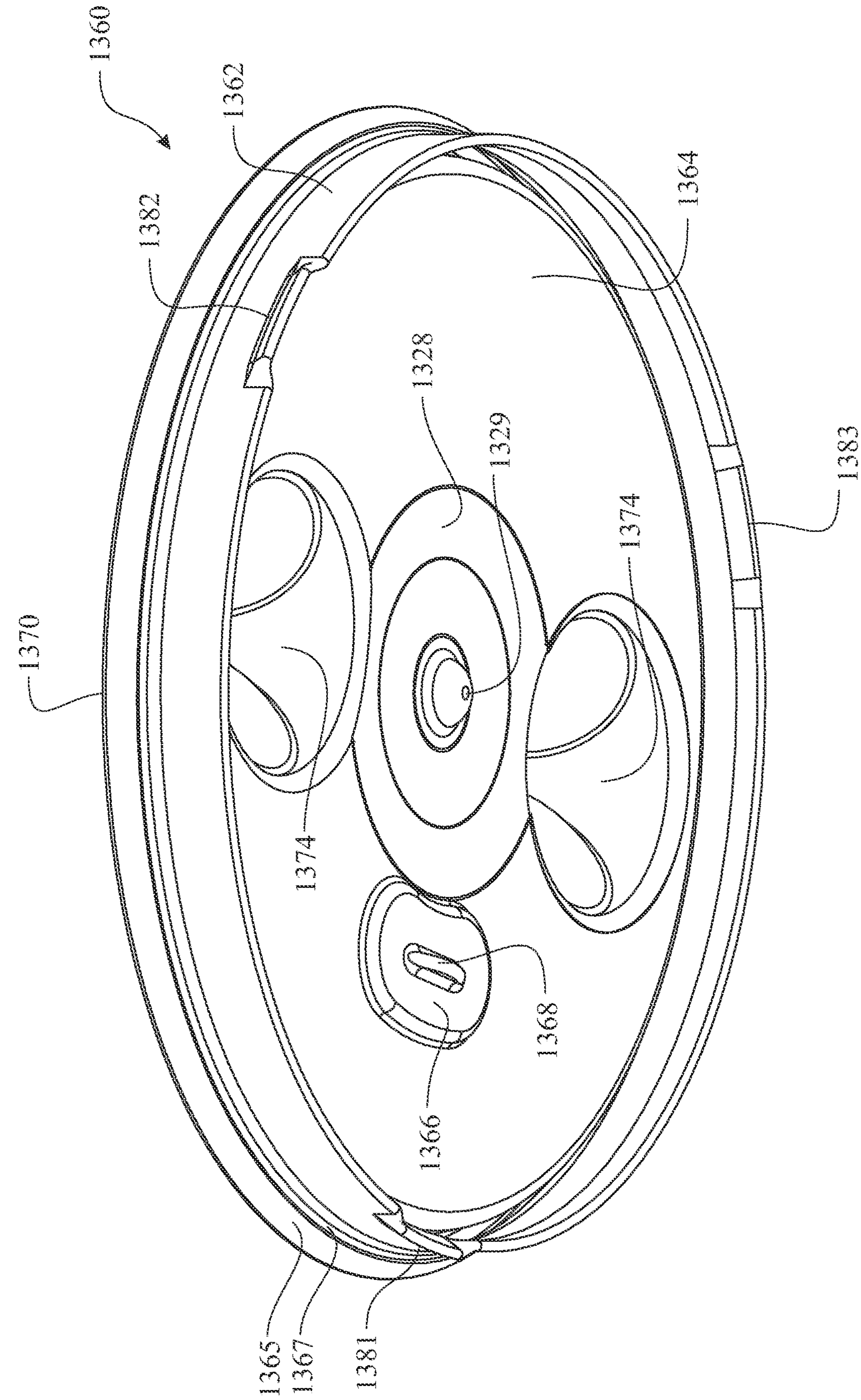
Figure 140:
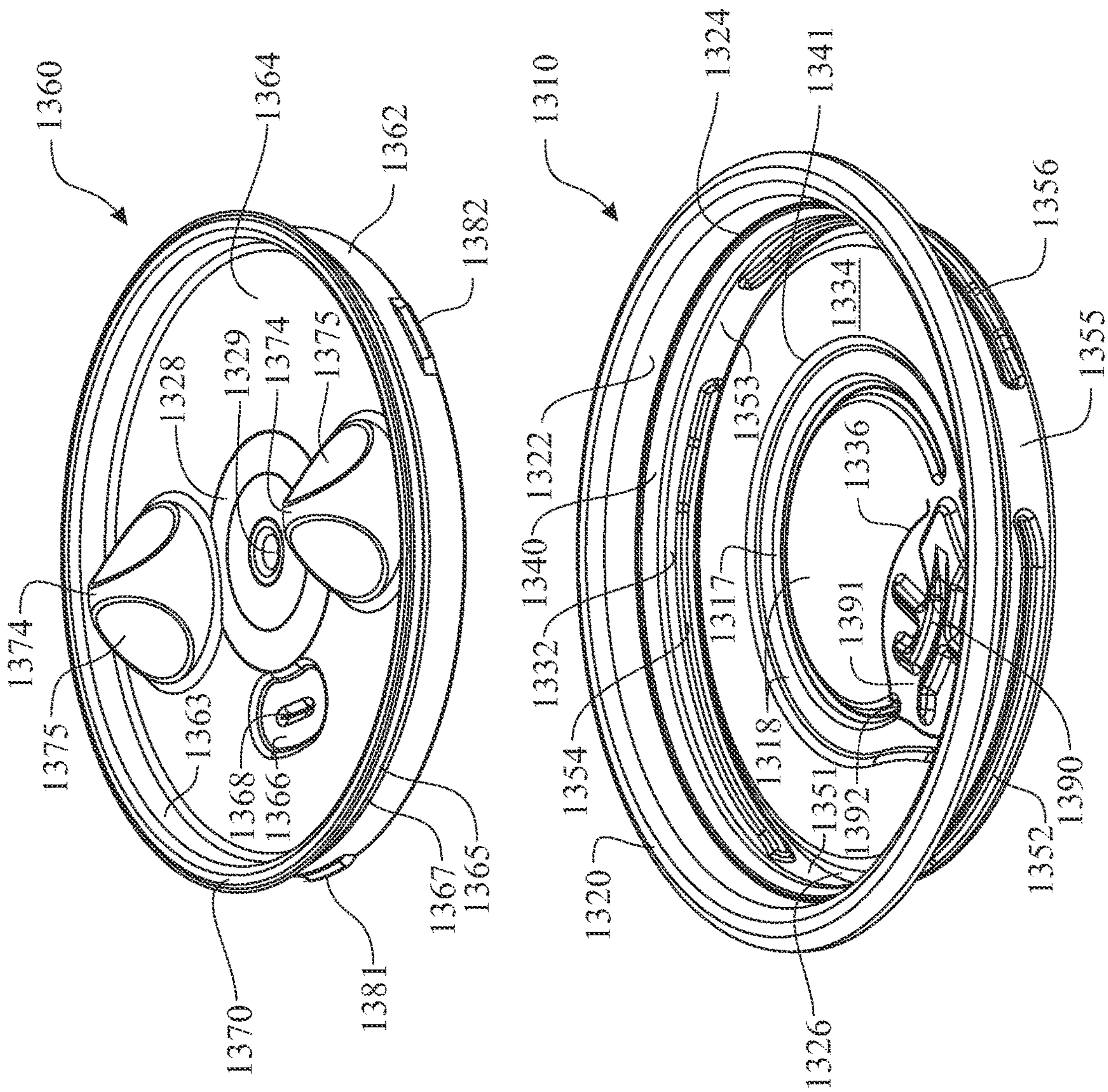
Figure 141:
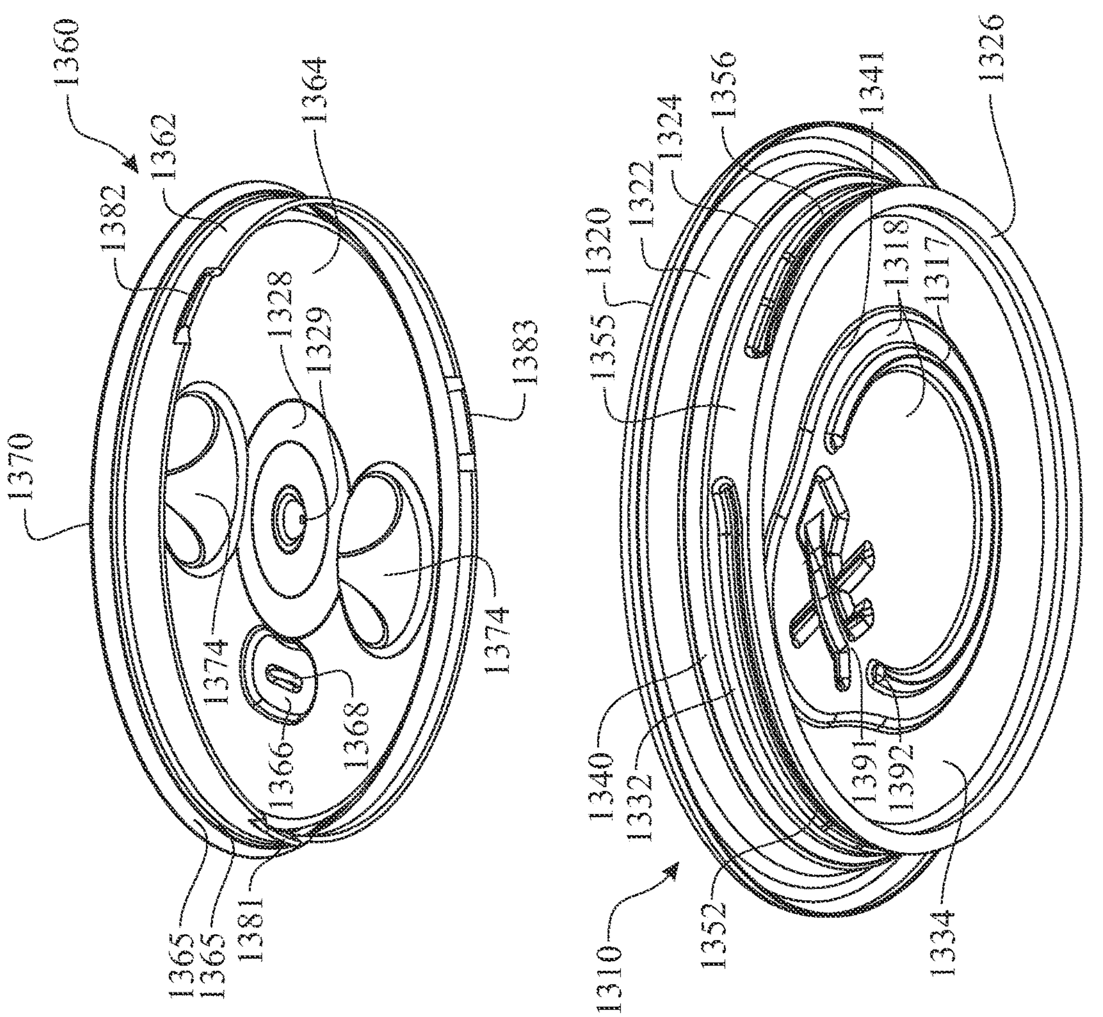
Figure 142:
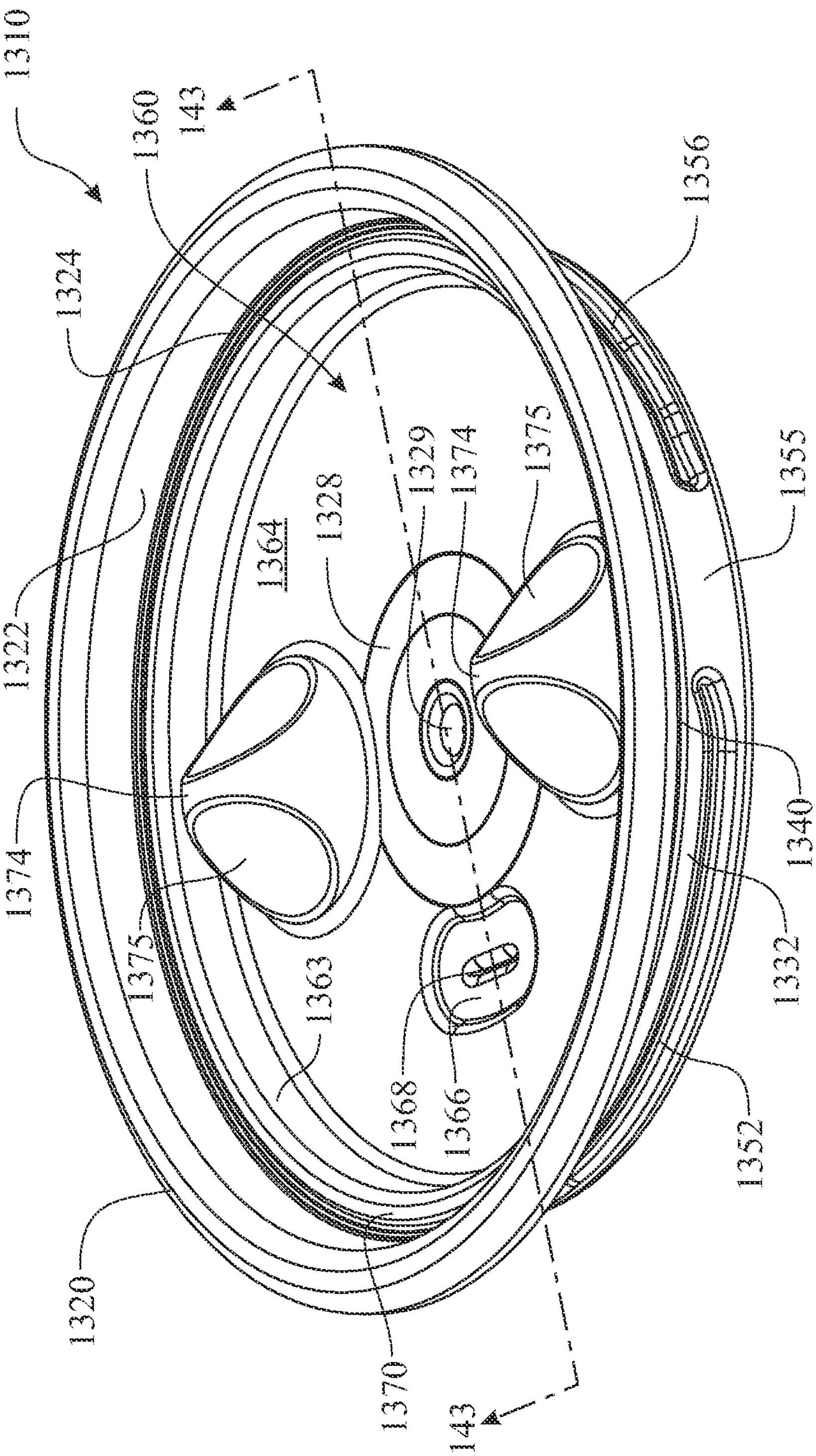
Figure 143:
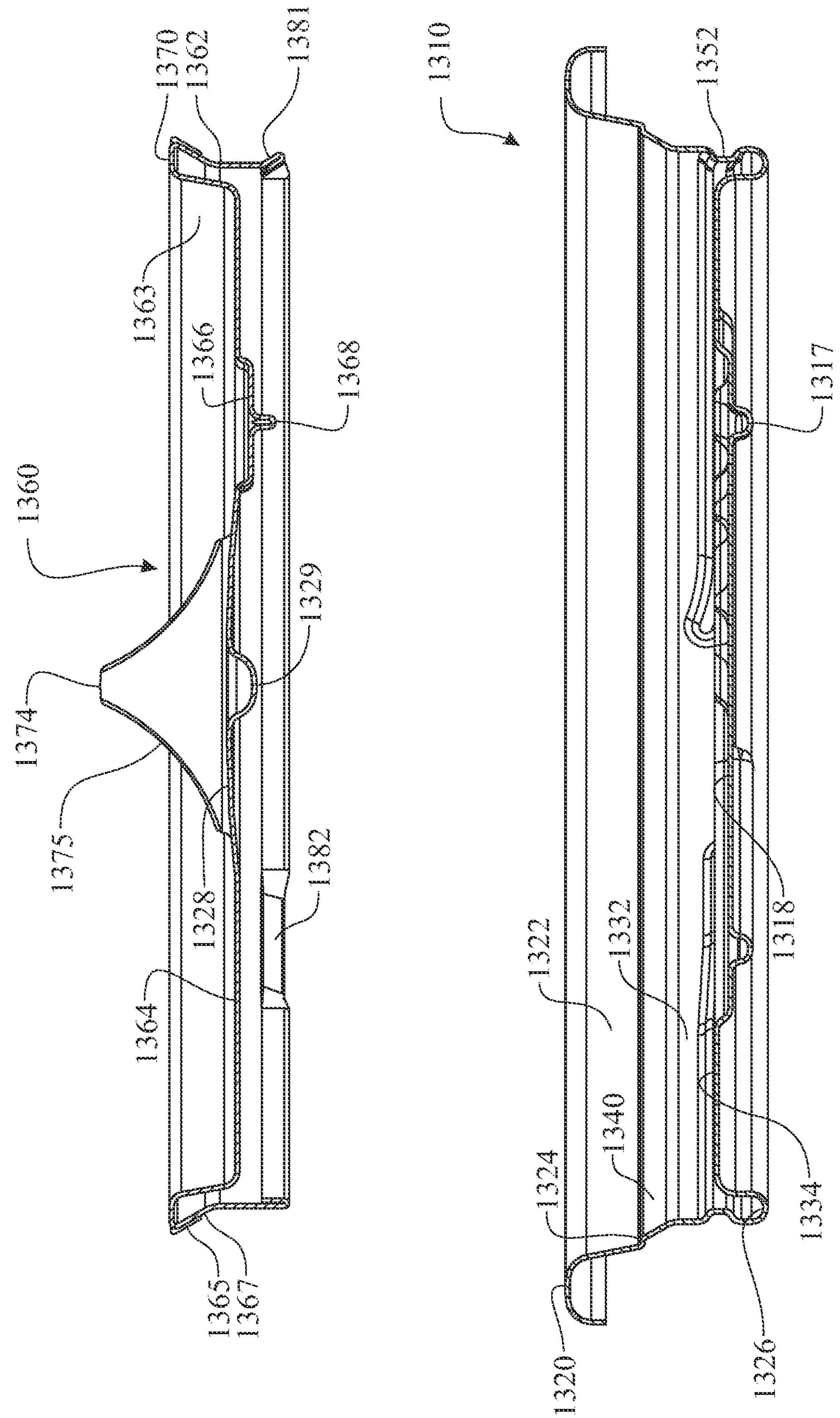
Figure 144:
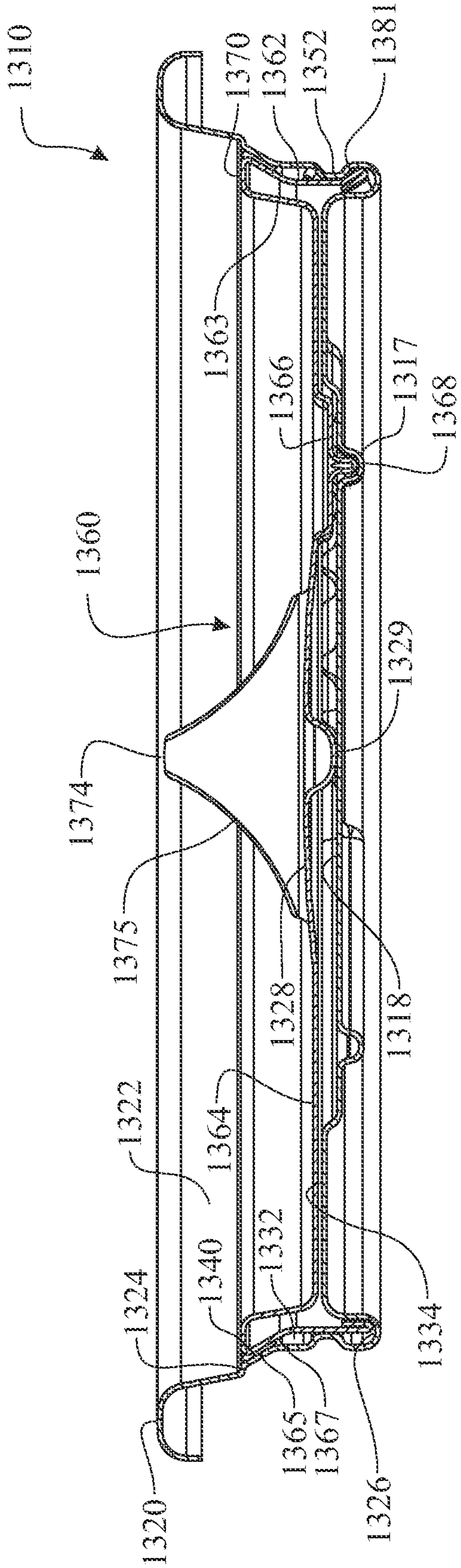
Figure 145:
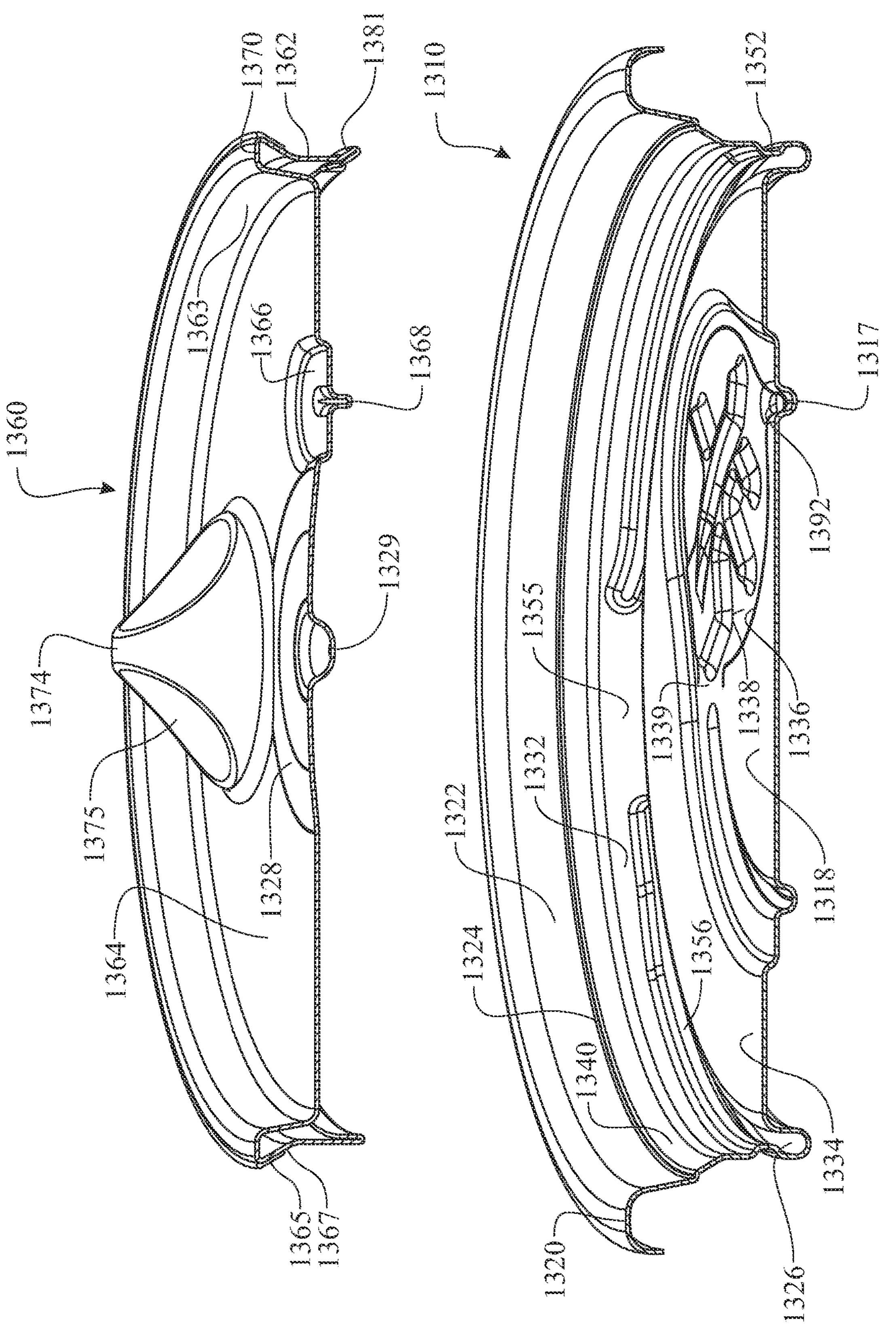
Figure 146:
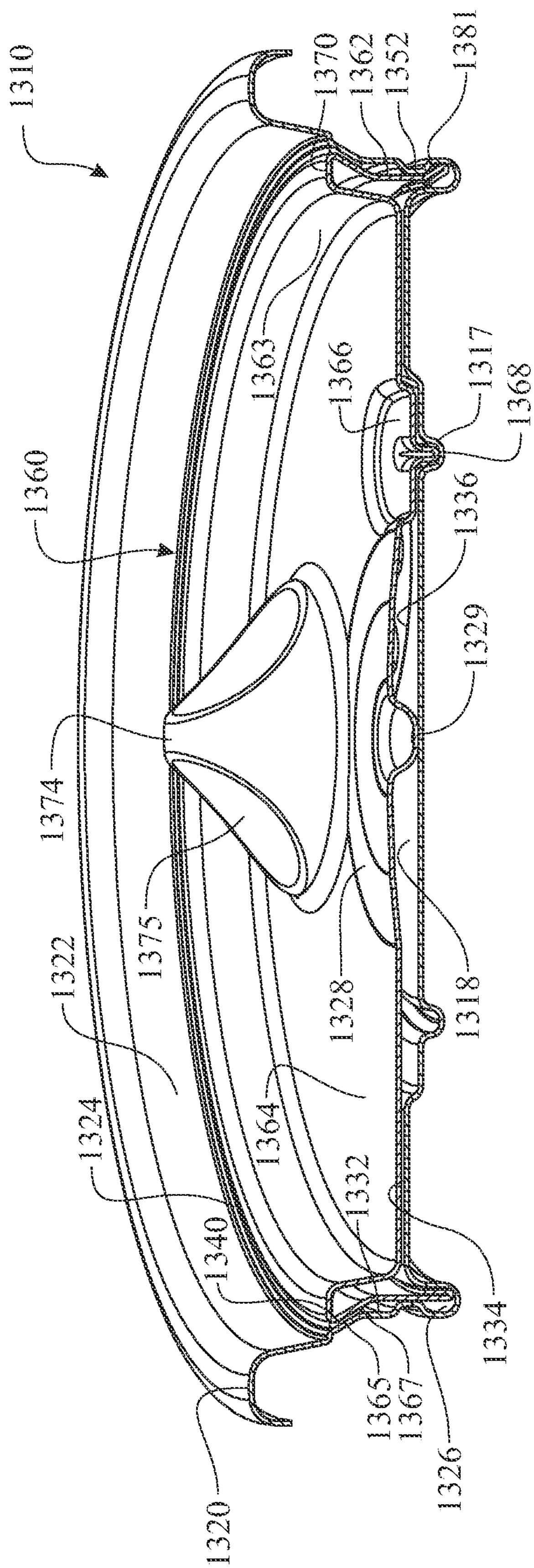
Figure 147:
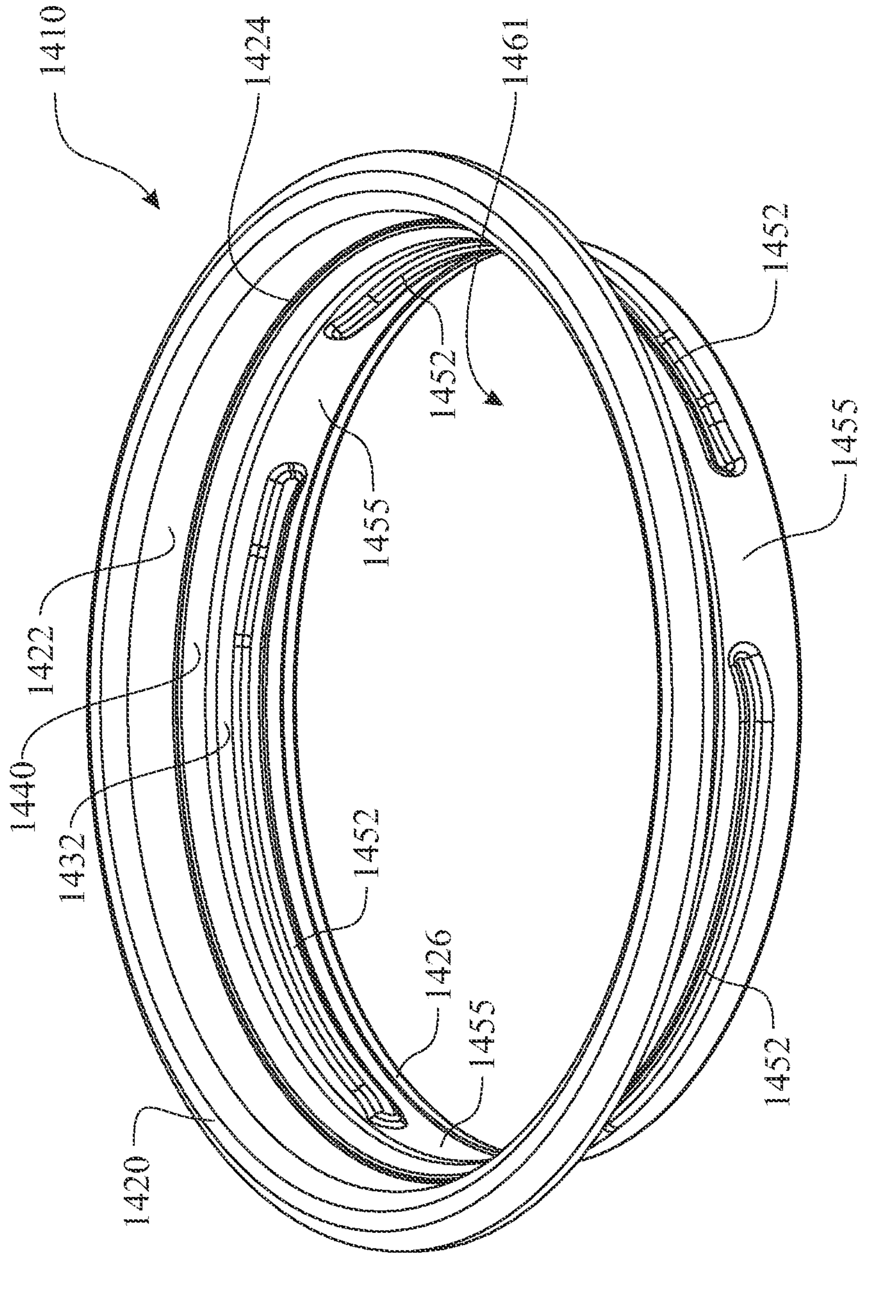
Figure 14S:
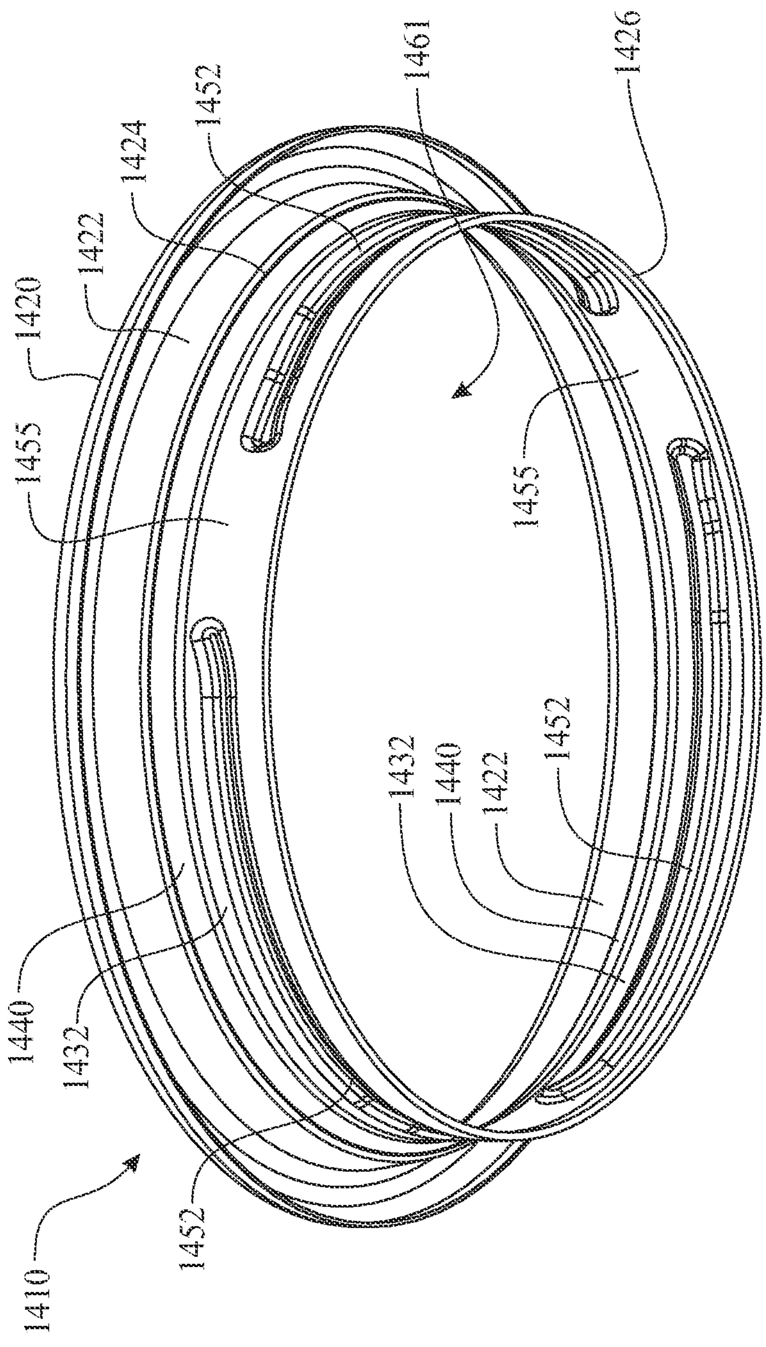
Figure 149:
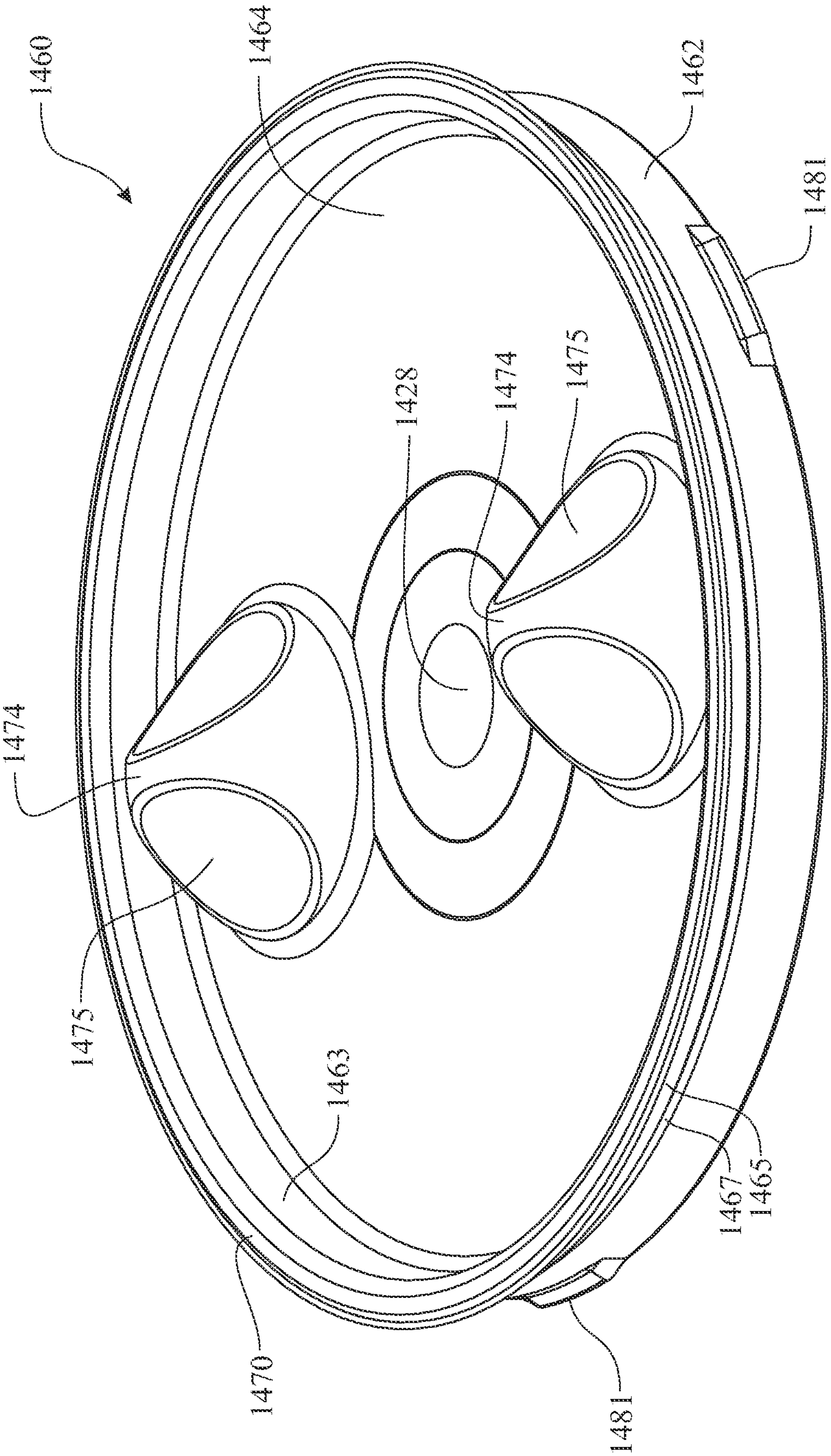
Figure 150:
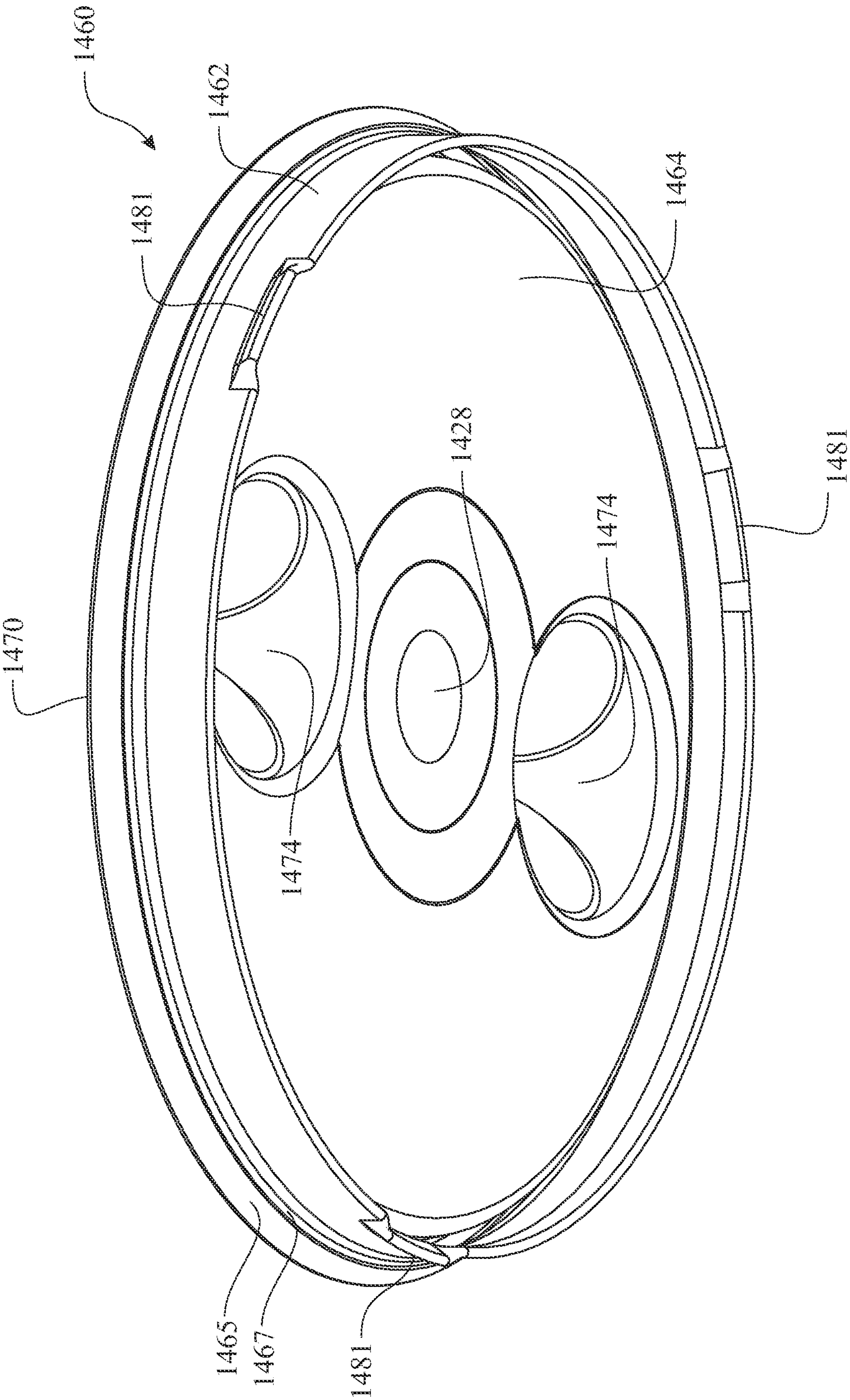
Figure 151:
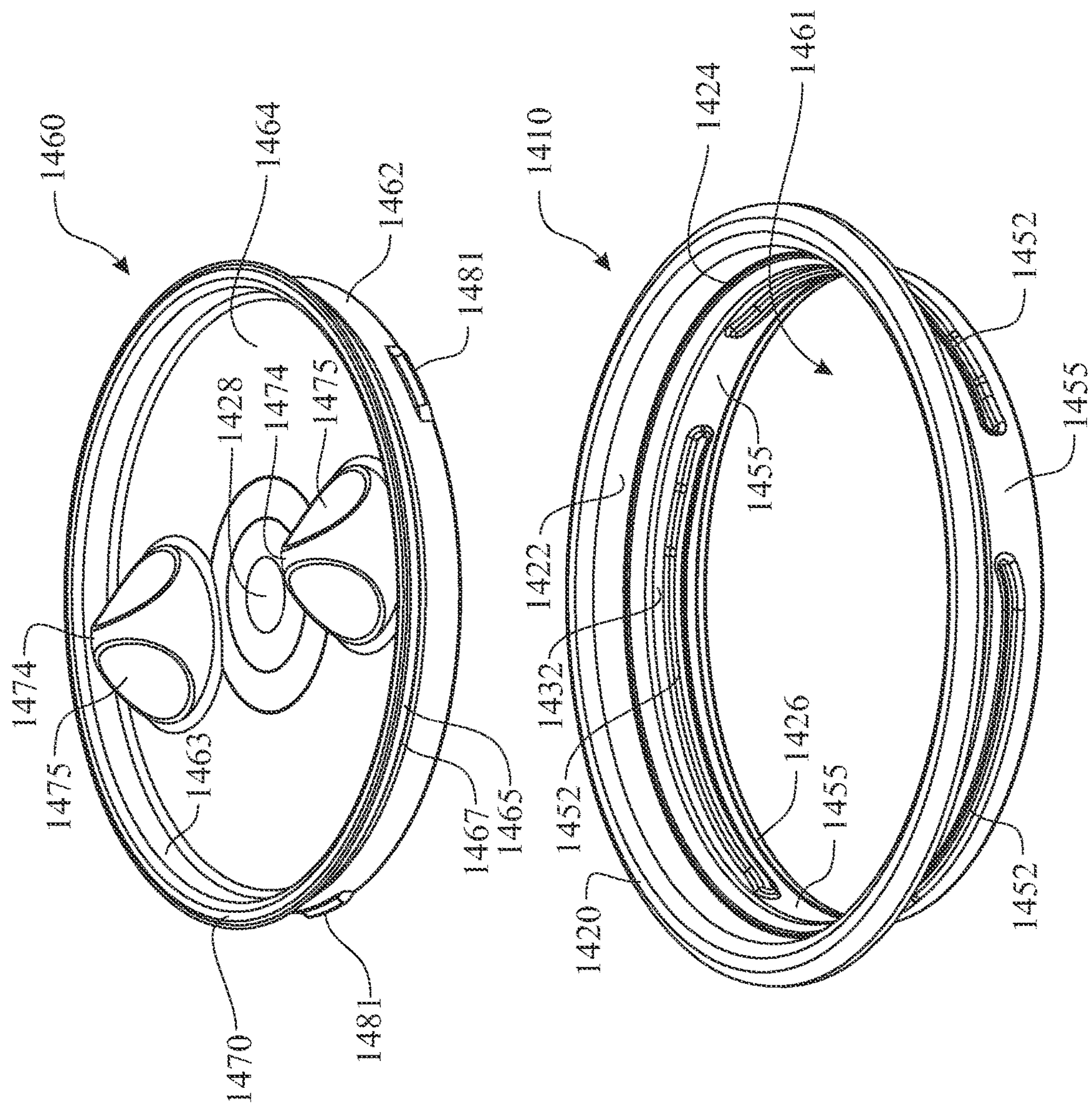
Figure 152:
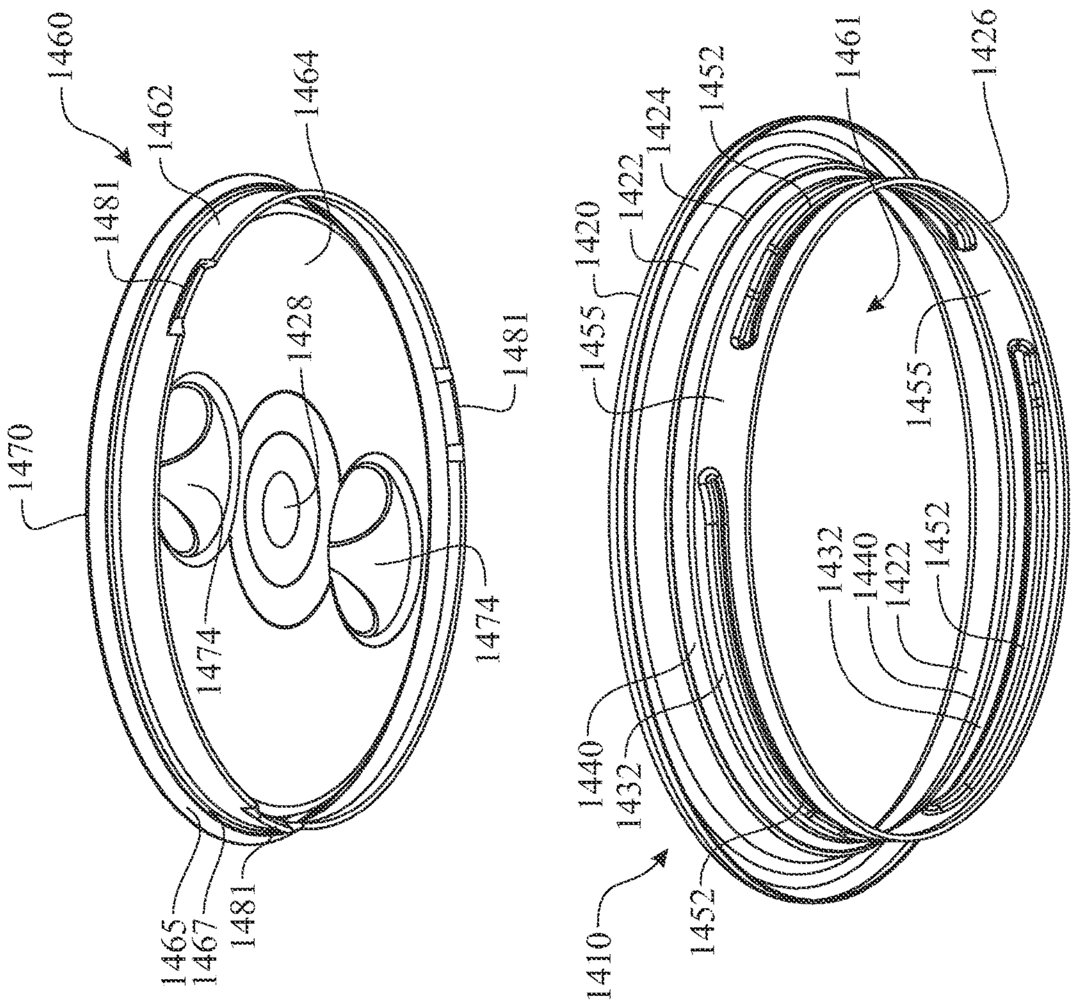
Figure 153:
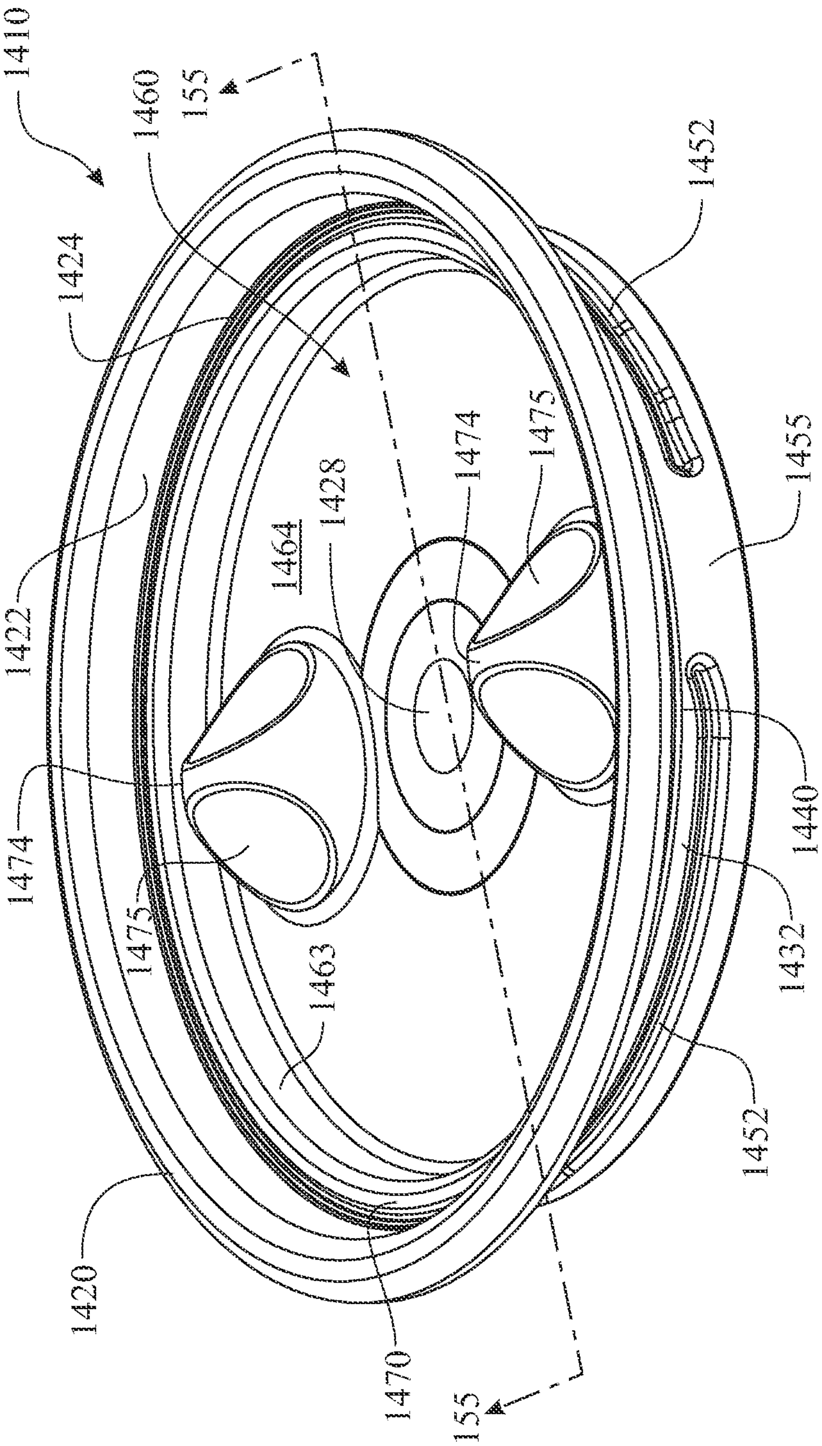
Figure 154:
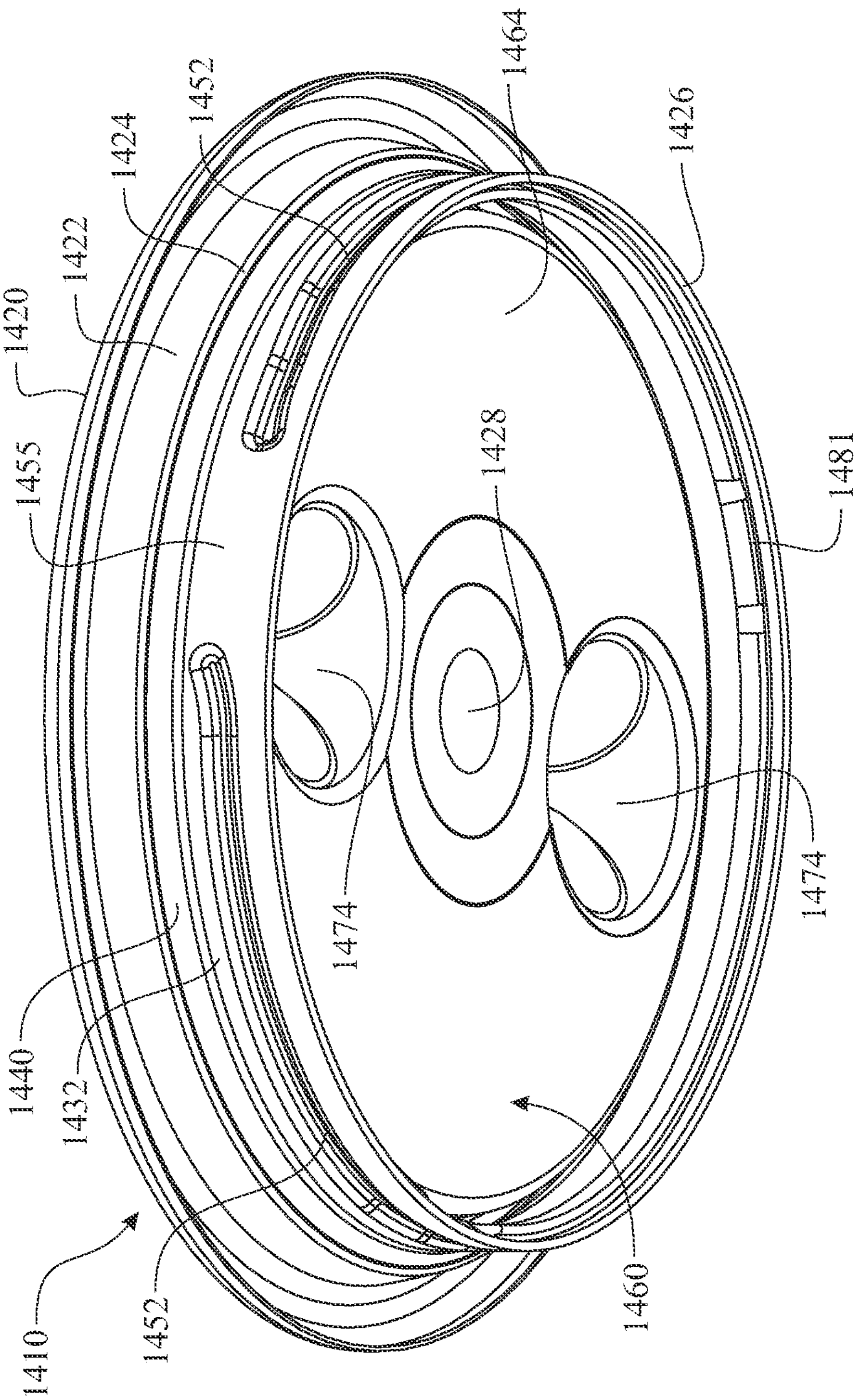
Figure 155:
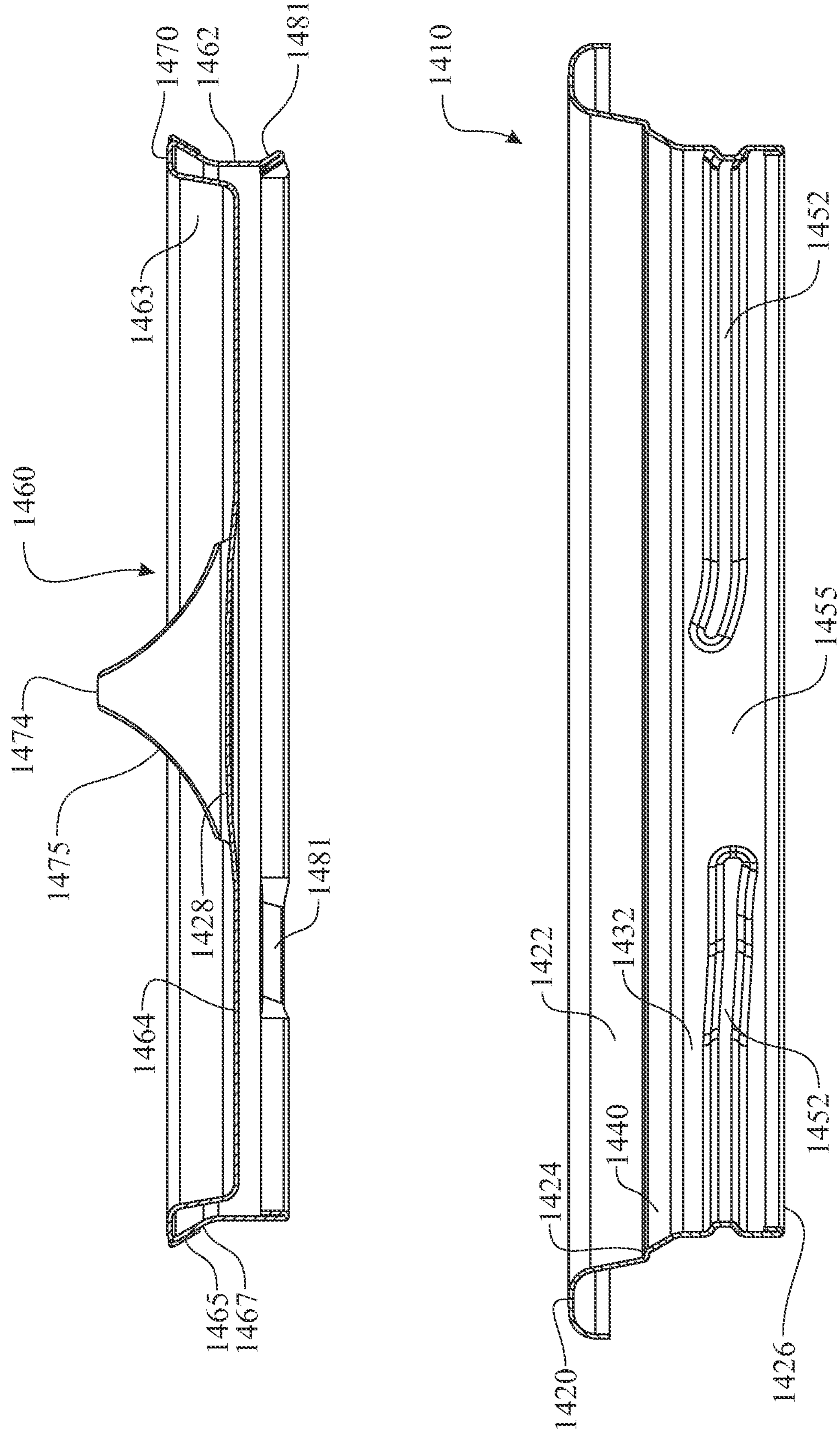
Figure 156:
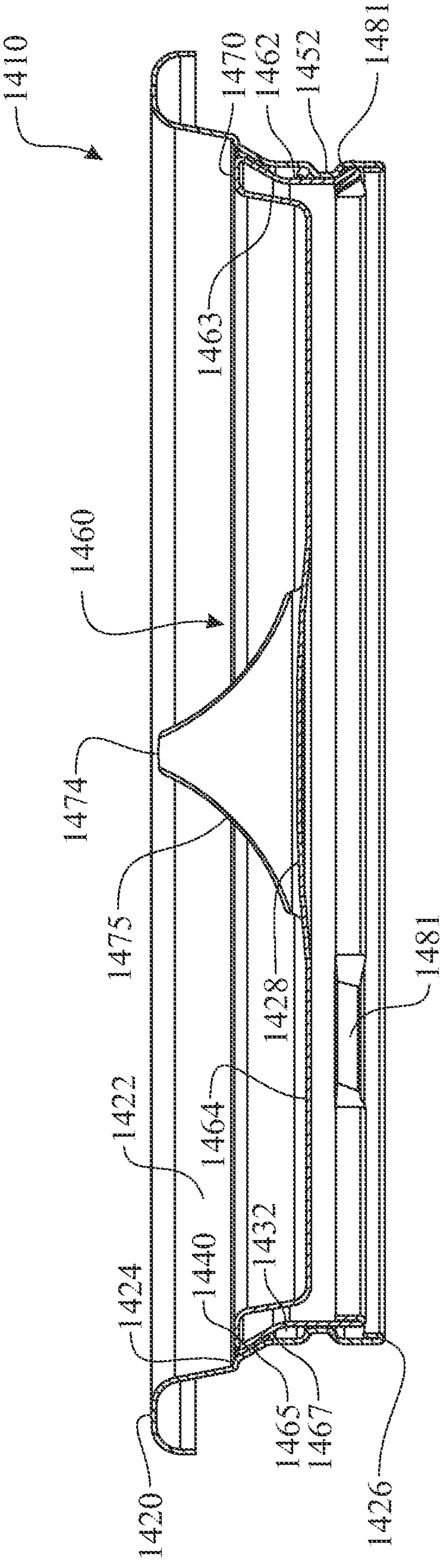
Figure 157:
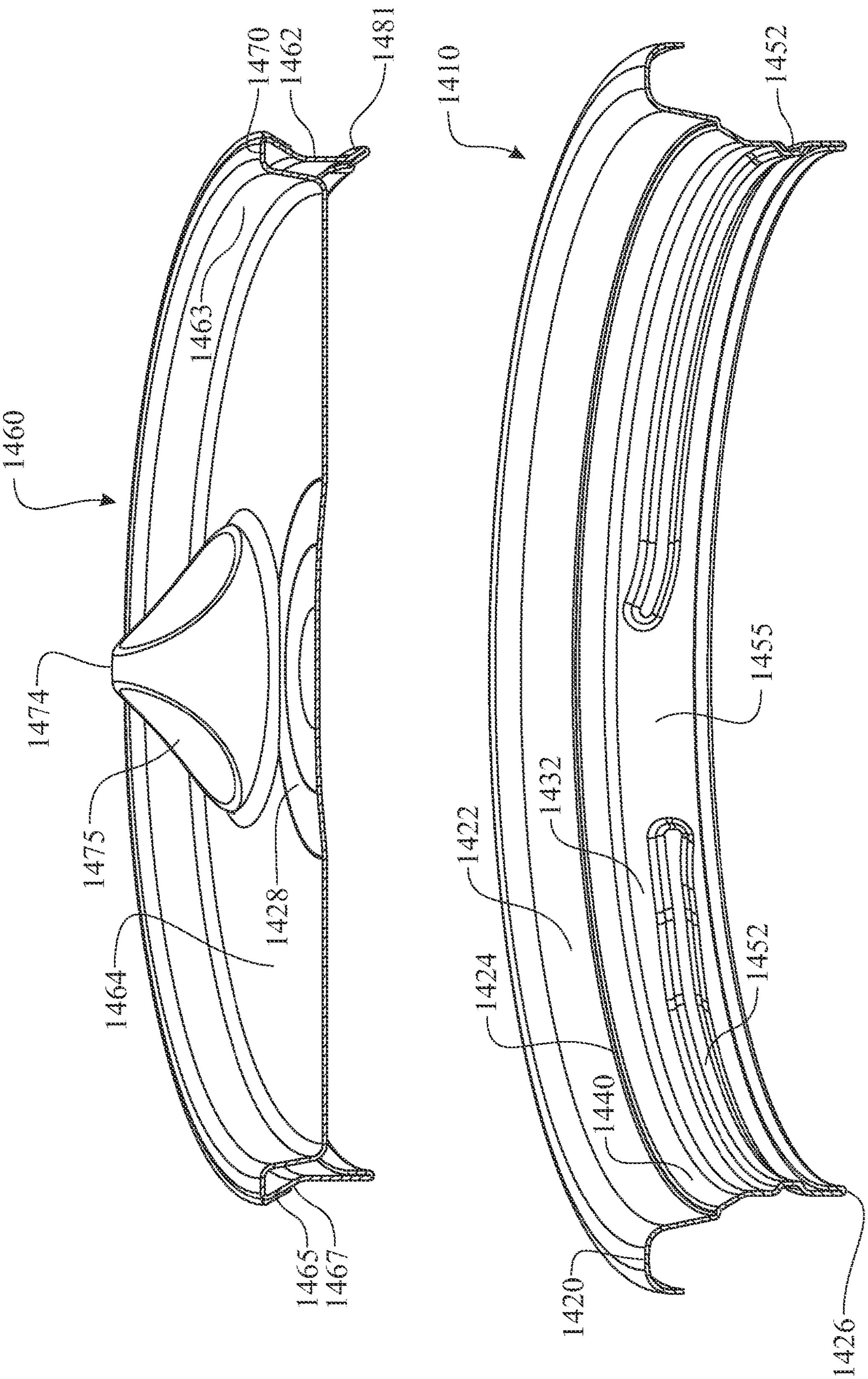
Figure 158:
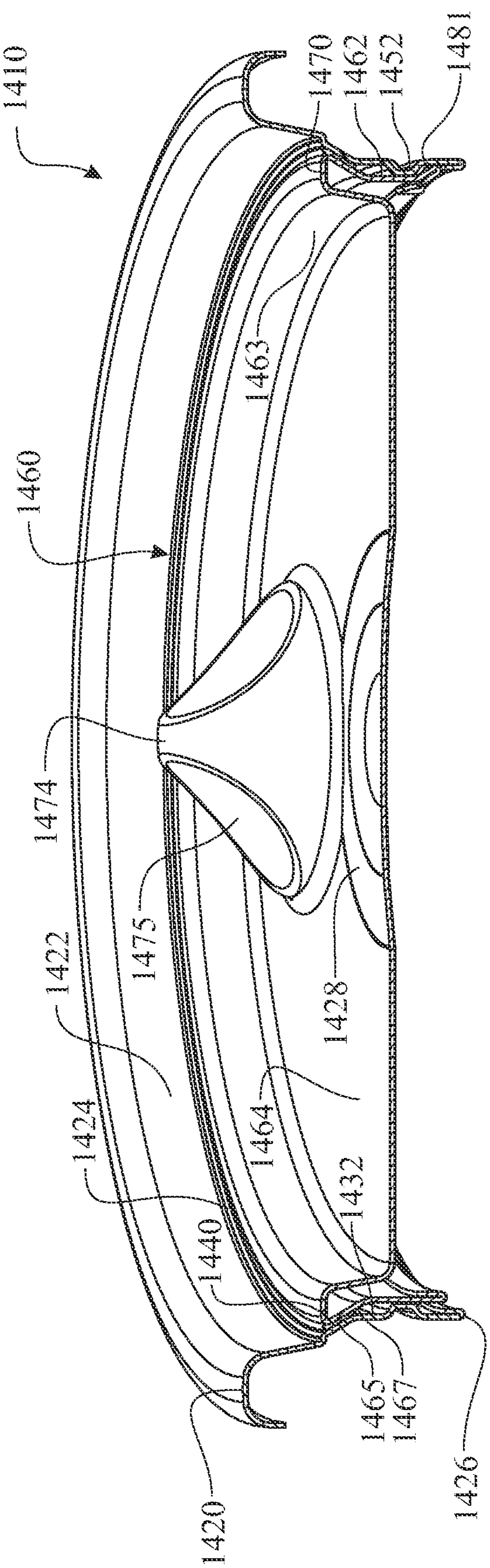
Figure 159:
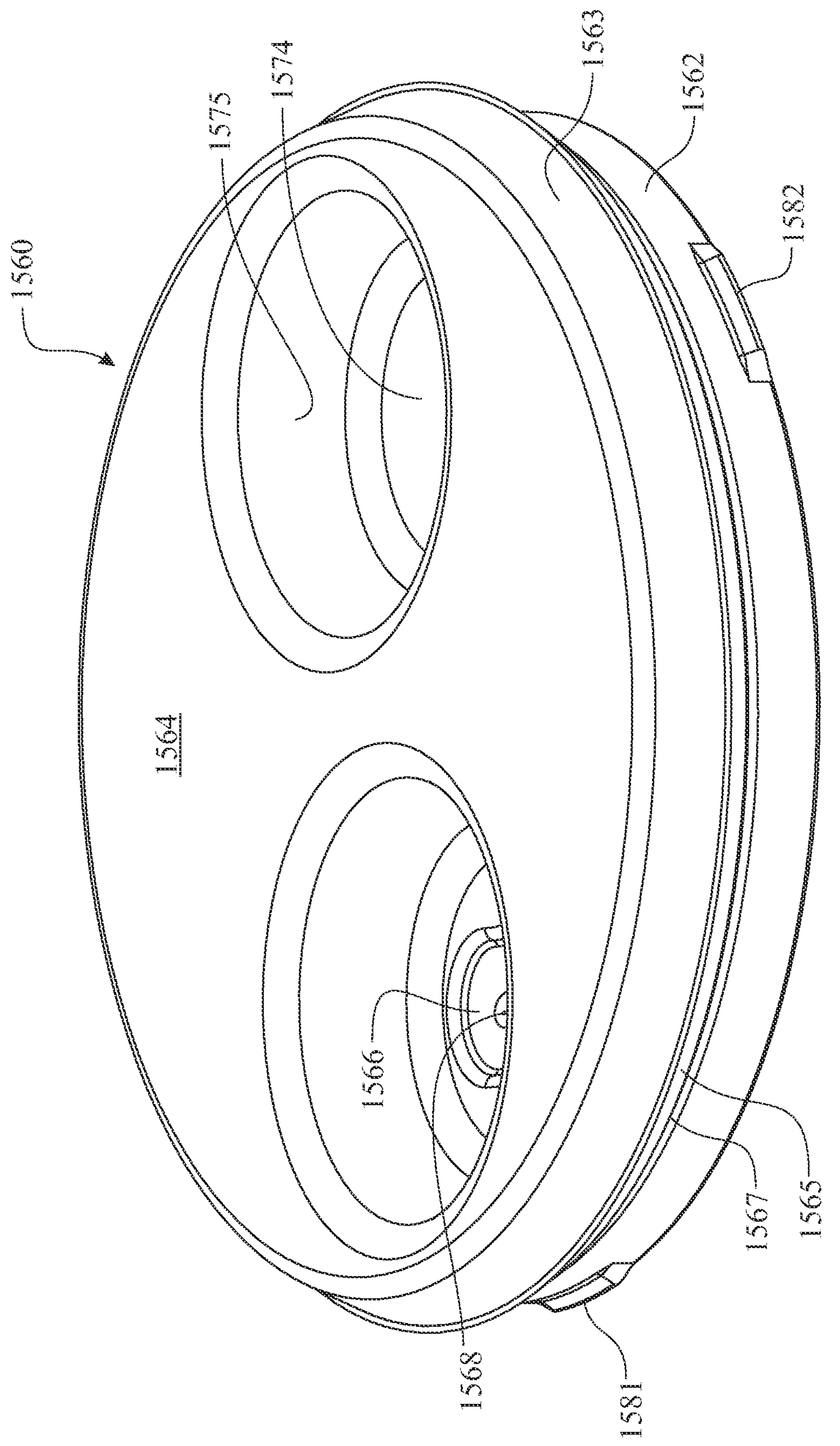
Figure 160:
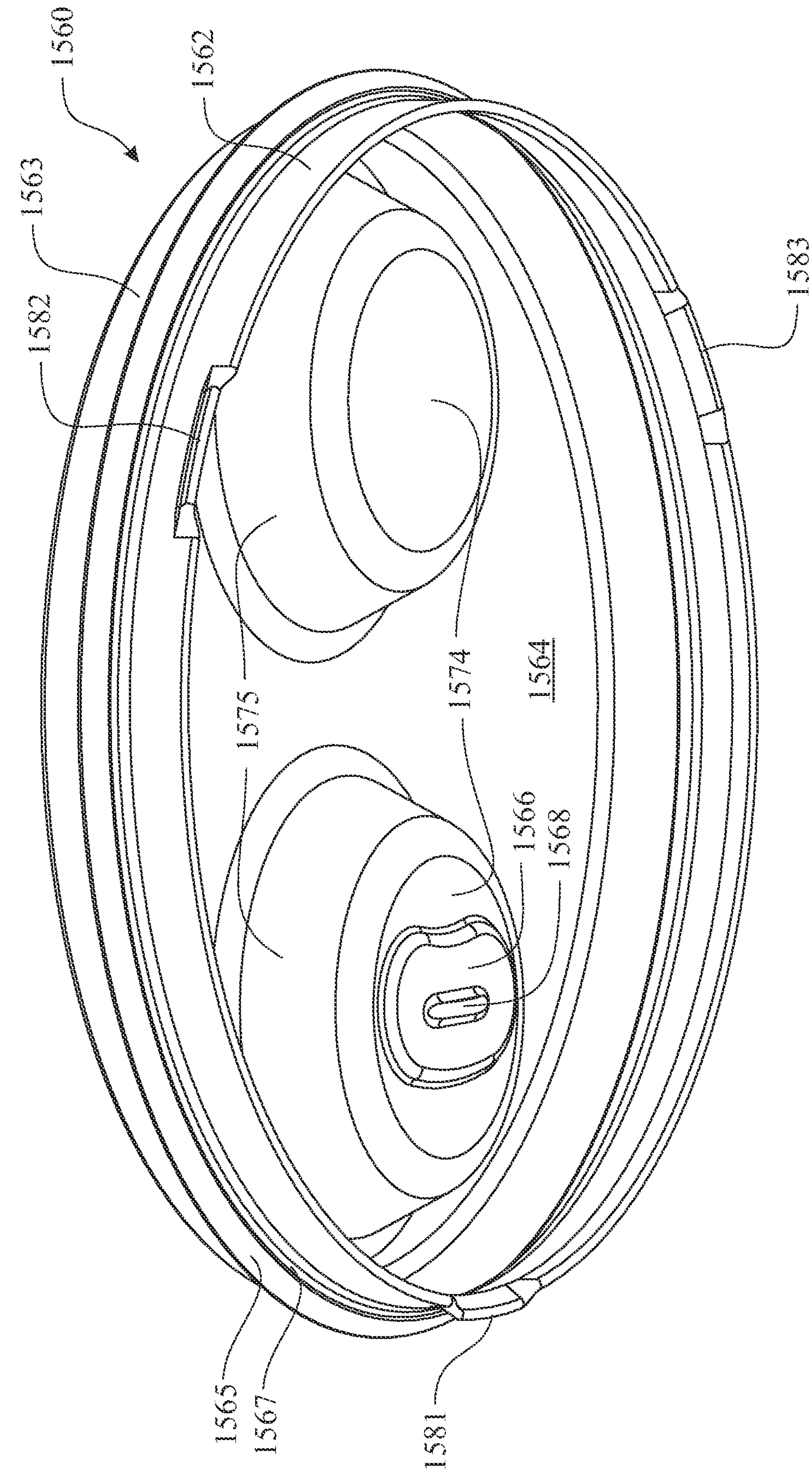
Figure 161:
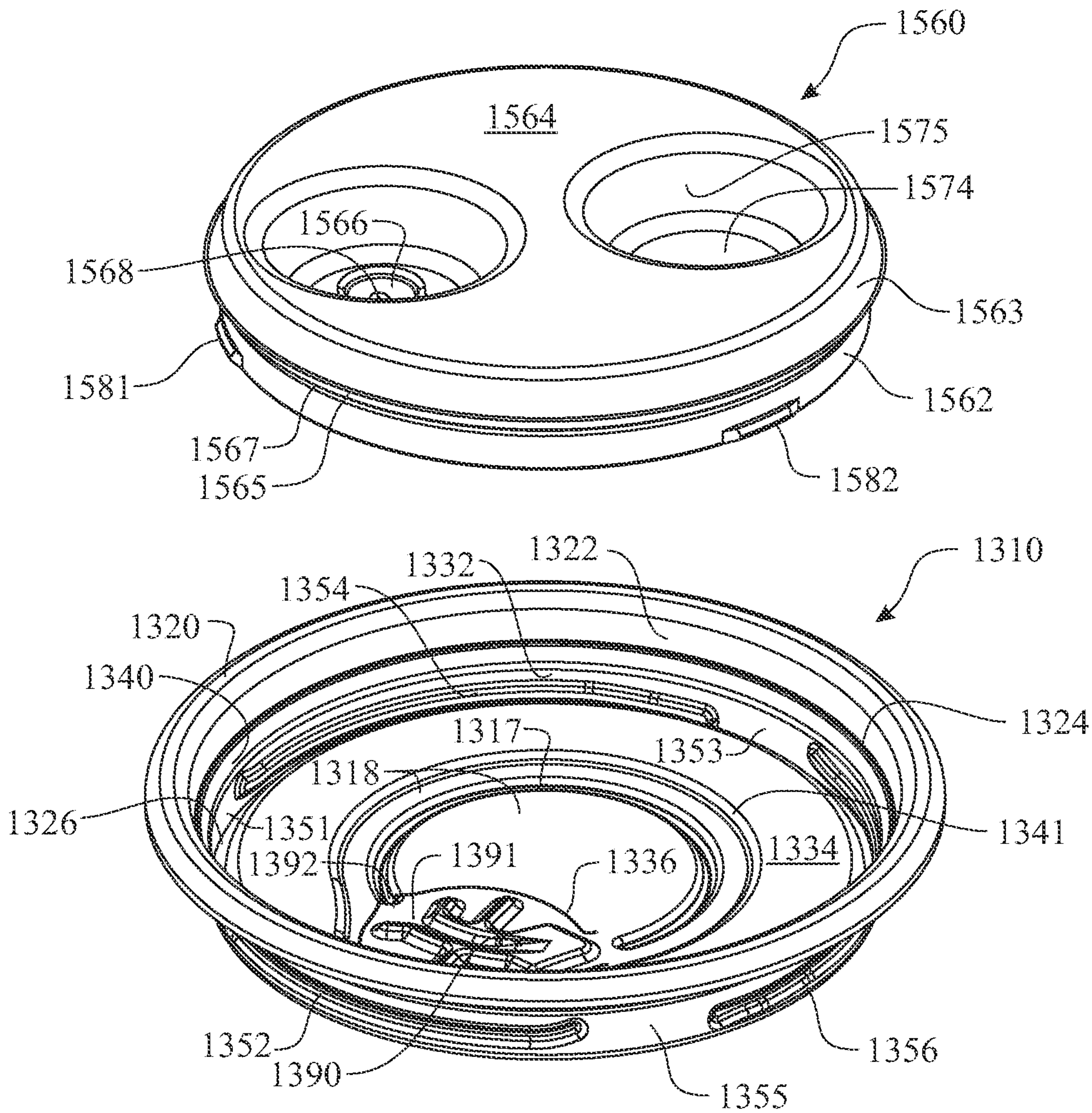
Figure 162:
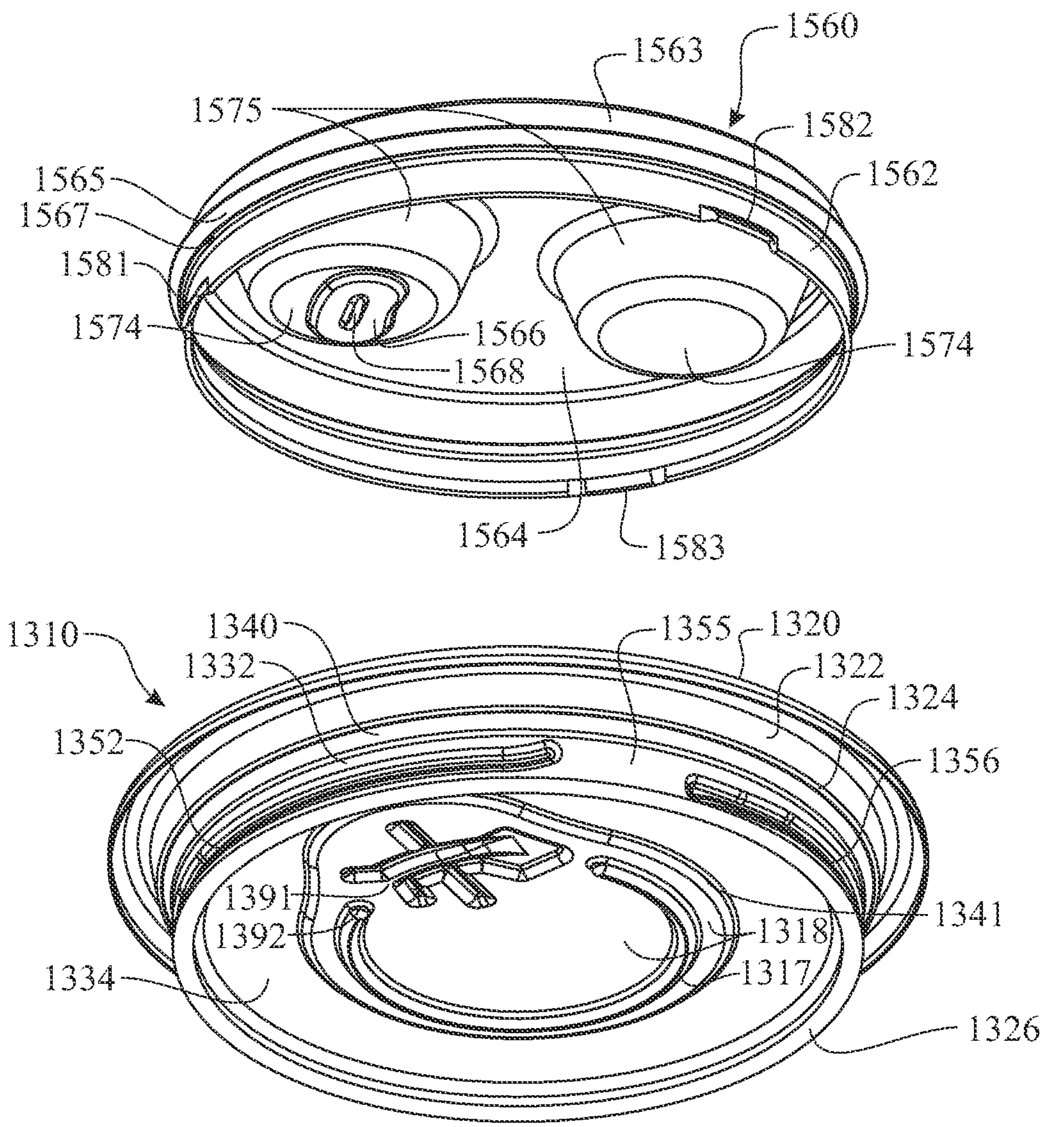
Figure 163:
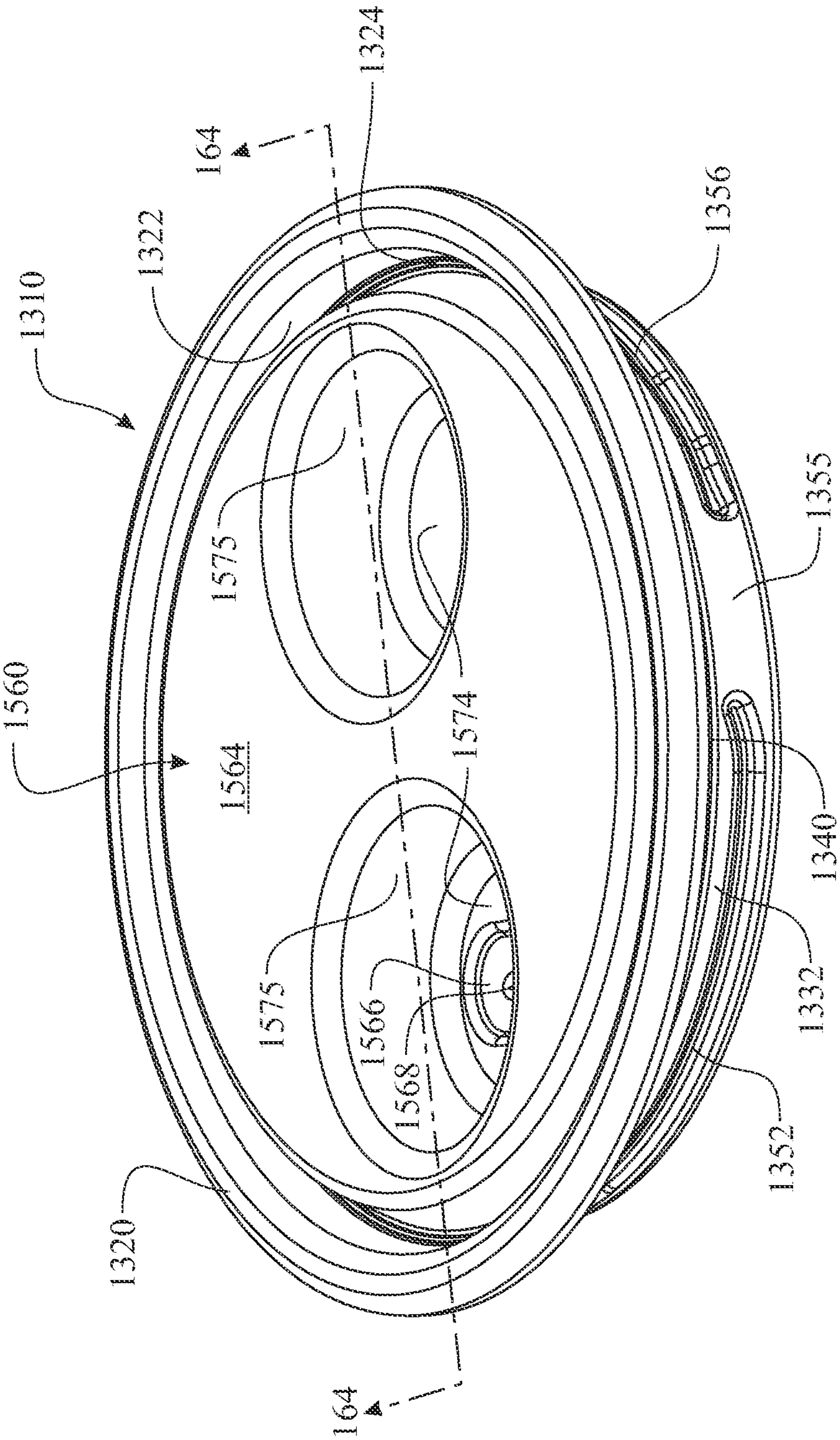
Figure 164:
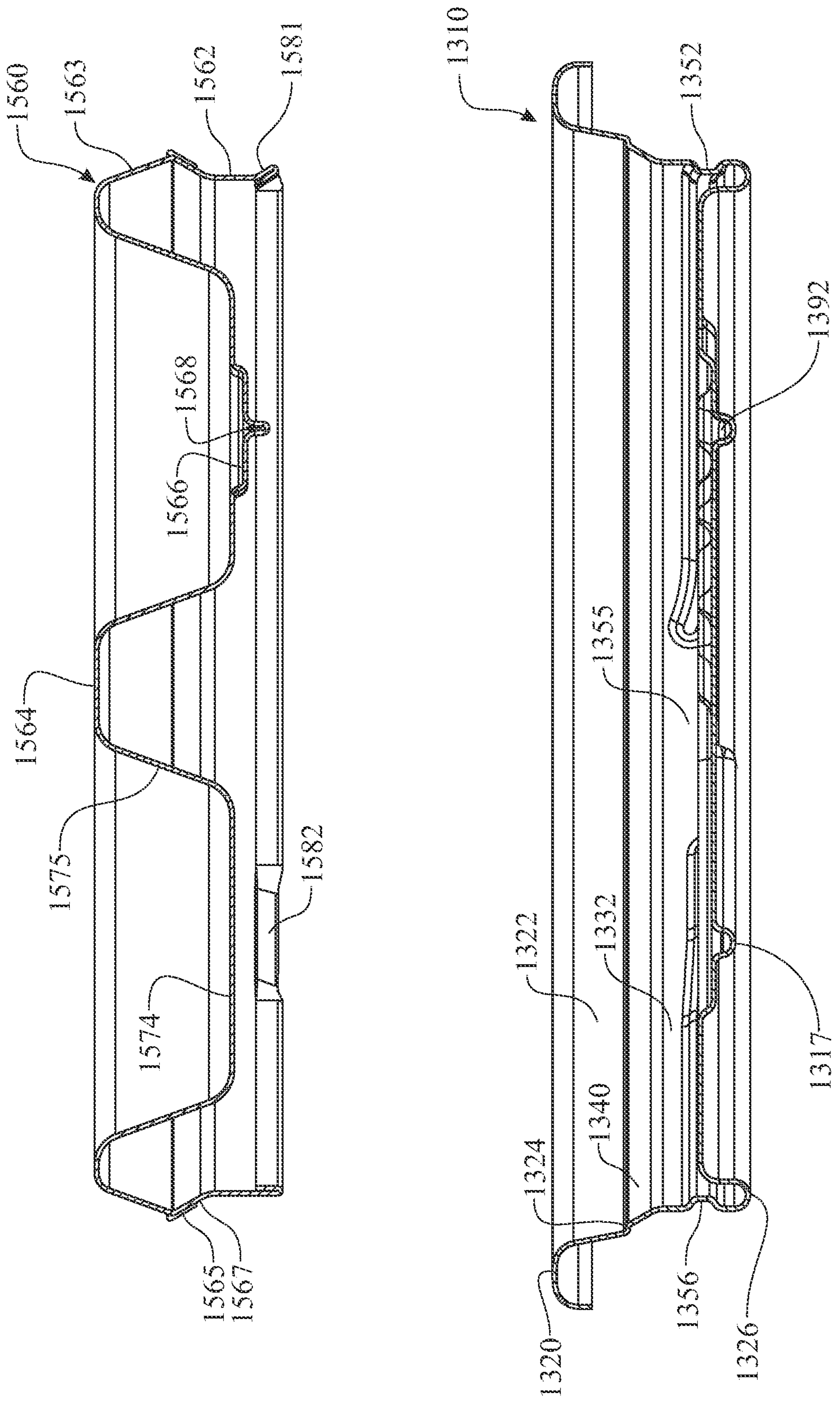
Figure 165:
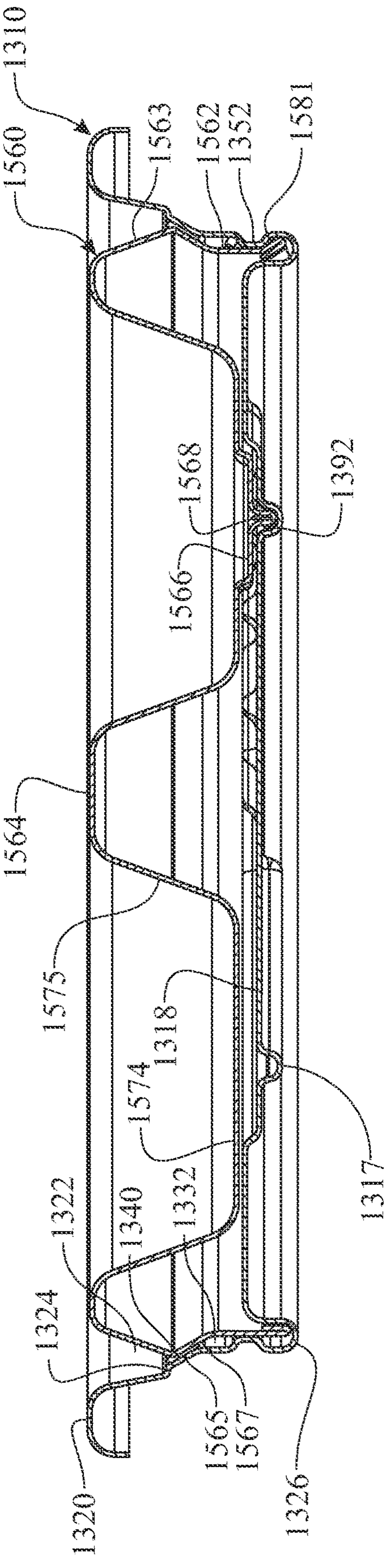
Figure 166:
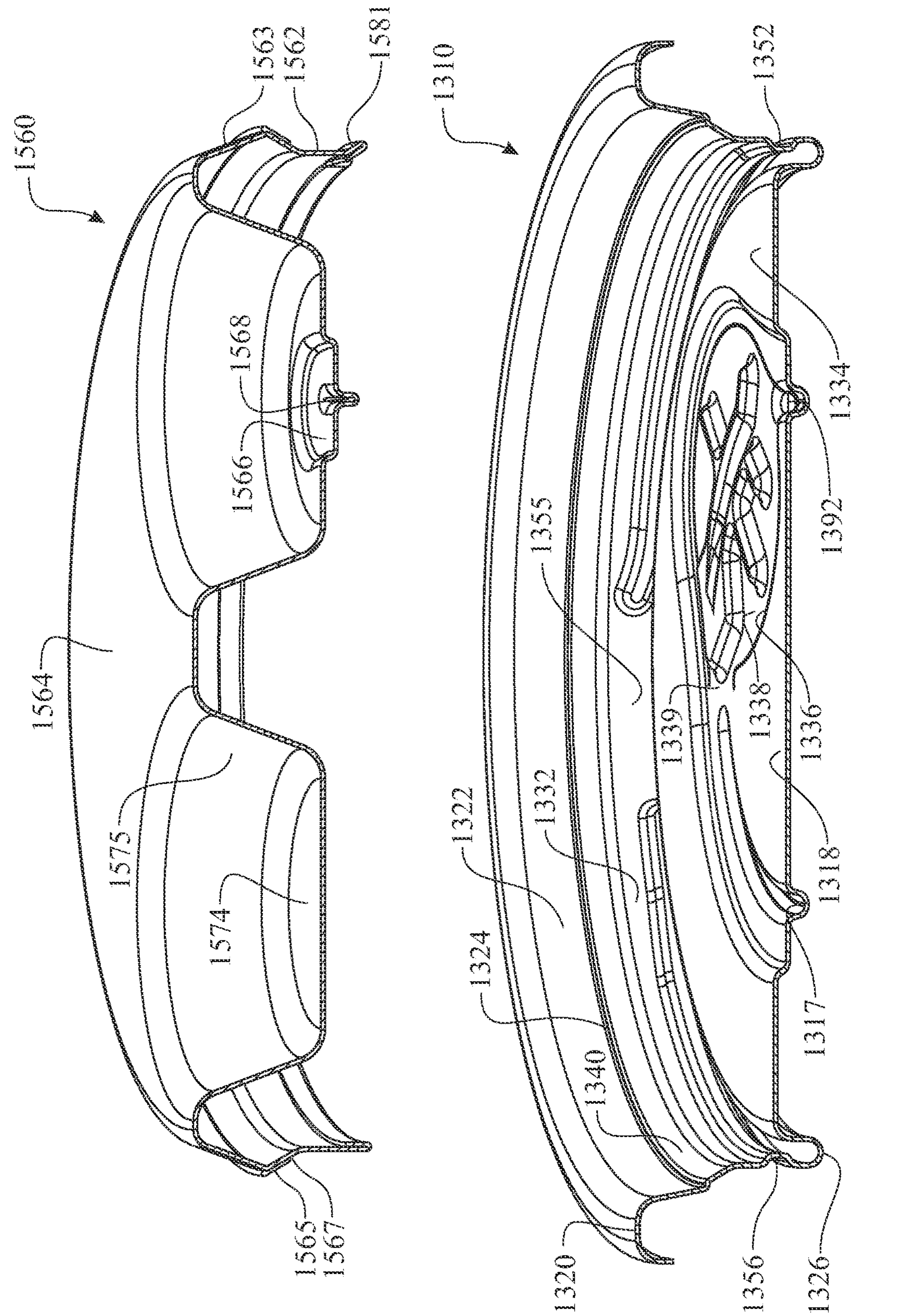
Figure 167:
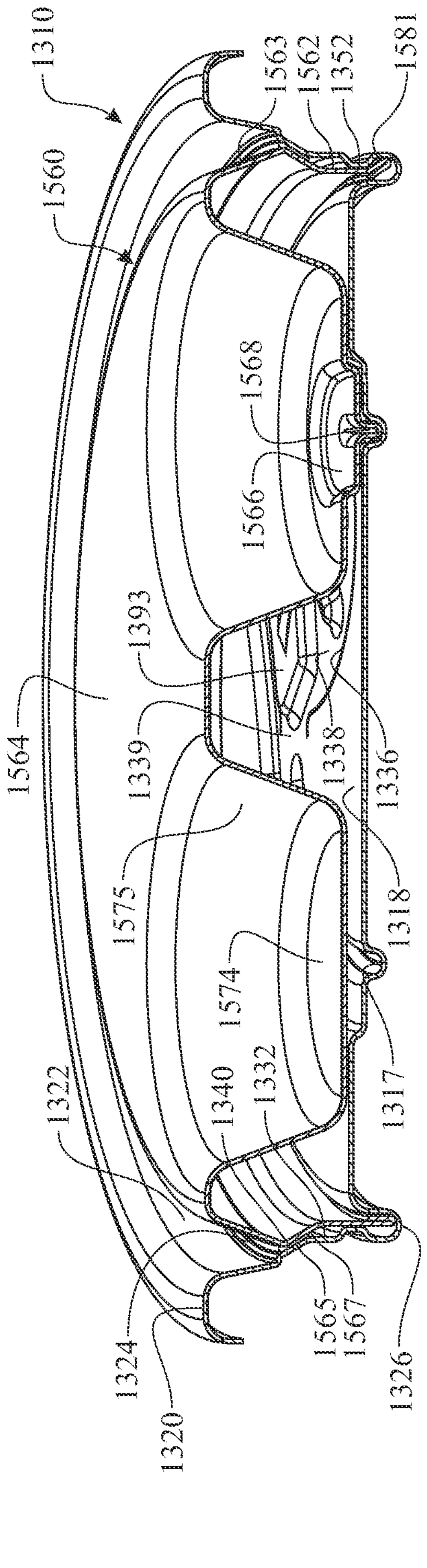
Figure 168:
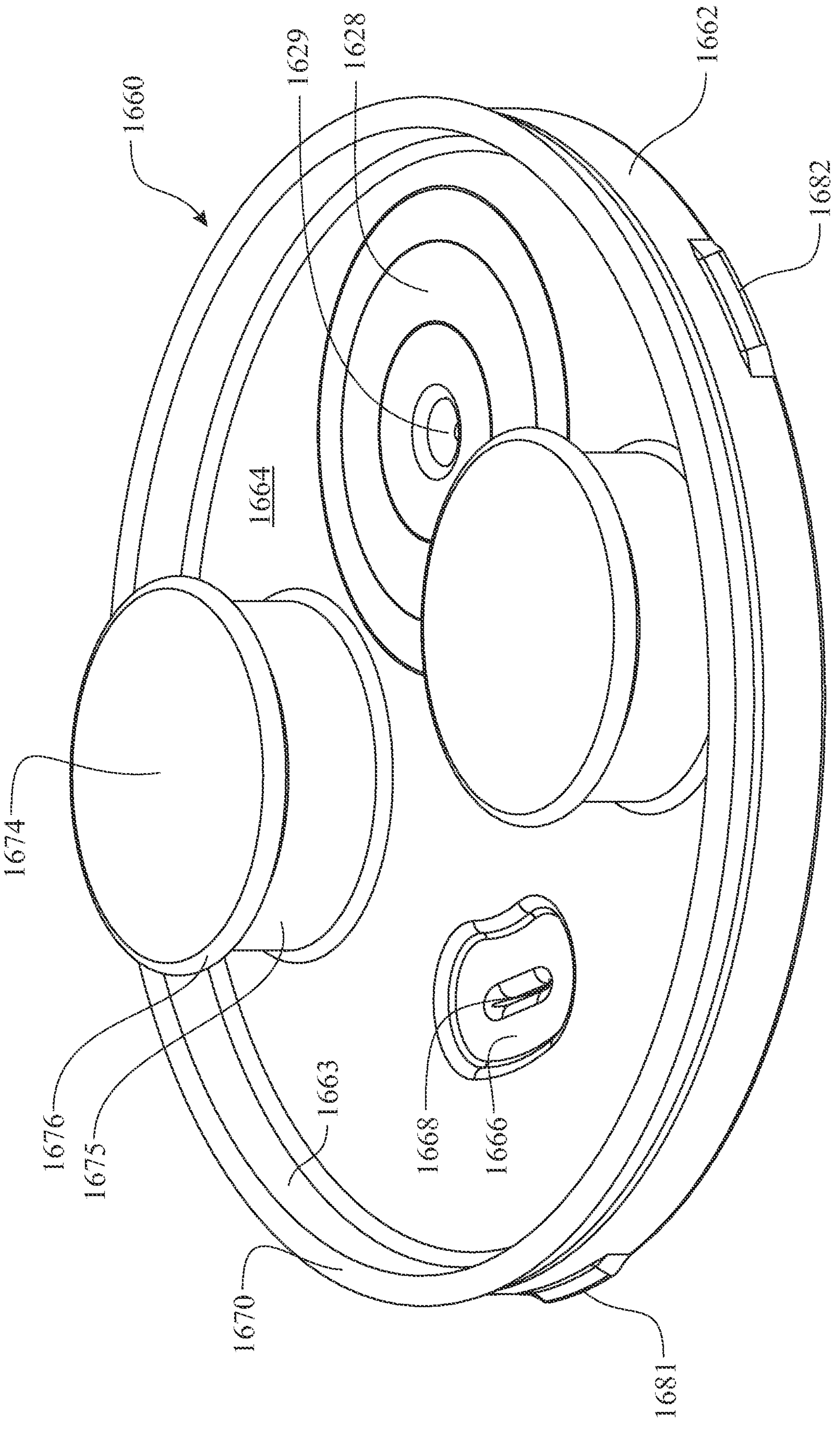
Figure 169:
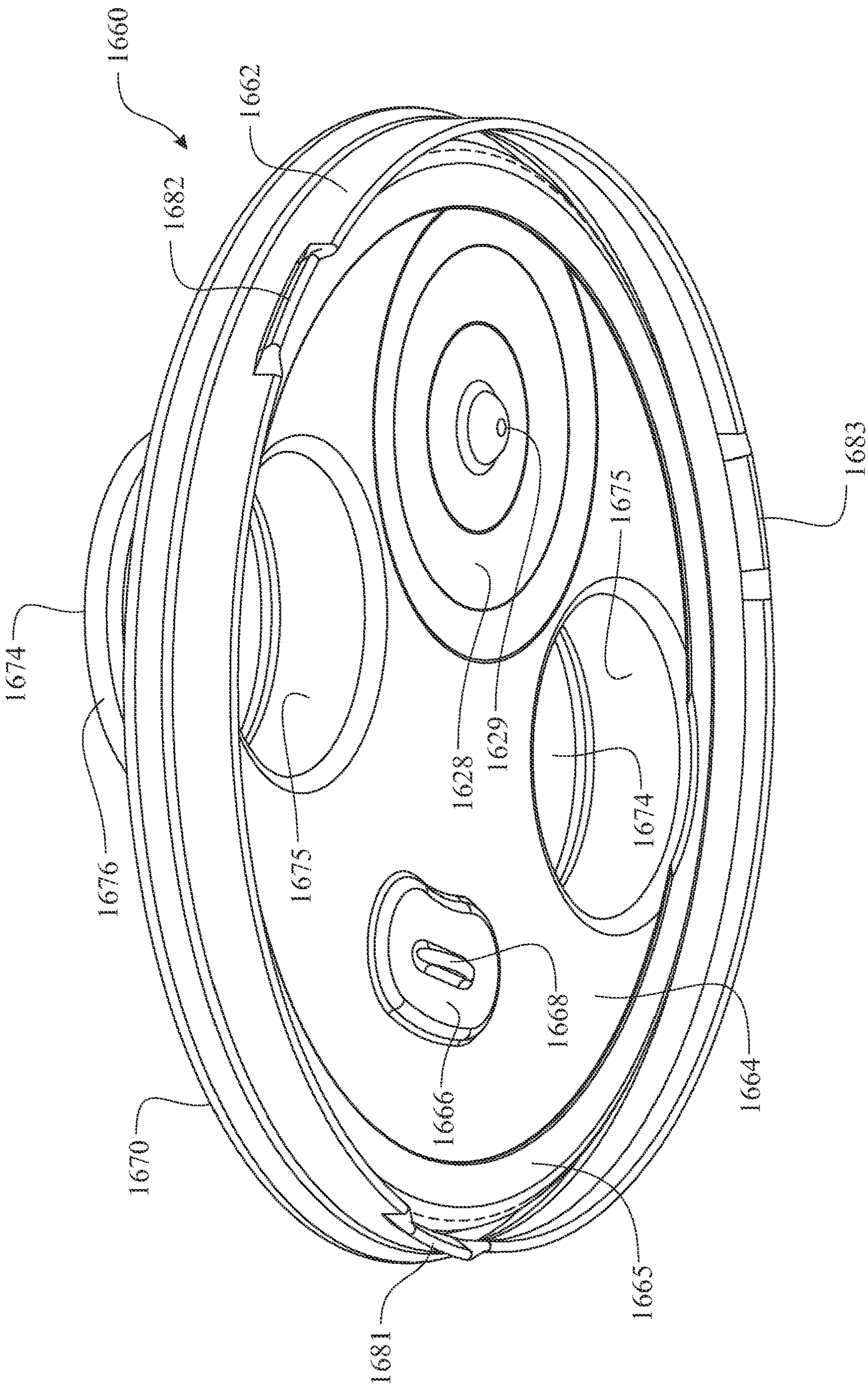
Figure 170:
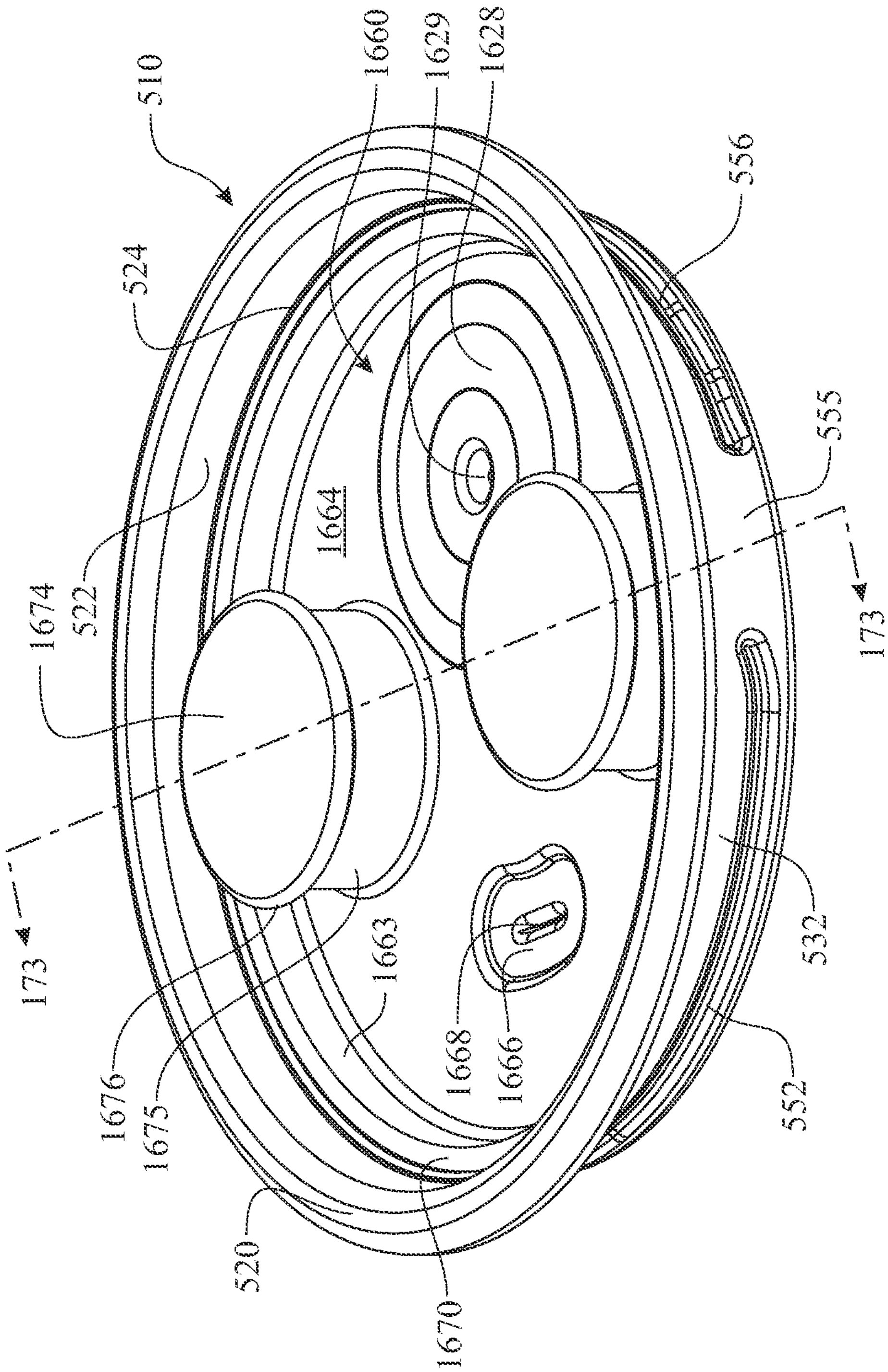
Figure 171:
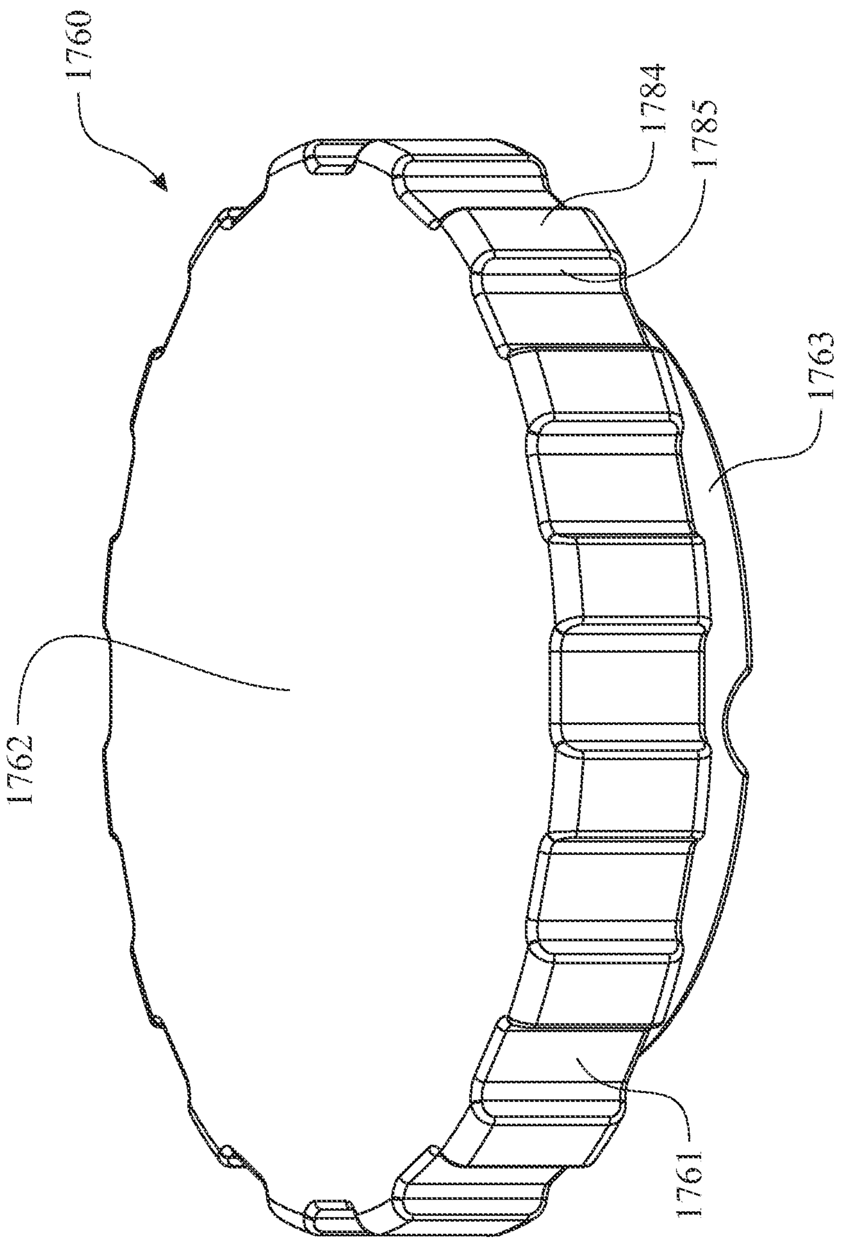
Figure 172:
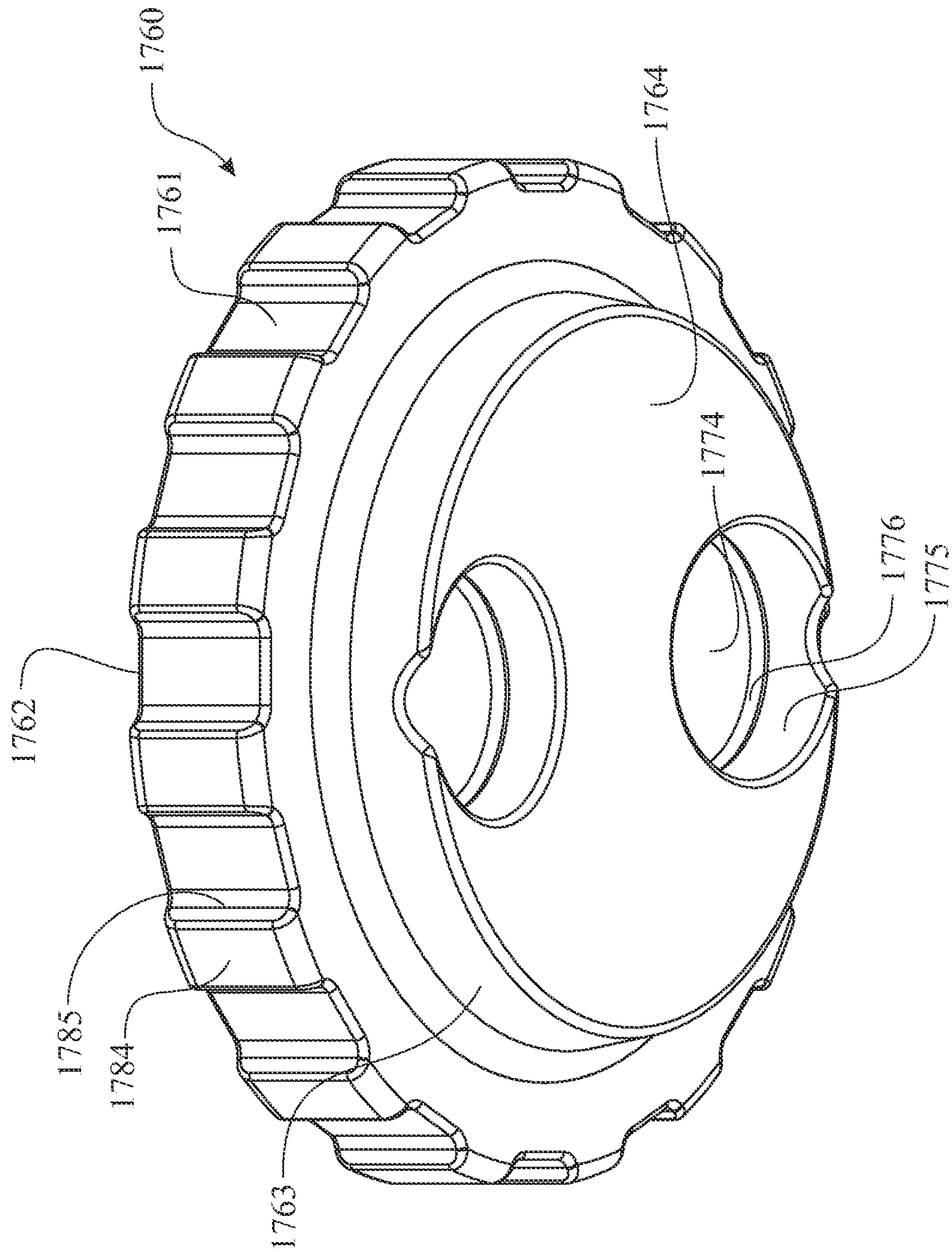
Figure 173:
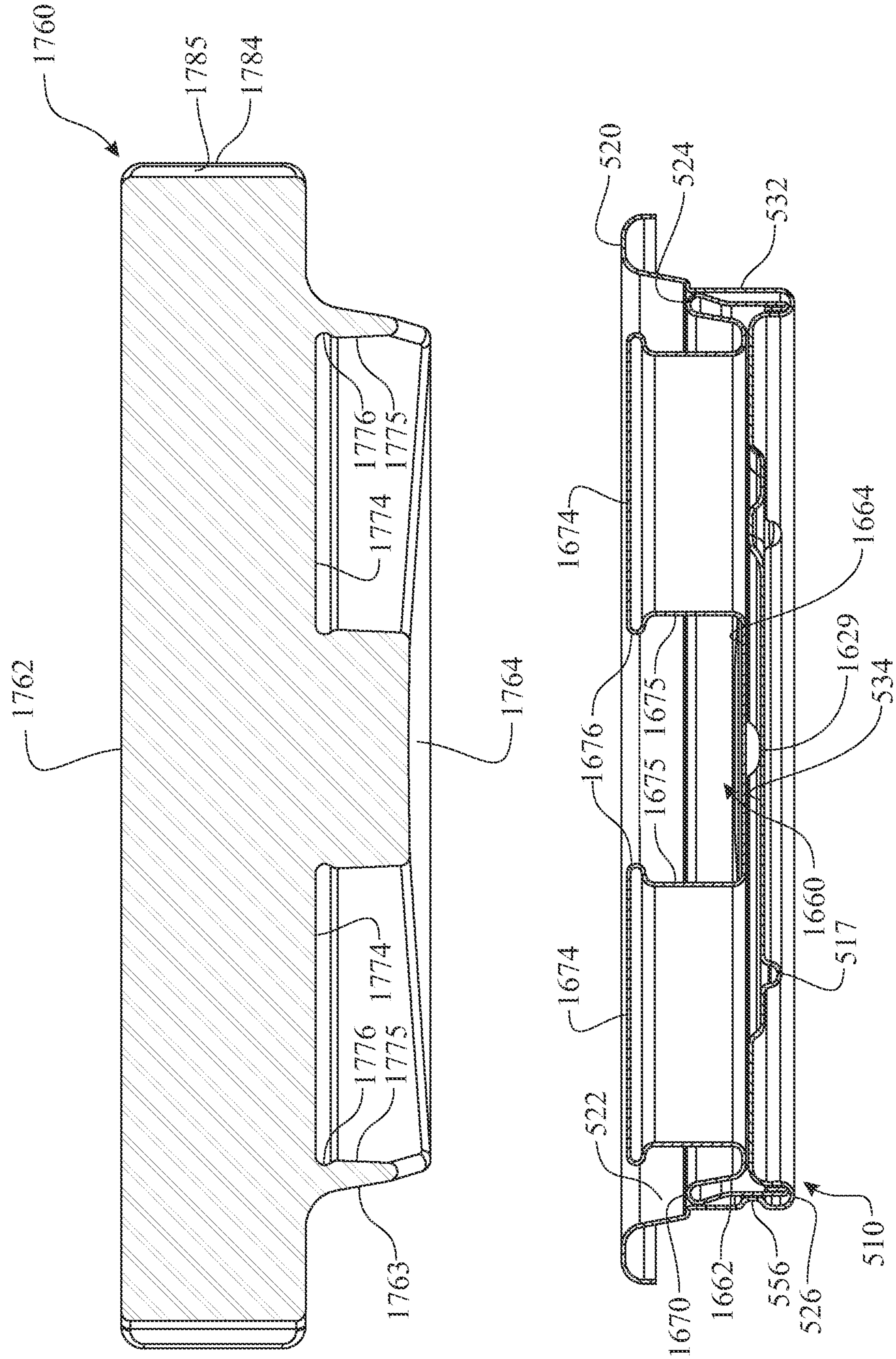
Figure 174:
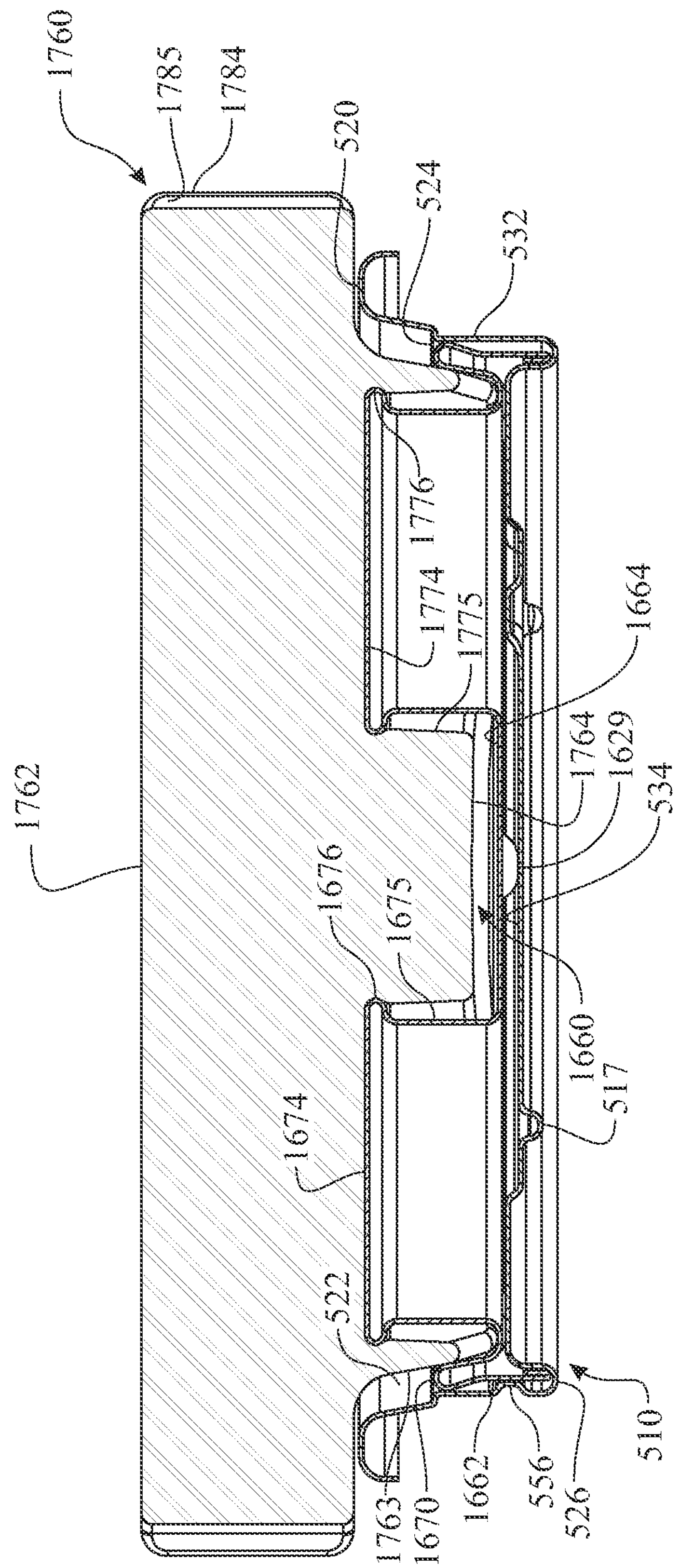
Figure 175:
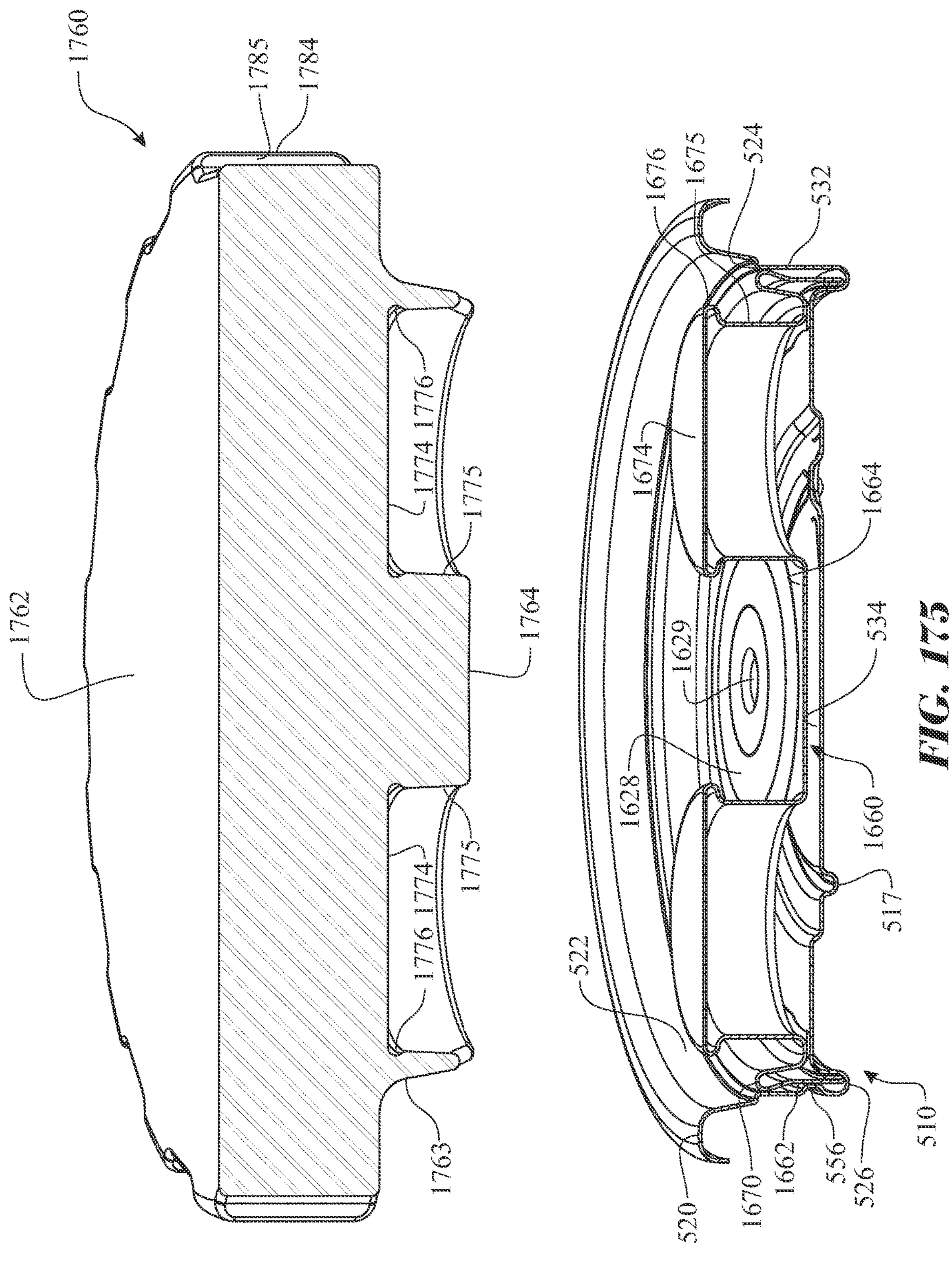
Figure 176:
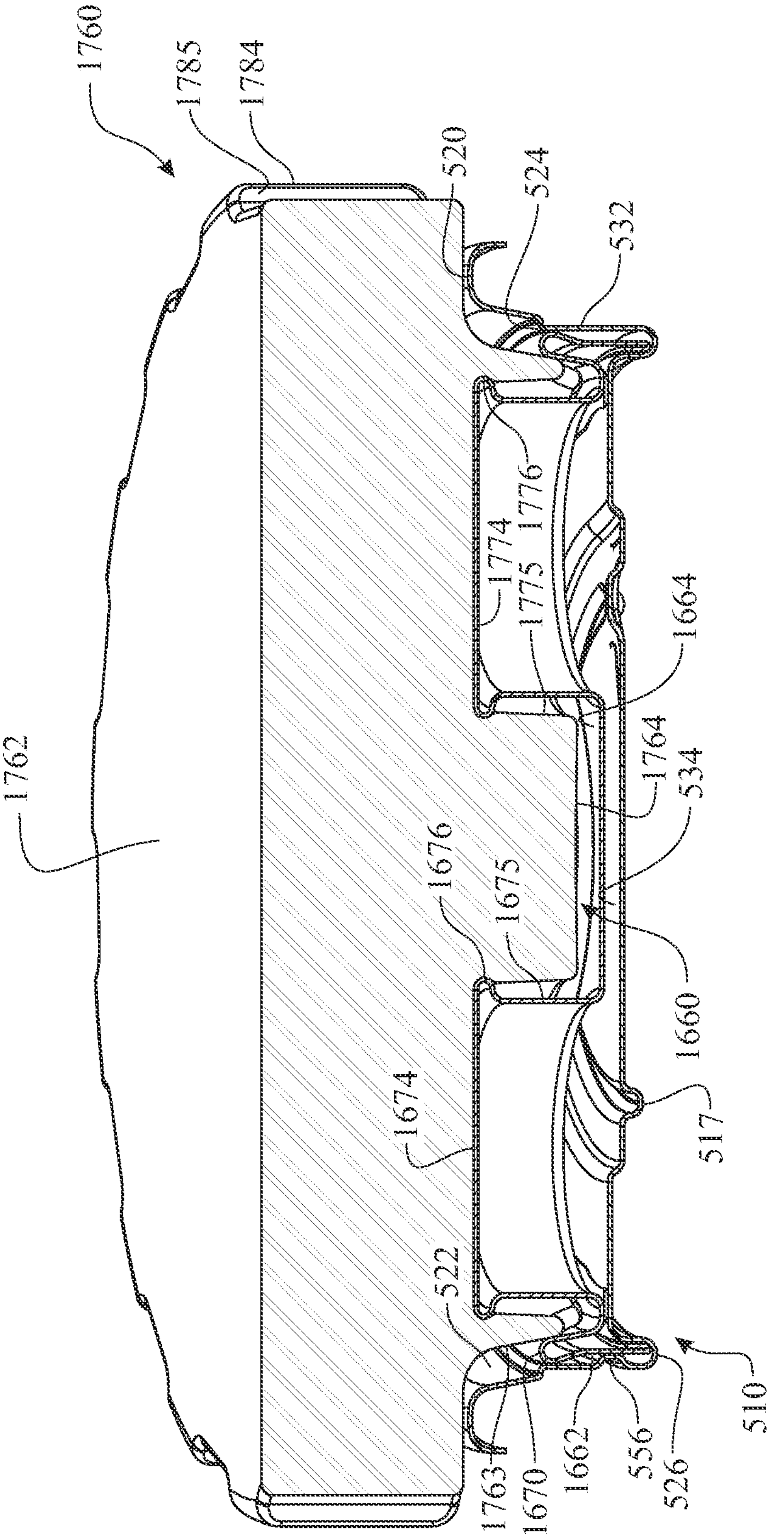
Figure 177:
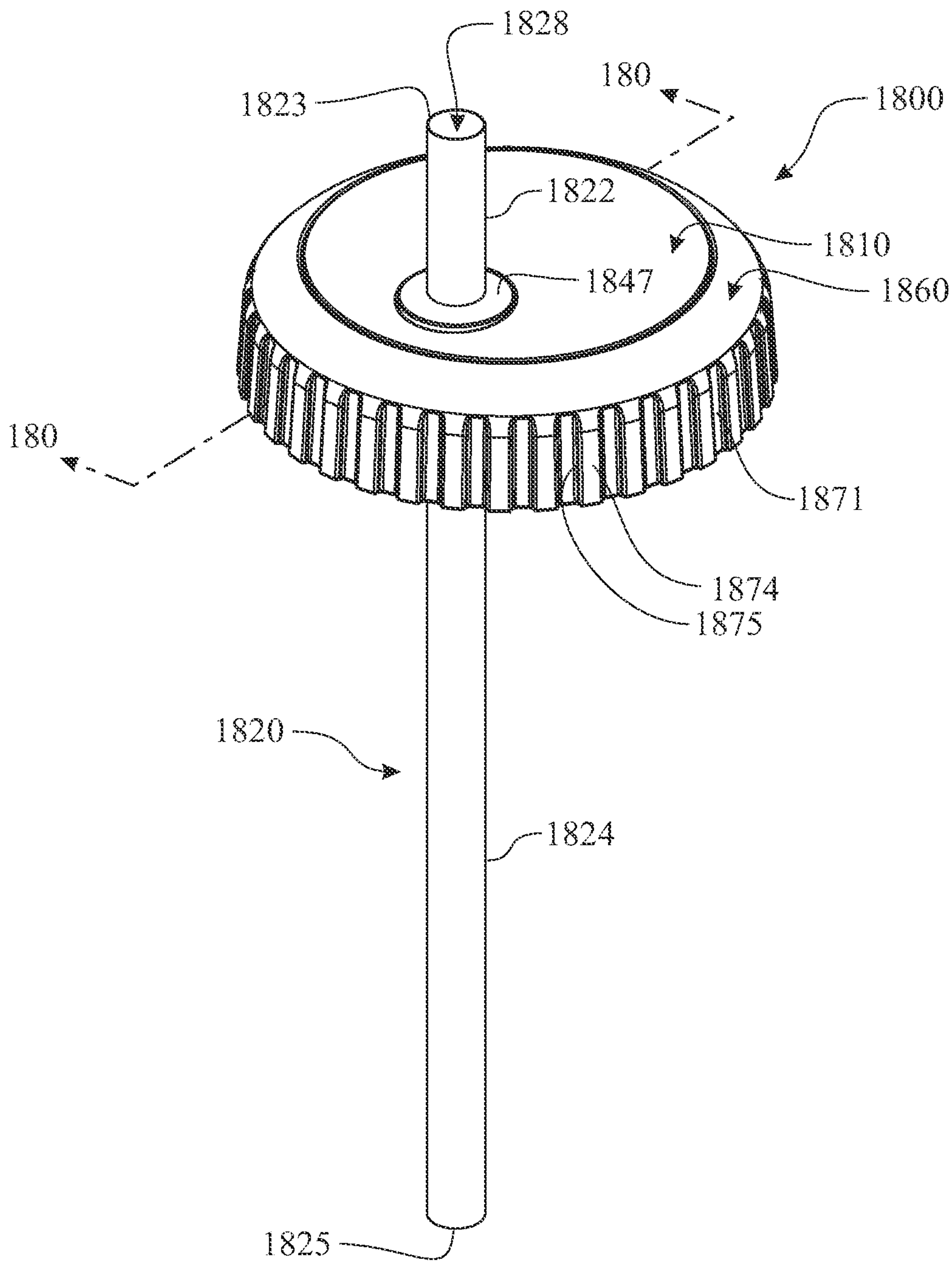
Figure 178:
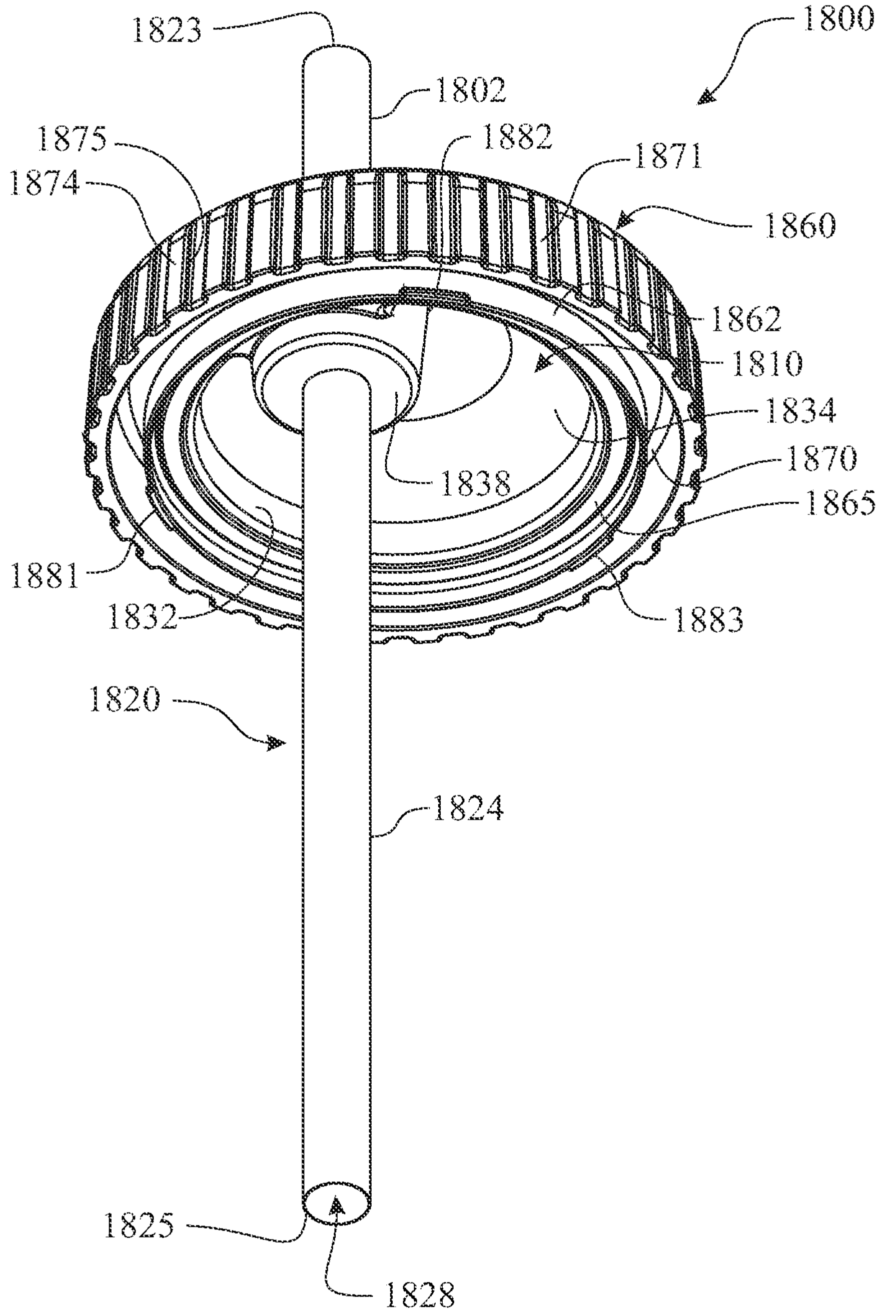
Figure 179:
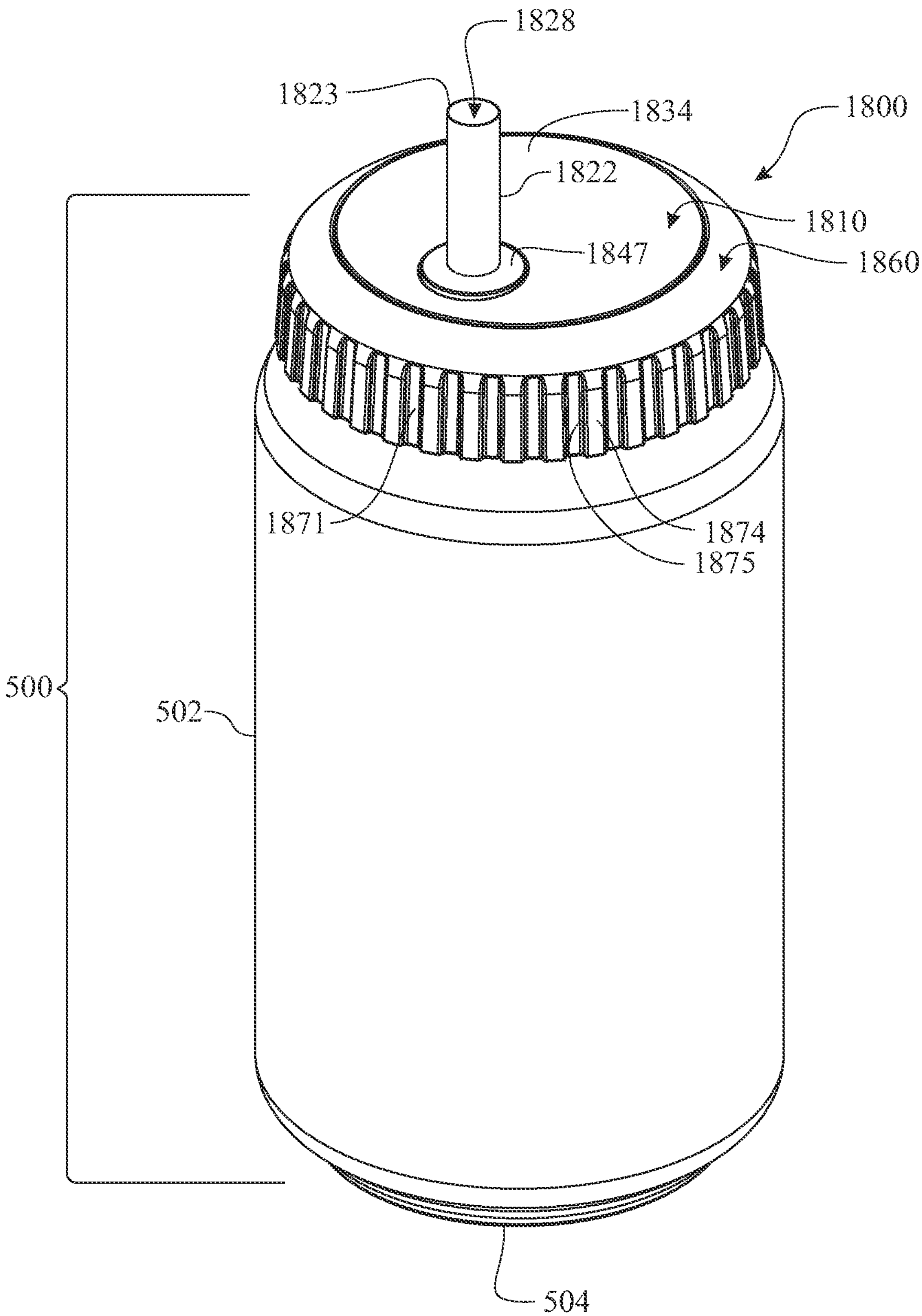
Figure 180:
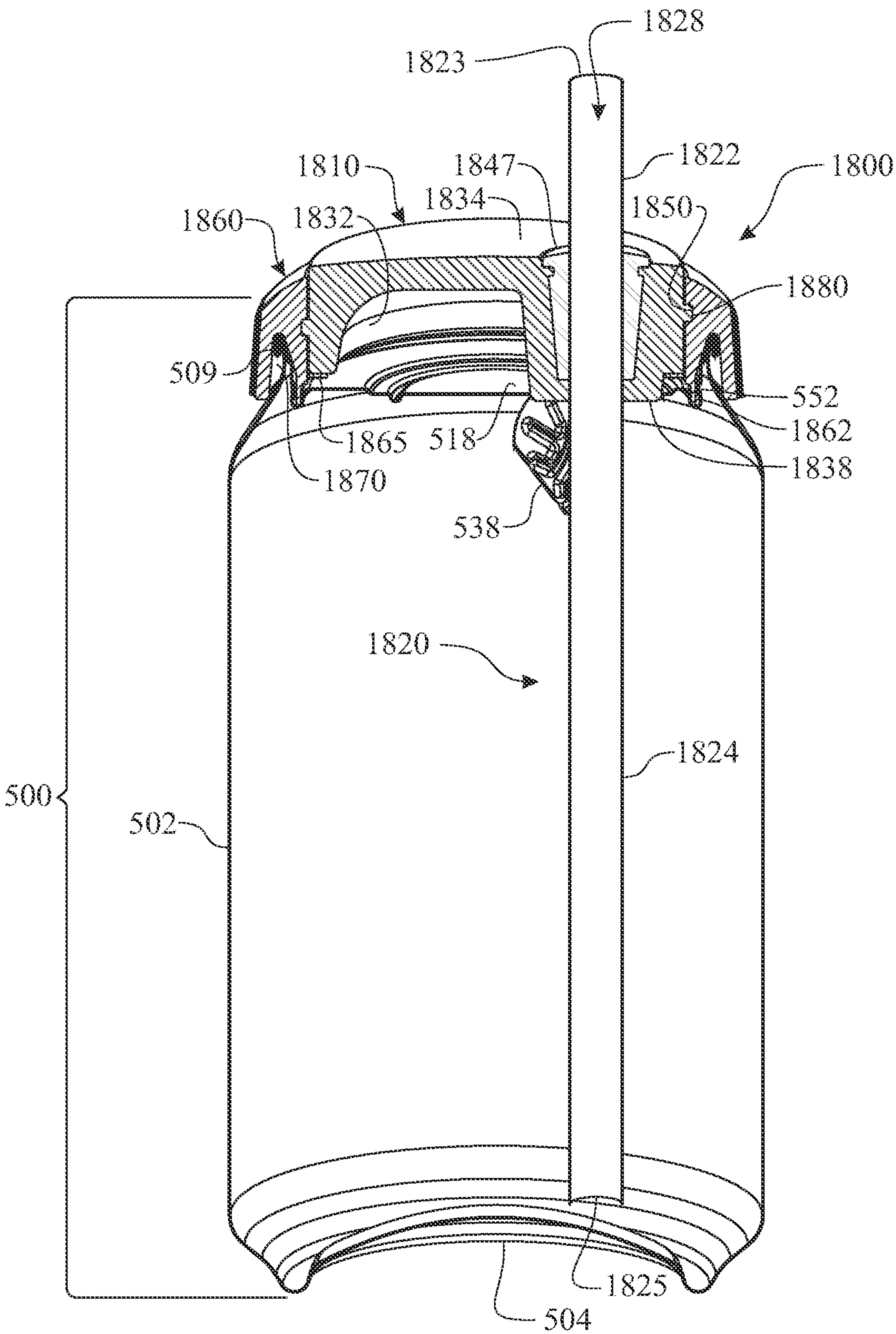
Figure 181:
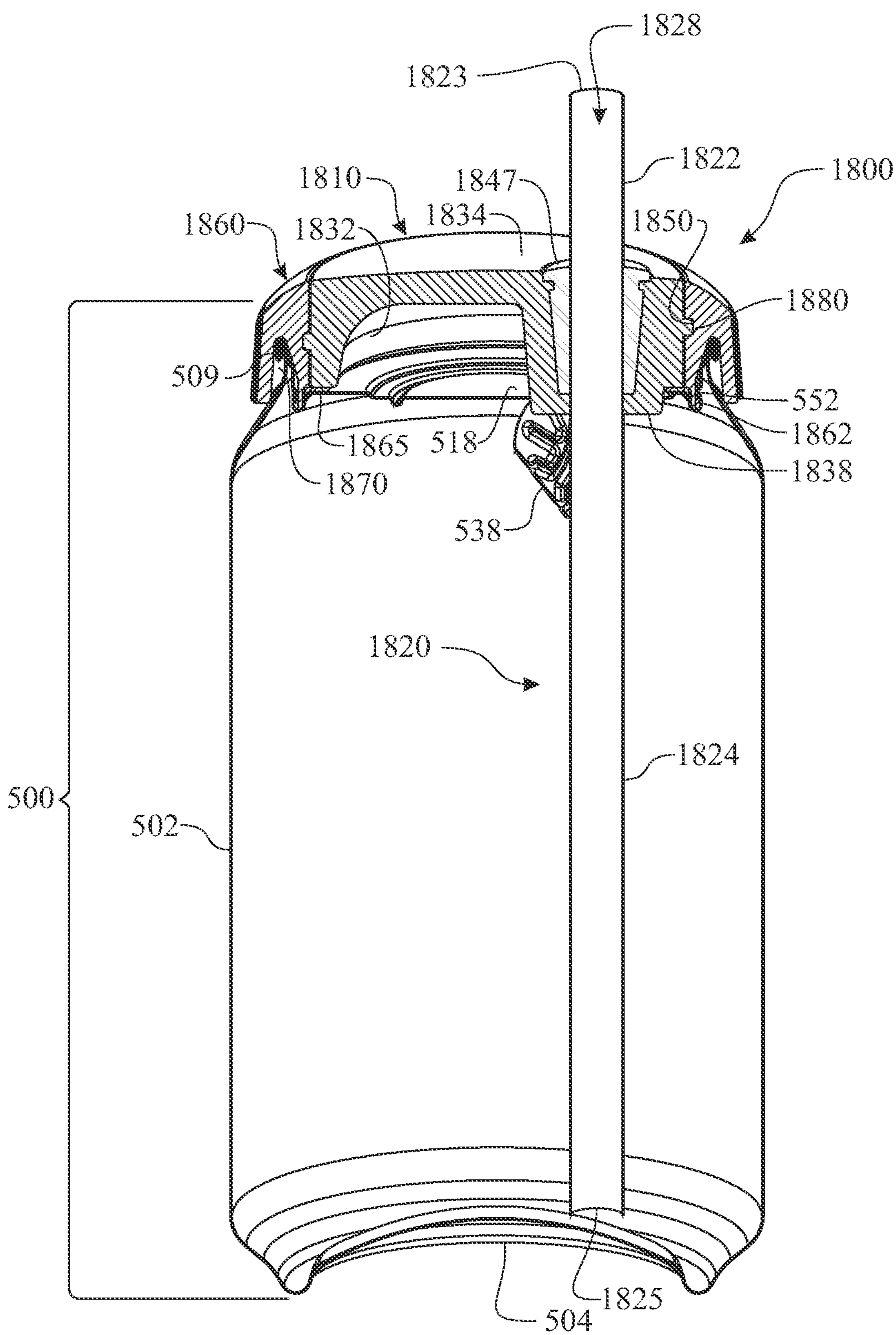
Figure 182:
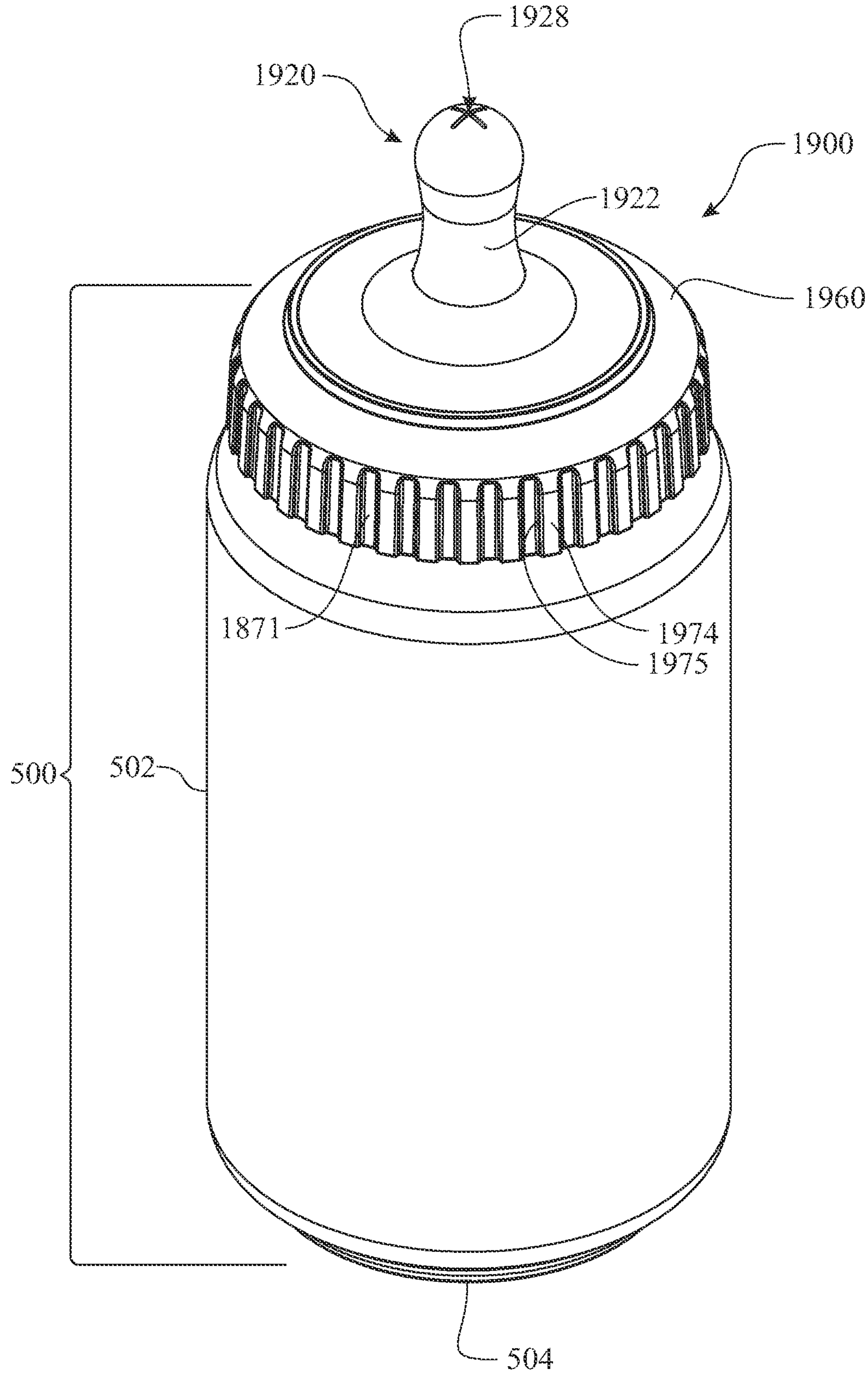
Figure 183:
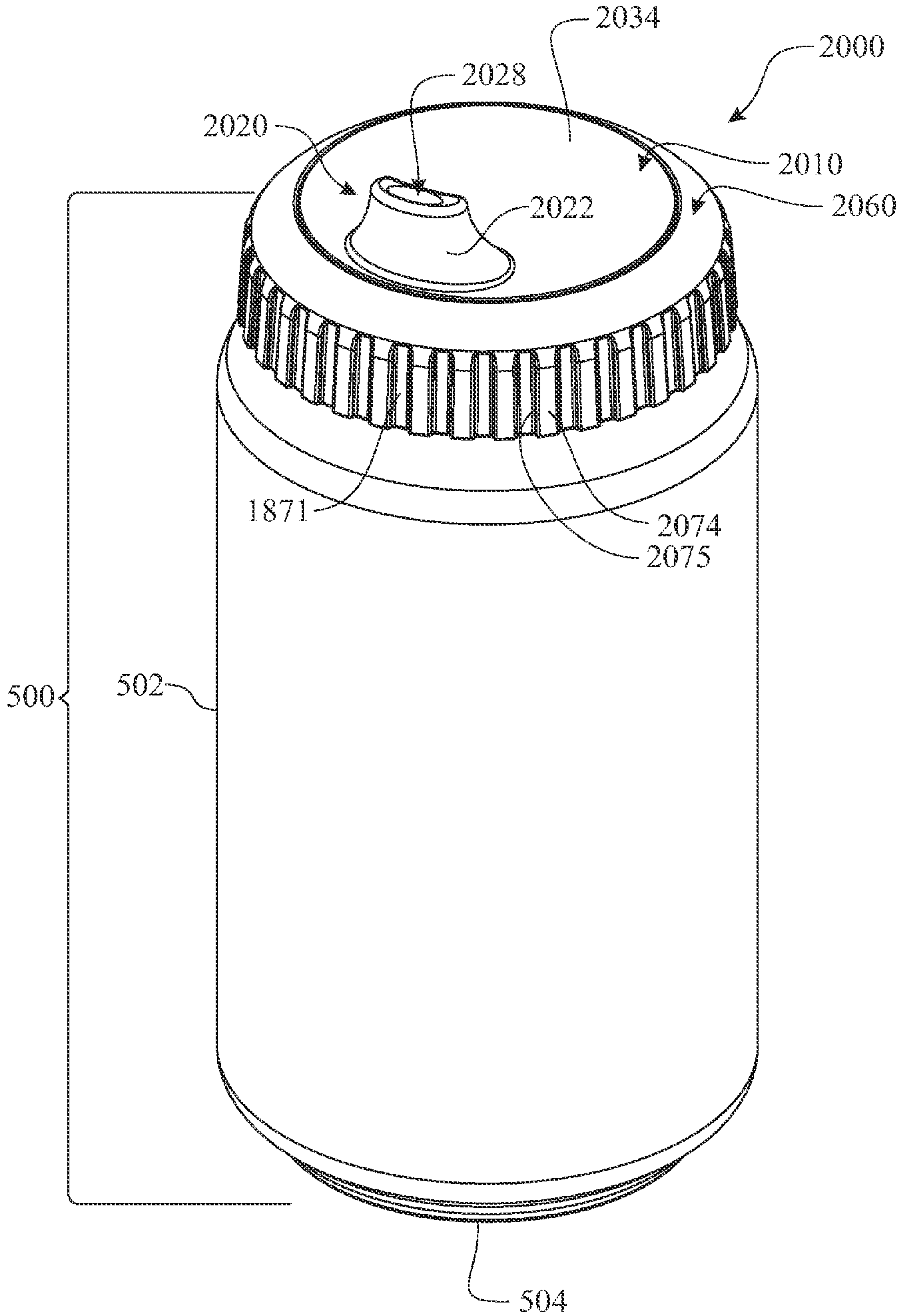
Figure 184:
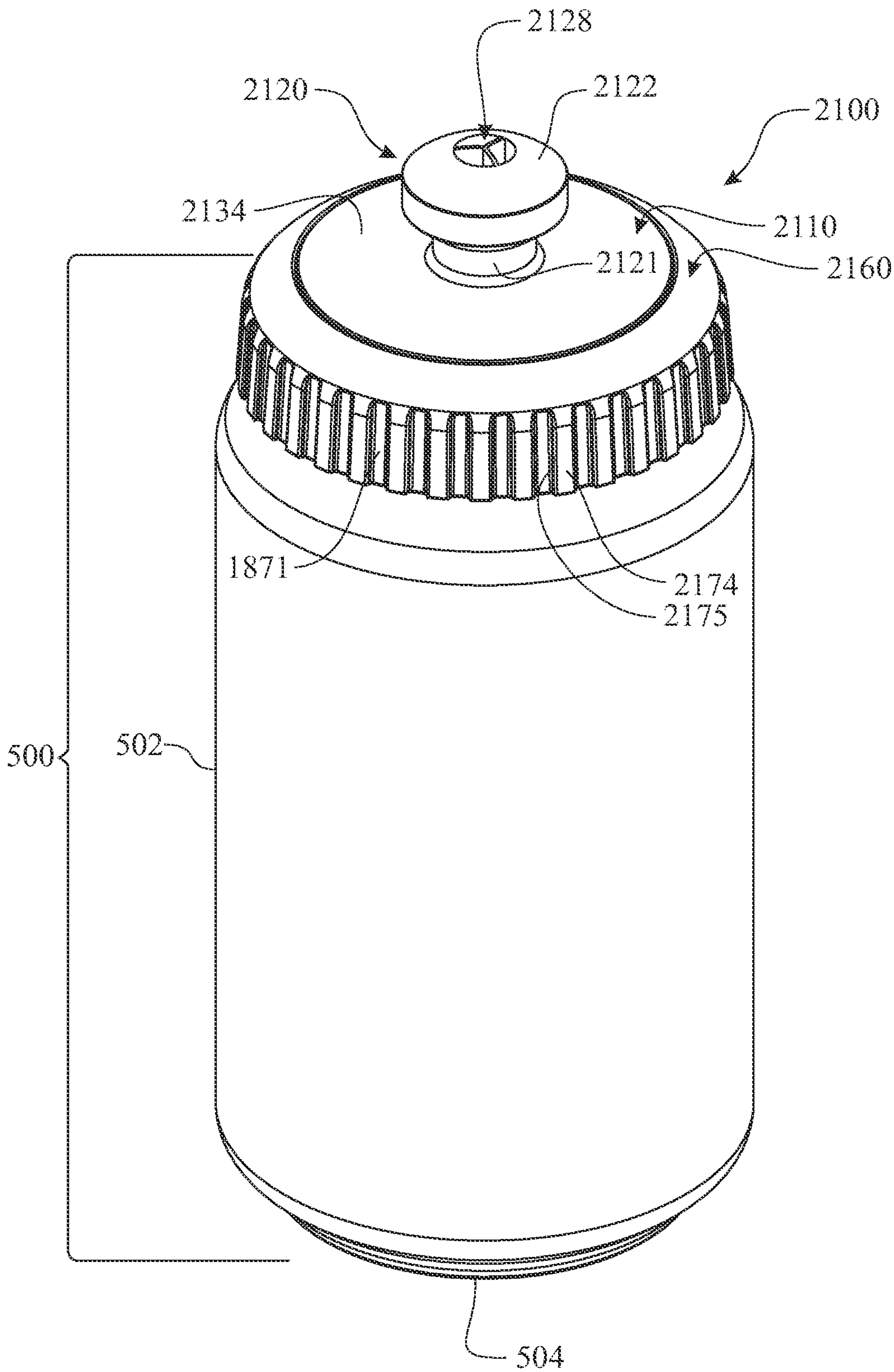
Figure 185:
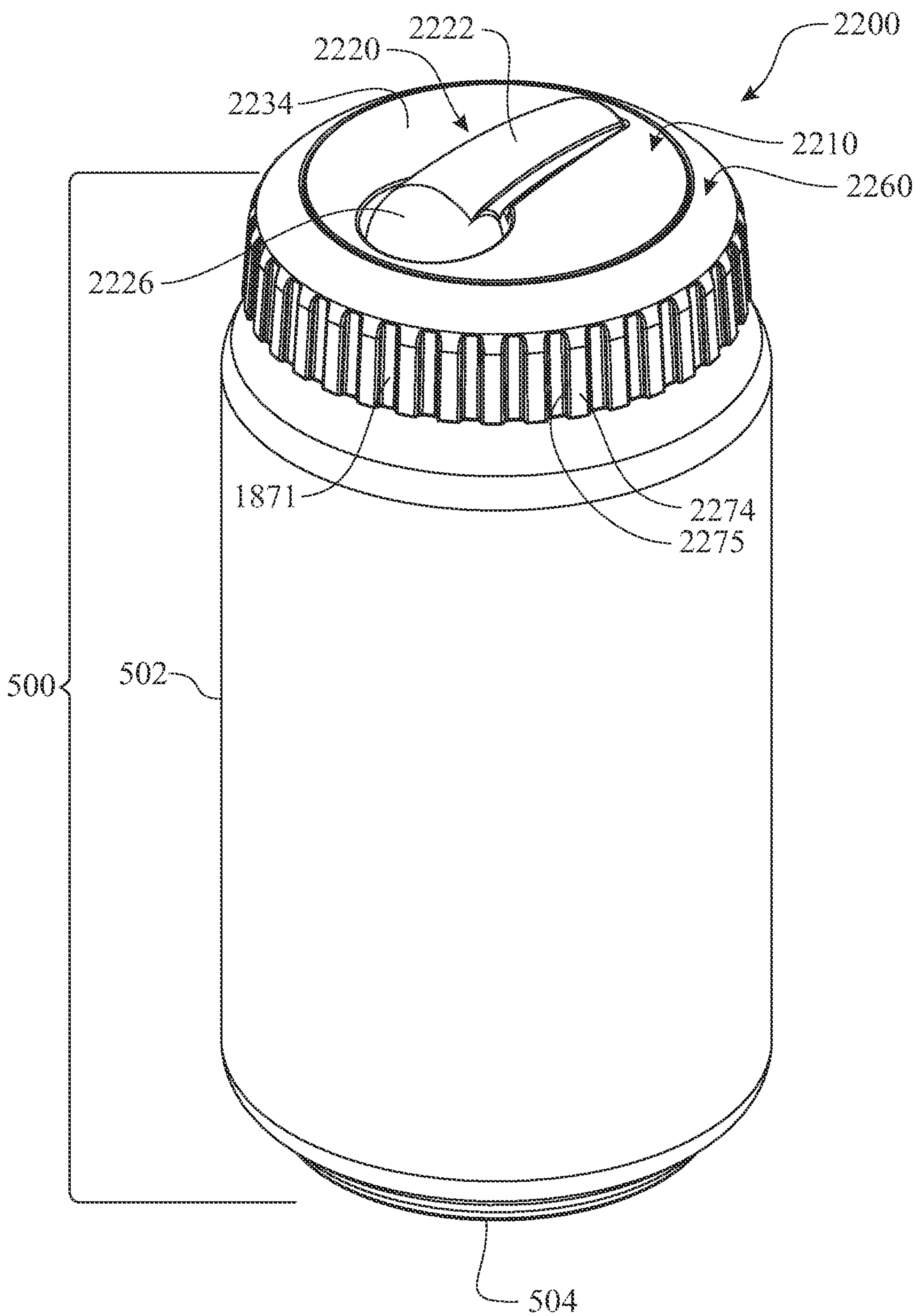
Figure 186:
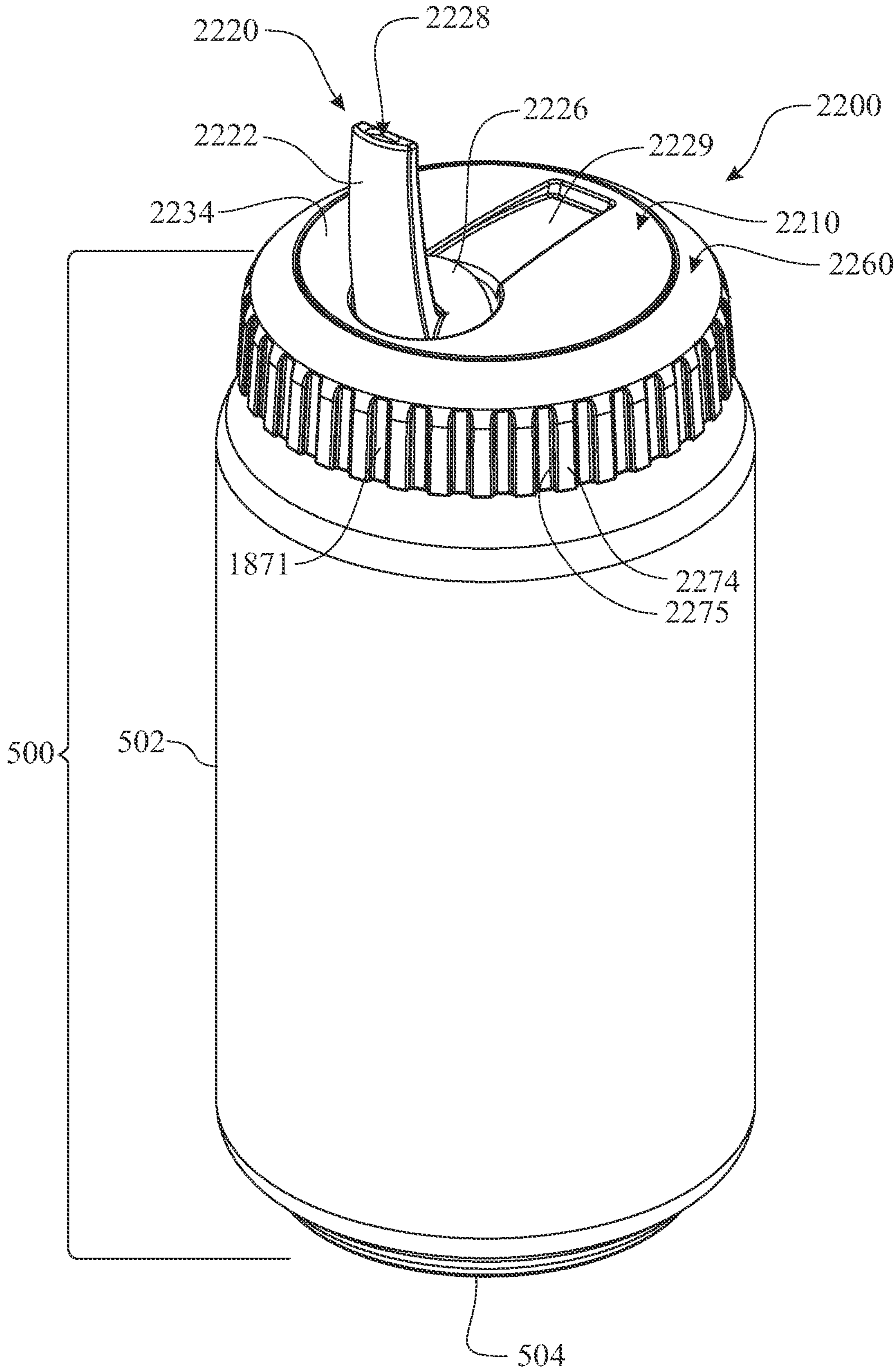
Figure 187:
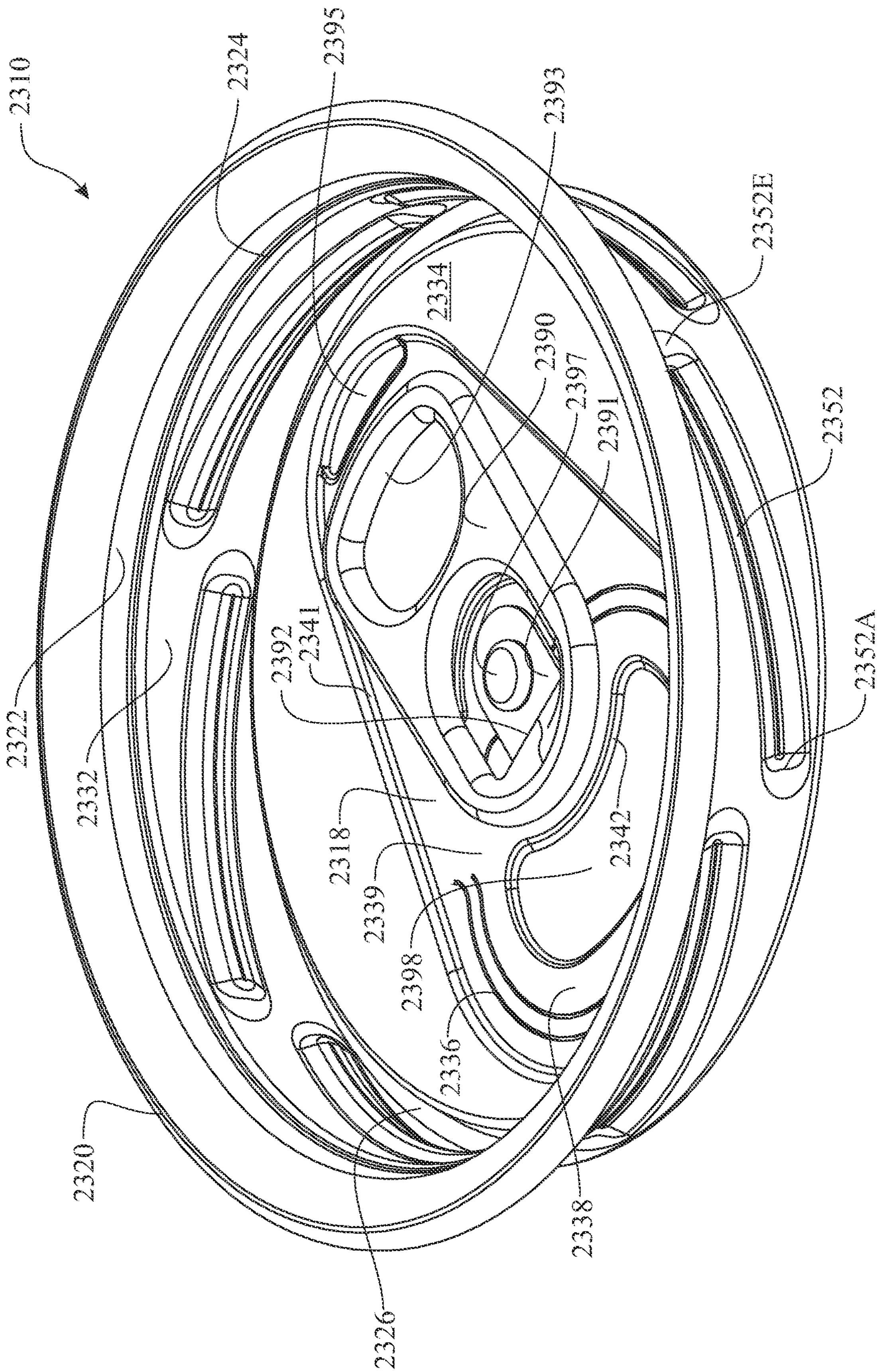
Figure 188:
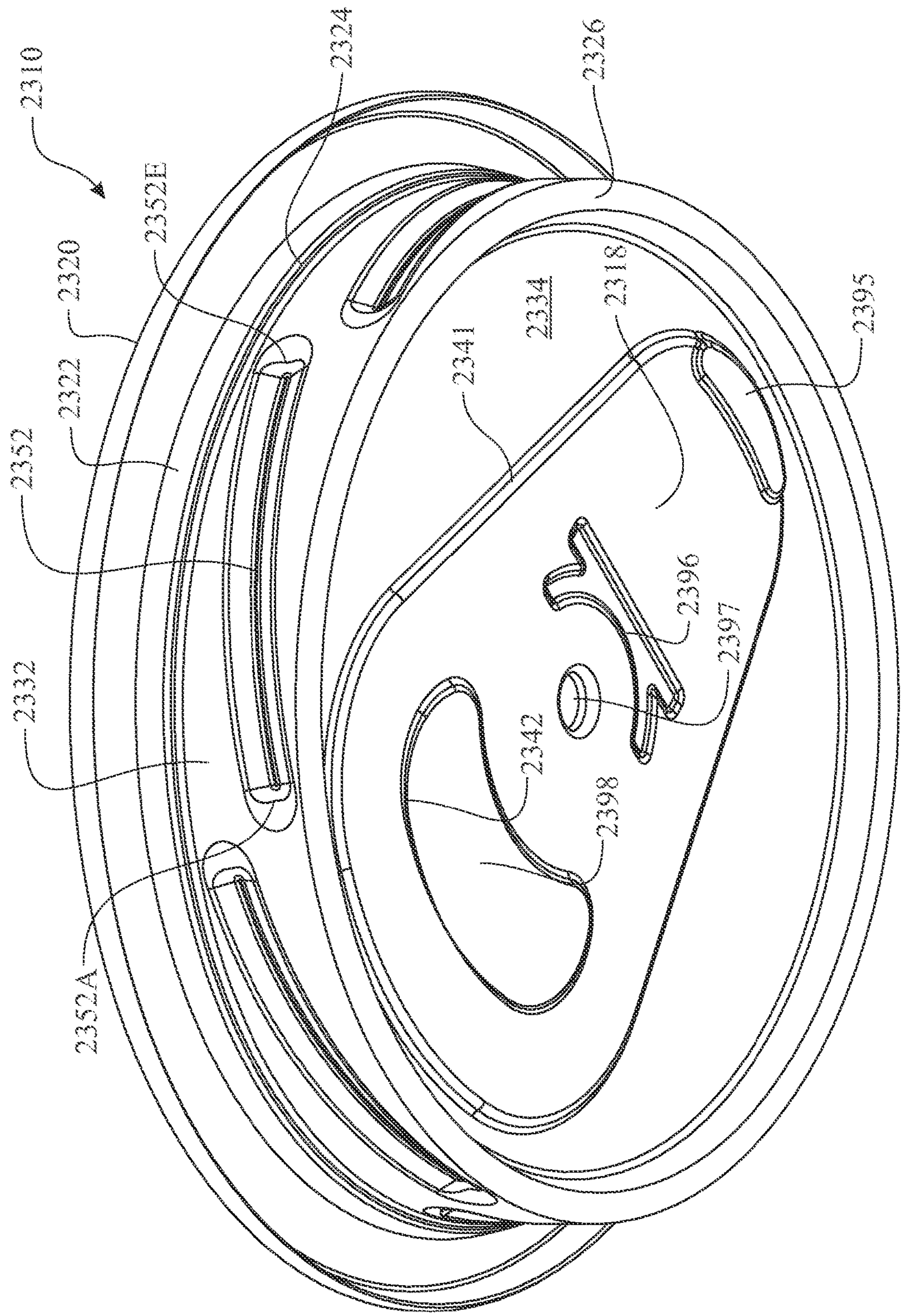
Figure 189:
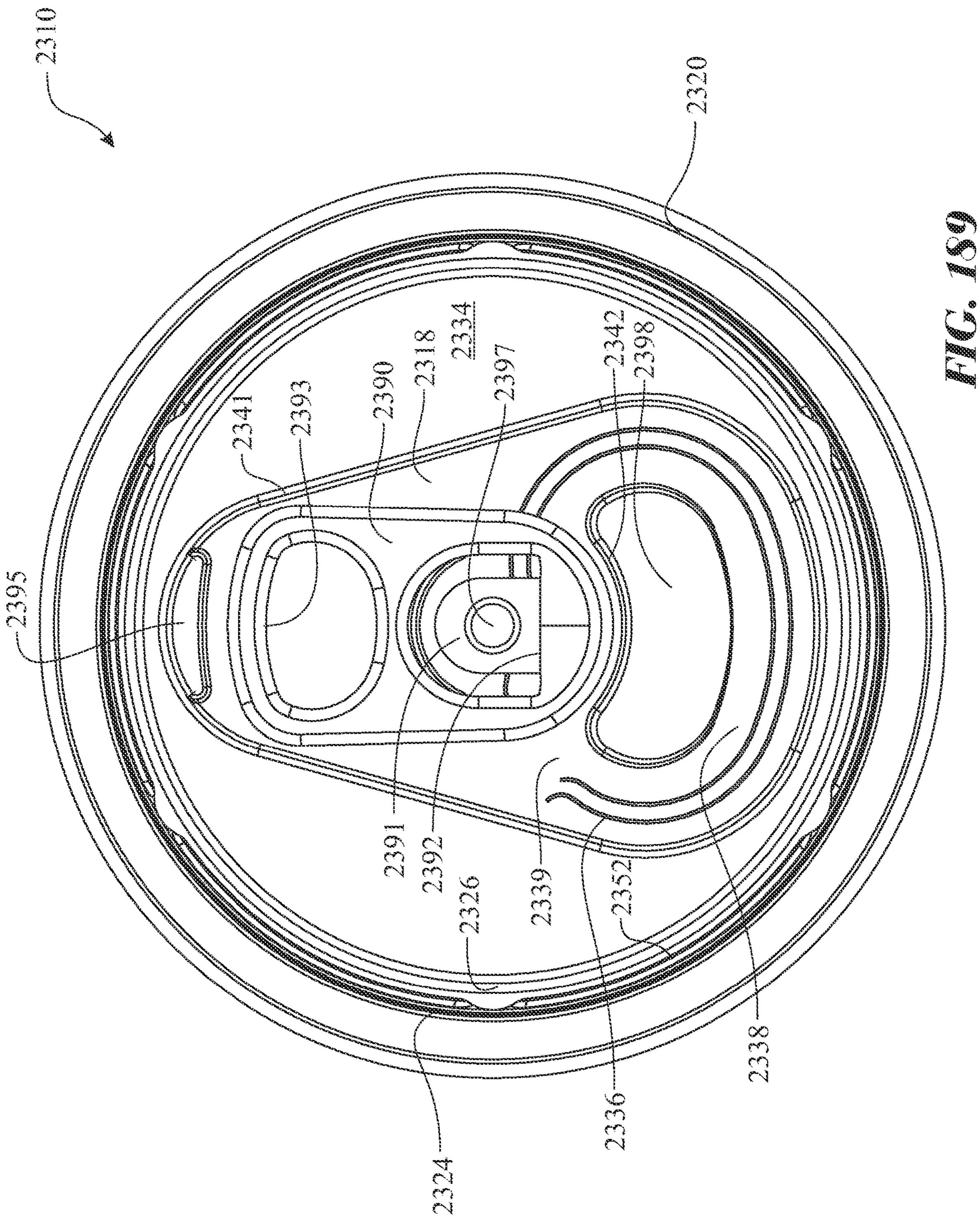
Figure 190:
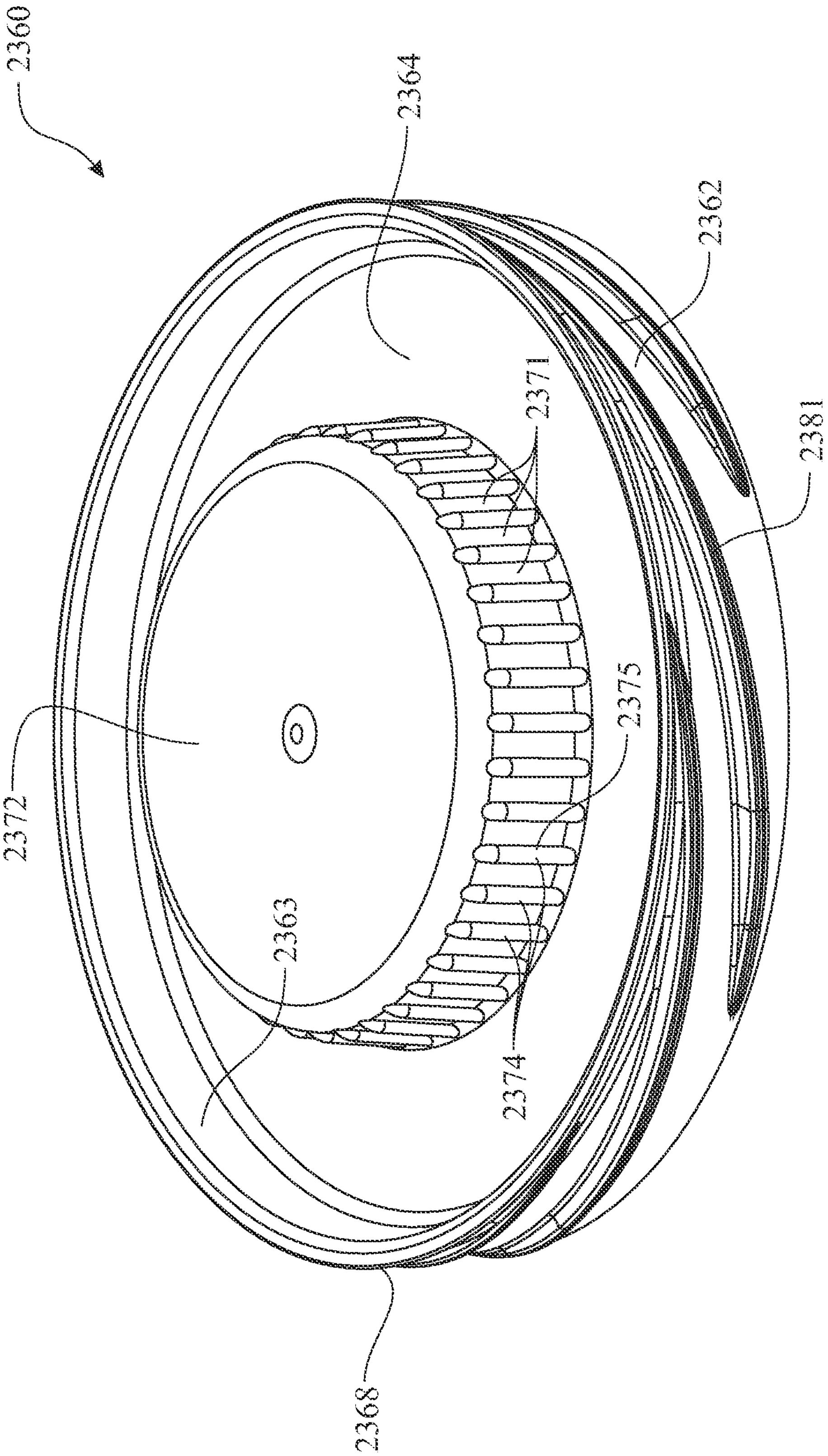
Figure 191:
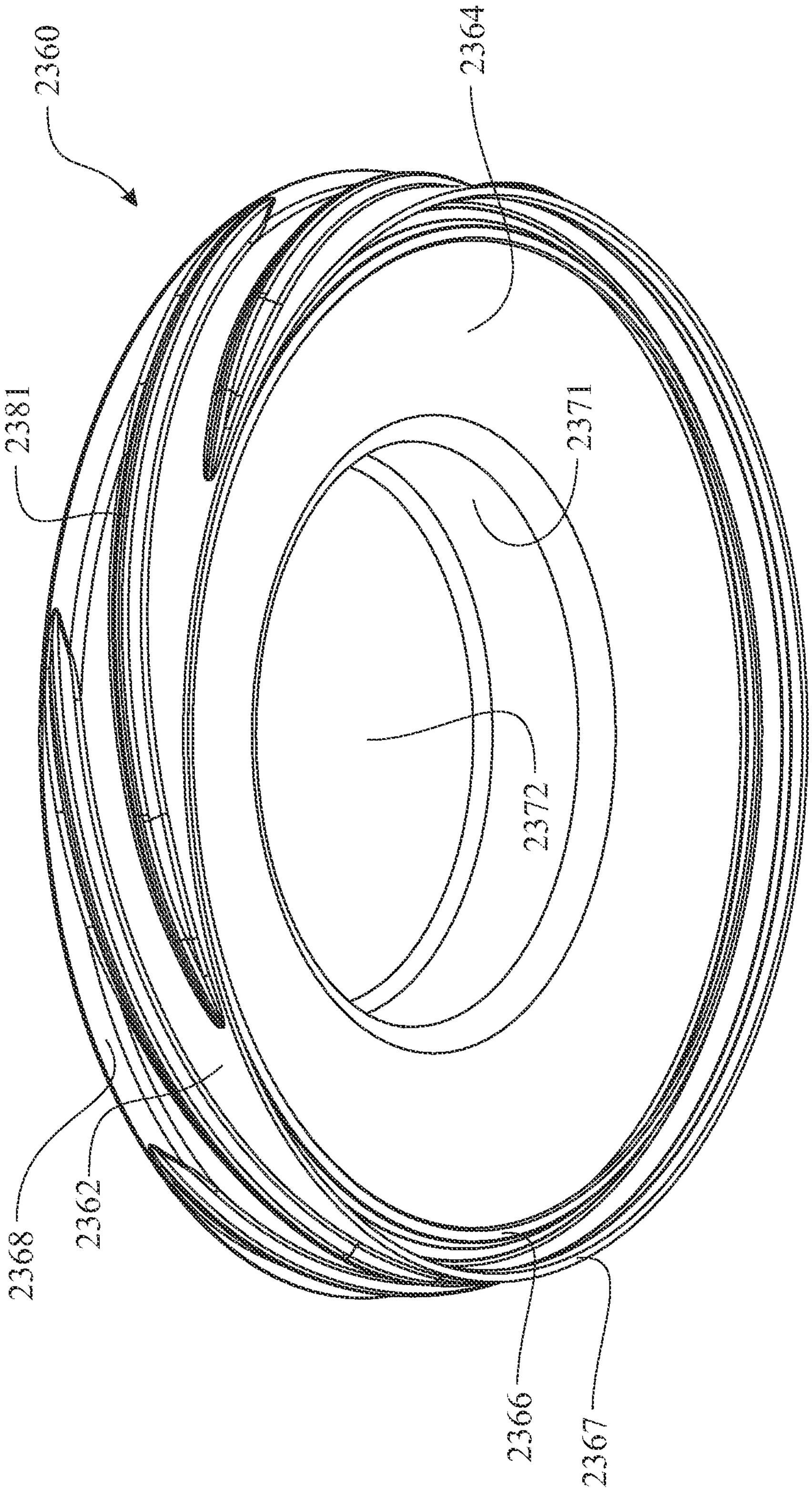
Figure 192:
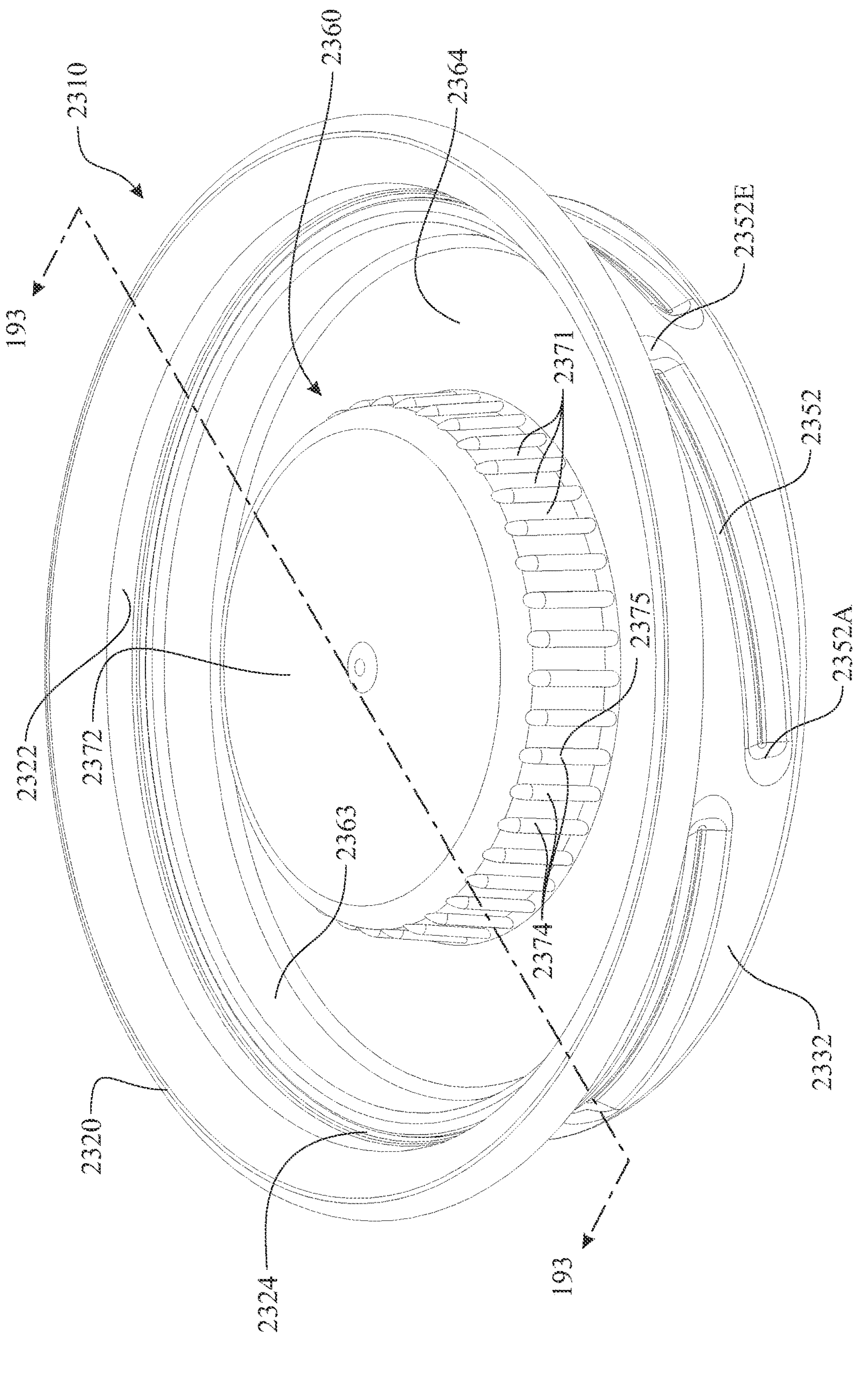
Figure 193:
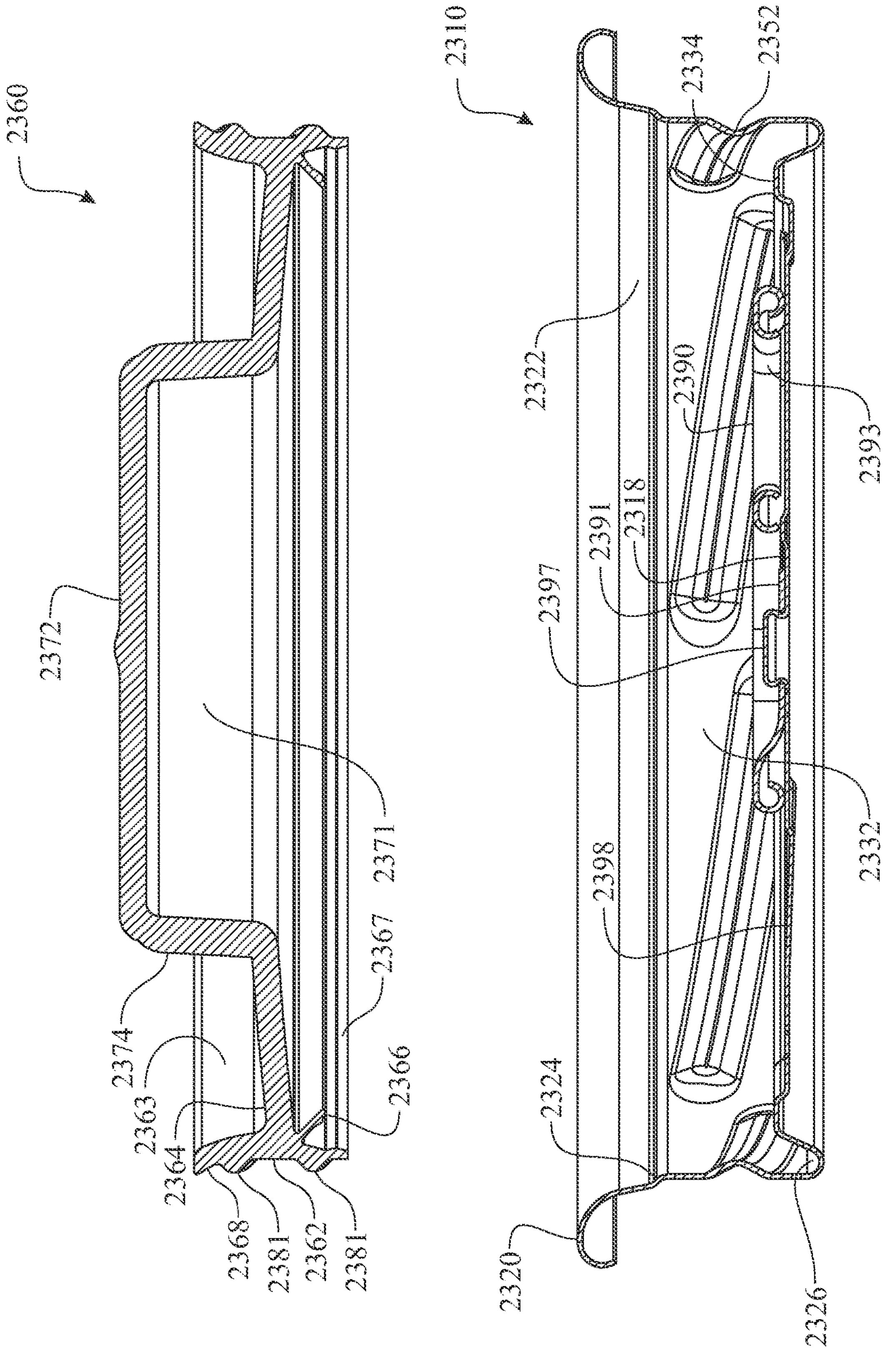
Figure 194:
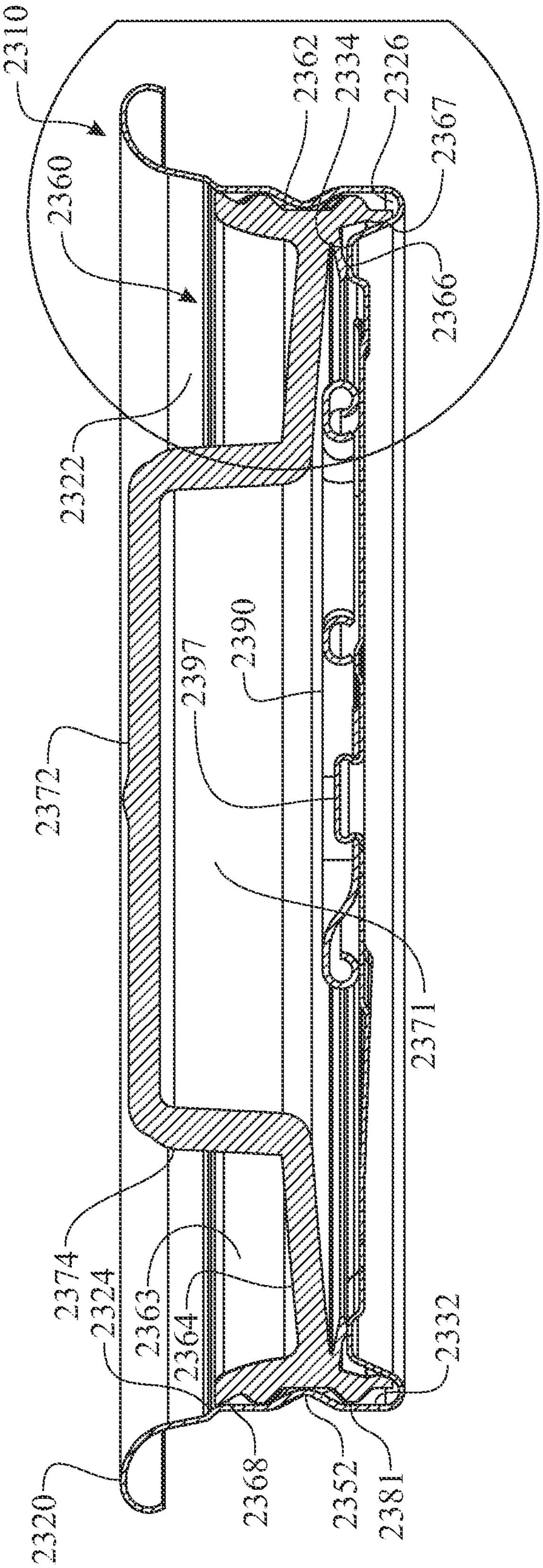
Figure 195:
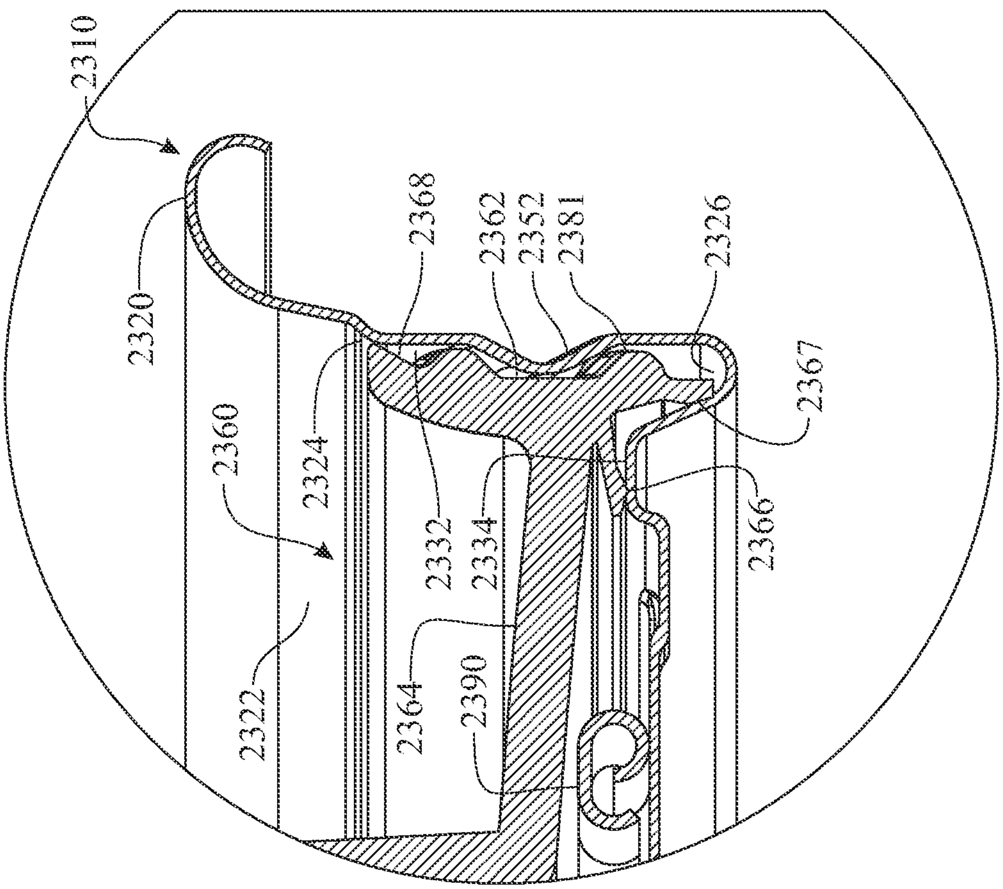
Figure 196:
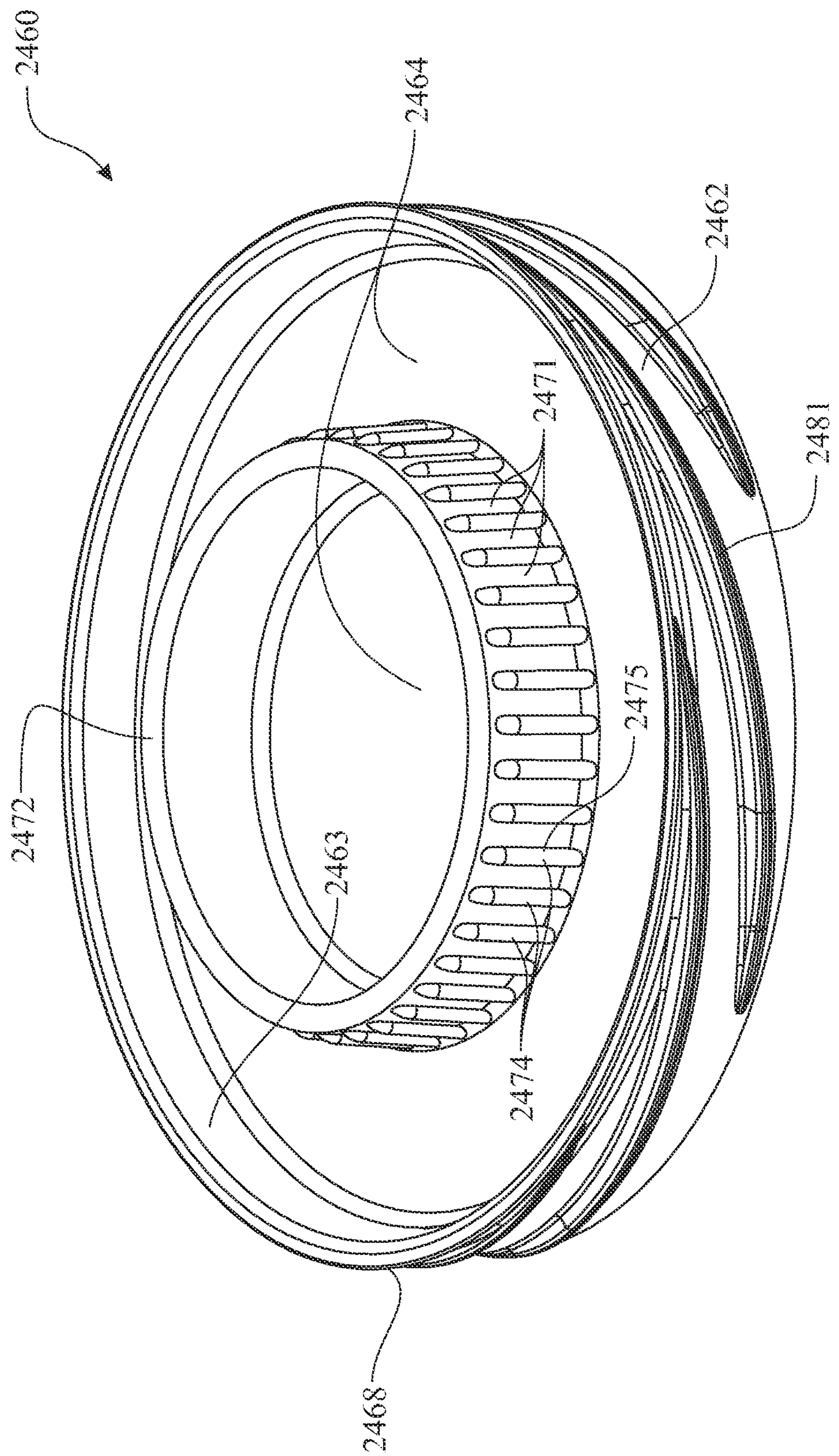
Figure 197:
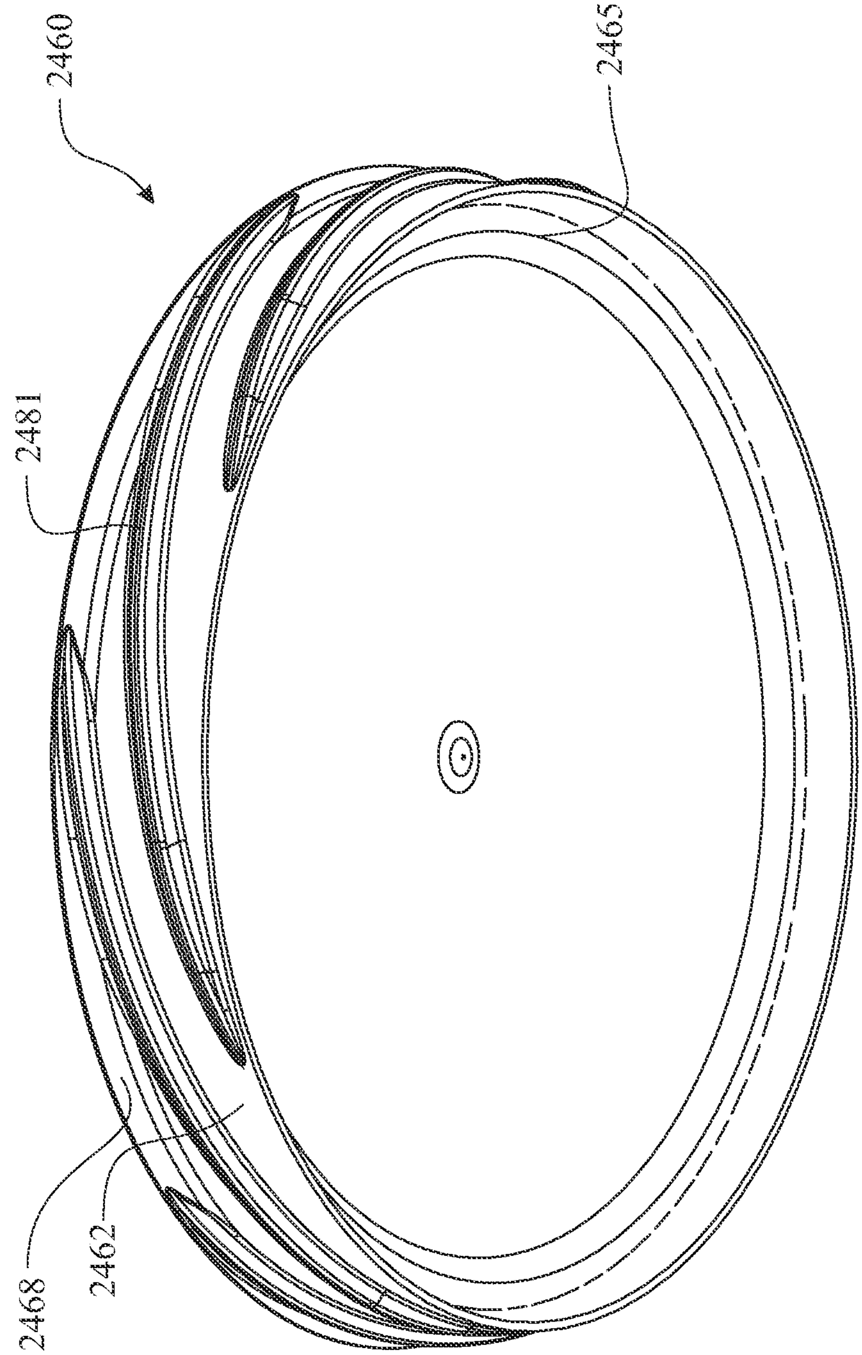
Figure 19S:
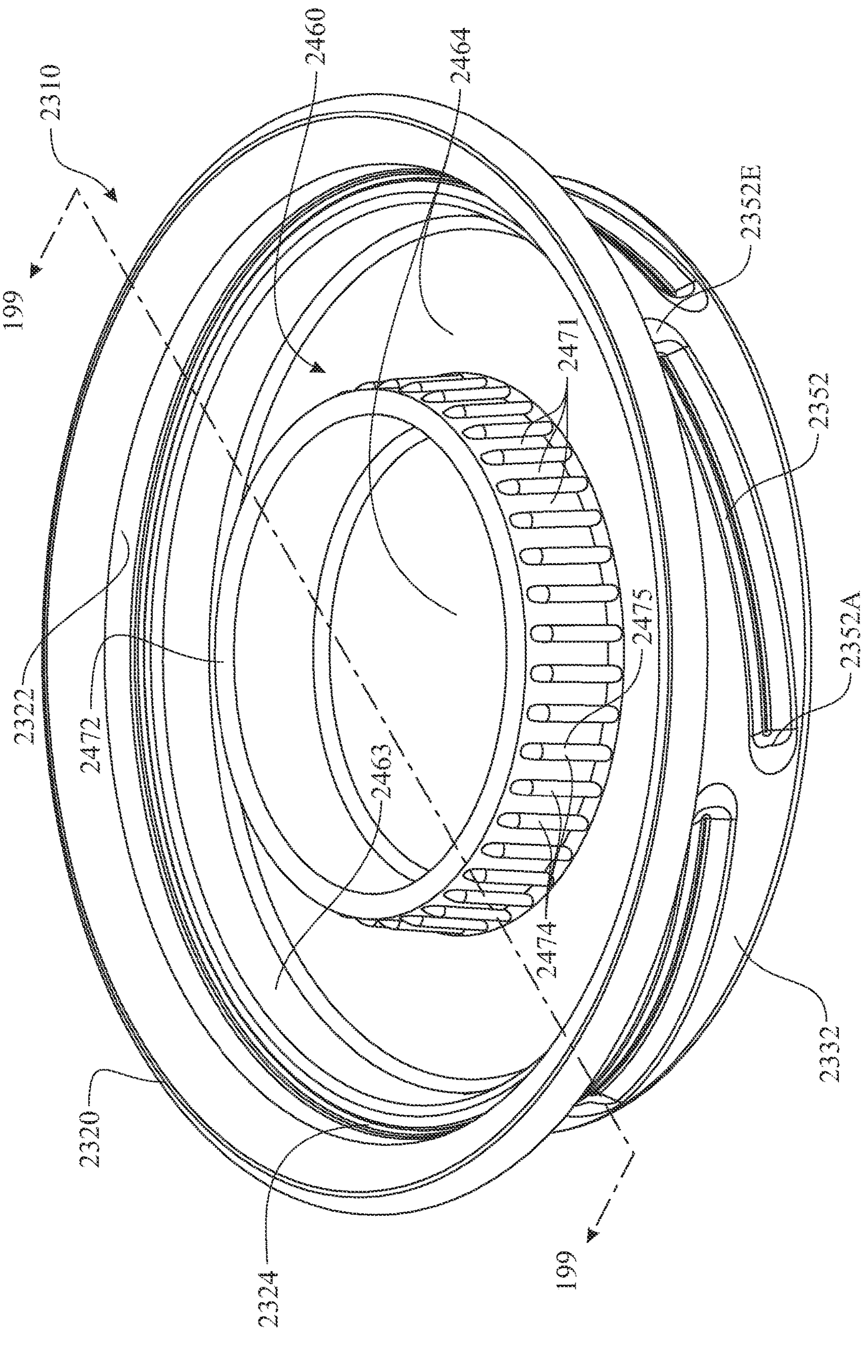
Figure 199:
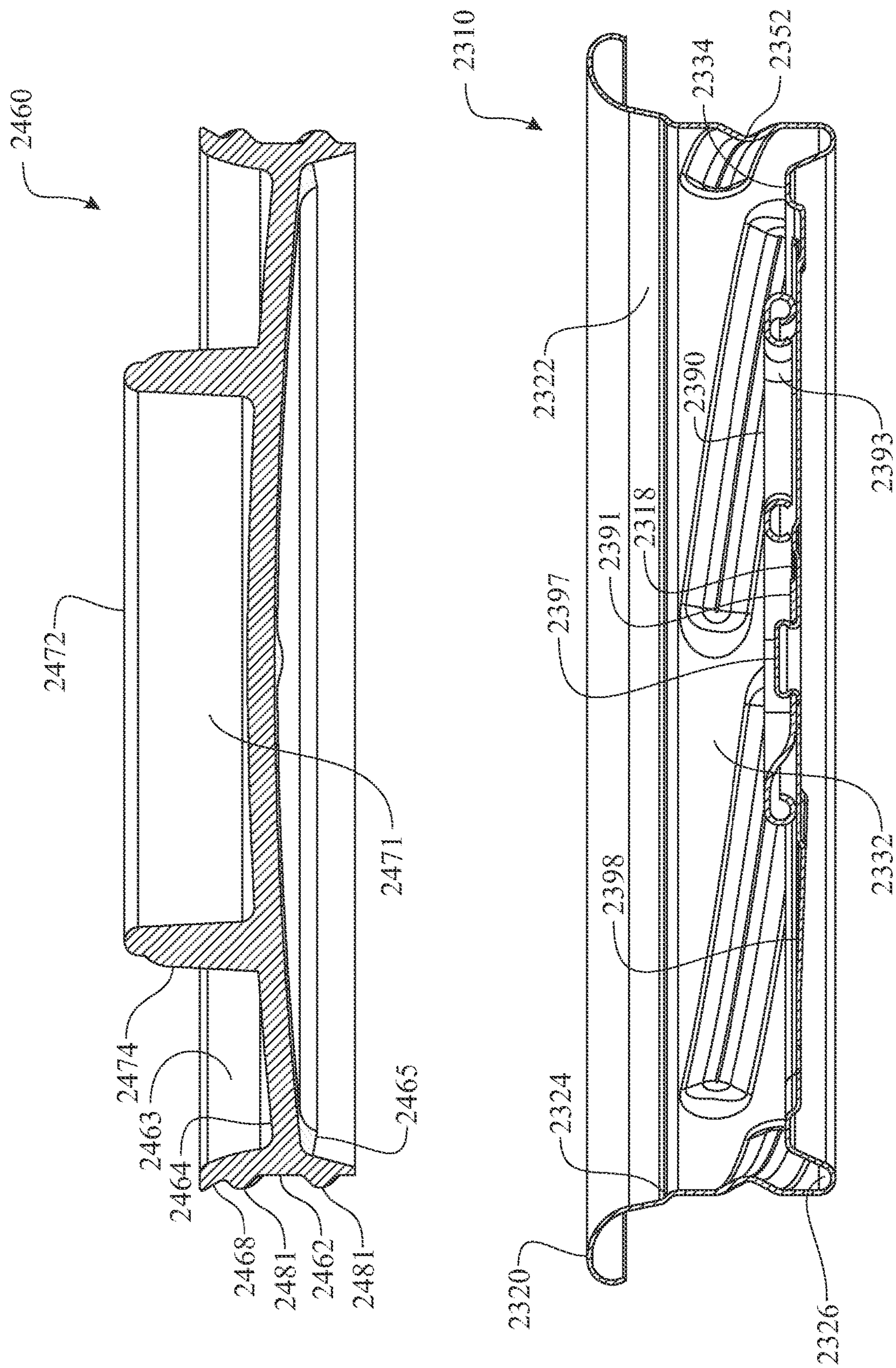
Figure 200:
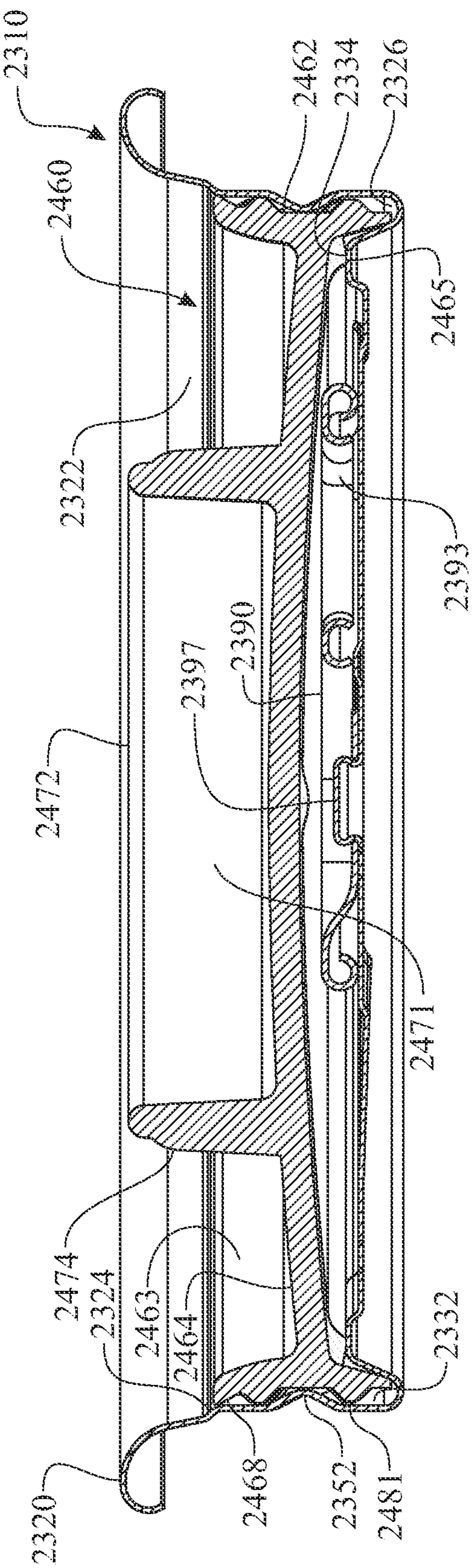
Figure 201:
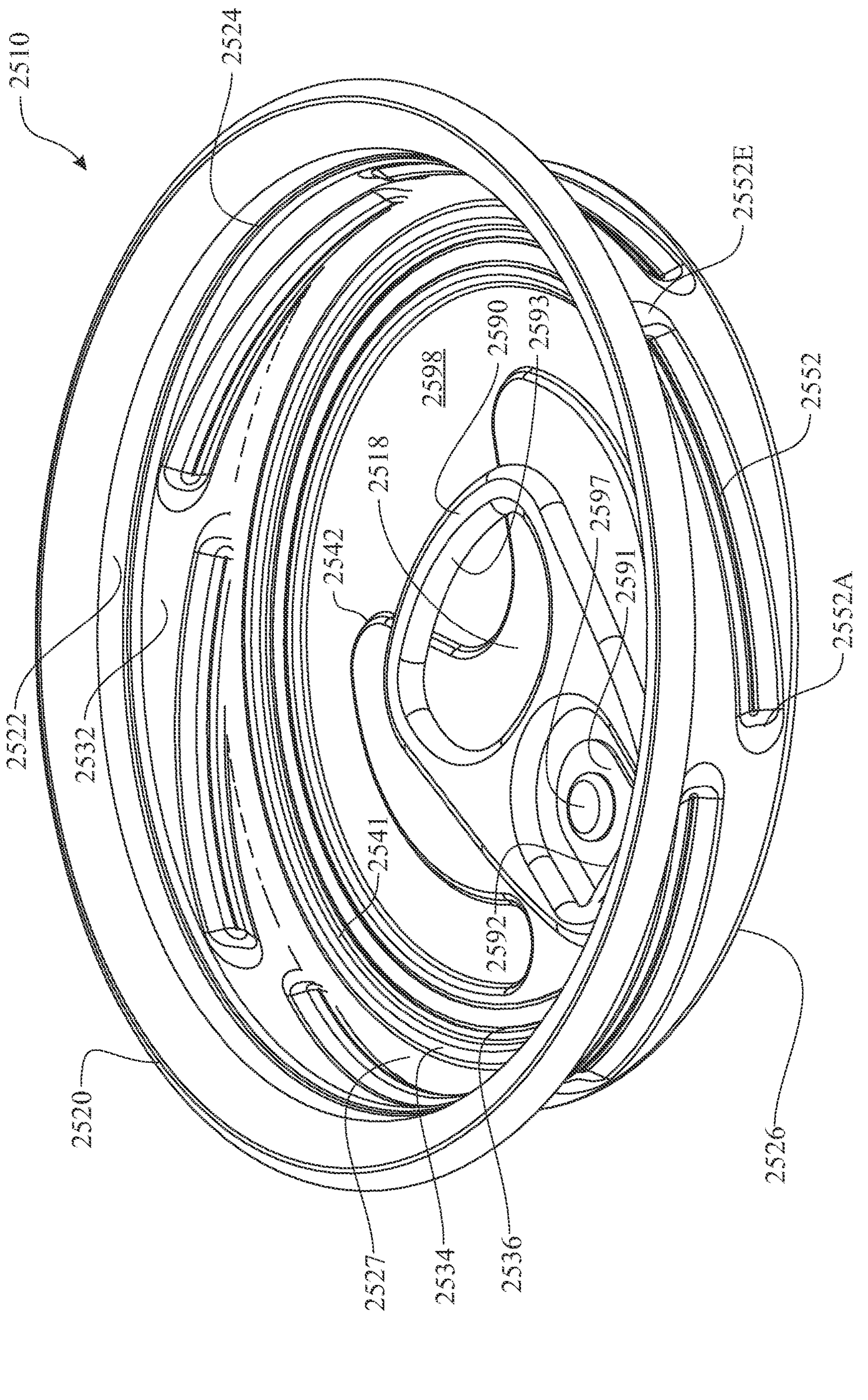
Figure 202:
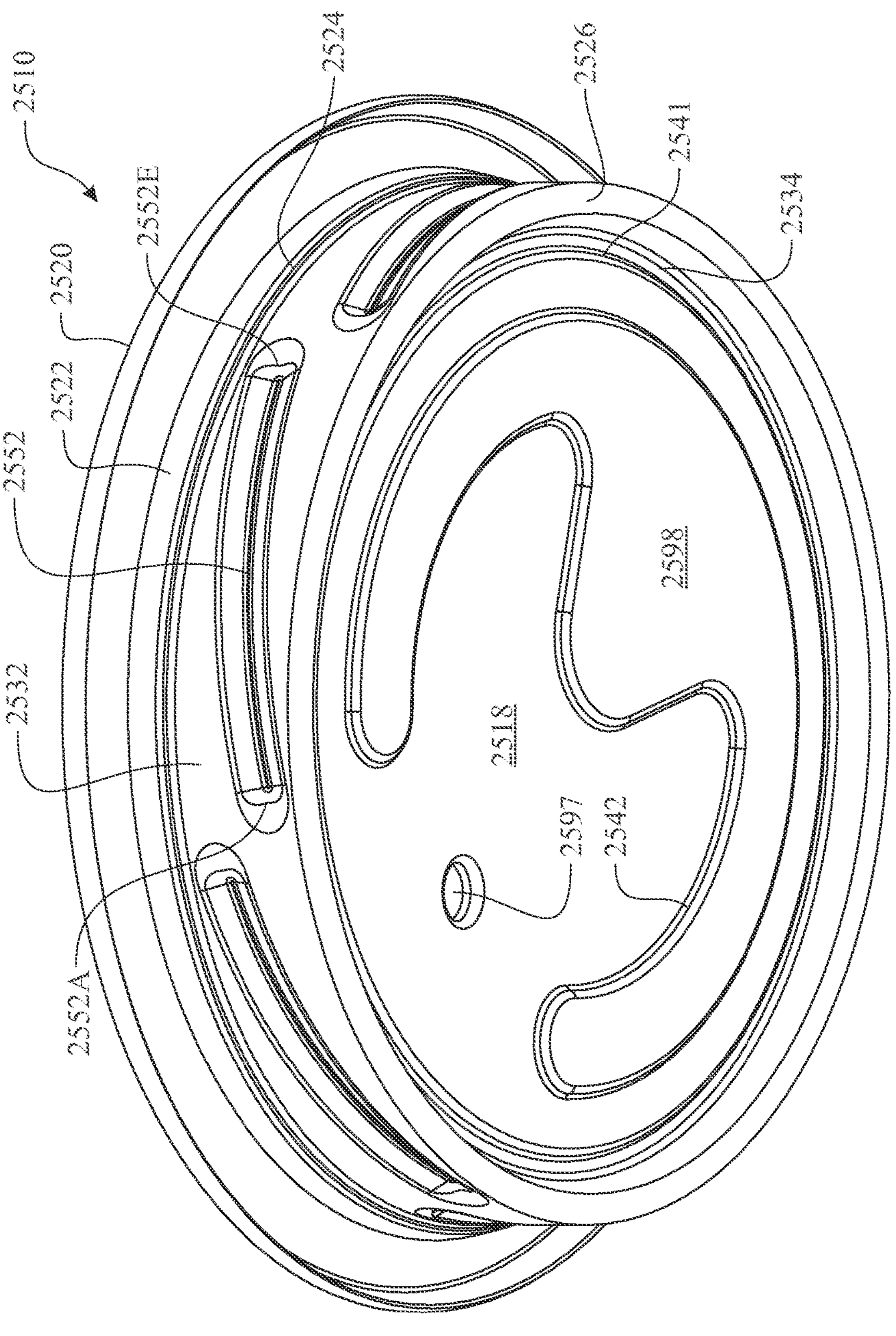
Figure 203:
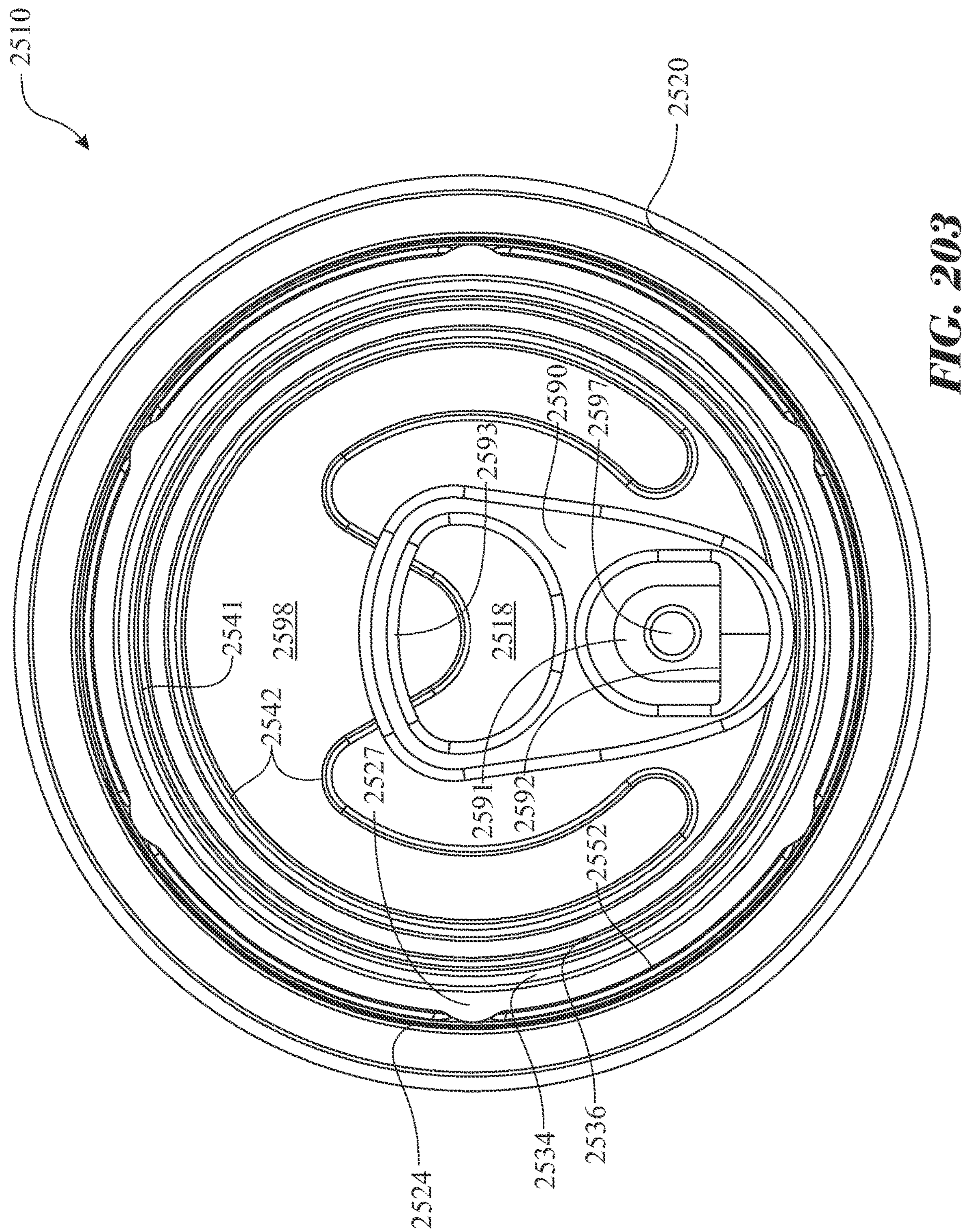
Figure 204:
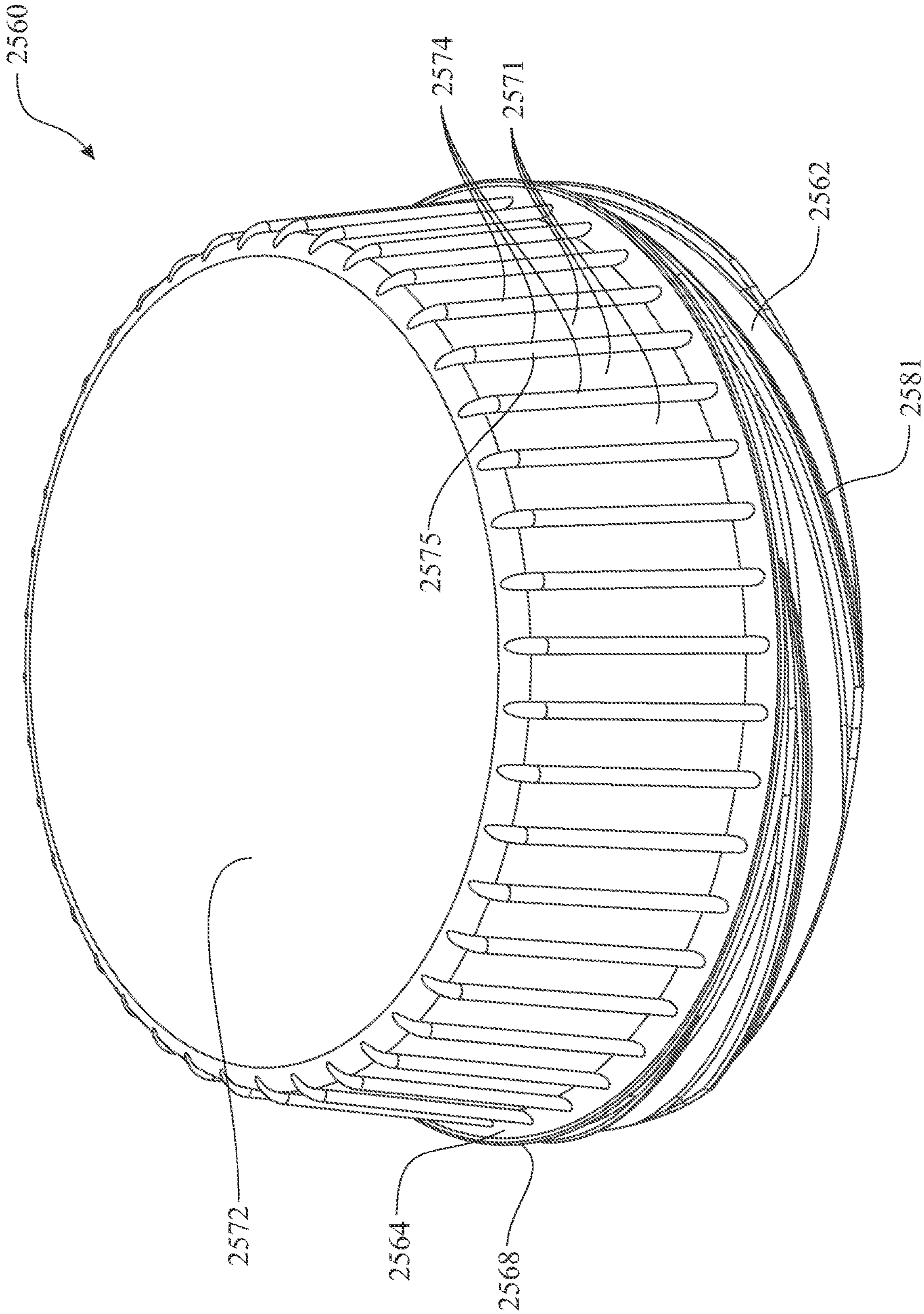
Figure 205:
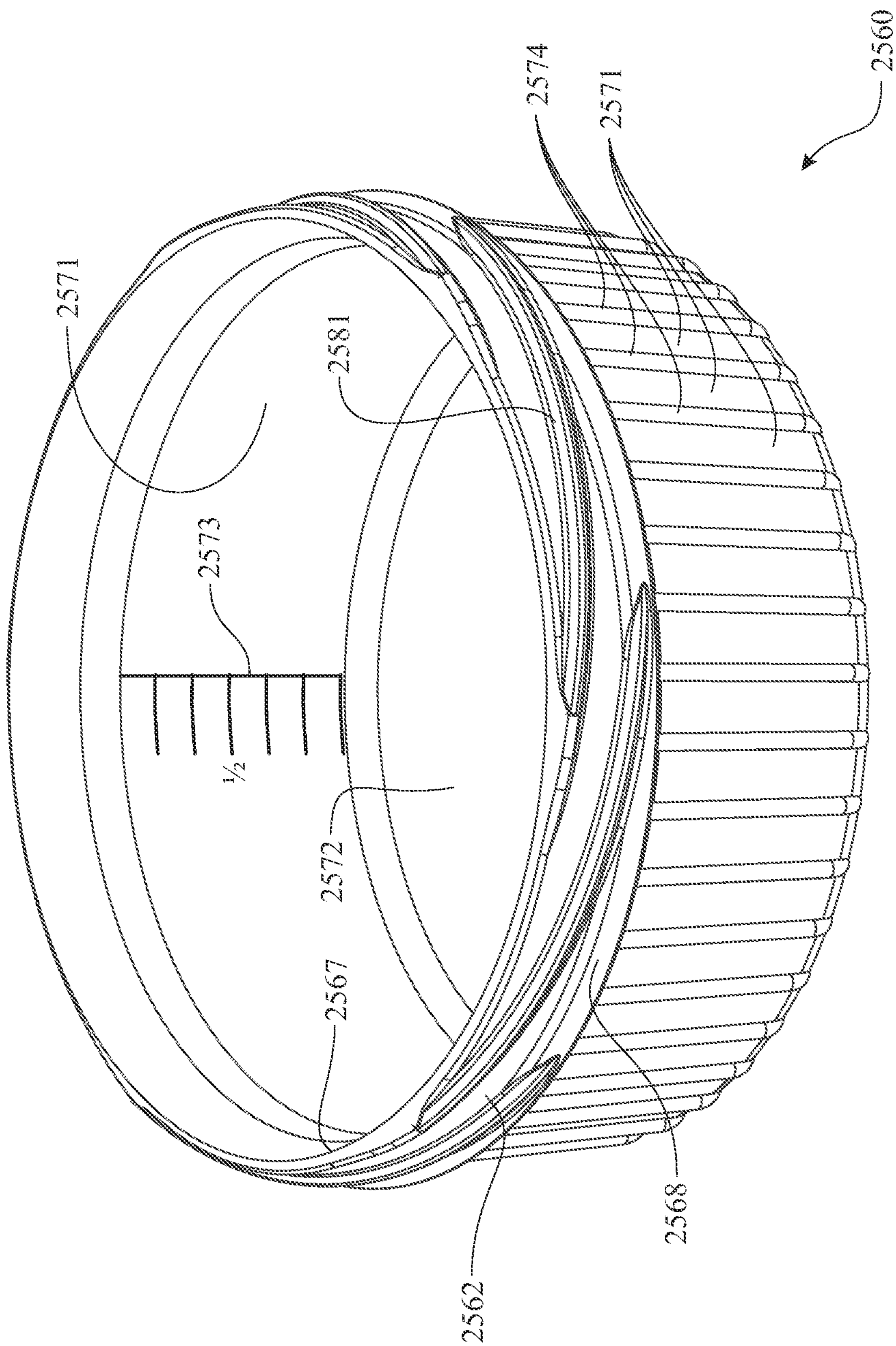
Figure 206:
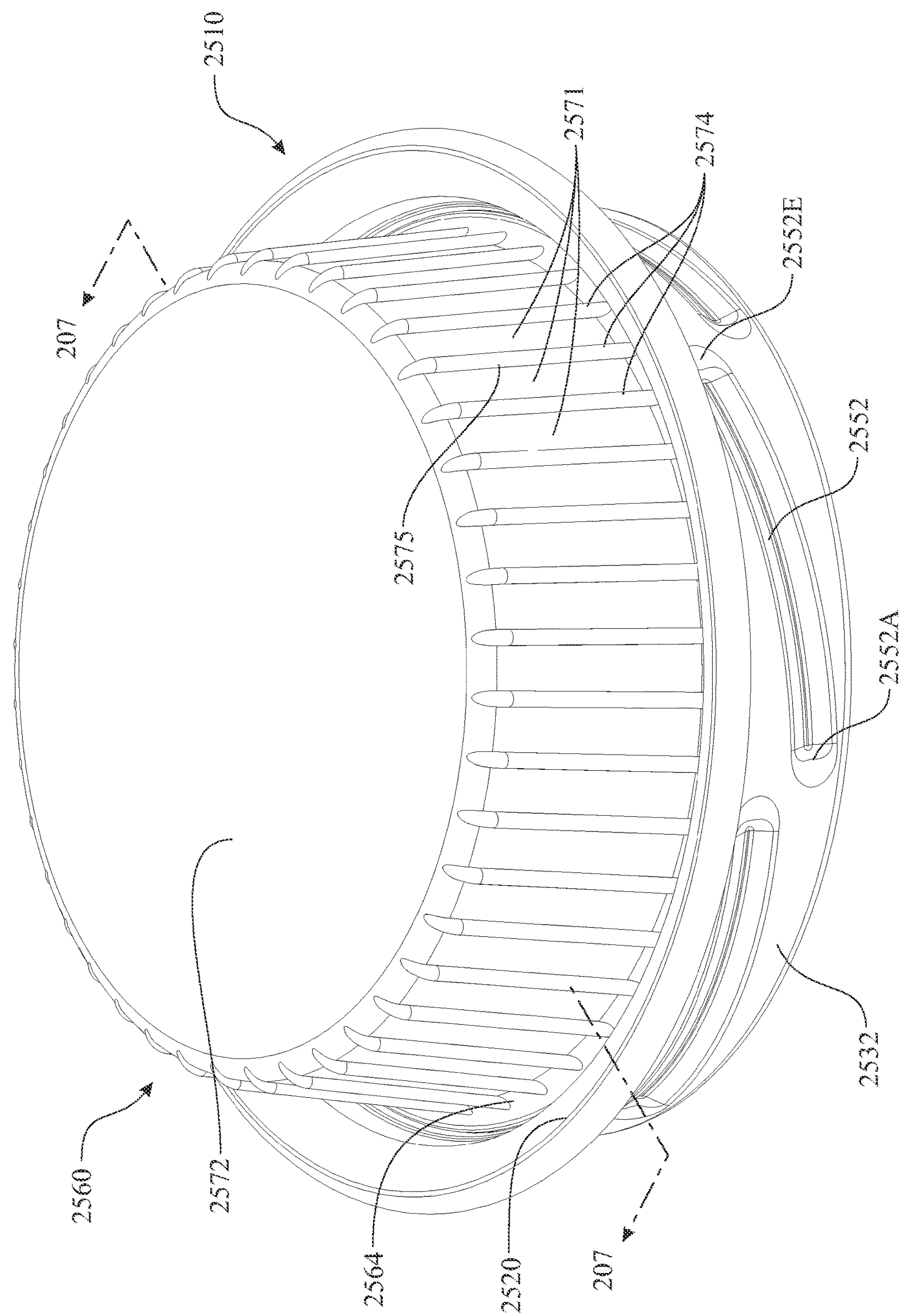
Figure 207:
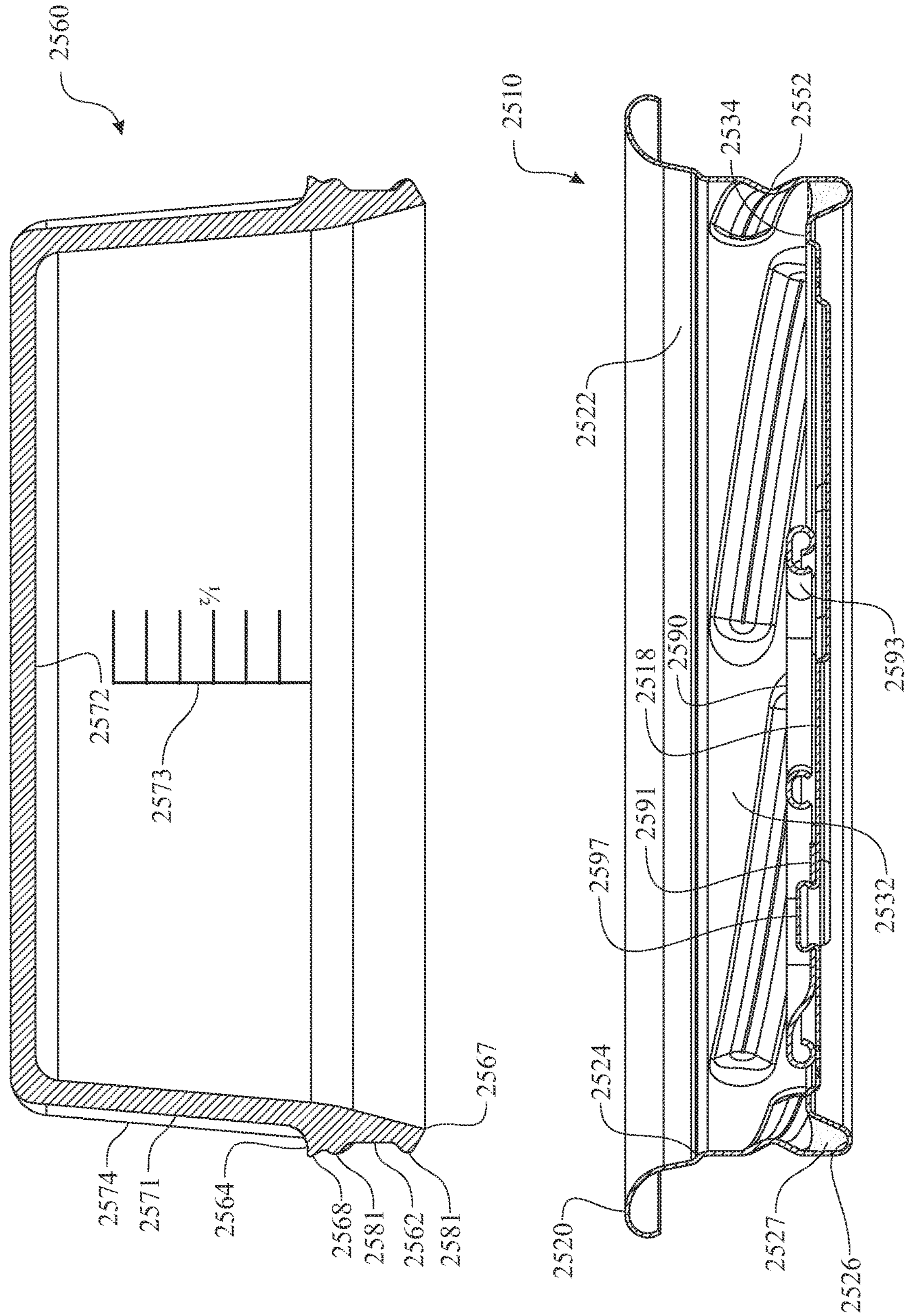
Figure 208:
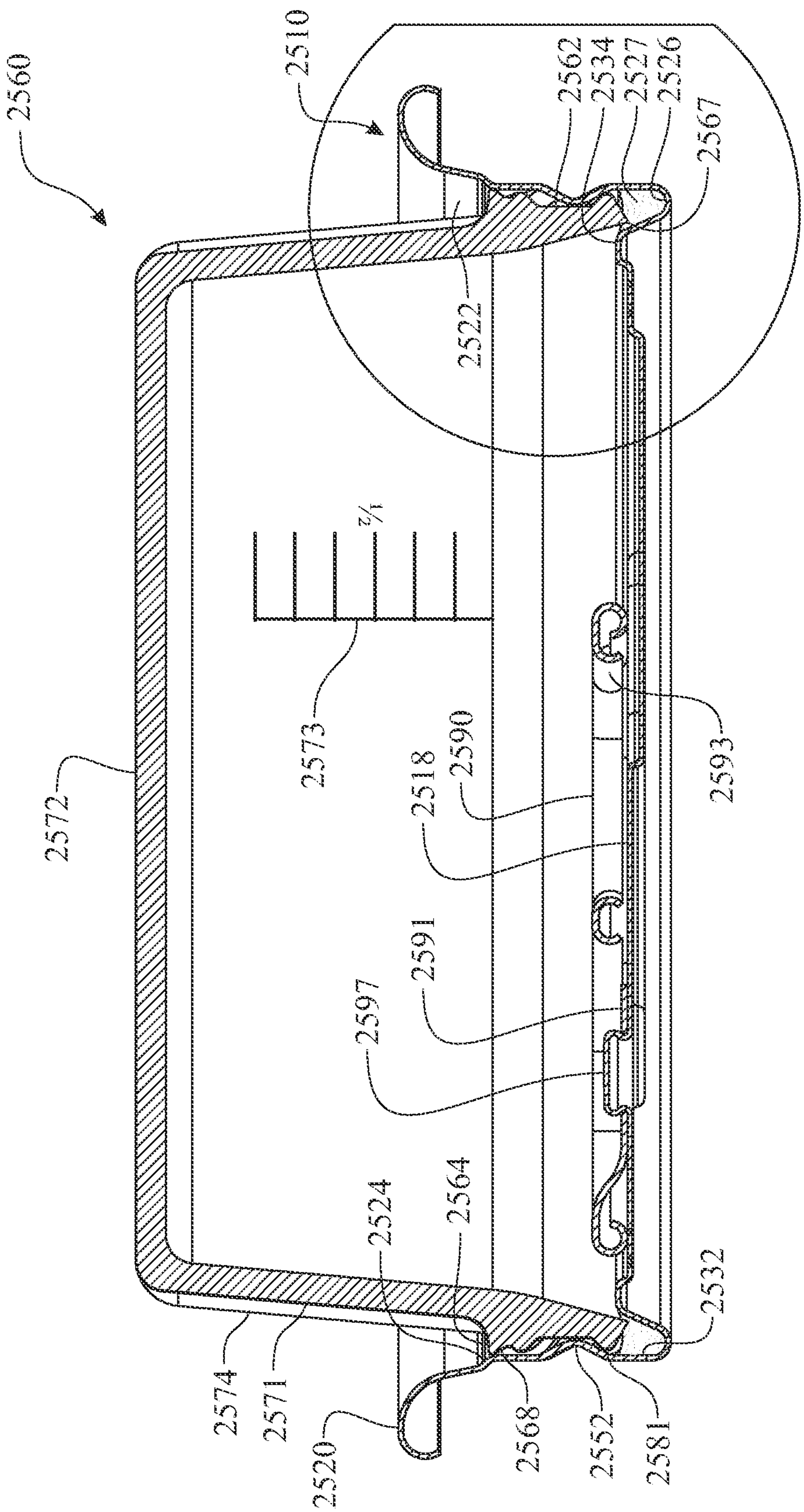
Figure 209:
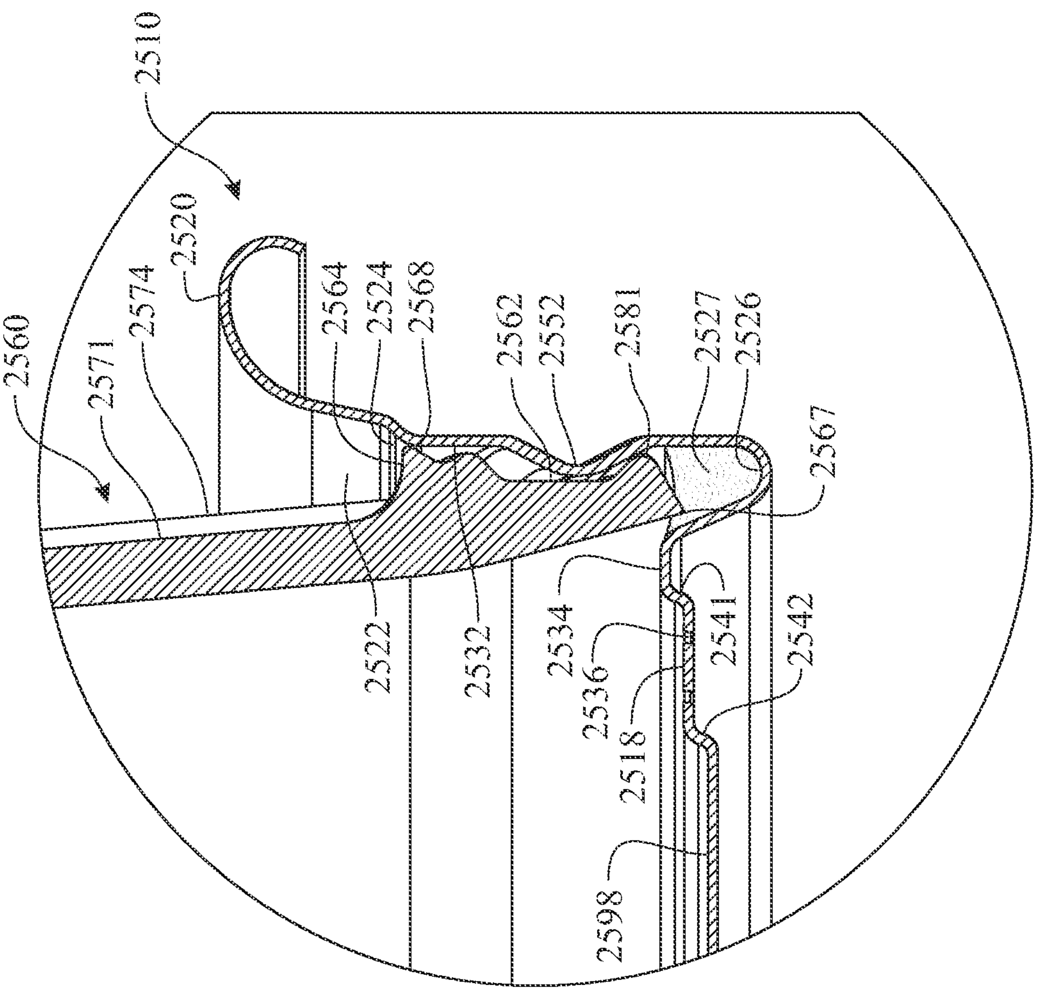
Figure 210:
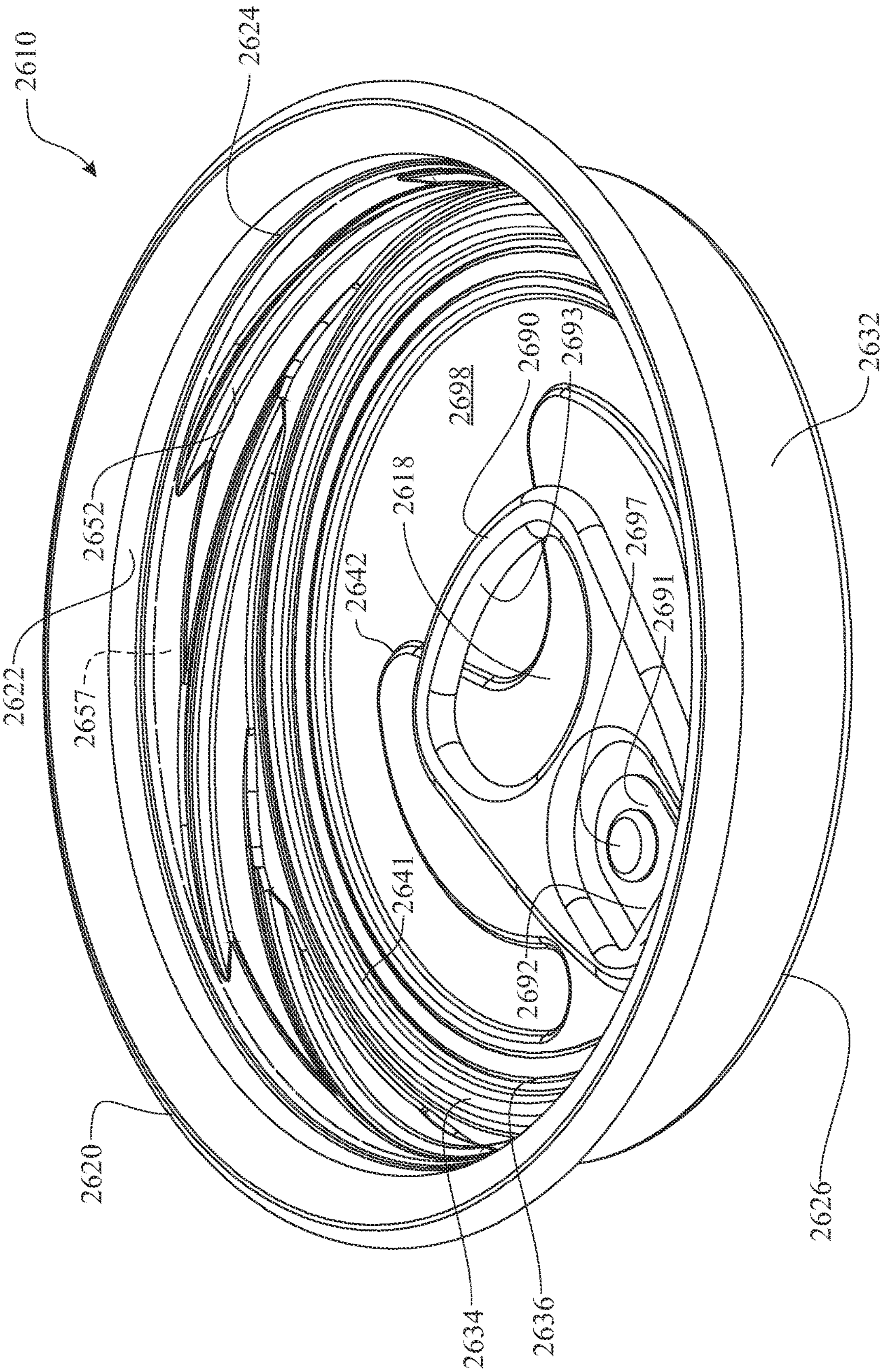
Figure 211:
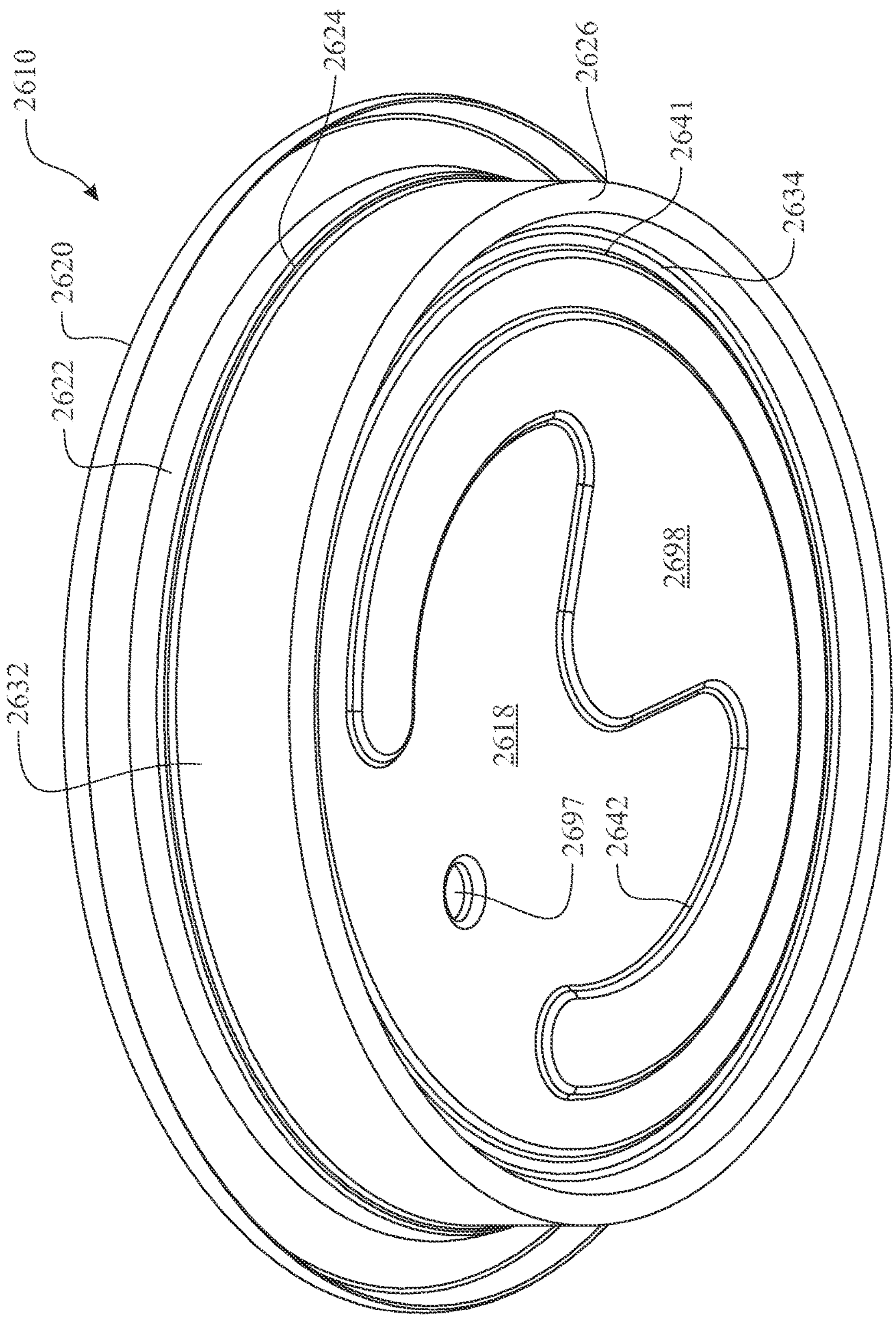
Figure 212:
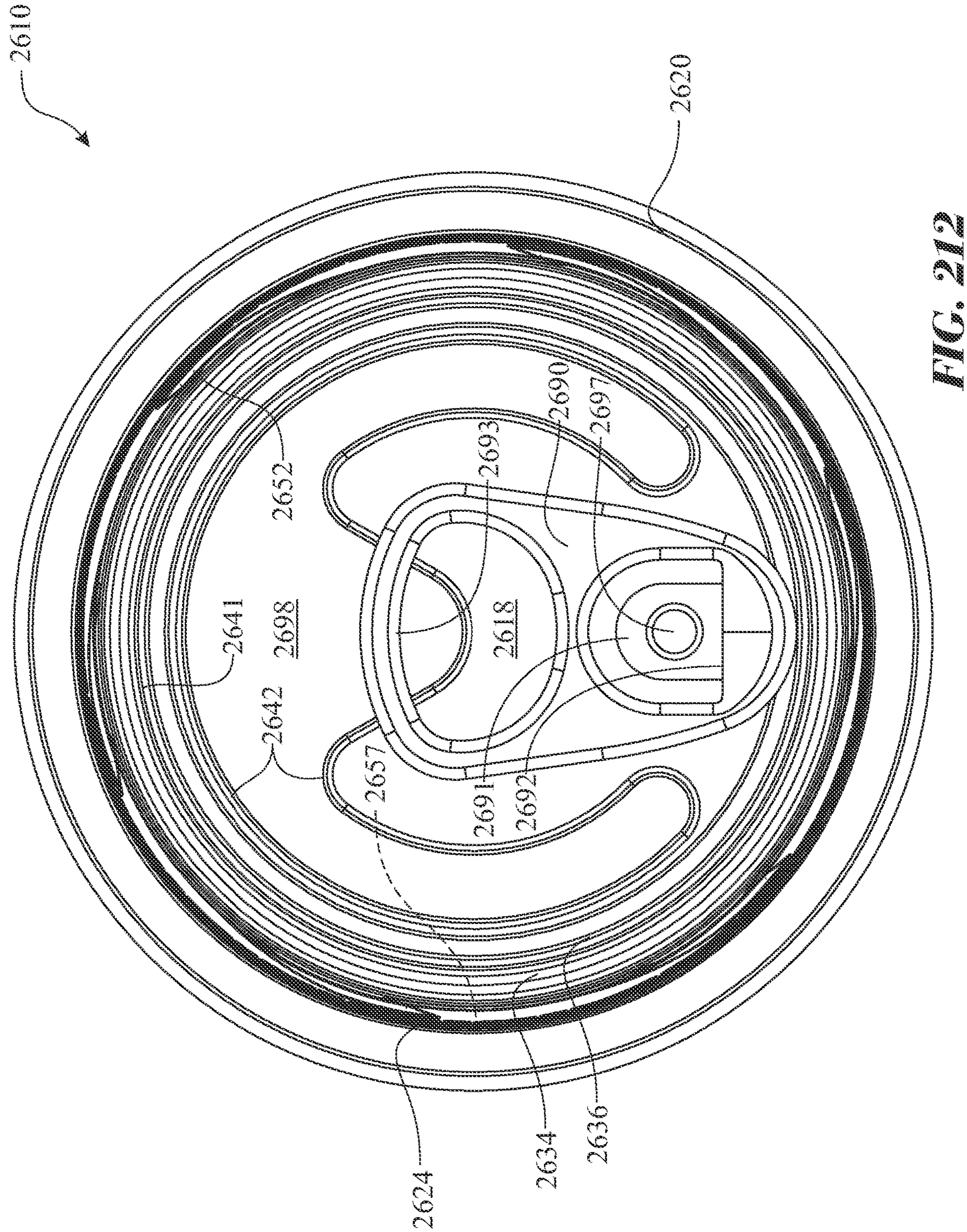
Figure 213:
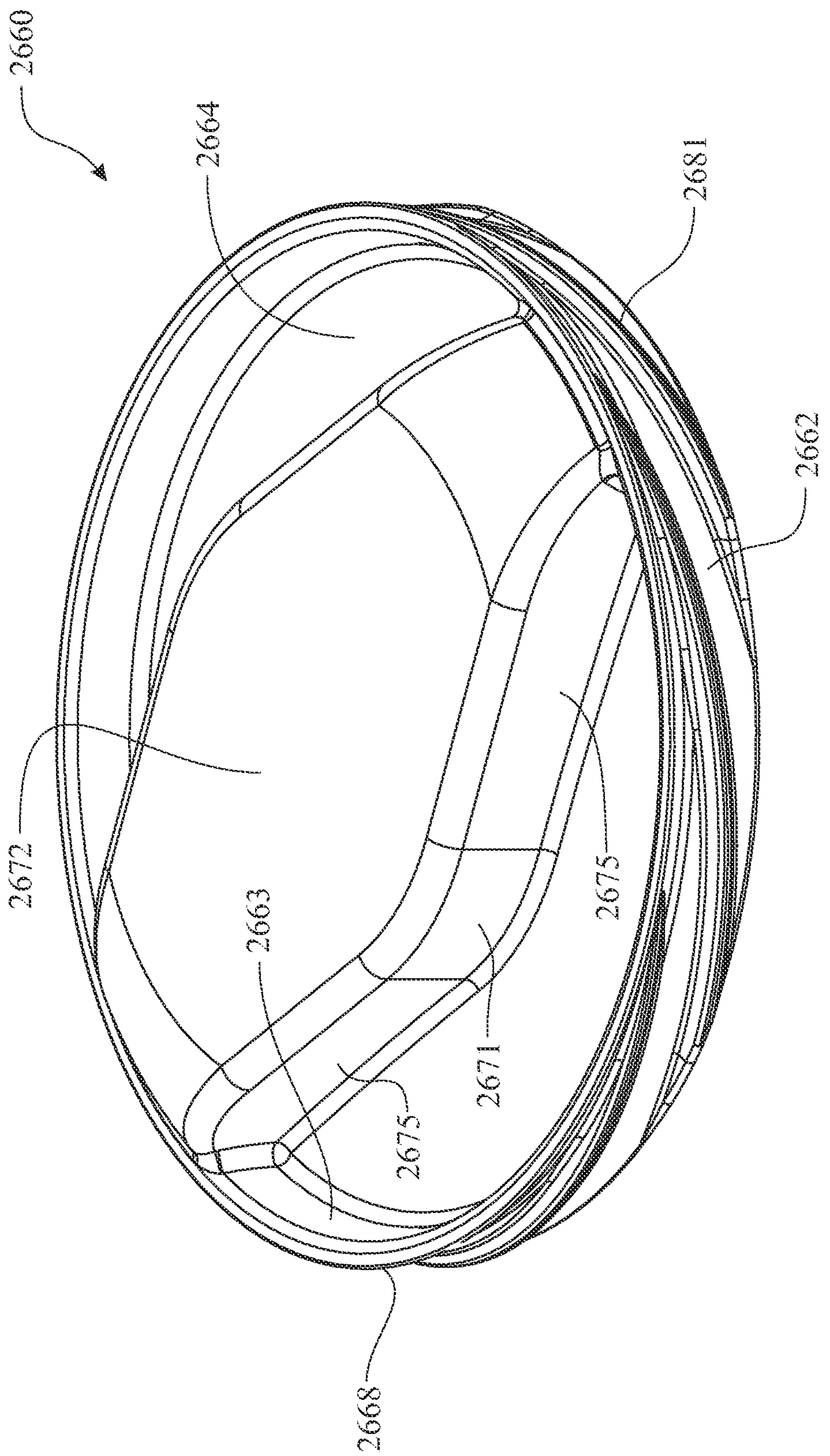
Figure 214:
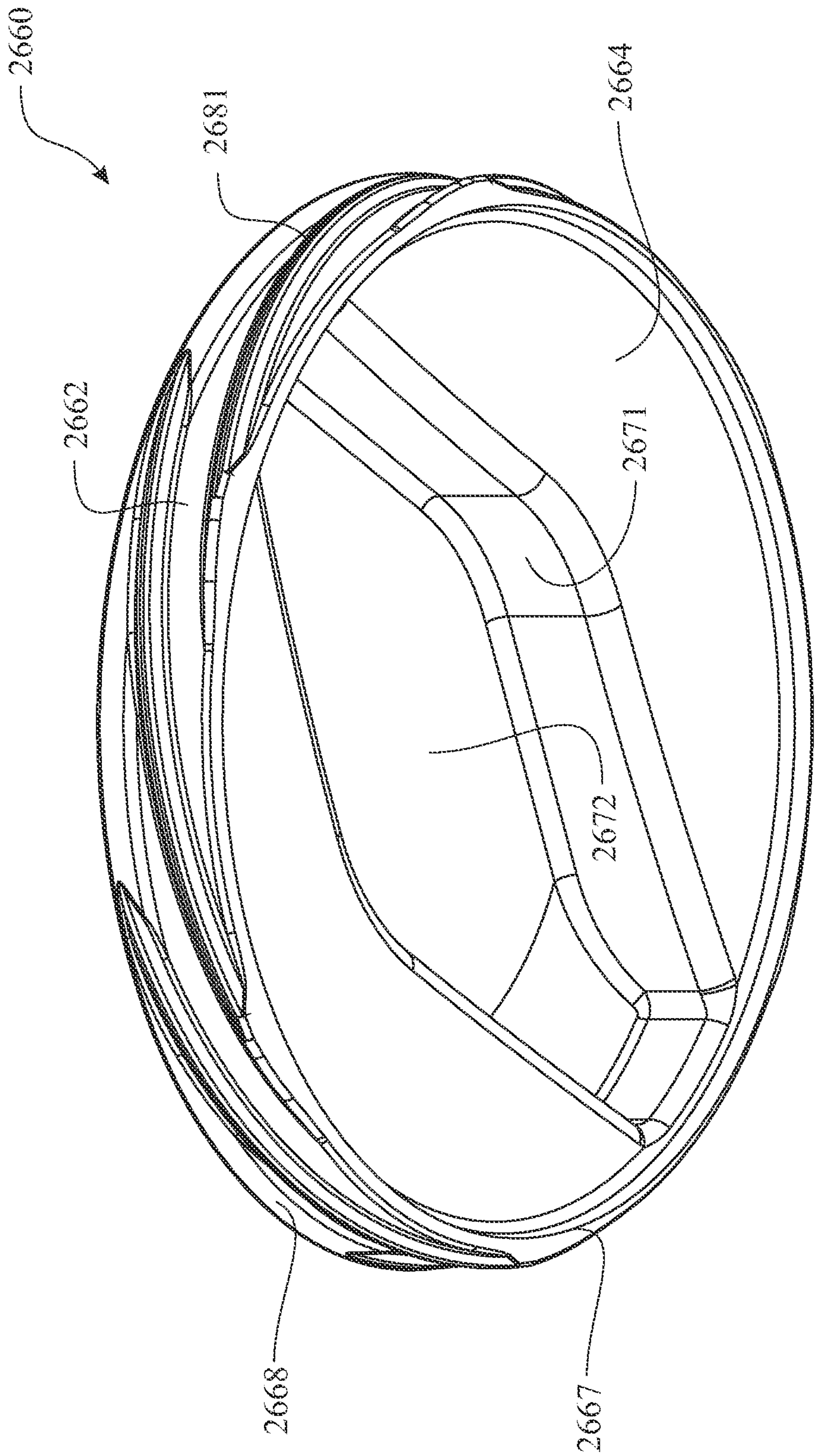
Figure 215:
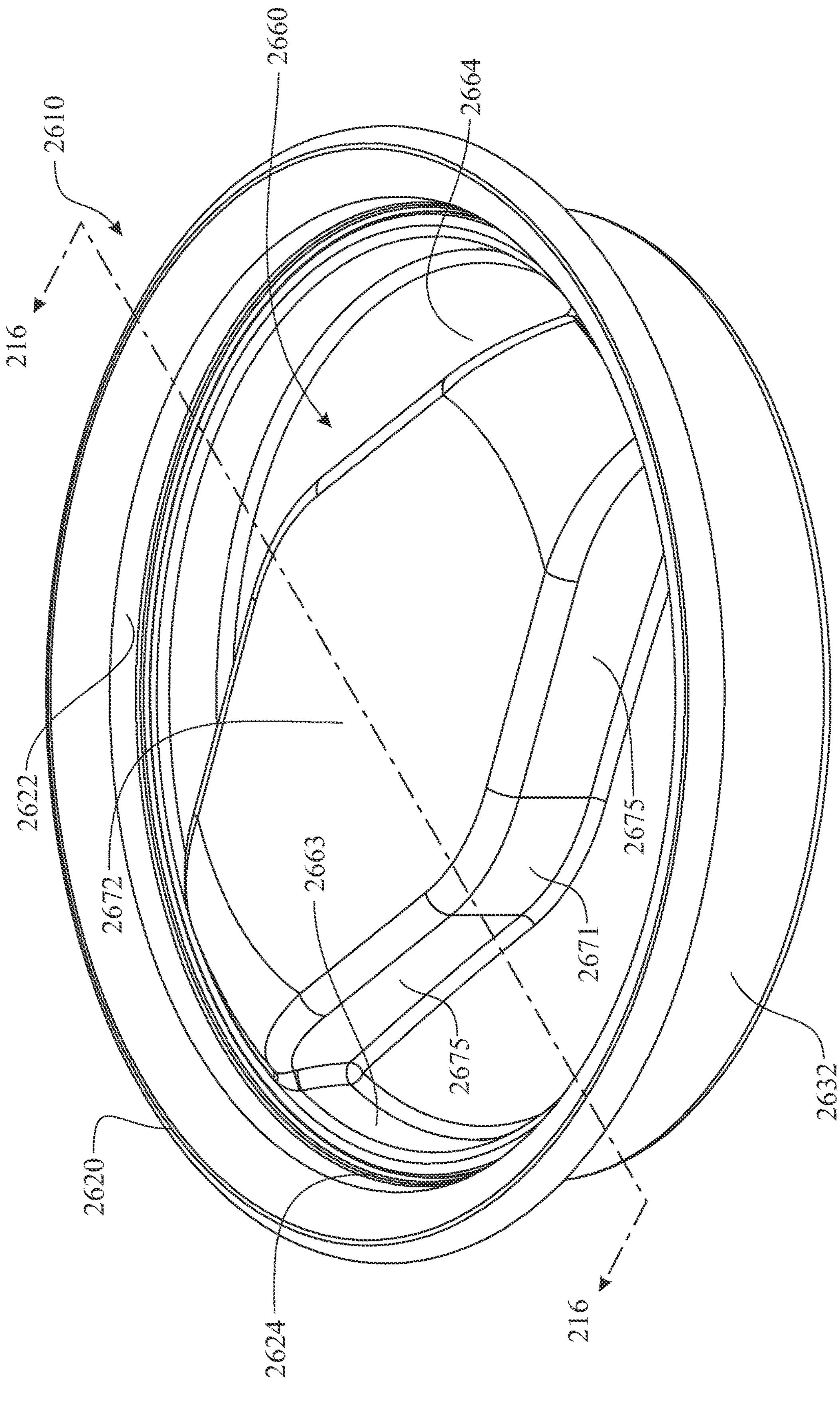
Figure 216:
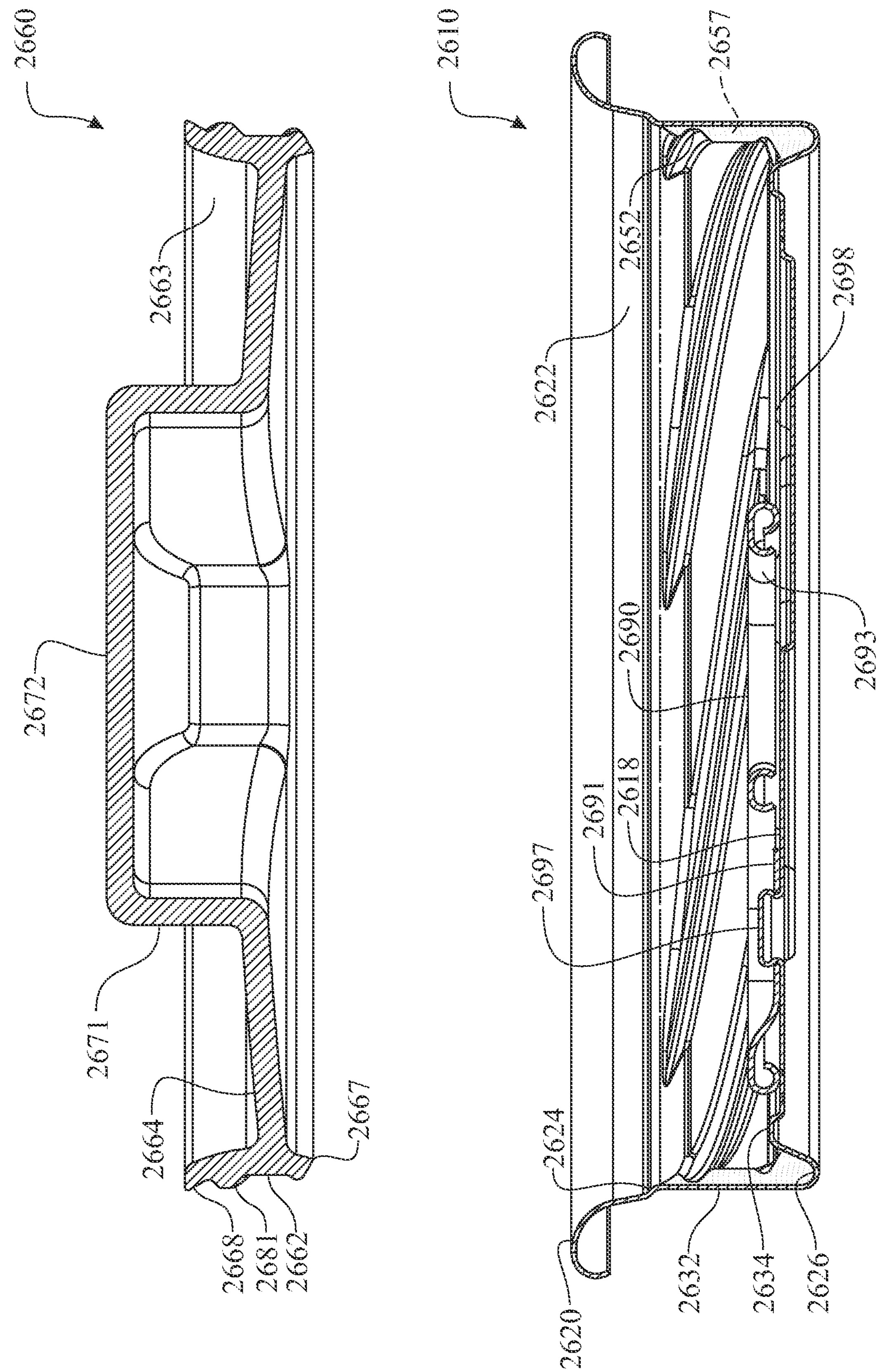
Figure 217:
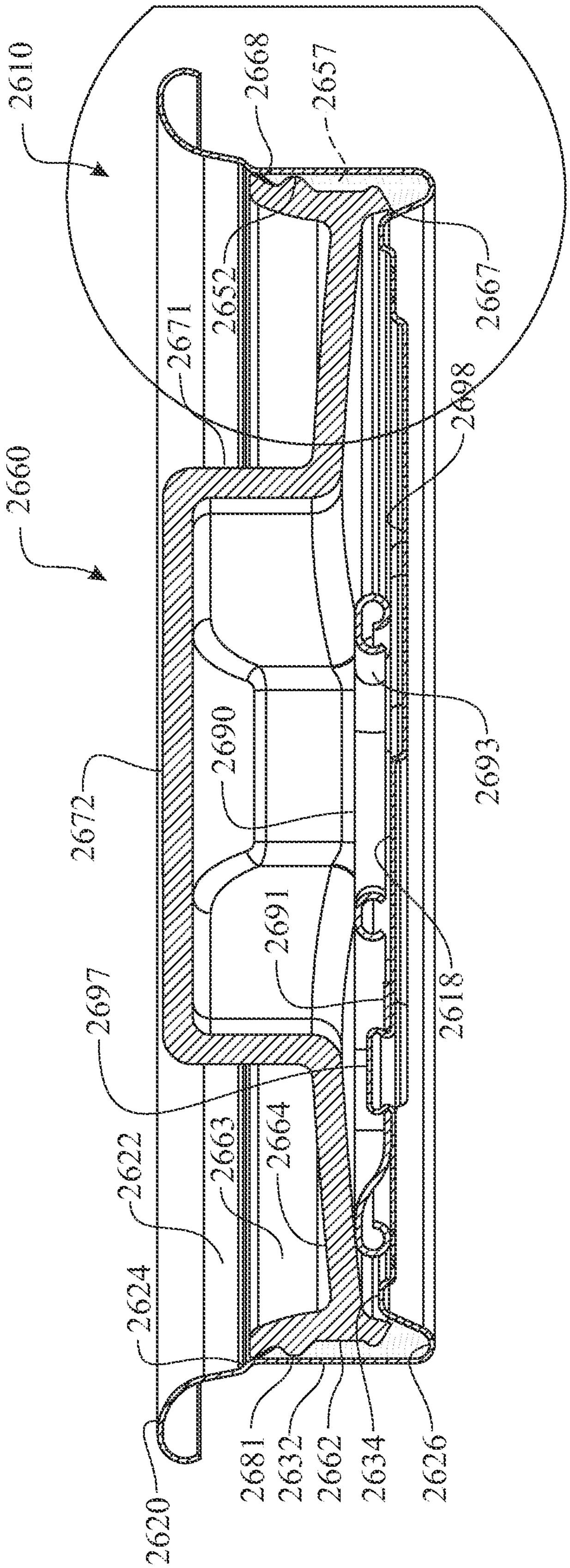
Figure 218:
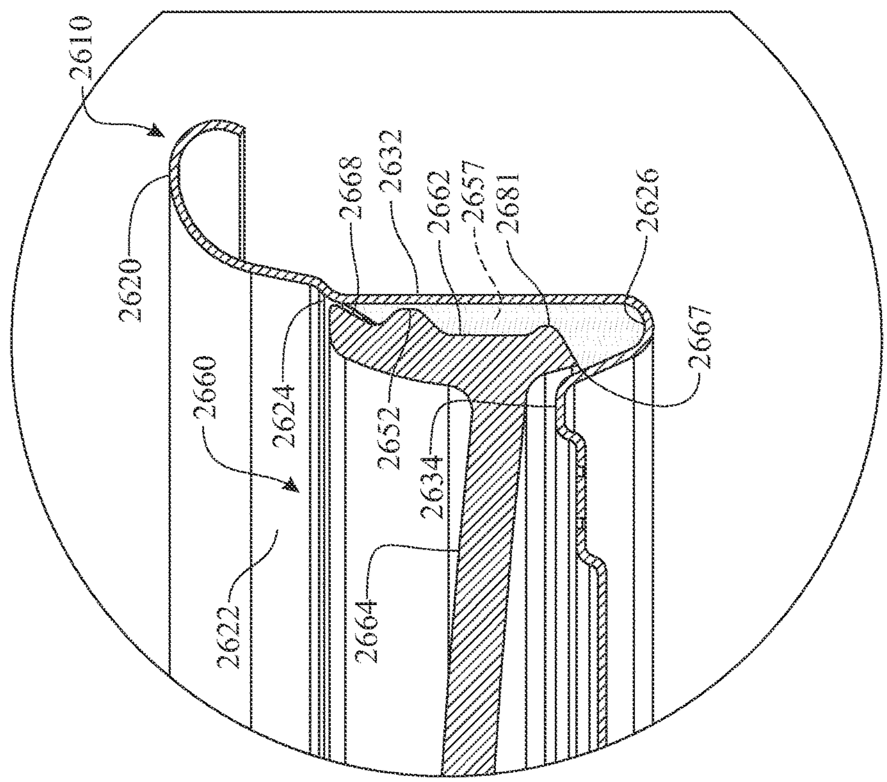
Figure 219:
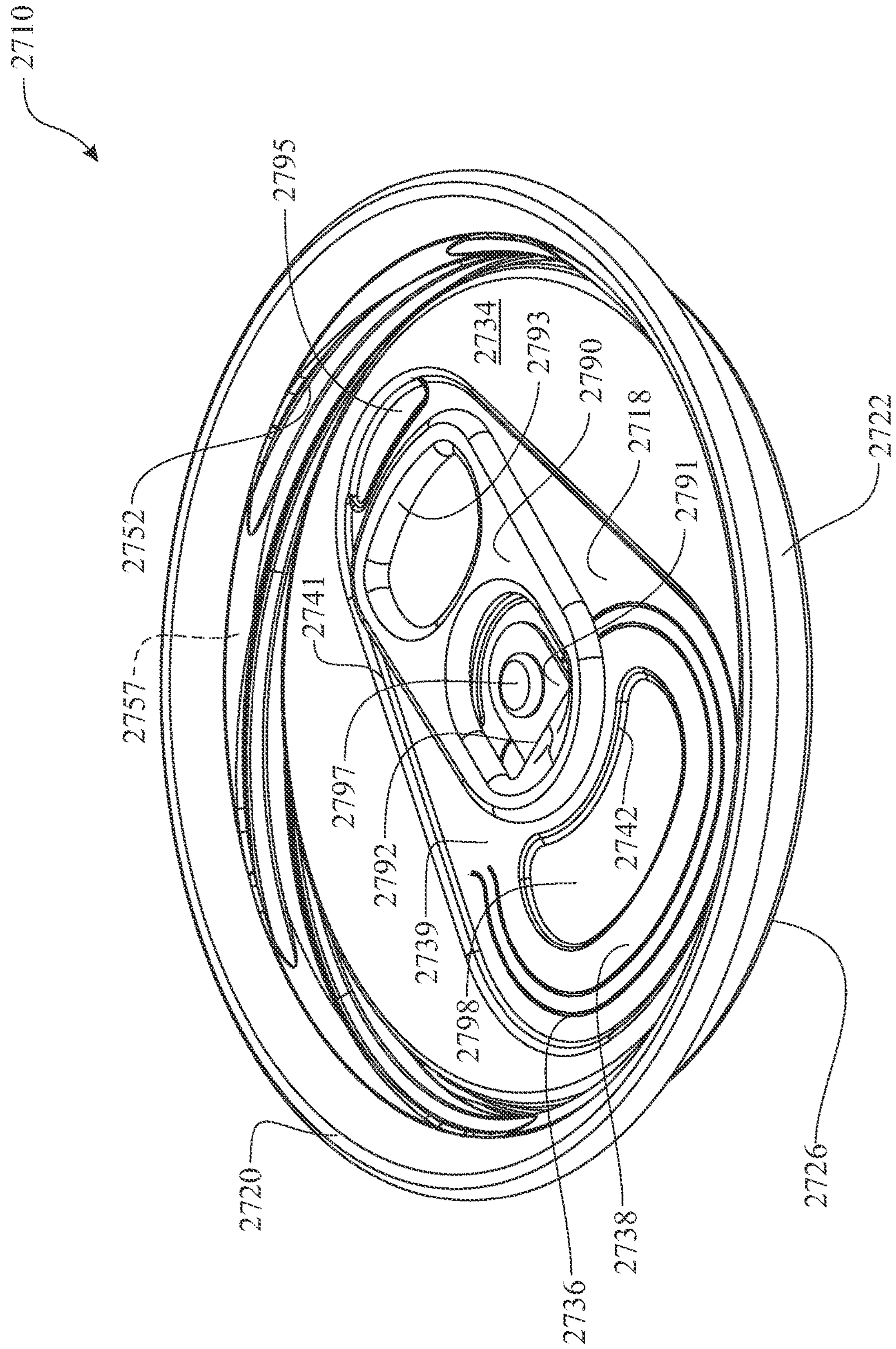
Figure 220:
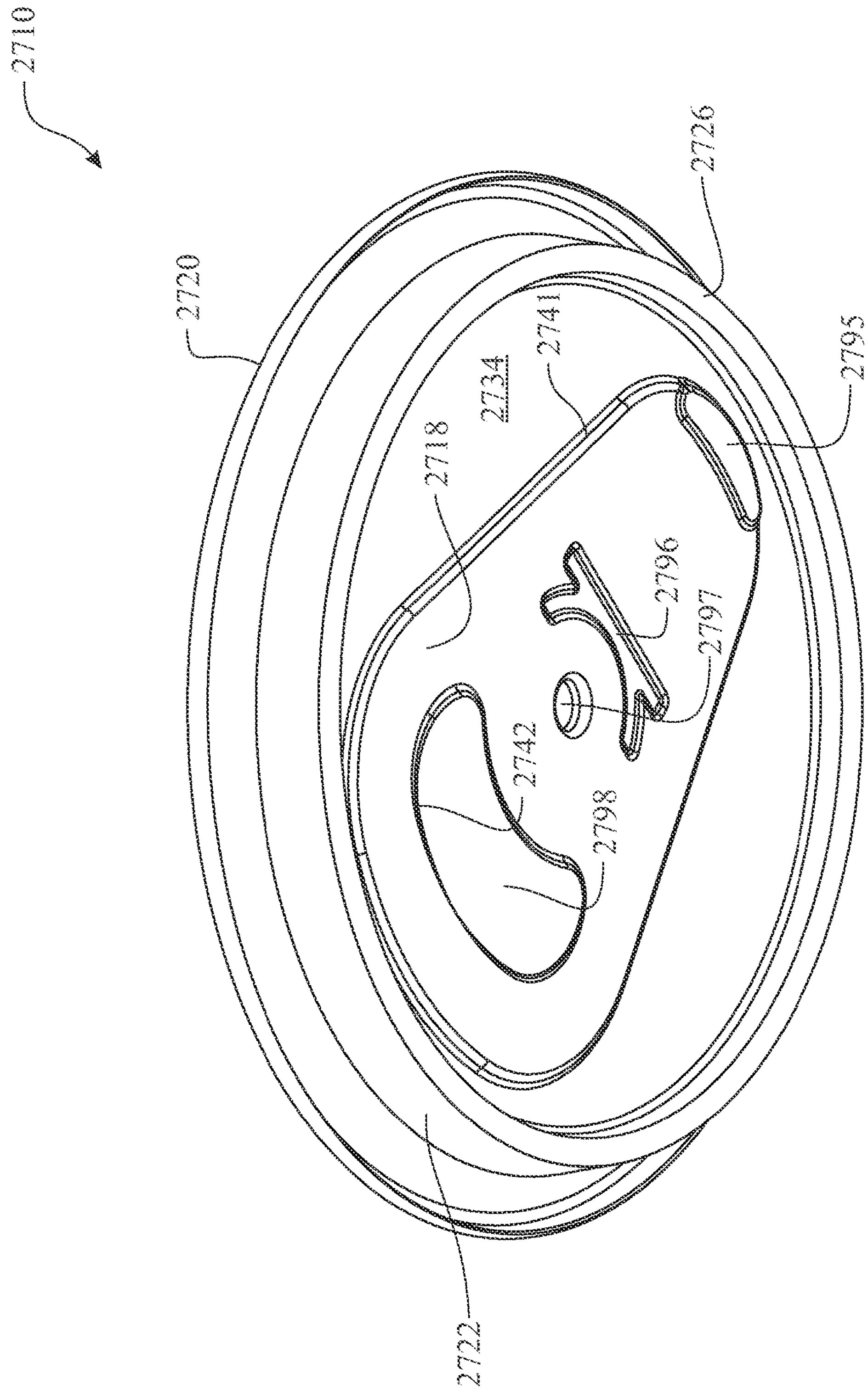
Figure 221:
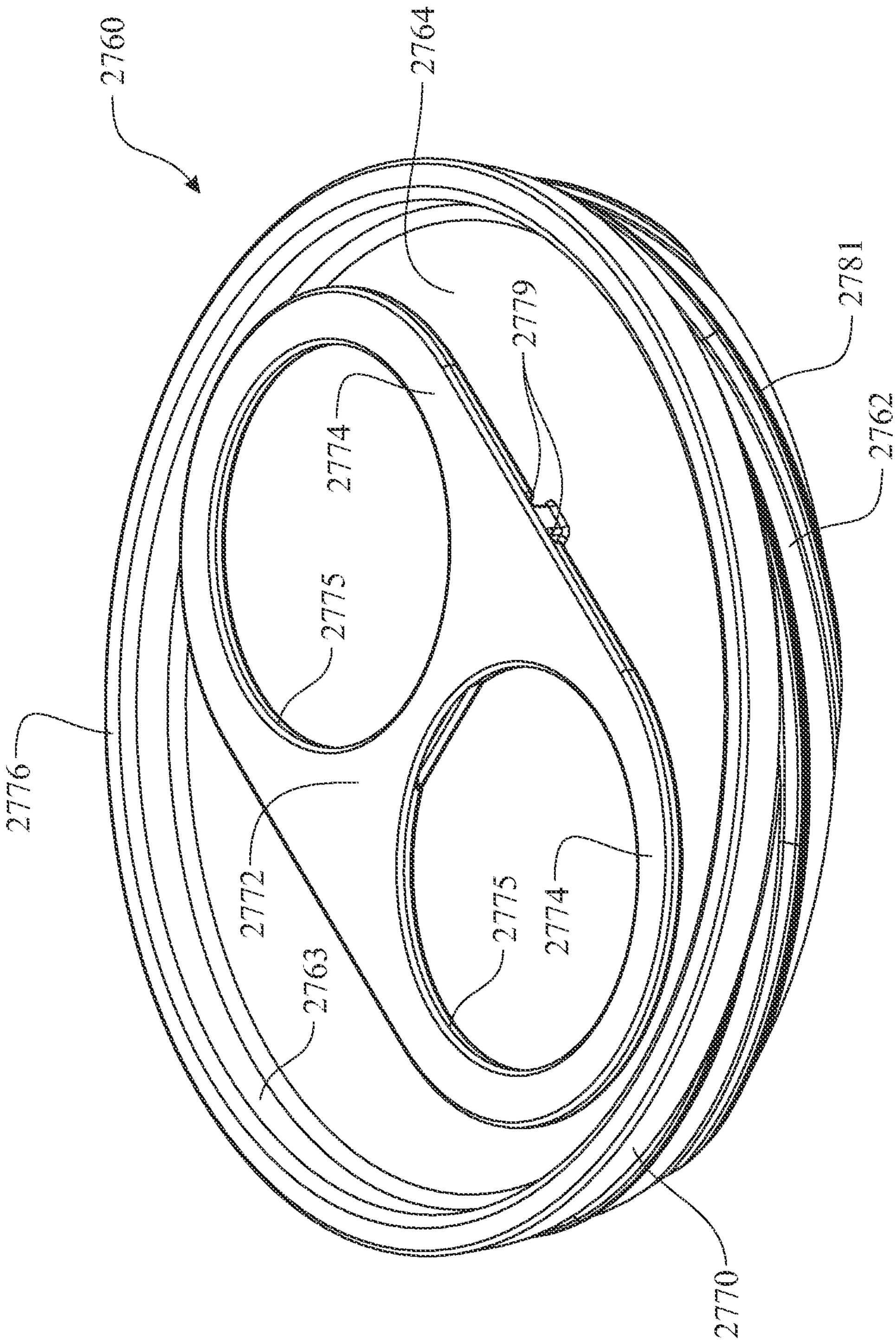
Figure 222:
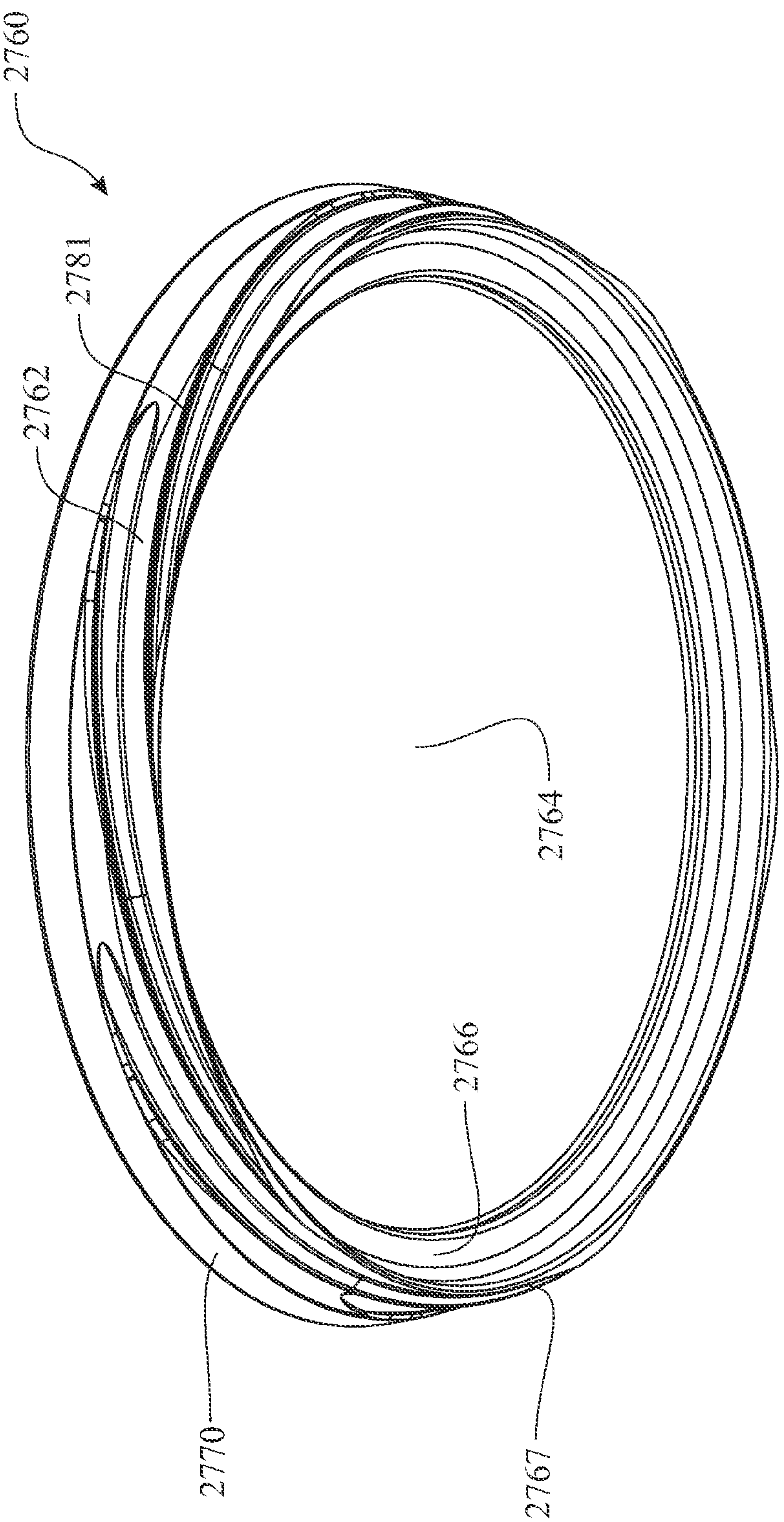
Figure 223:
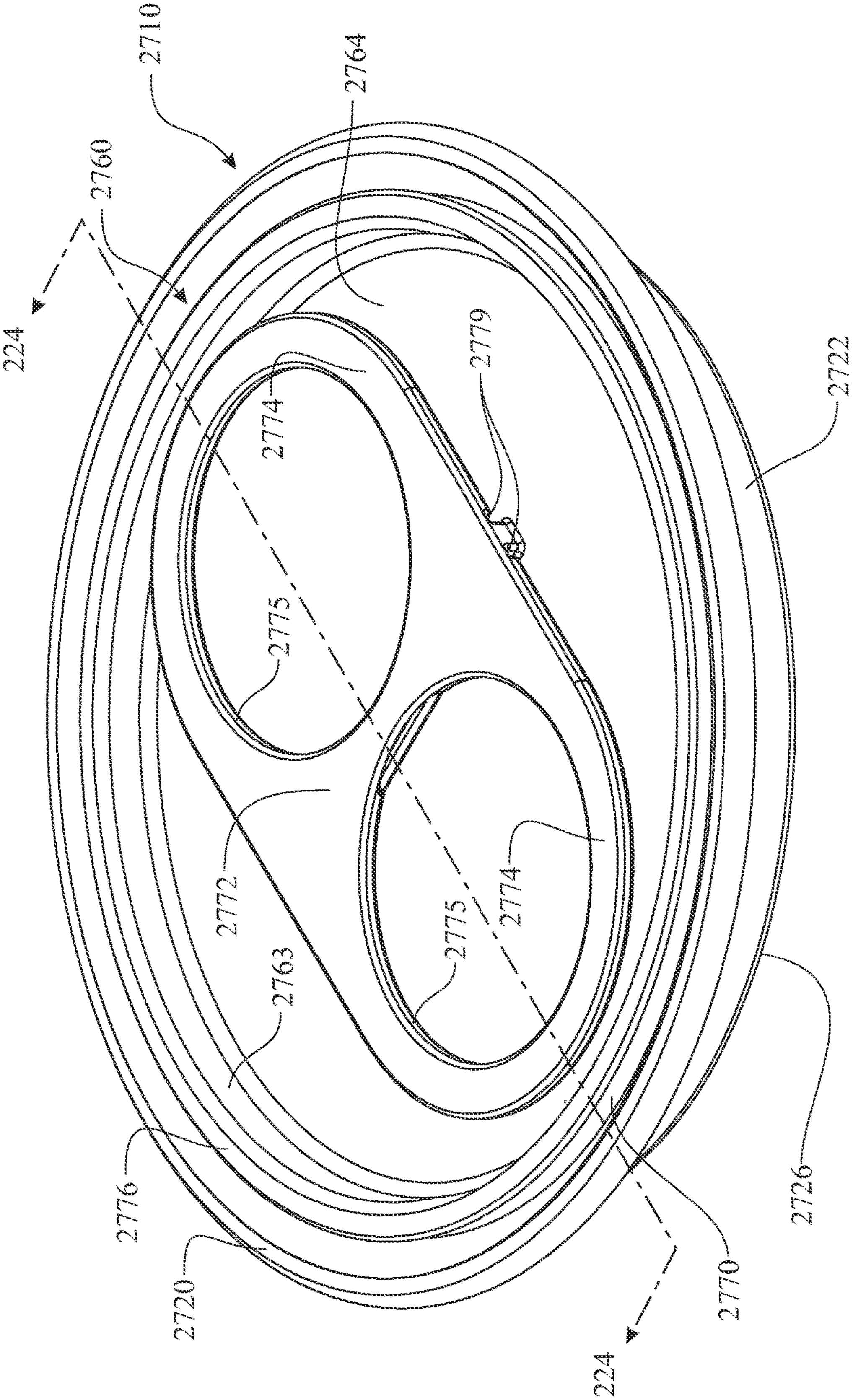
Figure 224:
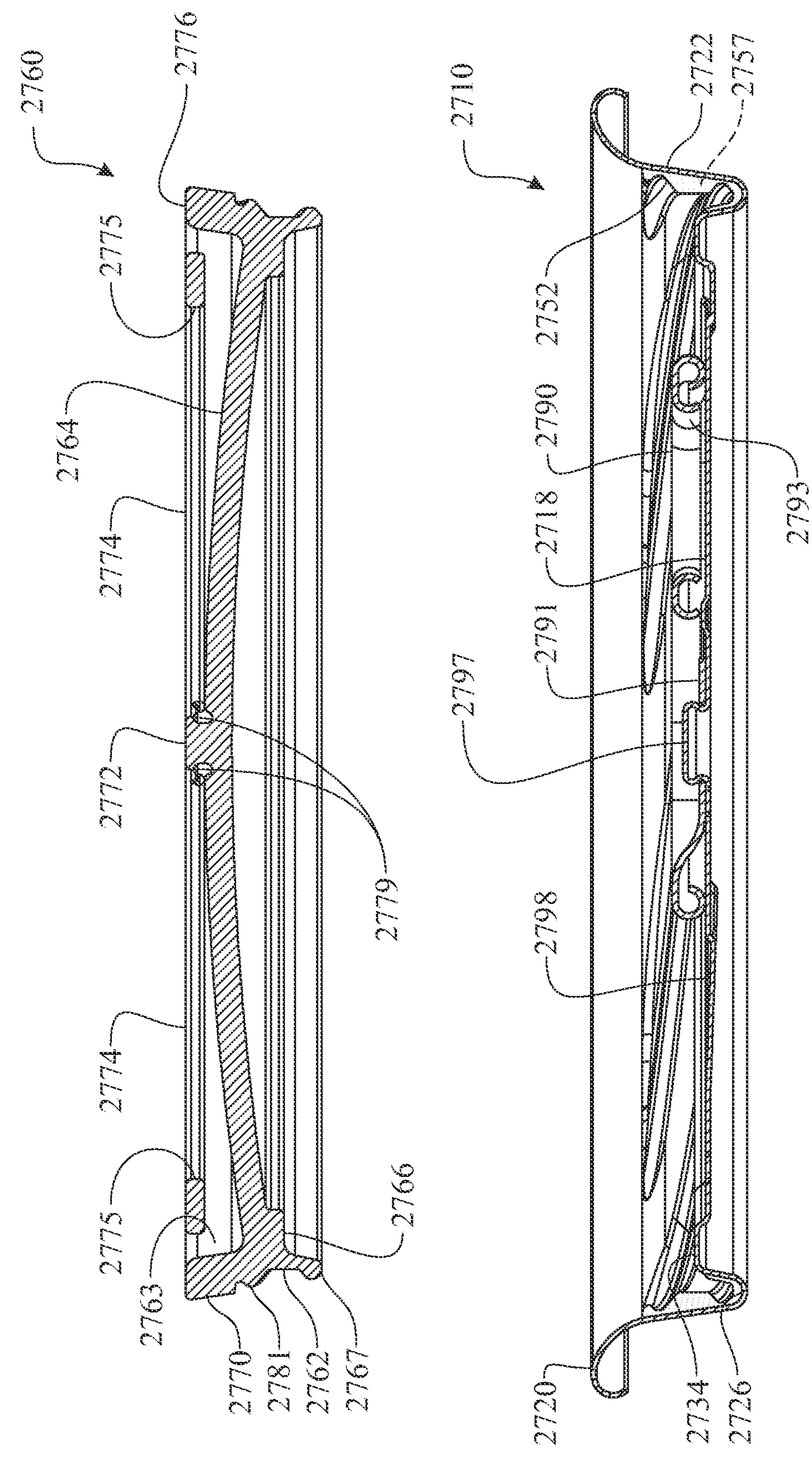
Figure 225:
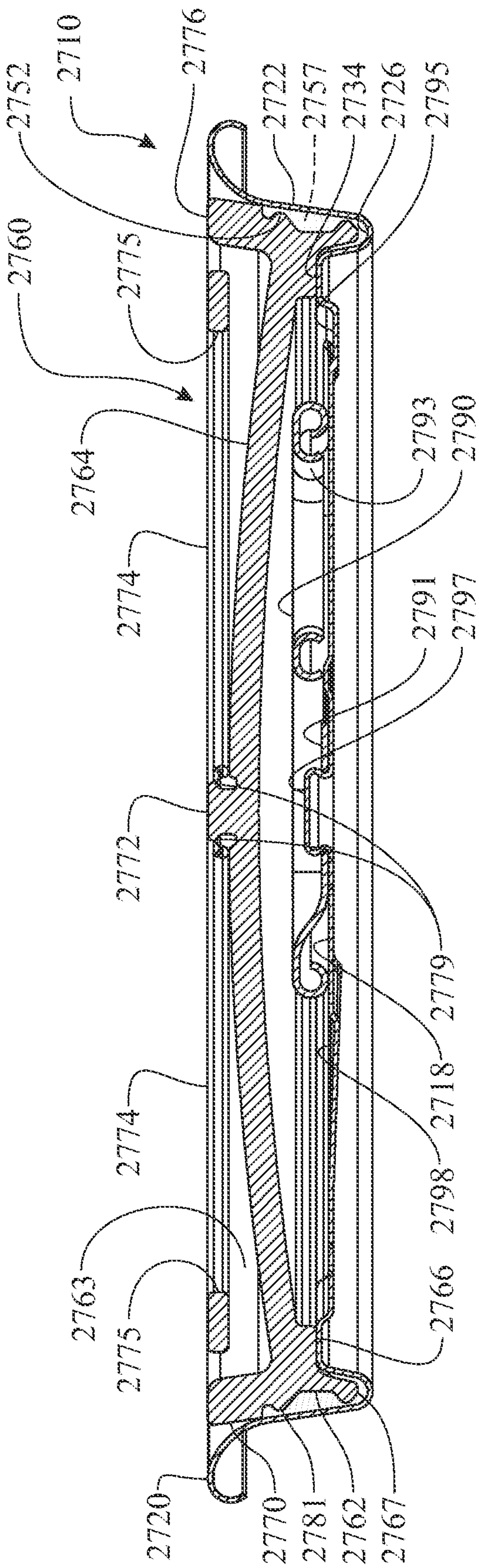
Figure 226:
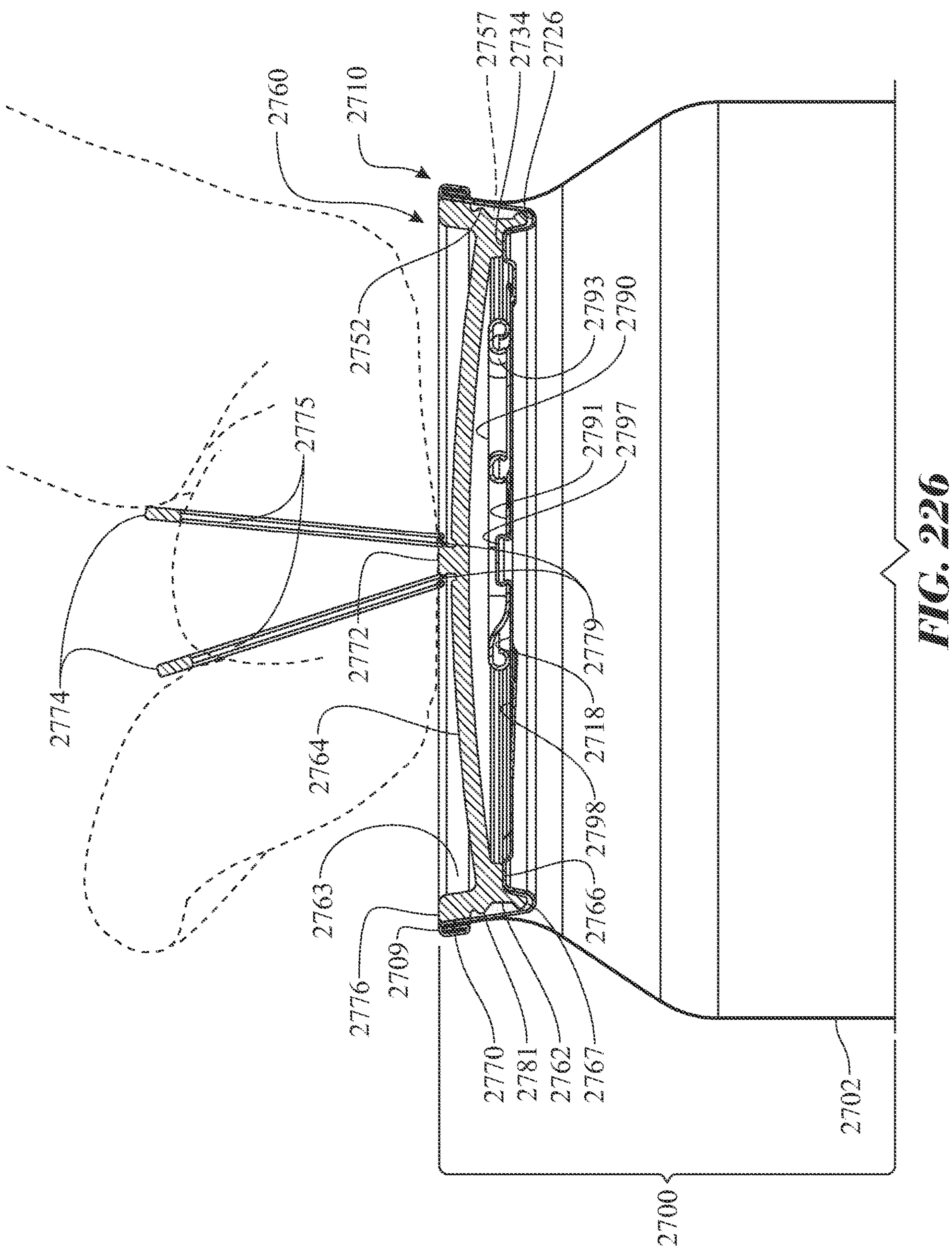
Figure 227:
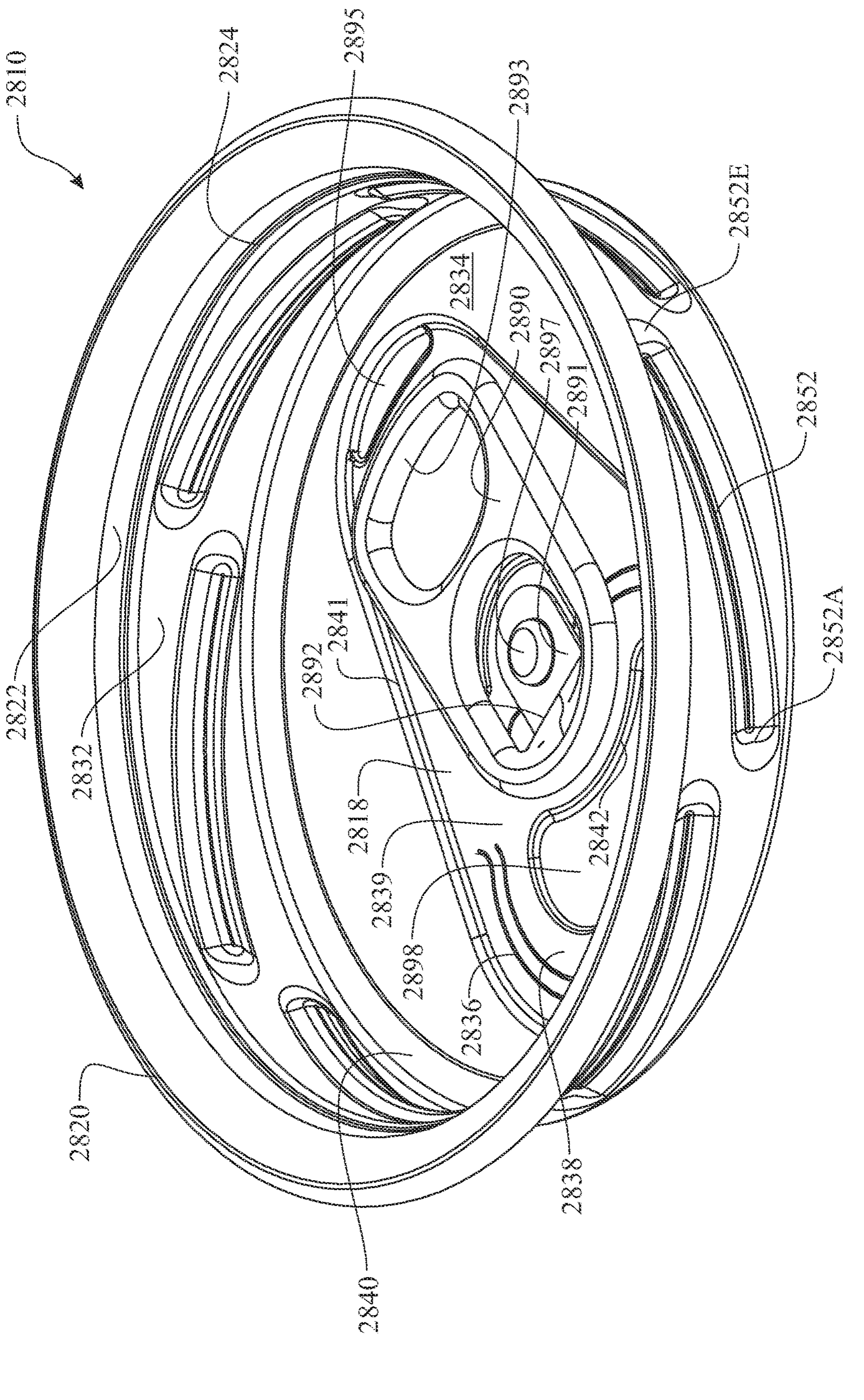
Figure 228:
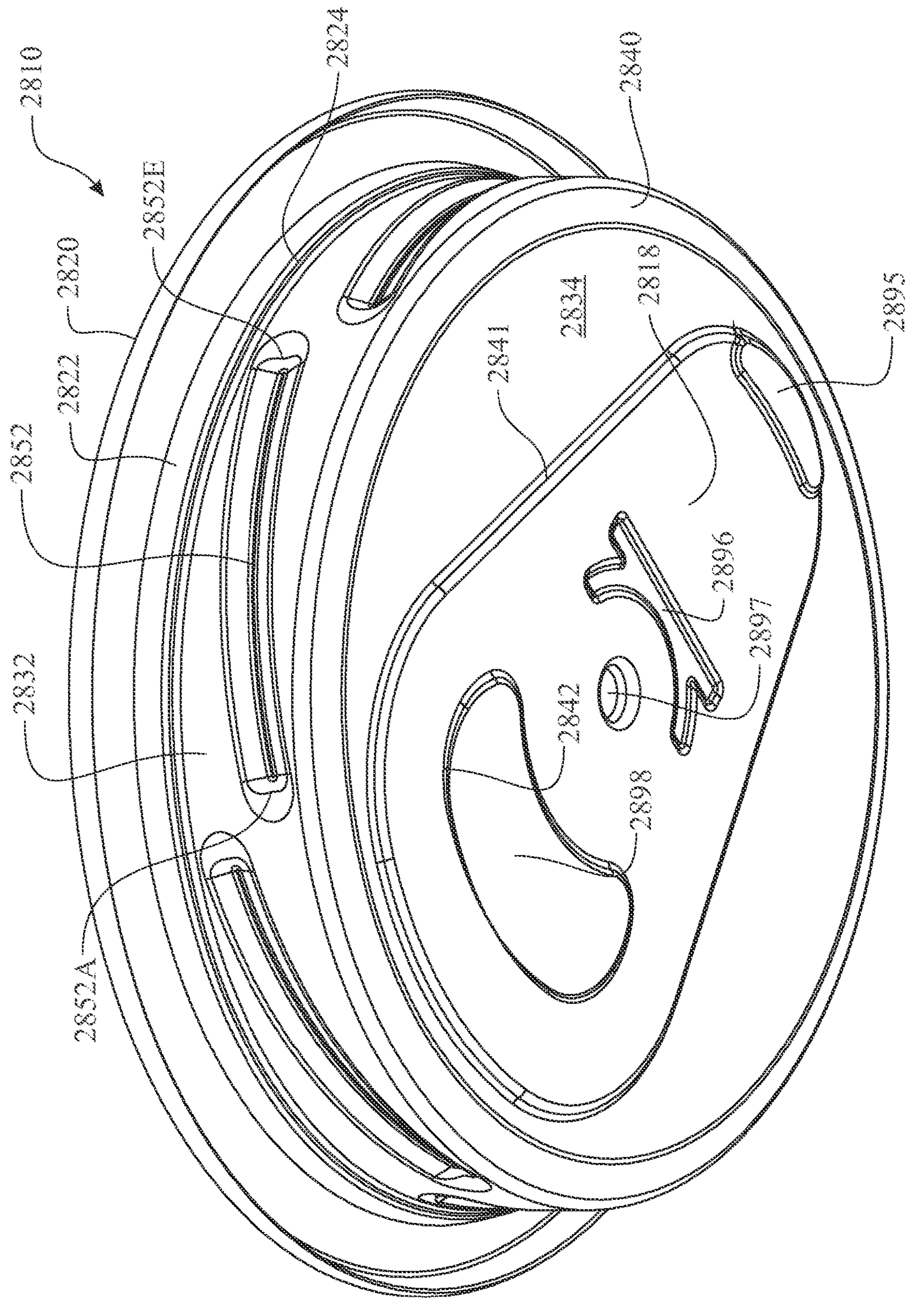
Figure 229:
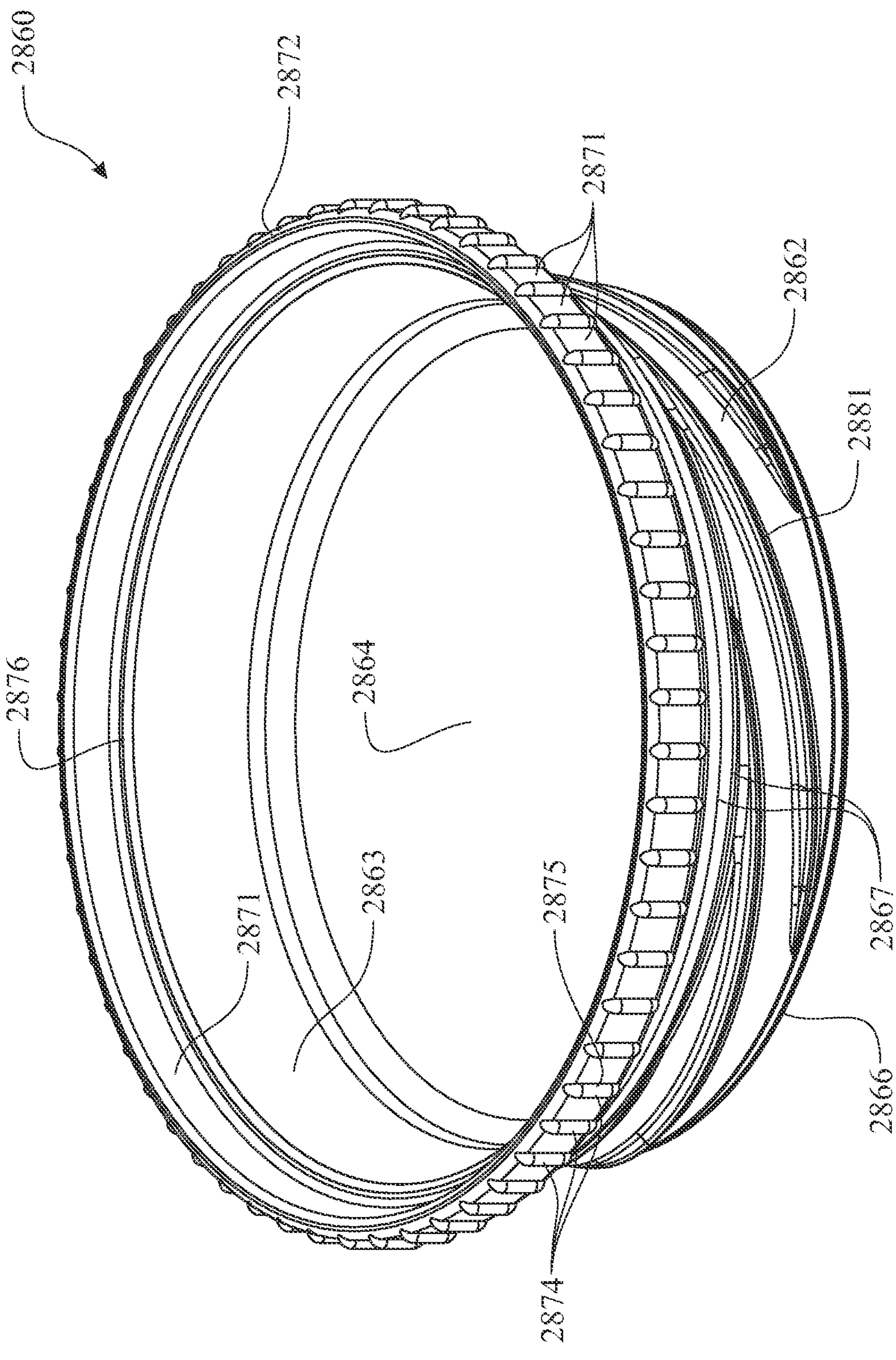
Figure 230:
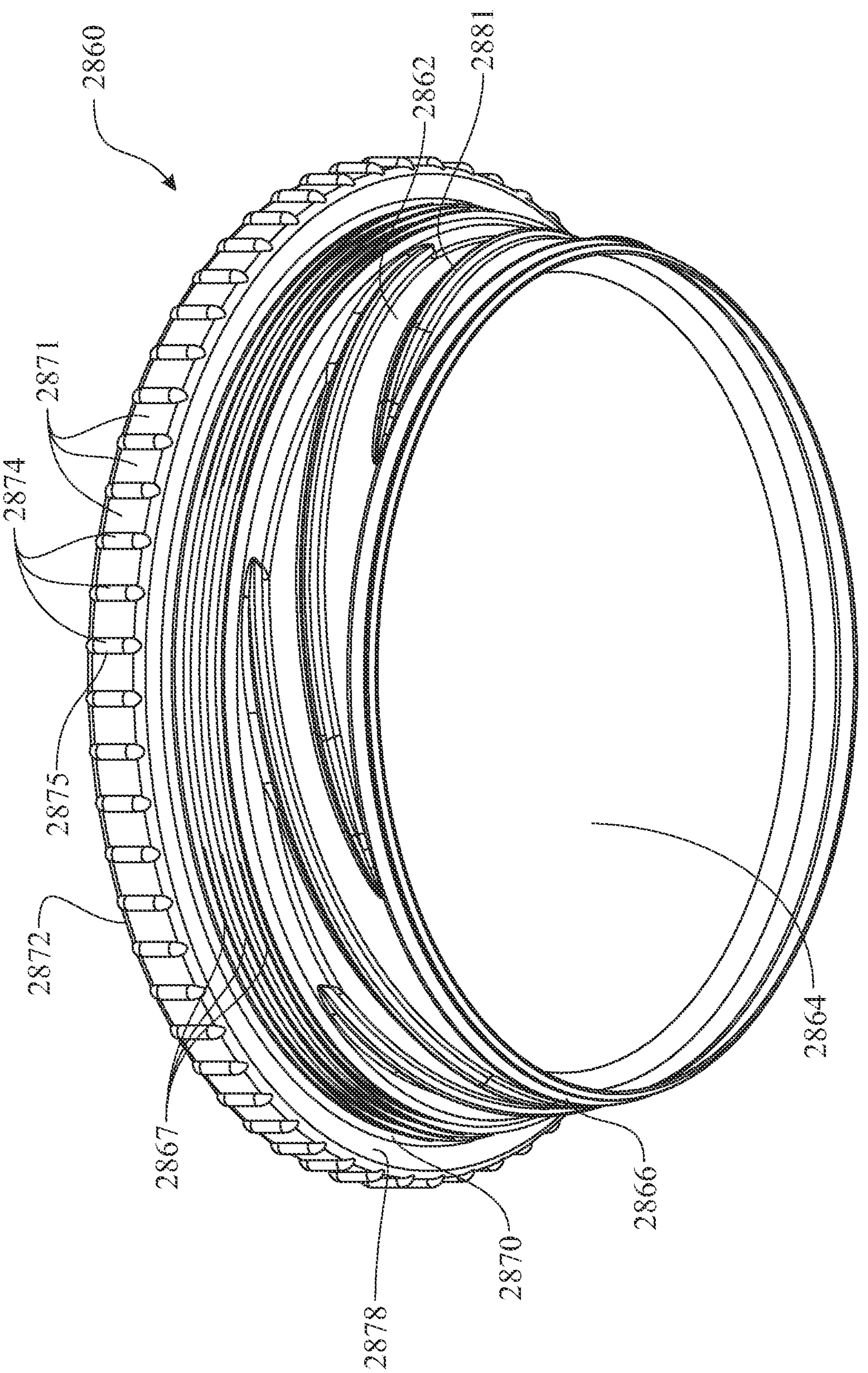
Figure 231:
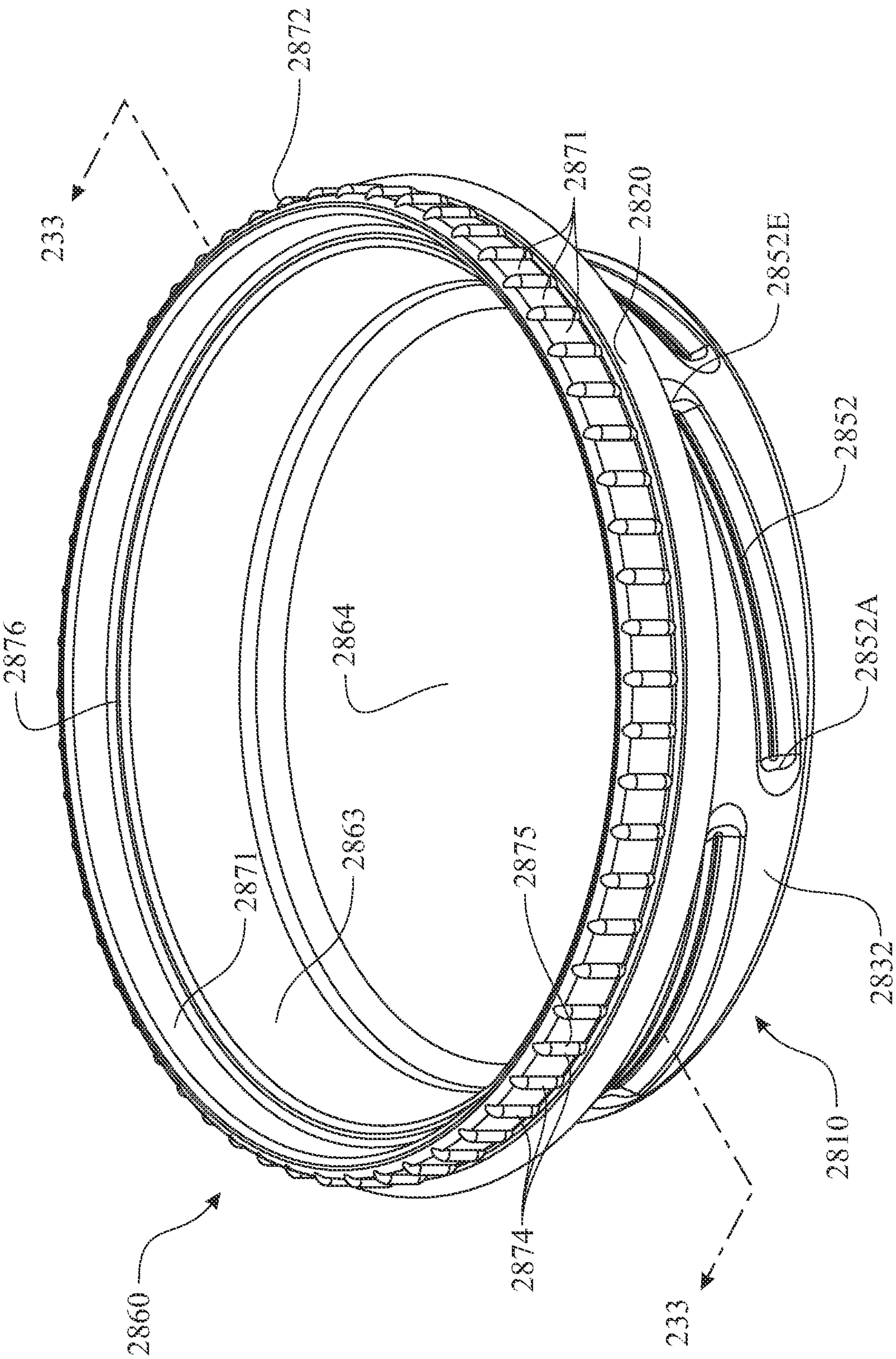
Figure 232:
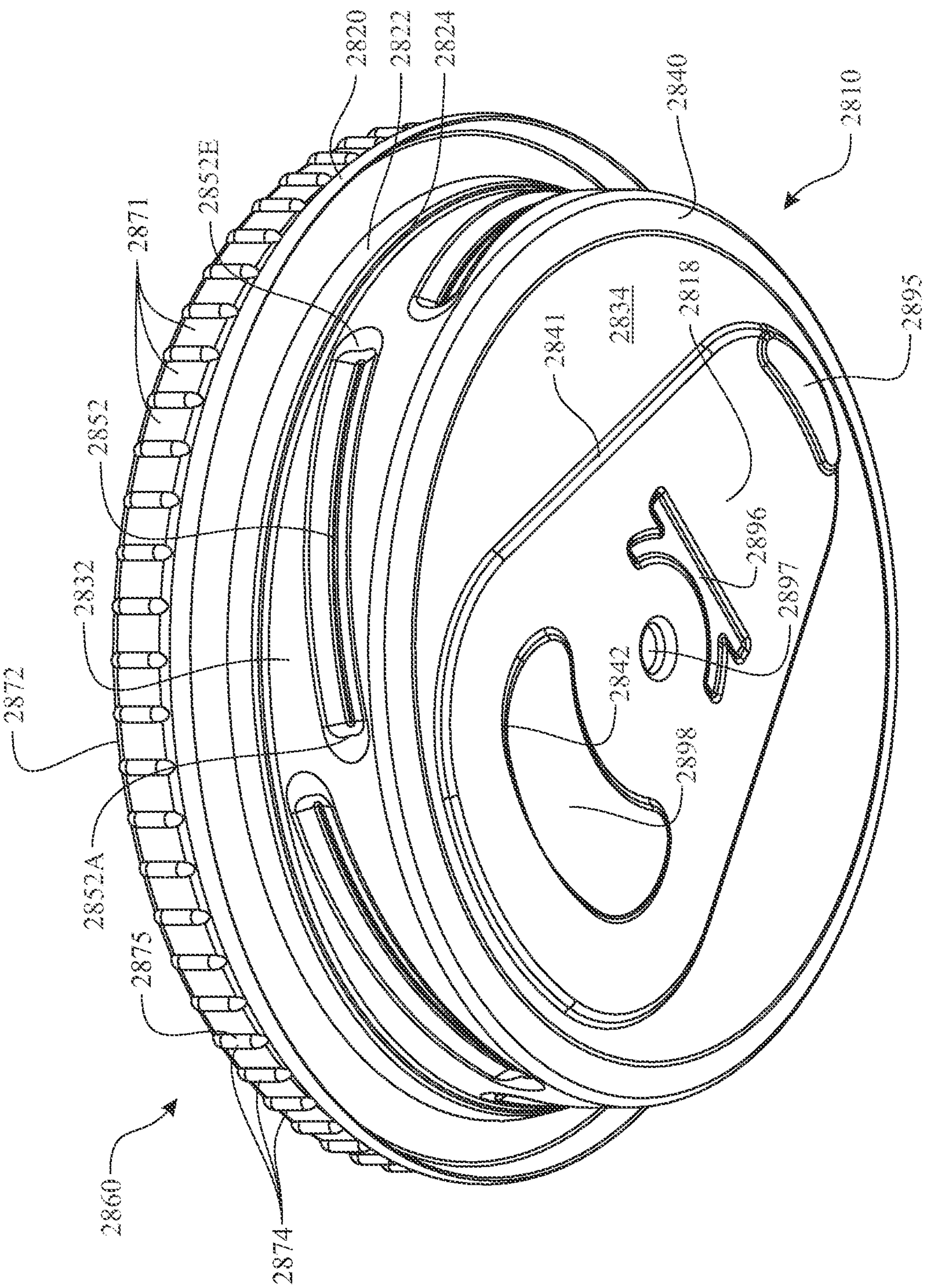
Figure 233:
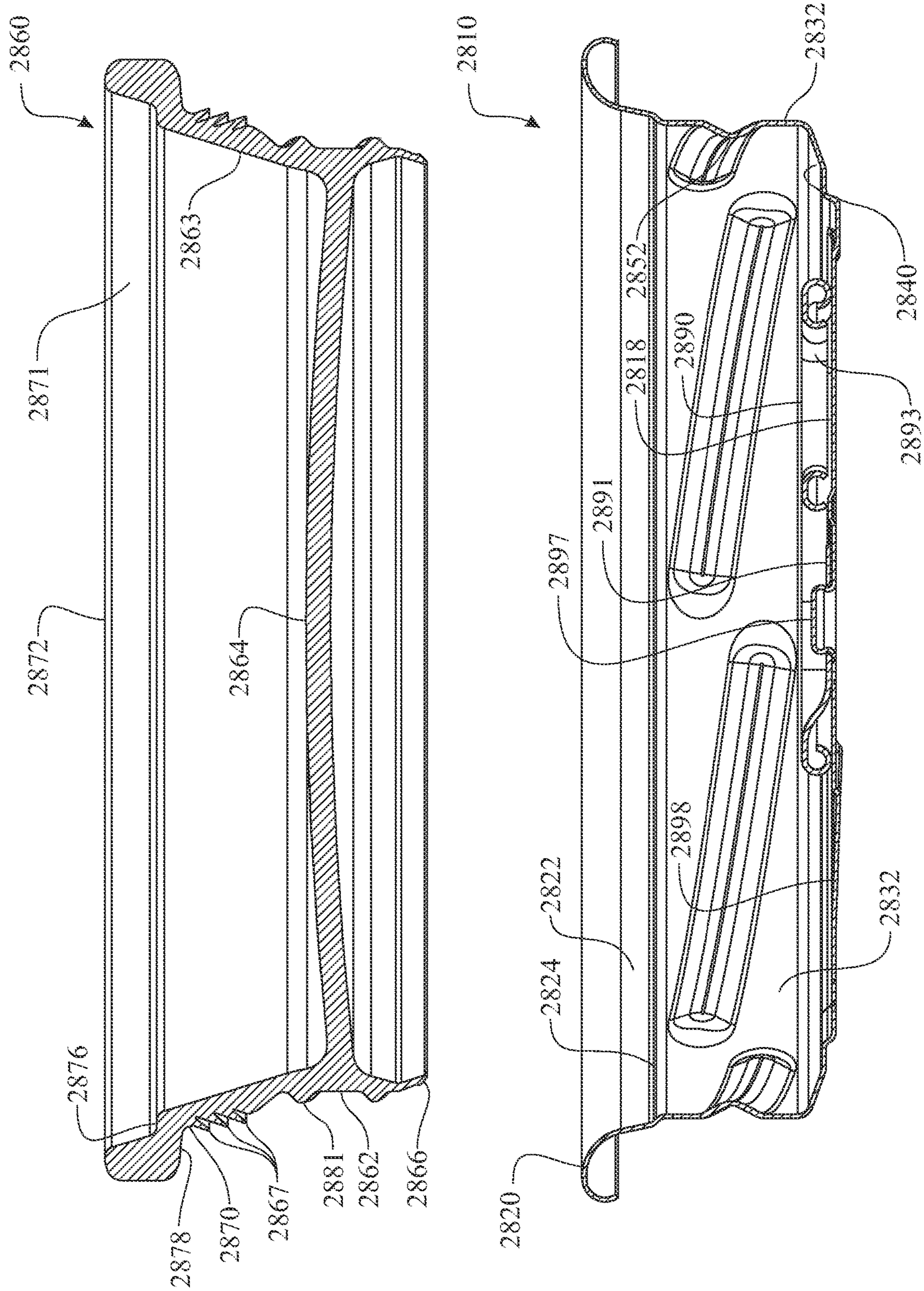
Figure 234:
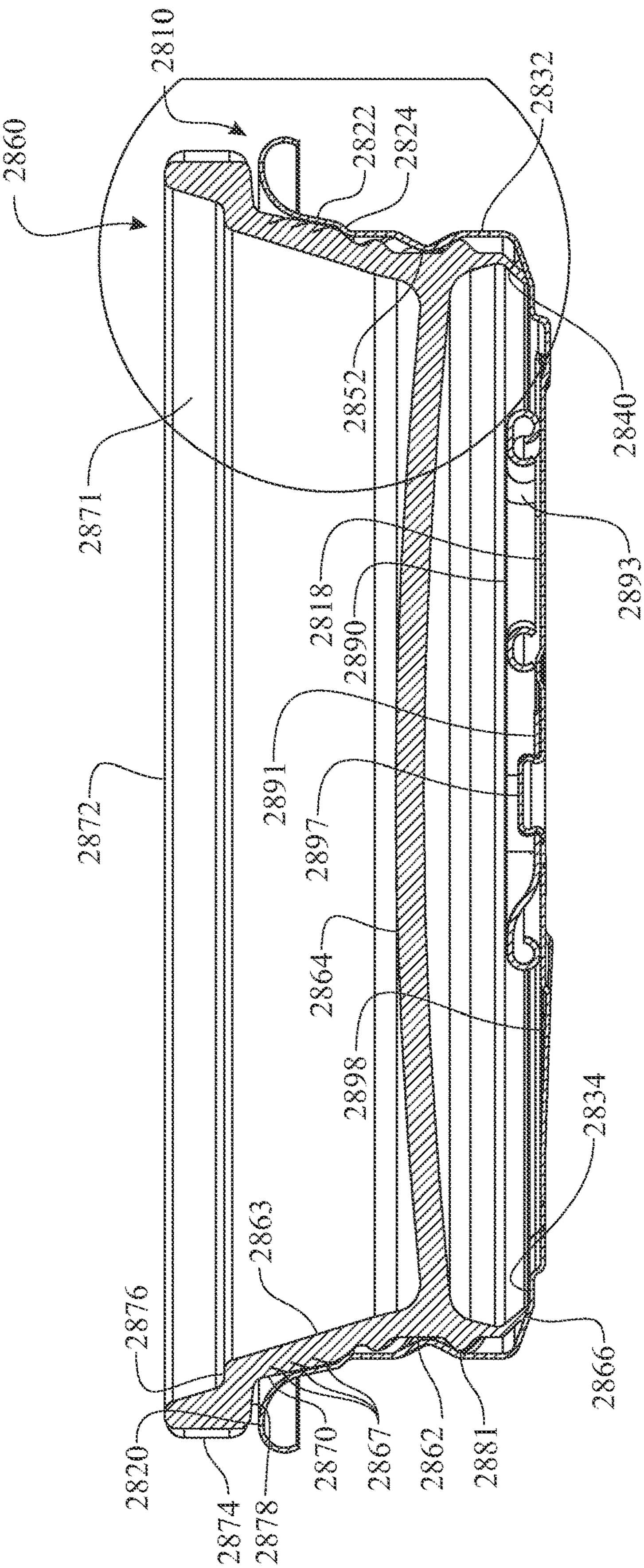
Figure 235:
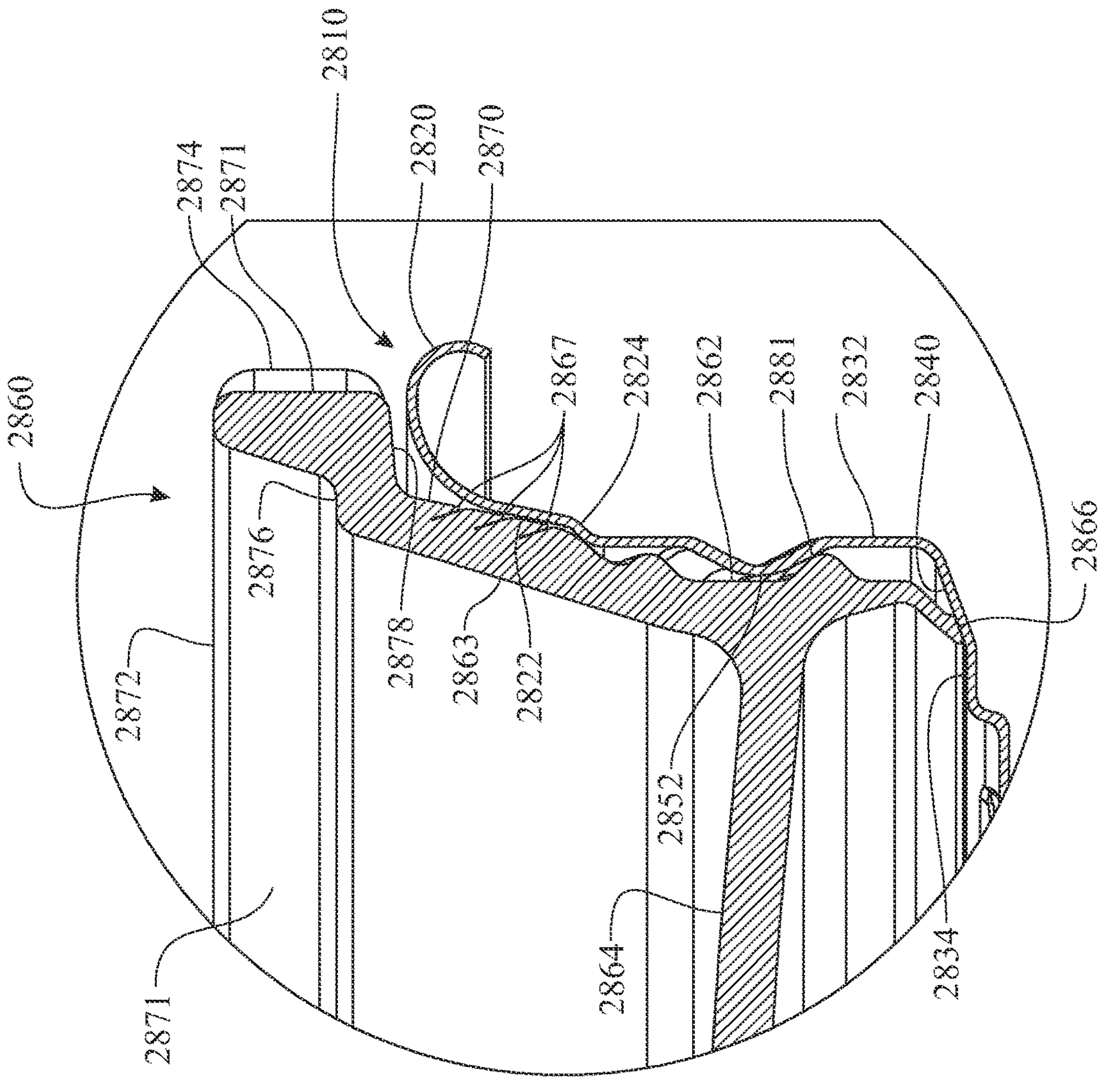
Figure 236:
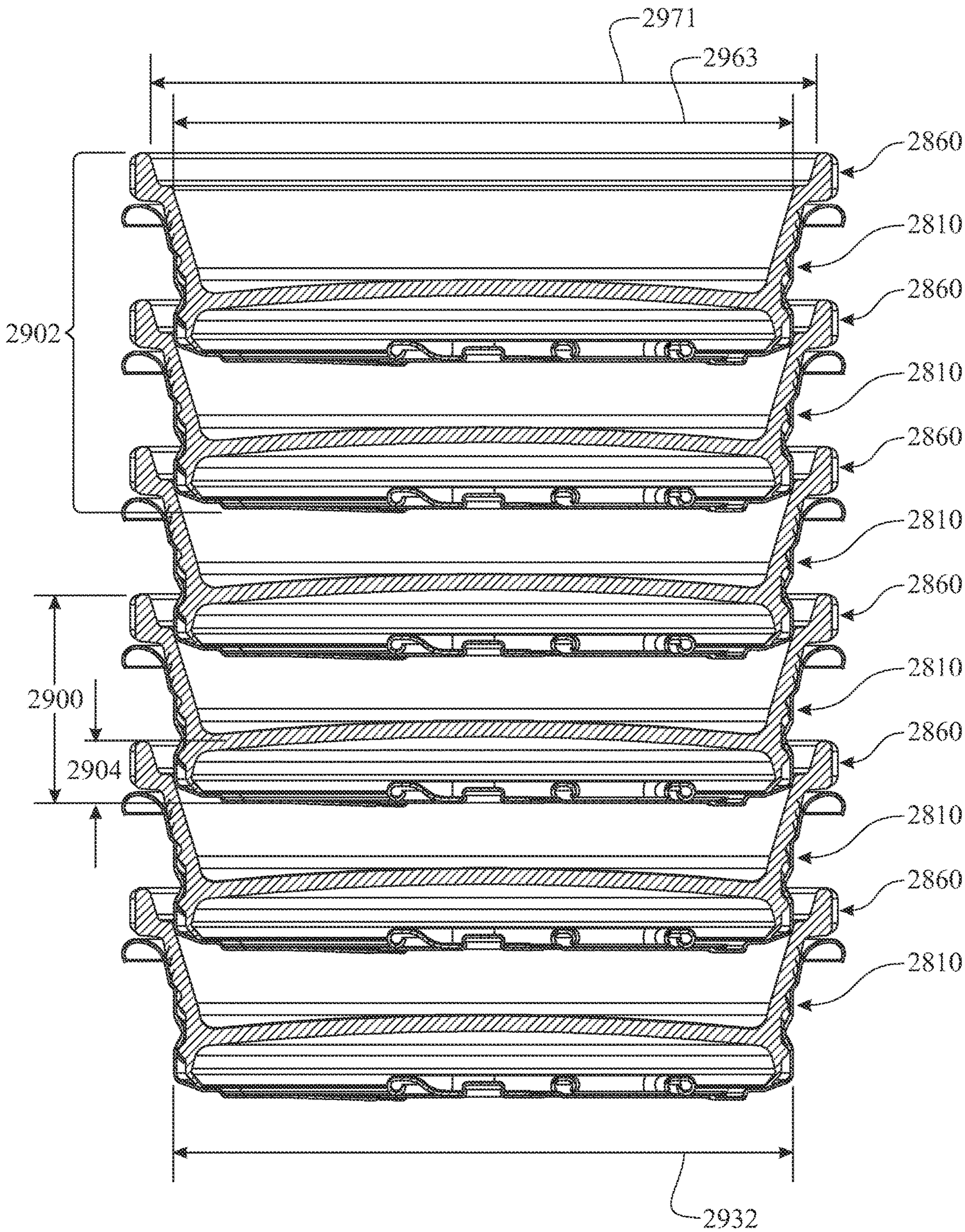
Figure 237:
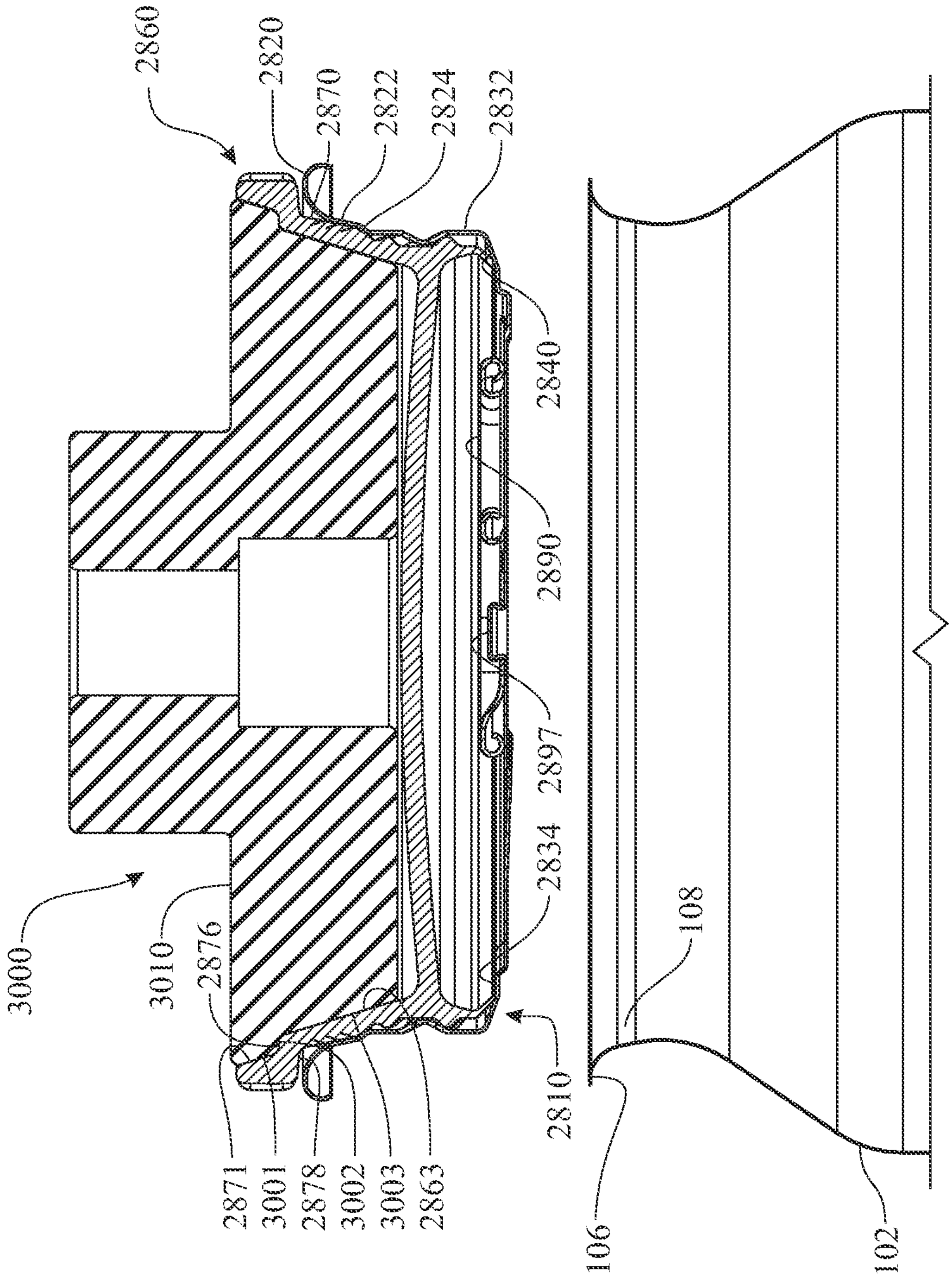
Figure 238:
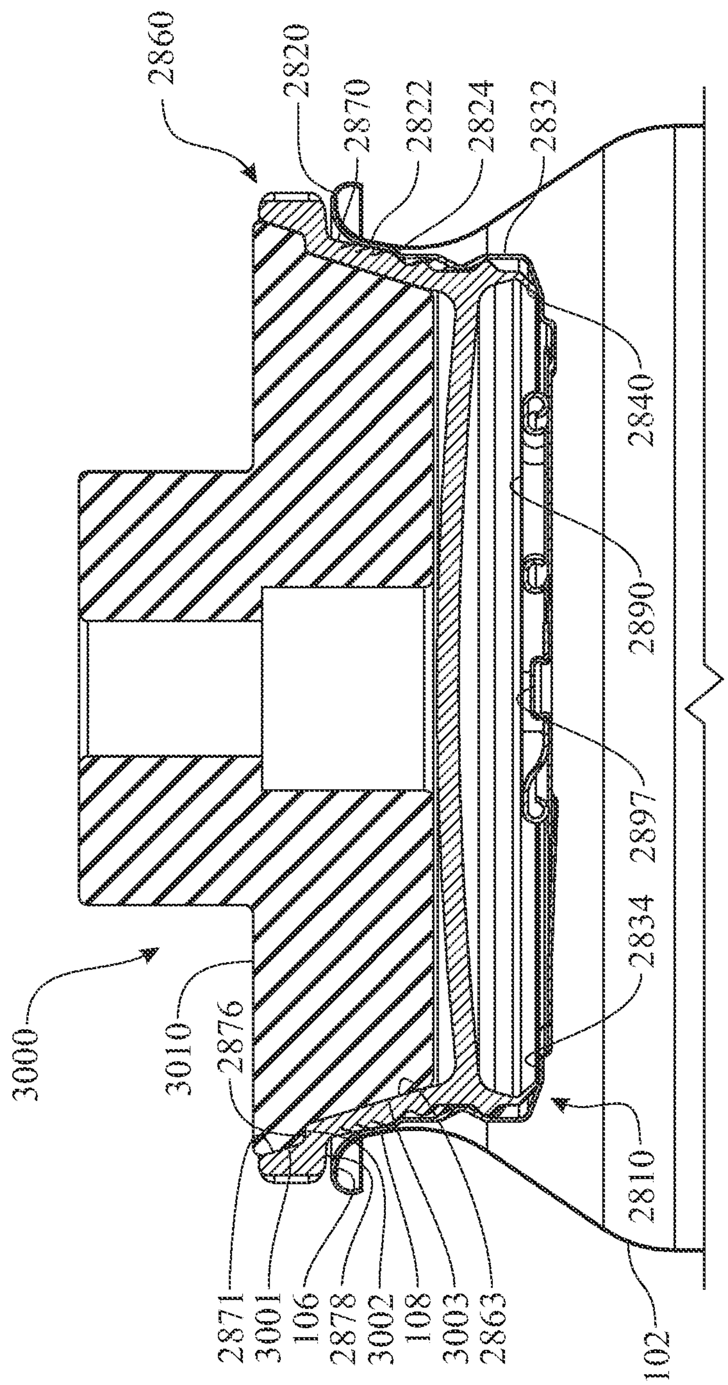
Figure 239:
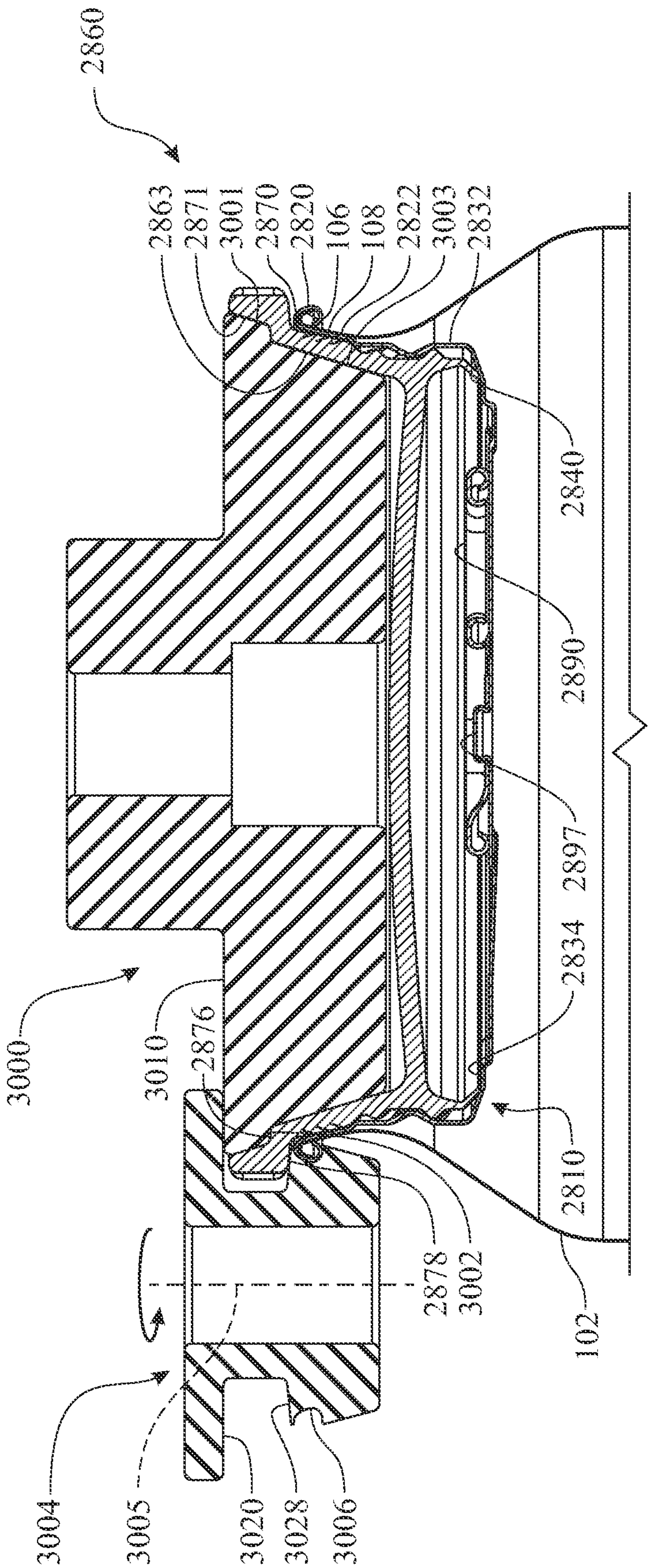
Figure 240:
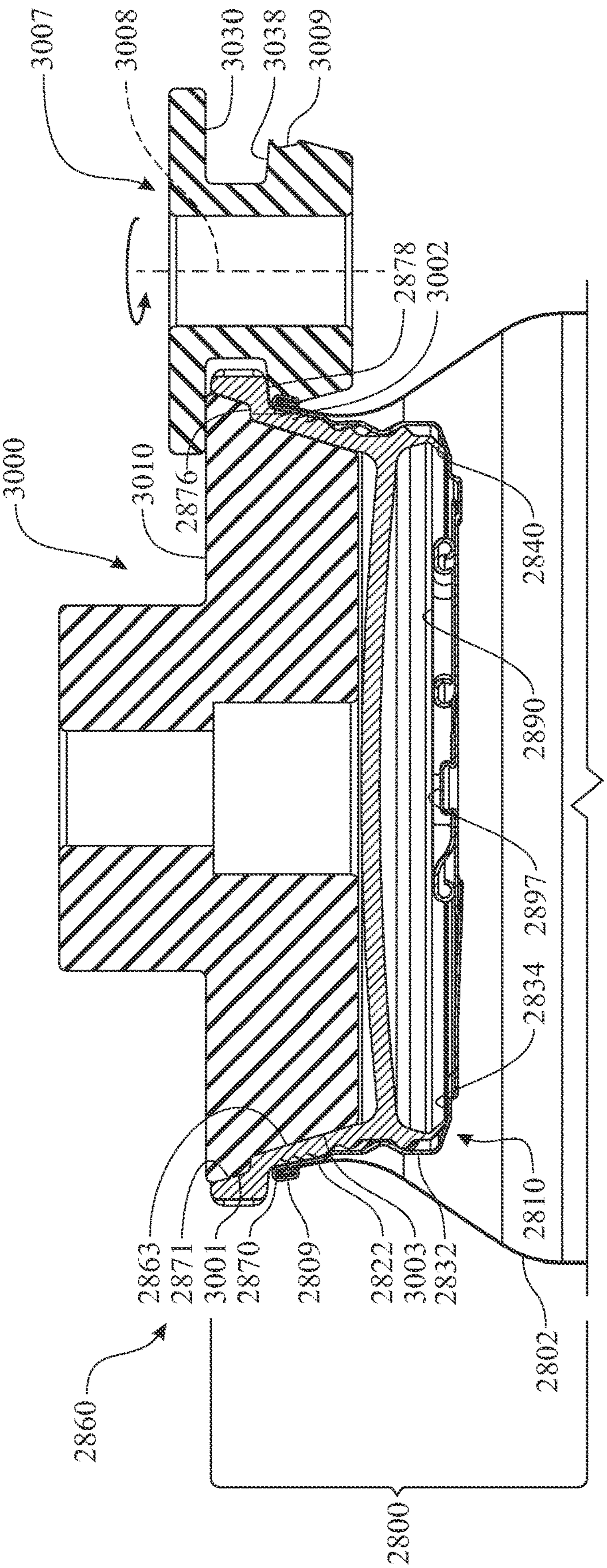
Figure 241:
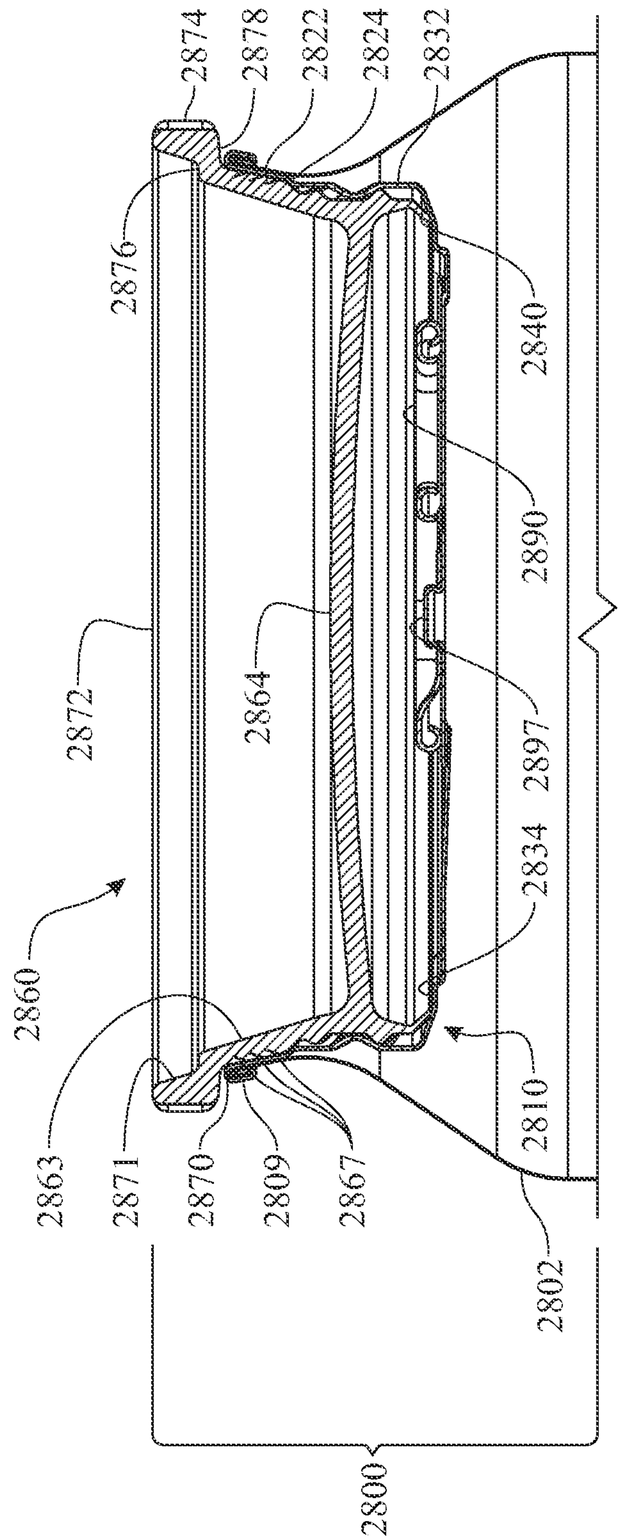
Figure 242:
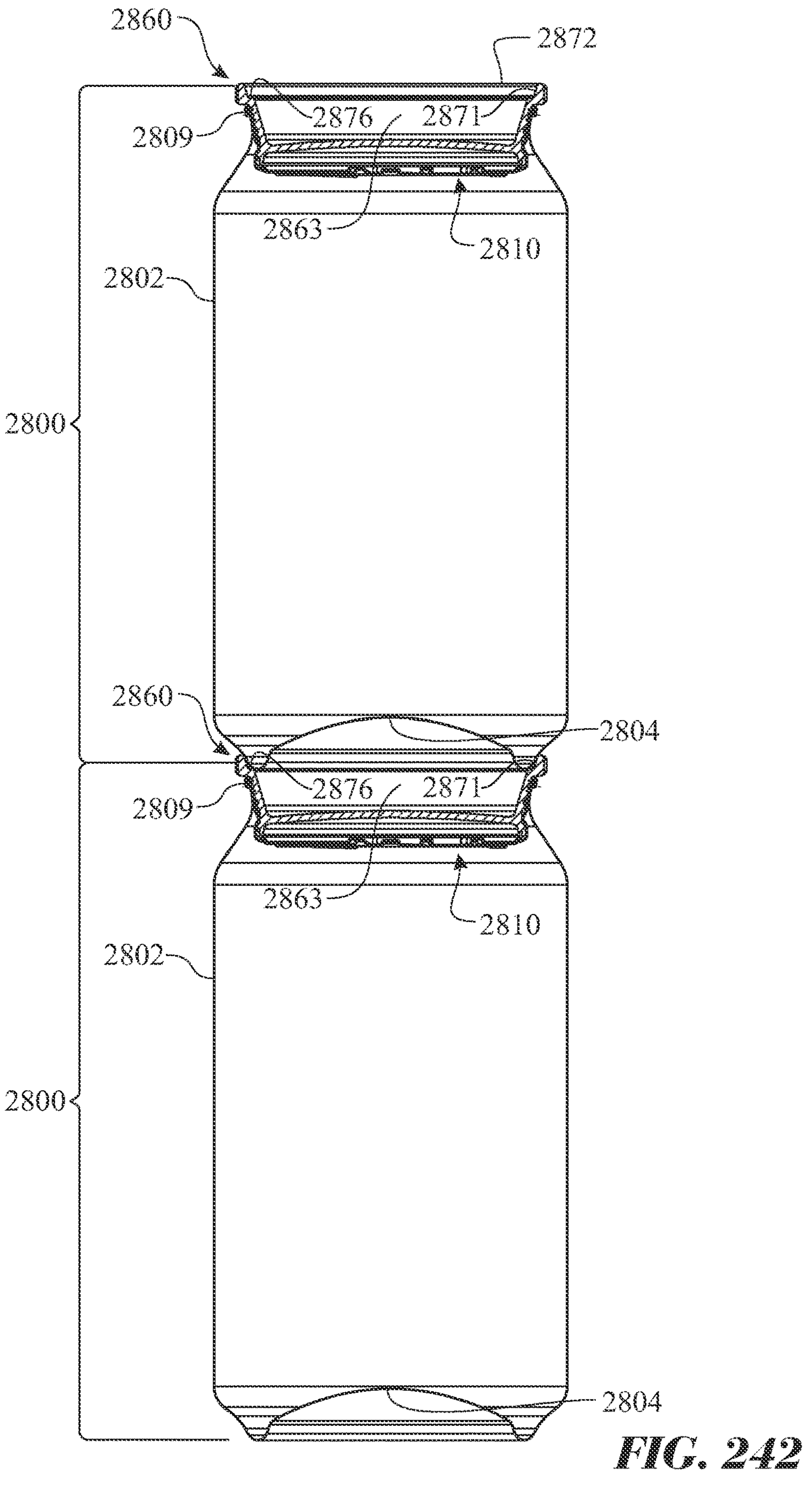
Figure 243:
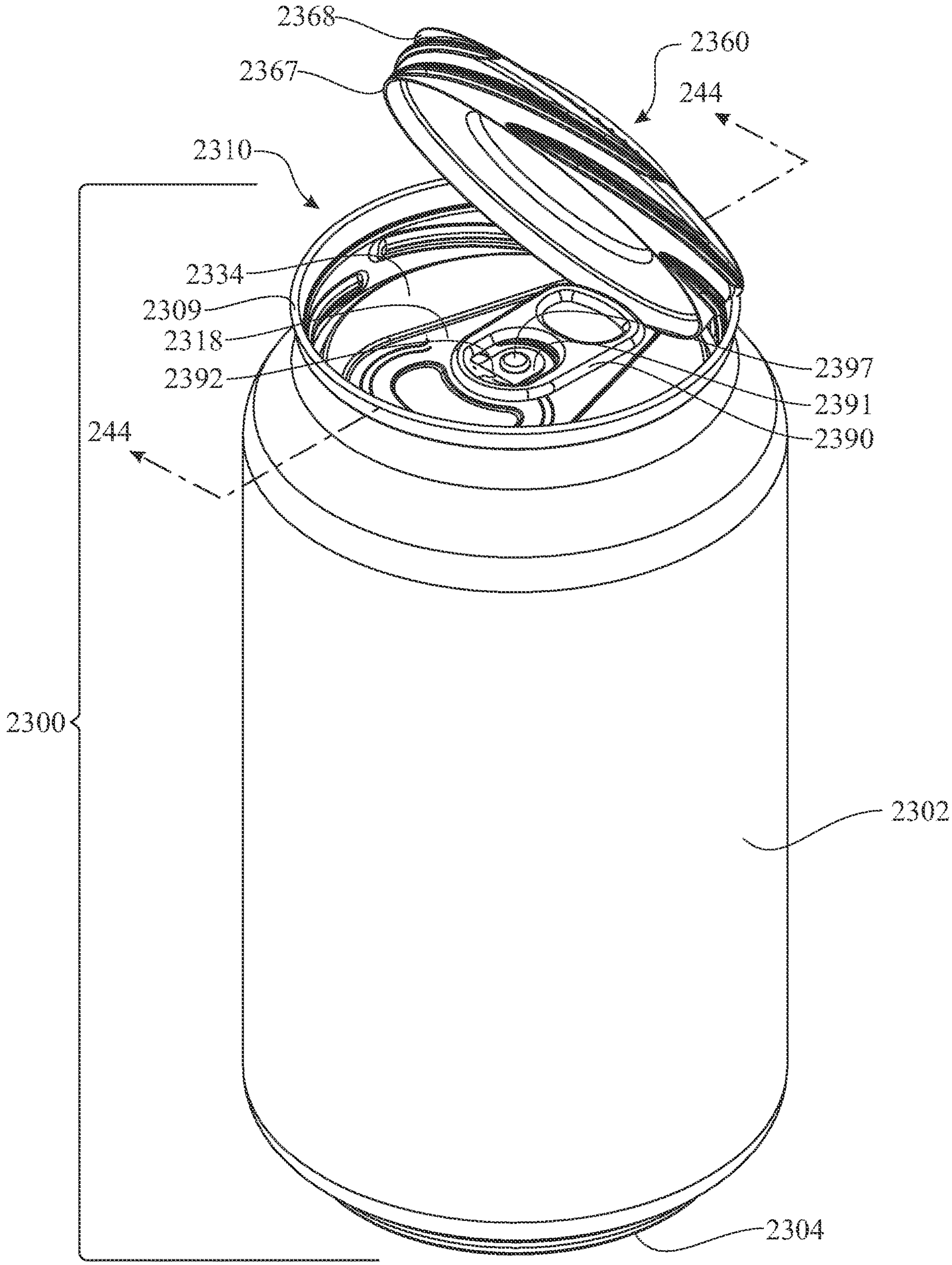
Figure 244:
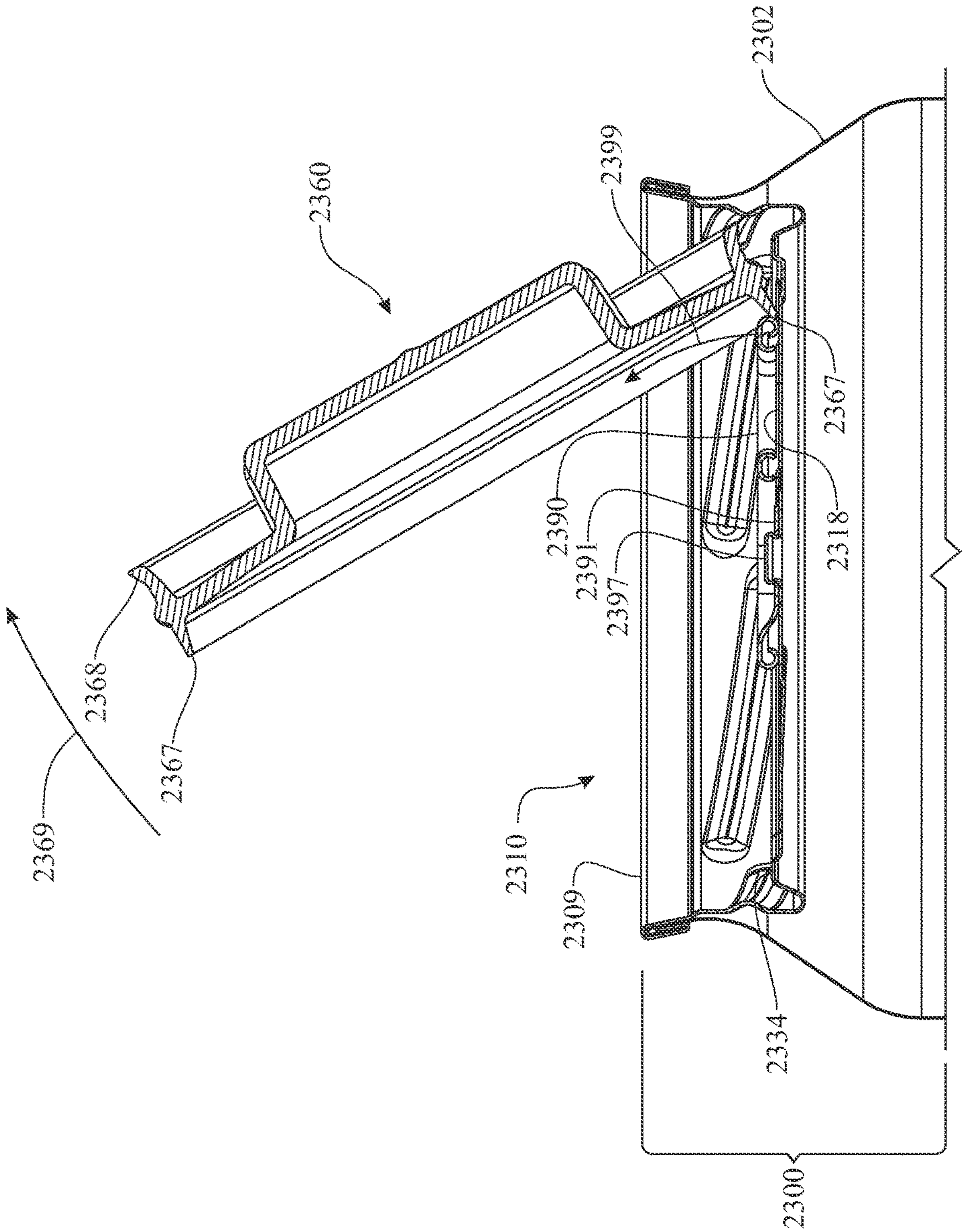

FIG. 117 presents a bottom isometric view of the cap originally introduced in FIG. 116, the cap further introducing: an offset sealing component;

FIG. 118 presents a top plan view of the cap originally introduced in FIG. 116;

FIG. 119 presents a top isometric exploded assembly view of the container lid originally introduced in FIG. 113 and the cap originally introduced in FIG. 116;

FIG. 120 presents a bottom isometric exploded assembly view of the container lid originally introduced in FIG. 113 and the cap originally introduced in FIG. 116;

FIG. 121 presents a top isometric assembly view of the container lid originally introduced in FIG. 113 and the cap originally introduced in FIG. 116, the assembly shown in a closed and sealed configuration;

FIG. 122 presents a top plan assembly view of the container lid originally introduced in FIG. 113 and the cap originally introduced in FIG. 116, the assembly shown having the cap rotated to an open, dispensing configuration;

FIG. 123 presents an isometric elevation section view of the container assembly including the container lid assembly introduced in FIG. 119, the section orientation being referenced by section line 123-123 of FIG. 122, the assembly shown having the cap rotated to an open, dispensing configuration;

FIG. 124 presents a top plan assembly view of the container lid originally introduced in FIG. 113 and the cap originally introduced in FIG. 116, the assembly shown in the closed and sealed configuration;

FIG. 125 presents an isometric elevation section view of the container assembly introduced in FIG. 124, the section orientation being referenced by section line 125-125 of FIG. 124, the assembly shown with the cap rotated to a closed and sealed configuration;

FIG. 126 presents a side elevation view of the container lid introduced in FIG. 113, the illustration introducing the series of functional segments associated with a travel path of a cam interface, which includes a downturn at a distal end of the cam interface, wherein the downturn retains the cap to the container lid;

FIG. 127 presents a top isometric view introducing another variant of the container lid introduced in FIG. 42, the variant is adapted to employ a tool rotating in a direction that is opposite to the direction of the cap introduced in the steps of FIGS. 60-65 for fracturing the score line and opening the tear panel from the bottom wall of the container lid;

FIG. 128 presents a bottom isometric view of the variant of the container lid introduced in FIG. 127;

FIG. 129 presents a top plan view of the variant of the container lid introduced in FIG. 127;

FIG. 130 presents a top isometric view introducing a tool for opening the container lid introduced in FIG. 127, the tool being comprising multiple incisors for fracturing the score line defining the tear panel of the container lid and multiple dispensing apertures for dispensing a volume stored within the container, the multiple, repeated features enabling multiple assembly orientations between the cap and the container lid;

FIG. 131 presents a bottom isometric view of the tool introduced in FIG. 130;

FIG. 132 presents a top plan view of the tool introduced in FIG. 130, the illustration presenting the tool installed onto the container assembly having one of the multiple dispensing apertures in alignment with the dispensing aperture of the container lid;

FIG. 133 presents a top isometric view of the tool introduced in FIG. 130 being assembled to the container assembly as configured in FIG. 124;

FIG. 134 presents a top isometric view of the container assembly comprising the container lid originally introduced in FIG. 127, the container assembly shown having the tear panel fractured from the container lid bottom wall and bent into a dispensing configuration;

FIG. 135 presents a top isometric section view of the container assembly, the container assembly being shown in the configuration presented in FIG. 134, the section being taken along section line 135-135 of FIG. 132;

FIG. 136 presents a top isometric view introducing yet another variant of the container lid introduced in FIG. 42, the variant of the container lid is adapted to employ a sealing configuration located above the cam tracks;

FIG. 137 presents a bottom isometric view of the variant of the container lid introduced in FIG. 136;

FIG. 138 presents a top isometric view introducing yet another variant of the cap introduced in FIG. 45 for use with the container lid introduced in FIG. 136, the variant of the cap is adapted to employ a sealing configuration located above the cam followers;

FIG. 139 presents a bottom isometric view of the cap originally introduced in FIG. 138, the cap further introducing: an annular sealing component;

FIG. 140 presents a top isometric exploded assembly view of the container lid originally introduced in FIG. 136 and the cap originally introduced in FIG. 138;

FIG. 141 presents a bottom isometric exploded assembly view of the container lid originally introduced in FIG. 136 and the cap originally introduced in FIG. 138;

FIG. 142 presents a top isometric assembly view of the container lid originally introduced in FIG. 136 and the cap originally introduced in FIG. 138;

FIG. 143 presents a sectioned elevation exploded assembly view of the container lid originally introduced in FIG. 136 and the cap originally introduced in FIG. 138, the section view taken along section line 143-143 of FIG. 142;

FIG. 144 presents a sectioned elevation assembly view of the container lid originally introduced in FIG. 136 and the cap originally introduced in FIG. 138, the section view taken along section line 143-143 of FIG. 142;

FIG. 145 presents a sectioned isometric top exploded assembly view of the container lid originally introduced in FIG. 136 and the cap originally introduced in FIG. 138, the section view taken along section line 143-143 of FIG. 142;

FIG. 146 presents a sectioned isometric top assembly view of the container lid originally introduced in FIG. 136 and the cap originally introduced in FIG. 138, the section view taken along section line 143-143 of FIG. 142;

FIG. 147 presents a top isometric view introducing yet another variant of the container lid introduced in FIG. 136, the variant of the container lid is exclusive of a container lid bottom wall;

FIG. 148 presents a bottom isometric view of the variant of the container lid introduced in FIG. 147;

FIG. 149 presents a top isometric view introducing a variant of the cap introduced in FIG. 138 for use with the container lid introduced in FIG. 147, the variant of the cap is exclusive of an incisor and exclusive a probe on the safety indicator;

FIG. 150 presents a bottom isometric view of the cap originally introduced in FIG. 149;

FIG. 151 presents a top isometric exploded assembly view of the container lid originally introduced in FIG. 147 and the cap originally introduced in FIG. 149;

FIG. 152 presents a bottom isometric exploded assembly view of the container lid originally introduced in FIG. 147 and the cap originally introduced in FIG. 149;

FIG. 153 presents a top isometric assembly view of the container lid originally introduced in FIG. 147 and the cap originally introduced in FIG. 149;

FIG. 154 presents a bottom isometric assembly view of the container lid originally introduced in FIG. 147 and the cap originally introduced in FIG. 149;

FIG. 155 presents a sectioned elevation exploded assembly view of the container lid originally introduced in FIG. 147 and the cap originally introduced in FIG. 149, the section view taken along section line 155-155 of FIG. 153;

FIG. 156 presents a sectioned elevation assembly view of the container lid originally introduced in FIG. 147 and the cap originally introduced in FIG. 149, the section view taken along section line 155-155 of FIG. 153;

FIG. 157 presents a sectioned isometric top exploded assembly view of the container lid originally introduced in FIG. 147 and the cap originally introduced in FIG. 149, the section view taken along section line 155-155 of FIG. 153;

FIG. 158 presents a sectioned isometric top assembly view of the container lid originally introduced in FIG. 147 and the cap originally introduced in FIG. 149, the section view taken along section line 155-155 of FIG. 153;

FIG. 159 presents a top isometric view introducing a variant of the cap introduced in FIG. 138 for use with the container lid introduced in FIG. 136, the variant introducing finger grip cavities, the incisor being formed within a bottom wall of one of the finger grip cavities;

FIG. 160 presents a bottom isometric view of the cap originally introduced in FIG. 159;

FIG. 161 presents a top isometric exploded assembly view of the container lid originally introduced in FIG. 136 and the cap originally introduced in FIG. 159;

FIG. 162 presents a bottom isometric exploded assembly view of the container lid originally introduced in FIG. 136 and the cap originally introduced in FIG. 159;

FIG. 163 presents a top isometric assembly view of the container lid originally introduced in FIG. 136 and the cap originally introduced in FIG. 159;

FIG. 164 presents a sectioned elevation exploded assembly view of the container lid originally introduced in FIG. 136 and the cap originally introduced in FIG. 159, the section view taken along section line 164-164 of FIG. 163;

FIG. 165 presents a sectioned elevation assembly view of the container lid originally introduced in FIG. 136 and the cap originally introduced in FIG. 159, the section view taken along section line 164-164 of FIG. 163;

FIG. 166 presents a sectioned top isometric exploded assembly view of the container lid originally introduced in FIG. 136 and the cap originally introduced in FIG. 159, the section view taken along section line 164-164 of FIG. 163;

FIG. 167 presents a sectioned top isometric assembly view of the container lid originally introduced in FIG. 136 and the cap originally introduced in FIG. 159, the section view taken along section line 164-164 of FIG. 163;

FIG. 168 presents a top isometric view introducing a variant of the cap introduced in FIG. 45 for use with the container lid introduced in FIG. 42, the variant introducing protruding finger grips which include an engaging flange;

FIG. 169 presents a bottom isometric view of the cap originally introduced in FIG. 168;

FIG. 170 presents a top isometric assembly view of the container lid originally introduced in FIG. 42 and the cap originally introduced in FIG. 168;

FIG. 171 presents a top isometric view introducing a resealable container cap torque enhancing tool for use with the cap originally introduced in FIG. 168;

FIG. 172 presents a bottom isometric view of the resealable container cap torque enhancing tool originally introduced in FIG. 171;

FIG. 173 presents an elevation partially exploded assembly section view of the resealable container cap torque enhancing tool originally introduced in FIG. 171, the tool being shown prior to being coupled to the cap, wherein the cap is shown assembled to the container lid, the section being taken along section line 173-173 of FIG. 170;

FIG. 174 presents an elevation partially assembly section view of the resealable container cap torque enhancing tool originally introduced in FIG. 171, the tool being shown coupled to the cap, wherein the cap is shown assembled to the container lid, the section being taken along section line 173-173 of FIG. 170;

FIG. 175 presents an isometric elevation partially exploded assembly section view of the resealable container cap torque enhancing tool originally introduced in FIG. 171, the tool being shown prior to coupled to the cap, wherein the cap is shown assembled to the container lid, the section being taken along section line 173-173 of FIG. 170;

FIG. 176 presents an isometric partially assembly section view of the resealable container cap torque enhancing tool originally introduced in FIG. 171, the tool being shown coupled to the cap, wherein the cap is shown assembled to the container lid, the section being taken along section line 173-173 of FIG. 170;

FIG. 177 presents a top isometric view of a first exemplary accessory for use with the container lid, the accessory being a cap and drinking straw assembly, the cap including a fixed inner cap liner and a rotatable outer cap component for securing the cap assembly to the container lid;

FIG. 178 presents a bottom isometric view of the cap and drinking straw assembly originally introduced in FIG. 177;

FIG. 179 presents a top isometric view of the cap and drinking straw assembly originally introduced in FIG. 177 shown as secured to the container assembly;

FIG. 180 presents a top isometric section view of the cap and drinking straw assembly, the illustration detailing the functions of the fixed inner cap liner and a rotatable outer cap component, the exemplary cap and drinking straw assembly being shown prior to being secured to the container assembly, the section being taken along section line 180-180 of FIG. 177;

FIG. 181 presents a top isometric section view of the cap and drinking straw assembly as shown in FIG. 180, the exemplary cap and drinking straw assembly being shown secured to the container assembly, the section being taken along section line 180-180 of FIG. 177;

FIG. 182 presents a top isometric view of a second exemplary accessory for use with the container lid, the accessory including a baby nipple;

FIG. 183 presents a top isometric view of a third exemplary accessory for use with the container lid, the accessory including a spill-proof children's cap;

FIG. 184 presents a top isometric view of a fourth exemplary accessory for use with the container lid, the accessory including a resealable sports bottle dispensing mechanism;

FIG. 185 presents a top isometric view of a sixth exemplary accessory for use with the container lid, the accessory including a rotating resealable fluid dispensing spout, the rotating resealable fluid dispensing spout being shown in a closed configuration;

FIG. 186 presents a top isometric view of the rotating resealable fluid dispensing spout originally introduced in FIG. 185, the rotating resealable fluid dispensing spout being shown in an open configuration;

FIG. 187 presents a top isometric view introducing a stay on tab (SOT) container lid, adapted to employ a cap for sealing an opened container, the illustration introducing helically shaped threads for engagement with corresponding helically shaped threads of the cap;

FIG. 188 presents a bottom isometric view of the stay on tab (SOT) container lid introduced in FIG. 187;

FIG. 189 presents a top plan view of the stay on tab (SOT) container lid introduced in FIG. 187;

FIG. 190 presents a top isometric view introducing a molded variant of a cap for use with the container lid introduced in FIG. 187, the variant of the cap includes a cylindrical grip feature;

FIG. 191 presents a bottom isometric view of the cap originally introduced in FIG. 190, the illustration of the cap further introducing an integral annular deforming cantilevered sealing components;

FIG. 192 presents a top isometric assembly view of the container lid originally introduced in FIG. 187 and the cap originally introduced in FIG. 190;

FIG. 193 presents a sectioned elevation exploded assembly view of the container lid originally introduced in FIG. 187 and the cap originally introduced in FIG. 190, the section view taken along section line 193-193 of FIG. 192;

FIG. 194 presents a sectioned elevation assembly view of the container lid originally introduced in FIG. 187 and the cap originally introduced in FIG. 190, the section view taken along section line 193-193 of FIG. 192;

FIG. 195 presents a magnified sectioned elevation view of the container lid assembly as shown in FIG. 194, wherein the illustration magnifies the flexure and the deformation of the annular deforming cantilevered sealing components of the cap that occurs during a sealing process between the container lid originally introduced in FIG. 187 and the cap originally introduced in FIG. 190;

FIG. 196 presents a top isometric view introducing a variant of the molded cap originally introduced in FIG. 190, the cap featuring a modified cylindrically shaped grip feature;

FIG. 197 presents a bottom isometric view of the cap originally introduced in FIG. 196, the illustration of the cap further introducing a disk shaped elastomeric sealing component;

FIG. 198 presents a top isometric assembly view of the container lid originally introduced in FIG. 187 and the cap originally introduced in FIG. 196;

FIG. 199 presents a sectioned elevation exploded assembly view of the container lid originally introduced in FIG. 187 and the cap originally introduced in FIG. 196, the section view taken along section line 199-199 of FIG. 198;

FIG. 200 presents a sectioned elevation assembly view of the container lid originally introduced in FIG. 187 and the cap originally introduced in FIG. 190, the section view taken along section line 199-199 of FIG. 198;

FIG. 201 presents a top isometric view introducing a variant of the stay on tab (SOT) container lid originally introduced in FIG. 187, wherein the container lid comprises a score line circumscribing a bottom wall enabling removal of a substantial portion of the bottom panel of the container lid, the illustration further introducing an elastomeric sealing composition disposed within a peripheral countersink of the container lid;

FIG. 202 presents a bottom isometric view of the variant of the stay on tab (SOT) container lid introduced in FIG. 201;

FIG. 203 presents a top plan view of the variant of the stay on tab (SOT) container lid introduced in FIG. 201;

FIG. 204 presents a top isometric view introducing a variant of the molded cap originally introduced in FIG. 190, the cap featuring a modified cylindrically shaped grip feature whereby the cylindrically shaped grip feature extends diametrically outward to a peripheral edge of the container cap;

FIG. 205 presents a top isometric view of the inverted cap originally introduced in FIG. 204, the illustration of the cap further introducing a function of the cap for use as a cup with measuring capabilities;

FIG. 206 presents a top isometric assembly view of the container lid originally introduced in FIG. 201 and the cap originally introduced in FIG. 204;

FIG. 207 presents a sectioned elevation exploded assembly view of the container lid originally introduced in FIG. 201 and the cap originally introduced in FIG. 204, the section view taken along section line 207-207 of FIG. 206;

FIG. 208 presents a sectioned elevation assembly view of the container lid originally introduced in FIG. 201 and the cap originally introduced in FIG. 204, the section view taken along section line 207-207 of FIG. 206;

FIG. 209 presents a magnified sectioned elevation view of the container lid assembly as shown in FIG. 208, wherein the illustration magnifies the engagement between a lower edge of the cap and the elastomeric sealing composition disposed within a peripheral countersink of the container lid that occurs during a sealing process between the container lid originally introduced in FIG. 201 and the cap originally introduced in FIG. 204;

FIG. 210 presents a top isometric view introducing a variant of the stay on tab (SOT) container lid originally introduced in FIG. 201, wherein the bossed helical threads of the socket sidewall are replaced by threads formed using an elastomeric compound disposed upon the cylindrical socket sidewall;

FIG. 211 presents a bottom isometric view of the variant of the stay on tab (SOT) container lid introduced in FIG. 210;

FIG. 212 presents a top plan view of the variant of the stay on tab (SOT) container lid introduced in FIG. 210;

FIG. 213 presents a top isometric view introducing a new version of a molded cap, the cap featuring a bossed bar-shaped grip feature designed to receive a linear force to generate a torque for rotating the cap in either a clockwise or counterclockwise direction;

FIG. 214 presents a bottom isometric view of the cap originally introduced in FIG. 213;

FIG. 215 presents a top isometric assembly view of the container lid originally introduced in FIG. 210 and the cap originally introduced in FIG. 213;

FIG. 216 presents a sectioned elevation exploded assembly view of the container lid originally introduced in FIG. 210 and the cap originally introduced in FIG. 213, the section view taken along section line 216-216 of FIG. 215;

FIG. 217 presents a sectioned elevation assembly view of the container lid originally introduced in FIG. 210 and the cap originally introduced in FIG. 213, the section view taken along section line 216-216 of FIG. 215;

FIG. 218 presents a magnified sectioned elevation view of the container lid assembly as shown in FIG. 217, wherein the illustration magnifies a forming by and engagement with a helical thread set of the cap and outer peripheral surface of an outer sidewall of the cap introduced in FIG. 213 and the elastomeric sealing composition disposed within a peripheral countersink and along an interior peripheral cylindrical socket surface of the container lid introduced in FIG. 210, that occurs during an initial insertion of the cap into the socket of the container lid and any subsequent sealing processes between the container lid and the cap;

FIG. 219 presents a top isometric view introducing a modified version of the current commercially available stay on tab (SOT) container lid, wherein threads are formed by applying an elastomeric compound onto a frustum shaped or angled chuck wall;

FIG. 220 presents a bottom isometric view of the modified version of the stay on tab (SOT) container lid introduced in FIG. 219;

FIG. 221 presents a top isometric view introducing a new version of a molded cap, the cap featuring a pair of pivoting grip features designed to receive a torsional force to generate a torque for rotating the cap in either a clockwise or counterclockwise direction, the cap further comprising features enabling seaming of the lid onto a container while a seaming chuck engages with the cap and the seaming forces are transferred through the cap onto the seaming panel and chuck wall of the container lid;

FIG. 222 presents a bottom isometric view of the cap originally introduced in FIG. 221, the illustration further introducing features to assist during the seaming process;

FIG. 223 presents a top isometric assembly view of the container lid originally introduced in FIG. 219 and the cap originally introduced in FIG. 221;

FIG. 224 presents a sectioned elevation exploded assembly view of the container lid originally introduced in FIG. 219 and the cap originally introduced in FIG. 221, the section view taken along section line 224-224 of FIG. 223;

FIG. 225 presents a sectioned elevation assembly view of the container lid originally introduced in FIG. 219 and the cap originally introduced in FIG. 221, the section view taken along section line 224-224 of FIG. 223, the illustration has the pair of pivotal grip features in a lowered configuration where each of the pair of pivotal grip features remain within a cavity of a body of the container lid, more specifically having the entire cap being below a chime of the container lid;

FIG. 226 presents a sectioned elevation assembly view of the container lid originally introduced in FIG. 219 and the cap originally introduced in FIG. 221, the section view taken along section line 224-224 of FIG. 223, the lid assembly being shown seamed onto a container body, the illustration further presenting the pair of pivotal grip features in an raised configuration where each of the pair of pivotal grip features extends upward from the cavity of the body of the container lid enabling a user to insert an object, such as a finger, through the pair of pivotal grip features for use;

FIG. 227 presents a top isometric view introducing a modified version of the stay on tab (SOT) container lid originally introduced in FIG. 187, wherein container lid is exclusive of a peripheral countersink and optionally includes a frustum shaped annular surface circumscribing a peripheral edge of the bottom wall and a mating edge of the cylindrical sidewall;

FIG. 228 presents a bottom isometric view of the modified version of the stay on tab (SOT) container lid introduced in FIG. 227;

FIG. 229 presents a top isometric view introducing a new version of a molded cap, the cap featuring a cylindrically shaped grip feature having a exterior diameter that extends beyond the cap exterior sidewall, defining a lower annular edge;

FIG. 230 presents a bottom isometric view of the cap originally introduced in FIG. 229, the illustration further introducing at least one integral, radially extending flexible sealing feature extending radially outward from an exterior surface of the cylindrical sidewall and an annular shaped flexible lower sealing edge of the cylindrical sidewall (in a generally axial direction);

FIG. 231 presents a top isometric assembly view of the container lid originally introduced in FIG. 227 and the cap originally introduced in FIG. 229, wherein the illustration demonstrates, when assembled, the cylindrical grip feature extends radially to a position partially covering the seaming panel prior to assembly onto the container body;

FIG. 232 presents a bottom isometric assembly view of the container lid originally introduced in FIG. 227 and the cap originally introduced in FIG. 229;

FIG. 233 presents a sectioned elevation exploded assembly view of the container lid originally introduced in FIG. 227 and the cap originally introduced in FIG. 229, the section view taken along section line 233-233 of FIG. 231, wherein the radially extending flexible sealing feature and the annular shaped flexible lower sealing edge of the container cap are shown in a relaxed, uncompressed state;

FIG. 234 presents a sectioned elevation assembly view of the container lid originally introduced in FIG. 227 and the cap originally introduced in FIG. 229, the section view taken along section line 233-233 of FIG. 231, wherein the radially extending flexible sealing feature and the annular shaped flexible lower sealing edge are shown in a compressed state, each sealing feature providing a respective seal between the cap and the container lid;

FIG. 235 presents a magnified sectioned elevation view of the container lid assembly as shown in FIG. 234, wherein the illustration magnifies the compressed state of the radially extending flexible sealing feature and the annular shaped flexible lower sealing edge are shown in a compressed state, each sealing feature providing a respective seal between the cap and the container lid when the cap originally introduced in FIG. 229 is inserted into the container lid originally introduced in FIG. 227;

FIG. 236 presents a sectioned elevation assembly view of a series of container lids originally introduced in FIG. 227 and a respective series of container caps originally introduced in FIG. 229 placed into a nested configuration for storage, conveyance, shipping, as well as for use during assembly onto container bodies, and any other suitable purpose;

FIG. 237 presents a sectioned elevation assembly view of the container lid introduced in FIG. 227 and the cap introduced in FIG. 229 assembled to one another in preparation for seaming onto a container body, the section orientation being referenced by section line 233-233 of FIG. 231, the illustration focusing on an series of steps for seaming the container lid assembly onto the container body;

FIG. 238 presents a sectioned elevation view of the container lid assembly process initiated in FIG. 237, wherein the illustration presents a second subsequent step from the configuration introduced in FIG. 237, wherein a seaming chuck applies pressure onto the cap and the cap transfers the applied force onto the container lid to properly seat and retain the container lid in position on the container body;

FIG. 239 presents a sectioned elevation view of the container lid assembly process initiated in FIG. 237, wherein the illustration presents a third subsequent step from the configuration introduced in FIG. 237, wherein a seaming panel of the container lid and a seaming flange of the container body are rolled about one another, the illustration detailing a process of forming a seam wherein the seaming chuck retains pressure on the cap and the cap transfers the applied retaining force onto the container lid, a seaming roller is configured to initiate a forming of a seam, exclusive of any contact with the container cap;

FIG. 240 presents a sectioned elevation view of the container lid assembly process initiated in FIG. 237, wherein the illustration presents a fourth subsequent step from the configuration introduced in FIG. 237, wherein the rolled seaming panel and seaming flange are compressed finalizing the seaming process;

FIG. 241 presents a sectioned elevation view of the container assembly, the illustration being shown prior to flexure and deformation of the container lid assembly which occurs during a retort or purification process during bottling, the section orientation being referenced by section line 233-233 of FIG. 231;

FIG. 242 presents a sectioned elevation view exemplifying a stacking capability of a plurality of completed container assemblies comprising the container lid assembly originally introduced in FIG. 231 and a bottom formation of the container body, wherein the bottom formation of the container body nests within an upper cavity formed within the container cap;

FIG. 243 presents an isometric top view of an exemplary container, the illustration demonstrating a process of using a cap to aid in opening a respective stay on tab container lid; and FIG. 244 presents a sectioned elevation view of the exemplary container as presented in FIG. 243, the section orientation being referenced by section line 233-233 of FIG. 231, the illustration demonstrating the process of using the cap to aid in opening the respective stay on tab container lid.

Like reference numerals refer to like parts throughout the various views of the drawings.

DETAILED DESCRIPTION OF THE PRESENT INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. In other implementations, well-known features and methods have not been described in detail so as not to obscure the invention. For purposes of description herein, the terms "upper", "lower", "left", "right", "front", "back", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments that may be disclosed herein are not to be considered as limiting, unless the claims expressly state otherwise.

A container 100, exemplified as a beverage container in FIGS. 1 through 12, includes a container cylindrical sidewall 202, a container closed container closed bottom wall 204, integrally formed with the container cylindrical sidewall 102 and a resealable container lid 110 connected to the container cylindrical sidewall 102 at the end opposite the container closed container closed bottom wall 204. In the illustrated embodiment, the container 100 is a beverage container commonly referred to as a can, wherein the container closed container closed bottom wall 204 and the container cylindrical sidewall 102 are formed from a single piece of aluminum material, using otherwise known processes. The aluminum material is a lightweight aluminum alloy commonly used in the beverage can industry. The resealable container lid 110 is preferably made of the same lightweight aluminum alloy material, and is joined at the upper end of the sidewall through likewise known processes. The resealable container lid 110 includes a cap receiving socket 130 which extends downwardly into the container 100 from a resealable container lid upper surface 114. The cap receiving socket 130 is formed near a peripheral edge or lip of the resealable container lid 110 as is customary in the art, to allow drinking from the container 100. A resealable container cap 160 fits into the cap receiving socket 130 and engages same in a manner described in more detail below. The container cylindrical sidewall 202 of the container 100 is preferably tapered at both the upper and lower ends to provide greater structural integrity, particularly for use with pressurized contents, such as when used for carbonated beverages.

The exemplary container cylindrical sidewall 102 is shown has being cylindrical. It is understood that the container sidewall 102 can be of any suitable shape. The shape of the tubular container body sidewall could be one suitable shape. Examples of non-cylindrical sidewalls include:

a. Cylindrical,
b. Spherical,
c. Conical,
d. Polygonal, or
e. Contoured tubular (examples of contoured tubular sidewalls include: COKE bottle, BUDWEISER BOWTIE can, and a HEINEKEN Keg Can).

The resealable container lid 110 has an outer perimeter that is connected to the upper open end of the container cylindrical sidewall 102 of the beverage container, using known processes, to form an enclosure which contains a beverage. Beverages contained therein are not limited, but include carbonated or non-carbonated beverages, and could also include foodstuffs, and non-edible products. The cap receiving socket 130 is integrally formed in the resealable container lid upper surface 114 of the resealable container lid 110 and includes a cap receiving socket cylindrical sidewall 132, which extends downwardly into the container 100, and a cap receiving socket bottom wall 134. A cap receiving socket bottom panel circular score line 136 is formed in the cap receiving socket bottom wall 134 in order to create a cap receiving socket bottom panel tear panel 138 (see FIGS. 13B, 13C and 13D) which is pushed into the can when the can is opened. In the opened position, the cap receiving socket bottom panel tear panel 138 remains connected to the cap receiving socket bottom wall 134 due to the fact that the cap receiving socket bottom panel circular score line 136 does not make a complete circle or loop; a tear panel hinge 139 is created where the cap receiving socket bottom wall 134 is not scored (see FIG. 5).

Figure 9:
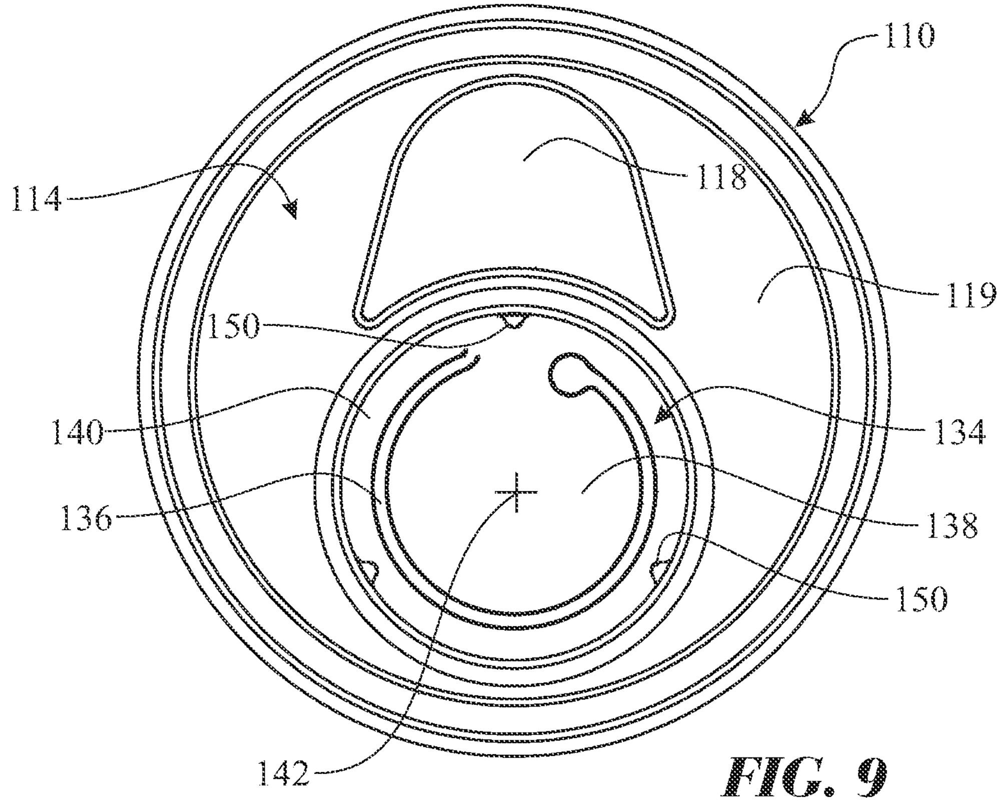
FIG. 9 presents a top view of the exemplary container originally introduced in FIG. 1, wherein the illustration excludes the cap to introduce projections inside the socket for engaging with cam surfaces of the cap.

As seen in figures, the resealable container cap 160 is sized to fit substantially within the cap receiving socket 130, and includes a flat annular cap bottom sealing surface 167 which is disposed between the cam shaped cap bottom surface 166 and the cap's resealable container cap cylindrical sidewall 162. In FIG. 9, the cap receiving socket bottom wall 134 of the cap receiving socket 130 may include a cap receiving socket bottom panel flat annular surface 140 which is disposed between the cap receiving socket cylindrical sidewall 132 and the cap receiving socket bottom panel circular score line 136. When assembled and in the "resealed" position shown in FIG. 13D, the flat annular cap bottom sealing surface 167 of the resealable container cap 160 comes into contact with the cap receiving socket bottom panel flat annular surface 140 of the bottom of the cap receiving socket 130 to effectively reseal the container 100.

The resealable container lid 110 has a shallow, resealable container lid upper surface reinforcement formation 118 which serves two purposes. First, the resealable container lid upper surface reinforcement formation 118 acts as a stiffening structure to provide greater strength to the resealable container lid 110. This is particularly advantageous if the resealable container lid 110 is to be made of the same aluminum alloy as the container cylindrical sidewall 102 and container closed container closed bottom wall 204 of the container 100. Secondarily, the resealable container lid upper surface reinforcement formation 118 adds a familiar look to consumers who are accustomed to the prior art beverage containers employing a pull tab that is operated first in an opening direction, and then secondly, in a seated direction, where the hinged pull tab is positioned after opening.

Figure 2:
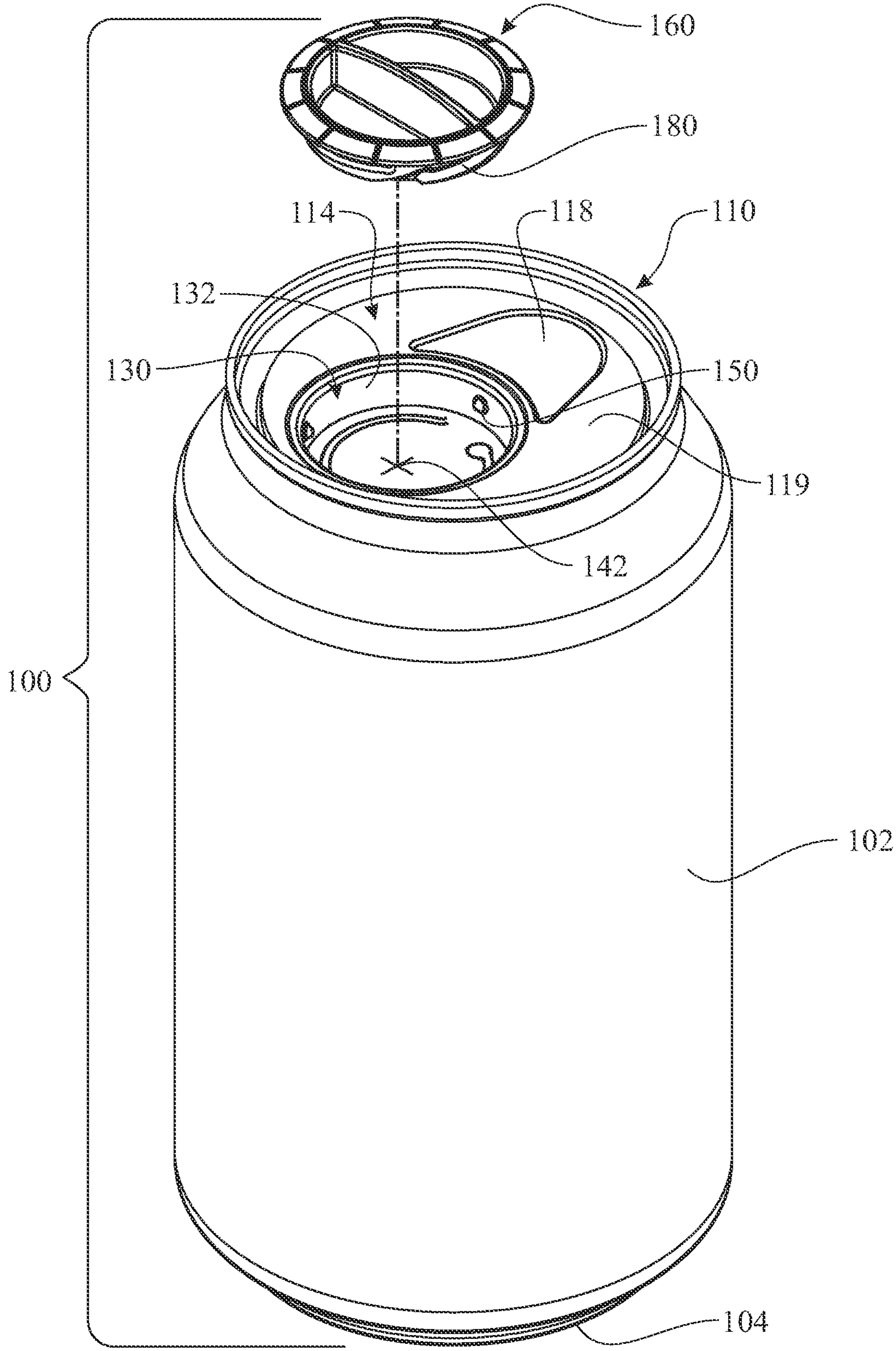
FIG. 2 presents a side isometric exploded assembly view of the container introduced in FIG. 1, wherein the illustration reveals features of a cap and a socket of the exemplary container.
Figure 3:
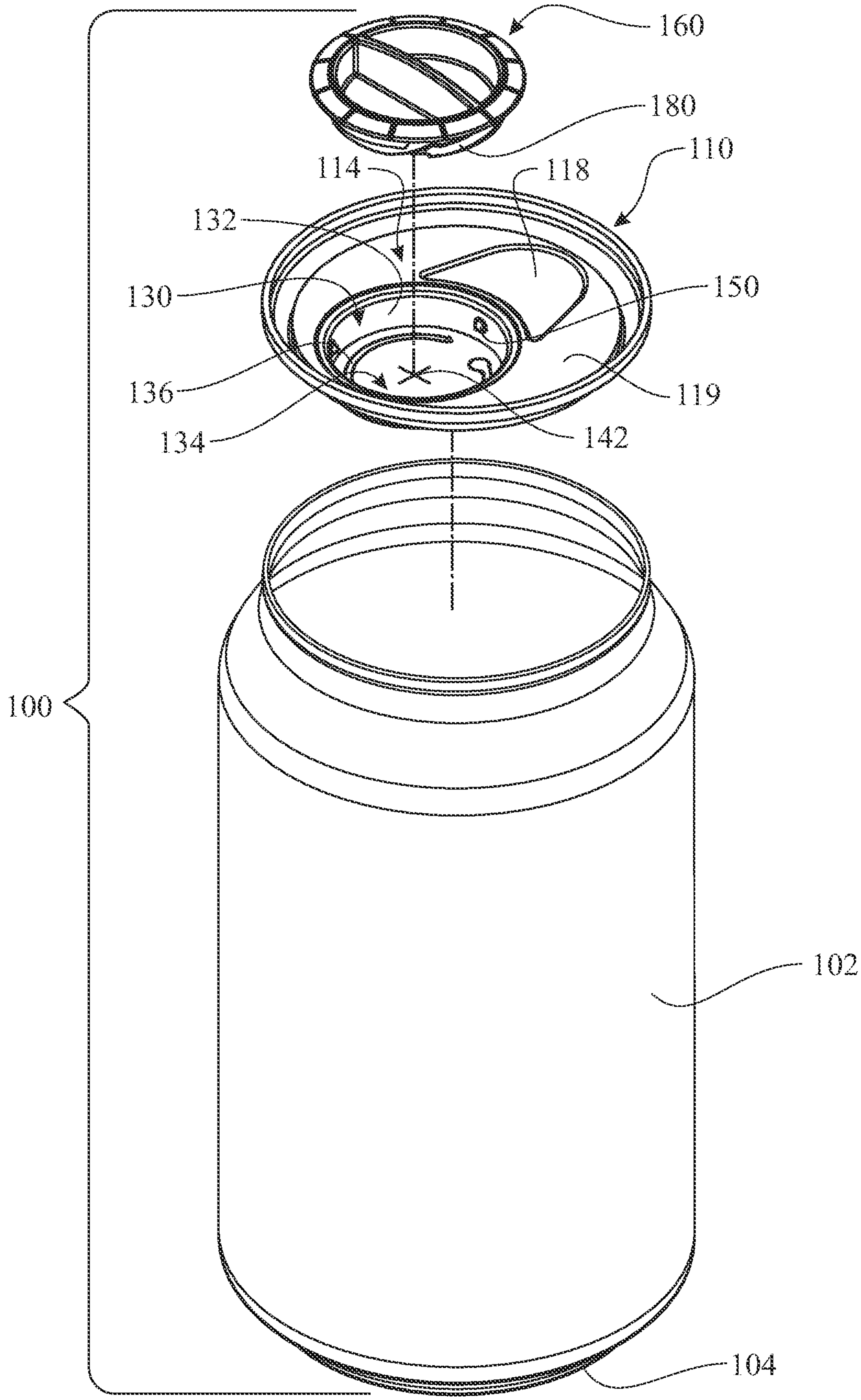
FIG. 3 presents a side isometric exploded assembly view of the container introduced in FIG. 1, wherein the illustration additionally separates the lid and the exemplary container body.
Figure 4:
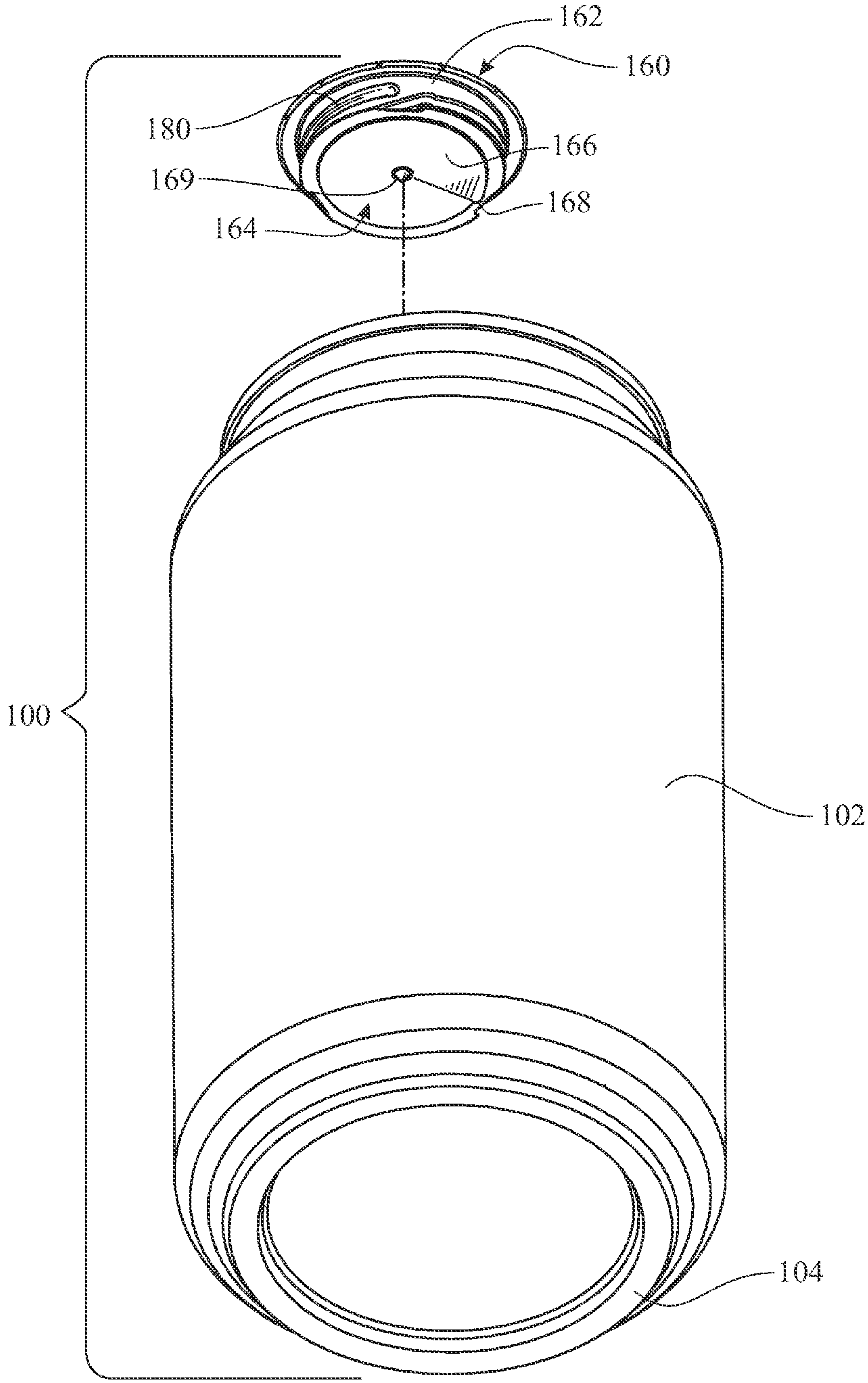
FIG. 4 presents a bottom isometric exploded assembly view of the container as shown in FIG. 2.
Figure 5:
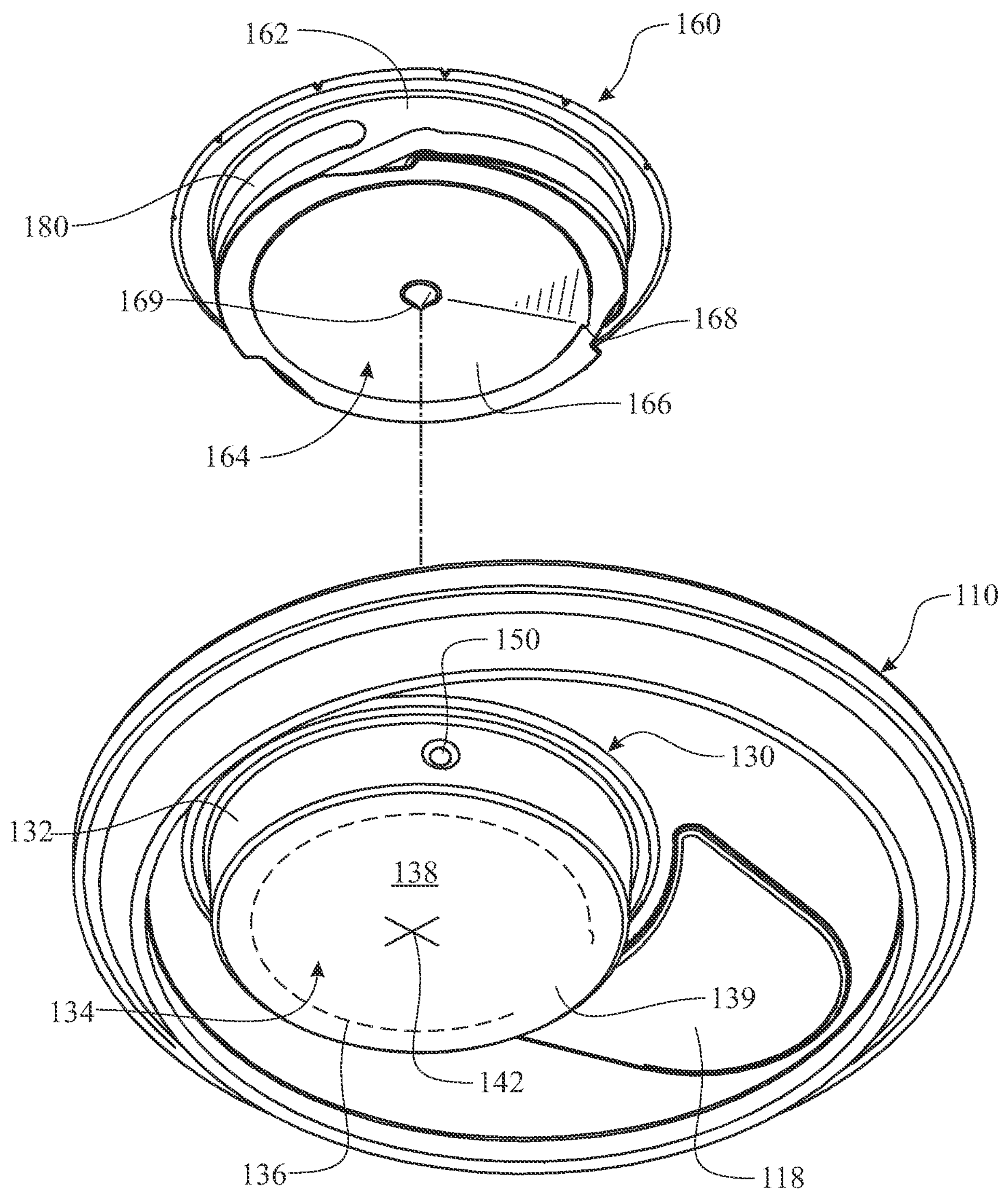
FIG. 5 presents an enlarged, bottom isometric exploded assembly view of the lid and the cap of the exemplary container introduced in FIG. 1.

As shown in FIGS. 2, 3 and 5, the cap receiving socket cylindrical sidewall 132 of the cap receiving socket 130 has a plurality of equally spaced socket sidewall cam engaging projections 152, 154, 156 (examples of a container cap rotational and axial guide features), disposed substantially on the same plane and being integrally formed in the sidewall 22. FIG. 5 shows one protrusion as an indentation or recess, since FIG. 5 shows the outer cylindrical sidewall 132 of the resealable container lid 110, whereas the other figures show the inner cap receiving socket cylindrical sidewall 132 of the resealable container lid 110. The socket sidewall cam engaging projections 152, 154, 156 cooperate with the resealable container cap 160 in a manner described below in order to open and reseal the container 100.

Figure 1:
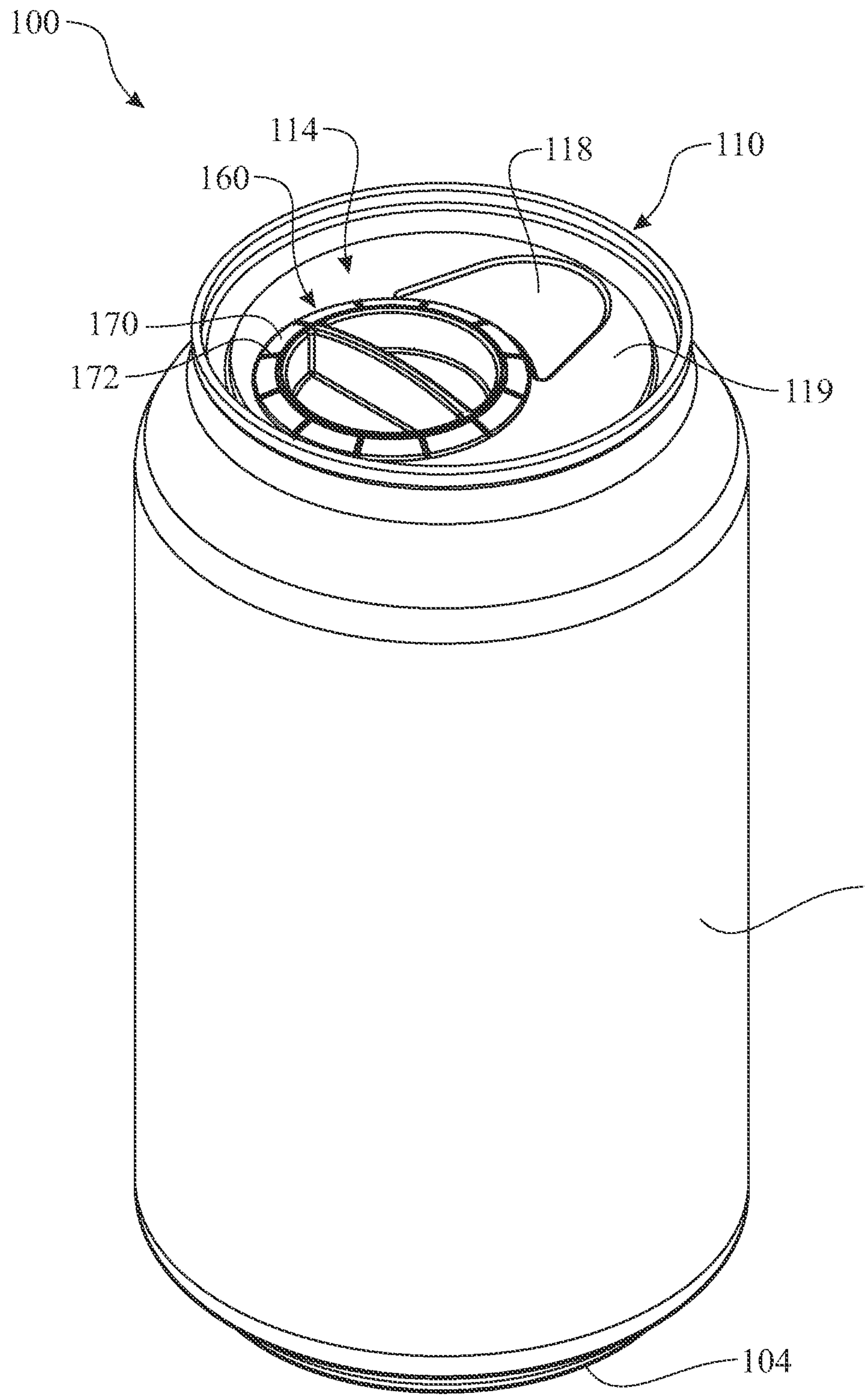
FIG. 1 presents a side isometric view introducing an exemplary container in accordance with the present invention.
Figure 6:
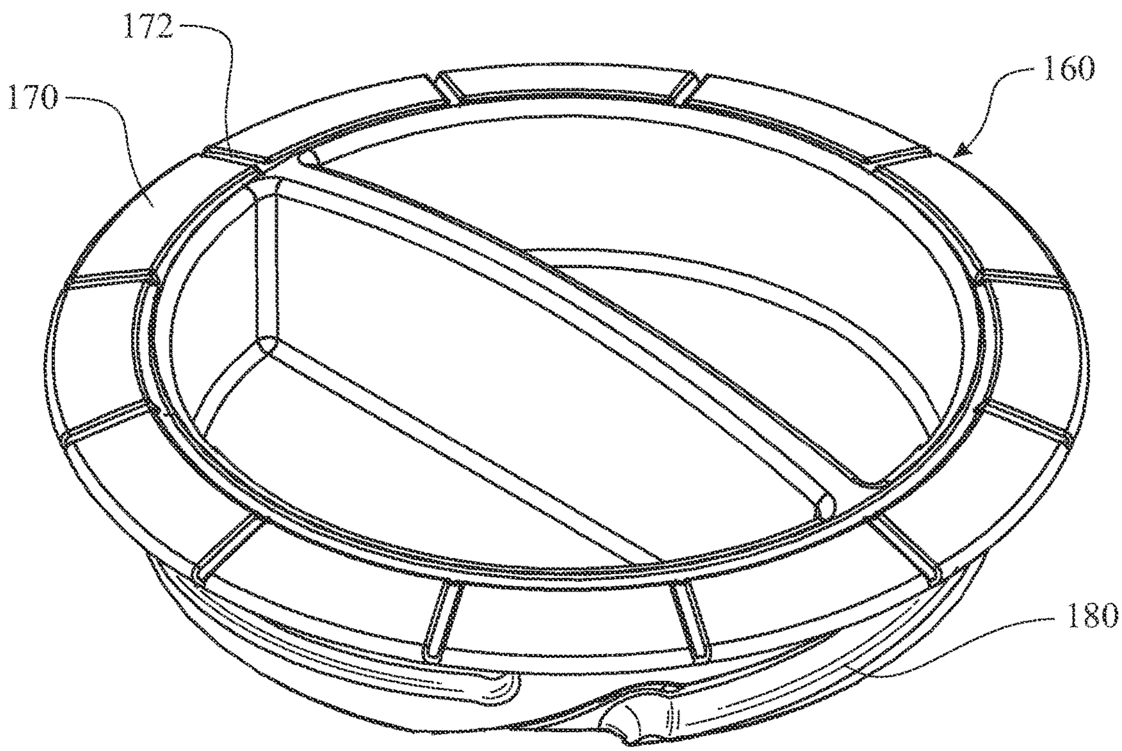
FIG. 6 presents an enlarged, top and side isometric view of the cap originally introduced in FIG. 1.
Figure 7:
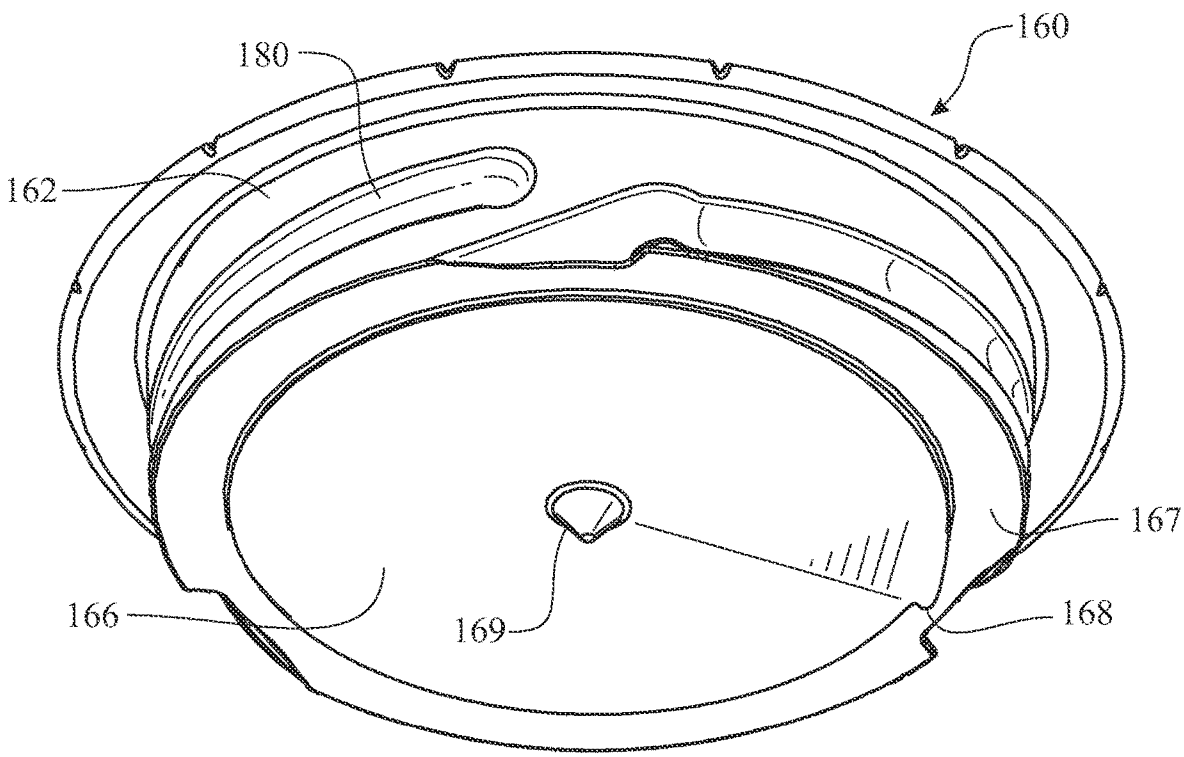
FIG. 7 presents an enlarged, bottom and side isometric view of the cap originally introduced in FIG. 1.

Referring to FIGS. 5-7, the resealable container cap 160 has a radially extending cap skirt 170 which acts as a tamper proof indicator. As seen in FIG. 1, prior to opening the container 100, the radially extending cap skirt 170 seats flush with the resealable container lid planar upper surface outer segment 119 of the resealable container lid 110. The skirt is integrally formed with the resealable container cap 160, which is preferably made of plastic material. The radially extending cap skirt 170 includes a series of radially extending cap skirt frangible score lines 172, extending radially outwardly, which are operable to break during the opening operation of the can. The breaking of the score lines 172 is effected by the skirt 170 being driven downwardly as the resealable container cap 160 is twisted or rotated and thereby advances downwardly into the cap receiving socket 130. Opening of the beverage container will thus be evident by the broken score lines 172 of the radially extending cap skirt 170, and preferably, by the sections of the radially extending cap skirt 170 that are formed by the broken score lines 172 extending at an angle upwardly, thus extending radially outwardly and radially upwardly.

The resealable container cap 160 is preferably made of a molded plastic material, is sized to fit substantially within the cap receiving socket 130, and includes a cam shaped cap bottom surface 166 formed at the lower or inner end of a resealable container cap cylindrical sidewall 162. The cam shaped cap bottom surface 166 may include an integrally formed sharp or pointed offset projecting incisor 168 disposed offset to the center axis of the resealable container cap 160 and extending downwardly into the cap receiving socket 130 when the resealable container cap 160 is assembled in the cap receiving socket 130. When assembled, the offset projecting incisor 168 is disposed immediately above the cap receiving socket bottom panel circular score line 136, so that when the resealable container cap 160 moves downwardly during opening of the container 100 offset projecting incisor 168 punctures the can at the beginning of the cap receiving socket bottom panel circular score line 136, next to the tear panel hinge 139, then progressively propagates the rupture along the cap receiving socket bottom panel circular score line 136 to its terminus on the opposite end of the tear panel hinge 139.

The cam shaped cap bottom surface 166 may also include a centered projecting incisor 169 disposed on the center axis of the resealable container cap 160 and extending downwardly into the cap receiving socket 130 when the resealable container cap 160 is assembled in the cap receiving socket 130. When assembled, the projection 169 is disposed immediate above a cap receiving socket bottom panel centered "X" shaped score line 142, so that when the resealable container cap 160 moves downwardly during opening of the container, the projection punctures the can at the cap receiving socket bottom panel centered "X" shaped score line 142, thereby relieving internal pressure and assisting in the rupturing of the cap receiving socket bottom panel circular score line 136 by the offset projecting incisor 168.

The opening operation of the container 100 is made possible by forming a cam structure between the cap receiving socket 130 and the resealable container cap 160. In particular, cam groove surfaces 181, 182, 183 are formed in the resealable container cap cylindrical sidewall 162 of the resealable container cap 160. The socket sidewall cam engaging projections 152, 154, 156 are fitted into and engage the cam groove surfaces 181, 182, 183 such that when the resealable container cap 160 is hand-twisted by the consumer, rotational motion of the resealable container cap 160 is converted into linear motion of the resealable container cap 160 thus driving the cap in a downward direction relative to the cap receiving socket 130. As the resealable container cap 160 moves downwardly, the cap receiving socket bottom panel circular score line 136 is ruptured by the offset projecting incisor 168, then progressively propagates the rupture along the cap receiving socket bottom panel circular score line 136 to its terminus. In an alternate embodiment, an optional cap receiving socket bottom panel centered "X" shaped score line 142 may be ruptured by the centered projecting incisor 169 immediately before the cap receiving socket bottom panel circular score line 136 is ruptured by the offset projecting incisor 168, to thereby relieve internal pressure and assist in the rupture of the cap receiving socket bottom panel circular score line 136 by the offset projecting incisor 168.

Figure 8:
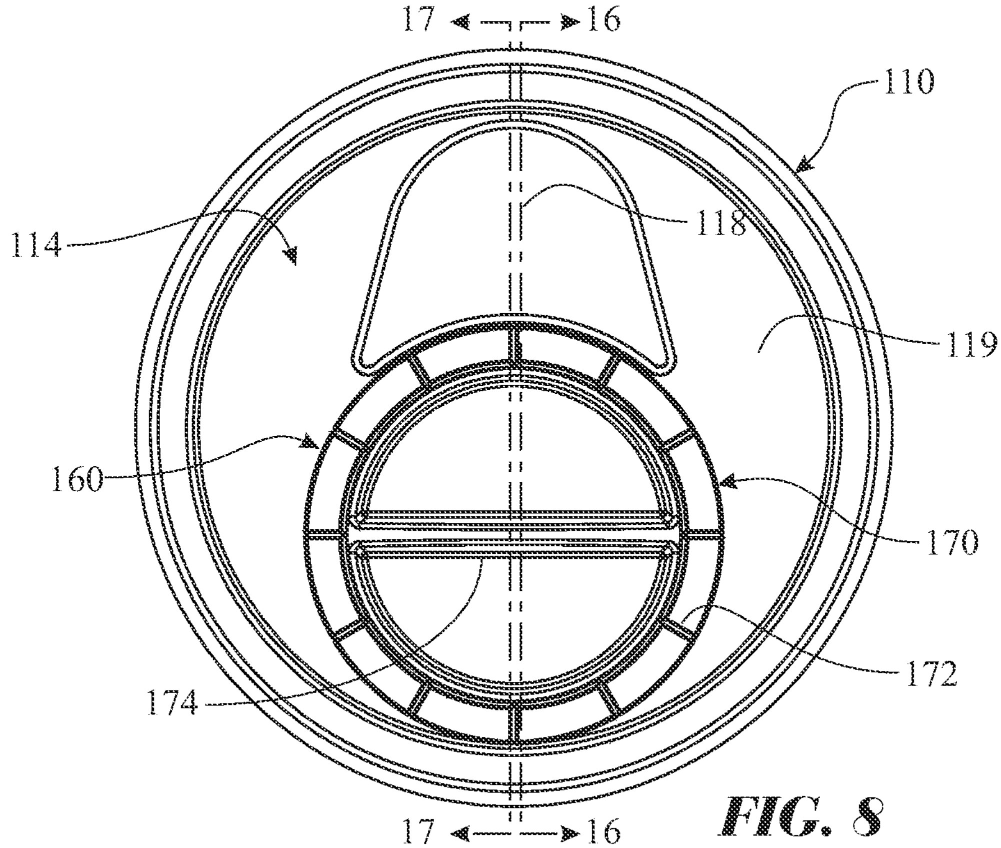
FIG. 8 presents a top view of the exemplary container originally introduced in FIG. 1, wherein the illustration includes the cap shown in an un-opened position.

As shown in FIG. 8, the resealable container cap 160 includes a resealable container cap grip element 174 for the consumer to grab when ready to open the beverage container, and also, as described below, for resealing the beverage container after opening. Depending on the contour of the cam surfaces and their direction of orientation, the cap can be rotated in one direction, preferably clockwise for opening, and then in the opposite direction, counterclockwise, to remove the cap during consumption of beverage, and then again back to the can-opening direction for resealing the beverage container if the contents are not entirely consumed. Symmetry of disposition of the three socket sidewall cam engaging projections 152, 154, 156 (examples of a container cap rotational and axial guide features) is shown in FIG. 9, wherein the three socket sidewall cam engaging projections 152, 154, 156 are located at approximately equal angular intervals of 120 degrees. Each projection engages a corresponding cam groove surface 181, 182, 183, more specifically, a first cam groove surface 181, a second cam groove surface 182, and a third cam groove surface 183 (examples of a container cap rotational and axial guide features). As shown in the illustrated embodiment, the resealable container cap cylindrical sidewall 162 of the resealable container cap 160 would be contoured, as by forming grooves, to form three cam groove surfaces 181, 182, 183. The cam surfaces or features 181, 182, 183 are shaped and sloped in a manner designed to cause the resealable container cap 160 to advance into an opening position without more than a quarter to half a turn, and as measured in radians, this would be no more than 1 to 2 radians. The number of projections and cam elements can be varied, although three provides a balance between cost and effectiveness.

Figure 10:
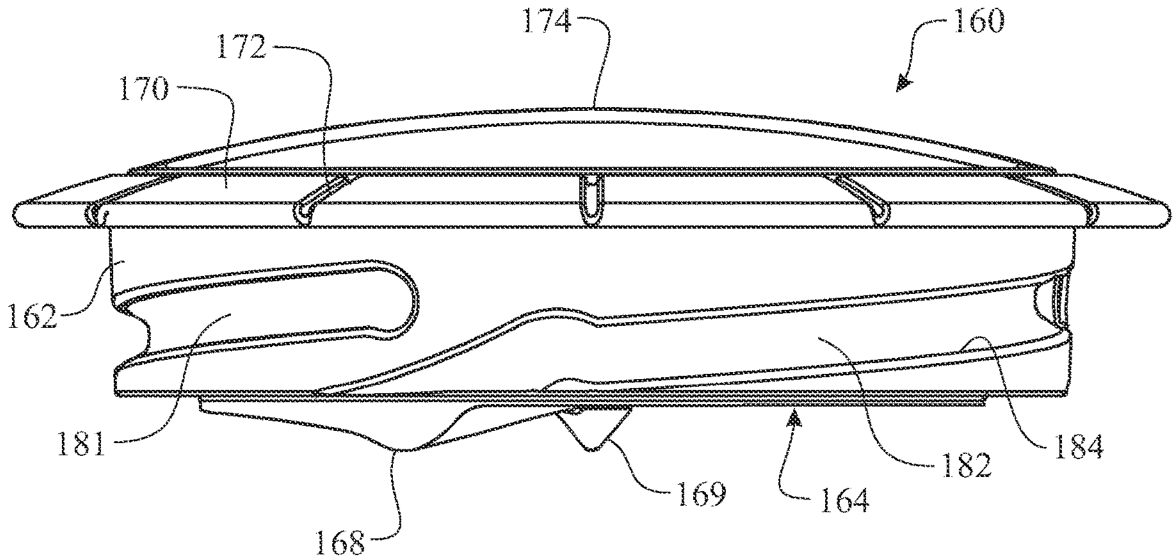
FIG. 10 presents an enlarged side elevation view of the cap, wherein the illustrations present details of the cam groove surfaces formed on a cylindrical sidewall of the cap.
Figure 11:
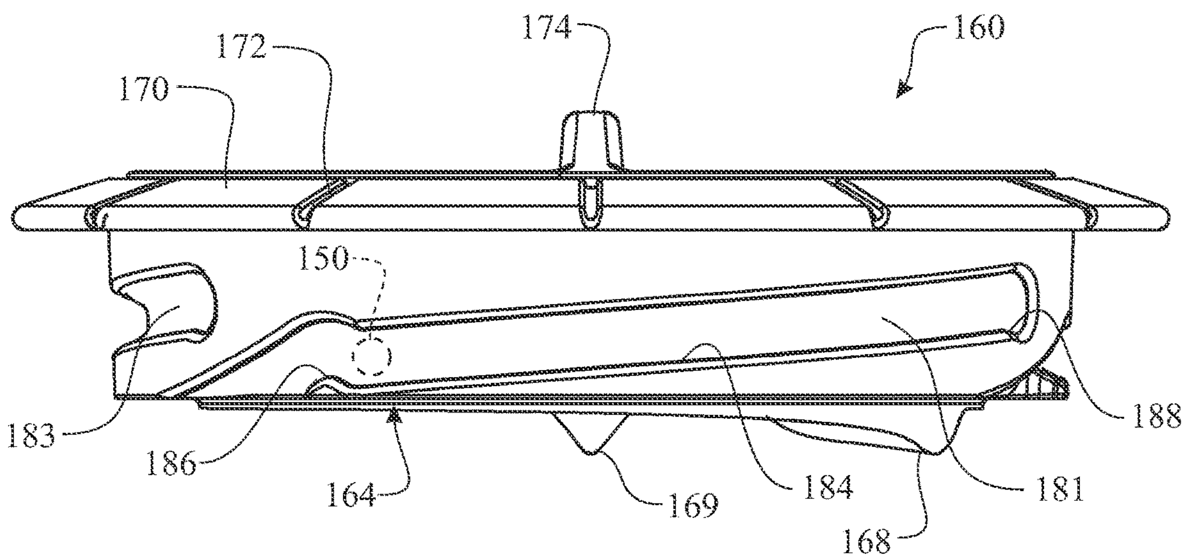
FIG. 11 presents an enlarged side elevation view of the cap, wherein the illustration presents the cap rotated ninety degrees (90°) from the illustration presented in FIG. 10.
Figure 12:
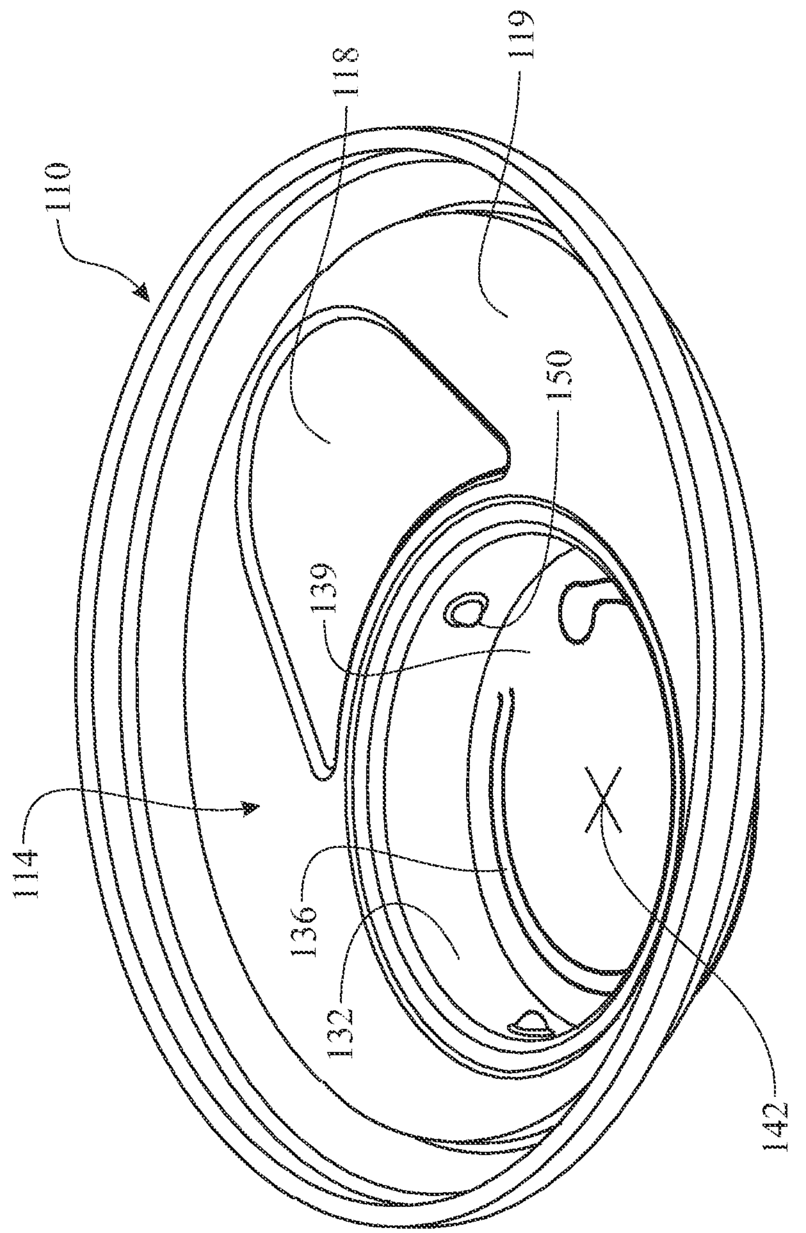
FIG. 12 presents a top isometric view of the resealable container lid, wherein the illustration excludes the cap to expose features of the socket.

The cap resealable container cap cylindrical sidewall 162 includes three equally spaced cam groove surfaces 181, 182 and 183, as best shown in FIGS. 10 and 11. The cam groove surfaces 181 and 182 and the resealable container cap grip element 174 extending across the page are best illustrated in FIG. 10. The resealable container cap bottom surface 164 of the resealable container cap 160 includes the centered projecting incisor 169, acting as a piercing element, which punctures the cap receiving socket bottom panel centered "X" shaped score line 142, and it further includes an offset projecting incisor 168 which also acts as a piercing element. The projection 168 is designed and shaped to impinge on the cap receiving socket bottom wall 134 of the cap receiving socket 130 inside and juxtaposed the cap receiving socket bottom panel circular score line 136. As the resealable container cap 160 is rotated, from the unopened position shown in FIG. 10, the cam structure turns the rotational movement to translational movement, thus moving the cap inwardly. As the resealable container cap 160 moves inwardly, the offset projecting incisor 168 rotates until, preferably, it reaches the position shown in FIG. 11, wherein a portion of the cap receiving socket bottom wall 134 breaks away and is pushed inwardly to form the cap receiving socket bottom panel tear panel 138 that remains hinged to the cap receiving socket bottom wall 134 by virtue of the cap receiving socket bottom panel circular score line 136 not extending to a complete loop. The offset projecting incisor 168 starts at the beginning of the cap receiving socket bottom panel circular score line 136 and only travels ninety degrees (90°). Thus, offset projecting incisor 168 will only have traveled a portion of the length. What pushes the cap receiving socket bottom panel tear panel 138 out of the way is the body of the cam shaped cap bottom surface 166 going past the plane of the cap receiving socket 130 cap receiving socket bottom wall 134. Notice that the cam shaped cap bottom surface 166 protrudes out from the flat annular cap bottom sealing surface 167.

Figure 13A:
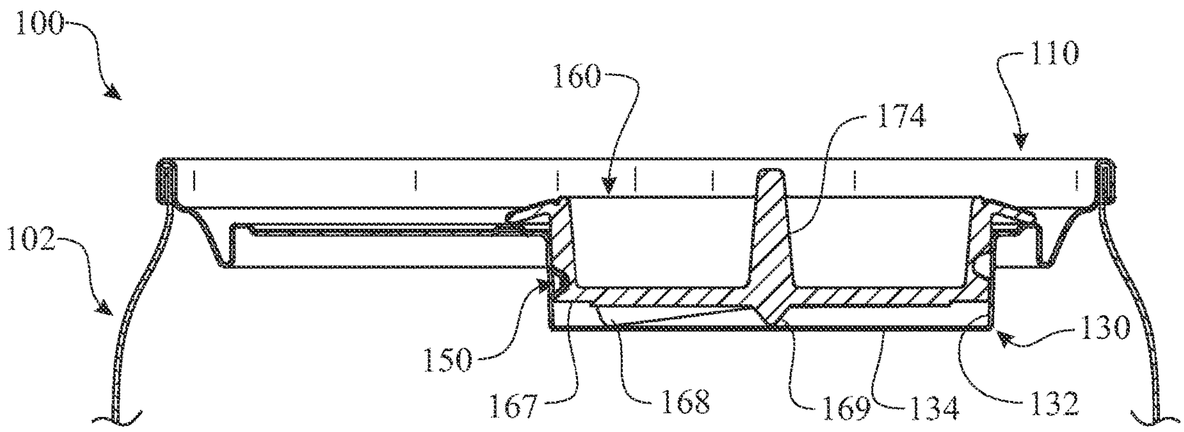
FIG. 13A presents a cross sectional elevation view of the cap in a sealed condition, following bottling, and prior to fracturing a score line to open the container.

Cross sectional views of the cap moving between opening and resealing positions are shown in FIGS. 13A through 13D. In FIG. 13A, the resealable container cap 160 is shown in cross section prior to opening the beverage container. Thus, the cap receiving socket bottom wall 134 of the cap receiving socket 130, the cap receiving socket cylindrical sidewall 132 of the cap receiving socket 130, and the resealable container lid upper surface 114 form the resealable container lid 110. The resealable container cap 160 is shown in the storage position, i.e., pre-opening of the can, in FIG. 13A, wherein the cap receiving socket bottom wall 134 is not punctured and the contents of the container 100 are air tight for potentially long term storage. The resealable container cap grip element 174 is shown in a first, unopened position. In this position the flat annular cap bottom sealing surface 167 of the resealable container cap 160 is spaced above the socket cap receiving socket bottom wall 134, but the offset projecting incisor 168 is close to or in slight contact with the cap receiving socket bottom panel circular score line 136. Similarly, if a second centered projecting incisor 169 is employed at the center of the lower end of the resealable container cap 160, it is also disposed in close proximity to the score line 44 if not slightly touching.

Figure 13B:
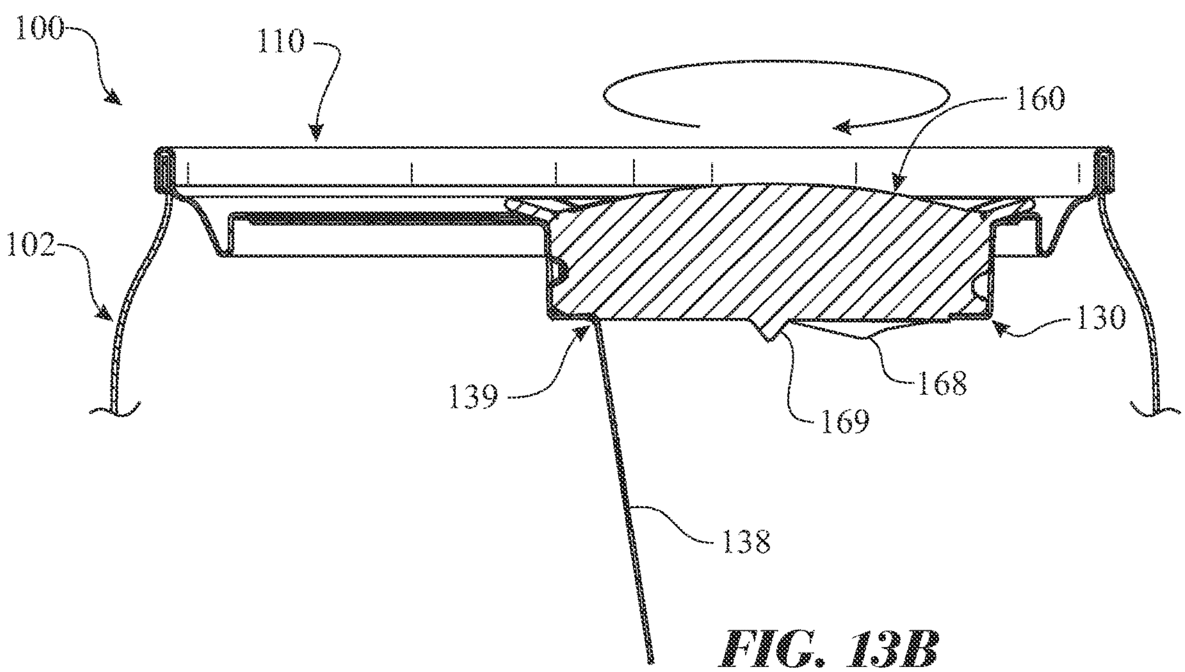
FIG. 13B presents a cross sectional elevation view of the cap, wherein the illustration demonstrates a first step in use, wherein the cap is rotated to open the container.

The resealable container cap 160 is rotated clockwise approximately ninety degrees (90°), as shown in FIG. 13B. Engagement between the cam groove surfaces 181, 182, 183 and the socket sidewall cam engaging projections 152, 154, 156 translates the resealable container cap 160 downwardly by a distance sufficient to cause the offset projecting incisor 168 to rupture the cap receiving socket bottom panel circular score line 136 as the projection moves along the inner side of the score line. The rupture creates a cap receiving socket bottom panel tear panel 138 which is pushed by the offset projecting incisor 168 into the interior of the container 100 by rotating downwardly about a tear panel hinge 139, wherein the tear panel hinge 139 is formed spanning between opposite ends of the cap receiving socket bottom panel circular score line 136. The opposite ends of the score line 136 are positioned to locate and define a pivot axis of the tear panel hinge 139 for the cap receiving socket bottom panel tear panel 138.

Figure 13C:
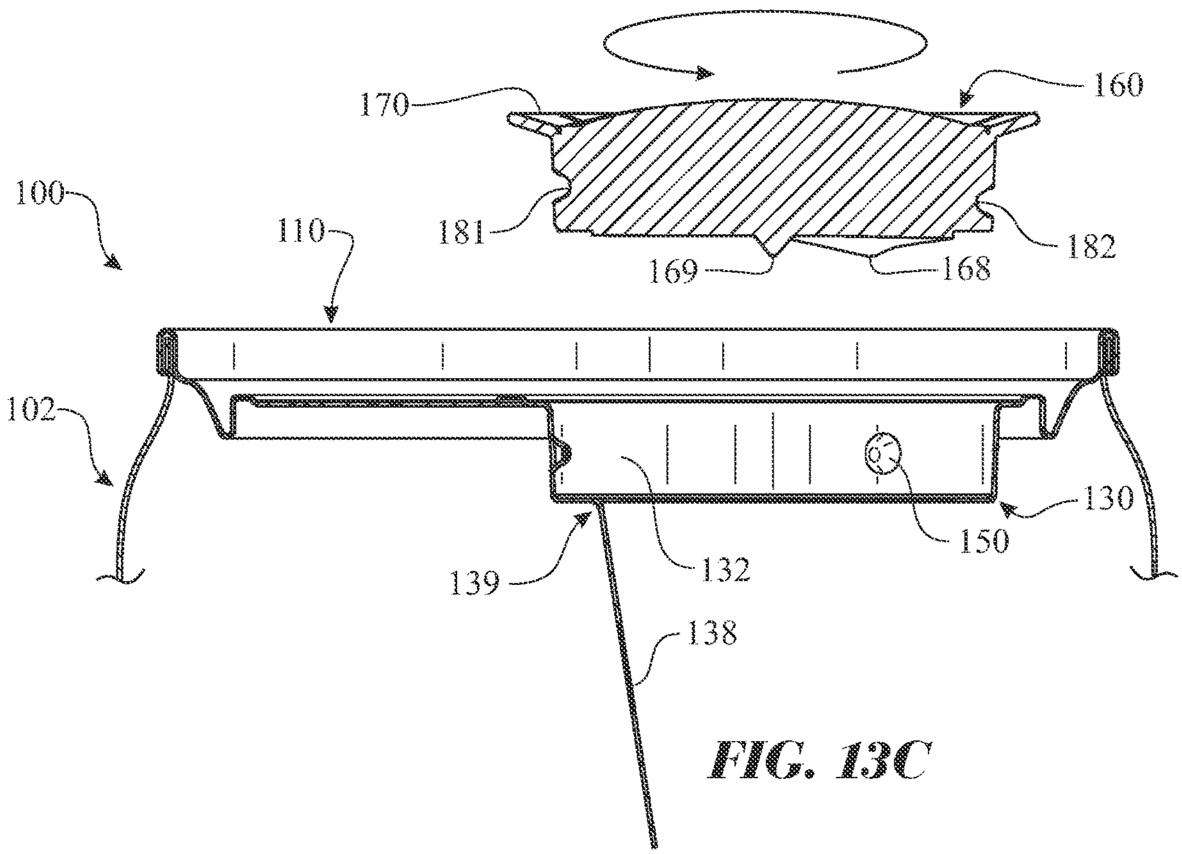
FIG. 13C presents a cross sectional elevation view of the cap, wherein the illustration demonstrates a second step in use, wherein the cap is removed from the lid of the container enabling dispensing and consumption of contents stored within the container.

After the cap receiving socket bottom panel tear panel 138 is formed, and the resealable container cap 160 is disposed at its innermost position relative to the socket, the consumer would then rotate the resealable container cap 160 counter-clockwise, preferably by turning the resealable container cap grip element 174. The resealable container cap 160 is shown in FIG. 13C being separated from the container 100, and can be pocketed by the consumer, or placed in a location for easy access in case the consumer chooses not to consume the entire contents of the container 100. As evidence that the beverage container has been opened, the radially extending cap skirt 170 may be angled upwardly as a result of the frangible score lines being broken, so that individual sections of the skirt are now biased in an upward direction. Also, when rotating counterclockwise, the cam groove surfaces 181, 182, 183 and the socket sidewall cam engaging projections 152, 154, 156 will eventually separate, allowing the resealable container cap 160 to be free of the container 100.

Figure 13D:
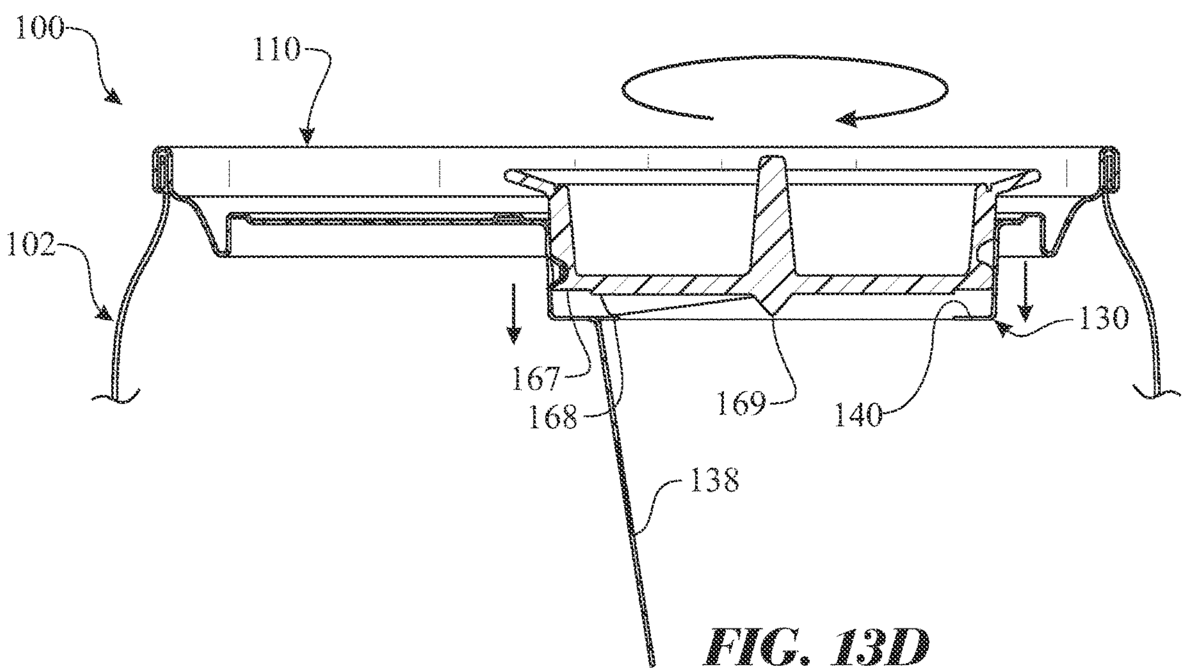
FIG. 13D presents a cross sectional elevation view of the cap, wherein the illustration demonstrates a third step in use, wherein the cap is replaced upon the lid of the container sealing any remaining contents within the container.

In the event that the consumer wishes to reseal the container 100, and as shown in FIG. 13D, the resealable container cap 160 is brought into contact with the cap receiving socket 130 by the consumer, by bringing the cam groove surfaces 181, 182, 183 into engagement with the socket sidewall cam engaging projections 152, 154, 156. Once this occurs, clockwise rotation will cause the resealable container cap 160 to translate downwardly until a sealing, seating arrangement is made between the cap receiving socket bottom panel flat annular surface 140 of the socket cap receiving socket bottom wall 134 and the flat annular cap bottom sealing surface 167 of the resealable container cap 160, thereby keeping the contents of the container 100 fresh and safe from foreign contaminants. The seal will retain carbonation when the contents are carbonated.

The resealable container cap 160 can be removed again and again to gain access to the contents of the beverage container until all contents are consumed. There is no limit to the type of beverages or other contents that can be housed in the container 100, but most commonly "canned" beverages include sodas, beer, juices, etc. It is also within the scope of the present invention that the contents of the containers could be foodstuff, and non-consumable liquids, gels, powders, and the like.

The cam means disclosed herein can be used for caps that provide other functionality for the container 100. For example, a variation of the resealable container cap 160 would be one that could include a passageway extending through the resealable container cap 160 with drinking implements formed at the upper, outer end, such as a child's sip cup, which would allow a child to drink from the container 100 without spilling. Alternatively, the resealable container cap 160 could be formed with an infant nipple for feeding formula, juice, water or other beverages suitable for infants. When using drinking implements such as sip cup and baby bottle nipples, a resealable container cap 160 would nonetheless have to be employed for opening the container, and then a second "cap" could be used for consuming the contents. In any event, the opening caps and drinking implements could be sold separately from the container 100, as long as the container 100 included the socket sidewall cam engaging projections 152, 154, 156 formed in the cap receiving socket cylindrical sidewall 132 of the cap receiving socket 130.

Although a wide range of plastic materials could be used to form the resealable container cap 160, other materials could be used, including ceramics and metals. However, for harder materials such as these, it may be necessary to position a gasket between the opposing annular surfaces 140, 167 of the socket 130 and the cap 160, respectively to ensure the best possible seal.

While the embodiments described herein place the socket 130 and cap 160 in the top of the container 100, it is possible to have the same opening and resealing structures in the container closed bottom wall 104 of the container 100. Also, while a cylindrical container 100 has been described herein, other shapes of containers, e.g., oval, rectangular, hexagonal, octagonal, and the like, could also be used.

The preferred shape of the frangible cap receiving socket bottom panel circular score line 136 in the bottom of the cap receiving socket 130 is circular, with a closed end and an open end. The inside score (shallower line) terminates in a curve arcing towards the socket's cylindrical sidewall to prevent loss of tear panel into the container. The outside score line (deeper line) terminates in circular form spaced from the inside score line. There is a hinged portion of the tear panel that keeps the panel in contact with the lid once ruptured, as described above.

The offset projecting incisor 168, described as a piercing element, is intended to be a single point of contact that moves deeper, and radially along the inside of the cap receiving socket bottom panel circular score line 136 while the resealable container cap 160 is rotated. The offset projecting incisor 168 may also include additional areas to further drive the cap receiving socket bottom panel tear panel 138 deeper into the container. A single point will apply more force to breaking the cap receiving socket bottom panel circular score line 136 defining the cap receiving socket bottom panel tear panel 138 but additional areas acting in a secondary fashion could help in the opening process.

The socket sidewall cam engaging projections 152, 154, 156 used in the cap receiving socket 130 allow the use of a very shallow socket 130 (as compared to threaded designs) and still provide positive opening, closing and sealing of the resealable container cap 160. The design of the socket sidewall cam engaging projections 152, 154, 156 also provides for positive stops for open, closed and removable cap positions. As seen in FIGS. 10 and 11, each cam groove surface 181, 182, 183 includes a sloped cam groove surface segment 184, a cam groove surface lower detent 186 and a cam groove surface upper detent 188. Once assembled, the three socket sidewall cam engaging projections 152, 154, 156 are respectively positioned so that the detents prevent the resealable container cap 160 from becoming disconnected from the cap receiving socket 130, during transport or storage, and from backing off a sealing position, when the resealable container cap 160 is positioned in a resealing position. This can be illustrated with reference to FIG. 11, where the exemplary socket sidewall cam engaging projection 156 is shown as a broken line circle. When the resealable container cap 160 is in the unopened position, each socket sidewall cam engaging projection 156 (shown as a broken line circle) will be positioned next to the cam groove surface lower detent 186. The cam groove surface lower detent 186 prevents the resealable container cap 160 from turning to a position where the socket sidewall cam engaging projection 156 is disengaged from the first cam groove surface 181, as for example, if vibration or the like caused the projection 156 to pass out of the sloped cam groove surface segment 184. Similarly, when the resealable container cap 160 is intentionally rotated clockwise, to either open or reseal the beverage container, the projection passes over the cam groove surface upper detent 188 to become locked by interference fit between the cam groove surface upper detent 188 and the socket sidewall cam engaging projection 156. The cam groove surface upper detent 188 thus prevents the resealable container cap 160 from inadvertently backing out from the sealing position. Thus, the resealable container cap 160 is held in two positions by the detents 186, 188. The first position can be referred to as a transport retaining position and the second position can be referred to as a closed position. The distance between the two detents, measured along the rotational axis of the resealable container cap 160 is equal to the distance between the resealing surface on the resealable container cap 160 and the associated surface of the cap receiving socket bottom wall 134. The transport retaining detent, or cam groove surface lower detent 186 restricts the rotary movement of the resealable container cap 160 due to the interference between the stabilizing radially extending cap skirt 170 and the flat upper rim of the resealable container cap 160, as well as the interference between the piercing element or offset projecting incisor 168 and the socket cap receiving socket bottom panel tear panel 138.

When turning the resealable container cap 160 in the opening direction, e.g., clockwise, the socket sidewall cam engaging projections 152, 154, 156 on the socket's cylindrical sidewall follow the sloped cam groove surface segments 184 of the cam groove surfaces 181, 182, 183, which form gradual ramps, converting the rotary motion of the resealable container cap 160 to a linear or translational movement, which drives the resealable container cap 160 into the interior of the container 100. This engages the offset projecting incisor 168 against the cap receiving socket bottom panel tear panel 138 and provides the force necessary to rupture the cap receiving socket bottom panel circular score line 136. Further turning of the resealable container cap 160 in the opening direction progressively pushes the cap receiving socket bottom panel tear panel 138 out of the way and into the interior of the container 100, until the socket sidewall cam engaging projections 152, 154, 156 reach the closed position of the cam groove surface upper detents 188. A slightly higher point on the sloped cam groove surface segment 184 of the cam groove surfaces 181, 182, 183 just before the closed position provides the resistance necessary to keep the resealable container cap 160 from backing out.

When turning the resealable container cap 160 opposite the opening direction, the socket sidewall cam engaging projections 152, 154, 156 follow the same route to their starting positions but after opening, the socket sidewall cam engaging projections 152, 154, 156 can pass over the transport retaining or cam groove surface lower detents 186 because the stabilizing radially extending cap skirt 170 and the cap receiving socket bottom panel tear panel 138 are now not providing any interference between the transport retaining or cam groove surface lower detents 186 and the void between the cam groove surfaces 181, 182, 183, allowing the resealable container cap 160 to be freed from the container.

In the embodiments described and illustrated herein, the exemplary cam groove surfaces 181, 182, 183 are shown as grooves having a sloped segment that terminates at opposite lower and upper ends in a lower and an upper detent 186, 188 (respectively), whereby the entire cam groove surfaces or elements 181, 182, 183 were formed in the resealable container cap cylindrical sidewall 162 of the resealable container cap 160. It is equally possible to form the cam groove surfaces or elements 181, 182, 183 as projections or bosses from the surface, integrally formed therewith, or as separate parts connected to the resealable container cap 160. Further, while the socket sidewall cam engaging projections 152, 154, 156, acting as cam followers, project from the cap receiving socket cylindrical sidewall 132 of the cap receiving socket 130, the cap receiving socket 130 could have been formed with cam surfaces 181, 182, 183 and the cam followers or cam engaging projections 152, 154, 156 could have been formed on the resealable container cap 160. The exact size and shapes of the cam surfaces 181, 182, 183 can be selected to correspond to the particular needs of the container 100. The overall goal is to select a structure that results in an operable torque which can be applied by consumers without exerting excessive effort.

Figure 14:
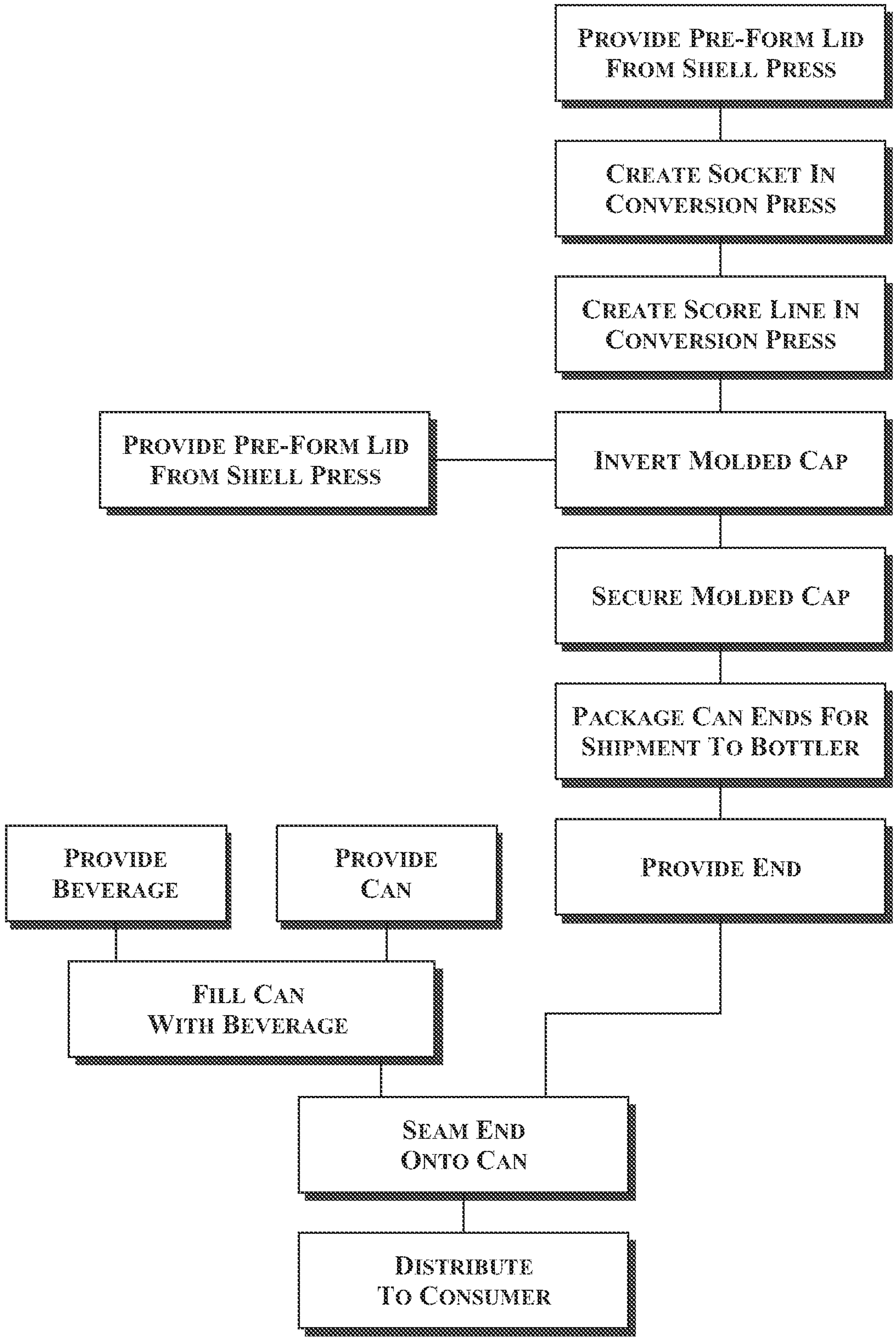
FIG. 14 presents an exemplary flow chart defining steps of manufacturing the resealable lid and the associated container according to one embodiment of the present invention.

The structures described above can be made using unique manufacturing processes, which combine some of the known processing steps with new, modified or avoided steps. In one particularly preferred method of making containers 100, as illustrated in the flow chart of FIG. 14, preformed resealable container lids 110 are provided from a shell press. Next, cap receiving sockets 130 are formed in the resealable container lids 110 using a conversion press. Next, a score line is formed in the bottom of the cap receiving socket 130 in the conversion press, either at the same time, or sequentially after the cap receiving socket 130 is formed. Resealable container cap 160 are formed by injection molding, or other suitable means, and the resealable container caps 160 are supplied to the assembly line, where they are inserted into the sockets. The resealable container caps 160 are then secured to the sockets by press forming the projections by spacing three dies around the socket, all centered on a common plane. The dies are pressed inwardly against the cylindrical sidewall of the cap receiving socket 130, and the resealable container cap 160 acts as a mandrel against the inner pressing force of the dies, thus forming the socket sidewall cam engaging projections 152, 154, 156 to project into the grooves of the cam groove surfaces 181, 182, 183. The resealable container lids 110 or ends are then packaged and sent to bottlers, who can then use conventional processing steps to secure the lid to any of a variety of cans or other beverage containers.

The process described above achieves several cost and environmental advantages over the prior manufacturing techniques. First of all, the lid does not have to be processed to form a rivet, which has conventionally been used to secure a pull tab to a can lid. There is no need for a rivet because there is no need for the pull tab. The rivet required the lid to be made of stronger, thicker material, usually consisting of a different alloy of aluminum as opposed to the material that made up the sidewall and bottom. Moreover, the conventional process would have required the formation of a pull tab, likely to be made of third, different aluminum alloy. Use of three different aluminum materials presented a problem for recycling, whereas in the present invention, a single material can be used to form the can body and the can lid.

Figure 15:
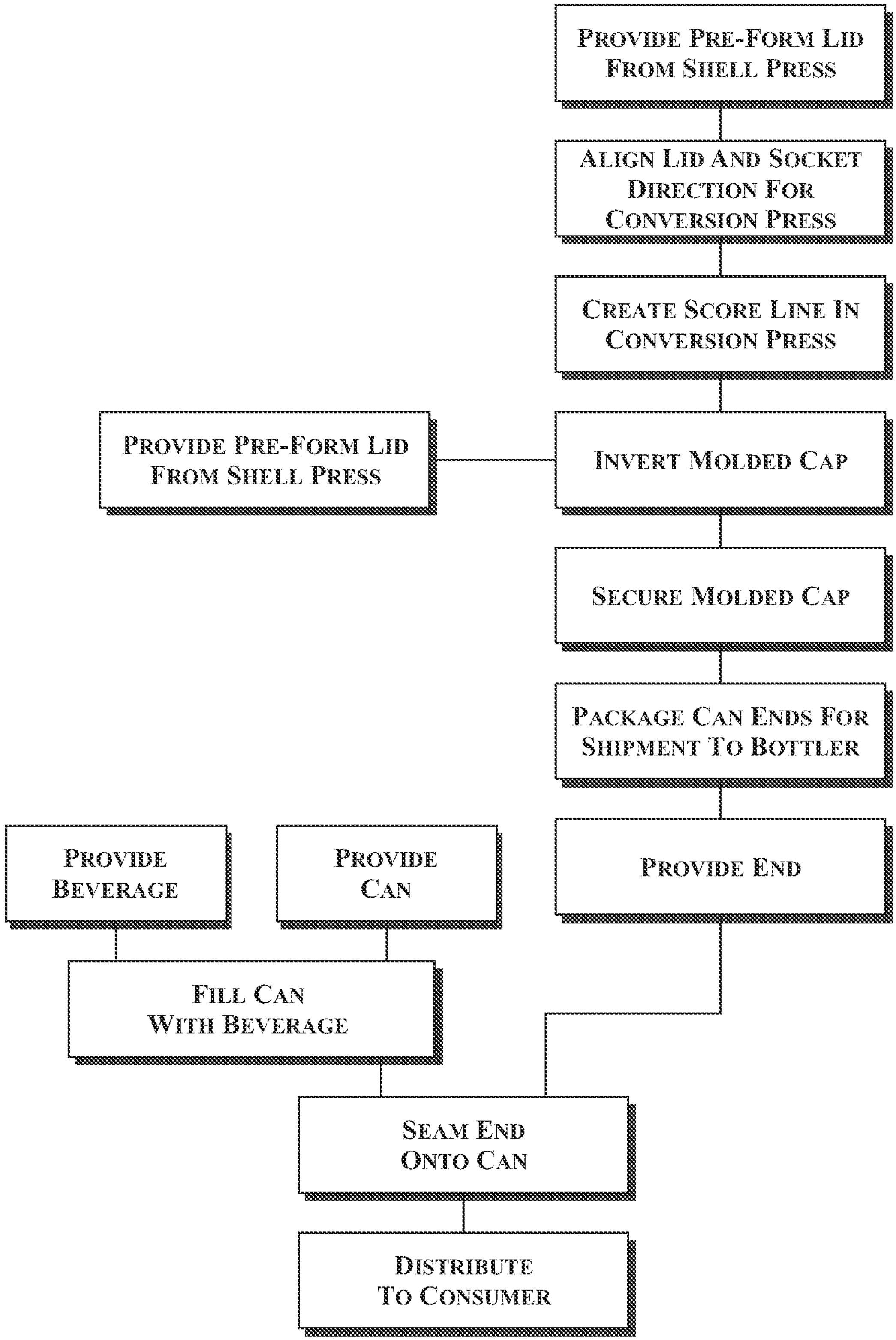
FIG. 15 presents an exemplary flow chart defining steps of manufacturing the resealable lid and the associated container according to a variant thereof.
Figure 16:
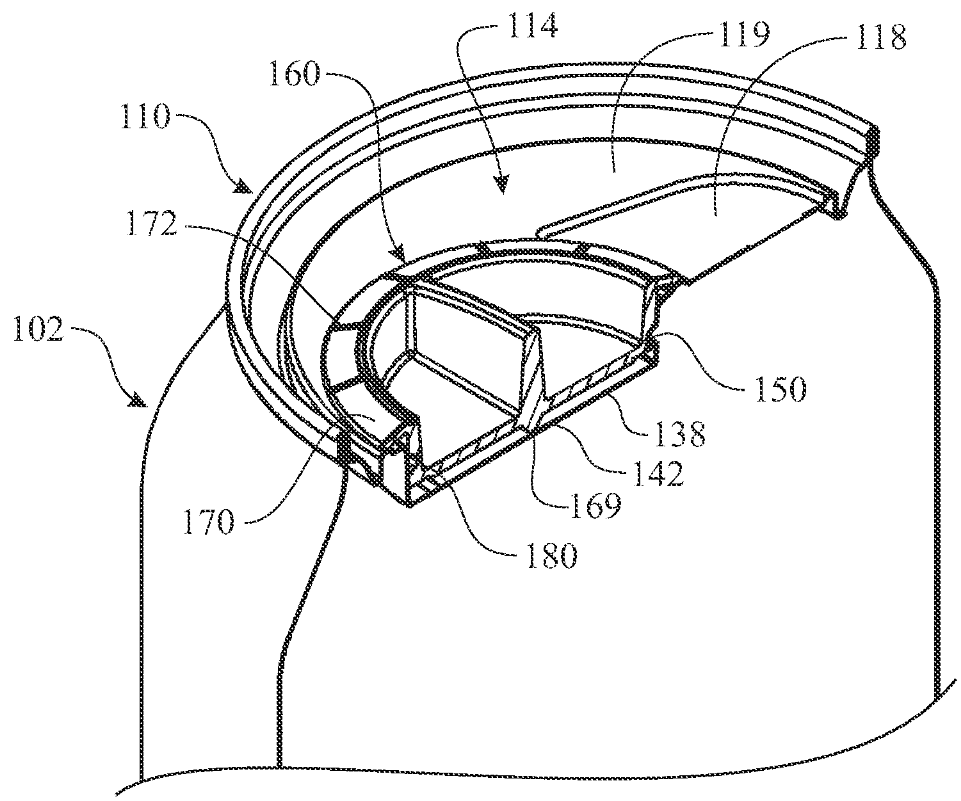
FIG. 16 presents a sectioned isometric view of the container, the section being taken along section line 16-16 of FIG. 8, wherein the illustration presents the container in an assembled, sealed configuration.
Figure 17:
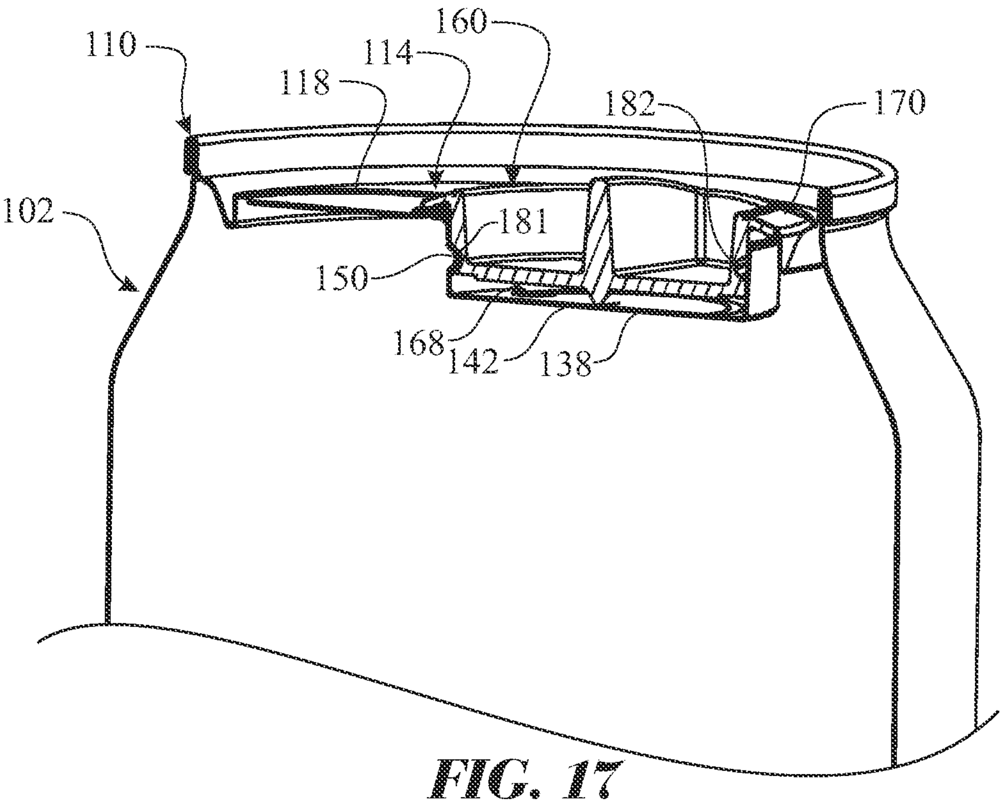
FIG. 17 presents an isometric view of the container FIG. 16, the section being taken along section line 17-17 of FIG. 8.
Figure 18:
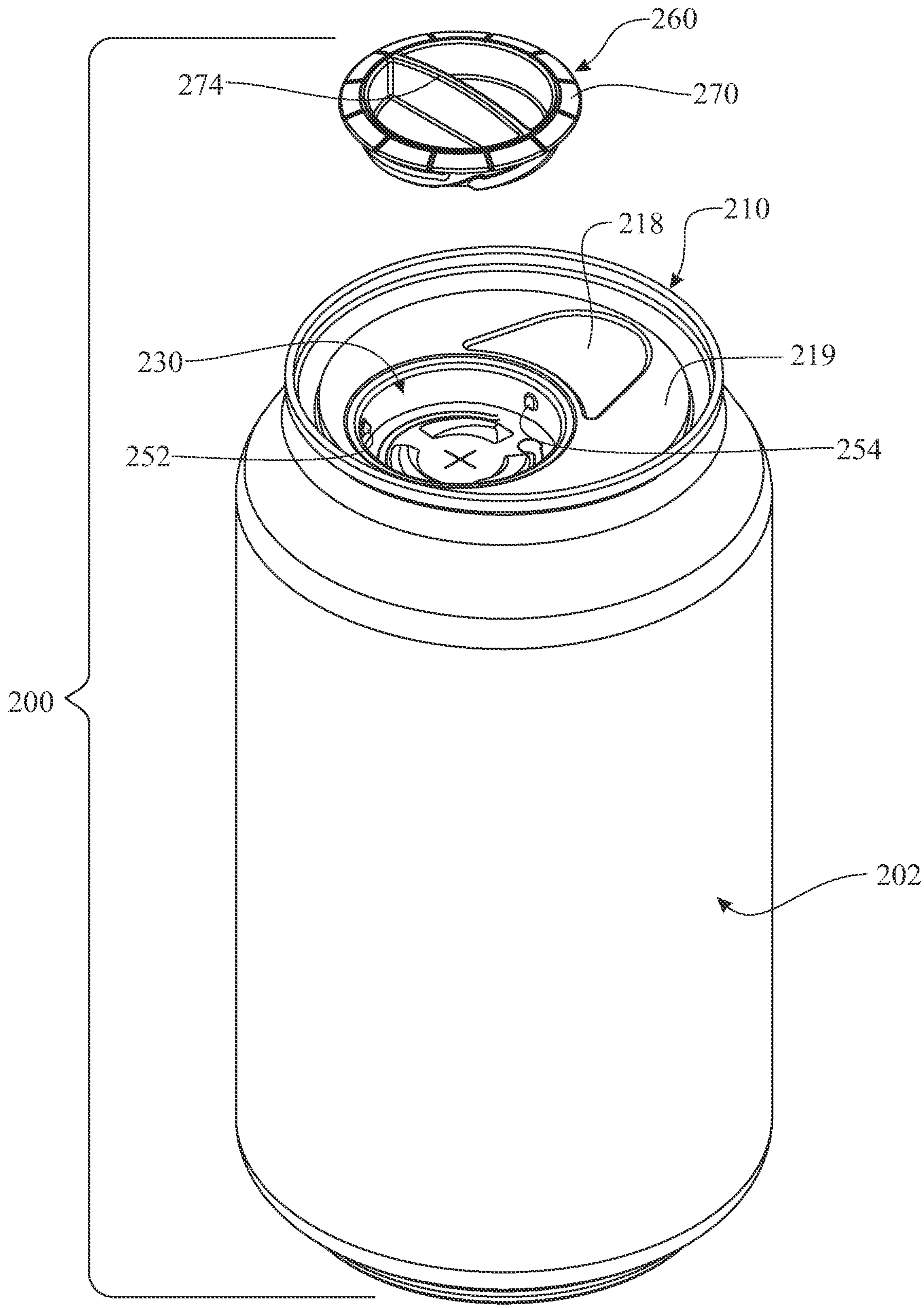
FIG. 18 presents a side isometric view of a second exemplary container introducing a variant of the present invention.
Figure 19:
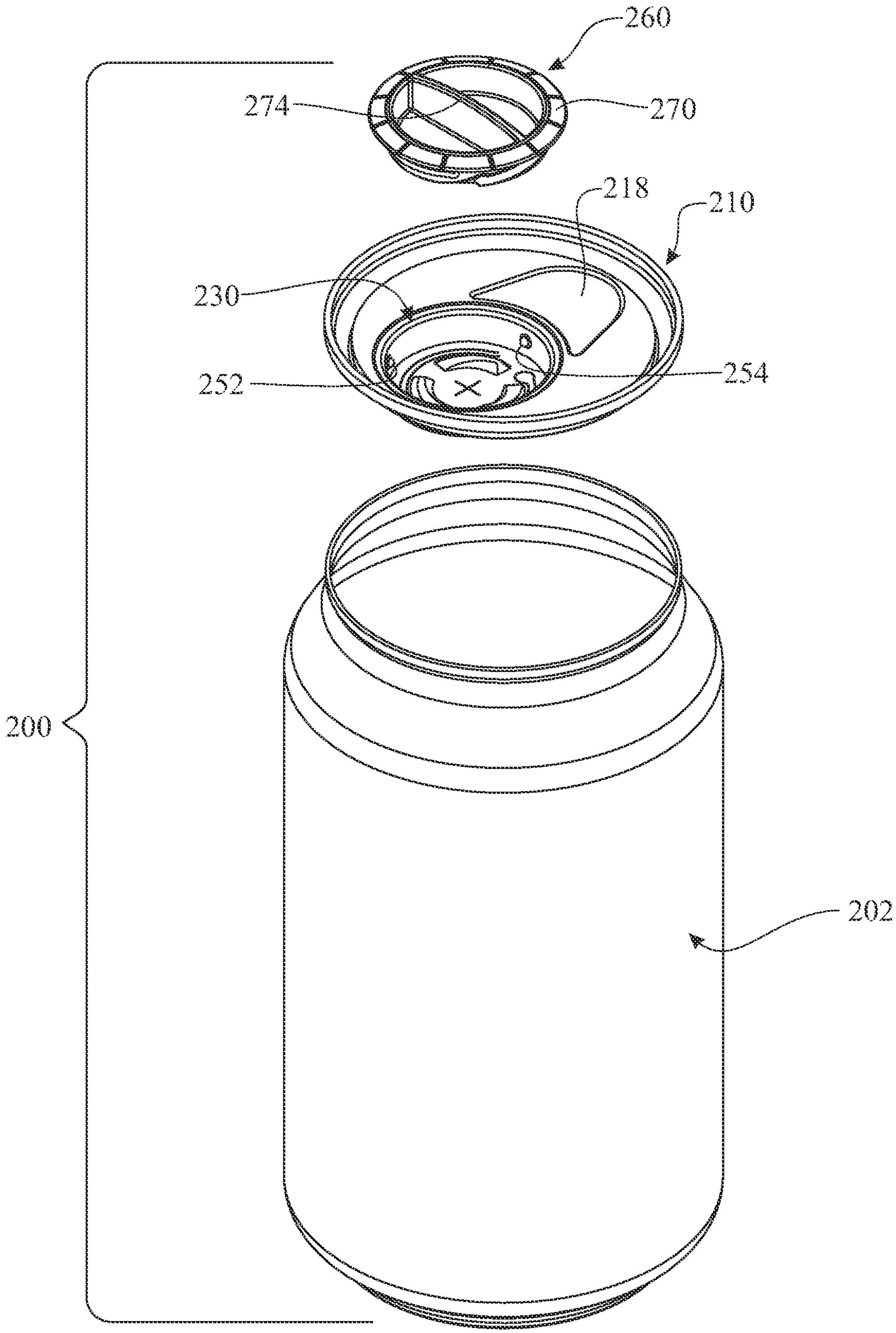
FIG. 19, presents a top and side isometric exploded assembly view of the container originally introduced in FIG. 18, wherein the illustration introduces the components of the container.
Figure 20:
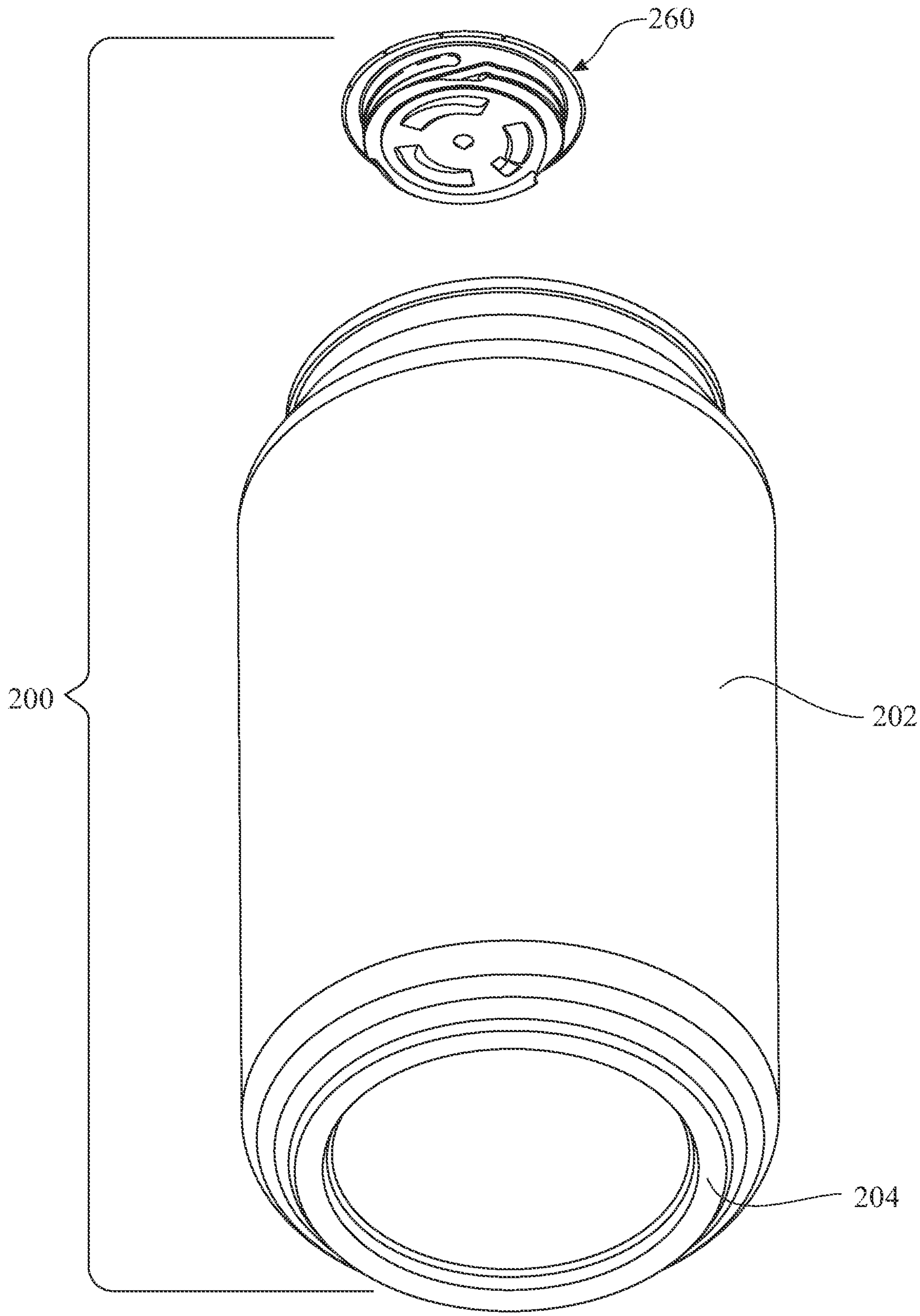
FIG. 20 presents a bottom and side isometric partially exploded assembly view of the container originally introduced in FIG. 18, wherein the cap is separated from the lid of the container to introduce features thereof.
Figure 21:
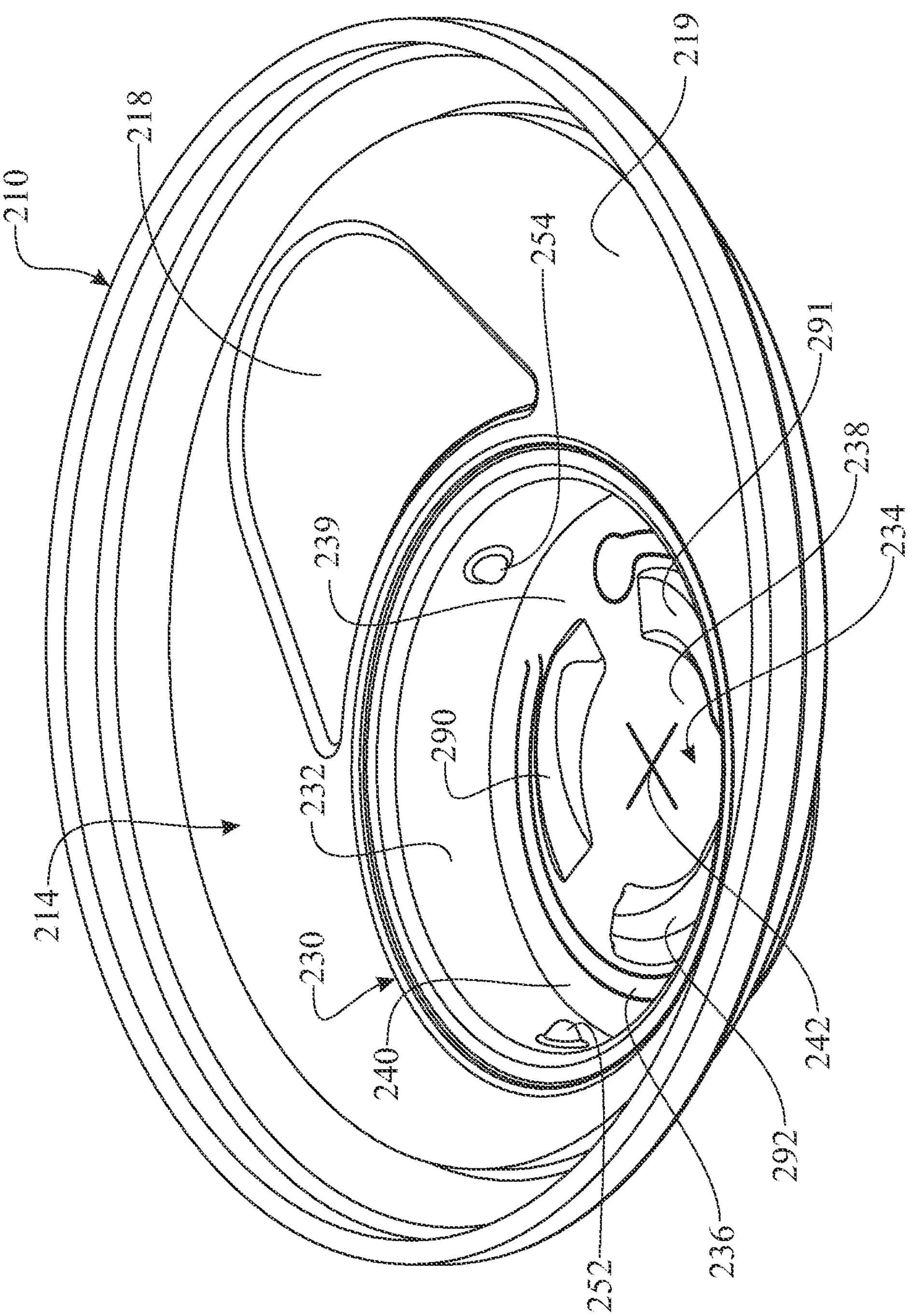
FIG. 21 presents an enlarged, isometric top view of the lid, of the container originally introduced in FIG. 18, wherein the lid is illustrated exclusive of the cap to introduced details thereof.
Figure 22:
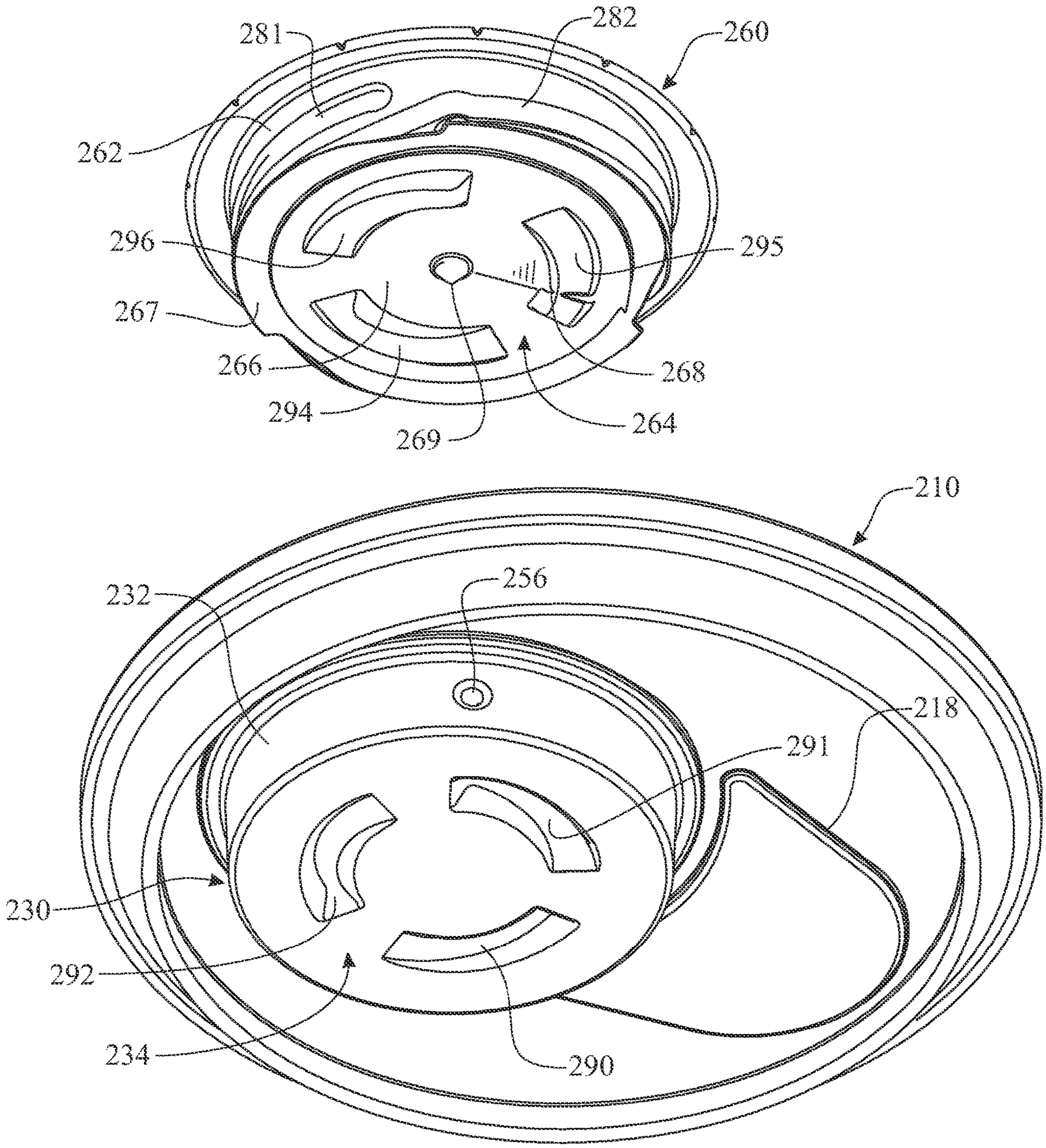
FIG. 22 presents a bottom isometric exploded assembly view of the lid and the cap of the container originally introduced in FIG. 18.
Figure 23:
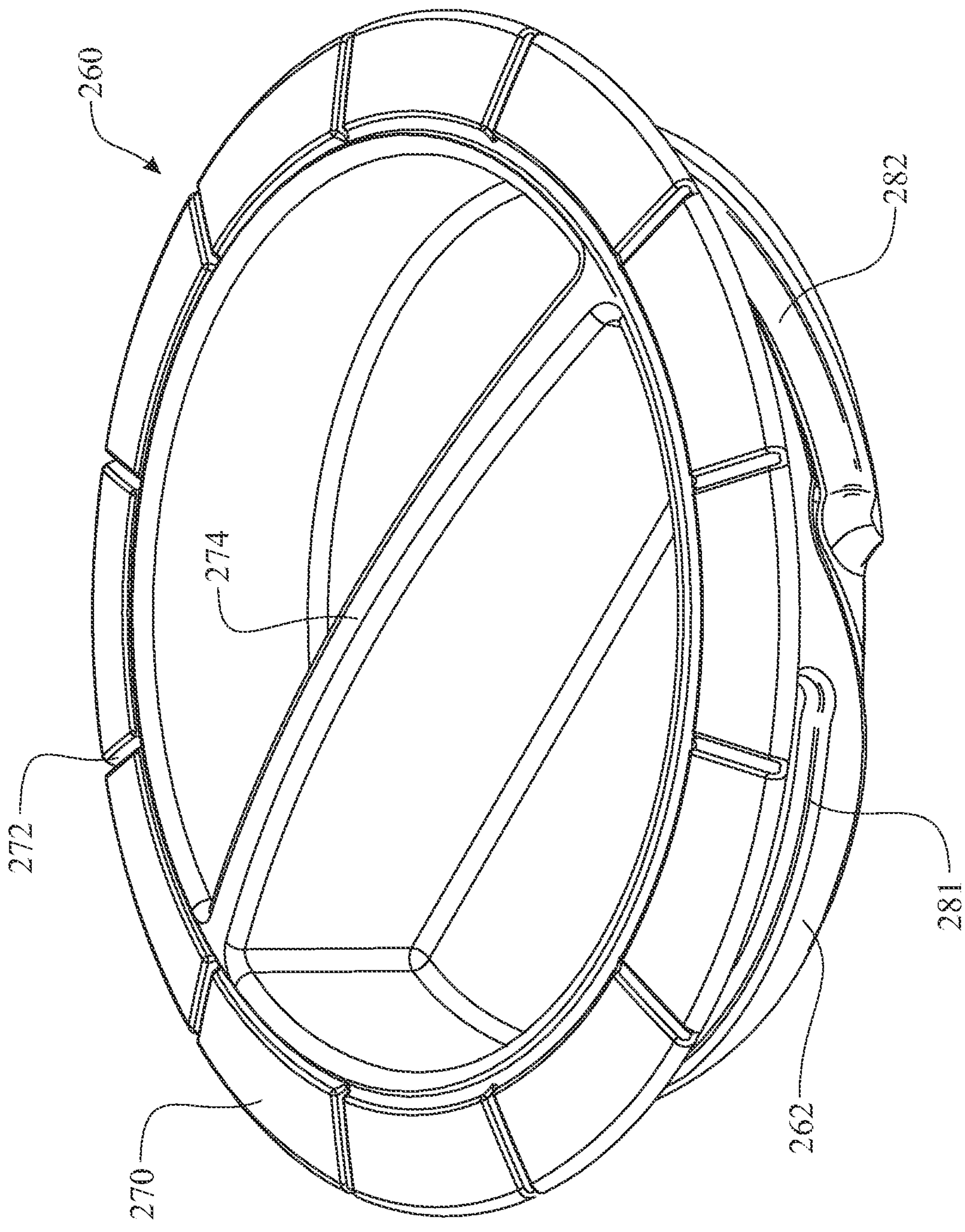
FIG. 23 presents an enlarged top isometric view of the cap of the container originally introduced in FIG. 18.
Figure 24:
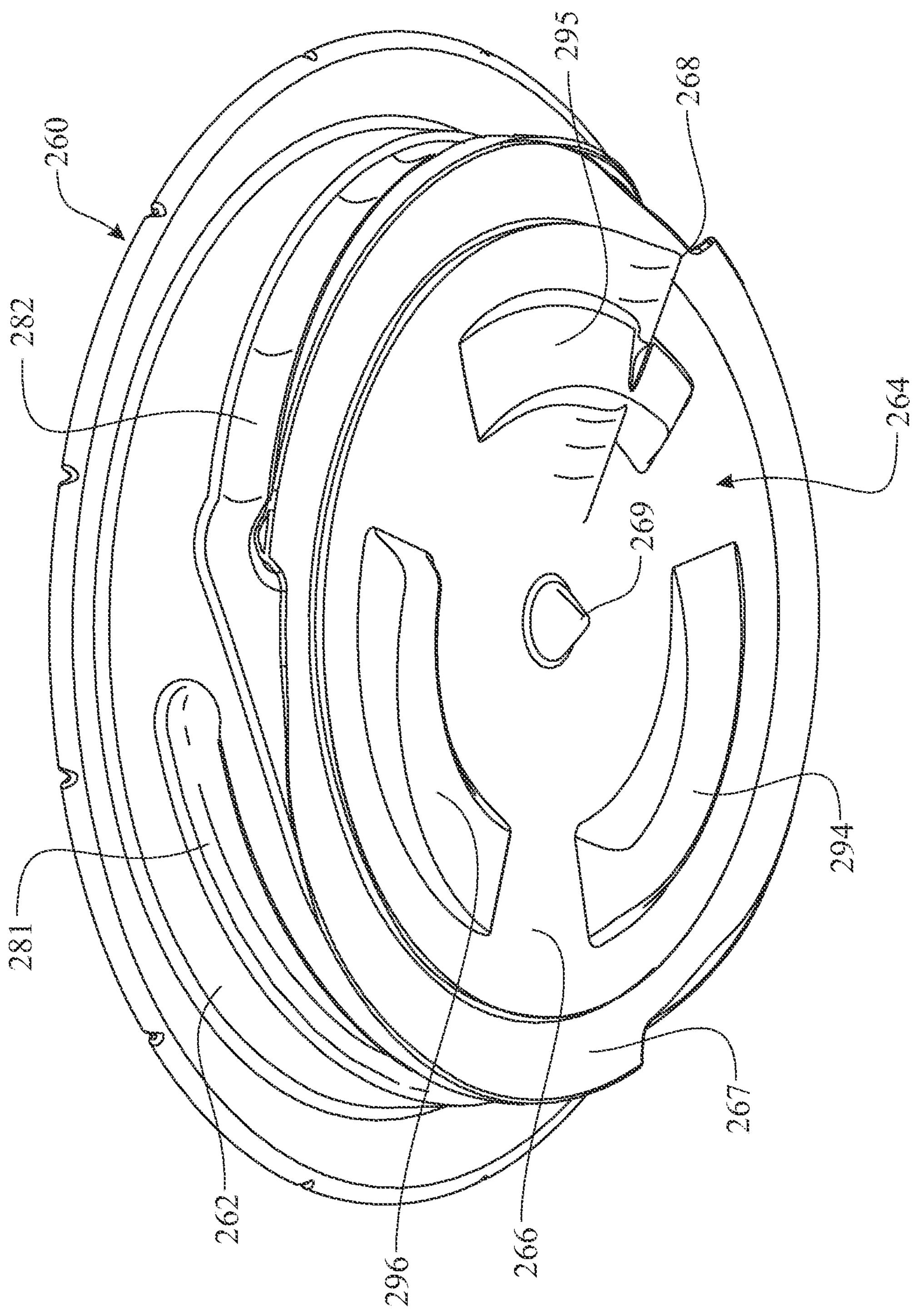
FIG. 24 presents an enlarged bottom isometric view of the cap shown in FIG. 23.

Referring to FIG. 15, a further variation of manufacturing process is disclosed. In the first step a pre-formed resealable container lid 110 is provided from a shell press with a cap receiving socket 130 already formed. In the next step, the resealable container lid 110 and cap receiving socket 130 are aligned directionally for a conversion press. Next a cap receiving socket bottom panel circular score line 136 is created in the conversion press, at the bottom of the cap receiving socket 130. Molded resealable container caps 160 are provided to the assembly line, and inserted into the molded resealable container cap 160. The molded resealable container caps 160 are secured to the cap receiving socket 130 by forming the socket sidewall cam engaging projections 152, 154, 156 in a manner described above, in which the resealable container cap 160 functions as a mandrel during formation of the projections. Next, the resealable container lids 110 with secured resealable container caps 160 are packaged and shipped to bottlers or others for conventional filling, sealing, and shipment to customers. As in the previously described manufacturing process, there is no need to form a rivet in the resealable container lid 110, and no need to attach a pull tab to the rivet. Avoiding these steps saves money and makes the resulting product easier to recycle.

An alternative embodiment of a container 200 is shown in FIGS. 18 through 35, and includes a body having a container cylindrical sidewall 202 and opposite axial ends. The container 100 and container 200 include a number of similar features. Like features of the container 100 and the container 200 are numbered the same except preceded by the numeral '2'. The container 200, like that of the previous embodiment (container 100), is illustrated in the size and shape of a common aluminum can used today for a wide variety of beverages, including soft drinks, juice drinks, beer, and the like. The body itself differs from the prior art in the features at the top end or lid of the container 100 where the features of the present invention allow for opening and resealing the container 200.

A container closed bottom wall 204 (seen in FIG. 20) is integrally formed at one of the axial ends with the container sidewall 202 in the known fashion of making aluminum cans. However, the body (202, 204) can be made of other materials and have other shapes, depending on either style, functionality or a combination of both. A resealable container lid 210 is attached to the open axial end of the body, at the open end defined by the container cylindrical sidewall 202, after filling the body (202, 204) with a beverage in the ordinary, and known, way of attaching resealable container lids or tops 110 to the containers 200. After assembly, the resealable container lid 210, container closed bottom wall 204 and container cylindrical sidewall 202 define a closed, interior space.

A cap receiving socket 230 is formed in the resealable container lid 210 and includes a cylindrical sidewall 110 and a cap receiving socket bottom wall 234. The cap receiving socket 230 is located eccentrically so that it nears a peripheral edge of the resealable container lid 210 to facilitate drinking and pouring after opening. The cap receiving socket 230 further includes a cap receiving socket bottom panel circular score line 236 slightly inset from the peripheral edge of the cap receiving socket bottom wall 234 and forming a cap receiving socket bottom panel substantially closed loop tear panel 238. An cap receiving socket bottom panel centered score line 242 is provided at the center of the bottom wall cap receiving socket bottom wall 234 and preferably includes two intersecting score lines that form an "X" with the intersection of the two lines being at the center of the cap receiving socket bottom wall 234. The cap receiving socket bottom wall 234 further includes socket bottom panel ramps 290, 291, 292 which are equidistantly spaced around the periphery of the cap receiving socket bottom wall 234 inside the cap receiving socket bottom panel circular score line 236. A different number of ramps could be used, but three is preferable. The socket bottom panel ramps 290, 291, 292 are integrally formed in the cap receiving socket bottom wall 234.

The cap receiving socket 230 further includes equidistantly spaced socket sidewall cam engaging projections 252, 254, 256 (examples of container lid rotational and axial guide features) formed in the sidewall 110. From an interior view, such as that shown in FIGS. 22 and 34, the projections such as projections 124 and 128 are shown as indentations, since the projections are formed from the sidewall material. The resealable container lid 210 also includes a resealable container lid upper surface reinforcement formation 218, as in the previous embodiment, which may include instructional text to inform the consumer how to use the opening and resealing features of the container 200.

Figure 31:
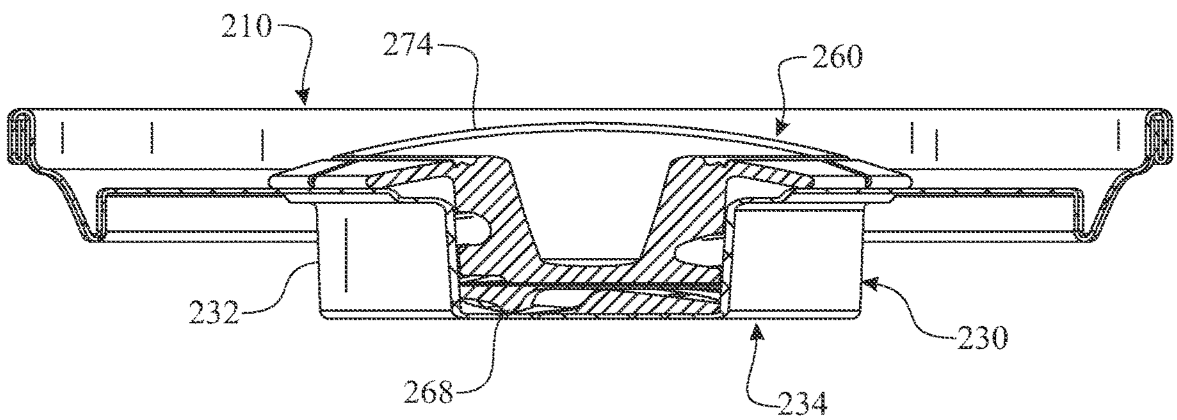
FIG. 31 presents a sectioned elevation view of the lid and cap subassembly of the container originally introduced in FIG. 18, wherein the section is taken along section line 31-31 of FIG. 25.
Figure 32:
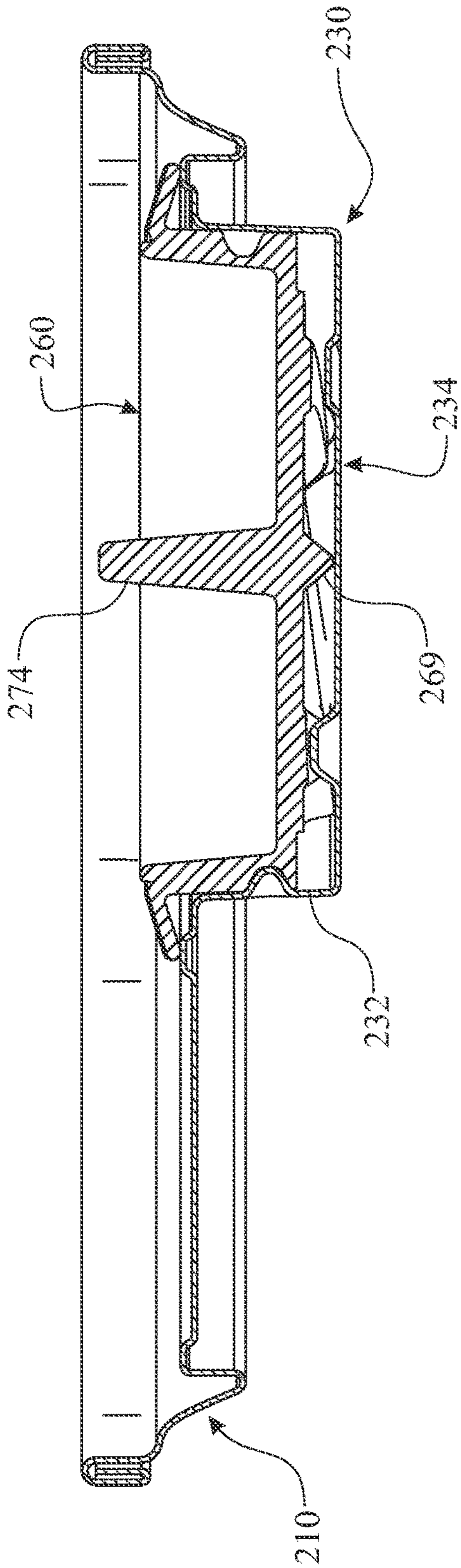
FIG. 32 presents a sectioned elevation view of the lid and cap subassembly of the container originally introduced in FIG. 18, wherein the section is taken along section line 30-30 of FIG. 25.
Figure 33:
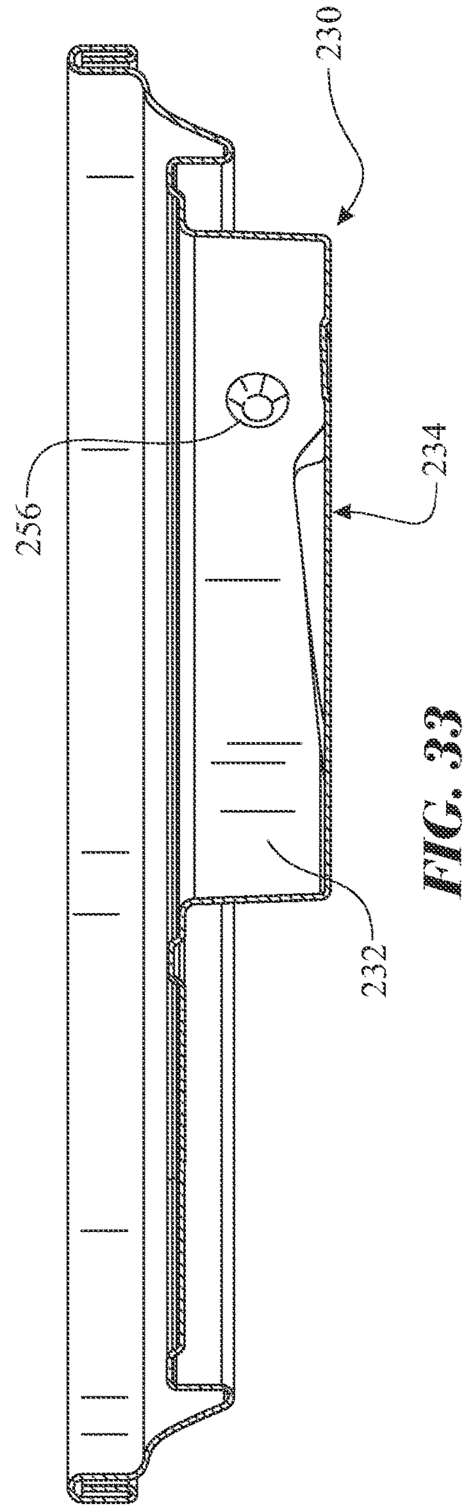
FIG. 33 presents a sectioned elevation view similar to FIG. 30, wherein the cap is excluded from illustration, exposing features of the socket within the lid of the container originally introduced in FIG. 18.
Figure 34:
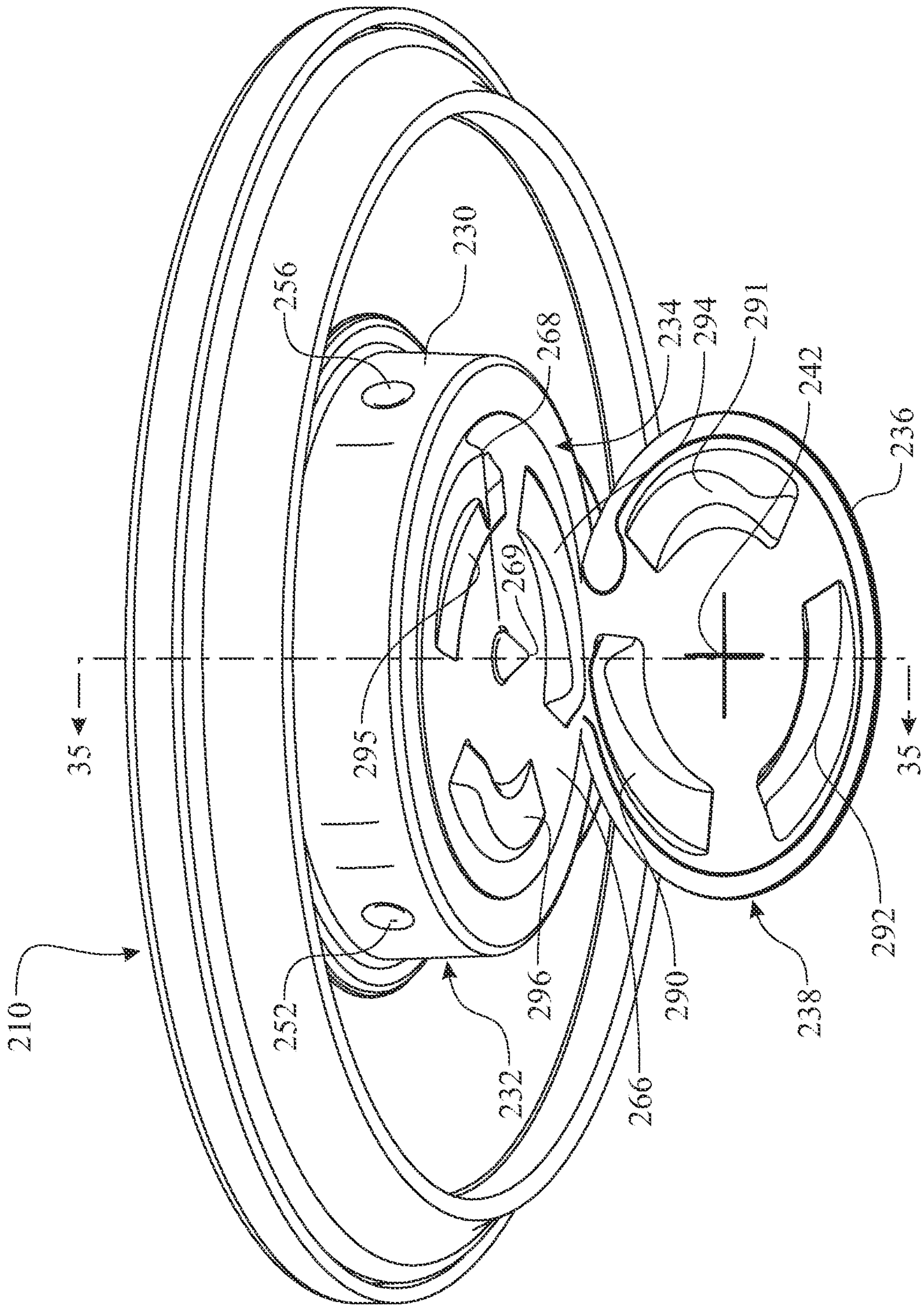
FIG. 34 presents a bottom isometric view of the lid and cap subassembly of the container originally introduced in FIG. 18, wherein the tear panel is shown after the cap has been rotated to impart linear motion fracturing the score line and bending the tear panel into the container.
Figure 35:
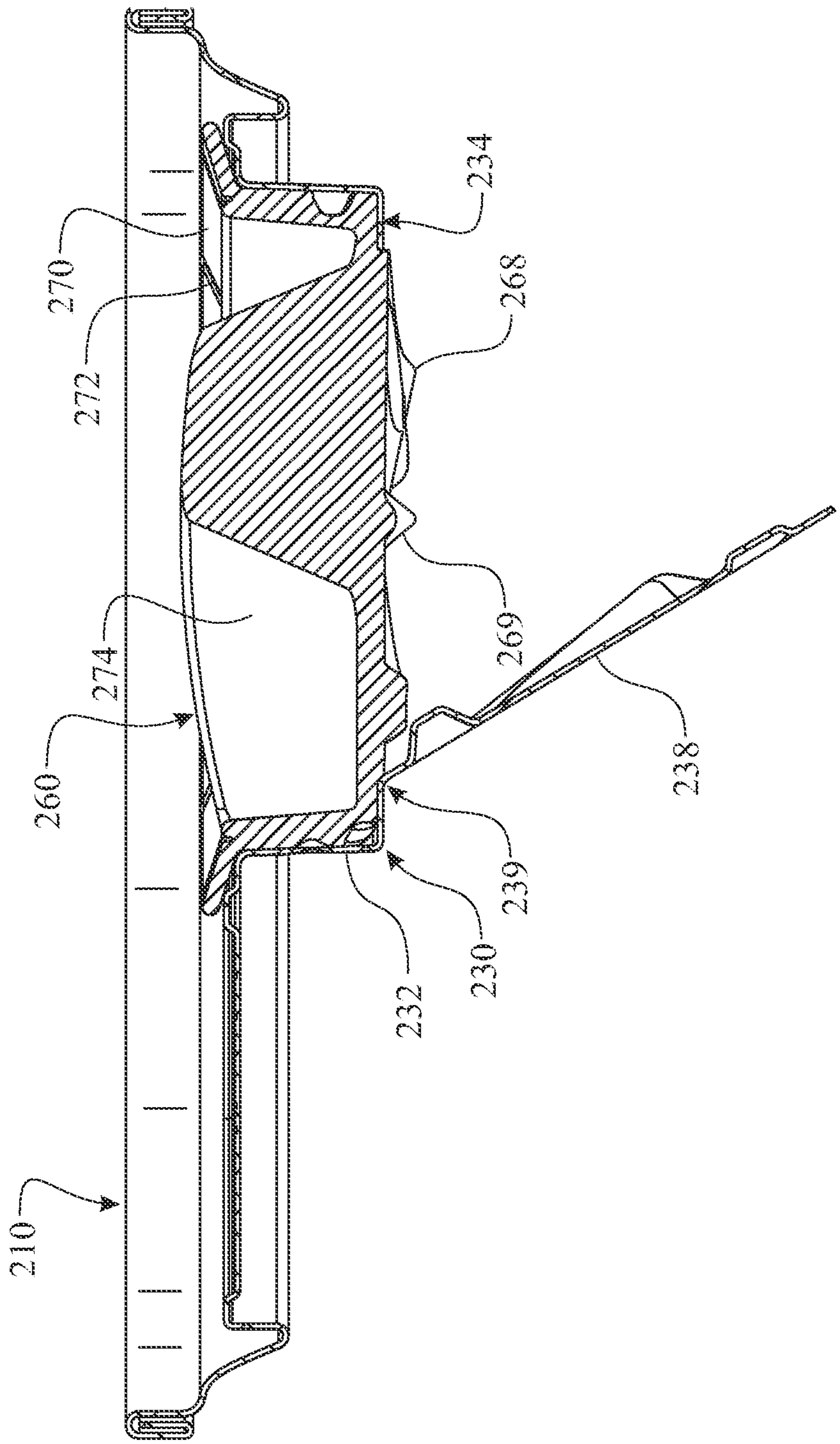
FIG. 35 presents a sectioned elevation view of the lid and cap subassembly in an opened and resealed configuration, wherein the section is taken along section line 35-35 of FIG. 34.

A resealable container cap 260 fits into the cap receiving socket 230 and includes a resealable container cap cylindrical sidewall 262 and a bottom wall 136. A series of cam groove surfaces 281, 282, 283 (examples of container cap rotational and axial guide features) are provided in the resealable container cap cylindrical sidewall 262 of the resealable container cap 260 at equidistantly spaced locations and are designed to receive the cam engaging projections 252, 254, 256, respectively, of the cap receiving socket 230, when the resealable container cap 260 is assembled within the cap receiving socket 230. In this regard, the embodiment of container 200 is similar to that of the embodiment of container 100. When assembled and before opening the container, the resealable container cap 260 seats in the cap receiving socket 230 as shown in FIGS. 30 through 32.

The resealable container cap 260 further includes a resealable container cap handle or grip element 274 at the upper end of the resealable container cap 260 so that the consumer can turn the cap in either clockwise or counterclockwise directions. As in the previous embodiments, the upper perimeter of the resealable container cap 260 is provided with a radially extending cap skirt 270 which provides a tamper resistant feature, whereby the skirt would extend upwardly if the cap had been turned to cause the resealable container cap 260 to descend further into the cap receiving socket 230. The radially extending cap skirt 270 and all other features of the resealable container cap 260 are integrally formed in a one-piece construction preferably of a plastic material. Within the scope of the invention, other materials could be used including ceramic and metallic materials.

A sharp centered incising projection 269 is formed in the center of the bottom surface of the resealable container cap 260, so that when the resealable container cap 260 is fitted in the cap receiving socket 230, prior to opening the beverage can 100, the point of the sharp centered incising projection 269 is positioned next to or juxtaposed at the center of the bottom surface of the cap receiving socket 230, at the point of intersection between the two lines that form the cap receiving socket bottom panel centered score line 242. The sharp centered incising projection 269 punctures the cap receiving socket bottom wall 234 of the cap receiving socket 230 as the resealable container cap 260 moves linearly downwardly and further into the cap receiving socket 230 during opening operation of the beverage can 200.

Figure 30:
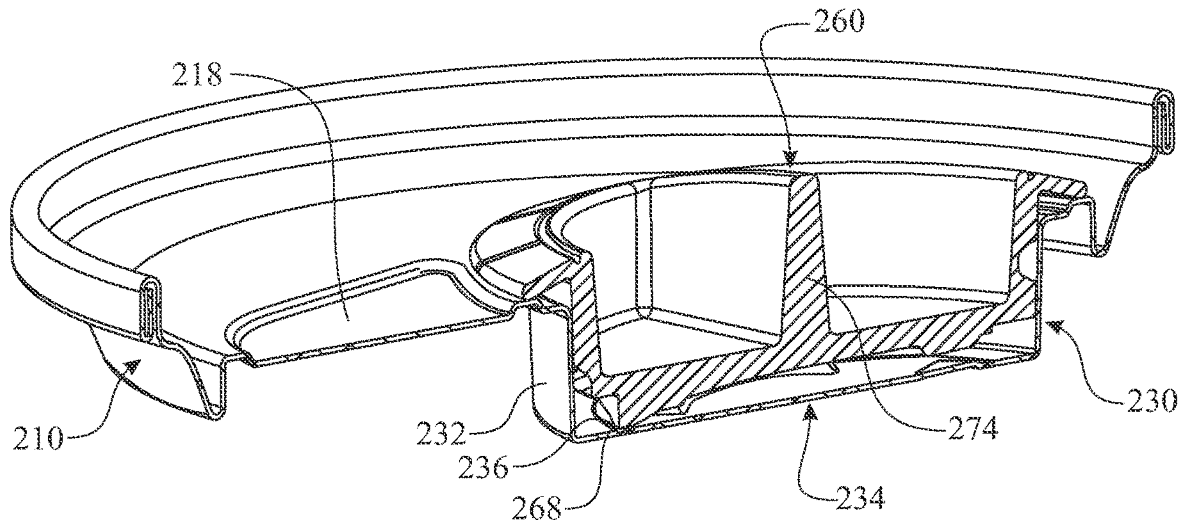
FIG. 30 presents an isometric, sectioned view of the lid and cap subassembly of the container originally introduced in FIG. 18, wherein the section is taken along section line 30-30 of FIG. 25.

An offset projecting incisor 268 is formed along an outer region of the bottom surface of the resealable container cap 260, so that when the resealable container cap 260 is fitted in the cap receiving socket 230, prior to opening the beverage can 100, the point of the sharp offset projecting incisor 268 is positioned in alignment with the cap receiving socket bottom panel circular score line 236 formed in the bottom surface of the cap receiving socket 230, as best shown in FIG. 30. The sharp offset projecting incisor 268 fractures the cap receiving socket bottom panel circular score line 236 formed in the cap receiving socket bottom wall 234 of the cap receiving socket 230 as the resealable container cap 260 moves linearly downwardly and further into the cap receiving socket 230 during opening operation of the beverage can 100.

Figure 25:
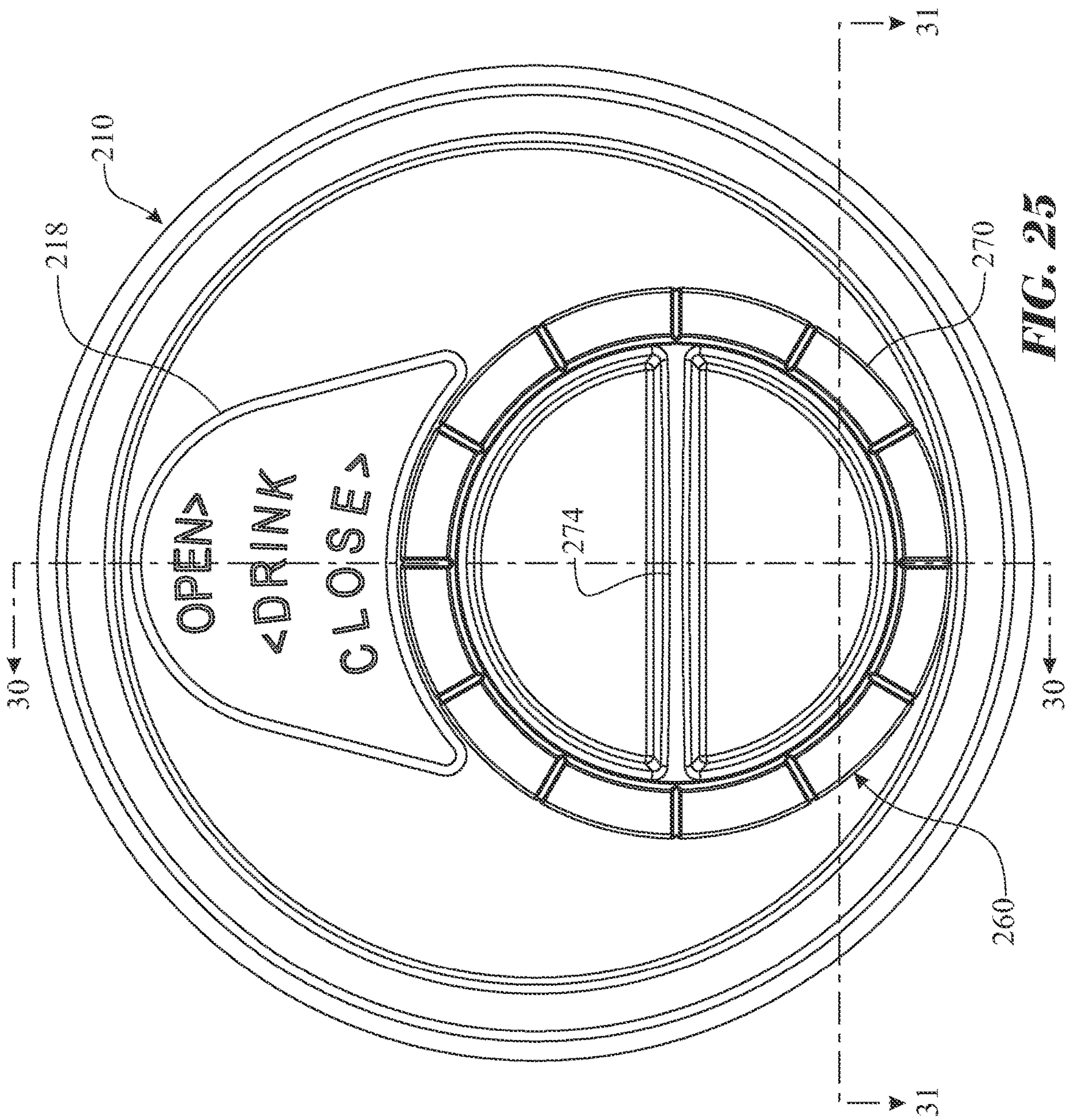
FIG. 25 presents a top plan view of the lid and the cap of the container originally introduced in FIG. 18, wherein the lid and cap are shown assembled to one another.
Figure 26:
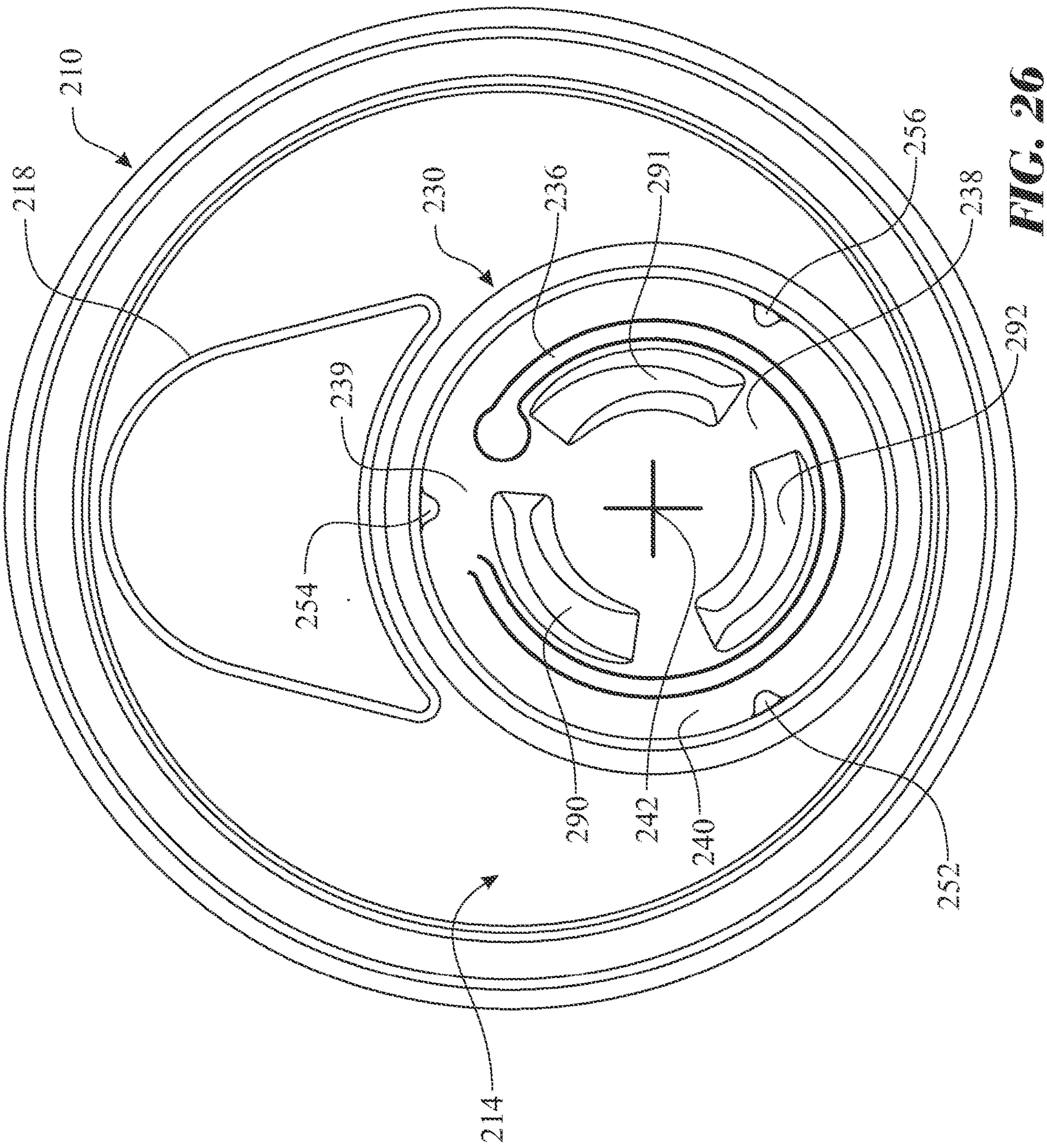
FIG. 26 presents a top plan view of the lid of FIG. 25, wherein the illustration excludes the cap to expose details of the socket.
Figure 27:
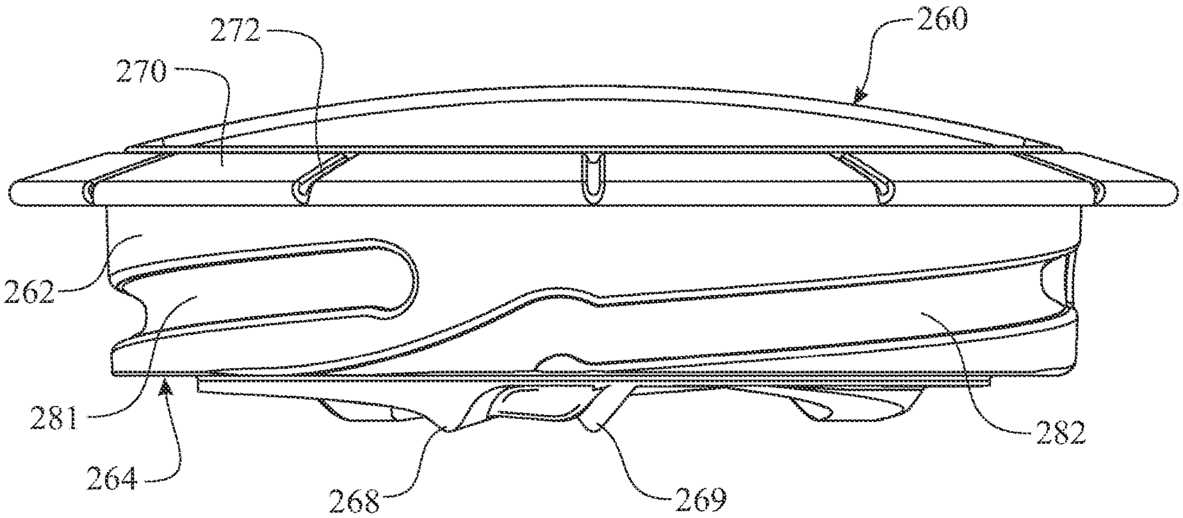
FIG. 27 presents a side elevation view of the cap of the container originally introduced in FIG. 18.
Figure 28:
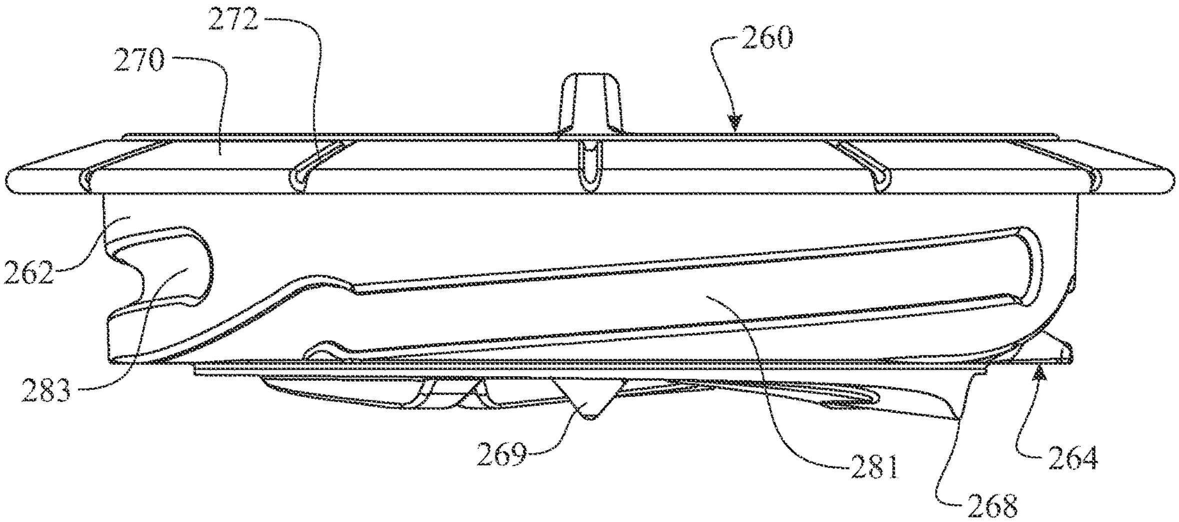
FIG. 28 presents a side elevation view of the cap of FIG. 27, wherein the cap is rotated ninety degrees (90°) from the view illustrated in FIG. 27.
Figure 29:
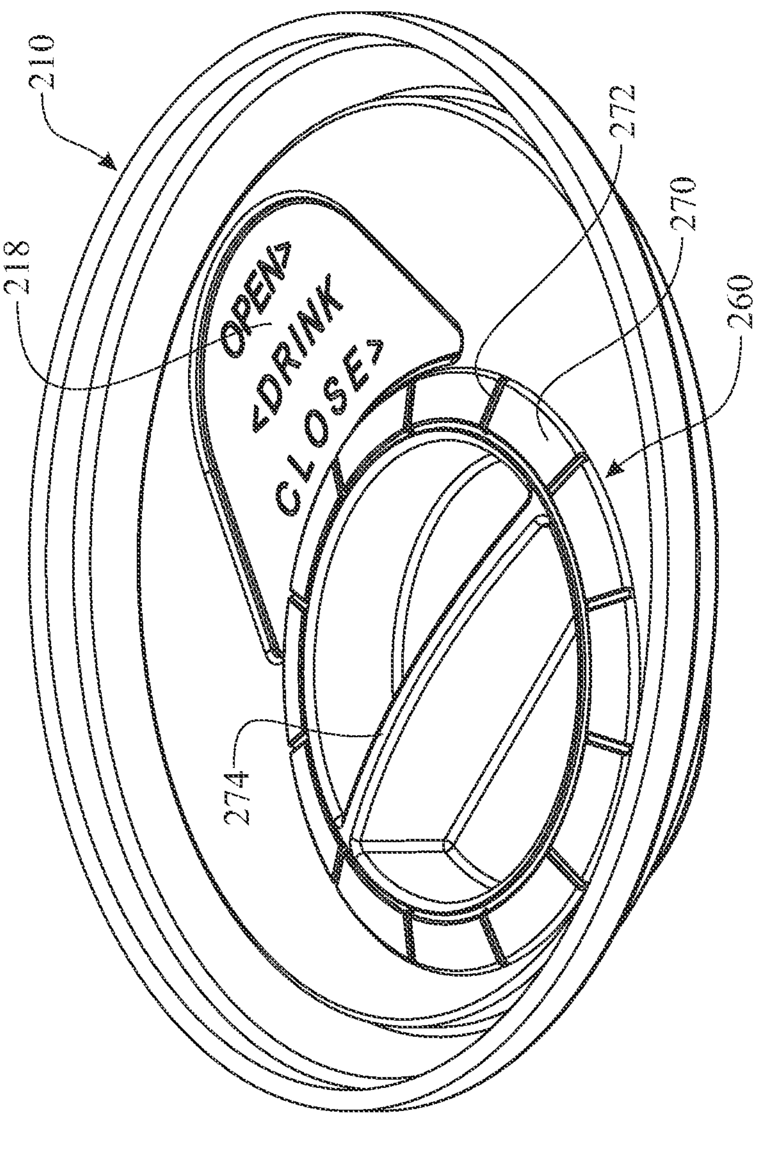
FIG. 29 presents a top isometric view of the cap and the lid of the container originally introduced in FIG. 18, wherein the cap and the lid are shown as a subassembly.

To understand how the embodiment of container 200 operates, reference is made to FIG. 25, which is a top view of the beverage container prior to opening. Optionally, the resealable container lid upper surface reinforcement formation 218 is embossed, printed or otherwise marked with instructions for how to use the resealable container cap 260. First, the consumer is instructed to open the beverage container by turning, or rotating, the resealable container cap 260 in the clockwise direction. The degree of slope on the ramps and the degree of slope on the spiral grooves is selected to ensure that the container 200 can be opened with the same or similar amount of force used to open a conventional beverage container, such as a soda can. This can be accomplished with a turning motion of the cap that is in the range of 45 to ninety degrees (45-90°), preferably.

After the resealable container cap 260 is rotated or turned to the full extent allowed, the resealable container cap 260 pushes the cap receiving socket bottom panel loop tear panel 238 into the can, but the tear panel 238 stays connected to the resealable container lid 210 through a portion of the lid between the ends of the cap receiving socket bottom panel circular score line 236. In order to then drink the contents of the container 200, the consumer turns, twists or rotates the resealable container cap 260 in the opposite direction until returning past the starting point from where the opening rotation started, placing the cam engaging projections 252, 254, 256 in the opened area of the cam groove surfaces 281, 282, 283.

At that point, the resealable container cap 260 is pulled upwardly by the consumer to become separated from the container 200, and the consumer is then free to drink from the opening formed in the resealable container lid 210 as a result of the cap receiving socket bottom panel substantially closed loop tear panel 238 being pushed into the container 100. When the consumer is finished drinking, and if the container 200 is not empty, the consumer can reseal or close the beverage container by pushing the resealable container cap 260 back into the cap receiving socket 230 and then turning, twisting or rotating the resealable container cap 260 in the same direction as the opening direction, until the resealable container cap 260 is fully seated in the cap receiving socket 230, thus sealing the opening in the container 200. In the resealed state, the contents of the container 200 can be kept fresh, carbonated (in the case of carbonated drinks), and spill-proof (when the beverage container 200 is mobile, such as if kept in a back pack, stroller, automobile drink holder, and the like).

As in the other embodiments described herein, the invention includes an assembled container 200, with or without contents, with a unique resealing mechanism. The invention also includes a container subassembly comprising a resealable container lid 210 and a resealable container cap 260, capable of further assembly with a container body 202, 204, such as beverage containers commonly in use as aluminum cans for distribution of a wide variety of beverages. The invention further includes a resealable container cap 260 capable of use with a resealable container lid 210, or with a container 200 that includes a resealable container lid 210, such that the beverage containers could be purchased without resealable container caps 260, and could separately purchase resealable container caps 260 that are then used with the containers 200 that are formed with the aforementioned cap receiving socket 230. This way, resealable container caps 260 could be re-used, repeatedly. Purchase of resealable container caps 260 separately from the containers 200 would have a "green" effect, in that the resealable container caps 260 could be washed and re-used over and over, thereby reducing waste.

Figure 36:
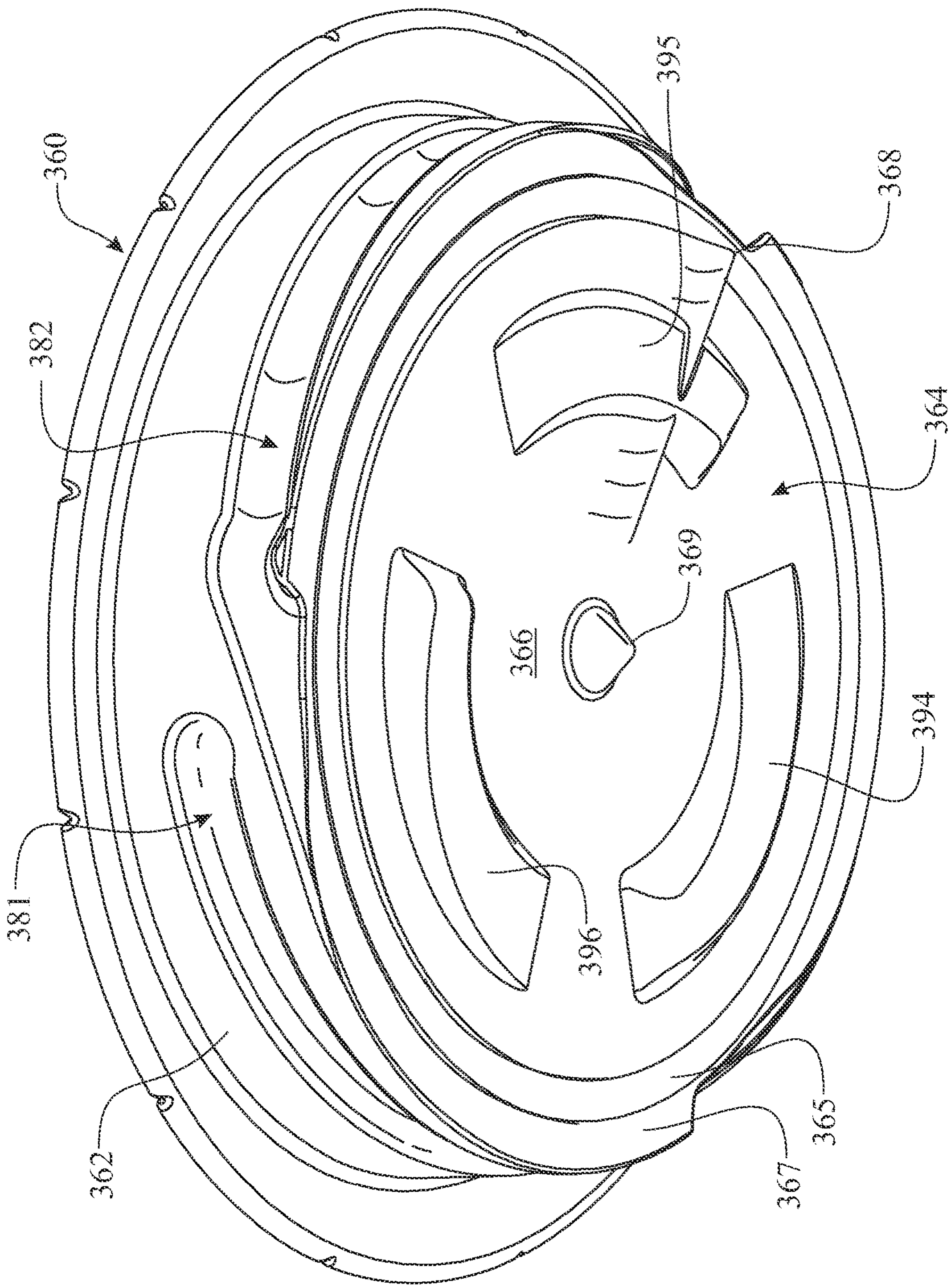
FIG. 36 presents a bottom isometric view of an enhanced cap, wherein the enhanced cap is similar in all aspects to the previously illustrated caps, while introducing a soft plastic sealing ring to further enhance the sealing capabilities of the cap.
Figure 37:
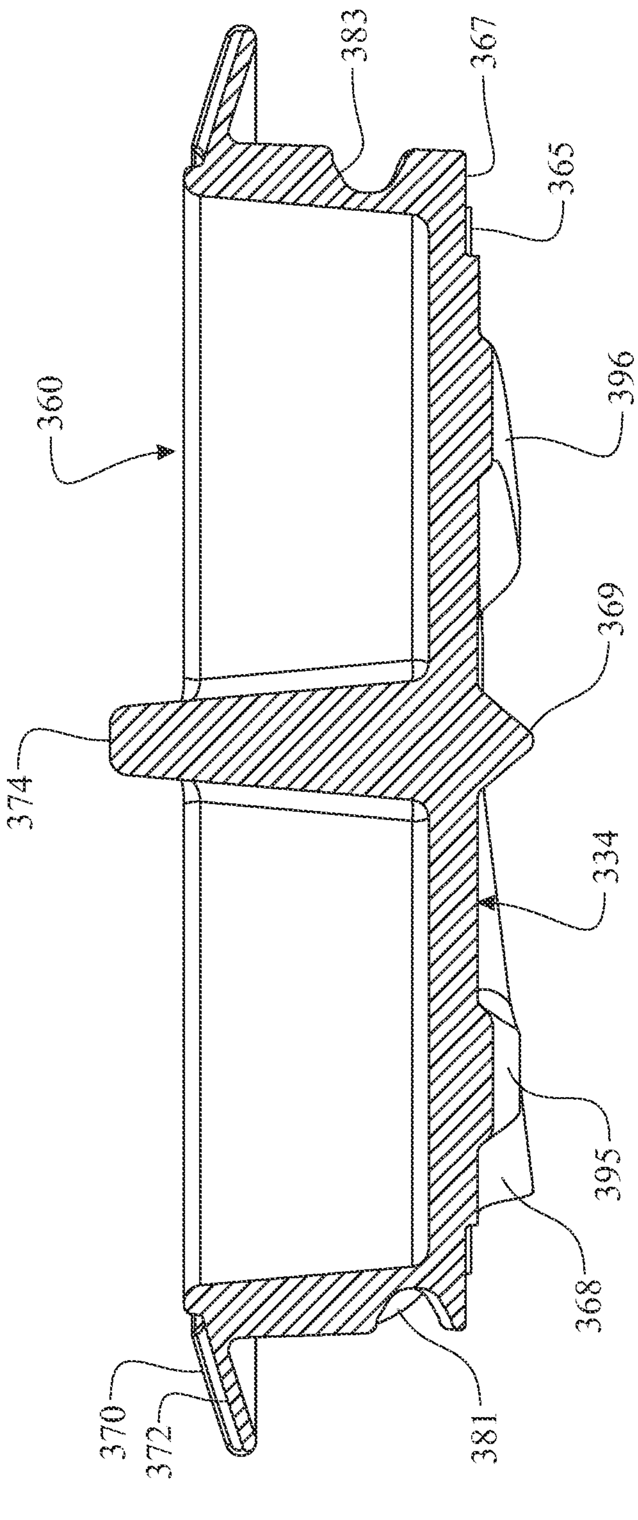
FIG. 37 presents a cross sectioned elevation view of the cap originally introduced in FIG. 36.

Another feature of the invention is to provide a resealable container cap 360, as illustrated in FIGS. 36 and 37. The resealable container cap 260 and resealable container cap 360 include a number of similar features. Like features of the resealable container cap 260 and the resealable container cap 360 are numbered the same except preceded by the numeral '3'. The resealable container cap 360 includes the features presented above, including the cap bottom surface ramps 394, 395, and 396, and cam groove surfaces 381, 382, and 383 (examples of container cap rotational and axial guide features). As with the other embodiments, the resealable container cap 360 has a cap receiving socket bottom wall 334 from which the ramps project. A cap sealing ring 365 is provided on the surface of the cap receiving socket bottom wall 334 near the periphery thereof. The cap sealing ring 365 is made of an elastomeric material that is different from the material that constitutes the resealable container cap 360, which is preferably made of a hard plastic material. The material which forms the cap sealing ring 365 can be injected through ports into a mold and formed on the resealable container cap 360 at the same time that the resealable container cap 360 is being injection molded. Alternatively, the cap sealing ring 365 can be a separate pre-formed item that can be adhesively bonded in place after the resealable container cap 360 is removed from its mold.

A central sharp projection 241 is formed in the center of the bottom surface of the resealable container cap 360, wherein the central sharp projection 241 is similar to the sharp centered incising projection 269 described above in design, location and function.

An offset projecting incisor 368 is formed along an outer region of the bottom surface of the resealable container cap 360, wherein the offset projecting incisor 368 is similar to the offset projecting incisor 268 described above in design, location, and function.

Any of a variety of thermoplastic elastomers (TPEs) can be used to make the cap sealing ring 365, and selection of the precise one is a matter of design choice, as the requirements are simply that the material be easy to mold, easily adherent to the material that makes up the cap, and to some degree deformable under pressure (in use). Other materials could be used if a sealing ring is pre-made and adhesively bonded to the end face or bottom wall of the cap. However, molding the ring in place is preferred. As for TPEs, they are sometimes referred to as thermoplastic rubbers, and are in a class of copolymers or a mixture of polymers which consist of both thermoplastic and elastomeric properties. They are particularly suitable for injection molding, which is the preferred way to form the cap sealing ring 365 on the face of the resealable container cap 360.

Figure 38:
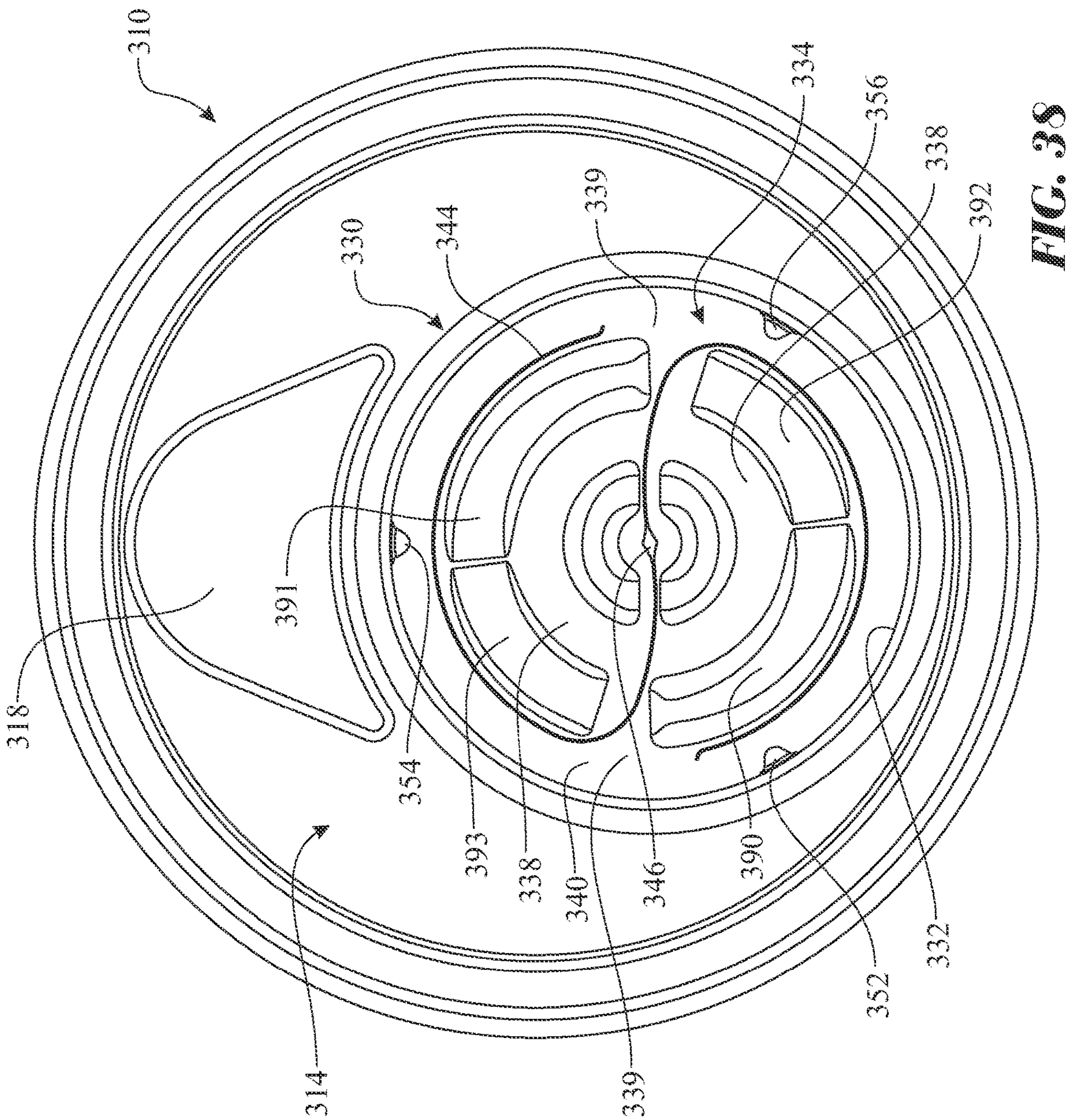
FIG. 38 presents a top plan view of another exemplary container lid, wherein the container lid is similar in all aspects to the previously illustrated lids, while introducing an alternative score line, wherein the alternative score line defines two tear panels for use during the opening process.

It is noted that in FIG. 38, there are two ramps 390, 391 illustrated as opposed to three, which are found in the other embodiments. Essentially any number of ramps can be employed, but two or three are more preferred for reasons that two or three can generate an opening force without requiring too much torque, and they are easier to manufacture than a number greater than three. As seen in FIG. 38, a cap used in the embodiment of FIG. 38 has two ramps on the lower end face that are shaped and positioned compatibly with the socket bottom panel ramps 390 and 391 shown in FIG. 38.

The resealable container cap 360 operates in the same way as the caps of previous embodiments, in that the consumer turns the cap in one direction to open the container, then turns the resealable container cap 360 in the opposite direction to remove the resealable container cap 360, and then the resealable container cap 360 is re-inserted into the cap receiving socket 230 and turned in the first, container-opening direction until the resealable container cap 360 is fully seated in the cap receiving socket 230. The resealable container cap 260 is shown in this fully seated position in FIG. 35, for resealing the container 200, in which the bottom surface 264 of the resealable container cap 260 presses against the cap receiving socket bottom wall 234 of the cap receiving socket 230 to form a sealing engagement between the cap receiving socket 230 and the cap. With the embodiment of resealable container cap 360 that includes the sealing ring 367, in this position, the cap sealing ring 365 is pressed against the cap receiving socket bottom wall 234 of the cap receiving socket 230 to enhance the sealing relationship between the cap receiving socket 230 and the resealable container cap 360. Contact between a hard surface, i.e., the metal material that makes up the cap receiving socket 230, and a relatively softer material, i.e., the elastomeric material that makes up the cap sealing ring 365, will ensure a better seal for the contents of the container 200. This is particularly useful when it comes to carbonated beverages, such as sodas, beers, and the like.

Figure 39:
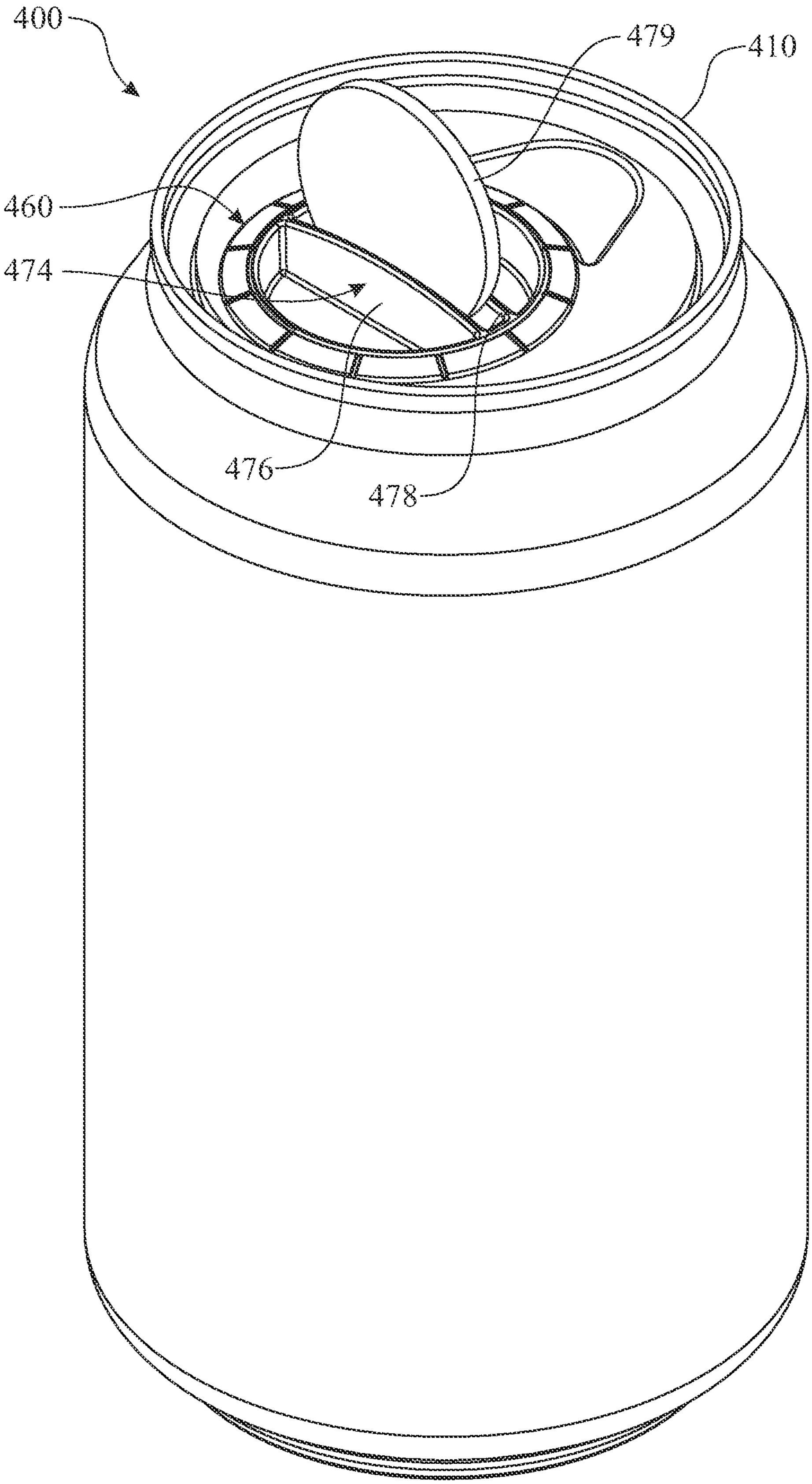
FIG. 39 presents a top and side isometric view of another exemplary container, wherein the cap introduces a grip capable of using an implement, such as a coin and the like, enabling the consumer to impart a greater opening force thereto.
Figure 40:
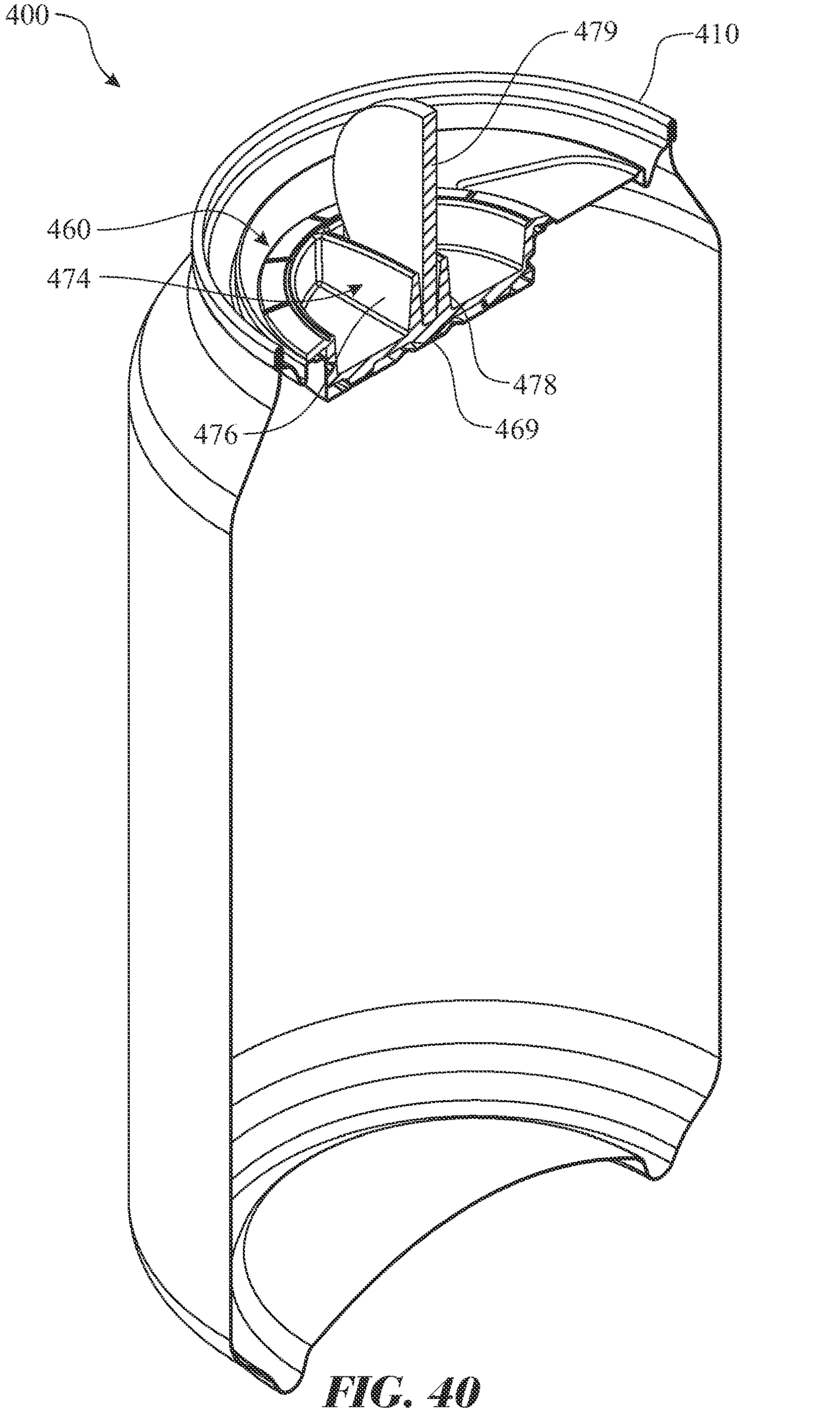
FIG. 40 presents a sectioned top and side isometric view, wherein the illustration demonstrates the use of a coin or other implement in conjunction with a grip to impart a greater opening force by the consumer.

In the previously described embodiments, the cap is provided with a resealable container cap handle or grip element 174, as seen in FIGS. 10, 11 and 13*a*, for example. An alternative embodiment of a resealable container cap grip element 374 is shown in FIGS. 39 and 40, in which the resealable container cap grip element 474 includes two parallel resealable container cap grip element first cross member 476 and 478, spaced apart by an amount sufficient to fit a force enhancing, or grip enhancing implement 479, such as a coin or other object made of a material that is rigid and strong enough to transfer torque from the consumer's hand to the resealable container cap 460. It is understood that the larger the diameter of the coin or other object, the greater the force that can be transmitted to the resealable container cap 460. The container 300 can be sold as an assembly which includes the resealable container cap 460 and the implement (coin) 479 (assuming it is not a coin), a subassembly including the resealable container lid 410, resealable container cap 460 and grip enhancing implement 479 (without the container body and sealed contents), or the resealable container cap 460 can be sold by itself. For ease of storage and transportation, and as a cost saving, it is preferable not to sell or package a grip enhancing implement 479 with the container 400 or resealable container cap 460, and/or lid/cap assembly.

Figure 41:
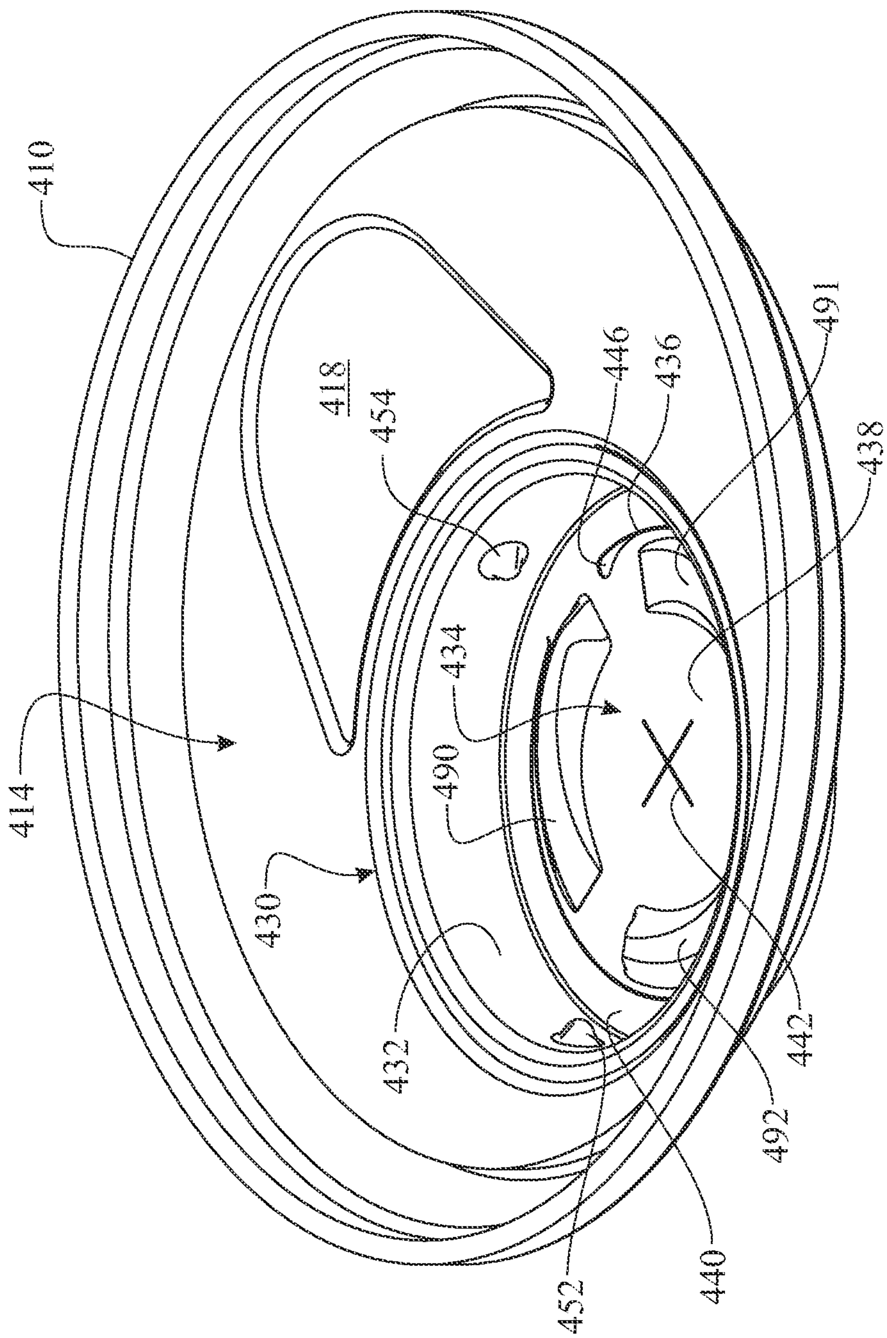
FIG. 41 presents a top isometric view of another enhanced container lid, wherein the enhancement introduces a thinned initiation region for initiating a fracture of the score line.

Referring now to FIG. 41, another aspect of the invention includes making the score line which defines the tear panel or panels in a way that enhances the opening or fracturing ability of the score line. As seen in FIG. 41, a resealable container lid 410 includes a cap receiving socket bottom wall 434 which includes a cap receiving socket bottom wall 434. The cap receiving socket bottom wall 434 includes three socket bottom panel ramps 490, 491 and 492, and a cap receiving socket bottom panel tear panel 438 defined by a cap receiving socket bottom panel circular score line 436. The cap receiving socket bottom panel circular score line 436, as in one of the previous embodiments, is in the form of a loop, not quite fully disposed, so that a hinge is defined between the opposite ends of the cap receiving socket bottom panel circular score line 436. The cap receiving socket bottom panel circular score line 436 is made during the formation steps that create the resealable container lid 410, which in the case of beverage cans, is made of 0.008 inch thick material. The score line 436 is typically 0.004 inch deep, so that the thickness of the lid 410 under the score line 436 is typically about 0.004 inch thick for aluminum beverage cans. The thinning of the material occurs during pressing of the lid 410, and in essence, the material which comprises the lid 410 is deformed and flows to create a thinned area beneath the score line 436.

Using the same principals of material flow or deformation during the pressing steps, a score line thinned fracture initiation region 437 is formed at one end of the cap receiving socket bottom panel circular score line 436 where one of the ramps 394, 395, 396 in conjunction with ramps 490, 491, 492 will impinge upon the score line 436. At the beginning of the opening process, the ramps 394, 395, 396 in conjunction with ramps 490, 491, 492 push on the flared, score line thinned fracture initiation region 437, which has been thinned essentially to the thickness of the sidewall 102, 202 of the container 100, 200, in the case of an aluminum can. In other words, the entire area of the puncture area is thinned relative to the surrounding surface of the lid 410 to make it easier to puncture or break the score line 436. Once the score line 436 is broken at the puncture area 437, the break will propagate more readily and predictably around the score line 436 to ease the opening of the container 100, 200. Although the score line thinned fracture initiation region 437 is thinner, and thus potentially more vulnerable to accidental opening, it is no thinner than the sidewall of the beverage container and thus capable of withstanding internal pressures. It is also shielded from accidental external rupture by means of the cap 460 when seated in the socket 430.

Each embodiment described herein has referred to a tear panel, such as cap receiving socket bottom panel tear panel 138, as that part of the bottom wall of the socket that is defined by a circular or loop-shaped score line. This tear panel can also be described as a "frangible area" because it breaks away from the rest of the bottom wall 138, 238, 338, 438 when the cap 160, 260, 360, 460 descends into the socket 130, 230, 330, 430. It is not required, however, for the tear panel 138, 238, 338, 438 or frangible area to be substantially circular or looped in shape, and indeed, a second illustrated embodiment is shown in FIG. 38. While all other aspects of the resealable container lid 310 are the same as in previous embodiments, including a cap receiving socket 330 having a cap receiving socket bottom wall 334, the bottom wall 334 is provided with an cap receiving socket bottom panel "S" shaped score line 344 which, when fractured by operation of the down movement of the cap and engagement of socket bottom panel ramp 390 and 391, the fracture forms two separate tear panels 338 which are pushed inwardly during the opening operation, with the two tear panels 338 being connected to the can by a hinge area 339 on opposite sides of the cap receiving socket bottom wall 334. During the opening process, the sharp protrusion in the middle of the bottom wall of the cap will puncture the center of the score line 344 at a score line fracture thinned initiation region 346. At about the same time, the ramps 390, 391, 392, 393 of the cap receiving socket 330 and the ramps 394, 395, 396 of the resealable container cap 360 cooperate to push the tear panels 338 at locations opposite what will become the hinges 339, in essentially the "loop" portions of the cap receiving socket bottom panel "S" shaped score line 344. Simultaneously, two tear panels 338 are formed and pushed into the interior of the container 100, 200.

During opening and closing operations, the resealable container cap handle or grip element 274, 474 is turned preferably ninety degrees (90°) in one direction, and then to withdraw the resealable container cap 260, 360, 460 from the socket, the grip 274, 474 is turned ninety degrees (90°) in the opposite direction, to the beginning point. In order to remove the resealable container cap 260, 360, 460 altogether from the lid, the grip is turned approximately another ten degrees (10°) until the grooves and protrusions are separated and the resealable container cap 260, 360, 460 is free to be lifted upwardly away from the container. Different combinations of embossed ramps 390, 392 and de-bossed ramps 391, 393, and different numbers of ramps, can be employed to achieve the desired effect. The space between the resealable container cap 260, 360, 460 and the cap receiving socket bottom wall 234, 334 of the cap receiving socket 230, 330, 430 is equal to the length of linear travel when the resealable container cap 260, 360, 460 is operated between the transport and open/resealed positions (in the case of aluminum beverage cans, approximately 0.055 inches). With the use of ramps that are embossed on the tear panel 238, 338, 438 that distance can be doubled, forcing the tear panel 238, 338, 438 to fold on its hinge 239, 339, 439 further away from the opening.

In all cases using ramps, it is preferred that the peak height of the ramps be disposed near or in close proximity to the hinge, as this will help push the tear panel 238, 338, 438 out of the way when the cap's cam body pushes through the opening. The ramps help propagate the ruptured score line along its length. There are corresponding ramps or other structures on the bottom of the cap that will interface with ramps on the tear panel 238, 338, 438 or panels. All ramps are embossed (rise up from the bottom socket surface), but they could equally be de-bossed ramps 391, 393 that start below the bottom socket surface and continue up the embossed ramp 390, 392. If the respective ramp on the cap starts inside the debossed ramp on the lid 210, 310, 410, during operation the effective linear travel of the cap 260, 360 460 can be doubled, tripled, and perhaps quadrupled.

Figure 43:
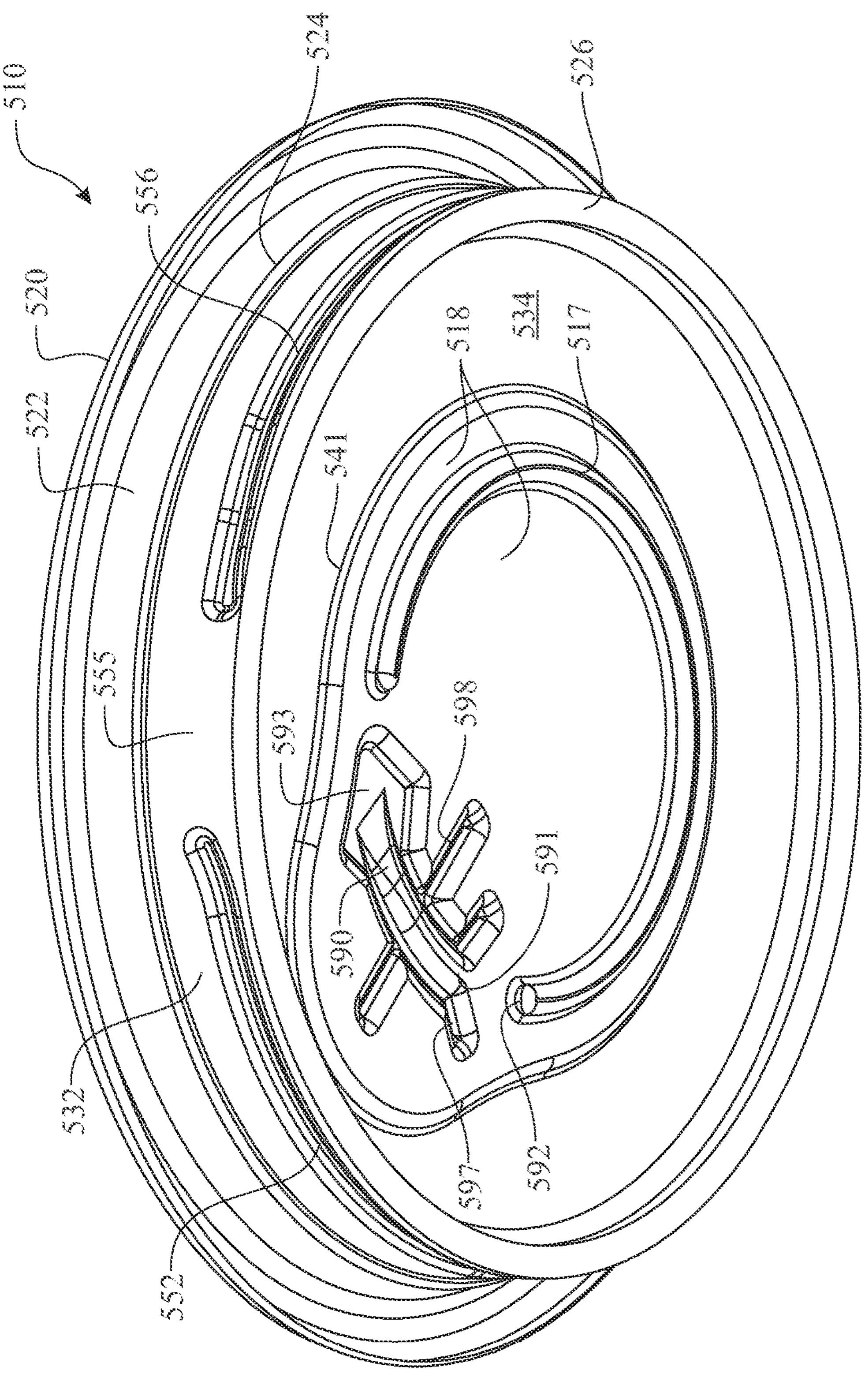
FIG. 43 presents a bottom isometric view of the container lid introduced in FIG. 42.

A resealable container lid 510, illustrated in FIGS. 42 through 78, is another exemplary variant of the resealable container lid concepts previously described herein. The resealable container lid 510 (detailed in FIGS. 42 through 44) and the resealable container cap 560 (detailed in FIGS. 45 through 47) include a portion of features that are similar to those of the resealable container lid 110 and resealable container lid 210 and those of the resealable container cap 160 and resealable container cap 260, respectively. Like features of the resealable container lid 510 and the resealable container lid 110 and resealable container lid 210 are numbered the same except preceded by the numeral '5'. Like features of the resealable container cap 560 and the resealable container cap 160 and resealable container cap 260 are numbered the same except preceded by the numeral '5'. The resealable container 500 (detailed in FIGS. 80 and 81, being assembled in FIGS. 82 through 85, and shown in use in FIGS. 86 through 90) and the resealable container 100 (detailed in FIGS. 1 through 4) include elements of a container body 102, 104, 106, 108, 109. Like features of the container body 502, 504, 506, 508, 509 and the container body 102, 104, 106, 108, 109 are numbered the same except preceded by the numeral '5', as indicated.

The resealable container lid 510 is preferably formed from a single sheet of metal using any suitable metal forming process or combination of metal forming processes. The resealable container lid 510 is formed having a substantially vertical sidewall 522, 532 and a generally horizontally arranged cap receiving socket bottom wall 534. The substantially vertical sidewall 522, 532 is configured having a cylindrical shape extending between an upper peripheral edge and a lower peripheral edge.

In previous variants, a cap receiving socket 130 was formed extending downward from a portion of the resealable container lid planar base bottom 119. More specifically, the cap receiving socket 130 is defined by a cap receiving socket cylindrical sidewall 132 in combination with the cap receiving socket bottom wall 134. The cap receiving socket 130 is preferably located off-centered respective to a peripheral edge of the resealable container lid 110.

In the exemplary variant, a cap receiving socket is defined by the cap receiving socket cylindrical sidewall 532 in combination with the cap receiving socket bottom wall 534. More specifically, the resealable container lid 510 is formed deeper to include the cap receiving socket cylindrical sidewall 532 as part of the outer peripheral sidewall, making the cap receiving socket bottom wall 534 the same as the container lid planar base bottom 119. The cap receiving socket is concentrically arranged respective to the cap receiving socket cylindrical sidewall 532 of the resealable container lid 510. A peripheral countersink 526 provides a transition between the cap receiving socket cylindrical sidewall 532 and the cap receiving socket bottom wall 534. The peripheral countersink 526 is preferably formed having a generally "U" shape, extending downward from the cap receiving socket cylindrical sidewall 532, then radially inward arching from a downward direction to an upward direction, and extending upward where the peripheral countersink 526 transitions into a peripheral edge of the cap receiving socket bottom wall 534.

The peripheral countersink 526 extends downward below an upper surface of the cap receiving socket bottom wall 534. The peripheral countersink 526 provides a clearance for a lower region of a resealable container cap cylindrical exterior sidewall 562 of the resealable container cap 560 during assembly of the resealable container cap 560 and the resealable container lid 510 to one another.

Figure 82:
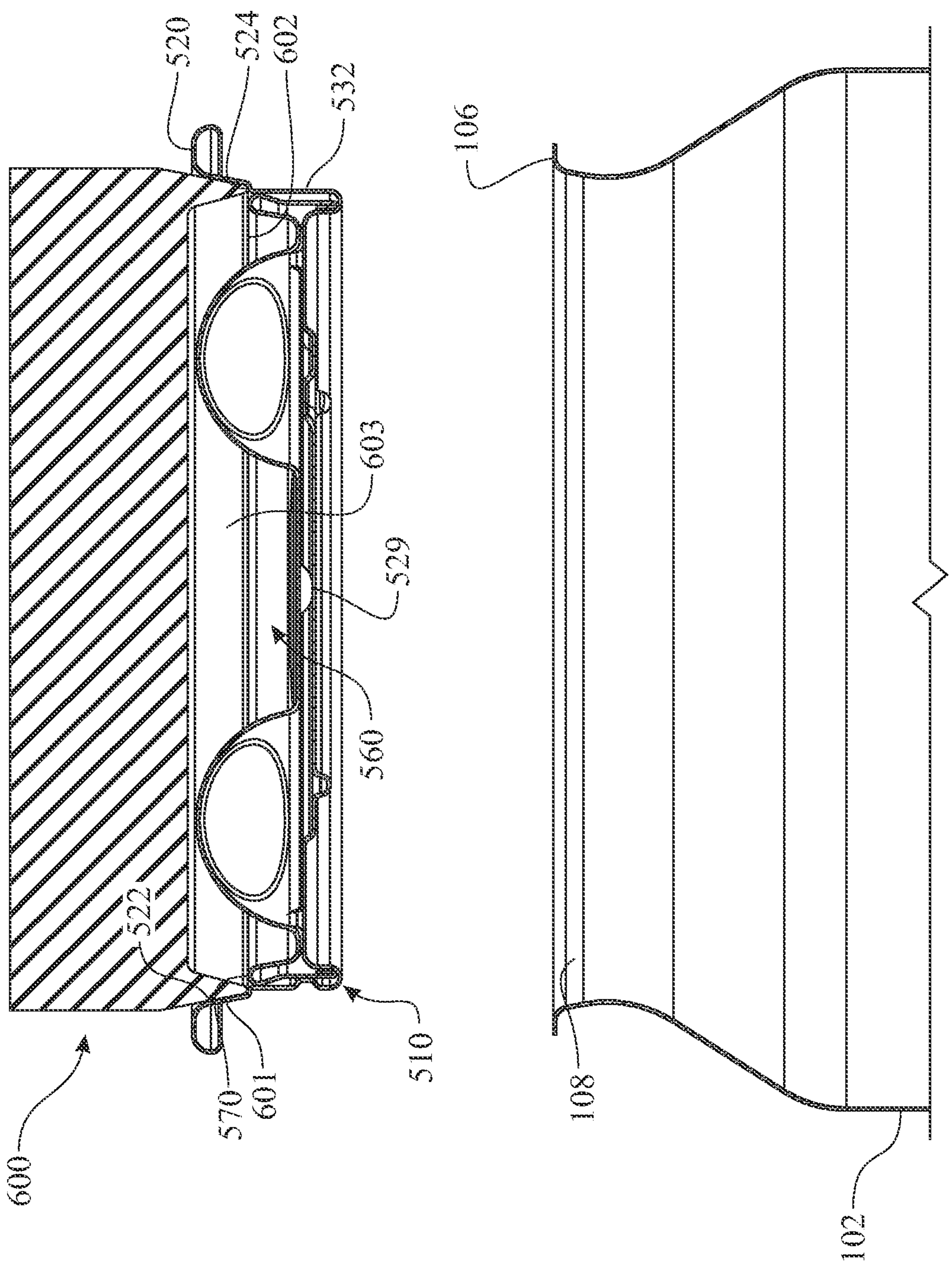
FIG. 82 presents a sectioned elevation view of the container lid introduced in FIG. 42 and the cap introduced in FIG. 79 assembled to one another in preparation for seaming onto a container body, the section orientation being referenced by section line 82-82 of FIG. 79, the illustration focusing on an series of steps for seaming the container lid assembly onto the container body.

The resealable container lid 510 includes a number of functional features. A seaming panel 520 (alternatively referred to as a lid and container joining formation 520) is formed about an upper edge of the resealable container lid 510, wherein the seaming panel 520 is provided to assemble the resealable container lid 510 to a container seaming flange 106 (FIG. 82). The resealable container lid 510 is assembled to a top rim of the container cylindrical sidewall 102, sealing contents within a resealable container 500, as shown in FIGS. 82-85. The resealable container lid 510 includes features enabling a user to access the contents sealed within the resealable container 500. A resealable container cap 560 is employed to enable a user to breach the sealed resealable container lid 510 and access or dispense the contents stored within the resealable container 500. Additionally, the resealable container cap 560 may be employed to enable a user to reseal/close the opened resealable container lid 510 preserve and protect the contents stored within the resealable container 500.

A cap receiving socket bottom panel tear panel 538 is designed into the resealable container lid 510 enabling the user to access the contents stored within the container. The cap receiving socket bottom panel tear panel 538 is defined by a cap receiving socket bottom panel circular score line 536 formed within the cap receiving socket bottom wall 534 of the resealable container lid 510. The cap receiving socket bottom panel tear panel 538 can be formed in at least one of a top surface of the cap receiving socket bottom wall 534 and a bottom surface of the cap receiving socket bottom wall 534. The cap receiving socket bottom panel circular score line 536 can be routed in any suitable shape defining the cap receiving socket bottom panel tear panel 538. In the exemplary embodiment, the cap receiving socket bottom panel circular score line 536 is formed extending between two ends in a generally circular shape. The two ends are spatially arranged creating a tear panel hinge 539. At least one end can be configured extending outward from an interior region or cap receiving socket bottom panel tear panel 538 defined by the cap receiving socket bottom panel circular score line 536. The at least one outward extending end of the cap receiving socket bottom panel circular score line 536 deters against tearing of the material between the two ends of the cap receiving socket bottom panel circular score line 536. It is understood that the preferred cap receiving socket bottom panel circular score line 536 would include a configuration where both ends include the outward extending formation. The outward extending formation can be linear, arched, or of any other suitable shape. In the exemplary embodiment, the cap receiving socket bottom panel tear panel 538 is designed to open when the resealable container cap 560 is rotated in a counterclockwise direction, wherein the opening is defined as a dispensing aperture. The dispensing aperture can be sized to dispense a beverage and/or a food product, wherein the beverage and/or food product are collectively referred to as comestible. The exemplary embodiment is directed towards a container adapted for retaining, distributing, and consuming a beverage, such as water, carbonated drinks, fruit drinks, milk, beer, wine, and the like. It is understood that the same container lid 510 can be used for smaller food products, such as peanuts and other nuts, candy, mints, gumdrops, confections, jelly beans, condiments, soups, oils, spices, powdered products (baking soda, sugar, flour), and the like.

Figure 52:
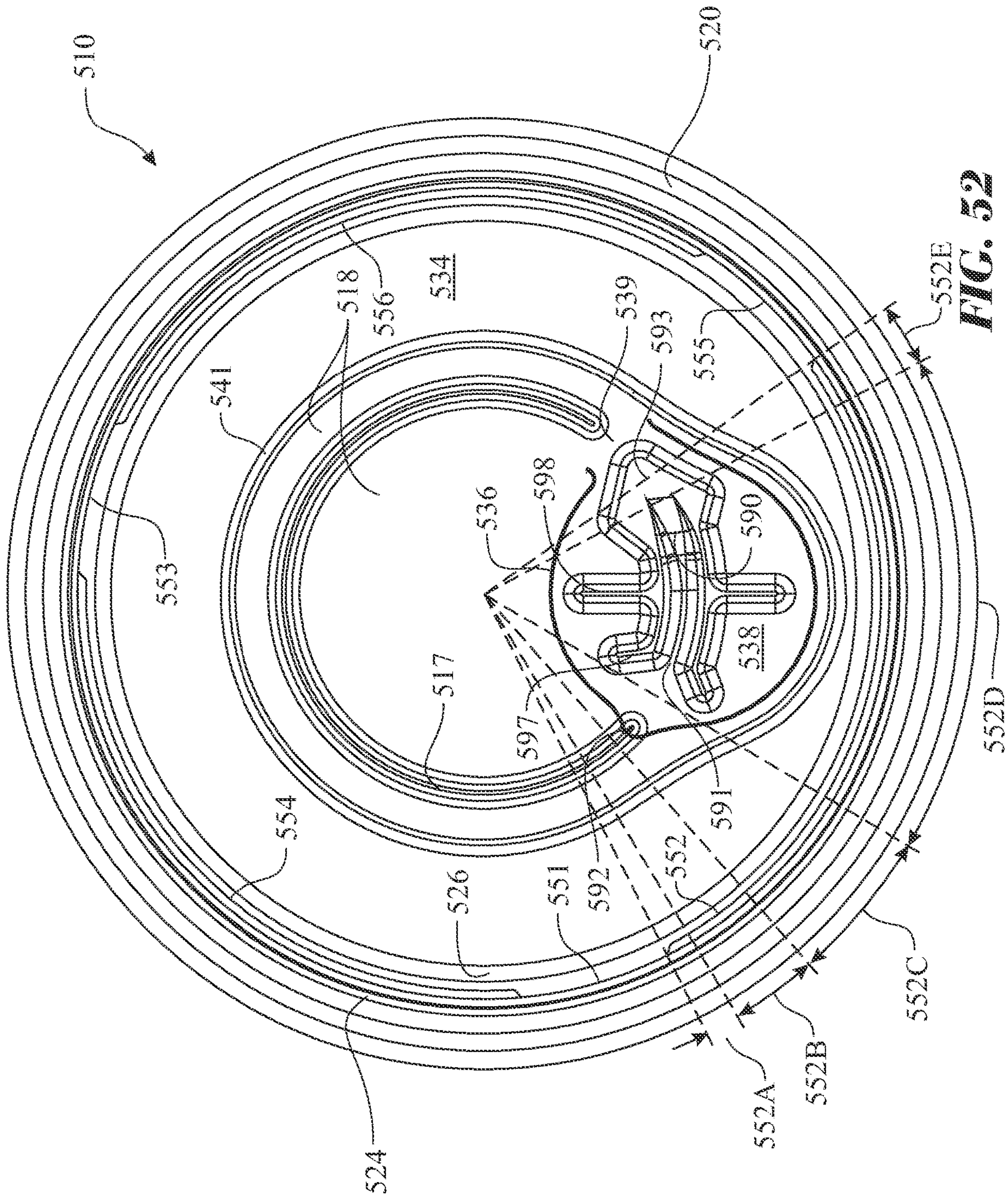
FIG. 52 presents a top plan view of the container lid introduced in FIG. 42, the illustration introducing the series of functional segments associated with a travel path of a cam interface.
Figure 53:
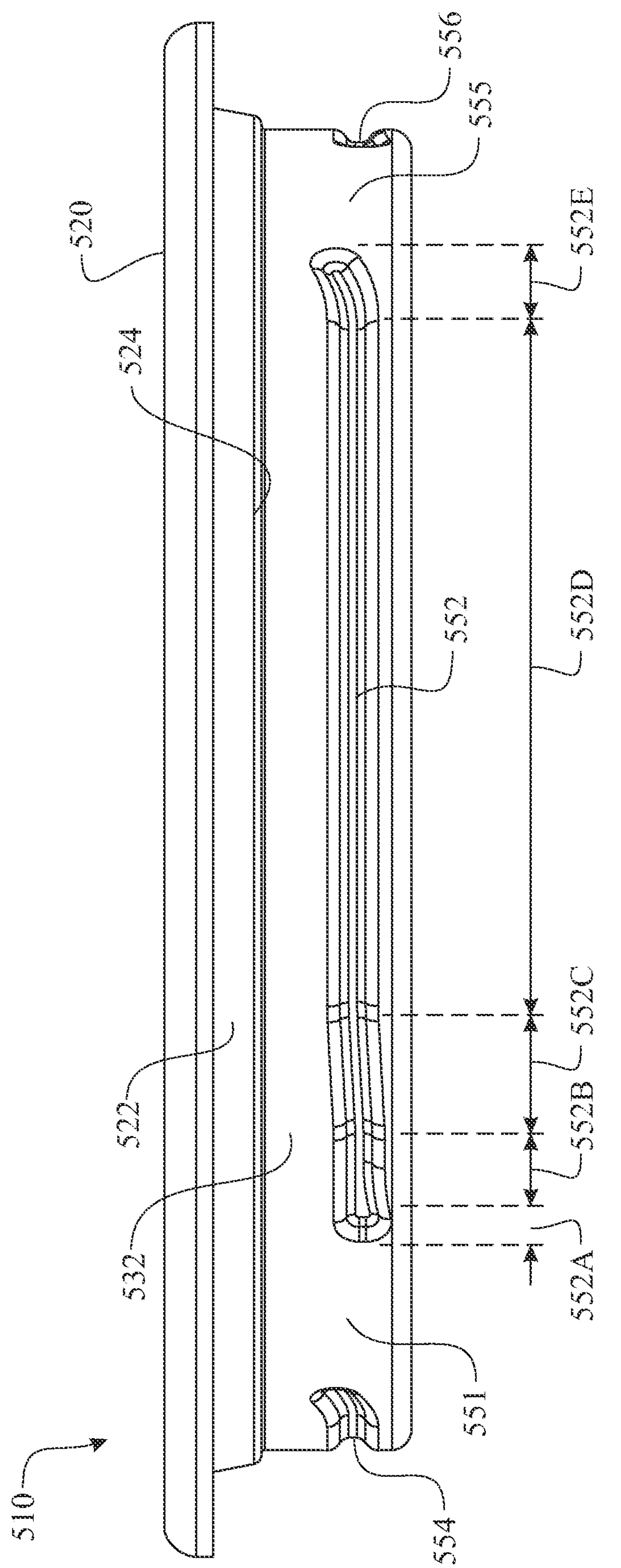
FIG. 53 presents a side elevation view of the container lid introduced in FIG. 42, the illustration detailing the series of functional segments associated with the travel path of the cam interface.
Figure 54:
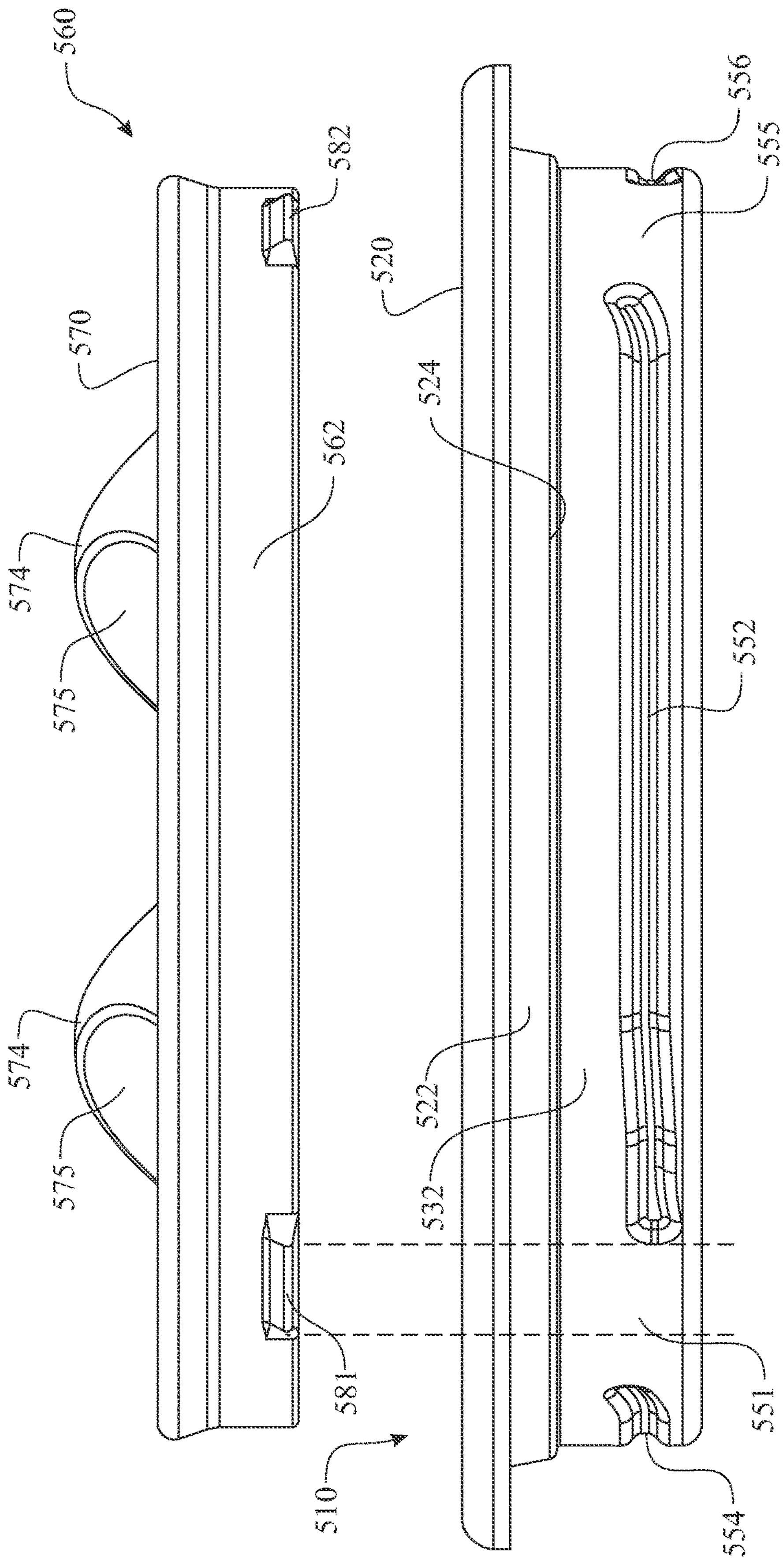
FIG. 54 presents a side elevation exploded assembly view of the container lid introduced in FIG. 42 and the cap introduced in FIG. 45, the illustration introducing a first step of aligning a cam follower of the cap with a cam tab relief section of the lid, the cam tab relief section being located between adjacent cams.

A seaming chuck shoulder 524 can be formed about a central portion of the vertical wall, segmenting the wall into a seaming chuck wall 522 (upper portion) and a cap receiving socket cylindrical sidewall 532 (lower portion). A plurality of cam tracks 552, 554, 556 (examples of container lid rotational and axial guide features) is formed within the cap receiving socket cylindrical sidewall 532. The plurality of cam tracks 552, 554, 556 is spatially arranged about the cap receiving socket cylindrical sidewall 532. The plurality of cam tracks 552, 554, 556 run generally horizontally, having slight upward and/or downward deviations to accomplish upward and/or downward motions of the resealable container cap 560. The cam tracks 552, 554, 556, provide several functions, including rotational and axial motions between the resealable container lid 510 and the resealable container cap 560, reinforcement of the vertical wall, a retention mechanism for retaining the resealable container cap 560 within the cap receiving socket of the resealable container lid 510, and other functions. The cam tracks 552, 554, 556 are segmented functionally into a plurality of sections, as shown in FIGS. 52 and 53. Details of the plurality of sections of the cam tracks 552, 554, 556 will be described later herein. The cam tracks 552, 554, 556 are preferably formed as embossed features extending inward from the cap receiving socket cylindrical sidewall 532. An inter-cam relief section 551, 555, 553 extends between adjacent ends of adjacent cam tracks 552, 554, 556. The inter-cam relief sections 551, 555, 553 enable passage of a respective cam follower 581, 582, 583 (examples of container cap rotational and axial guide features) of the resealable container cap 560 from a position above the cam tracks 552, 554, 556 to a position below the cam tracks 552, 554, 556.

A resealable container lid upper surface reinforcement formation 518 can be included and would be formed as either an embossed feature or a debossed feature within the cap receiving socket bottom wall 534. The resealable container lid upper surface reinforcement formation 518 is defined by a socket bottom wall to surface reinforcement formation transition 541. The cap receiving socket bottom panel tear panel 538 would be located within the resealable container lid upper surface reinforcement formation 518. The resealable container lid upper surface reinforcement formation 518 would be shaped to support the material of the resealable container lid upper surface reinforcement formation 518 adjacent to the cap receiving socket bottom panel circular score line 536 to increase the efficiency of the propagation of the fracture when the opening force is applied by the resealable container cap 560 onto the associated features of the cap receiving socket bottom panel tear panel 538. In addition, the resealable container lid upper surface reinforcement formation 518 provides a clearance for an incisor deboss panel 566 on the resealable container cap 560 and the resealable container lid upper surface reinforcement formation 518 lowers the top surfaces of the lead in supplemental score fracture propagation and tear panel support boss 597, the tear panel reinforcing boss 598, and the finishing score fracture propagation and tear panel fold urging boss 593 of the cap receiving socket bottom panel tear panel 538 resulting in a clearance to the bottom surface of the resealable container cap planar traversing wall 564 of the resealable container cap 560. The incisor deboss panel 566 is described as such as when viewing from an exterior surface of a resealable container cap 560 formed from a single sheet of material, the incisor deboss panel 566 appears as a recession extending downward from the resealable container cap planar traversing wall 564. In an alternative description, the incisor deboss panel 566 can be referred to as an incisor platform 566, as the incisor platform 566 extends downward from a bottom surface of the resealable container cap planar traversing wall 564.

The resealable container lid 510 can include one or more features to reinforce desired areas of the resealable container lid 510.

Reinforcement features can be integrated into the cap receiving socket bottom wall 534 and/or the vertical sidewall. The reinforcement features can provide any of several functions, including retention of a shape of the associated segment of the resealable container lid 510, movement between the resealable container cap 560 and the resealable container lid 510, reinforcement during initiation and/or propagation of a fracture of a cap receiving socket bottom panel circular score line 536, clearance for features during operation, retention of the resealable container cap 560 within the cap receiving socket of the resealable container lid 510, and the like.

The seaming chuck shoulder 524 provides some rigidity to the vertical sidewall. The cam tracks 552, 554, 556 provide additional rigidity to the vertical sidewall. The peripheral countersink 526 provides support about the lower edge of the vertical sidewall and the peripheral edge of the cap receiving socket bottom wall 534. The peripheral countersink 526 introduces some flexibility between the lower edge of the vertical sidewall and the peripheral edge of the cap receiving socket bottom wall 534, which will be described in more detail when discussing a retort process.

As stated above, the socket bottom wall to surface reinforcement formation transition 541 (defining the resealable container lid upper surface reinforcement formation 518) supports the portion of the resealable container lid upper surface reinforcement formation 518 adjacent to the cap receiving socket bottom panel circular score line 536 to increase the efficiency of the propagation of the fracture when the opening force is applied by the resealable container cap 560 onto the associated features of the cap receiving socket bottom panel tear panel 538.

An incisor pathway channel 517 can be formed within the resealable container lid upper surface reinforcement formation 518. The incisor pathway channel 517 is preferably formed having a semi-circular, debossed shape concentric with an axis of rotation of the resealable container cap 560. One end of the incisor pathway channel 517 terminates at an incisor channel to tear panel surface transition 592, wherein the incisor channel to tear panel surface transition 592 is located proximate and/or abutting a fracture initiating region of a cap receiving socket bottom panel circular score line 536. The incisor pathway channel 517 provides several functions, including increasing a rigidity of the resealable container lid upper surface reinforcement formation 518 and providing a clearance for an incisor 568 during rotation of the resealable container cap resealable container cap 560, wherein the offset projecting incisor 568 extends downward from a lower surface of the resealable container cap 560.

The exemplary embodiment includes a series of ribs 593, 597, 598 for reinforcing the cap receiving socket bottom panel tear panel 538. These formations reinforce the cap receiving socket bottom panel tear panel 538 in both a radial direction and a tangential direction respective to a rotational motion of the resealable container cap 560. The series of ribs 593, 597, 598 transfers and distributes a force applied by features of the resealable container cap 560 across the cap receiving socket bottom panel tear panel 538, directing the applied force to the cap receiving socket bottom panel circular score line 536, propagating a fracturing of the cap receiving socket bottom panel circular score line 536 along a length of the cap receiving socket bottom panel circular score line 536.

In addition to the above described reinforcing features, the lower edge of the resealable container cap cylindrical exterior sidewall 562 can be rolled to reinforce the circumferential lower edge thereof, as well as eliminating any sharp edges of the resealable container cap 560.

The resealable container cap 560 can be formed in any suitable configuration, with several variations of the container cap being described herein. Each of the variants of the container caps can be fabricated of any suitable metal, aluminum, steel, plastic, composite materials, fiber reinforced plastics, or any other suitable material. The exemplary resealable container cap 560 is formed from a single sheet of material using at least one commonly known metal forming process or other manufacturing process associated with the selected material.

The exemplary resealable container cap 560 includes a vertical sidewall circumscribing a peripheral edge of a resealable container cap planar traversing wall 564. The vertical sidewall includes an upward extending resealable container cap cylindrical interior sidewall 563 and a downward extending resealable container cap cylindrical exterior sidewall 562. The upward extending resealable container cap cylindrical interior sidewall 563 and the downward extending resealable container cap cylindrical exterior sidewall 562 are generally perpendicular to a resealable container cap planar traversing wall 564.

A cylindrical sidewall inverted countersink 570 is formed about an upper end of the vertical sidewall, the cylindrical sidewall inverted countersink 570 being a transition between the resealable container cap cylindrical interior sidewall 563 and the resealable container cap cylindrical exterior sidewall 562. The cylindrical sidewall inverted countersink 570 can be formed having an inverted "U" shape. The resealable container cap cylindrical exterior sidewall 562 is preferably dimensioned so that it fits within a generally vertical clearance between the proximal surfaces of the cam tracks 552, 554, 556 and the peripheral edge of the cap receiving socket bottom wall 534 (essentially, an inner wall of the peripheral countersink 526). Additionally, the resealable container cap cylindrical exterior sidewall 562 is preferably designed so that it curves out towards the cap receiving socket cylindrical sidewall 532, closing the gap created between the cap receiving socket cylindrical sidewall 532 and resealable container cap cylindrical exterior sidewall 562 to provide clearance for the cam tracks 552, 554, 556. It is understood that by closing this gap the container lid assembly can decrease the possibility of contaminants entering the gap between the cap receiving socket cylindrical sidewall 532 and resealable container cap cylindrical exterior sidewall 562.

An offset projecting incisor 568 extends downward from a bottom surface of the resealable container cap planar traversing wall 564. The offset projecting incisor 568 can be located within a incisor deboss panel 566, wherein the incisor deboss panel 566 is a debossed feature providing several functions, including lowering the offset projecting incisor 568, reinforcing an area of the material surrounding the offset projecting incisor 568, a distributed compression force applicator, and other functions.

A ring shaped cap sealing ring 565 is applied to a peripheral edge of a bottom surface of the resealable container cap planar traversing wall 564. The cap sealing ring 565 is fabricated of any suitable pliant material, including an elastomer, an elastomeric polymer, plastisol, a low durometer rubber, or any other suitable pliant sealing material.

A series of cam followers 581, 582, 583 are spatially arranged along a lower edge of the resealable container cap cylindrical exterior sidewall 562. The cam followers 581, 582, 583 are preferably formed using any suitable metal forming process, such as crimping process. The cam followers 581, 582, 583 would be sized and spatially arranged and located to be in alignment with the respective inter-cam relief sections 551, 555, 553. The cam followers 581, 582, 583 are sized and spatially arranged to pass through each respective inter-cam relief section 551, 555, 553 for engagement with a lower surface of the respective cam track 552, 554, 556. The interaction between the cam followers 581, 582, 583 and the respective cam track 552, 554, 556 converts a rotational motion of the resealable container cap 560 within the cap receiving socket of the resealable container lid 510 into at least one of an axial motion and an axial force applicator. The peripheral countersink 526 of the resealable container lid 510 is sized and shaped to receive the bottom edge of resealable container cap cylindrical exterior sidewall 562 and the cam followers 581, 582, 583 formed on the bottom edge of resealable container cap cylindrical exterior sidewall 562.

At least one resealable container cap grip element 574 is formed extending upward from the top surface of the resealable container cap planar traversing wall 564 of the resealable container cap 560. The resealable container cap grip element 574 can be formed having any suitable shape. In a preferred embodiment, the resealable container cap grip element 574 would be of a height that retains a top edge of the resealable container cap grip element 574 at or below a top edge or surface of the seam of the container (container body and lid assembly seam 509 of FIG. 90). The resealable container cap planar traversing wall 564 is recessed within a cavity defined by the resealable container cap cylindrical interior sidewall 563, wherein the recessed resealable container cap planar traversing wall 564 enables the resealable container cap grip element 574 to project upward therefrom, while retaining a minimum overall height from the bottom of the resealable container cap 560.

The resealable container cap grip element 574 would include at least one cap grip element force application surface 575. The cap grip element force application surface 575 would be sized to ergonomically and adequately support a force applied by the end user.

Figure 50:
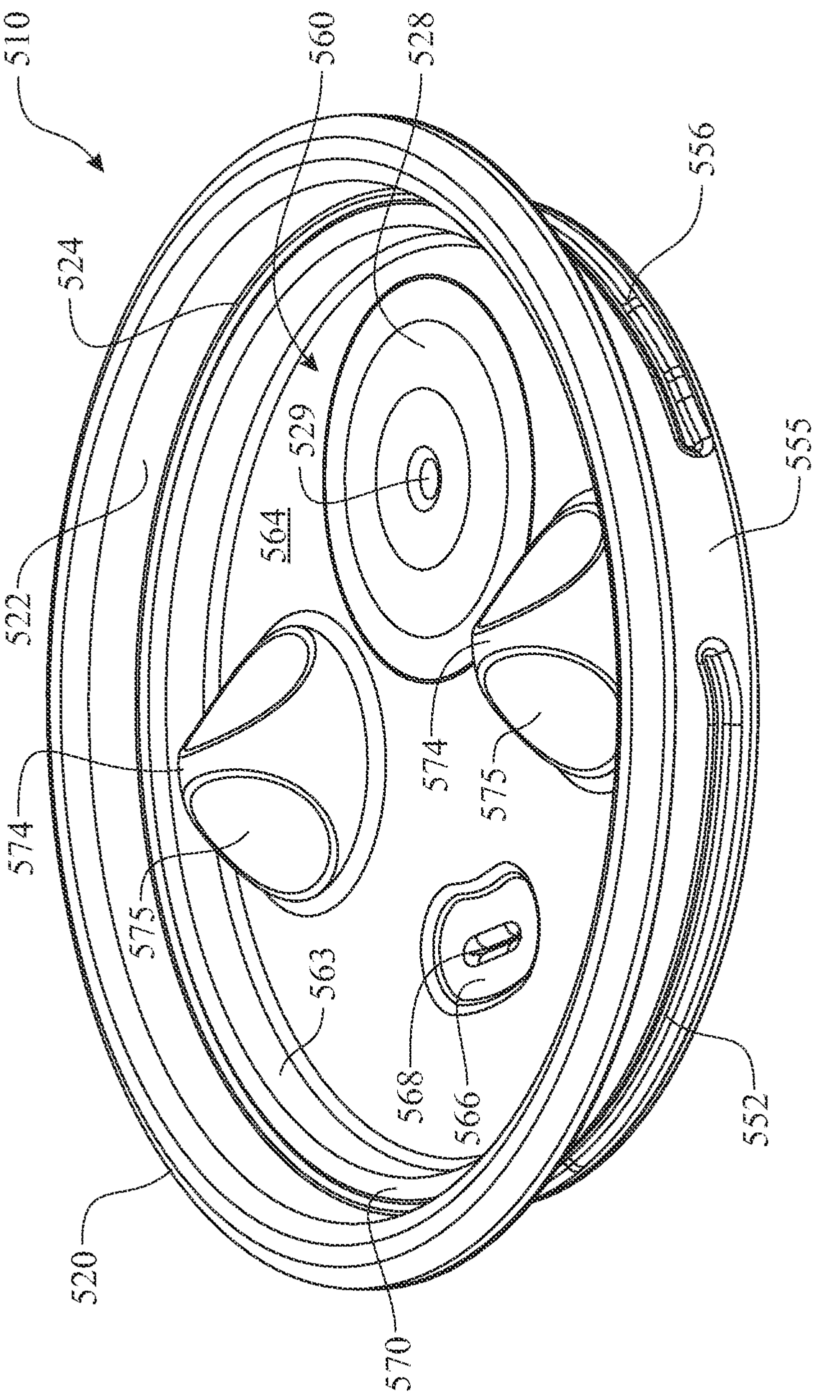
FIG. 50 presents a top isometric assembly view of the container lid originally introduced in FIG. 42 and the cap originally introduced in FIG. 45.
Figure 51:
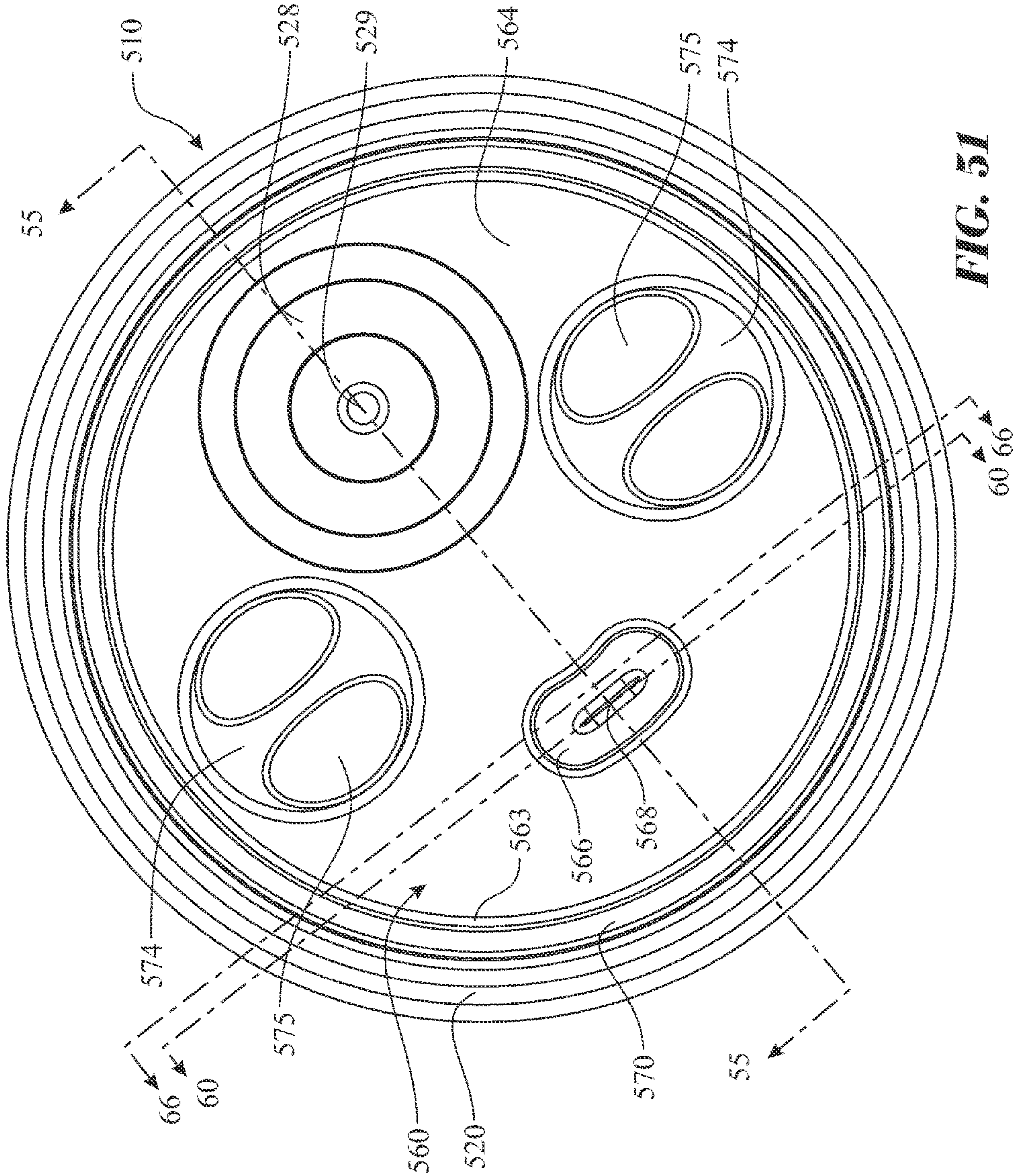
FIG. 51 presents a top plan assembly view of the container lid originally introduced in FIG. 42 and the cap originally introduced in FIG. 45.
Figure 55:
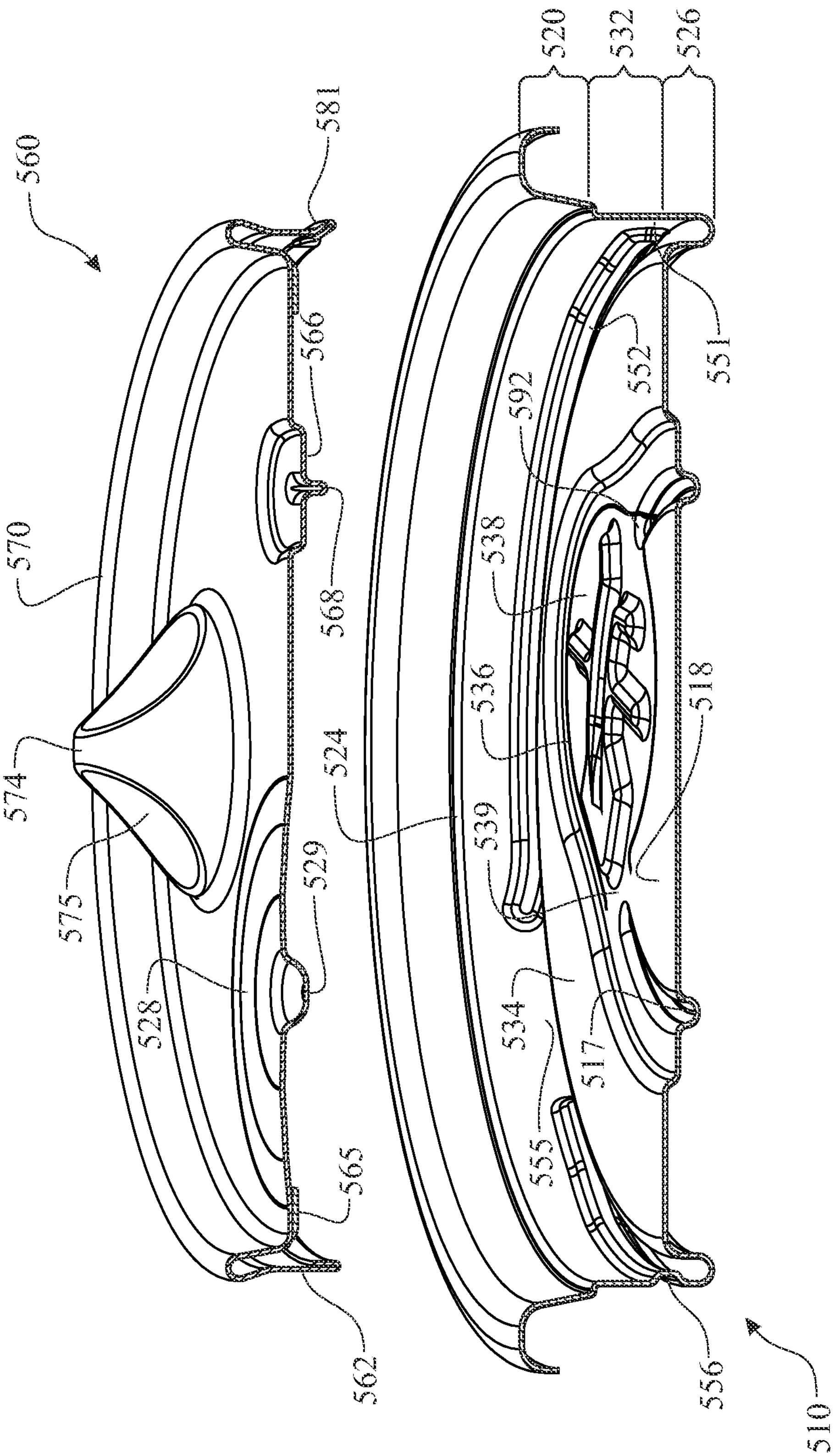
FIG. 55 presents a top isometric exploded assembly section view of the container lid introduced in FIG. 42 and the cap introduced in FIG. 45, the section taken along section line 55-55 of FIG. 51.
Figure 56:
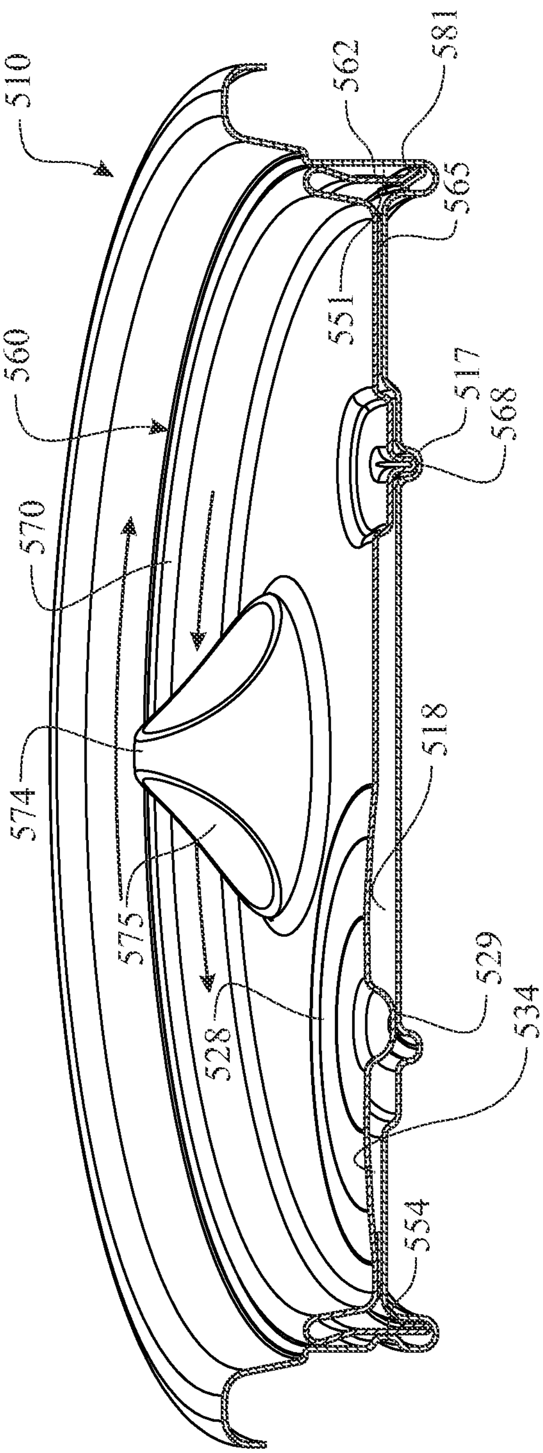
FIG. 56 presents a top isometric assembly section view of the container lid introduced in FIG. 42 and the cap introduced in FIG. 45, the section taken along section line 55-55 of FIG. 51, introducing an initial step of assembly.

The user would grip each at least one cap grip element force application surface 575 to apply a force to the resealable container cap 560. The force is translated into a rotational or torsional force for urging the resealable container cap 560 into a counterclockwise (score line fracturing) motion or a clockwise (closing) motion. In more detail, the cam tracks 552, 554, 556 are segmented into a plurality of functional sections, as best shown in FIGS. 52 and 53. Initially, each cam follower 581, 582, 583 is aligned with the respective inter-cam relief section 551, 555, 553, as best shown in FIGS. 44, 48, 49, and 54. The resealable container cap 560 is inserted into the cap receiving socket of the resealable container lid 510, wherein the cam followers 581, 582, 583 pass through the respective inter-cam relief sections 551, 555, 553, creating a container lid assembly as shown in FIG. 50. In the exemplary version, the resealable container lid 510 and the resealable container cap 560 are geometrically related with one another. The first formed cam follower 581 is aligned with the first inter-cam relief section 551 during initial assembly of the resealable container cap 560 into the cap receiving socket of the resealable container lid resealable container lid 510, as shown in the side elevation exploded assembly view of FIG. 54. Additionally, this alignment inserts the offset projecting incisor 568 into the incisor pathway channel 517, as shown in FIGS. 55 and 56.

Figure 57:
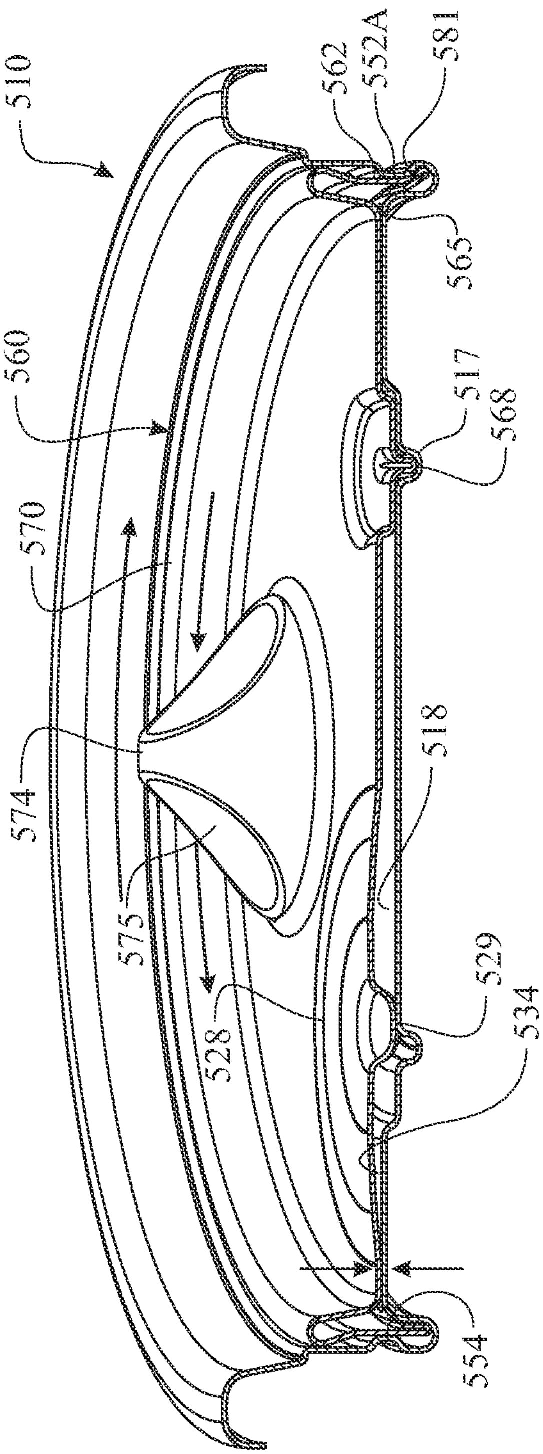
FIG. 57 presents a top isometric assembly section view of the container lid introduced in FIG. 42 and the cap introduced in FIG. 45, the illustration demonstrating a step of rotating the container lid in relation to the cap into a position compressing the sealing element and locating the cam followers beneath a cam detent functional segment.
Figure 58:
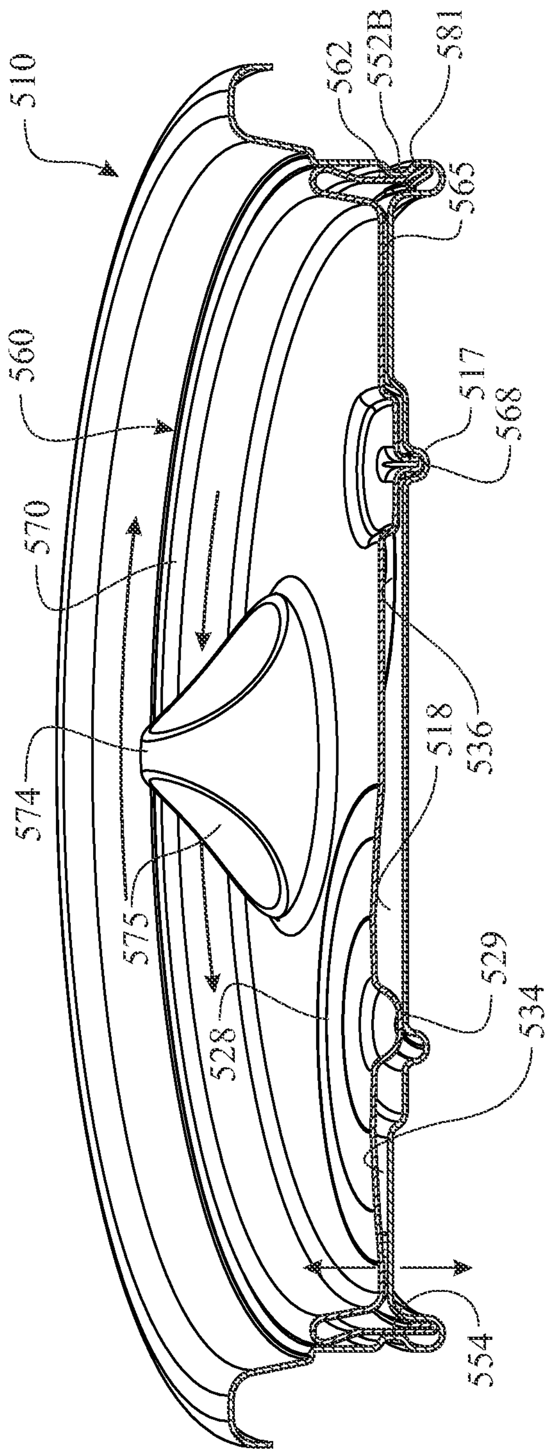
FIG. 58 presents a top isometric assembly section view of the container lid introduced in FIG. 42 and the cap introduced in FIG. 45, the illustration demonstrating a step of further rotating the container lid in relation to the cap into a position where the sealing element decompresses as the cam followers transition past the cam detent functional segment into a cam sealing functional segment.
Figure 59:
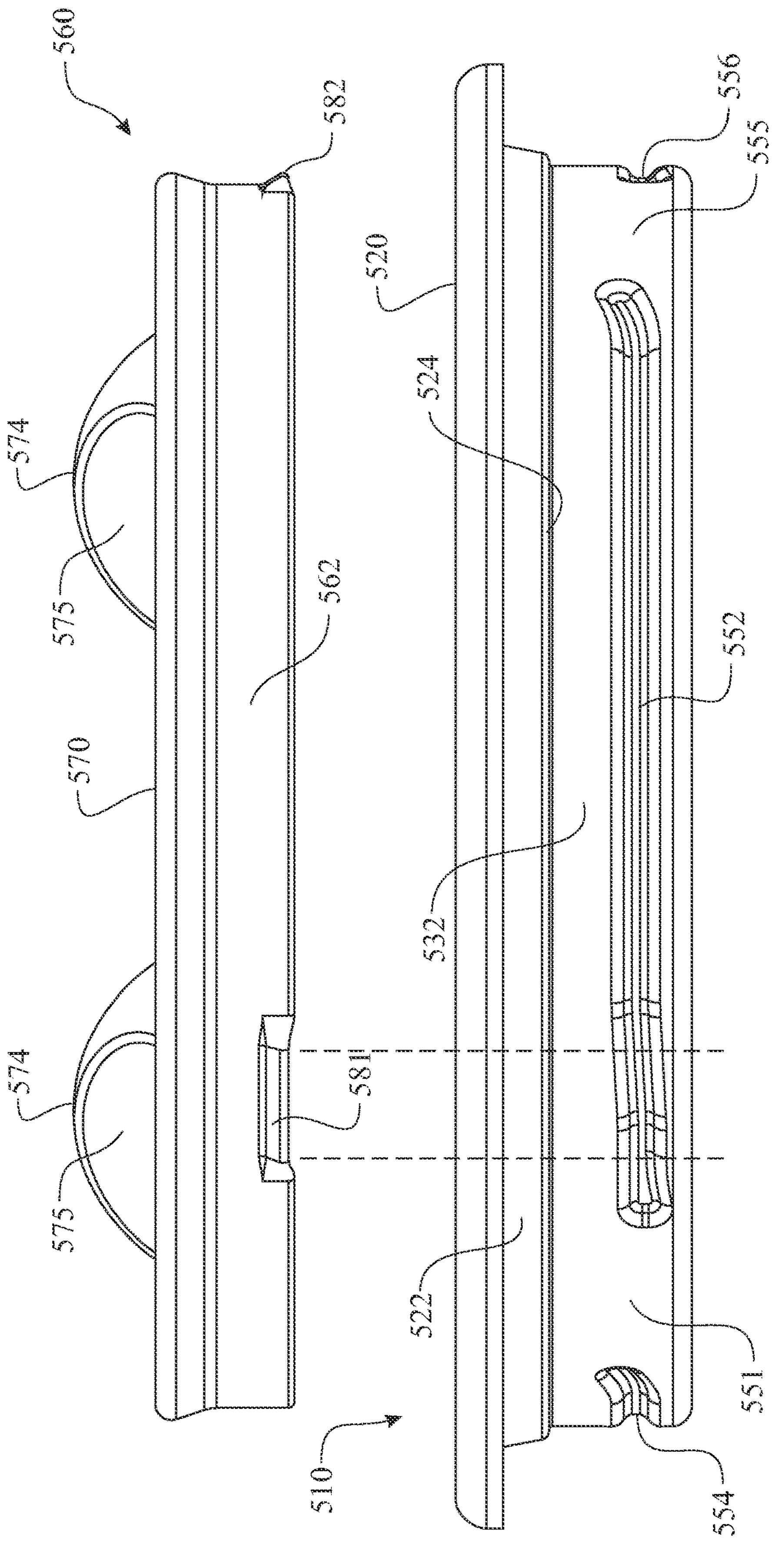
FIG. 59 presents a side elevation view demonstrating the rotated relationship between the container lid introduced in FIG. 42 and the cap introduced in FIG. 45, wherein the container lid and cap are positioned in accordance with the rotational relationship of FIG. 58.
Figure 68:
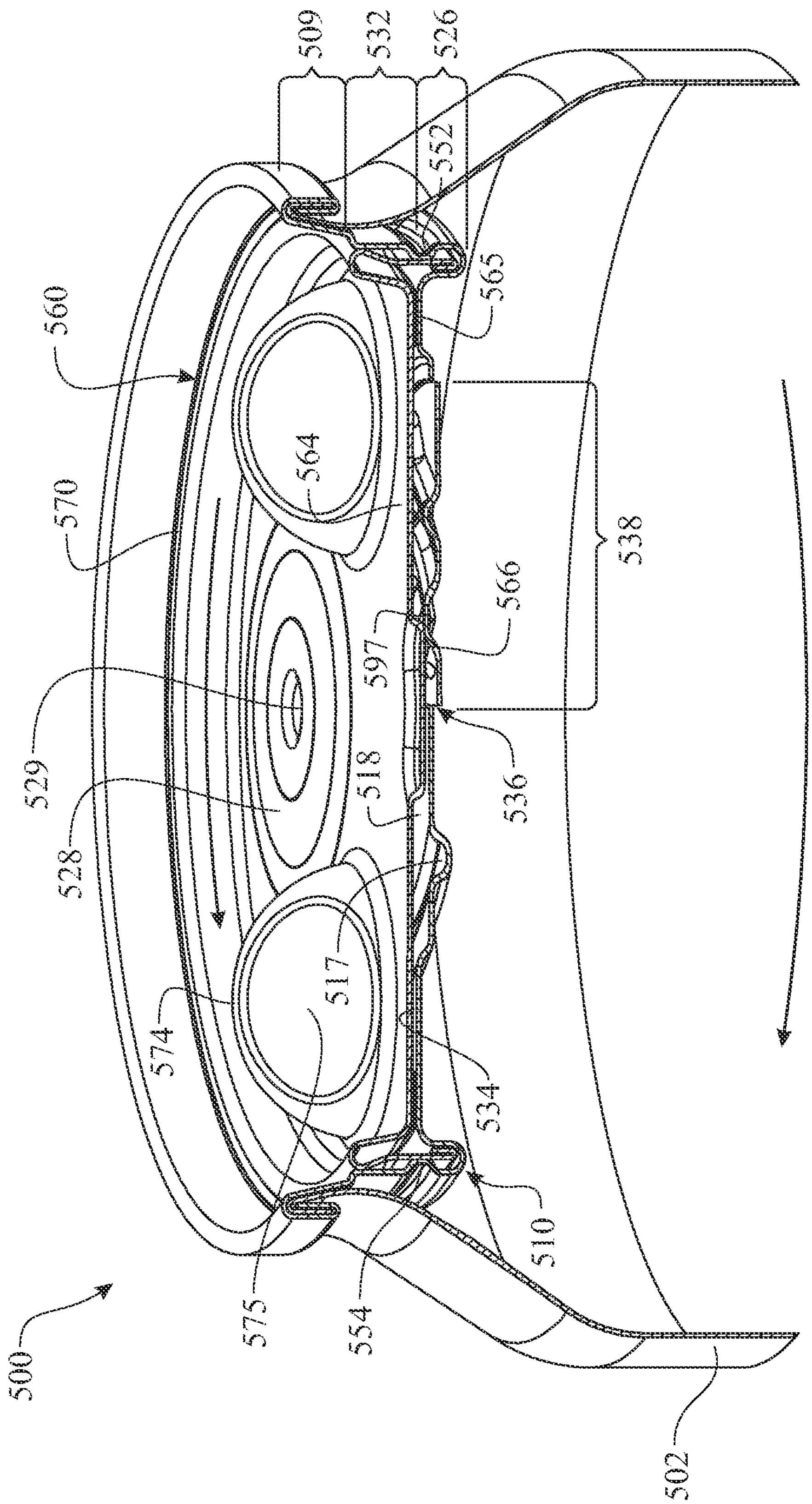
FIG. 68 presents a top isometric assembly section view of the container lid introduced in FIG. 42 and the cap introduced in FIG. 45, wherein the illustration presents a first subsequent step from the configuration as introduced in FIG. 66, wherein the cap and the container lid are illustrated carrying out the first step in opening sequence.

The assembly requires a significant downward force in combination with a counterclockwise rotation, compressing a cap sealing ring 565 sufficiently enough to locate the first formed cam follower 581 along a bottom edge of the cam track assembly/locking detent segment 552A of the first socket cam track 552. The significant downward force compresses the cap sealing ring 565, as shown in FIGS. 55, 56, 57. The initial contact is illustrated in FIG. 56, where the cap sealing ring 565 is in contact with the top surface of the cap receiving socket bottom wall 534, but not yet compressed. During application of the significant downward force, the cap sealing ring 565 is compressed, as illustrated in FIG. 57. The cam track assembly/locking detent segment 552A is configured being the lowest point of the cam track 552. Continuing with the counterclockwise rotation of the cap will transfer the first formed cam follower 581 into cam track initial/resealed segment 552B, which allows decompression of the cap sealing ring 565 (as shown in FIG. 68), as shown in the side elevation exploded assembly view of FIG. 58. Additionally, the configuration of the cam tracks 552, 554, 556 retain the resealable container cap 560 with the cap receiving socket of the resealable container lid 510 by the cam followers 581, 582, 583.

Figure 60:
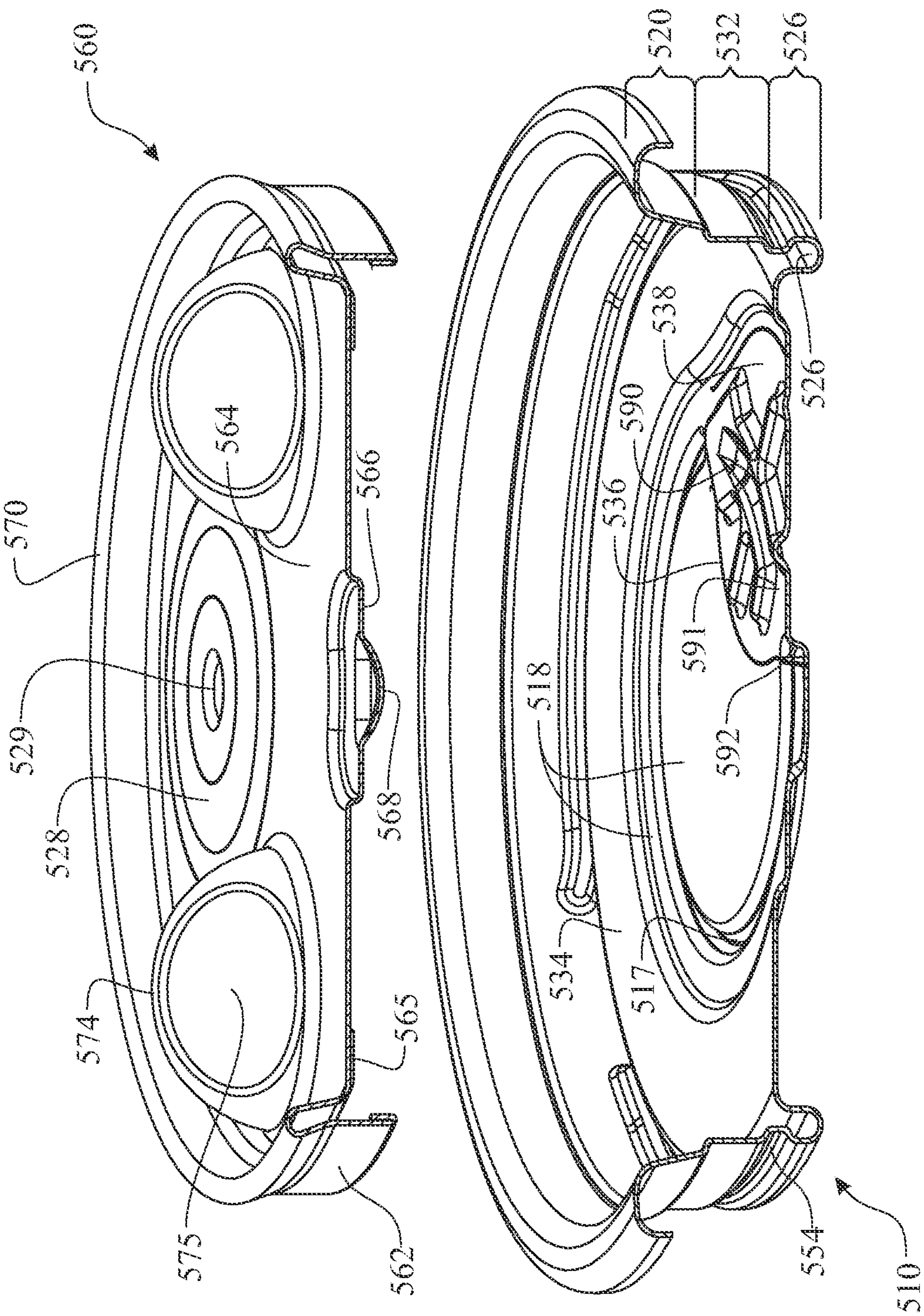
FIG. 60 presents a top isometric assembly section view of the container lid introduced in FIG. 42 and the cap introduced in FIG. 45, the section taken along section line 60-60 of FIG. 51, introducing an arrangement of the cap and the container lid just prior to a first step in opening sequence, the illustration focusing on the utilization of an incisor to fracture a score line between a tear panel and a container lid bottom wall, the cap and the container lid shown separated for clarity.
Figure 61:
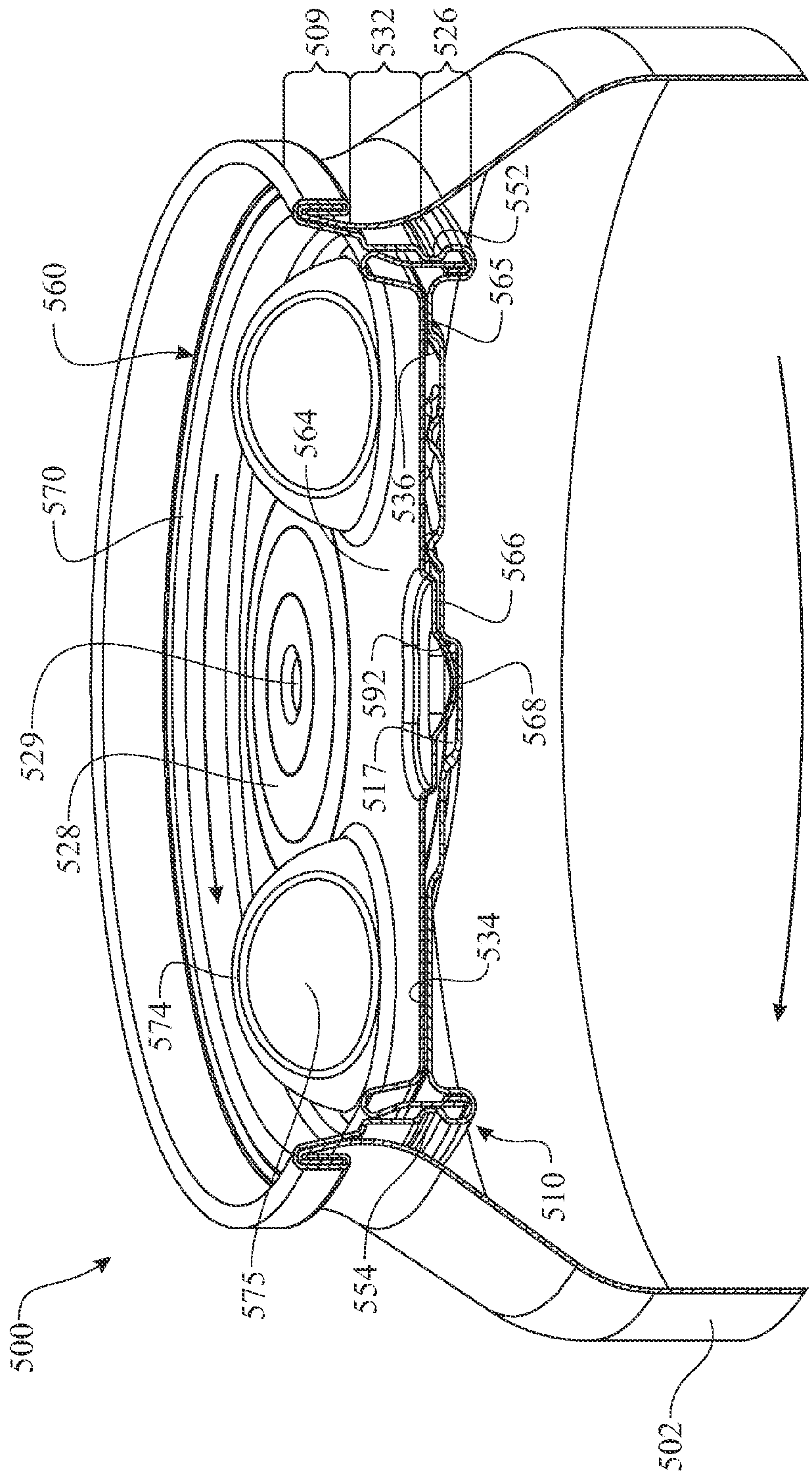
FIG. 61 presents a top isometric assembly section view of the container lid introduced in FIG. 42 and the cap introduced in FIG. 45, in a similar configuration as introduced in FIG. 60, wherein the cap and the container lid are illustrated just prior to the first step in opening sequence.

The cam track assembly/locking detent segment 552A retains the resealable container cap 560 within the cap receiving socket of the resealable container lid 510, when subjected to a clockwise motion. The offset projecting incisor 568 butts up against the incisor channel to tear panel surface transition 592 to retain the resealable container cap 560 within the cap receiving socket of the resealable container lid 510, when subjected to a continuing counterclockwise motion. Registration between the offset projecting incisor 568 and the incisor channel to tear panel surface transition 592 is best shown in FIGS. 60 and 61. Thus retaining the resealable container cap 560 within the cap receiving socket enabling only a small rotational motion thereof. It is understood that the design can be such to limit any motion to effectively eliminating any play between a counterclockwise motion and a clockwise motion.

The initial assembly step is adapted for completion by a mechanical device, such as an assembly machine. The forces required are designed to deter accomplishment of the initial assembly step by an individual. The subsequent steps are adapted to be accomplished by the end user.

Figure 67:
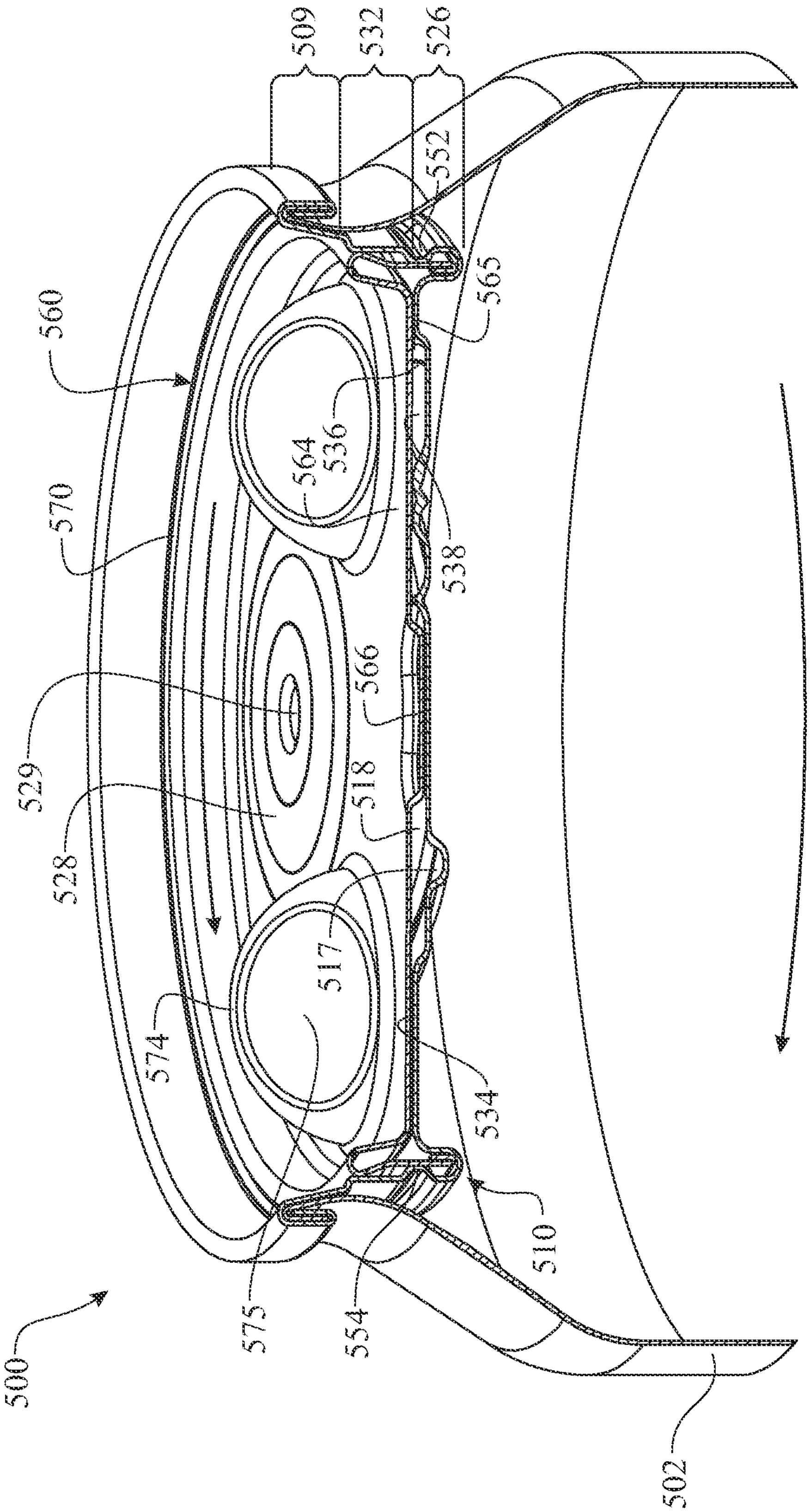
FIG. 67 presents a top isometric assembly section view of the container lid introduced in FIG. 42 and the cap introduced in FIG. 45, in a similar configuration as introduced in FIG. 66, wherein the cap and the container lid are illustrated just prior to the first step in opening sequence.
Figure 71:
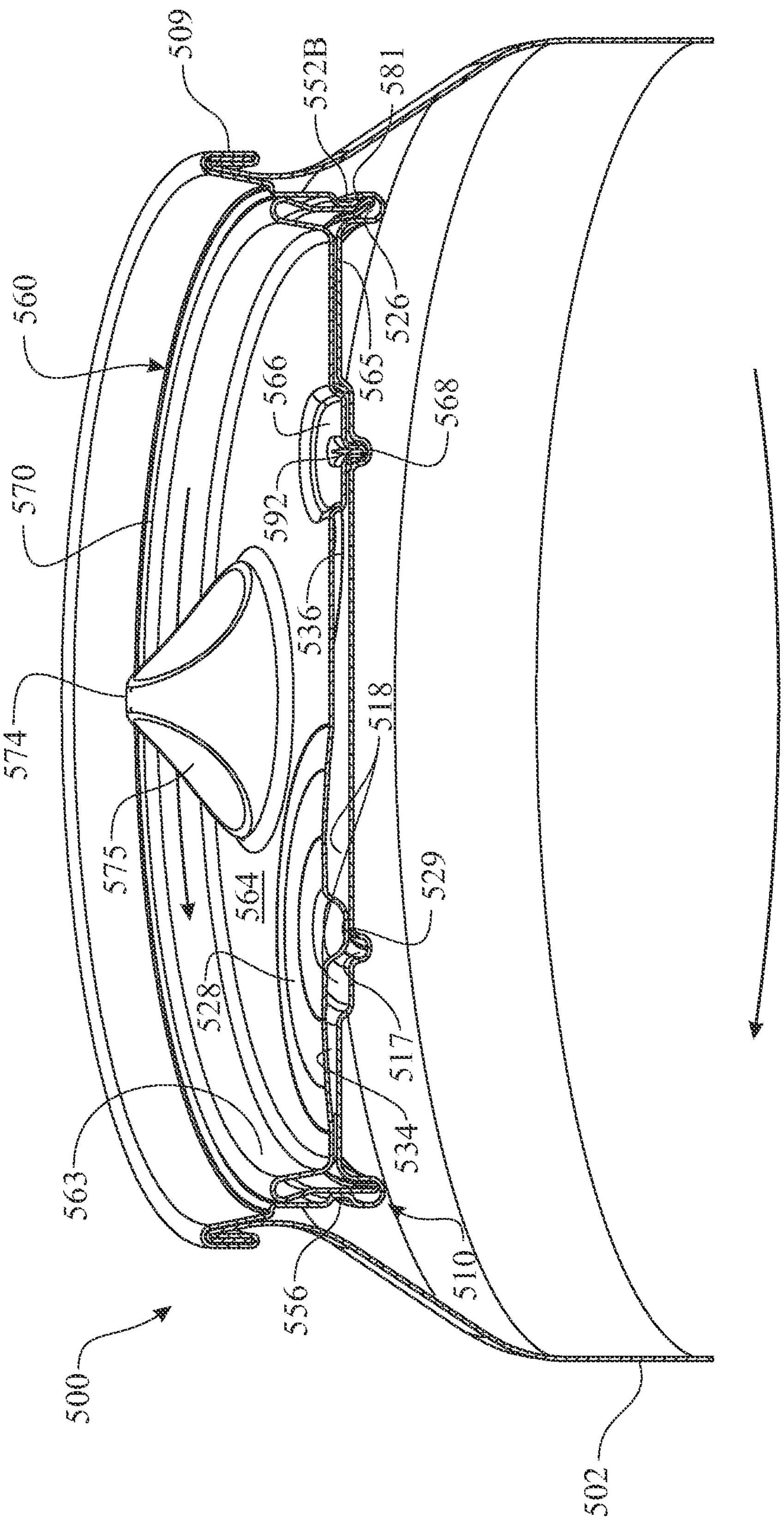
FIG. 71 presents a top isometric assembly section view of the container lid introduced in FIG. 42 and the cap introduced in FIG. 45, the illustration presenting the same arrangement as shown in FIG. 60, the section taken at 90 degrees to the view presented in FIG. 60, the sealing element being slightly relaxed and used to retain the cap and container lid in a fixed rotational relationship with one another, wherein the section is taken along section line 55-55 of FIG. 51.

The following describes the container lid opening sequence, which is directed towards completion by the end user. Continuing with a counterclockwise rotation of the resealable container cap 560, from a position where the first formed cam follower 581 is engaged with the cam track initial/resealed segment 552B, the continuing motion causes the offset projecting incisor 568 to impinge upon the incisor channel to tear panel surface transition 592, initializing a fracture of the cap receiving socket bottom panel circular score line 536, as shown in FIGS. 61, 67, 71.

Figure 62:
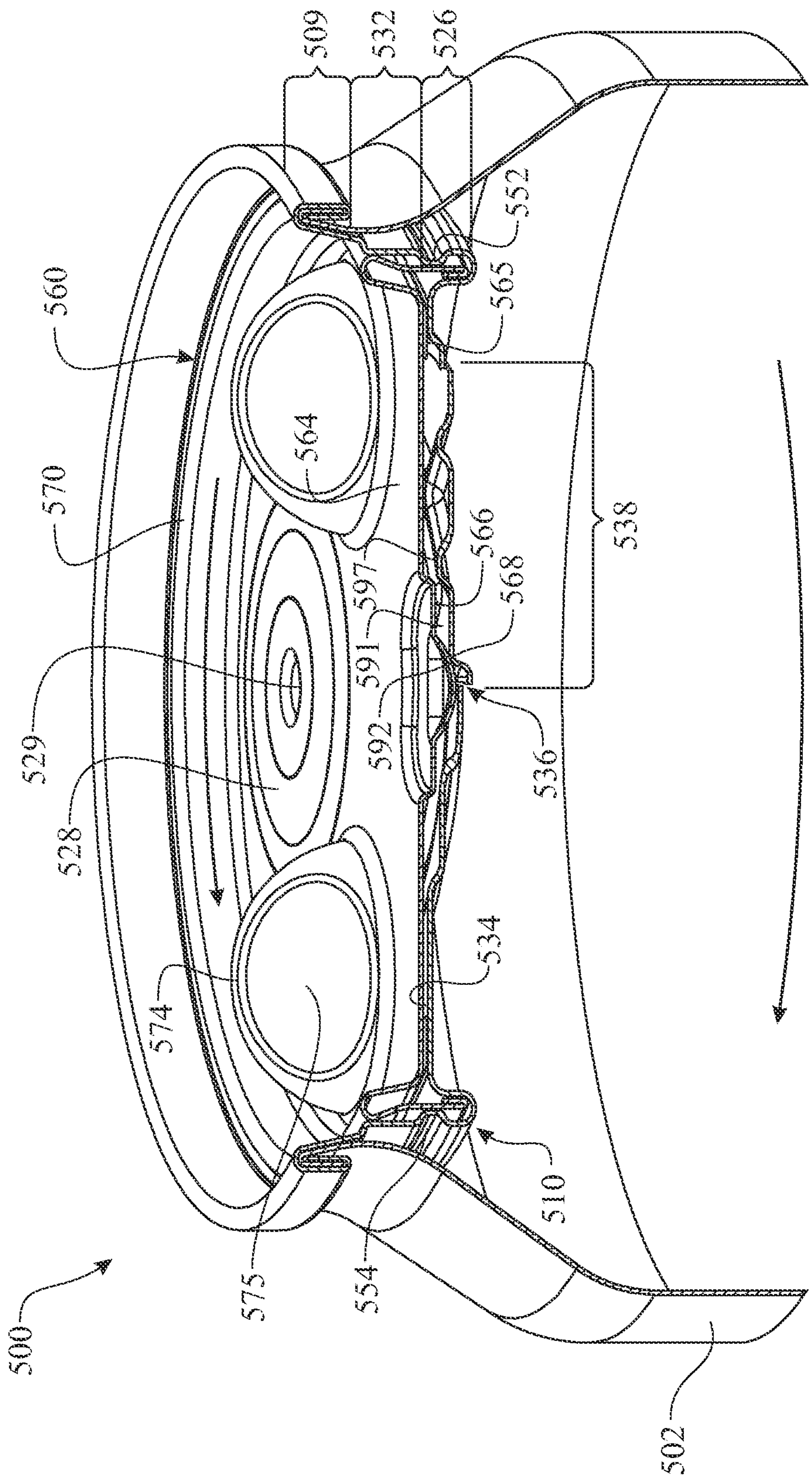
FIG. 62 presents a top isometric assembly section view of the container lid introduced in FIG. 42 and the cap introduced in FIG. 45, wherein the illustration presents a first subsequent step from the configuration as introduced in FIG. 60, wherein the cap and the container lid are illustrated carrying out the first step in opening sequence.
Figure 63:
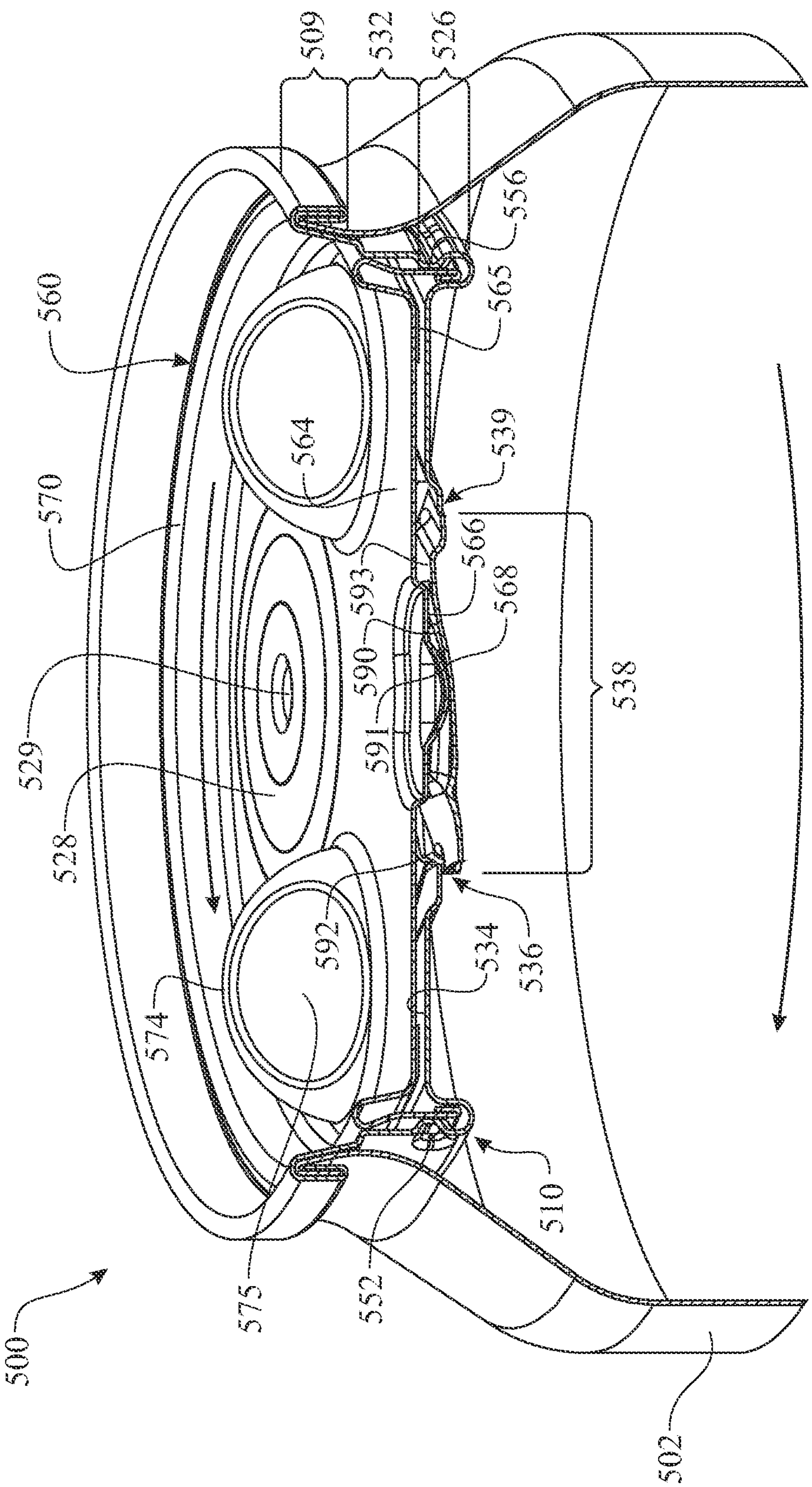
FIG. 63 presents a top isometric assembly section view of the container lid introduced in FIG. 42 and the cap introduced in FIG. 45, wherein the illustration presents a second subsequent step from the configuration as introduced in FIG. 60, wherein the cap and the container lid are illustrated carrying out the second step in opening sequence.
Figure 69:
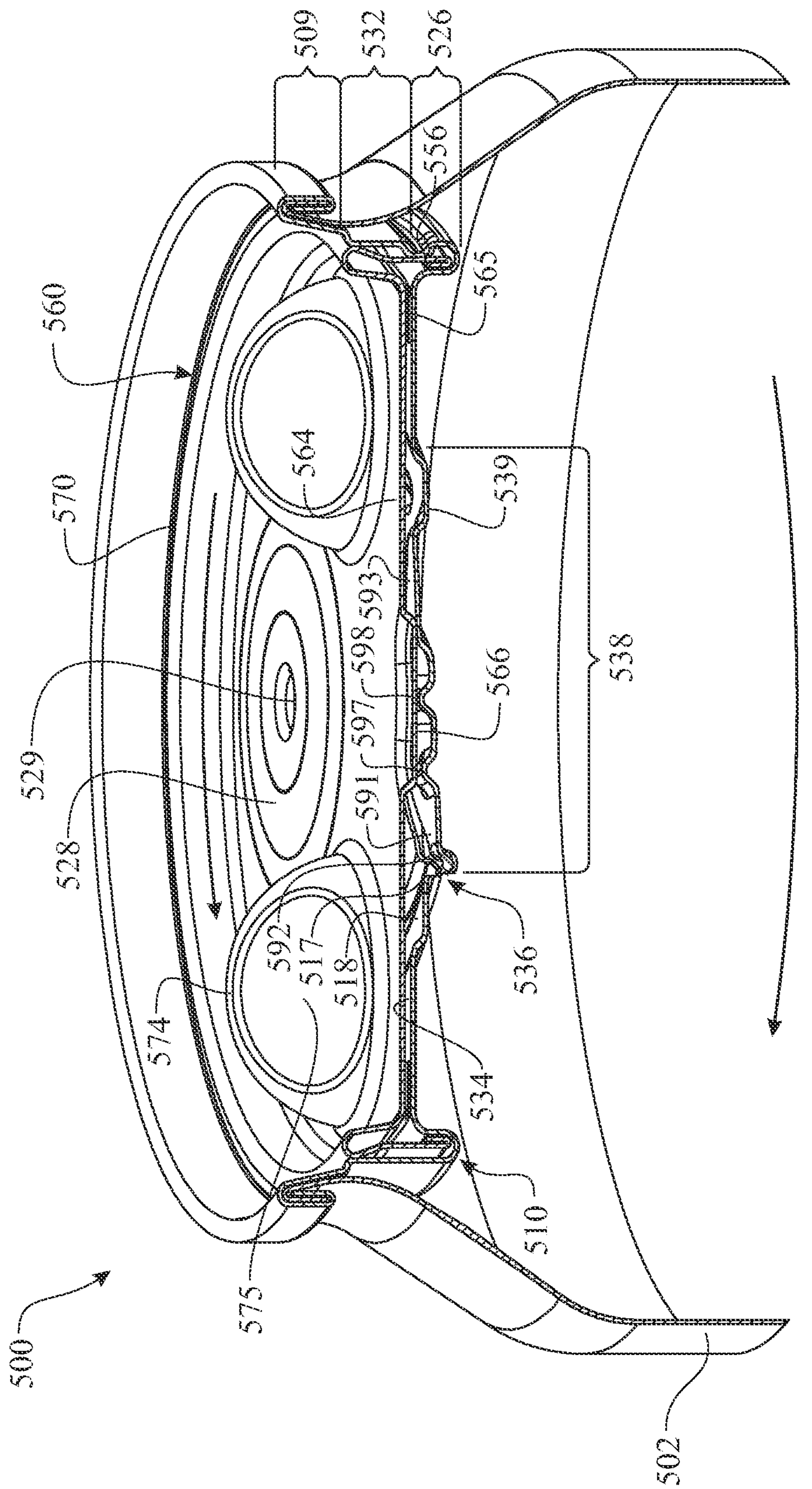
FIG. 69 presents a top isometric assembly section view of the container lid introduced in FIG. 42 and the cap introduced in FIG. 45, wherein the illustration presents a second subsequent step from the configuration as introduced in FIG. 66, wherein the cap and the container lid are illustrated carrying out the second step in opening sequence.
Figure 72:
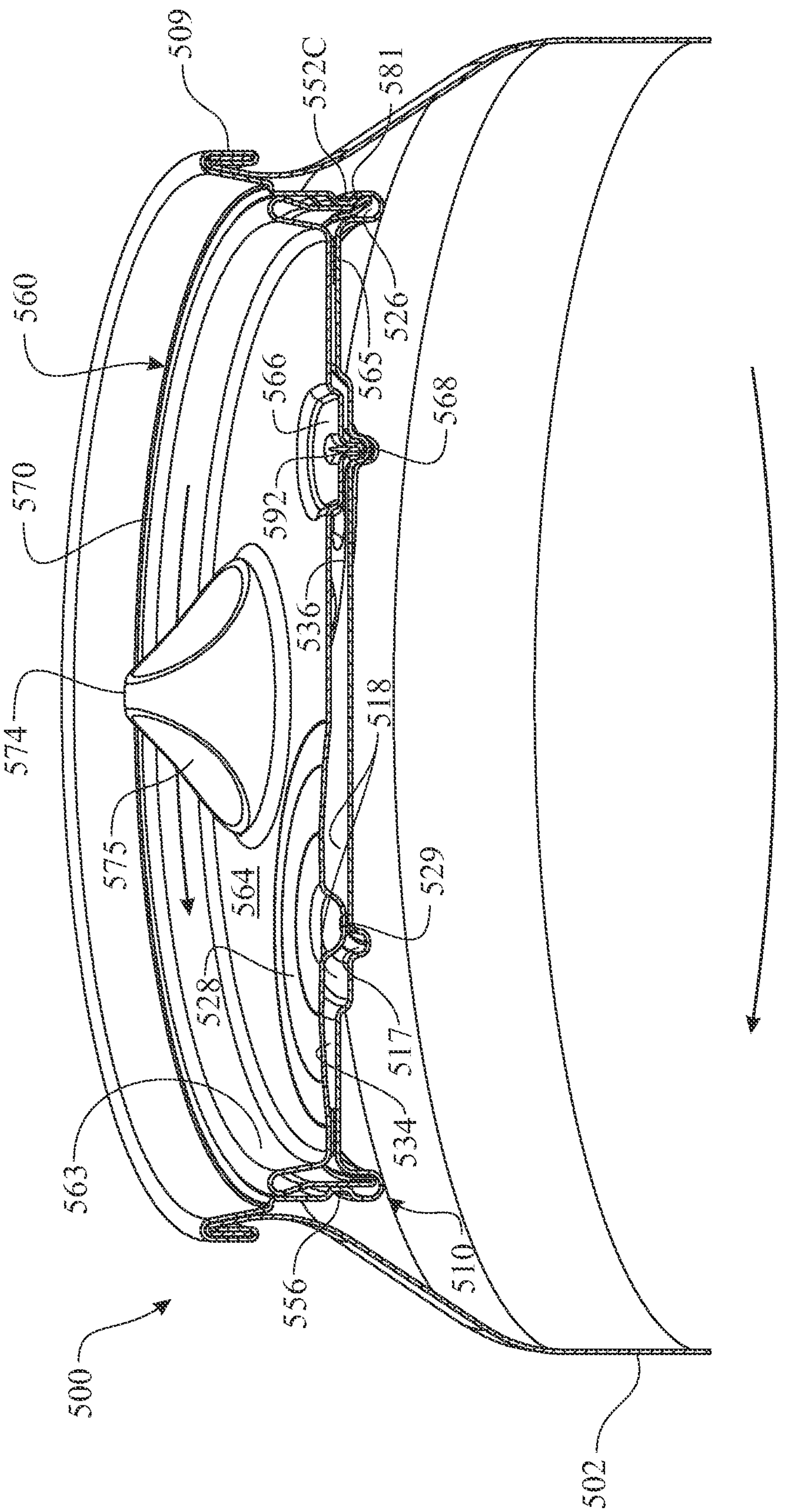
FIG. 72 presents a top isometric assembly section view of the container lid introduced in FIG. 42 and the cap introduced in FIG. 45, wherein the illustration presents a first subsequent step from the configuration as introduced in FIG. 71, wherein the cap and the container lid are illustrated carrying out the first step in opening sequence utilizing ramps to disengage the sealing element and assist in propagating the fracture of the score line.
Figure 73:
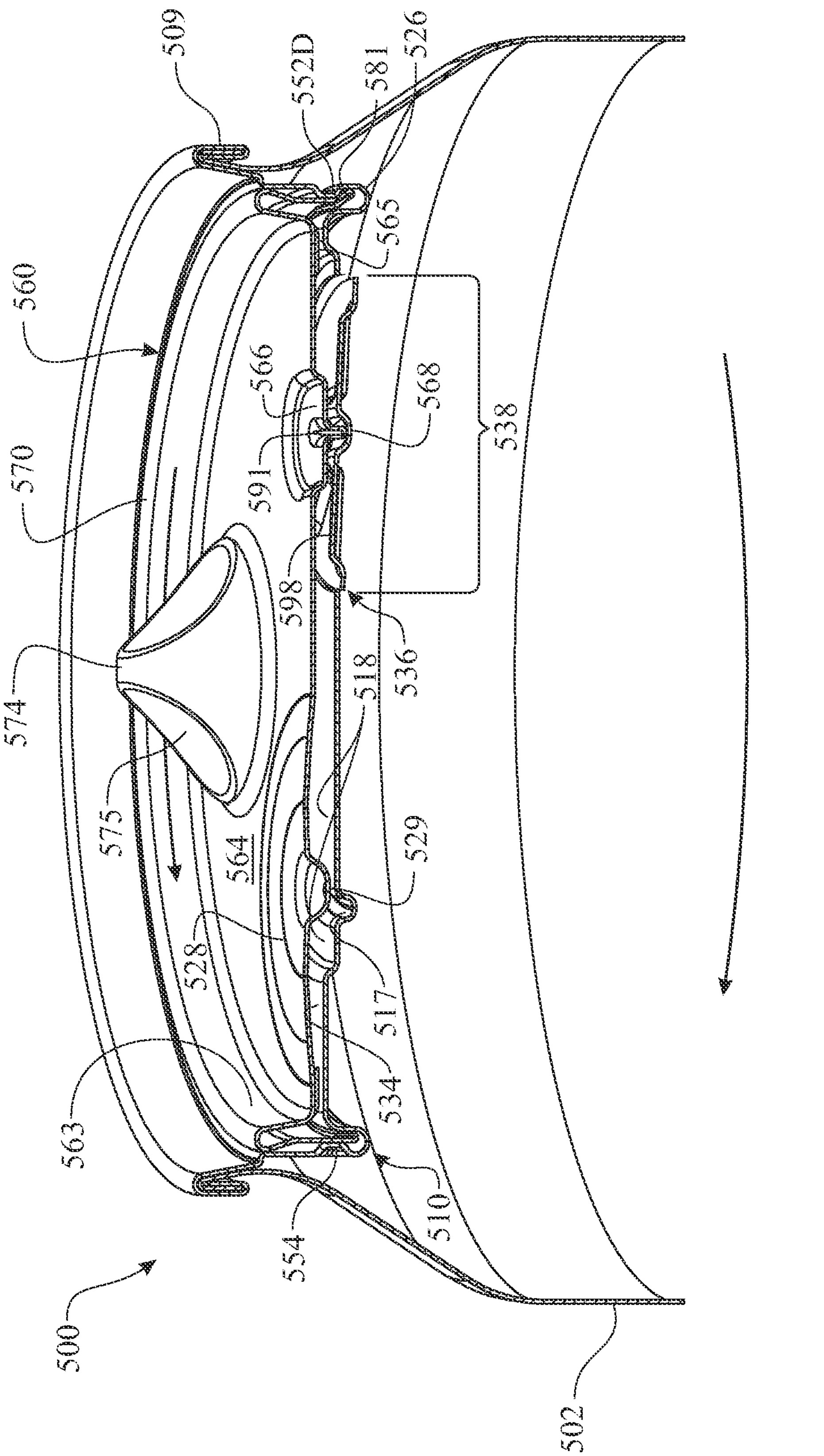
FIG. 73 presents a top isometric assembly section view of the container lid introduced in FIG. 42 and the cap introduced in FIG. 45, wherein the illustration presents a second subsequent step from the configuration as introduced in FIG. 71, wherein the cap and the container lid are illustrated carrying out the second step in opening sequence.

As the rotation continues, the first formed cam follower 581 transitions from the cam track initial/resealed segment 552B to a cam track height transition segment 552C, as best shown in FIGS. 62, 68, 72. During this transition, the bottom surface of the offset projecting incisor 568 begins to ride upon a top surface of the incisor channel to tear panel surface transition 592, wherein the offset projecting incisor 568 begins to force the cap receiving socket bottom panel tear panel 538 into the resealable container 500. Additionally, the bottom surface of the incisor deboss panel 566 begins to ride upon a top surface of the lead in supplemental score fracture propagation and tear panel support boss 597, wherein the incisor deboss panel 566 performs at least one function of propagating the fracture of the cap receiving socket bottom panel circular score line 536 and traversely distributes the axial force applied by the offset projecting incisor 568 to the incisor channel to tear panel surface transition 592 out to the bifurcated score line fracture 536. Further, the resealable container cap 560 separates slightly from the resealable container lid 510 in an axial direction, separating cap sealing ring 565 from contact with the upper surface of the cap receiving socket bottom wall 534 of the resealable container lid 510. This separation decreases or eliminates any parasitic drag or continued friction between the cap sealing ring 565 and the upper surface of the cap receiving socket bottom wall 534 and enables continued counterclockwise rotation of the resealable container cap 560 to propagate the fracturing of the cap receiving socket bottom panel circular score line 536. Additionally, this separation allows the venting of the pressurized gases released from the resealable container 500 when the offset projecting incisor 568 impinged upon the incisor channel to tear panel surface transition 592, initializing the fracture of the cap receiving socket bottom panel circular score line 536, in order to avoid the resealable container cap 560 from becoming a projectile if released from the container lid socket while still retaining pressure from the opened resealable container 500. As the rotation continues, the first formed cam follower 581 transitions from the cam track height transition segment 552C to a cam track operating segment 552D, as best shown in FIGS. 63, 69, 73. During this transition, the bottom surface of the offset projecting incisor 568 begins to ride upon a top surface of the tear panel surface incisor pathway 591, continuing to generate an axial force for propagating the bifurcated score line fracture 536 and further separating the cap sealing ring 565 and the upper surface of the cap receiving socket bottom wall 534. Additionally, the incisor deboss panel 566 in conjunction with the arrangement the ribbed support structures lead in supplemental score fracture propagation and tear panel support boss 597, 598, 593 on the cap receiving socket bottom panel tear panel 538, further the propagation of the fracture of the cap receiving socket bottom panel circular score line 536 by distributing the applied loading force from the resealable container cap 560, as shown in FIGS. 69 and 73. In addition to propagating the fracture of the cap receiving socket bottom panel circular score line 536, the process also folds the cap receiving socket bottom panel tear panel 538 about the tear panel hinge 539, away from the resealable container lid upper surface reinforcement formation 518. The load is sustained by the cam followers 581, 582, 583 riding against the bottom surface of the respective cam track 552, 554, 556.

Figure 64:
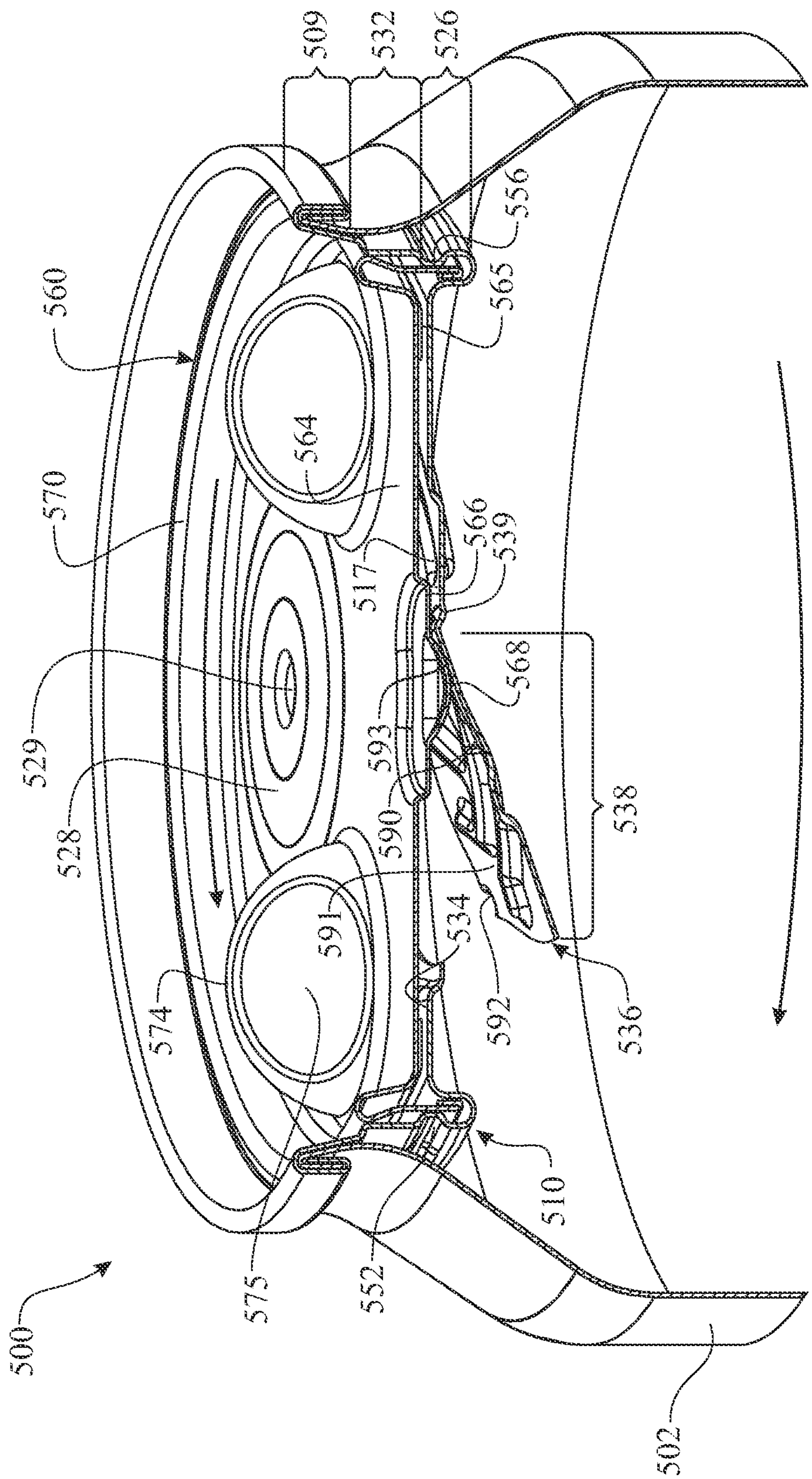
FIG. 64 presents a top isometric assembly section view of the container lid introduced in FIG. 42 and the cap introduced in FIG. 45, wherein the illustration presents a third subsequent step from the configuration as introduced in FIG. 60, wherein the cap and the container lid are illustrated carrying out the third step in opening sequence.
Figure 65:
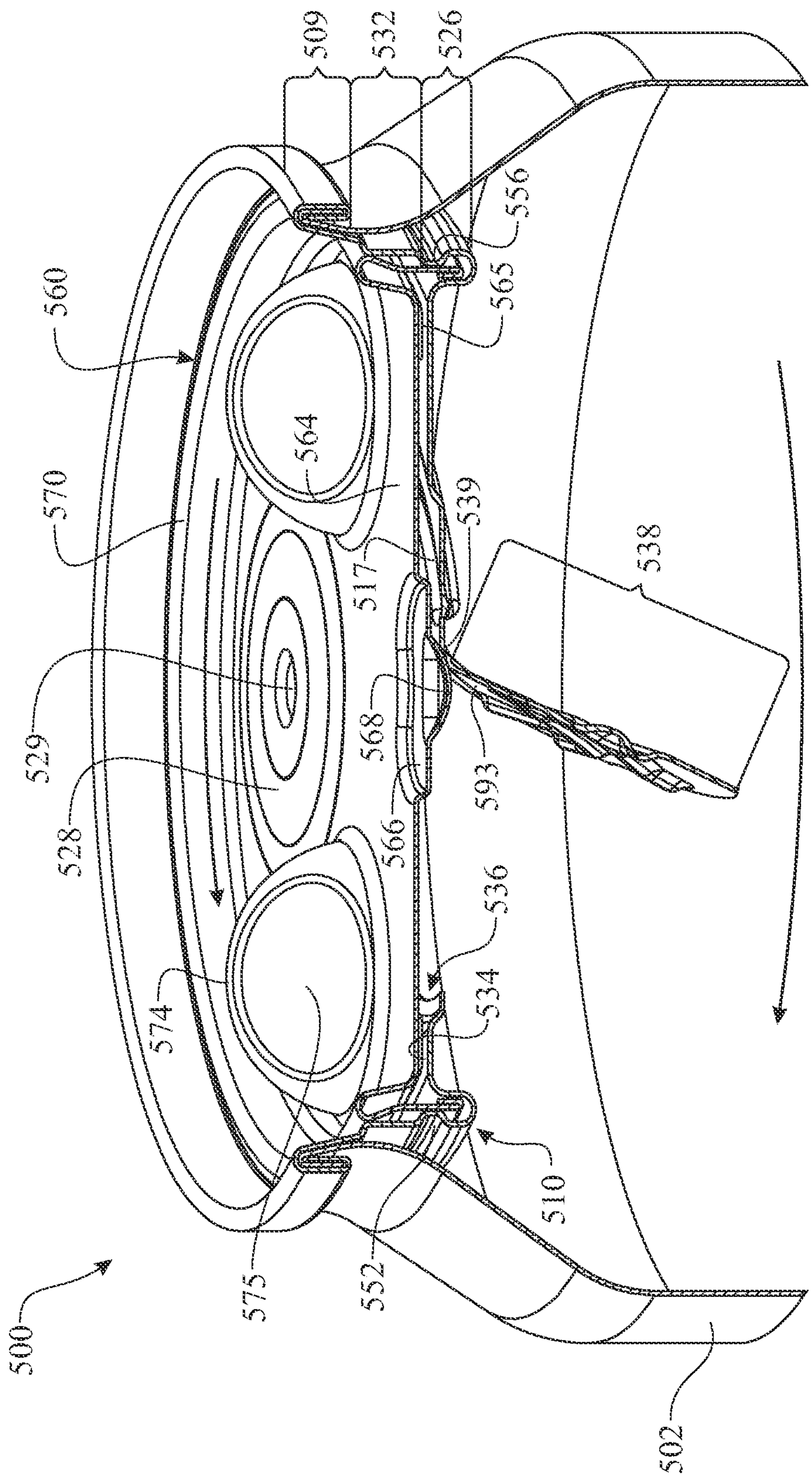
FIG. 65 presents a top isometric assembly section view of the container lid introduced in FIG. 42 and the cap introduced in FIG. 45, wherein the illustration presents a fourth subsequent step from the configuration as introduced in FIG. 60, wherein the cap and the container lid are illustrated carrying out the fourth step in opening sequence.
Figure 66:
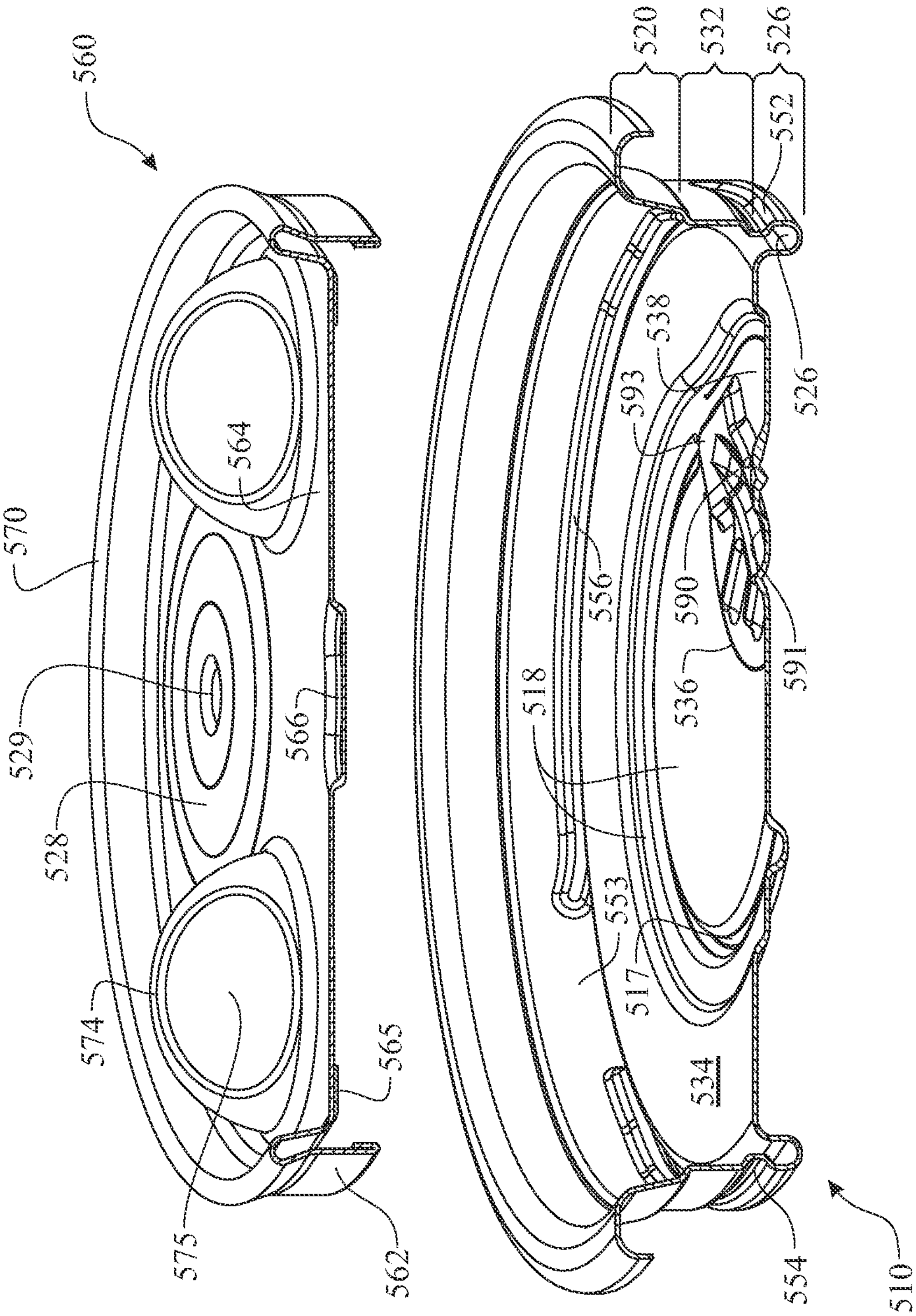
FIG. 66 presents a top isometric assembly section view of the container lid introduced in FIG. 42 and the cap introduced in FIG. 45, the section taken along section line 66-66 of FIG. 51, introducing an arrangement of the cap and the container lid just prior to a first step in opening sequence, the illustration focusing on the utilization of ramps to aid in fracture of a score line by distributing the applied load across the tear panel and about the score line and folding of a tear panel away from the container lid bottom wall, the cap and the container lid shown separated for clarity.
Figure 70:
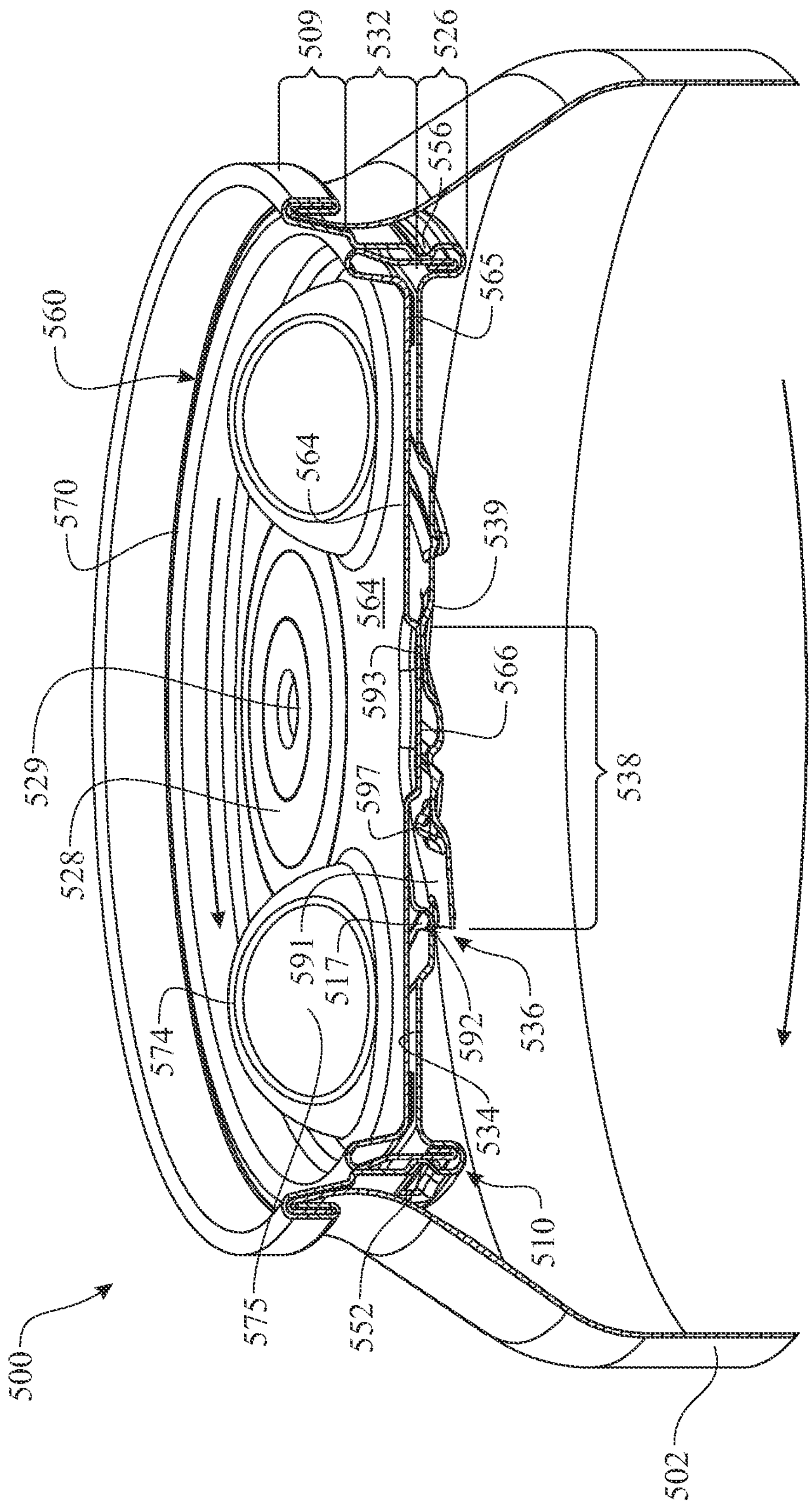
FIG. 70 presents a top isometric assembly section view of the container lid introduced in FIG. 42 and the cap introduced in FIG. 45, wherein the illustration presents a third subsequent step from the configuration as introduced in FIG. 66, wherein the cap and the container lid are illustrated carrying out the third step in opening sequence.
Figure 74:
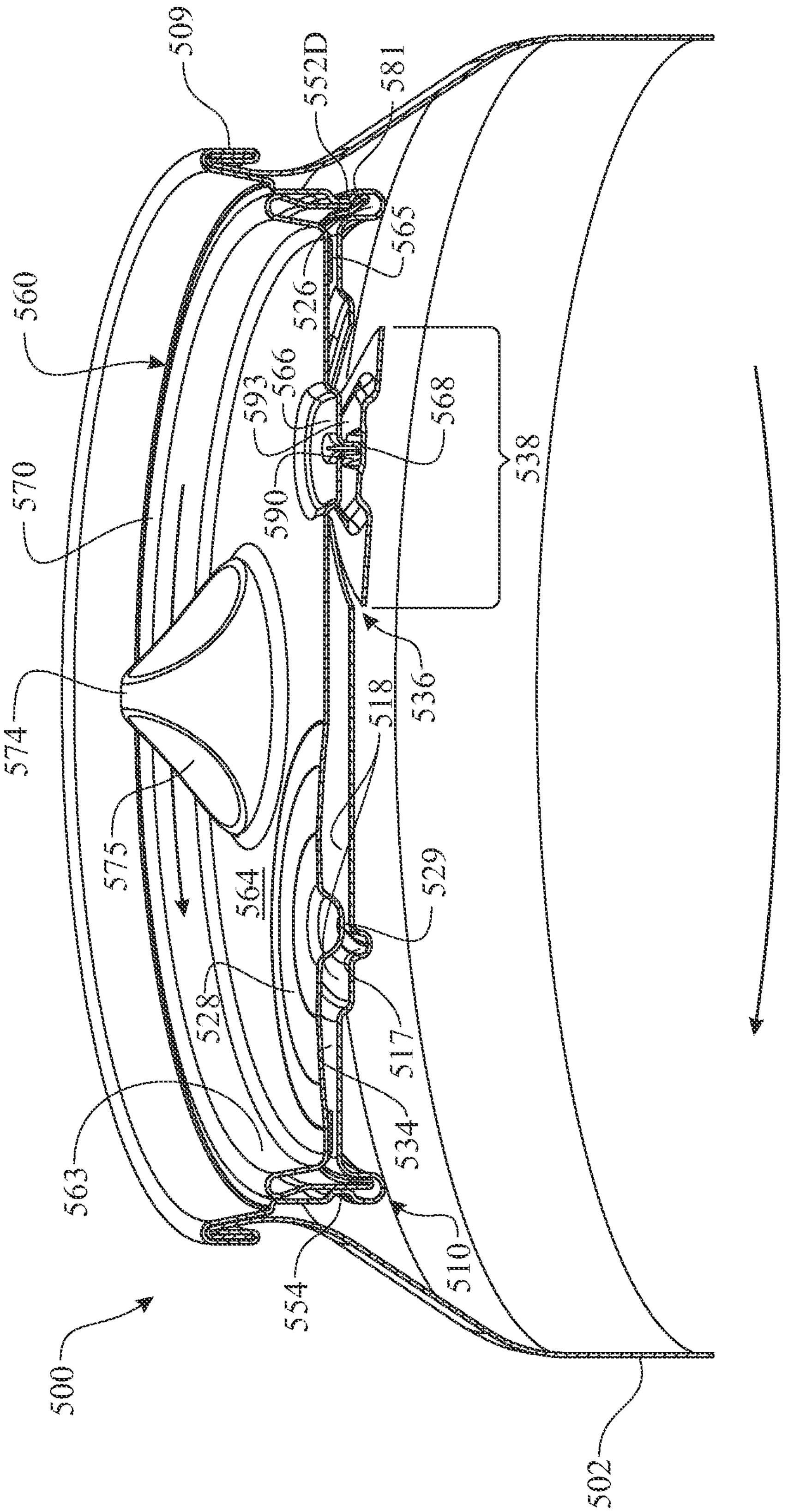
FIG. 74 presents a top isometric assembly section view of the container lid introduced in FIG. 42 and the cap introduced in FIG. 45, wherein the illustration presents a third subsequent step from the configuration as introduced in FIG. 71, wherein the cap and the container lid are illustrated carrying out the third step in opening sequence.
Figure 75:
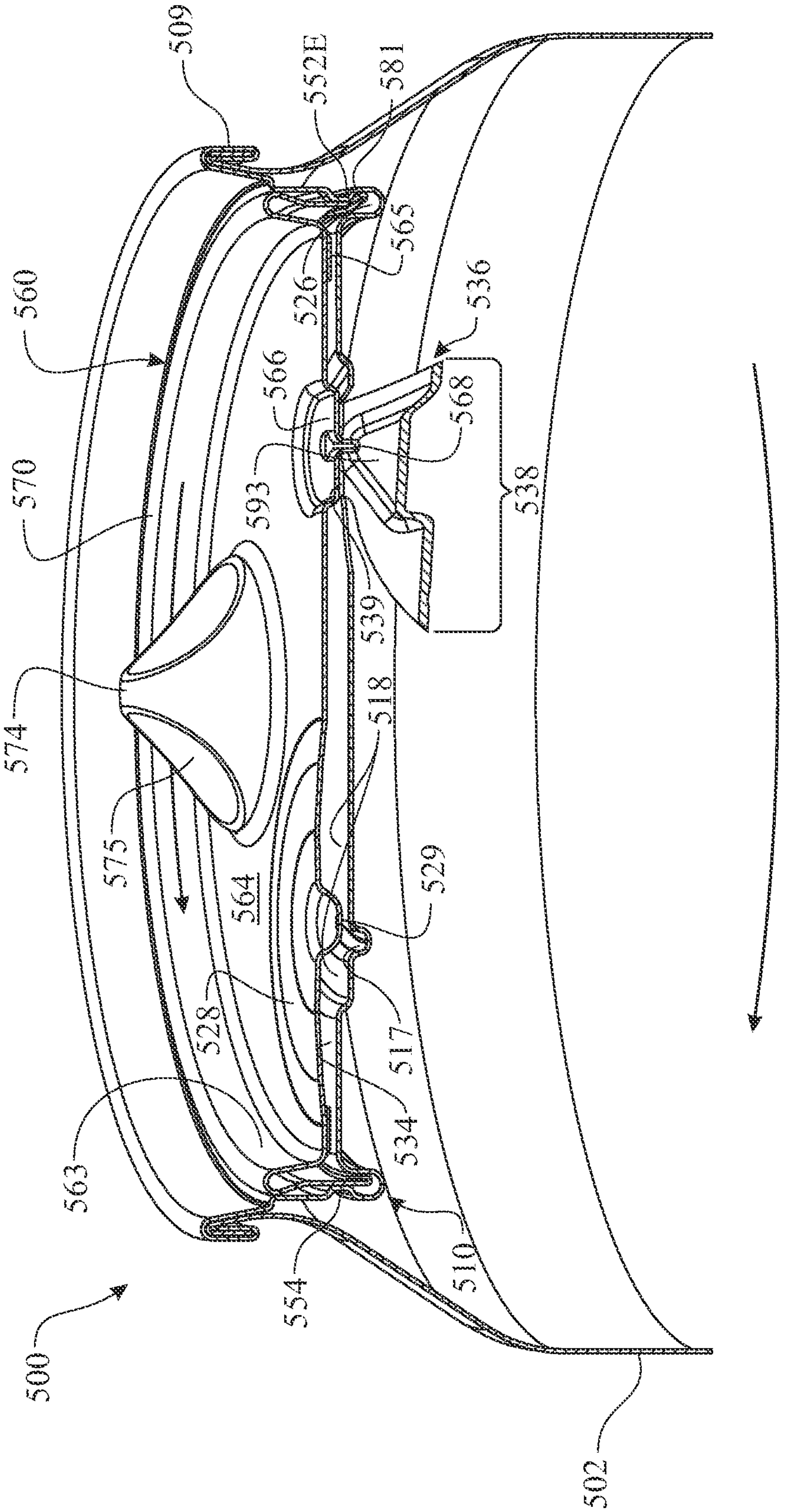
FIG. 75 presents a top isometric assembly section view of the container lid introduced in FIG. 42 and the cap introduced in FIG. 45, wherein the illustration presents a fourth subsequent step from the configuration as introduced in FIG. 71, wherein the cap and the container lid are illustrated carrying out the fourth step in opening sequence, wherein the tear panel is folded into the container.

As the rotation continues, the offset projecting incisor 568 rides up tear panel surface incisor pathway to tear panel fold boss transition 590, as shown in FIGS. 64, 70, and 74, and subsequently transitions onto the finishing score fracture propagation and tear panel fold urging boss 593, as shown in FIGS. 65 and 75. As the transition occurs, the incisor deboss panel 566 separates from the top surface of the ribbed support structure 597, 598, 593.

Figure 76:
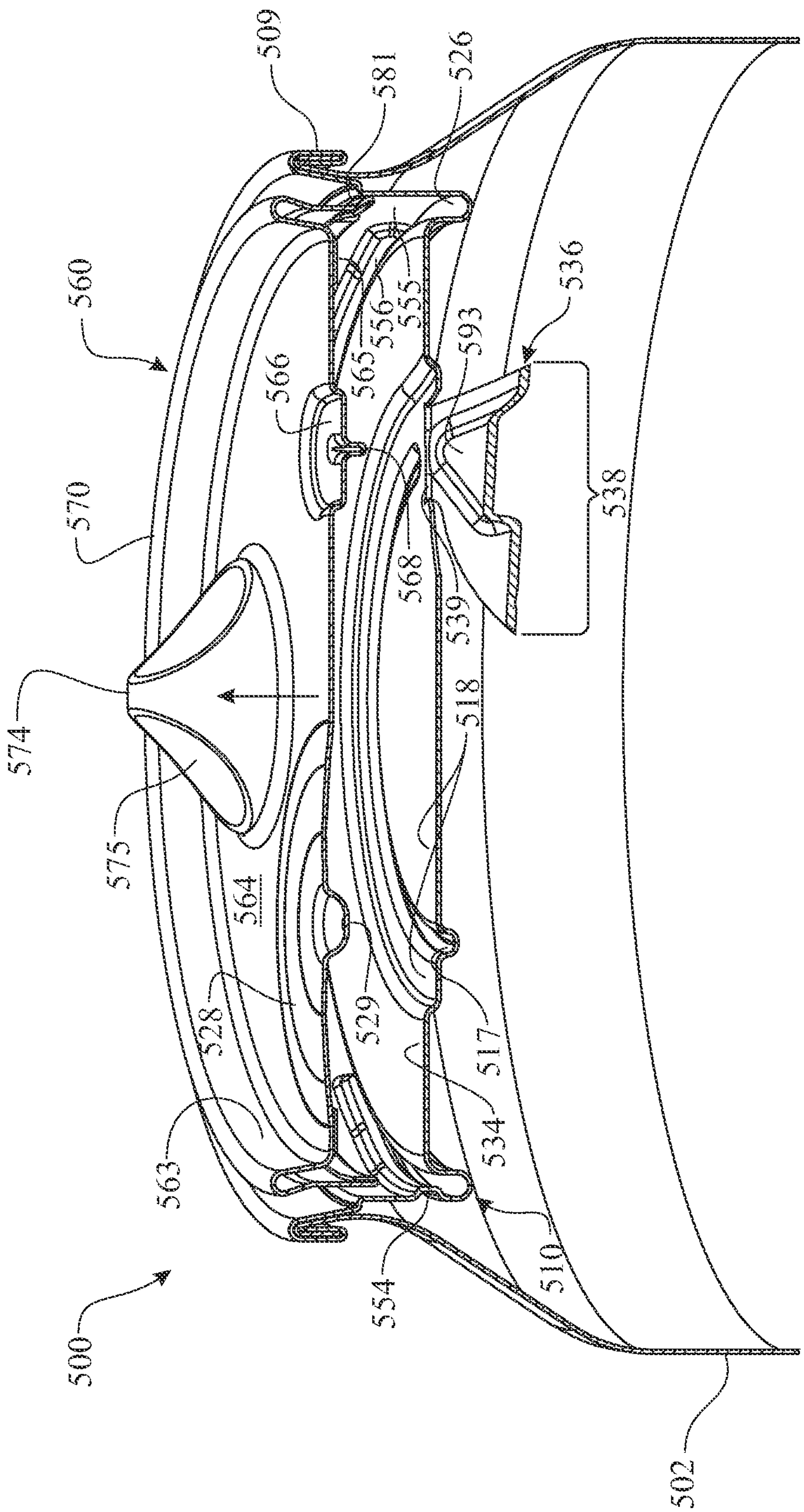
FIG. 76 presents a top isometric assembly section view of the container lid introduced in FIG. 42 and the cap introduced in FIG. 45, wherein the illustration presents a fifth subsequent step from the configuration as introduced in FIG. 71, wherein the cap and the container lid are illustrated carrying out the fifth step in opening sequence, wherein the cap can be removed from the container lid.

Nearing the end of the rotational container lid opening sequence, just prior to the transition of the first formed cam follower 581 between the cam track operating segment 552D to a cam track cam follower leader section 552E, shown in FIGS. 73, 74, the offset projecting incisor 568 impinges upon finishing score fracture propagation and tear panel fold urging boss 593 to finalize the folding of the cap receiving socket bottom panel tear panel 538 into the interior of the resealable container 500, as shown in FIGS. 65 and 75. Following the conclusion of the opening sequence, the cam followers 581, 582, 583 transition to a cam track cam follower leader section 552E, as shown in FIG. 75, where the cam followers 581, 582, 583 are guided into the adjacent inter-cam relief section 551, 555, 553, enabling removal of the resealable container cap 560 from the resealable container lid 510. More specifically, the conclusion of the opening sequence locates the first formed cam follower 581 within the third inter-cam relief section 555, enabling the axial withdrawal of the resealable container cap 560 from the resealable container lid 510, as shown in FIG. 76.

The shape of the cam tracks 552, 554, 556, more specifically, the cam track cam follower leader section 552E, is designed such to provide a clearance between the bottom of the offset projecting incisor 568 and the top surface of the resealable container lid upper surface reinforcement formation 518 to avoid any binding or other interference of the rotation of the resealable container cap 560. The combination of the cam track assembly/locking detent segment 552A and cam track cam follower leader section 552E ensures the reinstallation of the resealable container cap 560 into the cap receiving socket is only in a clockwise direction. Additionally, the revised, opened configuration of the resealable container lid 510 enables the user to insert the resealable container cap 560 into the cap receiving socket to reseal the resealable container 500 in any of the three potential orientations. The incisor pathway channel 517 provides clearance for the offset projecting incisor 568 in any orientation. The associated cam follower 581, 582, 583 is rotated to engage with the respective sealing section of the cam track 552, 554, 556 (as referenced by cam track initial/resealed segment 552B of the first socket cam track 552), causing the cap sealing ring 565 to compress against the top surface of the cap receiving socket bottom wall 534, providing an air and liquid tight seal therebetween.

Figure 46:
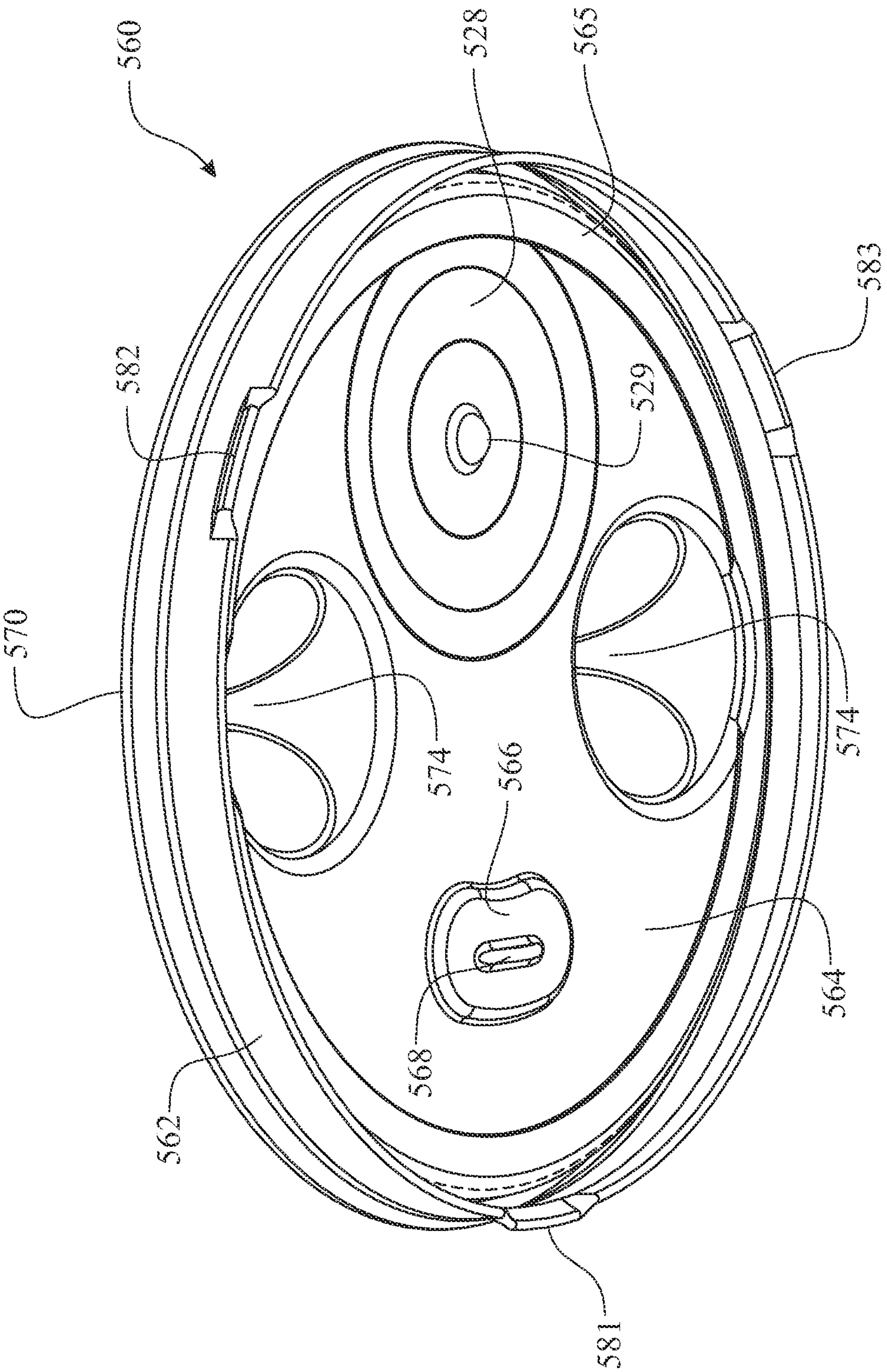
FIG. 46 presents a bottom isometric view of the cap originally introduced in FIG. 45, the cap further introducing: an annular sealing component.
Figure 47:
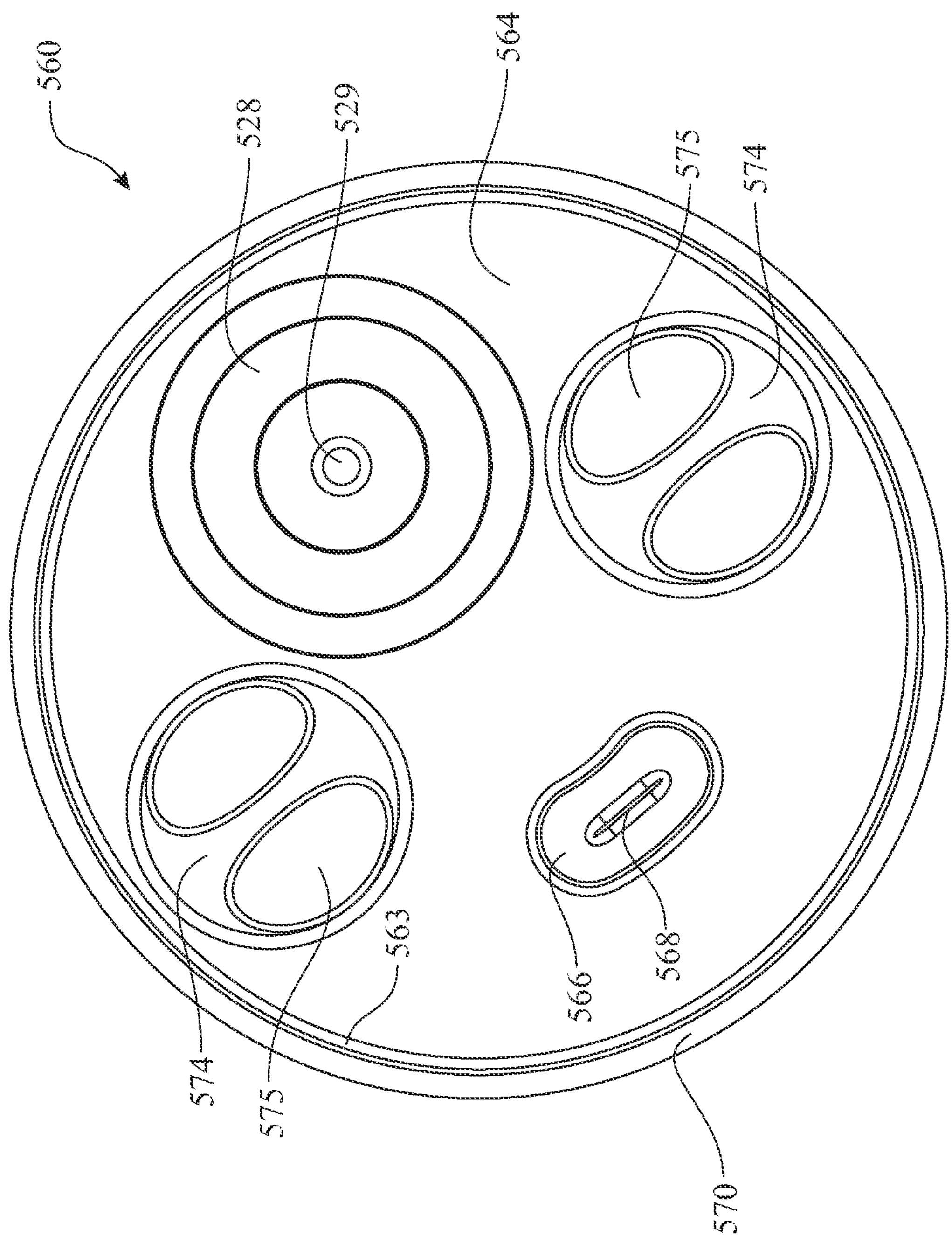
FIG. 47 presents a top plan view of the cap originally introduced in FIG. 45.
Figure 48:
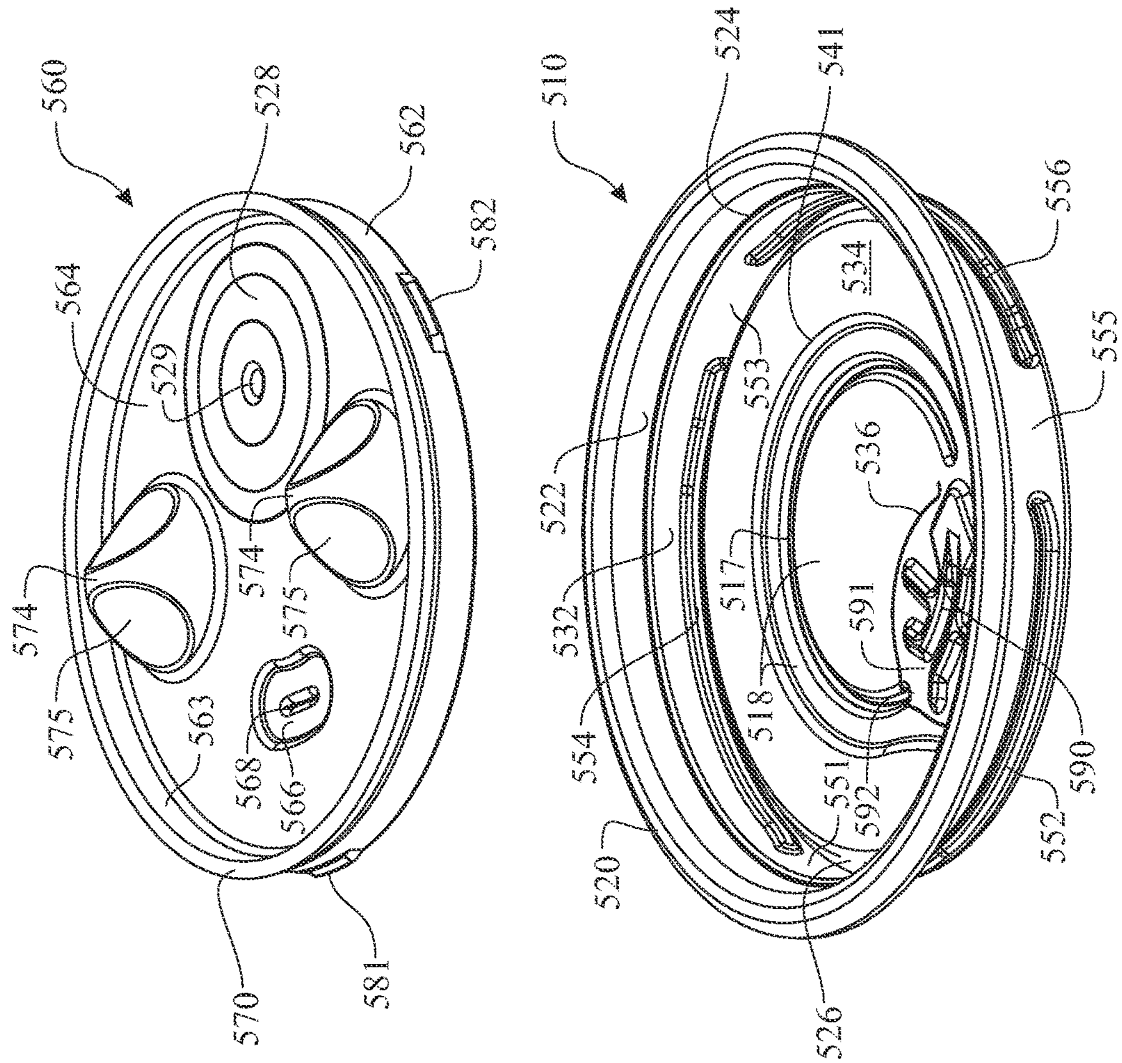
FIG. 48 presents a top isometric exploded assembly view of the container lid originally introduced in FIG. 42 and the cap originally introduced in FIG. 45.
Figure 49:
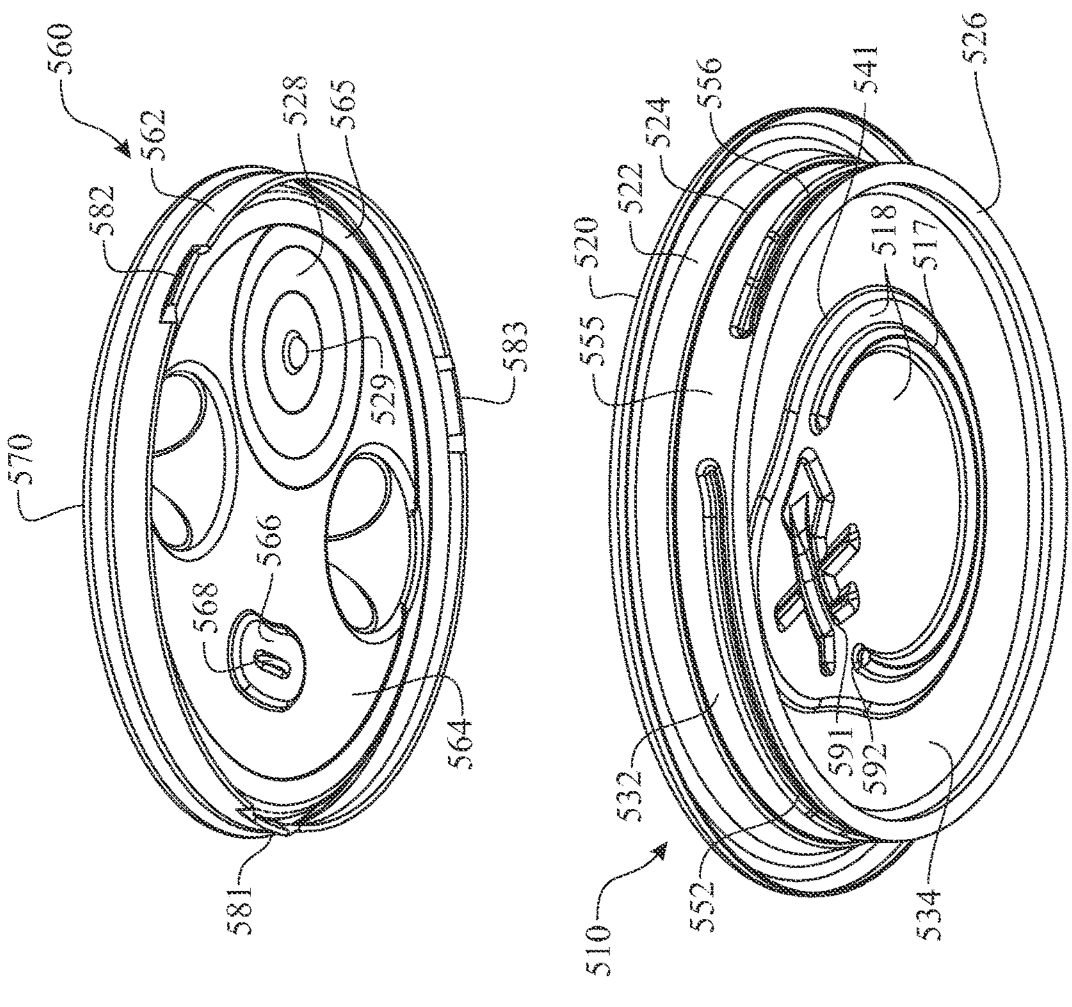
FIG. 49 presents a bottom isometric exploded assembly view of the container lid originally introduced in FIG. 42 and the cap originally introduced in FIG. 45.
Figure 77:
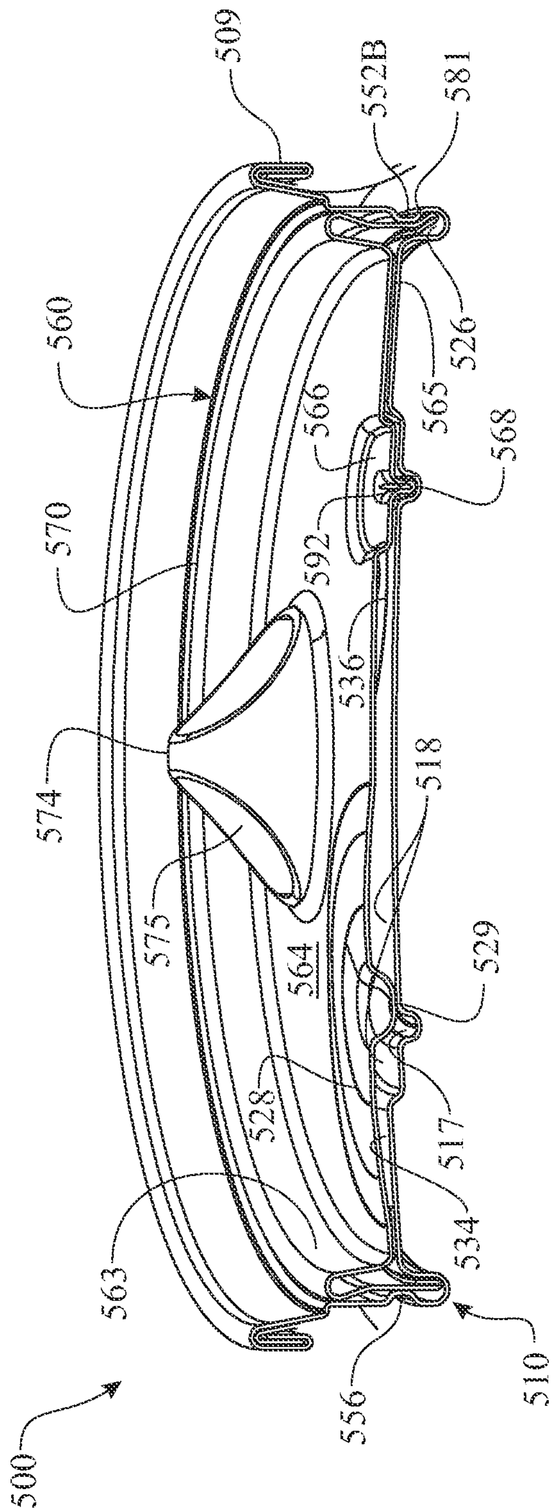
FIG. 77 presents a top isometric assembly section view of the container lid introduced in FIG. 42 and the cap introduced in FIG. 45, the illustration presenting the same arrangement as shown in FIG. 71, the section view being taken along section line 55-55 of FIG. 51, the illustration focusing on an operation of an off-centered safety indicator, the off-centered safety indicator shown in an unopened, untampered, safe condition.
Figure 78:
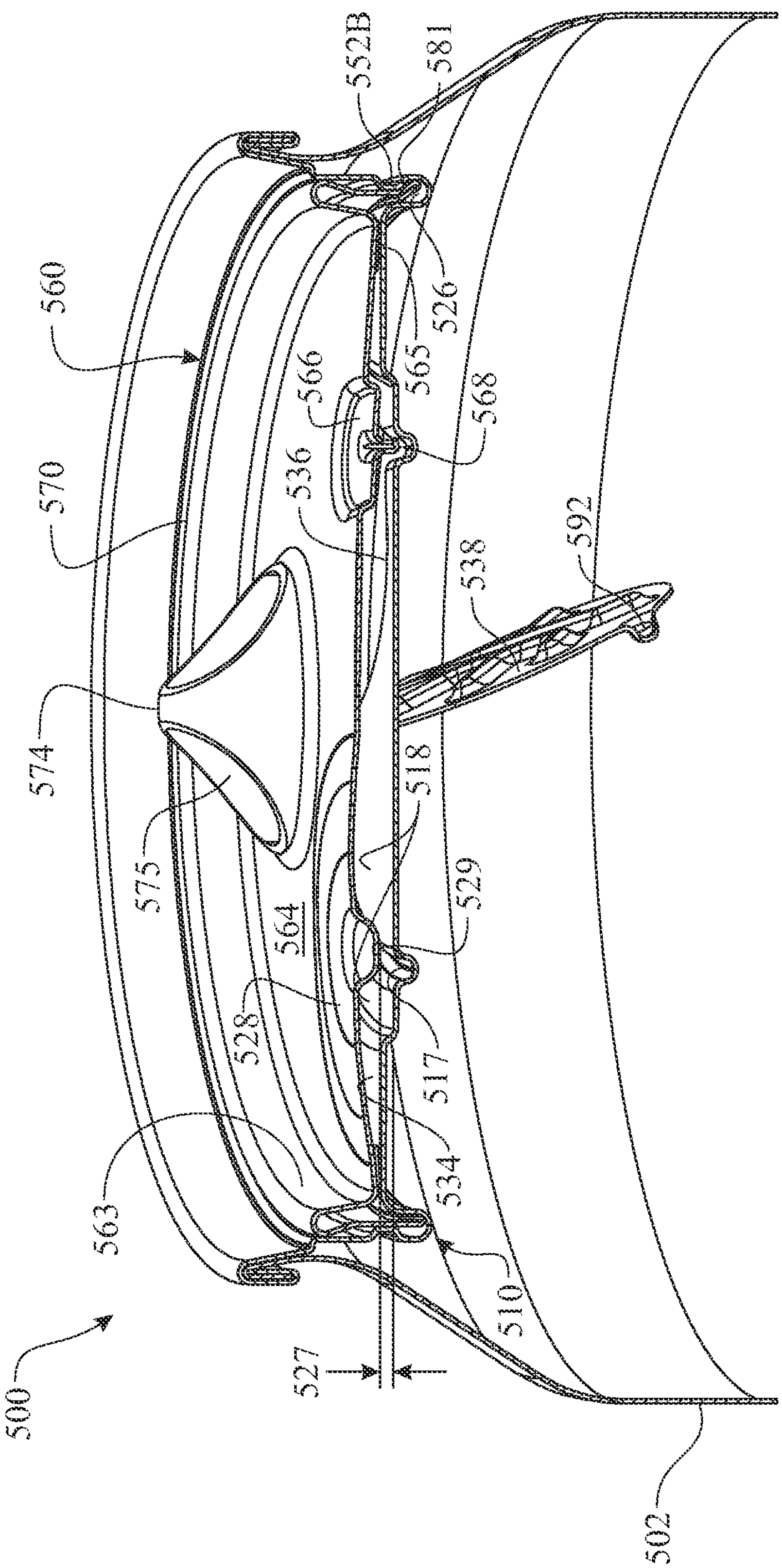
FIG. 78 presents a top isometric assembly section view of the container lid introduced in FIG. 42 and the cap introduced in FIG. 45, the illustration presenting the same arrangement as shown in FIG. 77, the illustration focusing on an operation of the off-centered safety indicator, the off-centered safety indicator shown capable of informing a user that a container lid has been opened.
Figure 79:
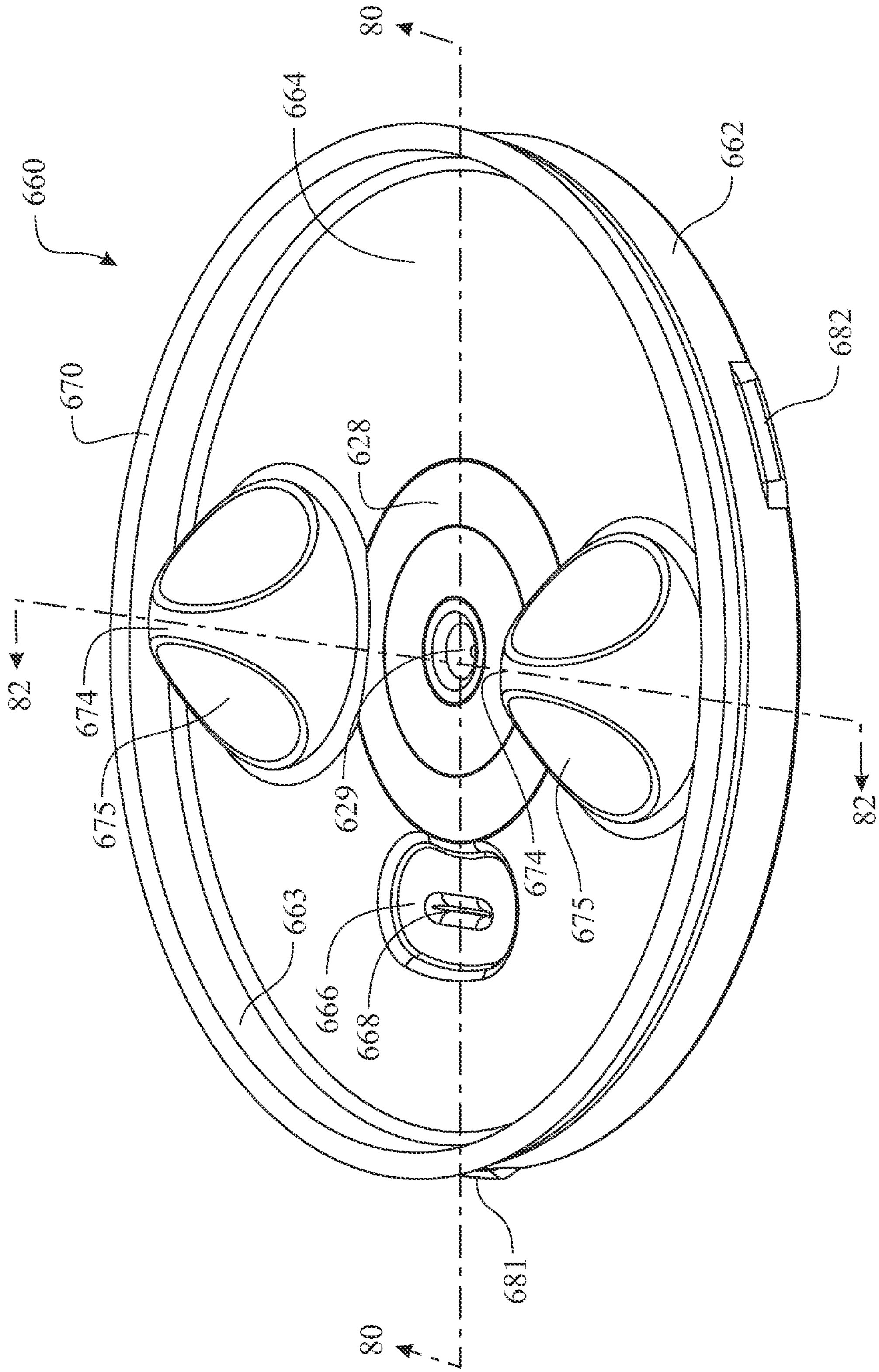
FIG. 79 presents a top isometric view introducing a variant of the cap introduced in FIG. 45 for use with the container lid introduced in FIG. 42, wherein the safety indicator is centrally positioned on the cap.

In addition to the operational features, the resealable container cap 560 can include a tamper indicator, such as the off-center tamper indicator feature 528, shown in FIGS. 45-47, and shown functioning in FIGS. 77, 78. The off-center tamper indicator feature 528 includes an off-center tamper indicator operation element 529, wherein the off-center tamper indicator operation element 529 mechanically operates the off-center tamper indicator feature 528. The off-center tamper indicator operation element 529 contacts the opposing surface of the resealable container lid upper surface reinforcement formation 518. The resealable container lid upper surface reinforcement formation 518 maintains a rigid (non-pliable) form when the resealable container 500 is in a sealed (unopened) condition, as shown in FIG. 77. The rigidity is provided by an internal pressure within the resealable container 500. The rigidity of the resealable container lid upper surface reinforcement formation 518 supports the off-center tamper indicator operation element 529, which in turn inhibits any motion of the off-center tamper indicator feature 528. This maintains the off-center tamper indicator feature 528 in position, disabling any potential for the off-center tamper indicator feature 528 to "report", wherein the "report" is the ability of the off-center tamper indicator feature 528 to flex, which preferably generates an audible and/or tactile response. When the resealable container 500 is breached, such as by the opening sequence previously described herein, the supporting pressure from within the resealable container 500 is reduced or removed, thus removing any support provided by the resealable container lid upper surface reinforcement formation 518 to the off-center tamper indicator operation element 529, resulting in a flexible condition of the off-center tamper indicator feature 528, now allowing the off-center tamper indicator feature 528 to "report", as shown in FIG. 78.

Another feature of the configuration of the resealable container lid 510 and resealable container cap 560 is an anti-missiling function. Missiling may occur upon an initial fracture of the cap receiving socket bottom panel circular score line 536, releasing stored pressure from within the resealable container 500. In a condition where the resealable container cap 560 retains a seal against the resealable container lid 510 and the resealable container lid 510 is breached, the pressure released from the resealable container 500 could potentially cause the resealable container cap 560 to become a projectile. The anti-missiling feature is created by a separation between the cap sealing ring 565 and the top surface of the cap receiving socket bottom wall 534 while the resealable container cap 560 remains in engagement with the resealable container lid 510 during the initial opening sequence of the resealable container 500, thus providing a pathway for release of pressure.

As previously mentioned, the resealable container cap 560 can be designed in any of a variety of configurations. A resealable container cap 660, illustrated in FIGS. 79 through 81 and 86 through 90, is one exemplary variant of the resealable container cap 560.

Figure 80:
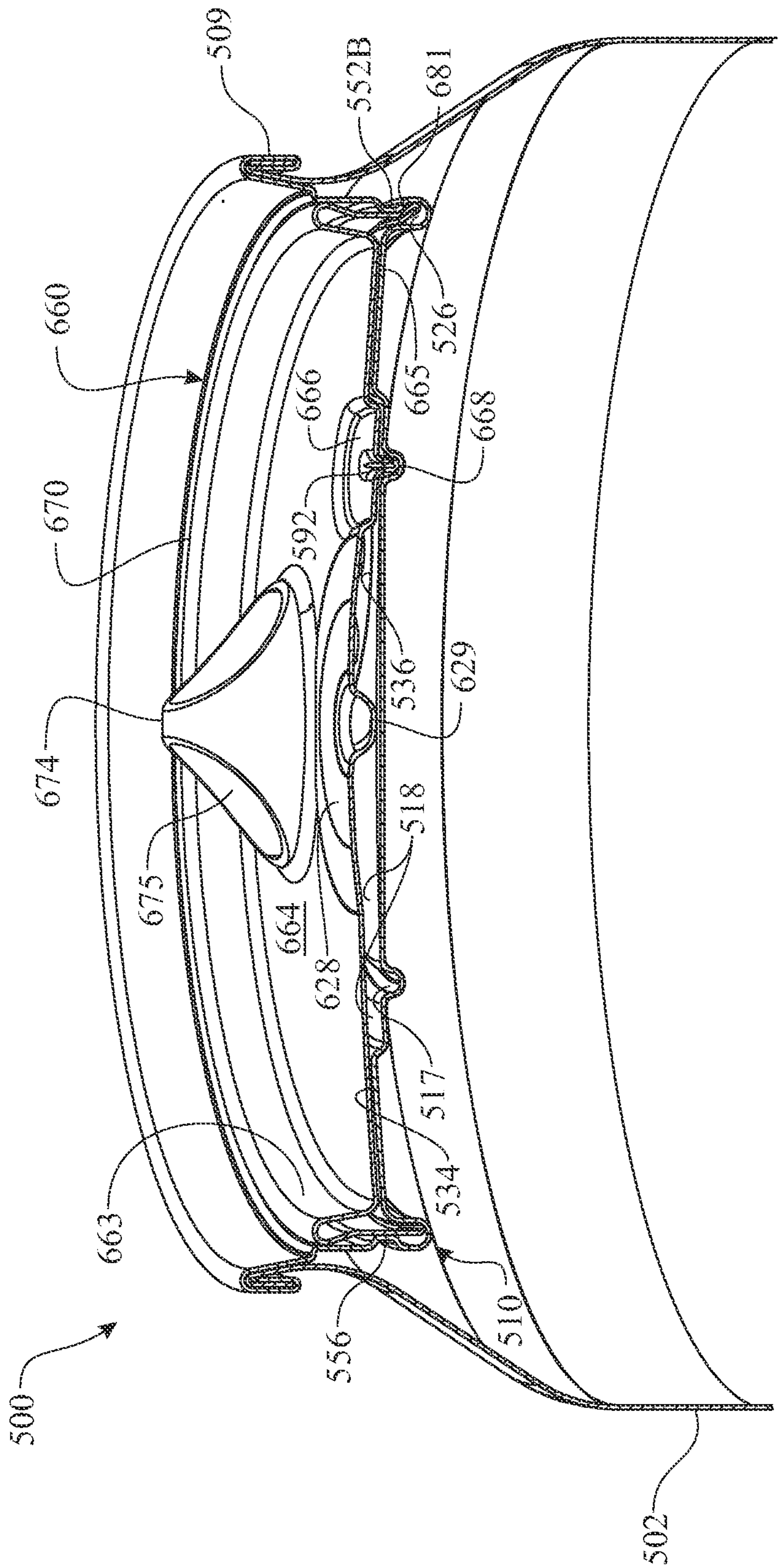
FIG. 80 presents a top isometric assembly section view of the container lid introduced in FIG. 42 and the cap introduced in FIG. 79, the section orientation being referenced by section line 80-80 of FIG. 79, the illustration focusing on an operation of the centrally located safety indicator, the centrally located safety indicator shown in an unopened, untampered, safe condition.
Figure 81:
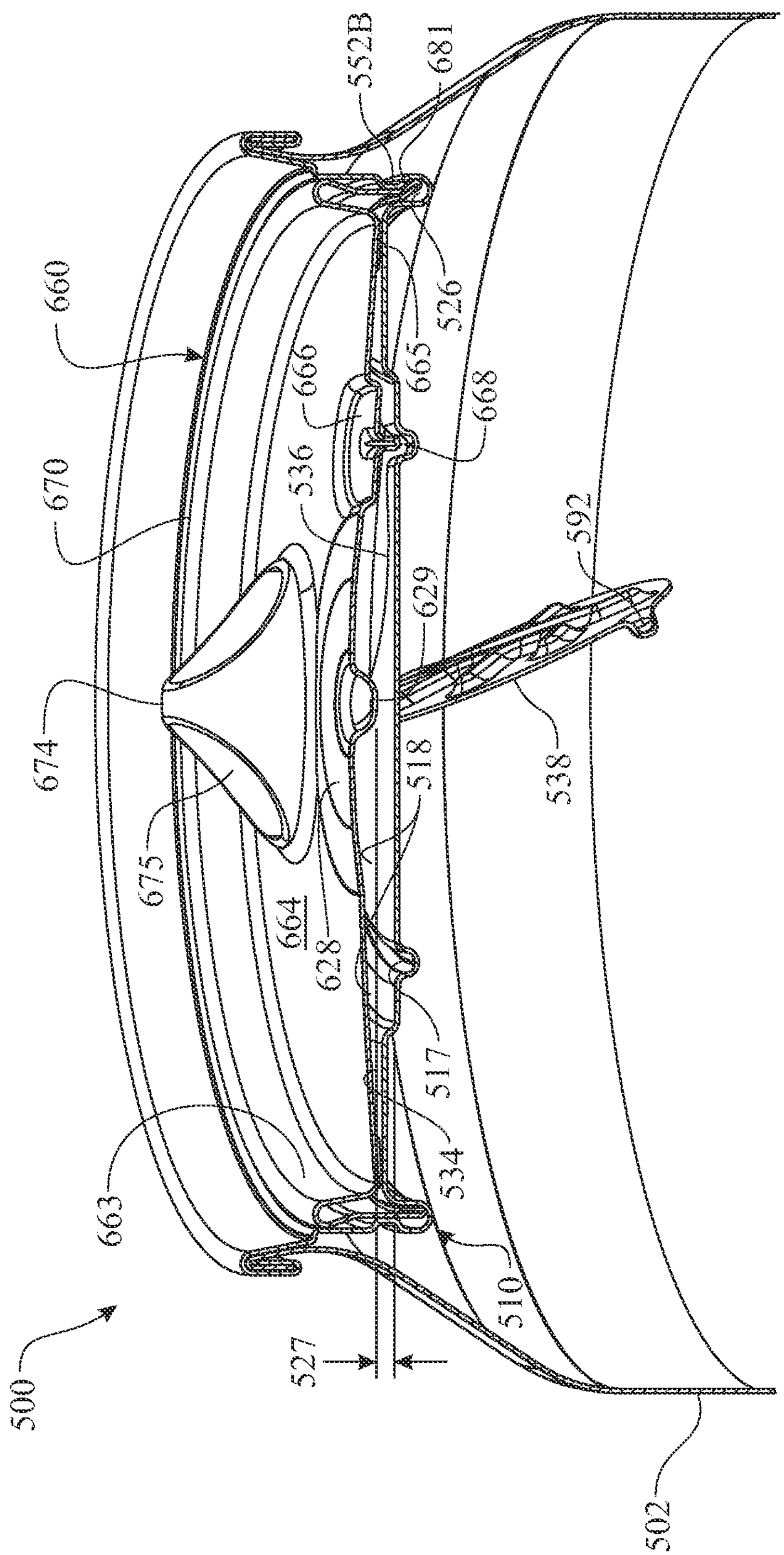
FIG. 81 presents a top isometric assembly section view of the container lid introduced in FIG. 42 and the cap introduced in FIG. 79, the illustration focusing on an operation of a safety indicator, the safety indicator shown capable of informing a user that a container lid has been opened.

The resealable container cap 660 includes features that are similar to those of the resealable container cap 560. Like features of the resealable container cap 660 and the resealable container cap 560 are numbered the same except preceded by the numeral '6'. The significant distinction of the resealable container cap 660 is the location of the concentric tamper indicator feature 628. The off-center tamper indicator feature 528 is formed in an off-centered location respective to a centroid of the resealable container cap 560. Conversely, the concentric tamper indicator feature 628 is formed in a concentric about the centroid of the resealable container cap 660. The centered location of the concentric tamper indicator feature 628, and more specifically, the concentric tamper indicator operation element 629 of the concentric tamper indicator feature 628, is located to contact the resealable container lid upper surface reinforcement formation 518 of the resealable container lid 510, as illustrated in FIG. 80. The cap receiving socket bottom panel circular score line 536 is designed to ensure that the cap receiving socket bottom panel tear panel 538 is off-centered to retain adequate support from the resealable container lid upper surface reinforcement formation 518 to the concentric tamper indicator operation element 629. When the resealable container 500 is sealed (unopened), the concentric tamper indicator operation element 629 contacts and is supported by the resealable container lid upper surface reinforcement formation 518, as shown in FIG. 80. The pressure within the container maintains a rigidity of the cap receiving socket bottom wall 534, including the resealable container lid upper surface reinforcement formation 518. The pressure maintains a convex or bulged shape of the cap receiving socket bottom wall 534, including the resealable container lid upper surface reinforcement formation 518. When the resealable container 500 is breached, the release of the pressure from within the interior of the container eliminates the support of the cap receiving socket bottom wall 534, including support of the resealable container lid upper surface reinforcement formation 518. This results in a creation of a tamper indicator operation element and lid surface gap 527, as shown in FIG. 81, the tamper indicator operation element and lid surface gap 527 extending between the concentric tamper indicator operation element 629 and the top surface of the resealable container lid upper surface reinforcement formation 518 and/or a flexibility of the resealable container lid upper surface reinforcement formation 518. Either condition allows the off-center tamper indicator feature 528 to "report" as previously described above, indicating the breach to the end user. Again, the "report" can be a tactile report, an audible report, or any other known reporting method.

An assembly of the resealable container lid 510 onto the container cylindrical sidewall 102 was previously introduced, but not fully described. The assembly process is described in a series of sequence illustrations shown in FIGS. 82 through 85. The resealable container cap 560 can be assembled to the resealable container lid 510 either prior to assembly of the resealable container lid 510 onto the container cylindrical sidewall 102 or subsequent to the assembly of the resealable container lid 510 onto the container cylindrical sidewall 102. In the exemplary assembly process, the resealable container cap 560 is assembled to the resealable container lid 510 prior to assembling the resealable container lid 510 onto the container cylindrical sidewall 102, as this configuration does not introduce limitations confronted in the process which excludes the resealable container cap 560.

Figure 83:
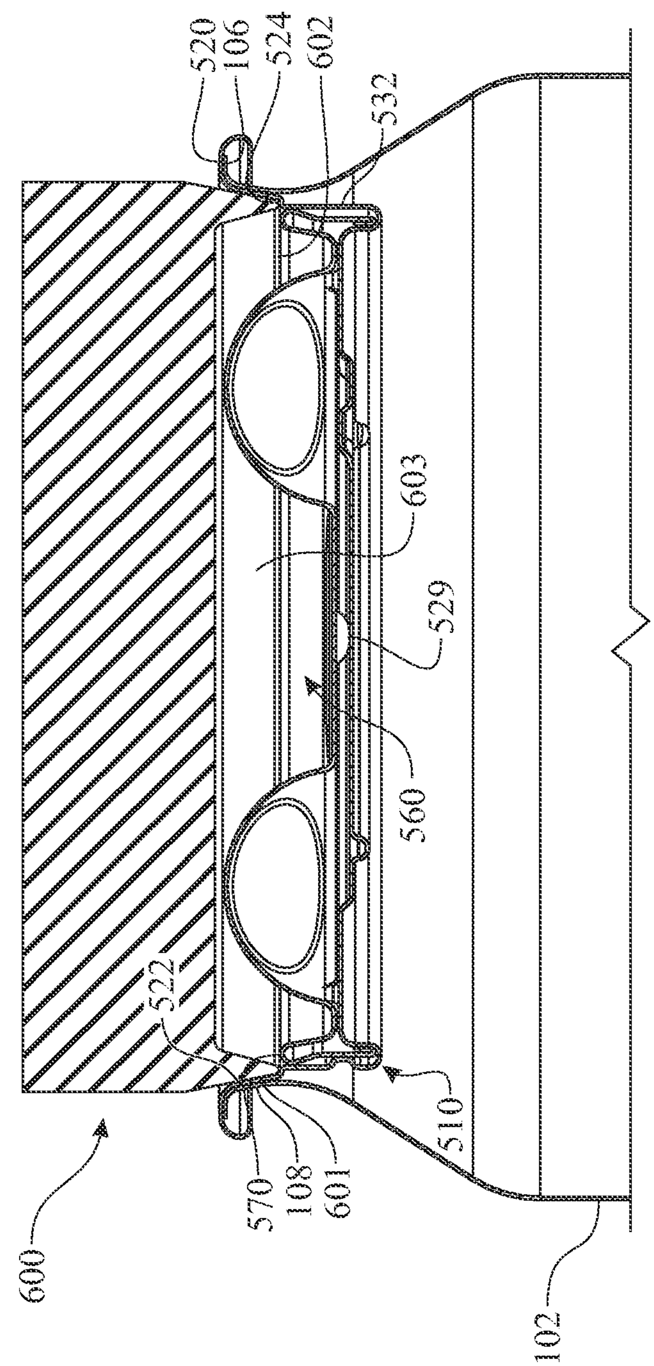
FIG. 83 presents a sectioned elevation view of the container lid assembly process initiated in FIG. 82, wherein the illustration presents a second subsequent step from the configuration introduced in FIG. 82, wherein the container lid assembly is positioned onto the container body.

A seaming chuck tool 600 is inserted into an interior of the resealable container lid 510 defined by the interior surface of the seaming chuck wall 522. The resealable container lid 510 is seated upon the container seaming panel 106 and the container seaming wall 108 of the container cylindrical sidewall 102, as shown in FIGS. 82, 83. The container seaming wall 108 is a frustum shaped registration surface formed about an opening of the container cylindrical sidewall 102. The container seaming panel 106 is an outward extending radial flange formed about an opening of the container cylindrical sidewall 102. The seaming chuck tool 600 includes a seaming chuck tool conical driving wall 601, a seaming chuck tool planar driving surface 602, and a seaming chuck tool cap clearance cavity 603. The seaming chuck tool conical driving wall 601 has a male frustum shape that is in concentric/conical registration with the seaming chuck wall 522 of the resealable container lid 510 and the container seaming wall 108 of the container cylindrical sidewall 102, and is preferably designed to receive the compression forces applied by the first operation roller driving channel first operation roller driving channel 606 of the first operation roller 604 and the second/final operation roller driving channel 609 of the second/final operation roller 607. The seaming chuck tool planar driving surface 602 is preferably located about a lower edge of the seaming chuck tool conical driving wall 601. Alternatively, the seaming chuck tool planar driving surface 602 can be formed within a portion of the seaming chuck tool conical driving wall 601. The seaming chuck tool planar driving surface 602 is preferably designed to provide a compression force to the seaming chuck shoulder 524 without coming into contact with the cylindrical sidewall inverted countersink 570 of the resealable container cap 560. The seaming chuck tool cap clearance cavity 603 extends upward into the seaming chuck tool 600, wherein the seaming chuck tool cap clearance cavity 603 is designed to provide clearance for features extending upward from the resealable container cap planar traversing wall 564 of the resealable container cap 560, such as a pair of resealable container cap grip elements 574. The cylindrical sidewall inverted countersink 570 of the resealable container cap 560 is preferably designed and positioned relative to the seaming chuck shoulder 524 so that the cylindrical sidewall inverted countersink 570 does not come into contact with any part of the seaming chuck tool 600 during the seaming process. The seaming chuck tool conical driving wall 601 and the seaming chuck tool planar driving surface 602 apply a compression force upon the seaming chuck wall 522 and the seaming chuck shoulder 524 of the resealable container lid 510 to ensure a bottom surface of the seaming panel 520 is properly seated against an upper surface of the container seaming panel 106.

Figure 84:
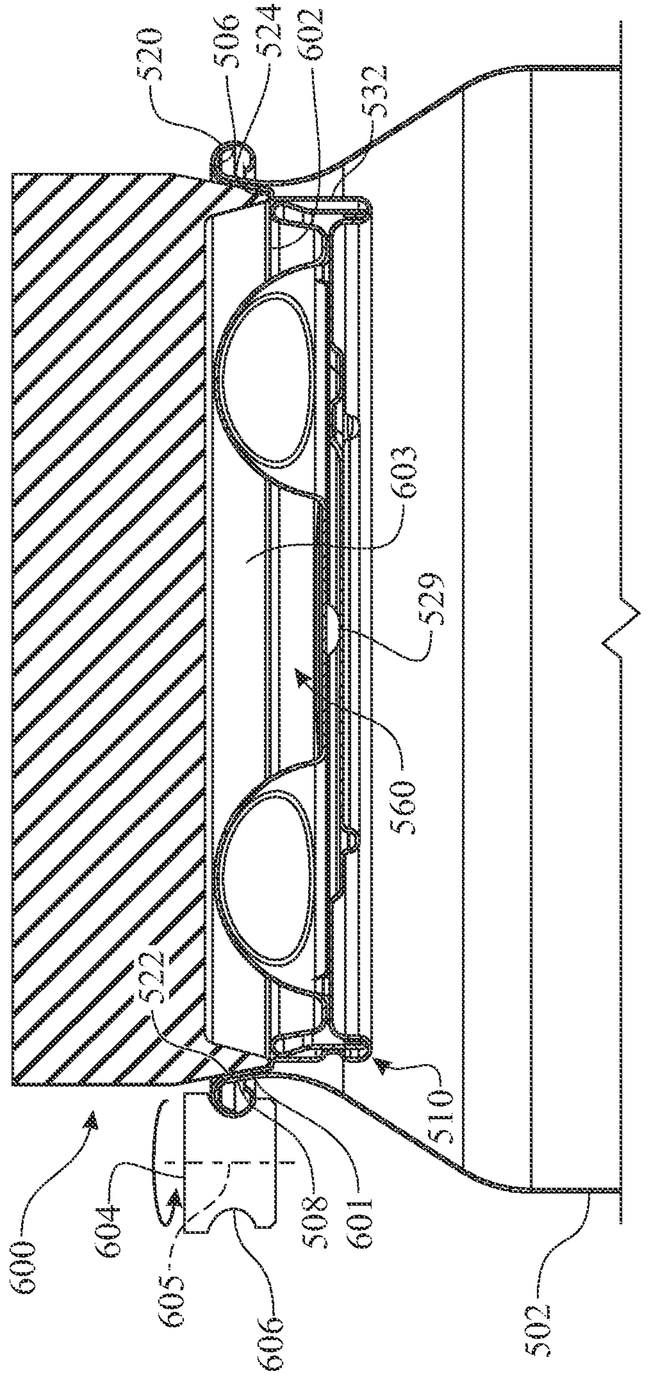
FIG. 84 presents a sectioned elevation view of the container lid assembly process initiated in FIG. 82, wherein the illustration presents a third subsequent step from the configuration introduced in FIG. 82, wherein a seaming panel (alternatively referred to as a lid and container joining formation) of the container lid and a seaming flange of the container body are rolled about one another.
Figure 85:
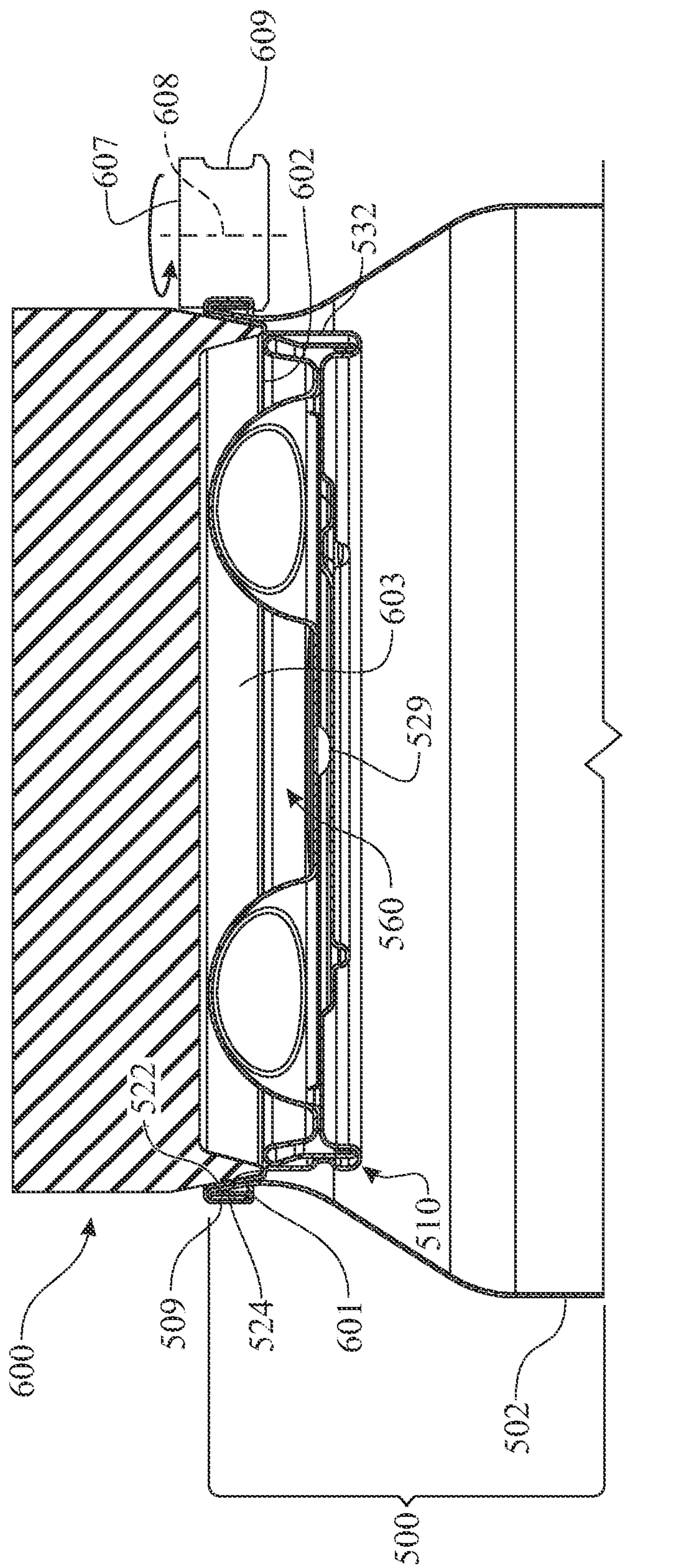
FIG. 85 presents a sectioned elevation view of the container lid assembly process initiated in FIG. 82, wherein the illustration presents a fourth subsequent step from the configuration introduced in FIG. 82, wherein the rolled seaming panel and seaming flange are compressed finalizing the seaming process.
Figure 86:
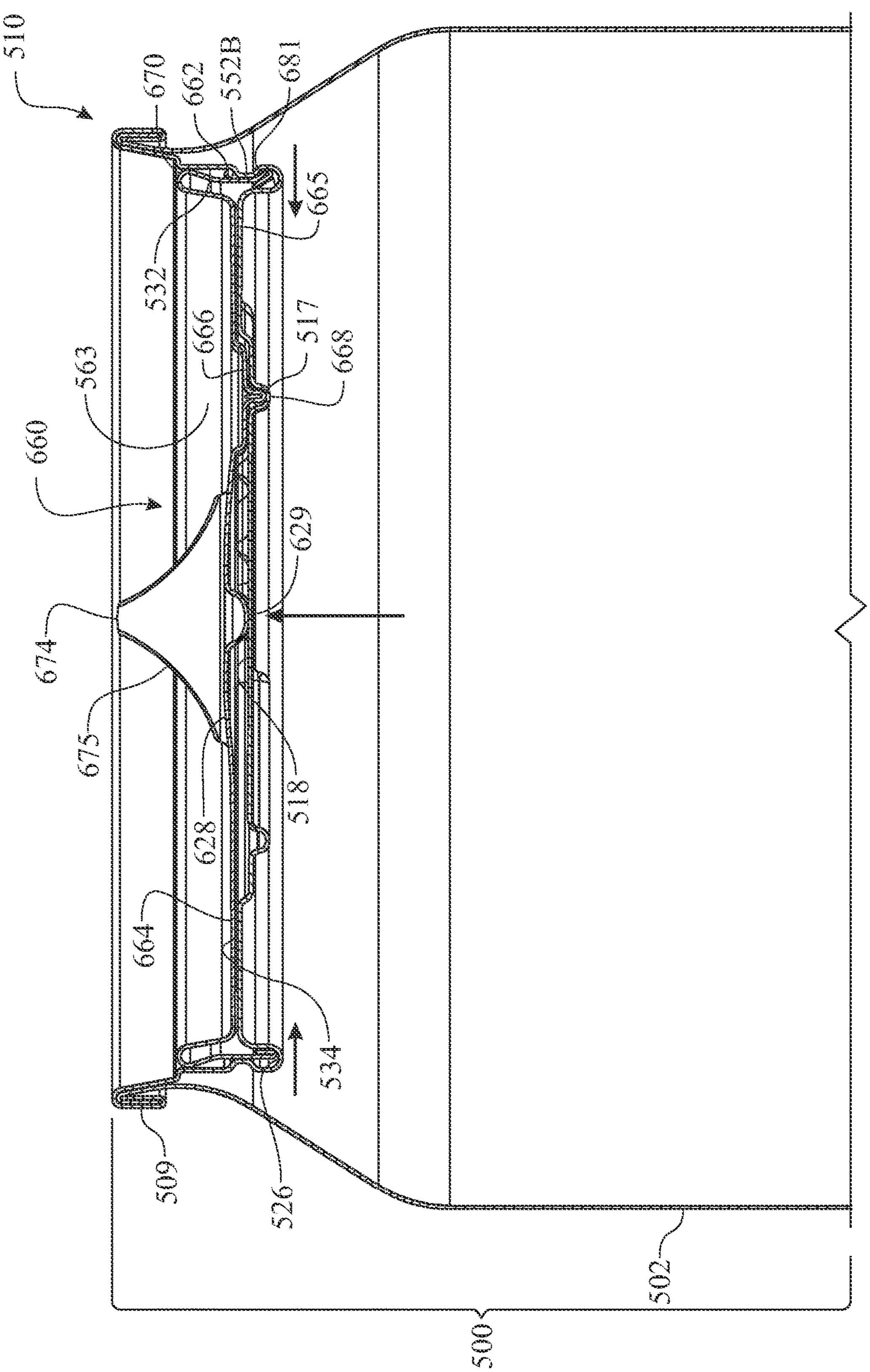
FIG. 86 presents a sectioned elevation view of the container assembly, the illustration being shown prior to flexure and deformation of the container lid assembly which occurs during a retort or purification process during bottling, the section orientation being referenced by section line 80-80 of FIG. 79.
Figure 87:
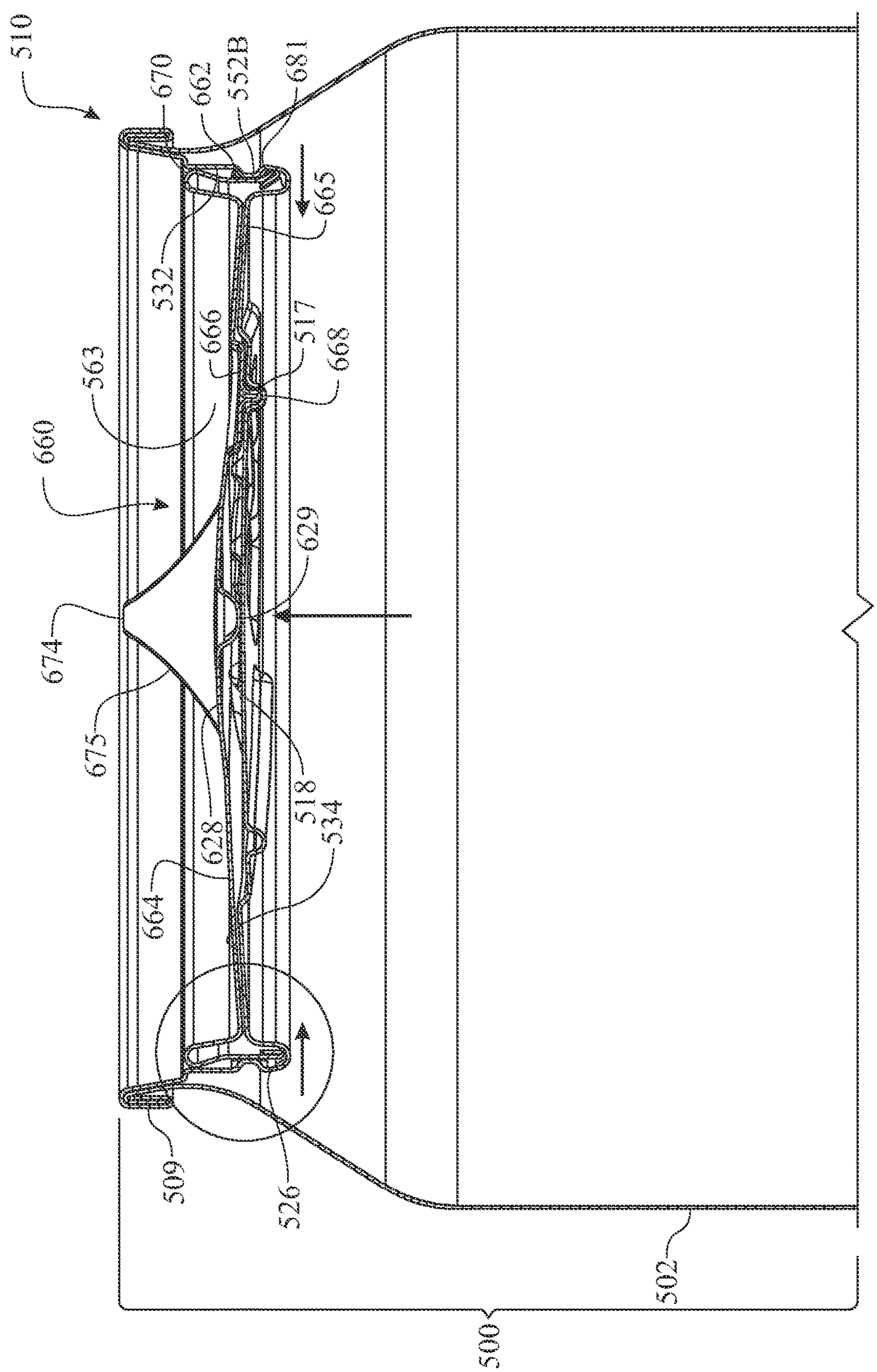
FIG. 87 presents a sectioned elevation view of the container assembly as introduced in FIG. 86, wherein the illustration exemplifies the flexure and the deformation of the container lid assembly that occurs during the retort or purification process during bottling.
Figure 88:
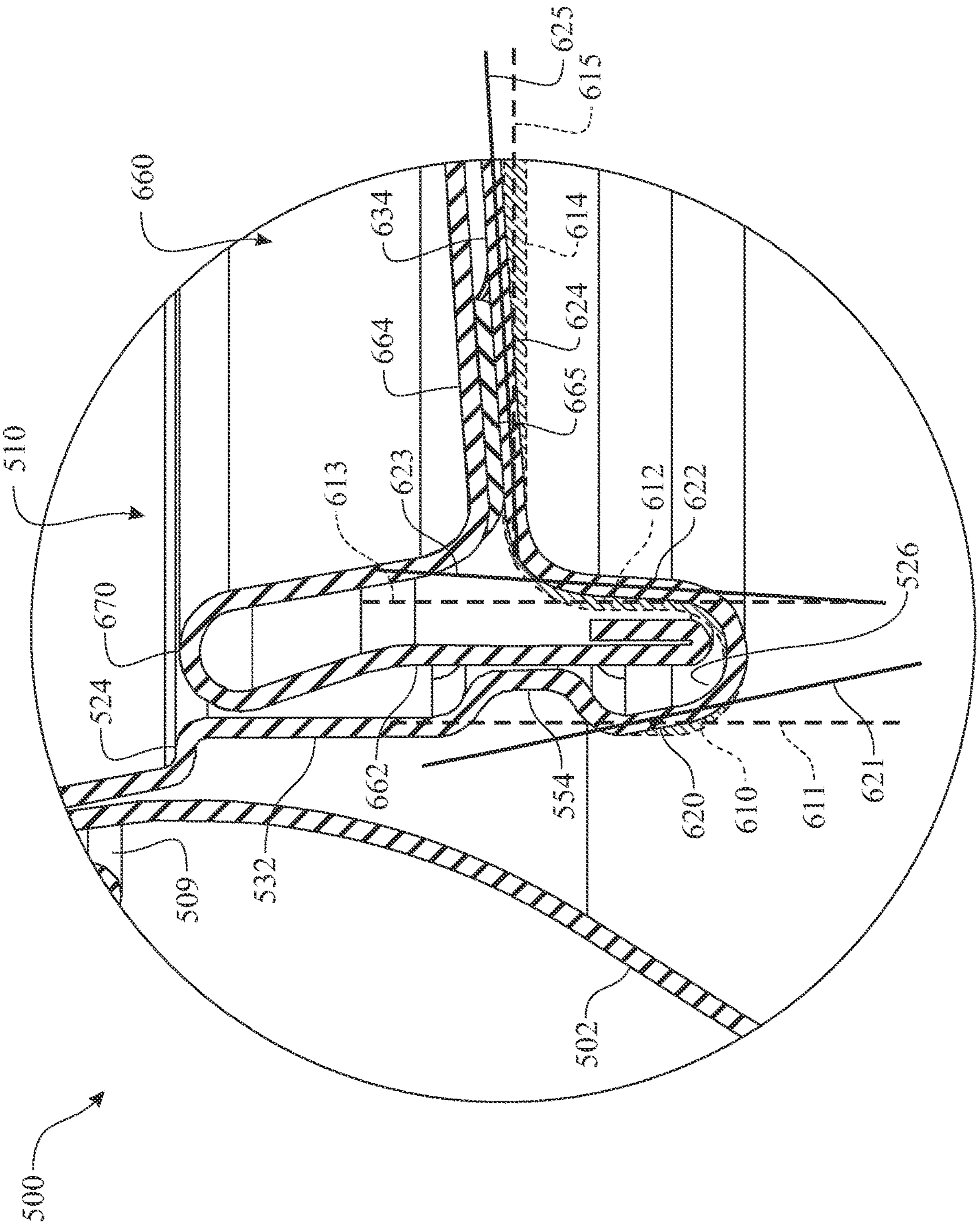
FIG. 88 presents a magnified sectioned elevation view of the container lid assembly as shown in FIG. 87, wherein the illustration magnifies the flexure and the deformation of the container lid assembly that occurs during the retort or purification process during bottling.

A first operation roller driving channel first operation roller driving channel 606, formed in a contacting surface of the first operation roller 604, rolls the seaming panel 520 and the respective portion of the container seaming panel 106, as shown in FIG. 84. The first operation roller driving channel first operation roller driving channel 606 is formed as a semi-circular groove within a cylindrical sidewall of the first operation roller 604. In a preferred process, the first operation roller 604 rotates about a first operation roller rotational axis 605 and the seaming chuck tool 600 rotates the container cylindrical sidewall 102 and the associated resealable container lid 510 against the first operation roller driving channel first operation roller driving channel 606 of the first operation roller 604. The contact between the first operation roller driving channel first operation roller driving channel 606 and the seaming panel 520 in conjunction with the resulting forces rolls the combination of the seaming panel 520 and the container seaming panel 106 together. Subsequently, a second/final operation roller 607, employing a second/final operation roller driving channel 609 in a similar manner to the first operation roller driving channel first operation roller driving channel 606 of the first operation roller 604 compresses the rolled formation into a compressed formation, as shown in FIG. 85. The second/final operation roller driving channel 609 is formed as an oblong, rectangular groove within a cylindrical sidewall of the second/final operation roller 607.

In a preferred process, the second/final operation roller 607 rotates about a second (final) operation roller spin axis 608 and the seaming chuck tool 600 rotates the container cylindrical sidewall 102 and the associated resealable container lid 510 against the second/final operation roller driving channel 609 of the second/final operation roller 607. The contact between the second/final operation roller driving channel 609 and the rolled version of the seaming panel 520 in conjunction with the resulting forces compresses the combination of the seaming panel 520 and the container seaming panel 106 together. The compressed shape creates a sealed seam between the seaming panel 520 and the container seaming panel 106. The completed container assembly is referred to as a resealable container 500 and the completed seam is referred to as a container body and lid assembly seam 509, as shown in FIG. 85.

Once sealed, the resealable container 500 is subjected to a process referred to a retort, where the contents of the resealable container 500 are heated. The heat increases an internal pressure within the resealable container 500. The increased pressure deforms the resealable container lid 510 of the resealable container 500. More specifically, because of the shape of the features of the resealable container 500, the increased pressure deforms the cap receiving socket bottom wall 534 of the resealable container lid 510 upward into a domed or bulged shape as indicated by the upward directing arrow in FIGS. 86, 87, which draws the peripheral edge of cap receiving socket bottom wall 534 (essentially, the peripheral countersink 526) inward, as indicated by the pair of radially inwardly directed arrows located adjacent to each sectioned view of the peripheral countersink 526. The resealable container lid 510 and the resealable container cap 660 are shown in a pre-retort, original shape in FIG. 86. The resealable container lid 510 and the resealable container cap 660 are shown in a deformed, bulged shape during the retort process in FIG. 87. A magnified view of the peripheral countersink 526, illustrated in FIG. 88, introduces the deflections imposed upon the features of the resealable container lid 510 and the resealable container cap 660 during the retort process. Broken tangent lines 611, 613, 615 delineate an original shape of the respective assembly segments 610, 612, 614, shown prior to exposure to the retort process. Solid tangent lines 621, 623, 625 delineate a reformed shape of the respective assembly segments 620, 622, 624, shown during the retort process. The resealable container lid 510 and the resealable container cap 660 are shown in a post-retort, residual deformed shape in FIG. 89.

In an original shape of the container lid assembly, prior to exposure to the retort process, the peripheral countersink 526 is formed having a outer peripheral countersink wall pre-retort geometry 610 on an outer, distal region and a inner peripheral countersink wall pre-retort geometry 612 on an inner, proximal region. Additionally, the cap receiving socket bottom wall 534 is referred to as a cap receiving socket bottom wall post-retort geometry 624. The outer peripheral countersink wall pre-retort geometry 610 is formed along an outer peripheral countersink wall pre-retort geometry angle delineator 611. The inner peripheral countersink wall pre-retort geometry 612 is formed along an inner peripheral countersink wall pre-retort geometry angle delineator 613. The cap receiving socket bottom wall post-retort geometry 624 is formed along a cap receiving socket bottom wall pre-retort geometry angle delineator 615. In a pre-retort condition, the outer peripheral countersink wall pre-retort geometry 610 and the inner peripheral countersink wall pre-retort geometry 612 are generally vertically oriented. Additionally, the cap receiving socket bottom wall pre-retort geometry 614 is generally planar and substantially horizontally oriented.

In a shape of the container lid assembly during the retort process, the outer peripheral countersink wall pre-retort geometry 610 is reshaped into a outer peripheral countersink wall post-retort geometry 620 on the outer, distal region and the inner peripheral countersink wall pre-retort geometry 612 is reshaped into a inner peripheral countersink wall post-retort geometry 622 on the inner, proximal region of the peripheral countersink 526. Additionally, the cap receiving socket bottom wall pre-retort geometry 614 is reshaped into a cap receiving socket bottom wall post-retort geometry 624. The outer peripheral countersink wall post-retort geometry 620 is formed along an outer peripheral countersink wall post-retort geometry angle delineator 621. The inner peripheral countersink wall post-retort geometry 622 is formed along an inner peripheral countersink wall post-retort geometry angle delineator 623. The cap receiving socket bottom wall post-retort geometry 624 is formed along a cap receiving socket bottom wall post-retort geometry angle delineator 625. During this process, the cap receiving socket bottom wall pre-retort geometry 614 transitions from a generally planar shape to a convex or bulged shape, identified as a cap receiving socket bottom wall post-retort geometry 624. This geometric condition reduces the diameter of the peripheral edge of the cap receiving socket bottom wall 534 (cap receiving socket bottom wall pre-retort geometry 614). This reduction in the diameter of the peripheral edge of the cap receiving socket bottom wall 534 draws the upper edge of the inner peripheral countersink wall pre-retort geometry 612 inward, angling the inner peripheral countersink wall pre-retort geometry 612 respectively, which is subsequently referred to as a inner peripheral countersink wall post-retort geometry 622. The reshaping of the inner peripheral countersink wall pre-retort geometry 612 to the inner peripheral countersink wall post-retort geometry 622 pulls the peripheral countersink 526 inward, impacting the lower edge of the cap receiving socket cylindrical sidewall 532. The resulting motion draws the lower edge of the outer peripheral countersink wall pre-retort geometry 610 inward, angling the outer peripheral countersink wall pre-retort geometry 610 respectively, which is subsequently referred to as an outer peripheral countersink wall post-retort geometry 620.

In a post-retort shape of the resealable container lid 510, the reshaped assembly segments 620, 622, 624 permanently retain a portion of the reshaping undergone during the retort process.

The design of the resealable container cap 660, more specifically a cylindrical sidewall inverted countersink 670 provides a flexible transition between the resealable container cap cylindrical exterior sidewall 662 and resealable container cap cylindrical interior sidewall 663, which accommodates a reshaping of the resealable container cap planar traversing surface 664 when the resealable container cap 660 is assembled onto the outer peripheral countersink wall pre-retort geometry 610. This reshaping results from a force applied to the resealable container cap planar traversing surface 664 by the cap receiving socket bottom wall 534 on the resealable container lid 510 during the retort process. A separation between the resealable container cap planar traversing surface 664 and cap receiving socket bottom wall 534 may be maintained by the off-center tamper indicator operation element 529 being in mechanical contact with the upper surface of the resealable container lid upper surface reinforcement formation 518, maintaining the relative separation between the resealable container cap planar traversing surface 664 and the cap receiving socket bottom wall 534 during the retort process in order to prevent the offset projecting incisor 668 from prematurely placing a fracturing forcing upon the cap receiving socket bottom panel circular score line 536. Additionally, the reshaping of the cap receiving socket cylindrical sidewall 532 during the retort process, more specifically, the outer peripheral countersink wall pre-retort geometry 610, impinges cam tracks 552, 554, 556 into the respective cam followers 581, 582, 583, retaining the assembly of the resealable container cap 660 onto the resealable container lid 510 during the maximum deformation during the retort process.

The design of the resealable container cap 660, more specifically, the resealable container cap cylindrical exterior sidewall 662 is adapted to accommodate the changes in shape of the peripheral countersink 526 of the resealable container lid 510 during and subsequent to the retort process. The end result enables rotational motion of the resealable container cap cylindrical exterior sidewall 662 within the peripheral countersink 526 by the consumer after completion of the retort process. This avoids any binding between the cam followers 581, 582, 583 within the peripheral countersink 526, while retaining the cam followers 581, 582, 583 against the mating surface of the respective cam tracks 551, 553, 555. It is recognized that the deformation of the cap receiving socket cylindrical sidewall 532 resulting from the retort process is adapted to enhance the engagement between the cam followers 581, 582, 583 and the mating surface of the respective cam tracks 551, 553, 555, as the deformation decreases the diameter of the lower portion of the 526.

Figure 89:
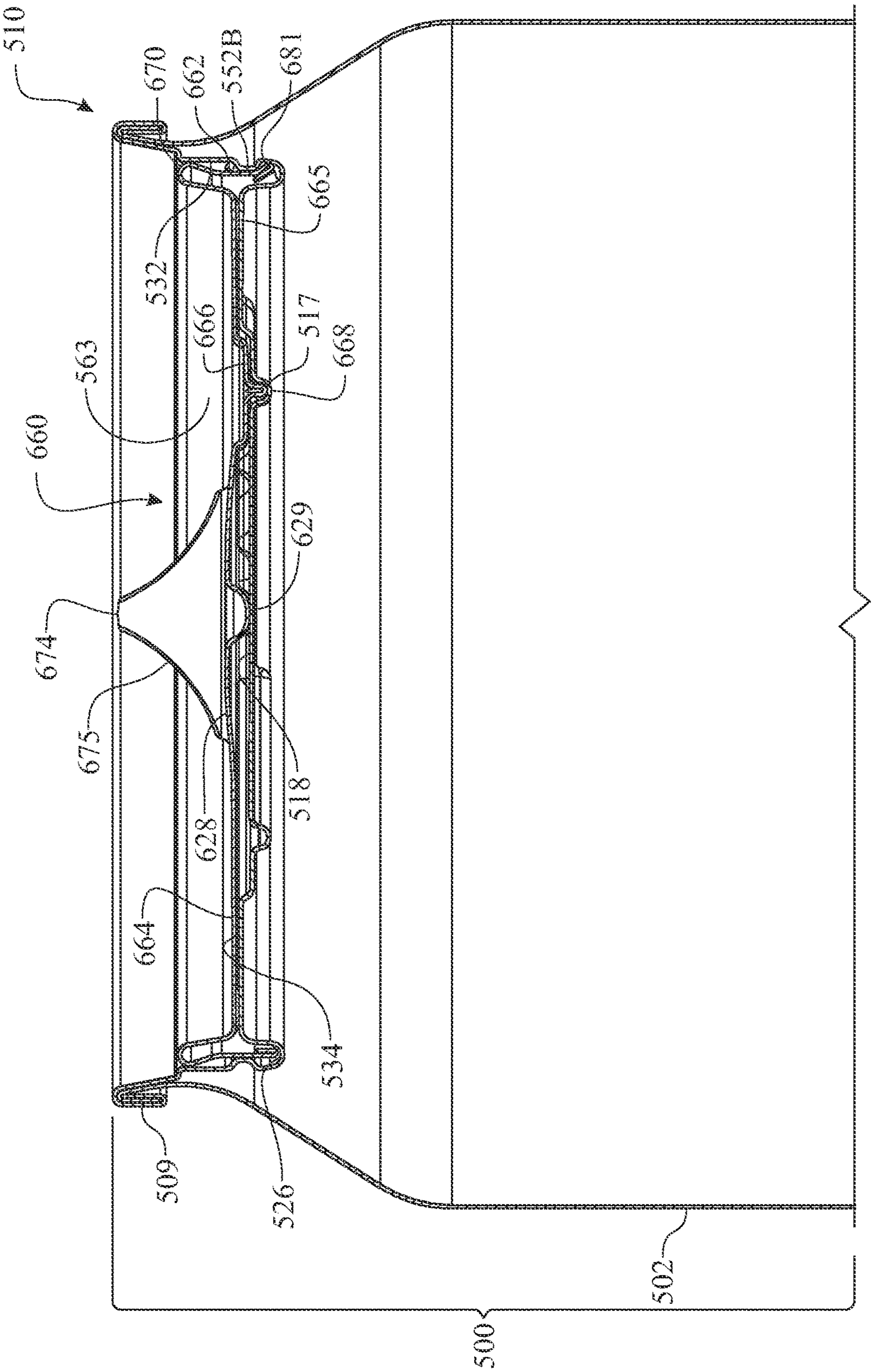
FIG. 89 presents a sectioned elevation view of the container assembly as introduced in FIG. 86, wherein the illustration exemplifies the resulting flexure and the deformation of the container lid assembly following the retort or purification process during bottling.

The resulting post-retort shape is shown in a cross sectioned view of the resealable container 500, as presented in FIG. 89.

Figure 90:
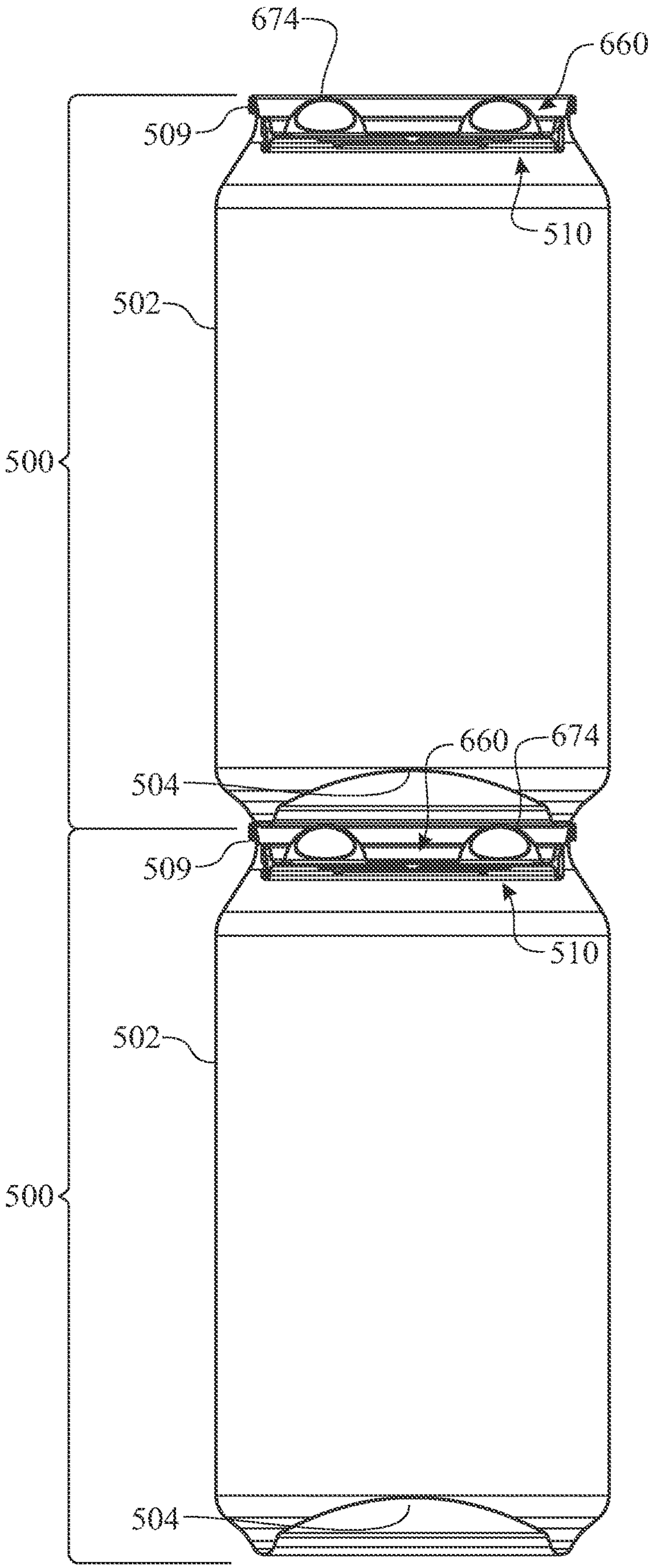
FIG. 90 presents a sectioned elevation view exemplifying a stacking capability of a plurality of completed container assemblies.
Figure 91:
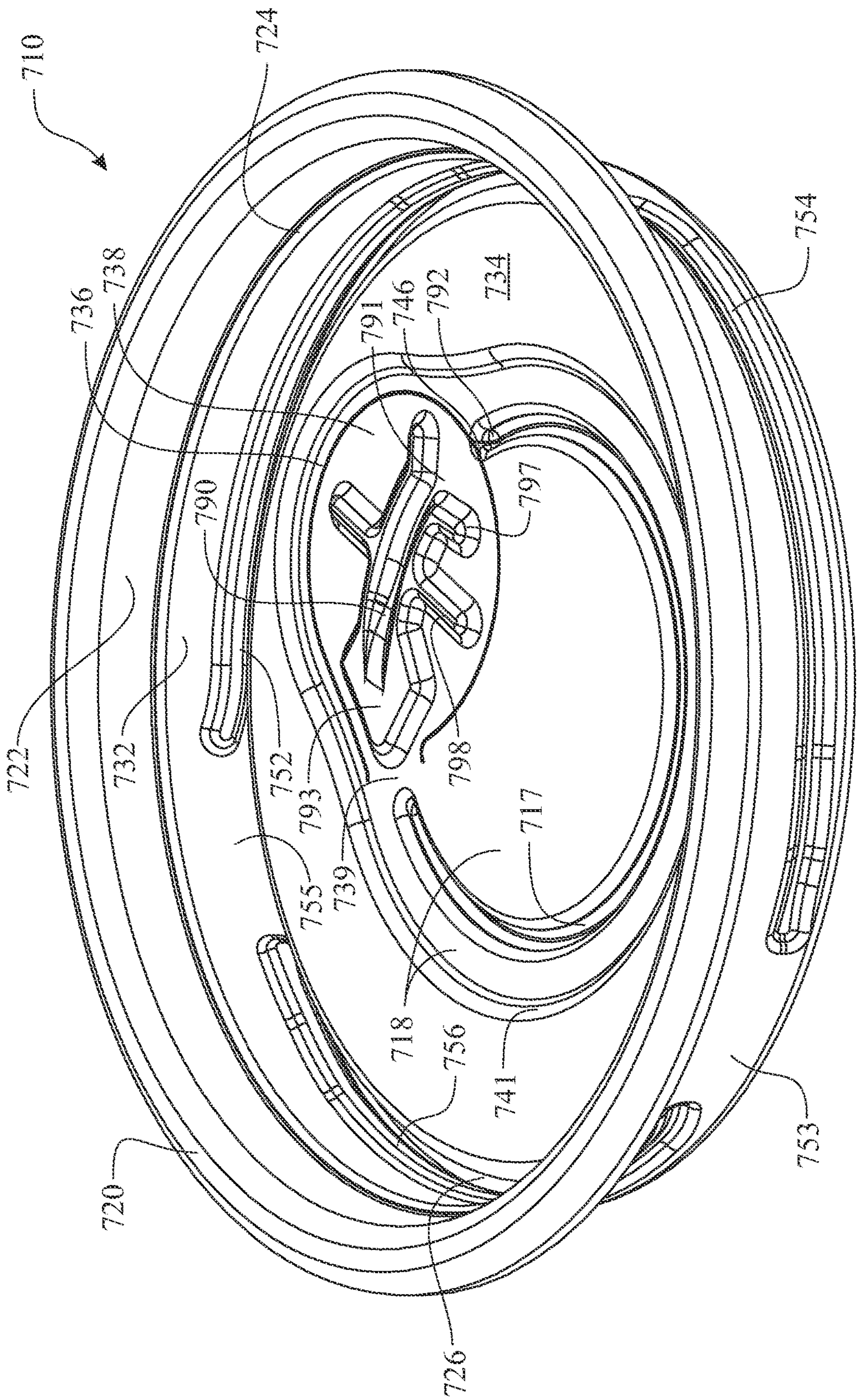
FIG. 91 presents a top isometric view introducing a container lid that is a variant to the container lid originally introduced in FIG. 42, wherein the variant employs a modified pathway of the score line.

The resealable container 500 can include features enabling nesting between assemblies 500, as shown in FIG. 90. A container closed bottom wall 504 of the resealable container 500 includes a clearance to accommodate upward extending features, such as the pair of resealable container cap grip elements 674. Each resealable container cap grip element 674 providing a cap grip element force application surface 675. The cap grip element force application surface 675 is preferably arranged to be oriented in a radial direction for receiving a force that is applied in a tangential direction. A countersink or other feature can be formed within the container closed bottom wall 504, wherein the countersink is shaped and sized to nest within an interior of the container body and lid assembly seam 509 of the seaming chuck tool 600.

Figure 44:
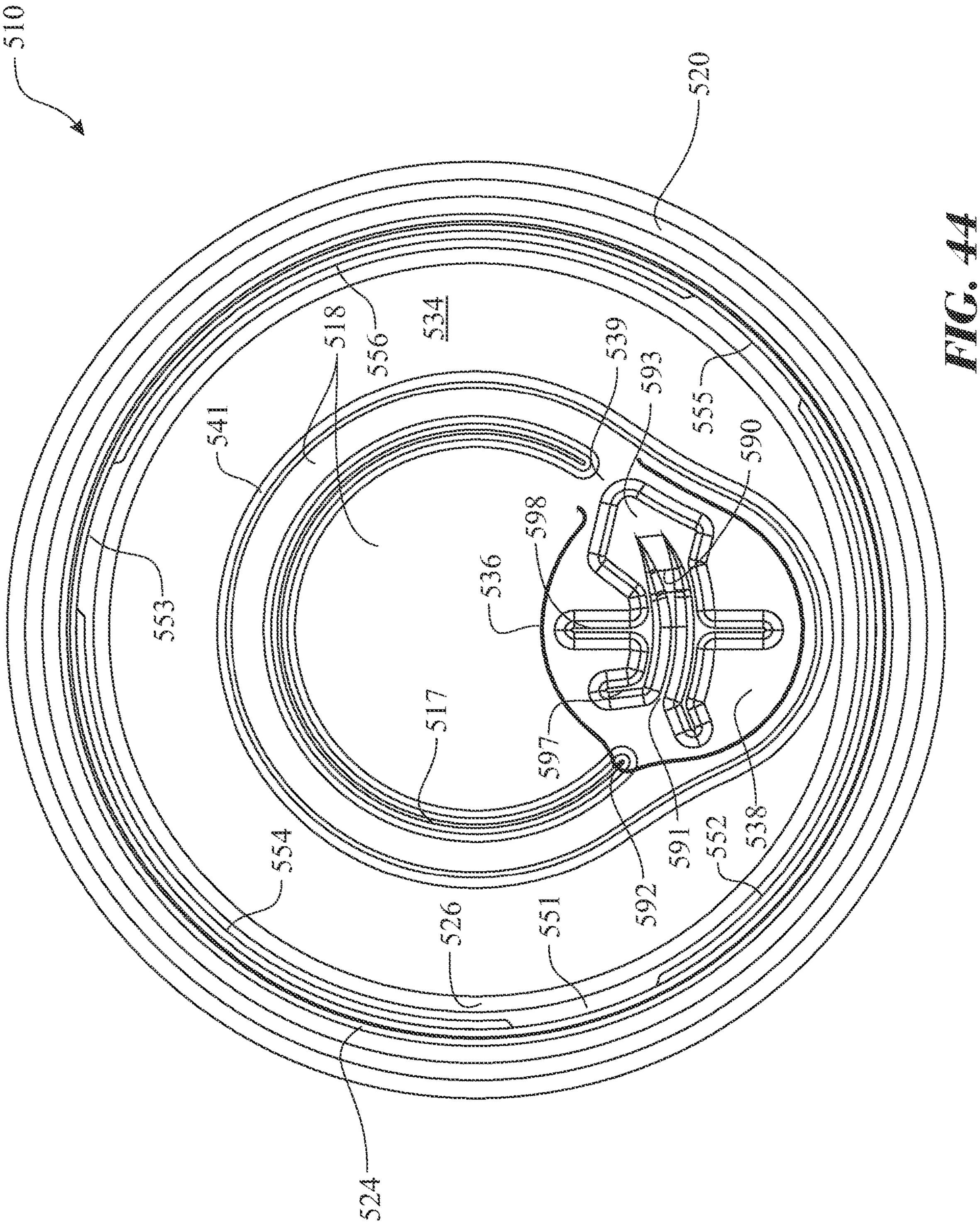
FIG. 44 presents a top plan view of the container lid introduced in FIG. 42.
Figure 92:
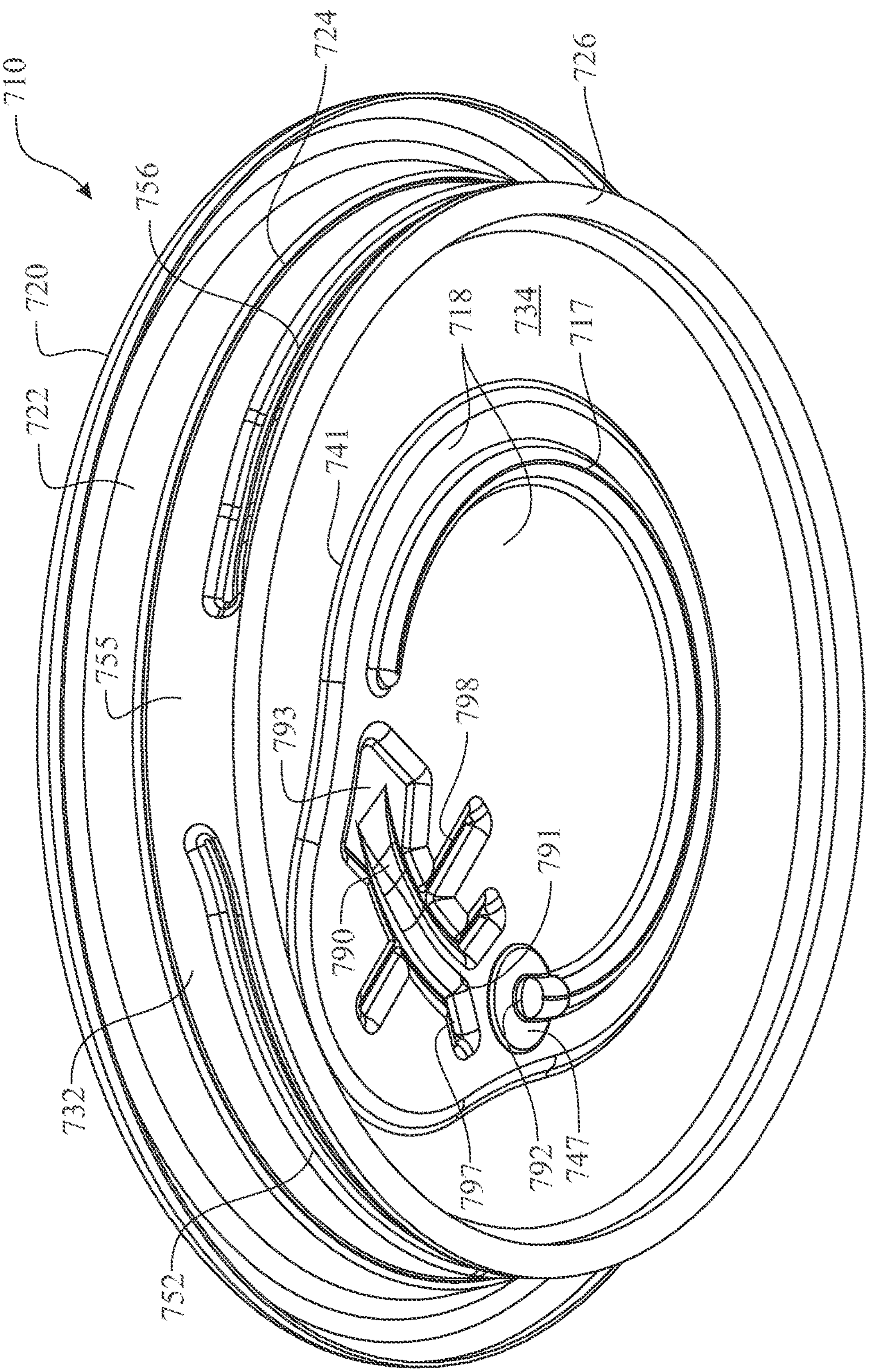
FIG. 92 presents a bottom isometric view of the container lid originally introduced in FIG. 91, the illustration introducing a sealant material disposed on an underside of the bottom wall, the sealant material being located opposite a fracture initiation point of the score line.
Figure 93:
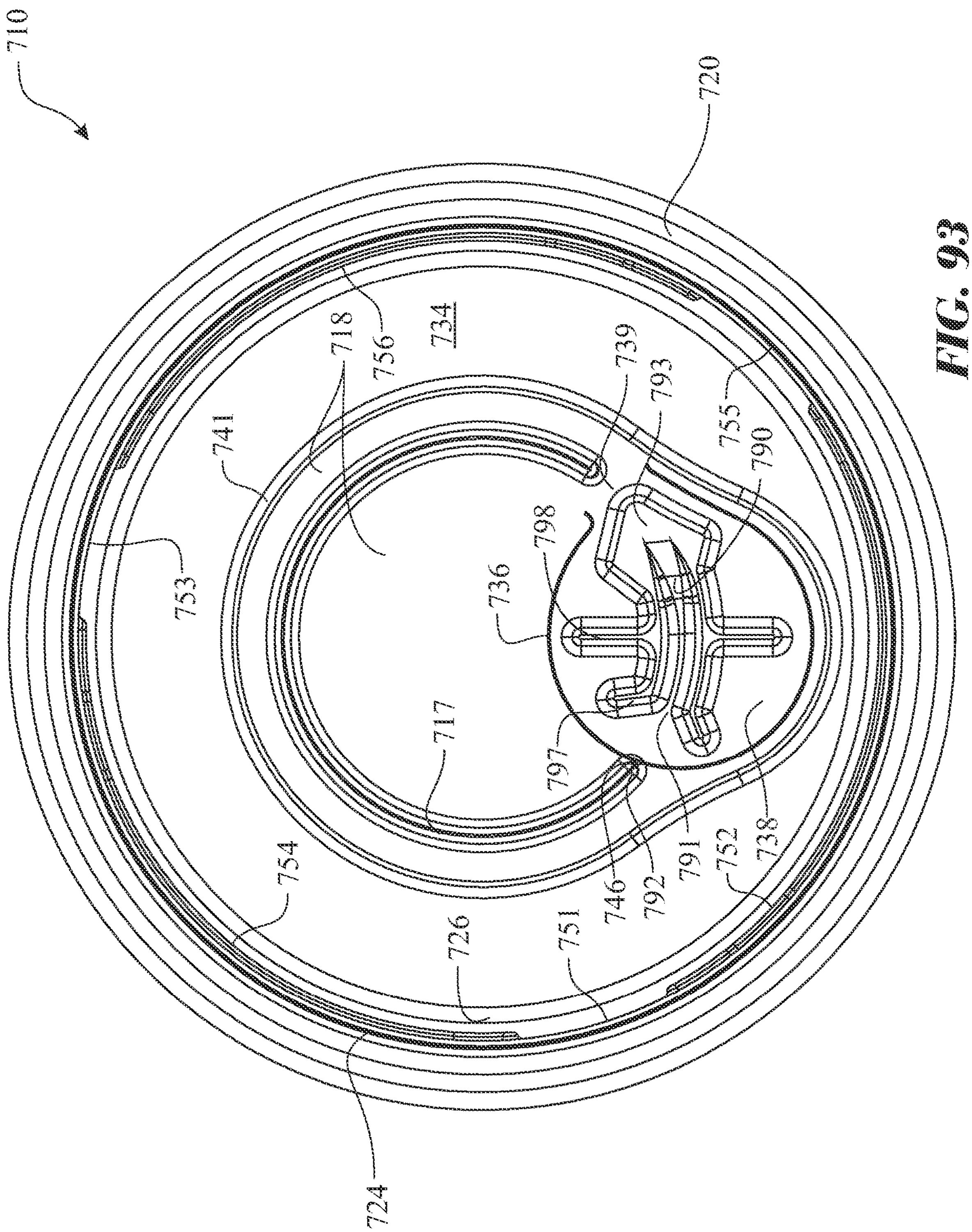
FIG. 93 presents a top plan view of the container lid originally introduced in FIG. 91.
Figure 94:
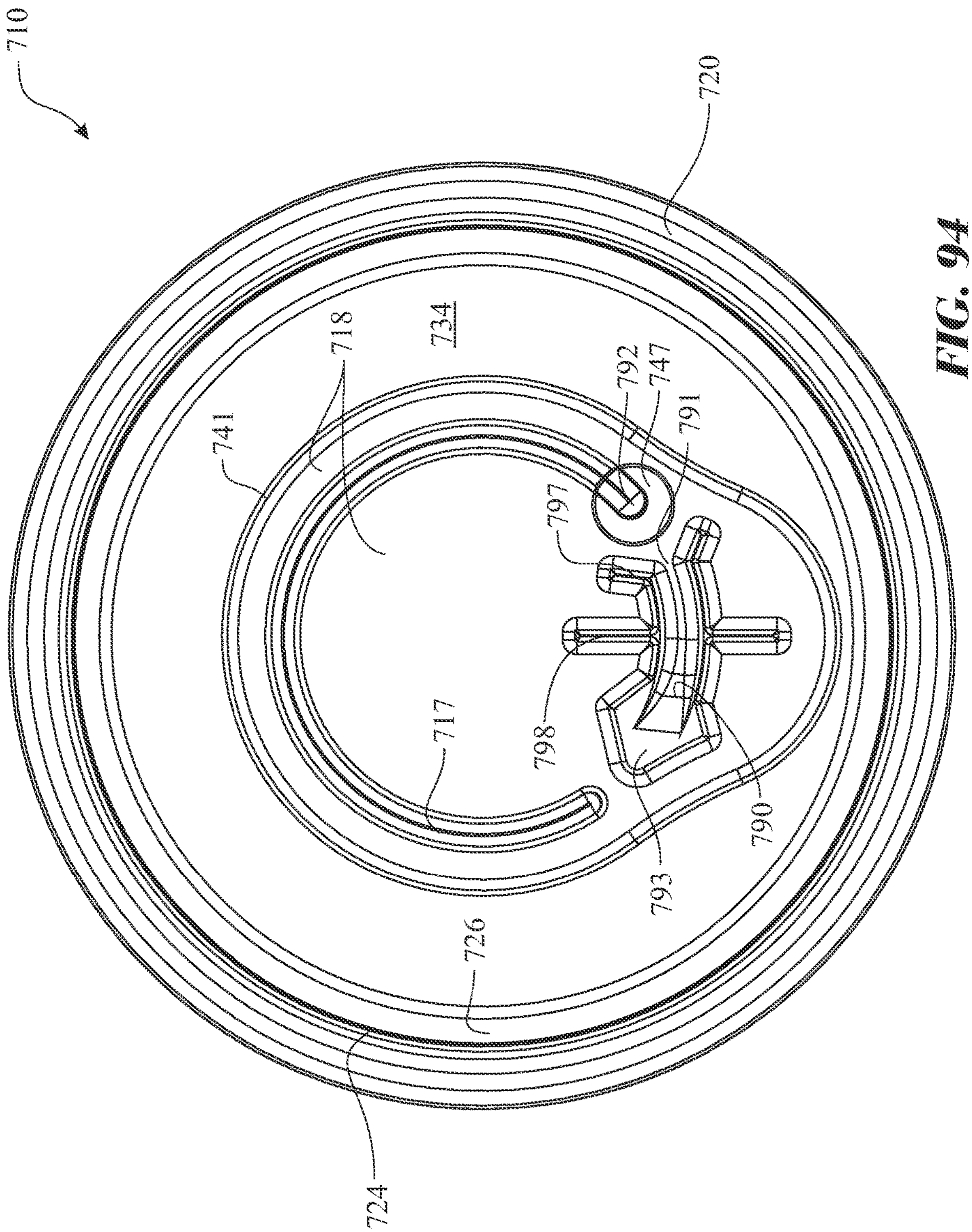
FIG. 94 presents a bottom plan view of the container lid originally introduced in FIG. 91.
Figure 95:
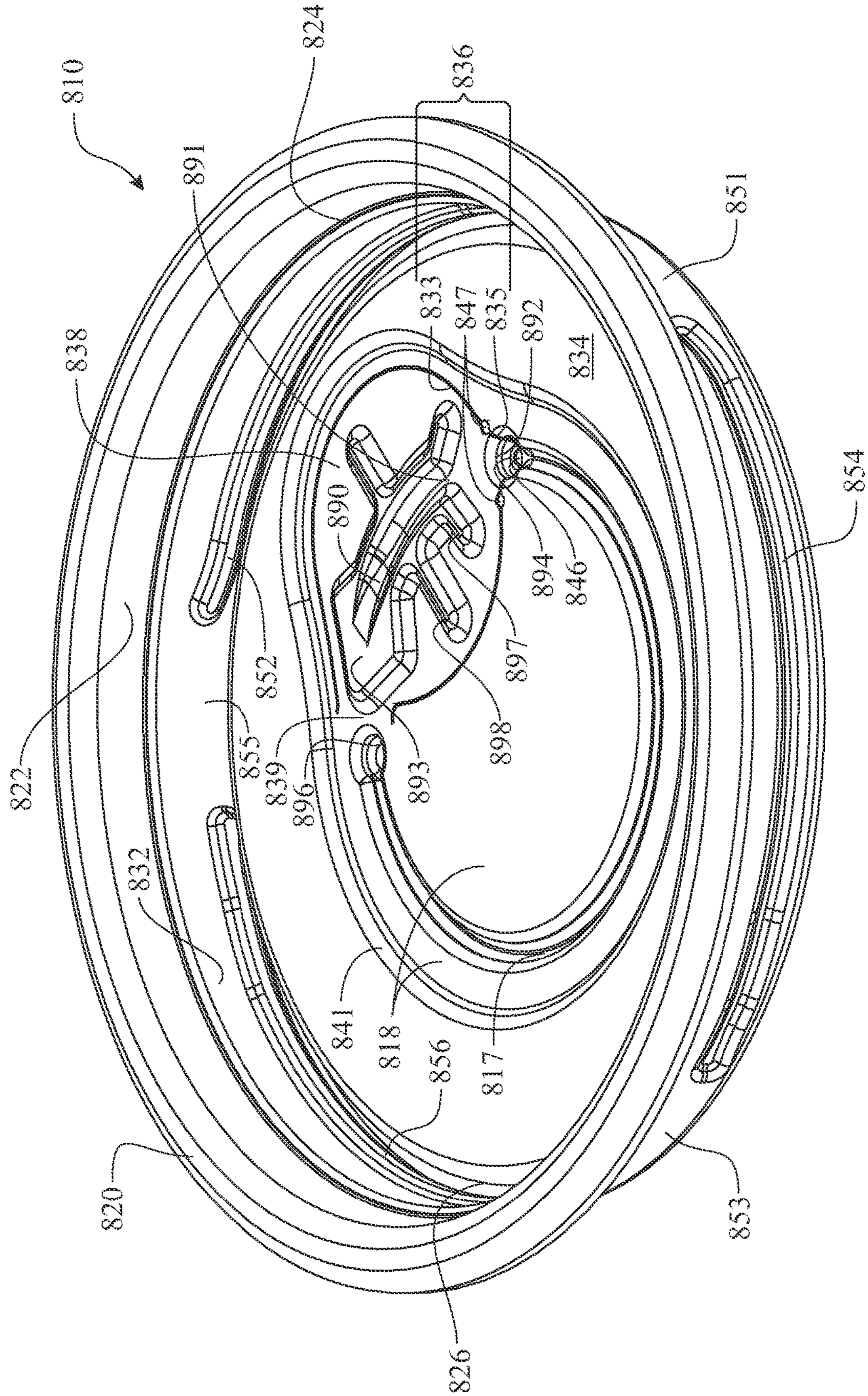
FIG. 95 presents a top isometric view introducing a container lid that is a variant to the container lid originally introduced in FIG. 42, wherein the variant employs locating features for registration during a modified process for forming the score line.

Such as the resealable container cap 560 can include variations, the resealable container lid 510 is also open to variations in the design. For example, a resealable container lid 710, shown in FIGS. 91 through 94, introduces a variation in the layout of the cap receiving socket bottom panel circular score line 736 compared to the layout of the cap receiving socket bottom panel circular score line 536 of the resealable container lid 510. The resealable container lid 710 includes features that are similar to those of the resealable container lid 510. Like features of the resealable container lid 710 and the resealable container lid 510 are numbered the same except preceded by the numeral '7'. In the resealable container lid 510, as best shown in FIG. 44, the cap receiving socket bottom panel circular score line 536 is routed through each of the opposing sidewalls of the incisor pathway channel 517 and across a bottom surface of the incisor pathway channel 517. Conversely, the cap receiving socket bottom panel circular score line 736 is routed passing across an upper tangential edge of the associated end (identified as an incisor channel to tear panel surface transition 792) of the incisor pathway channel 717, as best shown in FIG. 93. The score line fracture thinned initiation region 746 would be formed extending inward from an exterior or exposed surface of the resealable container lid upper surface reinforcement formation 718, down an end wall on the incisor pathway channel 717 (essentially, the incisor channel to tear panel surface transition 792). A score line thinned region seal reinforcement 747 is preferably applied to an opposite or interior surface of the resealable container lid upper surface reinforcement formation 718, more specifically, about the region of the score line fracture thinned initiation region 746 routed passing across an upper tangential edge of the associated end (incisor channel to tear panel surface transition 792) of the incisor pathway channel 717, as shown in the underside views presented in FIGS. 92 and 94. The score line thinned region seal reinforcement 747 can be of the same material used to form a cap sealing ring 565 to optimize fabrication steps and costs. The score line thinned region seal reinforcement 747 retains a seal should the score line fracture thinned initiation region 746 fracture prematurely. Alternatively, the score line fracture thinned initiation region 746 can be configured to cut completely though the resealable container lid 510 material substrate, relying on the score line thinned region seal reinforcement 747 to maintain a sealed container.

Figure 96:
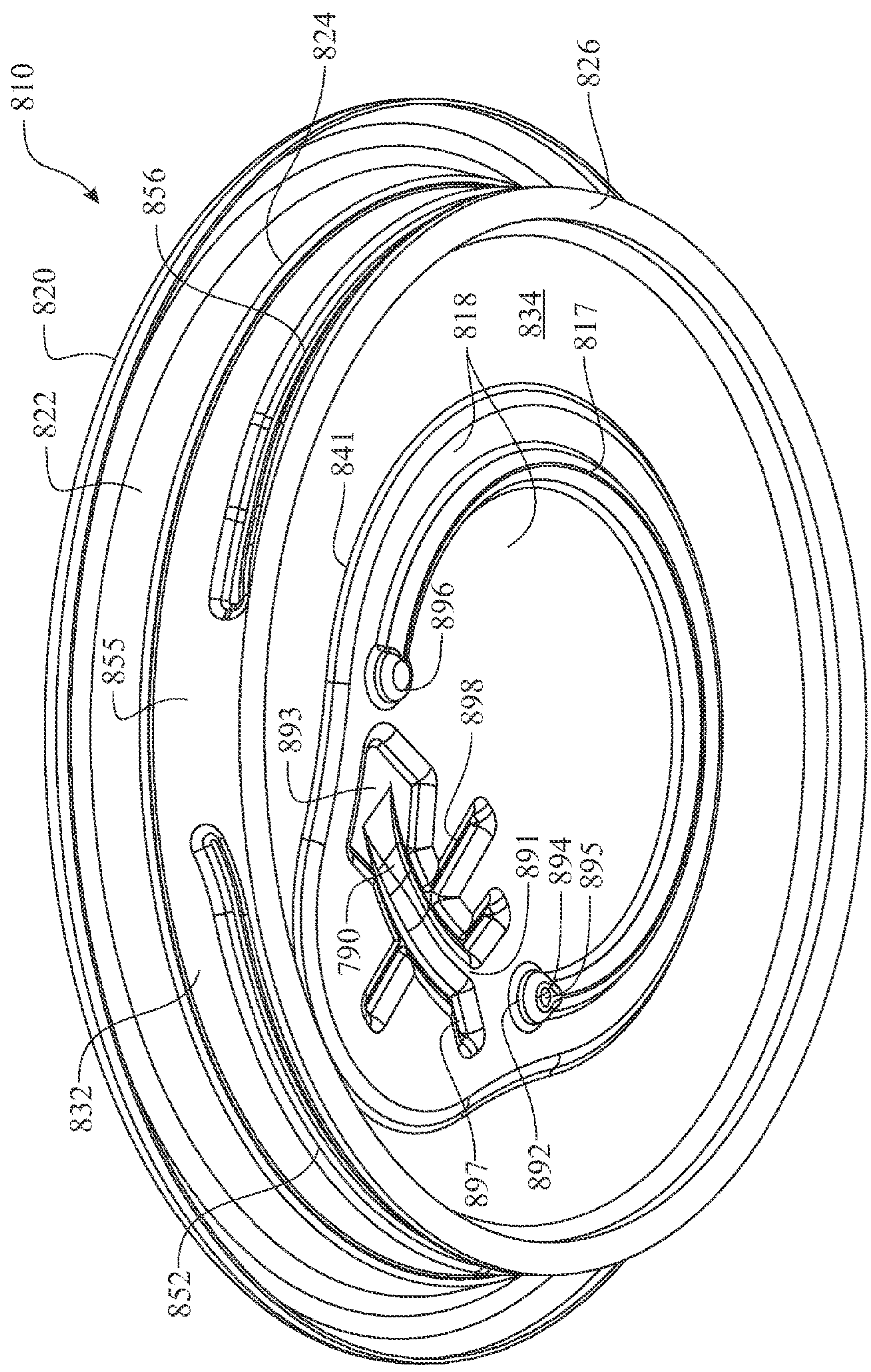
FIG. 96 presents a bottom isometric view of the container lid originally introduced in FIG. 95, the illustration introducing a domed metal forming feature located opposite the fracture initiation point of the score line.

The cap receiving socket bottom panel circular score line 536, 736 is commonly created using a standard single step forming process. A resealable container lid 810, shown in FIGS. 95 through 105, introduces a multi-step process for forming a cap receiving socket bottom panel circular score line 836. The resealable container lid 810 includes features that are similar to those of the resealable container lid 510, 710. Like features of the resealable container lid 810 and the resealable container lid 510, 710 are numbered the same except preceded by the numeral '8', unless otherwise stated. The multi-step process for forming the cap receiving socket bottom panel circular score line 836 employs a first incisor pathway index formation 894 and an second incisor pathway index formation 896. The first incisor pathway index formation 894 is located on a first end of an incisor pathway channel 817, wherein the first end includes an incisor channel to tear panel surface transition 892. The second incisor pathway index formation 896 is formed at a second end of the incisor pathway channel 817, which is preferably located proximate a tear panel hinge 839. The first incisor pathway index formation 894 and the second incisor pathway index formation 896 are formed using a more repeatable and accurate forming process than the process forming the ends of the incisor pathway channel 817. Additionally, the geometric shape of the indexing features 894, 896 are such to provide more accurate indexing registration than the shape of the ends of the incisor pathway channel incisor pathway channel 817, and to provide a more accurate geometric shape to form the cap receiving socket bottom panel circular score line 836 and respective features. A lid bottom score line thinned formation region 895, introduced in FIG. 96, can be formed in an opposite or interior surface of the first incisor pathway index formation 894, more specifically about the region of the score line fracture thinned initiation region 846 of the cap receiving socket bottom panel circular score line 836.

Figure 97:
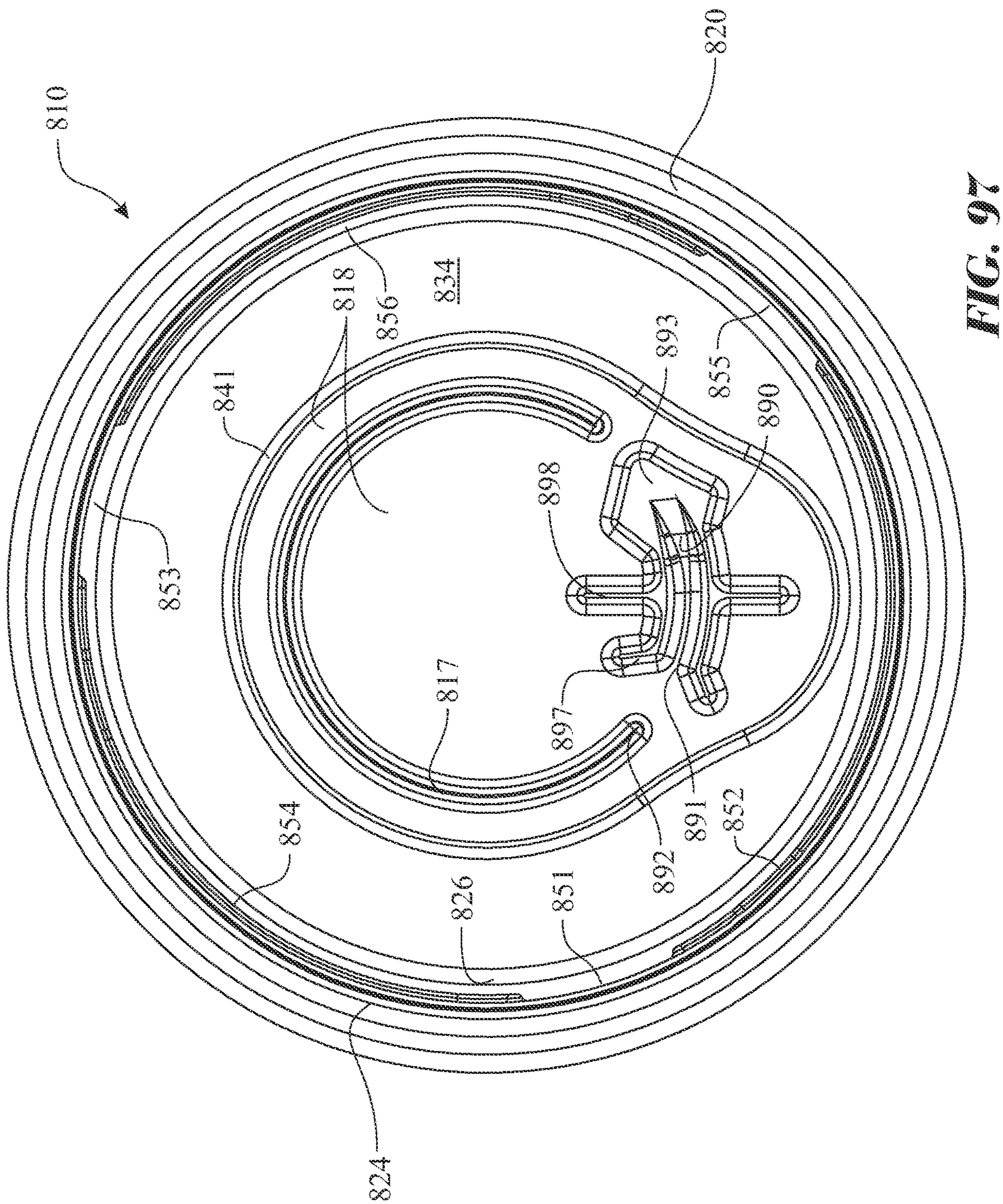
FIG. 97 presents a top plan view of the container lid originally introduced in FIG. 95, the illustration presenting a first step of the modified process for forming the score line.
Figure 98:
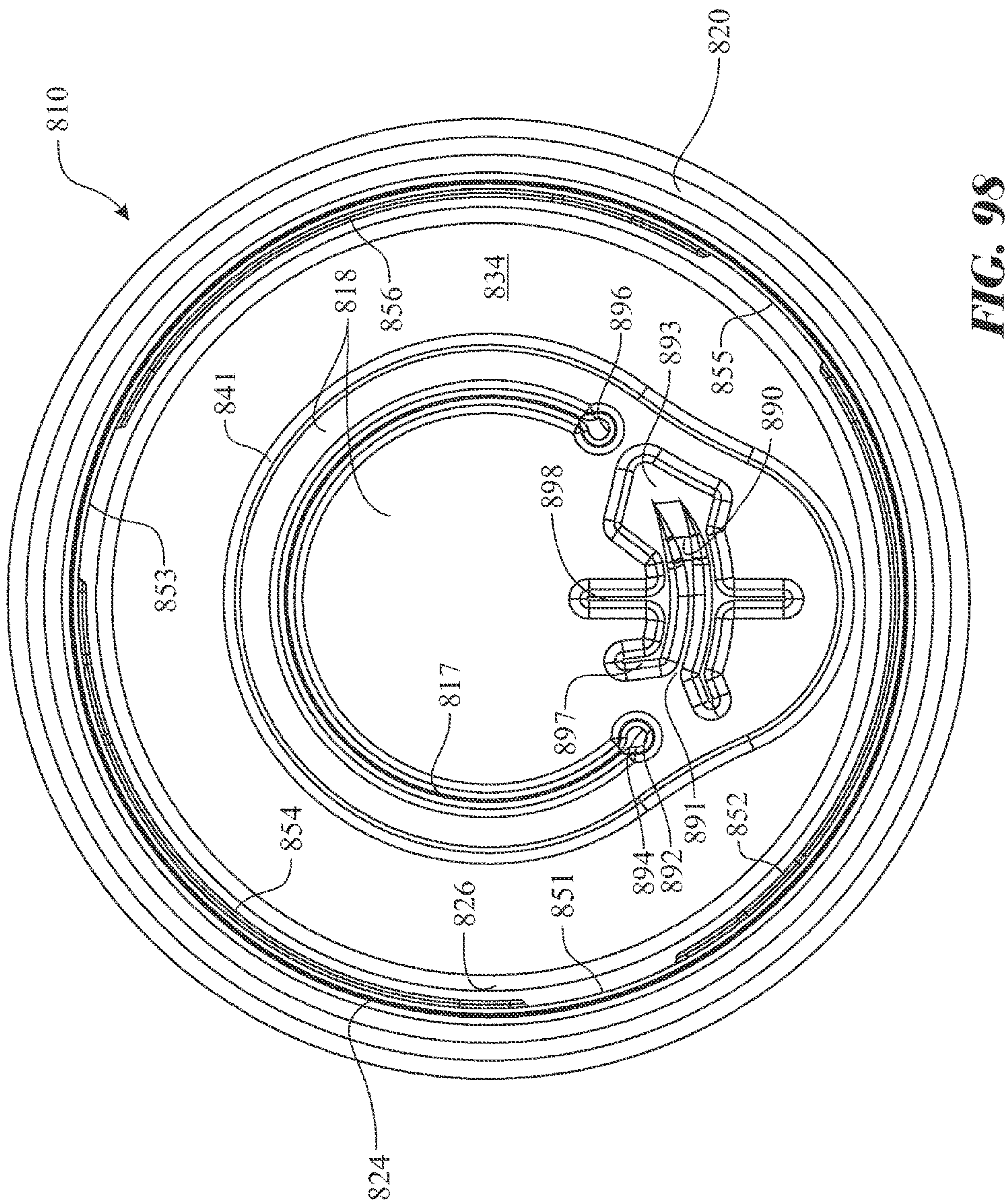
FIG. 98 presents a top plan view of the container lid originally introduced in FIG. 95, the illustration presenting a second step of the modified process for forming the score line, more specifically introducing the locating features for registration during a modified process for forming the score line.

The multi-step process for forming a cap receiving socket bottom panel circular score line 836 is demonstrated in a series of illustrations presented in FIGS. 97 through 105. Since the scoring process thins the material of the resealable container lid 810, the majority of the features of the resealable container lid 810 are initially created as shown in FIG. 97. This includes the incisor pathway channel 817. The indexing features 894, 896 are subsequently formed at the respective ends of the incisor pathway channel 817, as shown in FIG. 98, using a lid alignment feature anvil 910A and a lid alignment feature punch tool 960A, introduced in FIG. 101. The lid alignment feature punch tool 960A includes a first incisor pathway index formation punch 994 and a second incisor pathway index formation punch 996 extending downward from a lid alignment feature punch tool bottom surface 964 of a lid alignment feature punch tool body 962. The lid alignment feature anvil 910A includes features formed within a cap receiving socket bottom wall anvil 934 of a cap receiving socket cylindrical anvil body 932 to adequately support the resealable container lid 810. A resealable container lid upper surface reinforcement formation anvil 918 is recessed into the cap receiving socket bottom wall anvil 934 to accommodate the resealable container lid upper surface reinforcement formation 818. A socket bottom wall to surface reinforcement formation transition anvil 941 provides a transition between the cap receiving socket bottom wall anvil 934 and the resealable container lid upper surface reinforcement formation anvil 918. An incisor pathway channel anvil 917 is recessed into the resealable container lid upper surface reinforcement formation anvil 918 to accommodate the incisor pathway channel 817. The shapes of the resealable container lid upper surface reinforcement formation anvil 918 and the incisor pathway channel anvil 917 are used as initial registration or alignment features between the partially completed resealable container lid 810 and the lid alignment feature anvil 910A. A first incisor pathway index formation anvil 993 and a second incisor pathway index formation anvil 997 are formed at ends of the incisor pathway channel anvil 917 for receiving material being deformed by the first incisor pathway index formation punch 994 and the second incisor pathway index formation punch 996, respectively. A gap between the first incisor pathway index formation punch 994 and the first incisor pathway index formation anvil 993 is substantially the same as a thickness of the material of the first incisor pathway index formation 894. Similarly, a gap between the second incisor pathway index formation punch 996 and the second incisor pathway index formation anvil 997 is substantially the same as a thickness of the material of the second incisor pathway index formation 896. The first incisor pathway index formation punch 994 and the second incisor pathway index formation punch 996 are used to maintain alignment between the strikes of the progressive stations of the first score line segment punch tool 960B and the second score line segment punch tool 960C.

Figure 99:
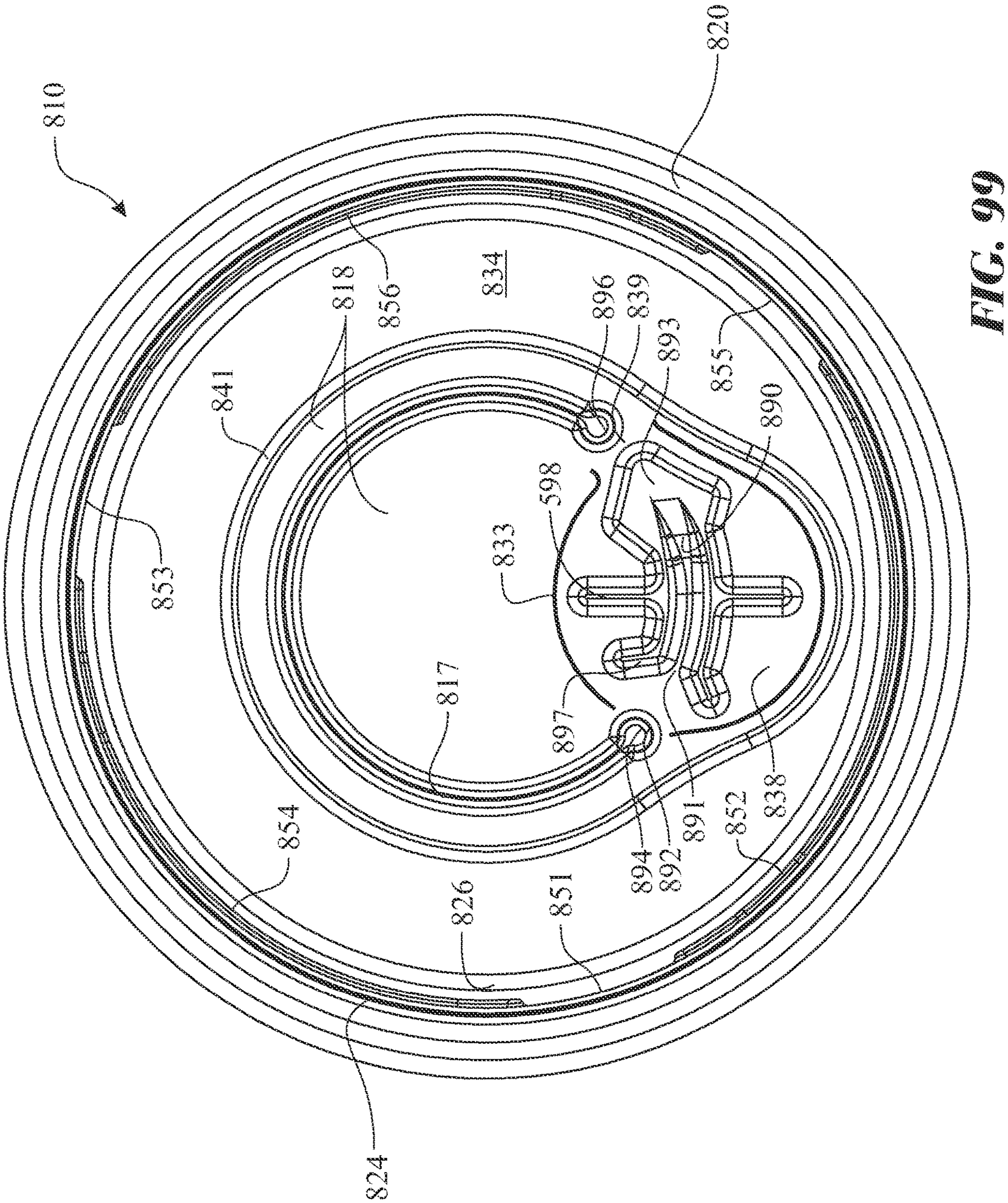
FIG. 99 presents a top plan view of the container lid originally introduced in FIG. 95, the illustration presenting a third step of the modified process for forming the score line, more specifically introducing a first partial score line forming procedure.

A first score line segment punch tool 960B is similar to the lid alignment feature punch tool 960A, with the introduction of a first score line formation segment punches 933. The first score line formation segment punches 933 is divided into two segments, each segment extends between a respective first score line formation segment punch ends ready for overlap 938 and tear panel hinge formation punch area 939. The resealable container lid 810 would be seated within a subsequent lid alignment feature anvil 910A in the manufacturing process, employing the registration features 993, 997 on the lid alignment feature anvil 910A and respective registration features 894, 896 on the resealable container lid 810 to ensure accurate alignment. The first score line segment punch tool 960B would then be employed to create in at least one first score line formation segments 833 as shown in FIG. 99.

Figure 100:
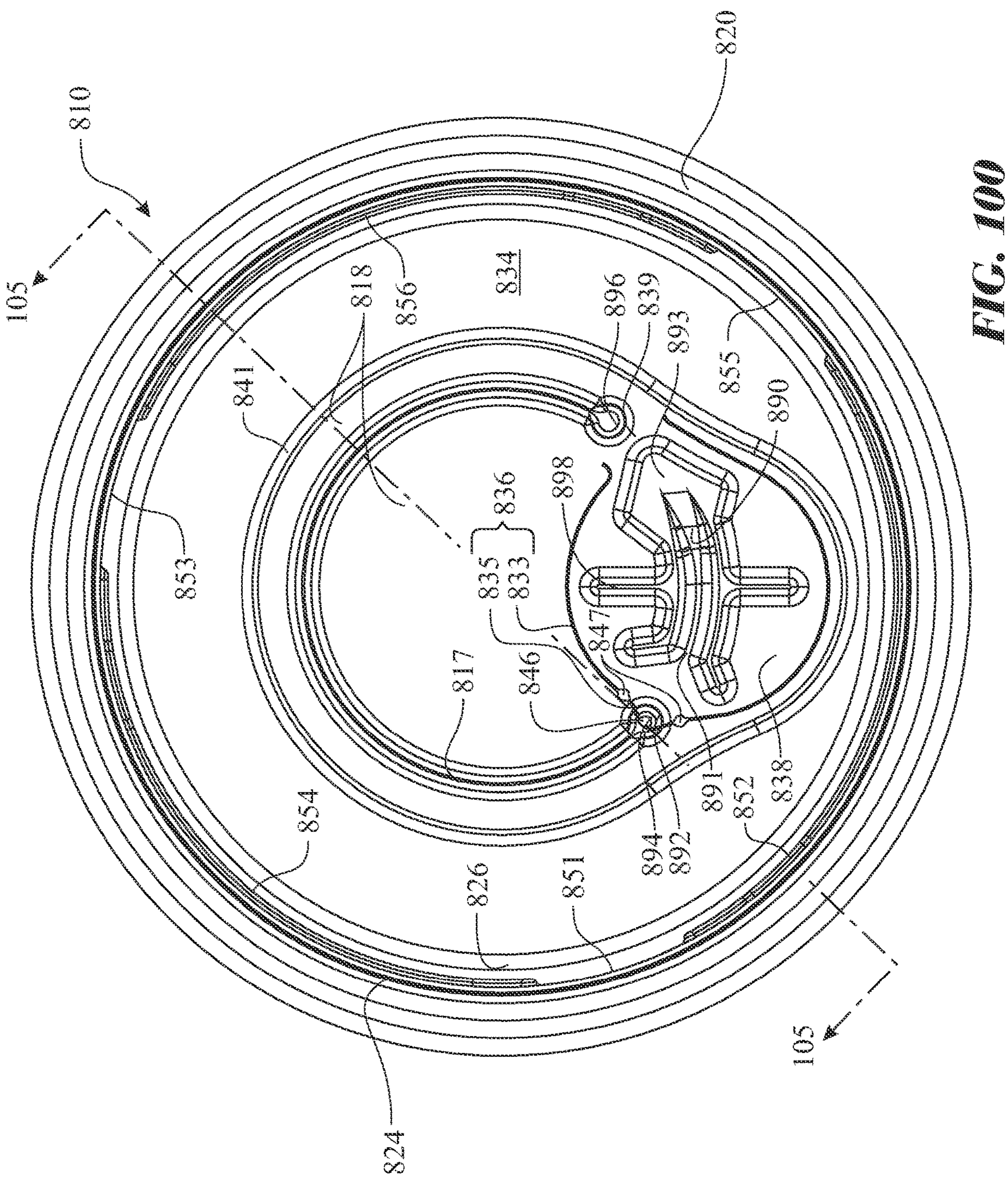
FIG. 100 presents a top plan view of the container lid originally introduced in FIG. 95, the illustration presenting a fourth step of the modified process for forming the score line, more specifically introducing a second partial score line forming procedure.
Figure 101:
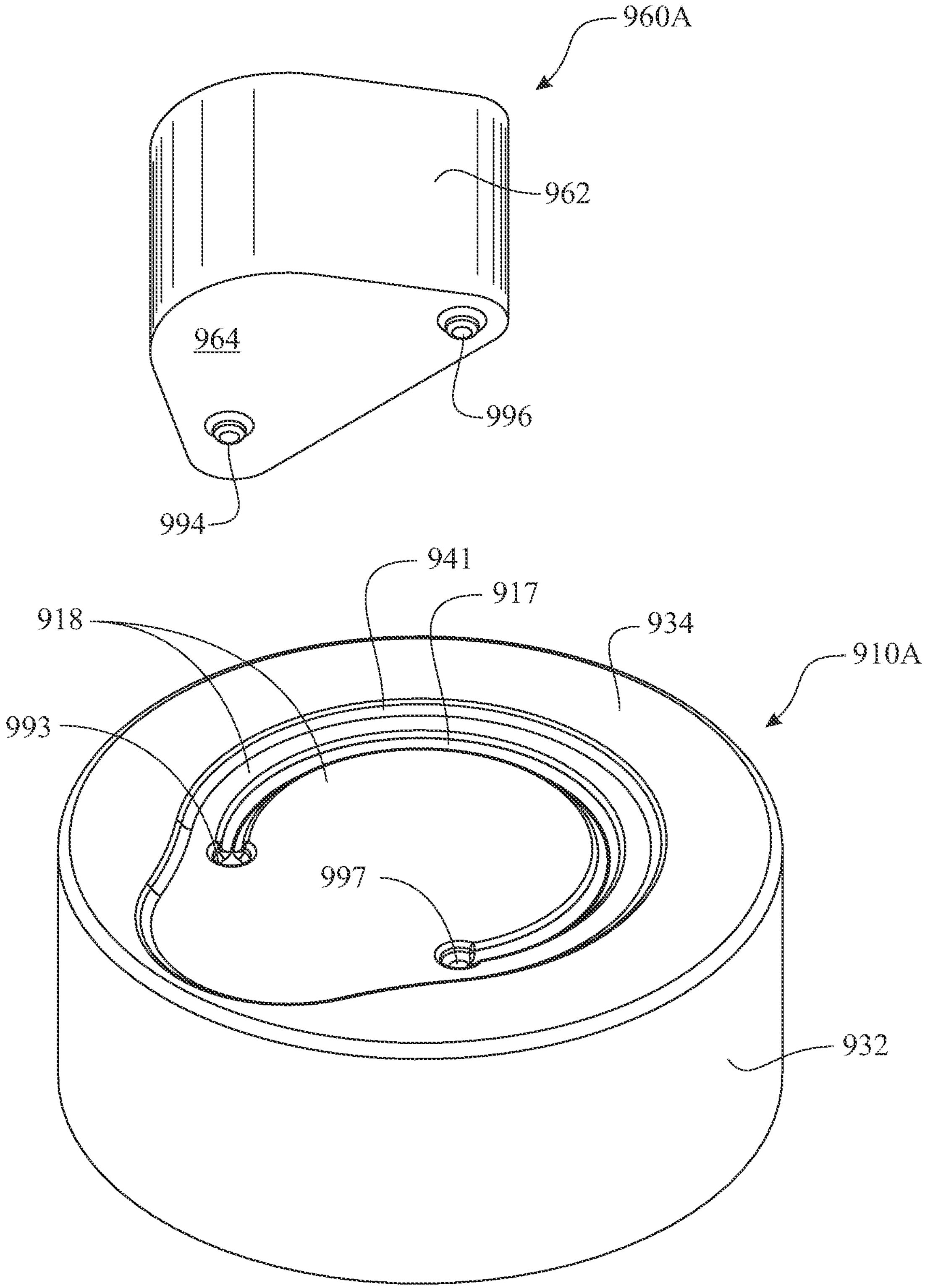
FIG. 101 presents a perspective view of two isometric elevation illustrations of a tooling punch and a corresponding tooling anvil for forming the locating elements in the container lid bottom wall.
Figure 102:
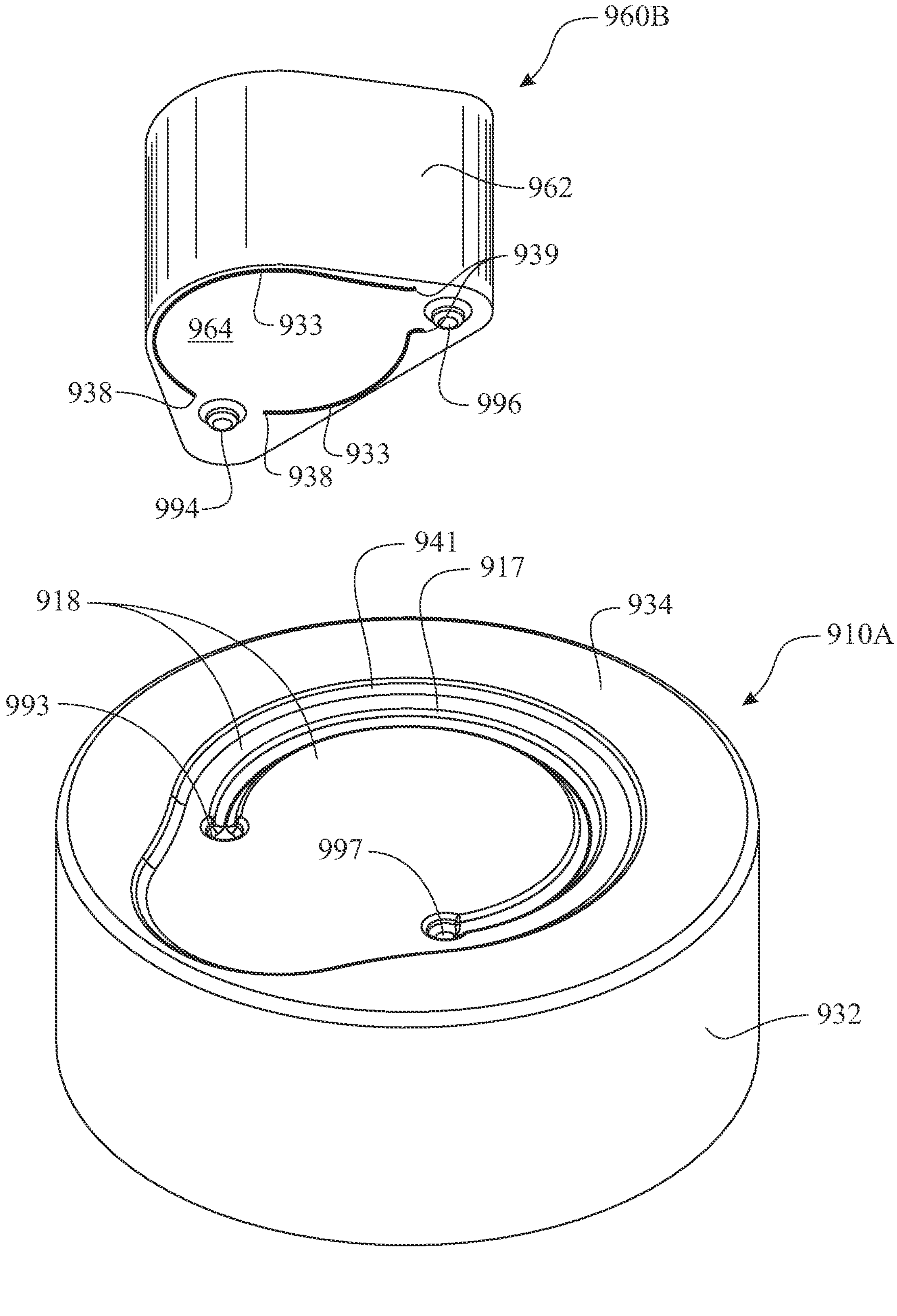
FIG. 102 presents a perspective view of the tooling anvil as originally introduced in FIG. 101, and further introducing a tooling punch including a score knife for forming a first segment of the score line in the container lid bottom wall, the tooling employing the locating elements for alignment.
Figure 103:
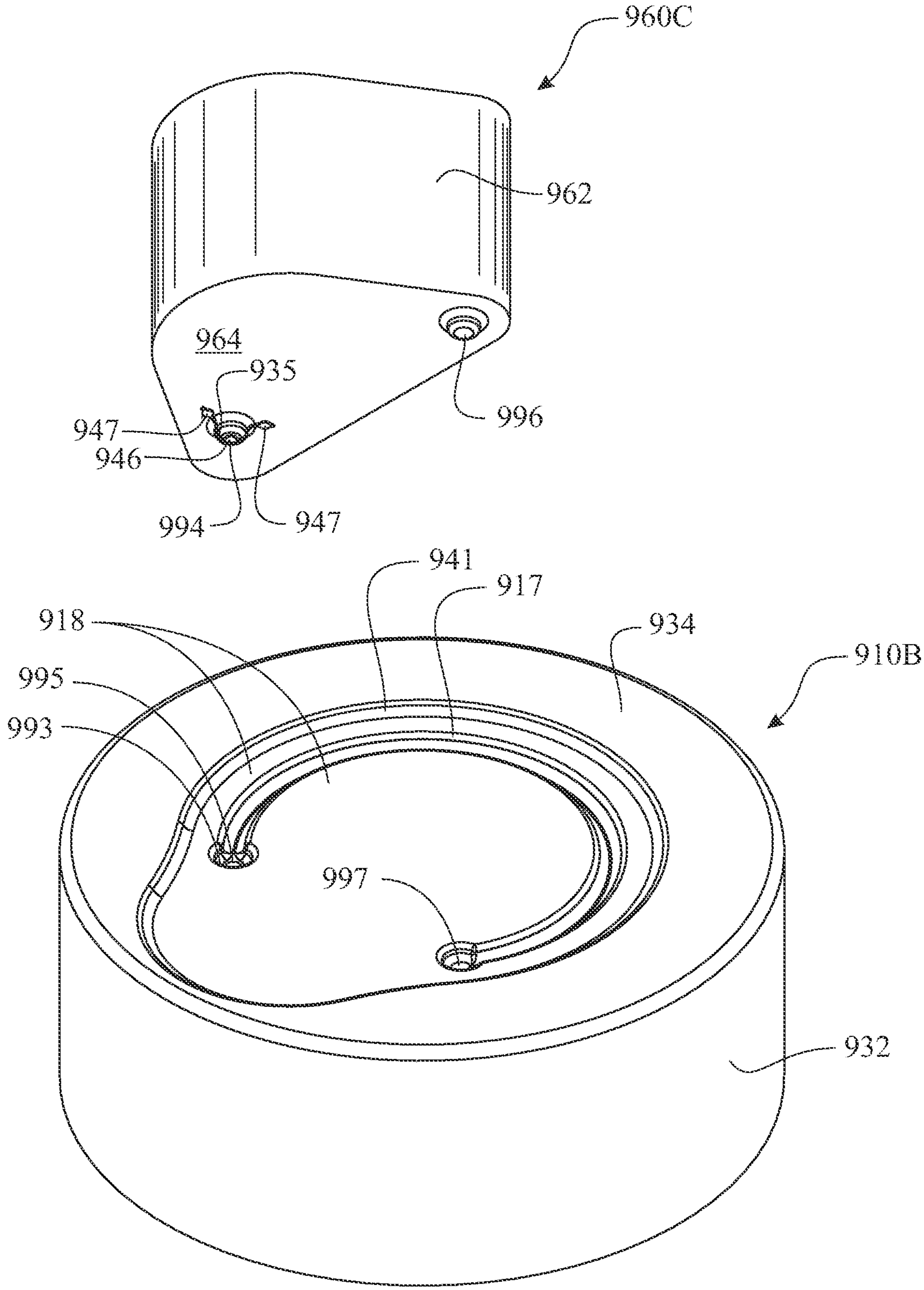
FIG. 103 presents a perspective view of the tooling anvil as originally introduced in FIG. 101, and further introducing a tooling punch including a score knife for forming a second segment of the score line in the container lid bottom wall, the tooling employing the locating elements for alignment.

A second score line segment punch tool 960C is similar to the lid alignment feature punch tool 960A, with the introduction of a score line fracture thinned initiation region punch 946 extending between two score line segment overlapping region punches 947. Each score line segment overlapping region punch 947 is located to align or overlap with the respective location of the first score line formation segment punch ends ready for overlap 938 of the lid alignment feature with lid bottom score line thinned formation anvil 910B. Each score line segment overlapping region punch 947 includes a second score line formation segment punch 935, which forms the actual second score segment. This creates one continuous score line 836. The resealable container lid 810 would remain seated within the lid bottom score line thinned formation anvil 910B and the second score line segment punch tool 960C would be employed to create a score line fracture thinned initiation region 846 extending between each score line segment overlapping regions 847 as shown in FIG. 100. The first incisor pathway index formation punch 994 and the second incisor pathway index formation punch 996 are used to maintain alignment between the strikes of the first score line segment punch tool 960B and the second score line segment punch tool 960C.

Figure 105:
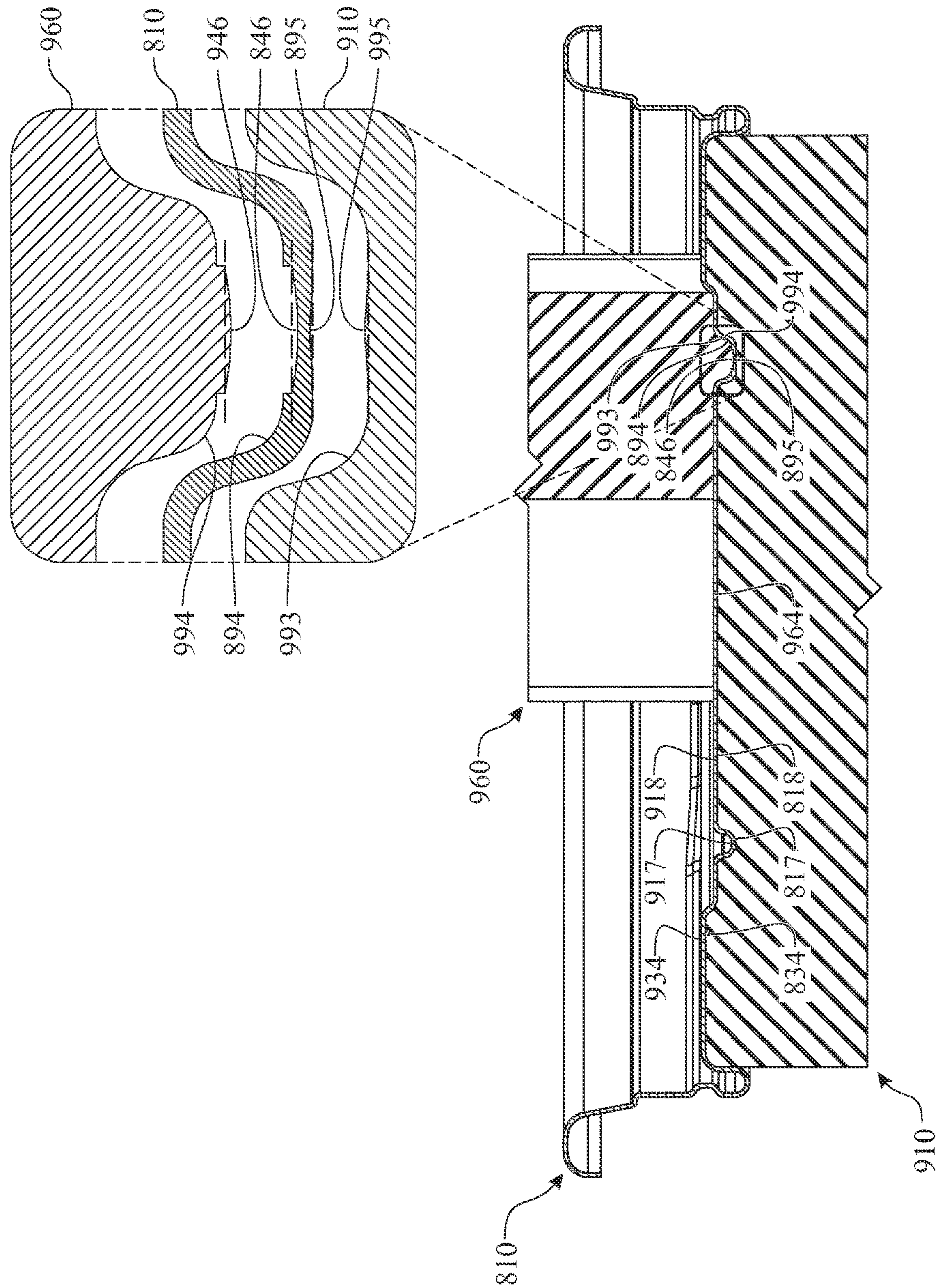
FIG. 105 presents an elevation section view detailing the forming action between the punch and the anvil when forming the score line passing through one of the two locating elements, the section orientation being referenced by section line 105-105 of FIG. 100.
Figure 106:
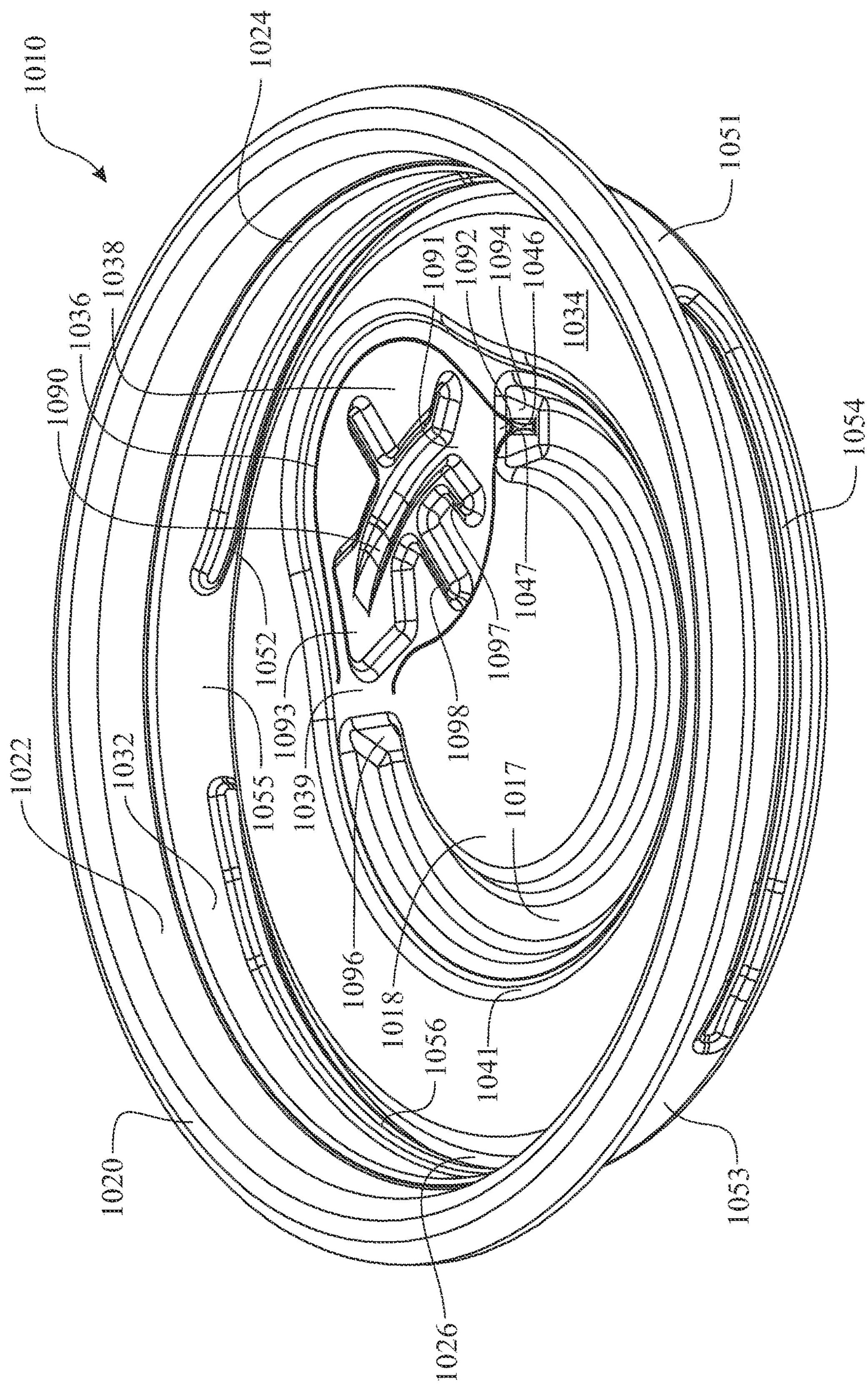
FIG. 106 presents a top isometric view introducing a variant of the container lid originally introduced in FIG. 95, wherein the variant of the container lid includes a modification to registration features and the associated score fracture initiation configuration.

The score line fracture thinned initiation region punch 946 can include a slight convex dome, as best shown in a magnified view illustrated in FIG. 105 (noting the lid alignment feature punch tool 960 and the lid bottom score line thinned formation anvil 910B are separated from the resealable container lid 810 for clarity of the features). The lid bottom score line thinned formation region anvil 995 can also include a slight convex dome, as best shown in a magnified view illustrated in FIG. 105. These convex domes 946, 995 form concave depressions within opposite sides of the first incisor pathway index formation 894, more specifically forming a score line fracture thinned initiation region 846 on an upper surface of the first incisor pathway index formation 894 and a lid bottom score line thinned formation region 895 on the opposite, lower surface of the first incisor pathway index formation 894. The convex domes of the second score line segment punch tool 960C (or the complete score line segment punch tool 960D) and the lid bottom score line thinned formation anvil 910B are provided to direct a flow of the material outward along a planar direction of the material (perpendicular to the generally vertical axis of the press action).

Figure 104:
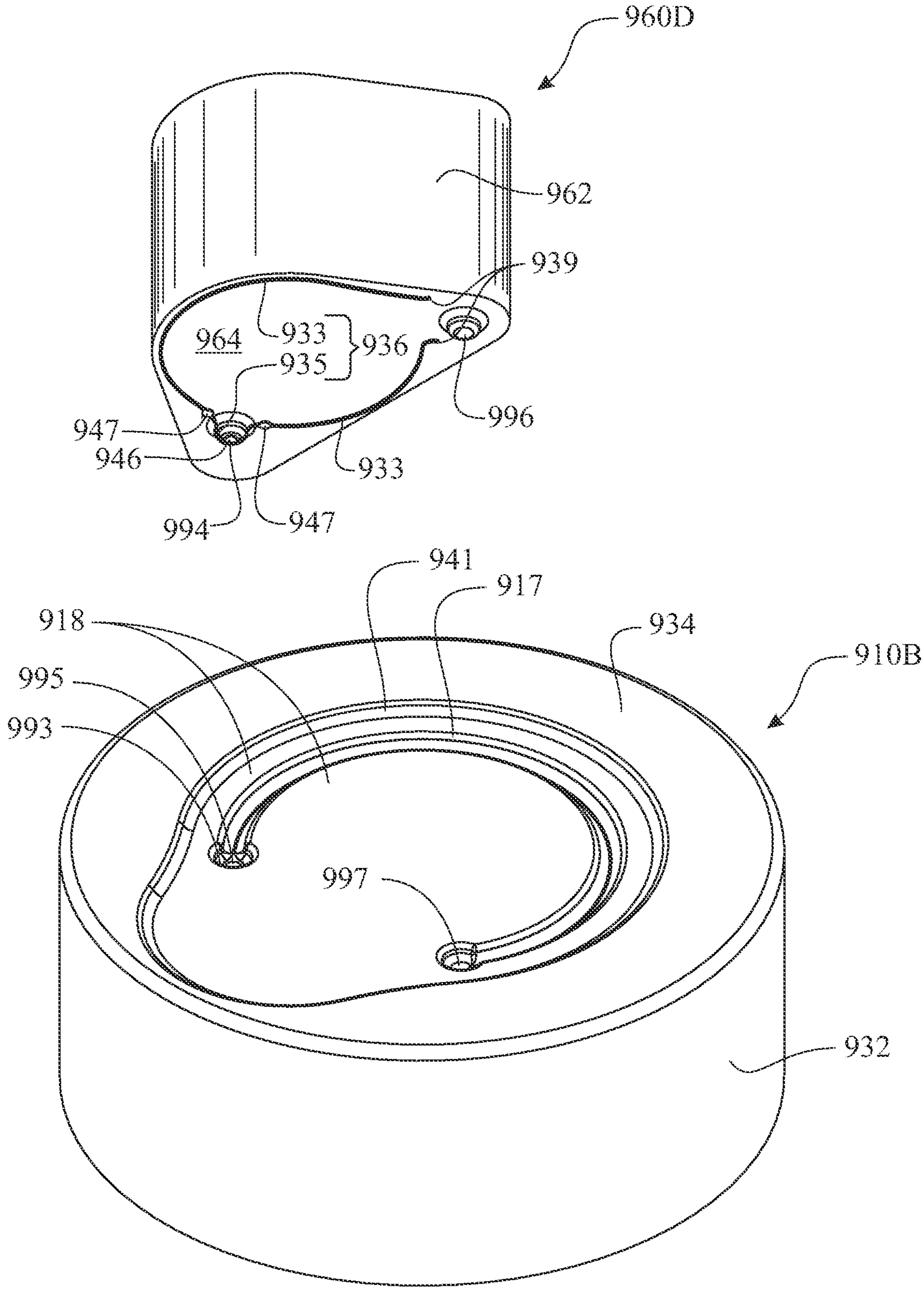
FIG. 104 presents a perspective view of the tooling anvil as originally introduced in FIG. 101, and further introducing a tooling punch including a score knife for forming a complete score line in the container lid bottom wall, the tooling employing the locating elements for alignment.

In a more common embodiment, the cap receiving socket bottom panel circular score line 836 and its respective features can be formed using a single strike punch, such as a complete score line punch tool 960D working against the lid alignment feature with lid bottom score line thinned formation anvil 910B, illustrated in FIG. 104. The cap receiving socket bottom panel circular score line 836 would be formed by a cap receiving socket bottom panel circular score line punch 936, wherein the cap receiving socket bottom panel circular score line punch 936 is, collectively, a combination of the first score line formation segment punches 933 and the second score line formation segment punches 935.

Figure 107:
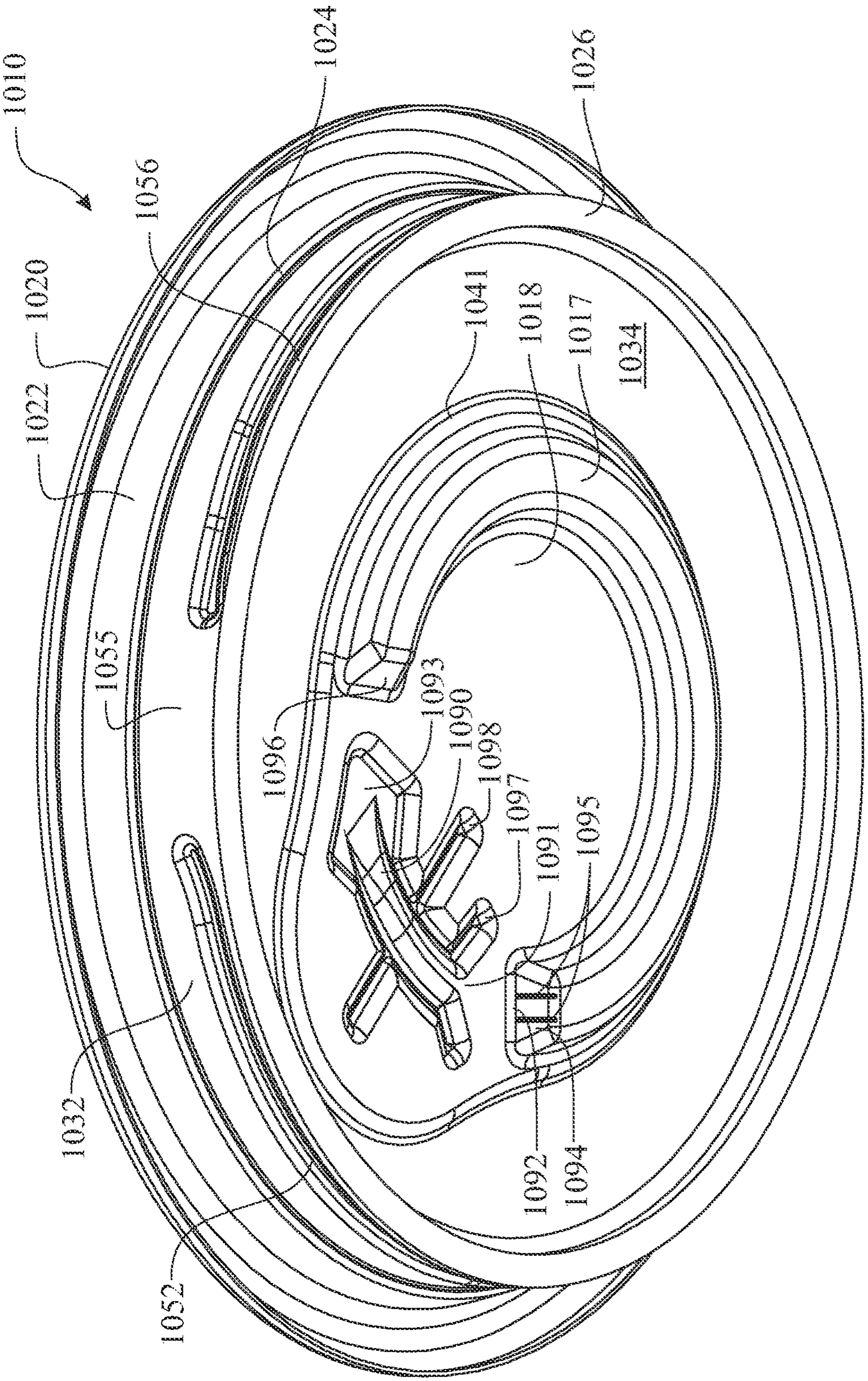
FIG. 107 presents a bottom isometric view of the container lid originally introduced in FIG. 106, the illustration introducing score lines employed to create a crease used to define the hinge.
Figure 108:
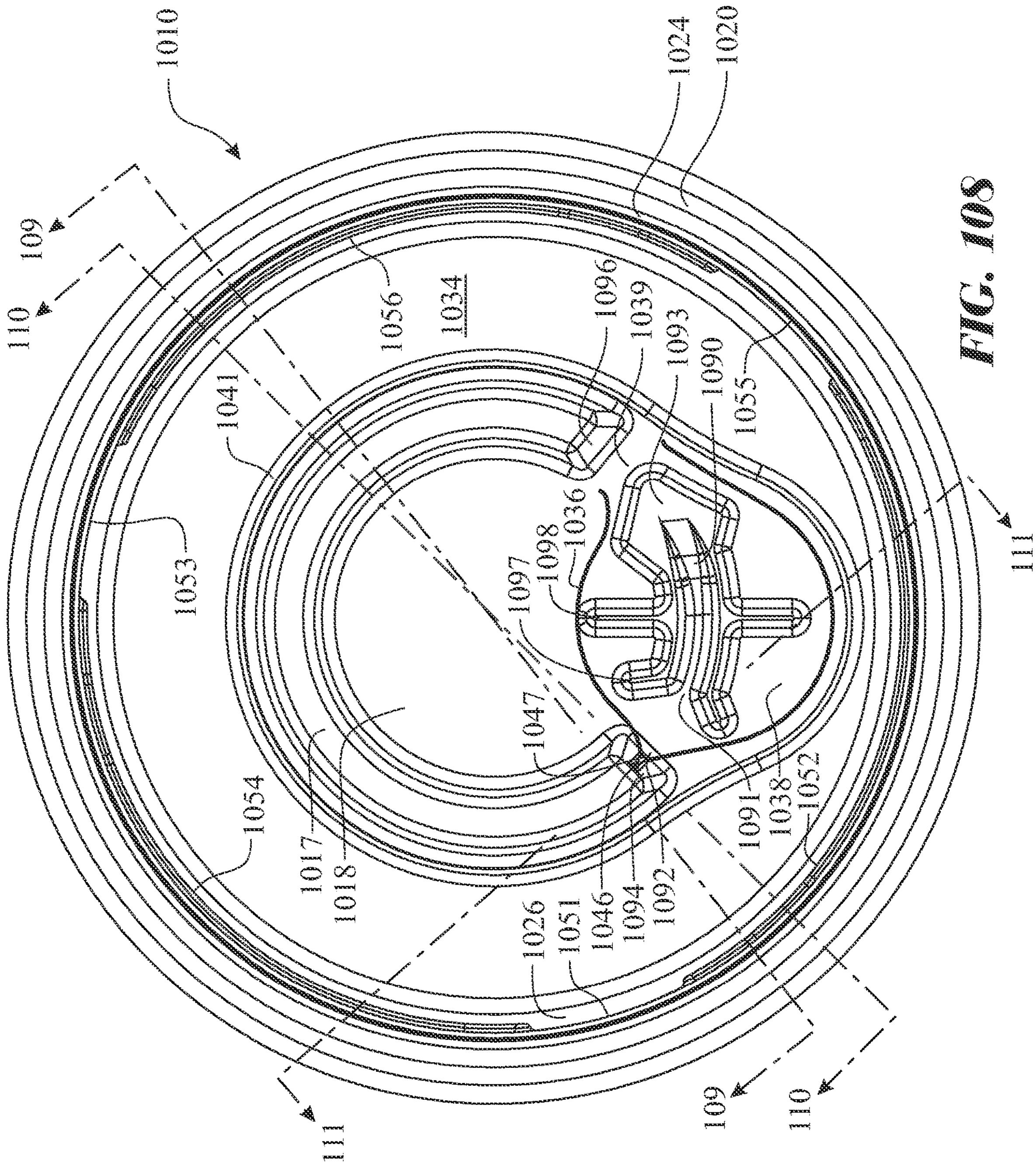
FIG. 108 presents a top plan view of the container lid originally introduced in FIG. 106.
Figure 109:
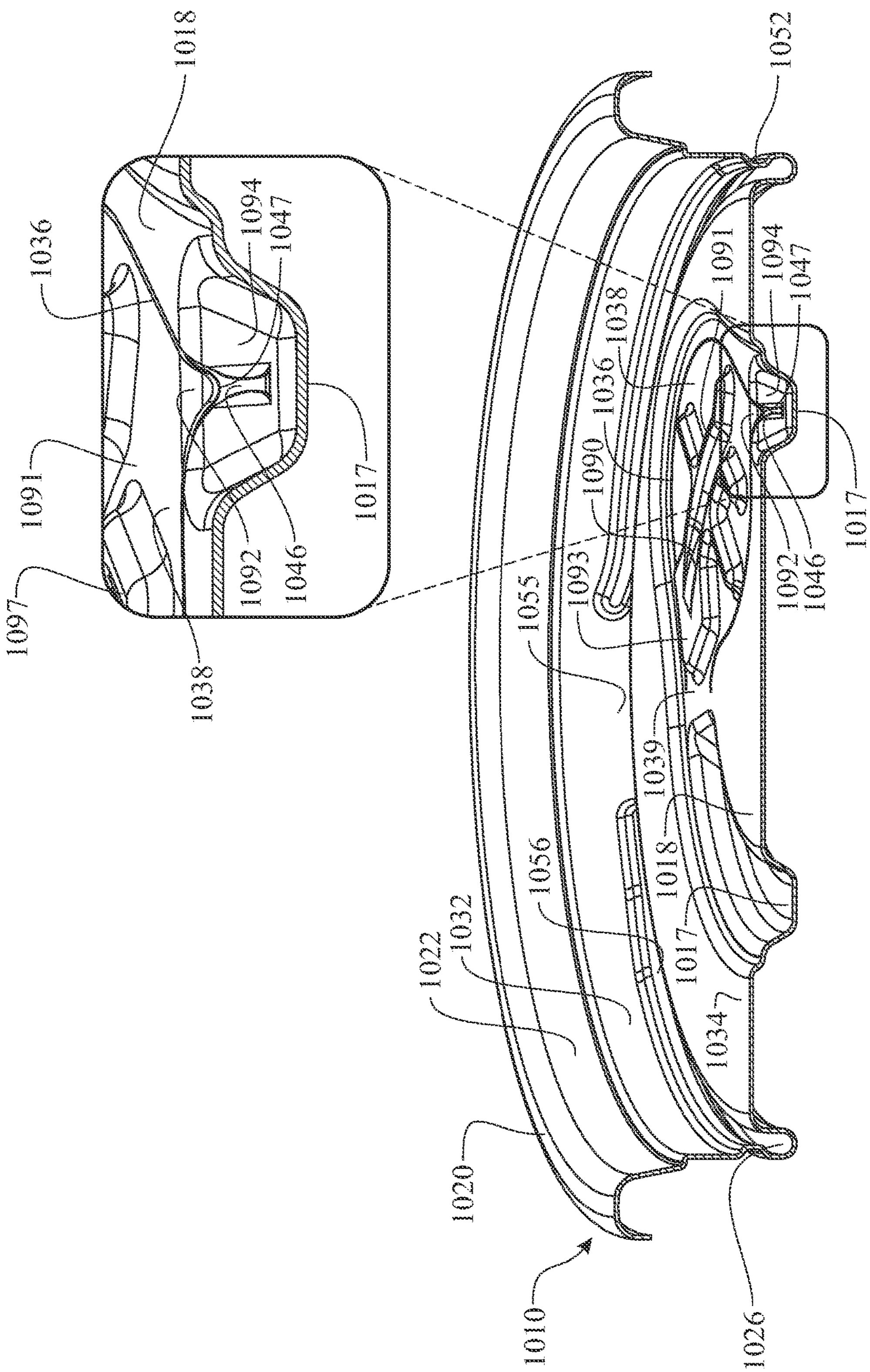
FIG. 109 is a top isometric section view detailing an end of an incisor well of the container lid originally introduced in FIG. 106, the section orientation being referenced by section line 109-109 of FIG. 108.
Figure 110:
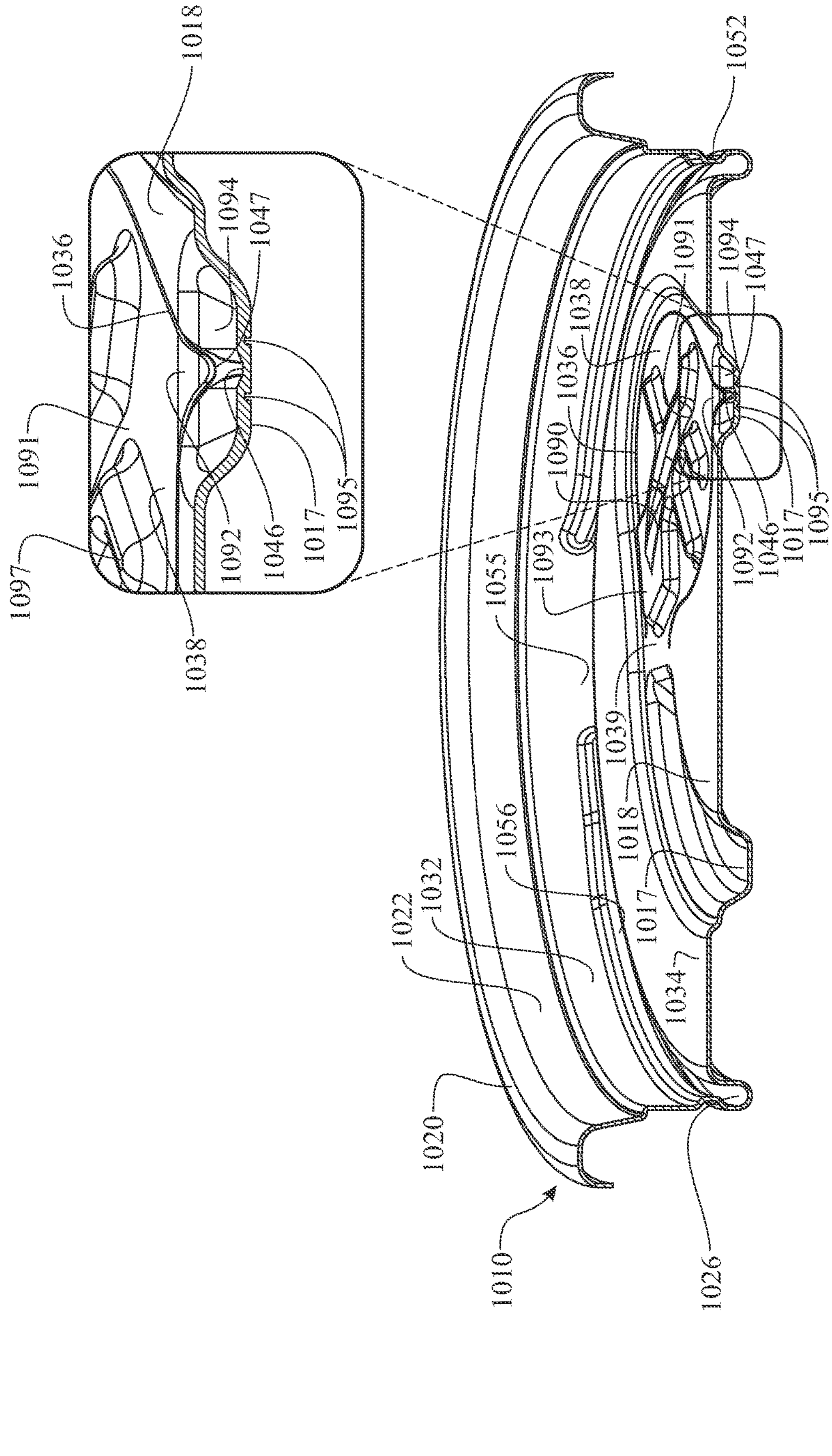
FIG. 110 is a top isometric section view sectioning the end of the incisor well of the container lid originally introduced in FIG. 106, focusing upon the actual incising region, the section orientation being referenced by section line 110-110 of FIG. 108.
Figure 111:
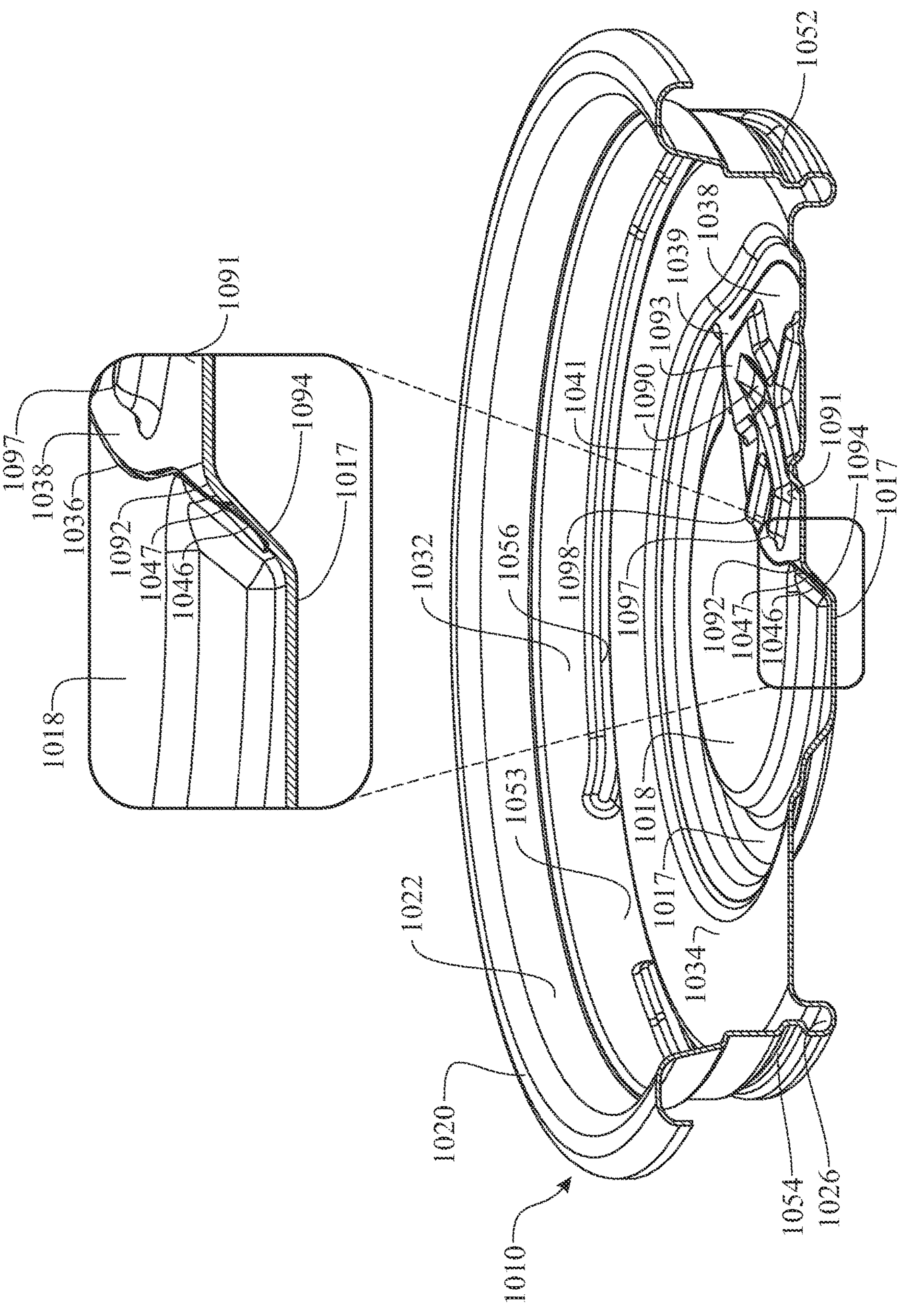
FIG. 111 is a top isometric section view sectioning the incisor well of the container lid originally introduced in FIG. 106, wherein the section details the score line thinned initiation region, the section orientation being referenced by section line 111-111 of FIG. 108.
Figure 112:
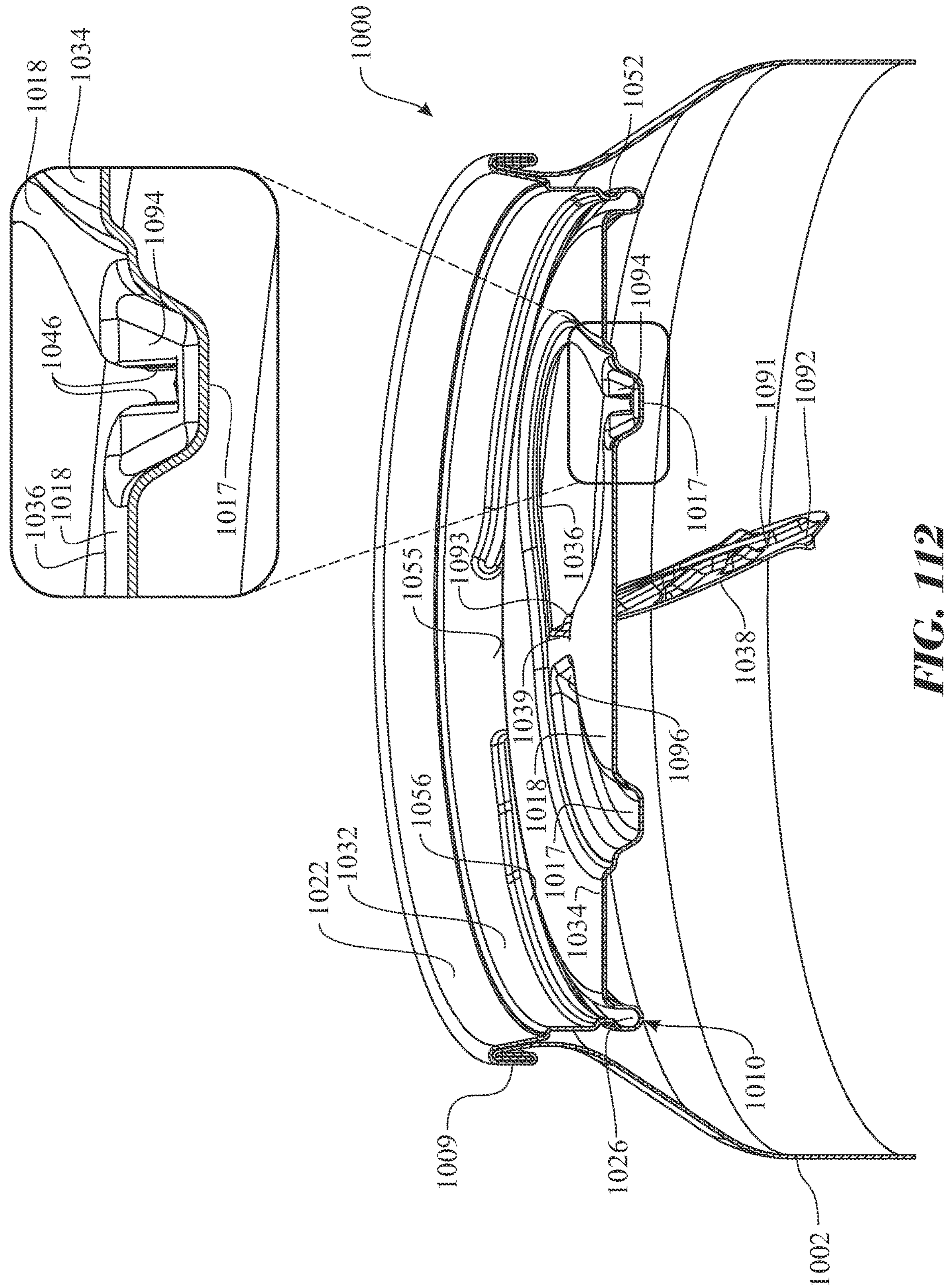
FIG. 112 is a top isometric section view of an opened resealable container assembly, further detailing a folded tear panel and a folded thinned initiation region, the section being oriented similarly to section line 111-111 of FIG. 108.

A resealable container lid 1010, shown in FIGS. 106 through 112, introduces yet another variant of an opening configuration. The resealable container lid 1010 includes features that are similar to those of the resealable container lid 810. Like features of the resealable container lid 1010 and the resealable container lid 810 are numbered the same except preceded by the numeral '10', unless otherwise stated. The resealable container lid 1010 includes a cap receiving socket bottom panel circular score line 1036 having an initial fracturing portion 1046 formed within a first incisor pathway refined chamfer face 1094 at one end of the incisor pathway channel 1017, best shown in the magnified section of the illustration presented in FIG. 109. The initial fracturing portion 1046 can be created having an angled trough or recess. The incisor pathway channel 1017 can be fabricated using a single punch process, or, preferably, a multi-step forming process. The exemplary ends of the incisor pathway channel 1017 are formed having a chamfered, linear end walls to enhance registration functions or the formation of a score line cap receiving socket bottom panel circular score line 1036 or at least one score line feature 1046, 1047. The initial fracturing portion of the cap receiving socket bottom panel circular score line 1036 is routed into the debossed region of the first incisor pathway refined chamfer face 1094 creating an overlapping region between the cap receiving socket bottom panel circular score line 1036 and the score line fracture thinned initiation region 1046, identified as a score line segment overlapping region 1047. The initial fracturing portion of the cap receiving socket bottom panel circular score line 1036 and the associated score line fracture thinned initiation region 1046 formed on an interior surface of the first incisor pathway refined chamfer face 1094 on the resealable container lid 1010. The resealable container lid 1010 introduces a pair of lid bottom score line hinge creases 1095 are formed on a bottom surface of the resealable container lid 1010 proximate the score line fracture thinned initiation region 1046, as shown in FIG. 107, and preferably arranged flanking each of two vertical edges thereof. Each of the pair of lid bottom score line hinge creases 1095 is preferably arranged in a vertical orientation or tangential with the arch of the incisor pathway channel 1017.

In use, the offset projecting incisor 568 (not shown) would travel along the incisor pathway channel 1017 approaching the score line fracture thinned initiation region 1046 within the first incisor pathway refined chamfer face 1094. The offset projecting incisor 568 then contacts and applies an opening force onto the score line fracture thinned initiation region 1046, causing the score line fracture thinned initiation region 1046 to fracture. The fracturing of the score line fracture thinned initiation region 1046 reduces the strength of the region, enabling a reduced force to fracture the score line segment overlapping region 1047 and subsequently the cap receiving socket bottom panel circular score line 1036. The lid bottom score line hinge crease 1095 directs the material about the score line fracture thinned initiation region 1046 to fold outward, introducing a clearance for free passage of the offset projecting incisor 568 to exit the end of incisor pathway channel 1017 while continuing a downward force on the incisor channel to tear panel surface transition 1092 to further propagate fracturing of the cap receiving socket bottom panel circular score line 1036. The process of separating the cap receiving socket bottom panel tear panel 1038 from the resealable container lid upper surface reinforcement formation 1018 continues as previously described in other variants, with the offset projecting incisor 568 applying a downward force to the incisor channel to tear panel surface transition 1092 in conjunction with various vertical applying force generating features engaging with one another, such as the incisor deboss panel 566 engaging with the lead in supplemental score fracture propagation and tear panel support boss 1097.

A resealable container lid 1110, shown in FIGS. 113 through 126, introduces a variant that retains the resealable container cap 1160 within the cap receiving socket of the resealable container lid 1110. The resealable container lid 1110 includes features that are similar to those of the resealable container lid 510. Like features of the resealable container lid 1110 and the resealable container lid 510 are numbered the same except preceded by the numeral '11' unless otherwise stated, wherein the variant of the container lid 510 is adapted to retain a resealable container cap 1160 and the resealable container lid 1110 as an assembly throughout the use thereof. The key distinction between the resealable container lid 1110 and the resealable container lid 510 is the formation of the cam tracks 1152, 1154, 1156 (examples of container lid rotational and axial guide features), more specifically shown reflecting upon the first socket cap retaining cam track 1152 as an exemplary cam track, a cam track cam follower locking section 1152E, as best shown in FIG. 126. The cam track cam follower locking section 1152E is routed downward compared to the cam track cam follower leader section 552E of FIG. 53, which is routed upward. The resealable container cap 1160 includes additional features related to the primary intention of this variant, wherein the resealable container lid 1110 and the resealable container cap 1160 are designed to remain assembled to one another. A resealable container cap dispensing aperture 1161 is introduced through a resealable container cap planar traversing surface 1164 of the resealable container cap 1160. The resealable container cap dispensing aperture 1161 is located in rotational alignment with an opening defined by the cap receiving socket bottom panel circular score line 1136 of the resealable container lid 1110, as shown in FIGS. 122 and 123. A tear panel conforming sealing gasket 1165 is carried by an underside of the resealable container cap planar traversing surface 1164. The tear panel conforming sealing gasket 1165 is located in rotational alignment with the opening defined by the cap receiving socket bottom panel circular score line 1136 of the resealable container lid 1110, but offset from the resealable container cap dispensing aperture 1161, as shown in FIG. 117. The tear panel conforming sealing gasket 1165 can be of any suitable shape to adequately seal the opening defined by the cap receiving socket bottom panel circular score line 1136 of the resealable container lid 1110. In the exemplary embodiment, the tear panel conforming sealing gasket 1165 is teardrop shaped to accommodate the shape of the dispensing aperture, more specifically, the region about the tear panel hinge 1139. The resealable container cap dispensing aperture 1161 enables access and dispensing of contents from within a breached resealable container lid 1110 of the resealable container 1100. The tear panel conforming sealing gasket 1165 seals the opened container after the cap receiving socket bottom panel circular score line 1136 has been fractured and the cap receiving socket bottom panel tear panel 1138 has been bent away from the resealable container lid upper surface reinforcement formation 1118. The resealable container cap 1160 is retained within a cap receiving socket of the resealable container lid 1110 by the shape of the cam tracks. The cam track assembly/locking detent 1152A limits the motion of the respective cam follower 1181 in a clockwise direction. The modification to the cam track cam follower locking section 1152E limits the motion of the respective cam follower 1181 in a counterclockwise direction. The same rotational limitations are provide by each can track 1152, 1154, 1156 and respective cam follower 1181, 1182, 1183 (examples of container cap rotational and axial guide features). When packaged, the cam follower 1181 is located at the cam track initial/resealed section 1152B segment of the first socket cap retaining cam track 1152. The remaining cam followers 1182, 1183 would be located at similar segments of the respective cam tracks 1154, 1156. This assembly configuration retains the resealable container cap 1160 in a fixed rotational position during shipping, distribution, sale, etc. until use. In use, the consumer would rotate the resealable container cap 1160 in a counterclockwise motion causing the offset projecting incisor 1168 to fracture the cap receiving socket bottom panel circular score line 1136 in a manner similar to the offset projecting incisor 568 fracturing the cap receiving socket bottom panel circular score line 536 (previously described above). As the resealable container cap 1160 continues to rotate, the resealable container cap dispensing aperture 1161 is positioned over the dispensing aperture defined by the fractured cap receiving socket bottom panel circular score line 1136, as shown in FIGS. 123, 124. When the consumer decides they are finished dispensing a desired volume of the contents from with the resealable container 1100, the consumer rotates the resealable container cap 1160 in a clockwise direction, aligning the tear panel conforming sealing gasket 1165 over the dispensing aperture defined by the fractured cap receiving socket bottom panel circular score line 1136, as shown in FIGS. 124 and 125. Additional illustrations are included to adequately present details of the resealable container lid 1110 and the respective resealable container cap 1160 as well as the interactions with one another.

All of the above configurations employ a counterclockwise rotation for fracturing the cap receiving socket bottom panel circular score line 536, 736, 836, 1036, 1136 of the respective resealable container lid 510, 710, 810, 1010, 1110. Each of these configurations are adapted to retain the respective resealable container cap 560, 660, 1160 within the cap receiving cavity of the respective resealable container lid 510, 710, 810, 1010, 1110 after the manufacturing process as well as the distribution and sales processes.

It is understood that the container lid can be modified to use a reusable or separately available version of a container cap. A resealable container lid 1210 is adapted to receive a reusable or separately available version of a container cap, such as a container lid socket engaging opening tool 1260, as shown in FIGS. 127 through 135. The resealable container lid 1210, detailed in FIGS. 127 through 129, includes features that are similar to those of the resealable container lid 510. Like features of the resealable container lid 1210 and the resealable container lid 510 are numbered the same except preceded by the numeral '12'. In this configuration, the resealable container 1200 would be manufactured, distributed, and sold excluding the container lid socket engaging opening tool 1260, which would be a sealed version of the container shown in FIG. 134. In the resealable container lid 510, the cap receiving socket bottom panel circular score line 536 and the other respective opening features are oriented to accommodate a counterclockwise rotation of the resealable container cap 560 to fracture the cap receiving socket bottom panel circular score line 536 and open the cap receiving socket bottom panel tear panel 538 thereof. Conversely, in the resealable container lid 1210, the cap receiving socket bottom panel clockwise opening circular score line 1236 and the other respective opening features are oriented to accommodate a clockwise rotation of the container lid socket engaging opening tool 1260 to fracture a cap receiving socket bottom panel clockwise opening circular score line 1236 and open a clockwise opening tear panel 1238 thereof. Essentially, the cap receiving socket bottom panel clockwise opening circular score line 1236 and the other respective opening features are a mirror image of the cap receiving socket bottom panel circular score line 536 and the other respective opening features.

The concept no longer requires the features to entrap the offset projecting incisor 568 within the incisor pathway channel 517 and just prior to the incisor channel to tear panel surface transition 592, as the container lid socket engaging opening tool 1260 is no longer pre-assembled to the resealable container lid 1210. One additional benefit of this configuration is that the container lid socket engaging opening tool 1260 can be axially symmetric, enabling assembly of the container lid socket engaging opening tool 1260 to the resealable container lid 1210 in any of three orientations. Although the exemplary embodiment mirrors the features of the container lid socket engaging opening tool 1260 in three 120 degree angular sections, it is understood that the resealable container lid 1210 and the container lid socket engaging opening tool 1260 can be design having any suitable number of like angular sections.

The container lid socket engaging opening tool 1260, detailed in FIGS. 130 through 133, is a variant of the resealable container cap 560, and includes features that function similar to those of the resealable container cap 560. Like features of the container lid socket engaging opening tool 1260 and the resealable container cap 560 are numbered the same except preceded by the numeral '12', unless otherwise stated. The container lid socket engaging opening tool 1260 can be formed using any suitable manufacturing process. The exemplary container lid socket engaging opening tool 1260 is fabricated using a molding process. The container lid socket engaging opening tool 1260 includes a opening tool exterior sidewall 1262 carrying a plurality of like cam followers 1281 (examples of container cap rotational and axial guide features) extending radially outward therefrom, being equidistantly spaced about a lower peripheral edge thereof. An opening tool container overlapping sidewall 1271 spatially circumscribes the opening tool exterior sidewall 1262 of the container lid socket engaging opening tool 1260 forming an opening tool container body and lid assembly seam cavity 1270 therebetween. The opening tool container body and lid assembly seam cavity 1270 is sized and shaped to fit over a container body and lid assembly seam 1209 of a resealable container 1200. A plurality of gripping features, such as a opening tool grip elements 1274 and respective opening tool grip element force application surfaces 1275) are formed about the radial, exterior surface of the opening tool container overlapping sidewall 1271. A plurality of opening tool dispensing aperture 1261 is formed through the opening tool planar traversing surface 1264. Each opening tool dispensing aperture 1261 would be located to rotate into a position enabling dispensing of contents from within the resealable container 1200.

A plurality of incisors 1268 extend axially downward from a sealing surface of the opening tool planar traversing surface 1264, the incisors 1268 being equidistantly spaced and equidistant from a rotational axis of the container lid socket engaging opening tool 1260. Any of the incisors 1268 can be used for initiating a fracture of the cap receiving socket bottom panel clockwise opening circular score line 1236.

In use, the container lid socket engaging opening tool 1260 would be assembled onto the resealable container lid 1210 by aligning each opening tool formed cam follower 1281 with each inter-cam relief section 1251, 1253, 1255 and slipping each opening tool formed cam follower 1281 beneath each cam track 1252, 1254, 1256 (examples of container lid rotational and axial guide features), more specifically, engaging with the upward angled end, similar to the cam track cam follower leader section 552E previously described. The upward angled end of the respective cam track 1252, 1254, 1256 guide the respective opening tool formed cam follower 1281 into the generally horizontally arranged segment of the cam track 1252, 1254, 1256, similar to the cam track operating segment 552D. The consumer would continue to rotation the container lid socket engaging opening tool 1260 in a clockwise motion to fracture the cap receiving socket bottom panel clockwise opening circular score line 1236 at the incisor channel to tear panel surface transition 1292 and subsequently propagate the fracture of a cap receiving socket bottom panel clockwise opening circular score line 1236, while folding or bending a clockwise opening tear panel 1238 away from a resealable container lid upper surface reinforcement formation 1218 along a clockwise opening tear panel hinge 1239, as shown in FIG. 135. Once the complete cap receiving socket bottom panel clockwise opening circular score line 1236 is fractured and the clockwise opening tear panel 1238 is folded away from the resealable container lid upper surface reinforcement formation 1218, the container lid socket engaging opening tool 1260 is rotated into a position aligning one opening tool dispensing aperture 1261 with the dispensing aperture created by the fractured cap receiving socket bottom panel clockwise opening circular score line 1236. The clockwise rotation of the container lid socket engaging opening tool 1260 is limited by a downward turn of each respective cam track 1252, 1254, 1256, similar to the cam track assembly/locking detent segment 552A previously introduced. The container lid socket engaging opening tool 1260 is removed by rotating the container lid socket engaging opening tool 1260 in a counterclockwise direction until each opening tool formed cam followers 1281 is placed into the respective inter-cam relief section 1251, 1253, 1255. Once each opening tool formed cam followers 1281 is placed into the respective inter-cam relief section 1251, 1253, 1255, the container lid socket engaging opening tool 1260 can be lifted from the cap receiving socket of the resealable container lid 1210. It is noted that the exemplary cap 1260 does not include features enabling resealing of the compromised or opened resealable container lid 1210. The container lid socket engaging opening tool 1260 can be modified to include a sealing feature. Alternatively, other caps can be employed to seal the compromised or opened resealable container lid 1210. In yet another configuration, the container lid socket engaging opening tool 1260 can be exclusive of the opening tool dispensing aperture 1261, simply providing an opening function.

Previous variants include a seal between the cap sealing ring 565, located on a bottom surface of the resealable container cap planar traversing wall 564 of the resealable container cap 560 and a cap receiving socket bottom wall 534 of the resealable container lid 510. In another variant, the seal can be provided between features of the vertical sidewall of the resealable container cap 560 and the resealable container lid 510. This variant is employed between a resealable container lid 1310 and a resealable container cap 1360, which are described in FIGS. 136 through 146.

The resealable container lid 1310, detailed in FIGS. 136 and 137, is a variant of the resealable container lid 510, and includes features that function similar to those of the resealable container lid 510. Like features of the resealable container lid 1310 and the resealable container lid 510 are numbered the same except preceded by the numeral '13'. The resealable container cap 1360, detailed in FIGS. 138 and 139, is a variant of the resealable container cap 560, and includes features that function similar to those of the resealable container cap 560. Like features of the resealable container cap 1360 and the resealable container cap 560 are numbered the same except preceded by the numeral '13'.

The resealable container lid 1310 includes a frustum shaped interior surface of a frustum shaped cap seal engaging annular surface 1340, as best shown in a section view illustrated in FIG. 143. The frustum shaped cap seal engaging annular surface 1340 extends axially between a cap receiving socket cylindrical sidewall 1332 and a seaming chuck shoulder 1324 of the resealable container lid 1310. The frustum shaped cap seal engaging annular surface 1340 is located between the functional cam region of the resealable container lid 1310 and the seaming panel elements, including the seaming chuck wall 1322 and the seaming panel 1320 (alternatively referred to as a lid and container joining formation 1320).

The resealable container cap 1360 includes a frustum shaped exterior surface of a frustum shaped cap sealing ring surface 1367, as best shown in a section view illustrated in FIG. 143. The frustum shaped cap sealing ring surface 1367 extends axially between a resealable container cap cylindrical exterior sidewall 1362 and a cylindrical sidewall inverted countersink 1370 of the frustum shaped cap sealing ring surface 1367. The frustum shaped cap sealing ring surface 1367 is located between the region containing the functional cam followers 1381, 1382, 1383 (examples of container cap rotational and axial guide features) of the resealable container cap 1360 and the cylindrical sidewall inverted countersink 1370. A frustum shaped cap sealing ring 1365 is applied to the exterior surface of the frustum shaped cap sealing ring surface 1367. The frustum shaped cap sealing ring 1365 can be of any suitable material, such as those previously suggested for the cap sealing ring 565.

When the resealable container cap 1360 and the resealable container lid 1310 are assembled to one another, the frustum shaped cap sealing ring 1365 seals against the interior surface of the frustum shaped cap seal engaging annular surface 1340, as best shown in FIGS. 144, 146. The spatially arranged cam followers 1381, 1382, 1383, interacting with the respective cam track 1352, 1354, 1356 (examples of container lid rotational and axial guide features) generally evenly distribute a compression load between the frustum shaped cap sealing ring surface 1367 and the frustum shaped cap seal engaging annular surface 1340.

In the resealable container cap 1360, a concentric tamper indicator operation element 1329 on a concentric tamper indicator feature 1328 is centrally located. The concentric tamper indicator operation element 1329 is supported by an upper surface of the resealable container lid upper surface reinforcement formation 1318. The resealable container lid upper surface reinforcement formation 1318 is supported by the pressure within the sealed interior of the container. Once the seal is compromised, the pressure is released, thus eliminating any support to and from the resealable container lid upper surface reinforcement formation 1318. Without the support, the resealable container lid upper surface reinforcement formation 1318 can flex axially, thus allowing the concentric tamper indicator feature 1328 to flex accordingly and report the breach of the container.

In yet another embodiment, a resealable container lid 1410 and a respective resealable container cap 1460 are adapted to support a solid composition (i.e. food) storage and distribution container, wherein the resealable container lid 1410 is described in FIGS. 147 through 158.

It is understood that the resealable container lid 1410 can be used for smaller and larger food products, such as those mentioned above an additionally including chips, pretzels, potato sticks, larger nuts, larger spices, candies, span, thicker soups, spreadables, peanut butter, jelly, larger condiments (sauerkraut, relish), and the like.

The resealable container lid 1410, detailed in FIGS. 147 and 148, is a variant of the resealable container lid 510, and includes features that function similar to those of the resealable container lid 510. Like features of the resealable container lid 1410 and the resealable container lid 510 are numbered the same except preceded by the numeral '14'. The resealable container cap 1460, detailed in FIGS. 149 and 150, is a variant of the resealable container cap 560, and includes features that function similar to those of the resealable container cap 560. Like features of the resealable container cap 1460 and the resealable container cap 560 are numbered the same except preceded by the numeral '14'.

The resealable container lid 1410 is provided with a removable sealed panel (not shown) spanning across a lower end thereof, or as a ring shaped element having a container lid dispensing aperture 1461. In a configuration where the resealable container lid 1410 includes a removable sealed panel spanning across a lower end thereof, the peripheral edge of the sealing panel can be defined by a score line. The removable seal can be opened and removed using any suitable element, such as a pull tab. The removable panel may also be of a plastic or metal foil material bonded to the lower end of the resealable container lid 1410. In a configuration excluding the removable seal bottom panel, a lower edge of the resealable container cap cylindrical exterior sidewall 1462 can be formed, introducing a peripheral bottom edge fold 1426 as a fold to reinforce the lower edge of the resealable container cap cylindrical exterior sidewall 1462 of the resealable container lid 1410 and to minimize any risk of injury.

The resealable container lid 1410 is assembled to the container cylindrical sidewall 102 using the same methods previously described. The exclusion of the cap receiving socket bottom wall 534 in the resealable container lid 1410 suggests modifications to the pneumatically operated concentric tamper indicator feature 1428. The pneumatically operated concentric tamper indicator feature 1428 excludes a tamper indicator operation element, as the resealable container lid 1410 excludes a cap receiving socket bottom wall, rendering the tamper indicator operation element as being of no use. The pneumatically operated concentric tamper indicator feature 1428 obtains support directly from pressure differential within the sealed contents section of the container.

The container lid cap can include a grip of any suitable configuration. The previous container lid caps 160, 260, 360, 460, 560, 660, 1160, 1360, 1460, each included a grip formation extending upward from a resealable container cap base element or planar traversing wall 564, 664, 1164, 1364, 1464. The container lid socket engaging opening tool 1260 includes a grip element formed on a radially exterior surface of the opening tool container overlapping sidewall 1271. A resealable container cap 1560, detailed in FIGS. 159 and 160, introduces a debossed grip configuration resealable container cap grip element cavity 1574 extending inward into an interior region of the resealable container cap 1560. The resealable container cap 1560 includes features having similar function to those of the resealable container cap 1360. Like features of the resealable container cap 1560 and the resealable container cap 1360 are numbered the same except preceded by the numeral '15', unless otherwise stated. Since the sealing features (frustum shaped cap sealing ring 1565 carried by a frustum shaped cap sealing ring surface 1567) are employed to provide a seal, a lower surface of the resealable container cap planar traversing surface 1564 is no longer mandated to contact the cap receiving socket bottom wall 1334, thus eliminating design constraints imposed by the cap sealing ring 565 of the resealable container cap 560. This enables the resealable container cap planar traversing surface 1564 to extend radially inward from an upper edge of the resealable container cap cylindrical lower exterior sidewall 1562. The resealable container cap 1560 can include a resealable container cap cylindrical upper exterior sidewall 1563, providing a transition between an upper edge of the resealable container cap cylindrical lower exterior sidewall 1562 and the outer edge of the resealable container cap planar traversing surface 1564. The height of the resealable container cap 1560 would preferably be designed to retain an uppermost surface thereof at or below an uppermost edge of the seaming panel 1320 (alternatively referred to as a lid and container joining formation 1320), as best shown in FIG. 165. The resealable container cap cylindrical upper exterior sidewall 1563 and resealable container cap planar traversing surface 1564 are preferably designed to nest within the cavity of the seaming chuck tool cap clearance cavity 603 on the seaming chuck tool 600 during the seaming process of the resealable container lid 1310 to the container body.

Since the resealable container cap planar traversing surface 1564 extends across a highest region of the resealable container cap 1560, the resealable container cap grip element cavity 1574 can be formed as a deboss, extending inward from the top surface of the resealable container cap planar traversing surface 1564. The resealable container cap grip element cavity 1574 includes a cap grip element cavity force application surface 1575, functioning the same as the cap grip element force application surface 575 (previously described), while being a tubular interior surface thereof. An upper transition between the cap grip element cavity force application surface 1575 and the resealable container cap planar traversing surface 1564 is chamfered, creating a comfort region for the consumer during the opening and resealing processes. A depth of the resealable container cap grip element cavity 1574 would place a bottom surface of the resealable container cap grip element cavity 1574 at a desired vertical position respective to an assembly reference feature, such as the cam followers 1581, 1582, 1583 (examples of container cap rotational and axial guide features), a bottom edge of the resealable container cap cylindrical lower exterior sidewall 1562, and the like. This locates a bottom surface of a cap grip bottom wall incisor deboss panel 1566 and a depth of a respective cap grip bottom wall projecting incisor 1568 adequately to properly interact with the opening features of the resealable container lid 1310 or other respective container lid, as best shown in FIGS. 165, 167. Assembly of the resealable container cap 1560 to the resealable container lid 1310 would be the same as previously described. The significant difference is the consumer would insert their fingers and/or a tool into the resealable container cap grip element cavity 1574, resting against the cap grip element cavity force application surface 1575 to apply a torsional force thereto. Obviously, the resealable container cap grip element cavity 1574 would be designed to accommodate the consumer's fingers and/or an opening assistance tool.

Continuing with variations in grip designs, a resealable container cap 1660, detailed in FIGS. 168 and 169, introduces another embossed grip configuration resealable container cap grip element 1674 extending upward from the resealable container cap planar traversing surface 1664 of the resealable container cap 1660. The resealable container cap 1660 includes features having similar function to those of the resealable container cap 560. Like features of the resealable container cap 1660 and the resealable container cap 560 are numbered the same except preceded by the numeral '16'.

The resealable container cap 560 includes a resealable container cap grip element 574 having a pinched shape to define the cap grip element force application surfaces 575. The resealable container cap grip element 1674 is formed having a more cylindrical shaped cap grip element force application surface 1675 terminating with a cap grip element grip enhancing feature 1676 circumscribing a distal edge of the cap grip element force application surface 1675 or a peripheral edge of a top panel thereof. It is recognized that the cap grip element force application surface 1675 and cap grip element grip enhancing feature 1676 as well as the entire resealable container cap grip element 1674 can be of any suitable shape. The preferred shape of the cap grip element force application surface 1675 is cylindrical for manufacturing and reliability purposes. The off-center tamper indicator feature 1628 can be located off-centered (as shown) or concentric with a resealable container cap cylindrical interior sidewall 1663 of the resealable container cap 1660. An off-center tamper indicator operation element 1629 of the off-center tamper indicator feature 1628 would be designed to engage with the cap receiving socket bottom wall 1334 when the container is subjected to a pressure created by the contents of the container. The resealable container cap 1660 would be assembled into any suitable container lid, such as the exemplary resealable container lid 510 shown in FIG. 170. It is noted that the resealable container cap grip element 1674 is of a height where an upper surface of each resealable container cap grip element 1674 is at or lower than a respective surface of the seaming panel 520 when the resealable container cap 1660 is assembled within a cap receiving socket of the resealable container lid 510.

The consumer can use their fingers to apply an opening force directly to each cap grip element force application surface 1675 of each resealable container cap grip element 1674. Alternatively, the consumer can employ a resealable container cap opening assistance tool 1760, introduced in FIGS. 171 through 173, to aid in rotating the resealable container cap 1660 to fracture the cap receiving socket bottom panel circular score line 536 of the resealable container lid 510, separating and folding the cap receiving socket bottom panel tear panel 538 away from the resealable container lid upper surface reinforcement formation 518.

The resealable container cap opening assistance tool 1760 is preferably fabricated of a pliant material using a molding process. The resealable container cap opening assistance tool 1760 includes a opening assistance tool top wall 1762, a opening assistance tool upper cylindrical sidewall 1761 having a plurality of spatially arranged gripping sections (comprising opening assistance tool grip elements 1784, each opening assistance tool grip element 1784 extending outward from a peripheral surface of the opening assistance tool upper cylindrical sidewall 1761 by a pair of opening assistance tool force application surfaces 1785. An opening assistance tool lower cylindrical sidewall 1763 extends downward from a bottom surface of the opening assistance tool upper cylindrical sidewall 1761. The opening assistance tool lower cylindrical sidewall 1763 is sized and shaped to fit within the cap receiving cavity of the resealable container lid 510, more specifically to fit within the cavity defined by the resealable container cap cylindrical interior sidewall 1663, as best shown in FIGS. 174, 176. The peripheral edge of the opening assistance tool upper cylindrical sidewall 1761 is sized to extend outward from a peripheral edge of the container to avoid any interference of the features of the container and associated container lid resealable container cap 560 during use of the resealable container cap opening assistance tool 1760. At least one opening assistance tool cap grip receiving cavity 1774 is formed as a cavity extending inward from an opening assistance tool bottom wall 1764 of the opening assistance tool lower cylindrical sidewall 1763. Each of the at least one opening assistance tool cap grip receiving cavity 1774 includes a opening assistance tool grip enhancing feature 1776 circumscribing an interior edge of a respective opening assistance tool force application surface 1775. The opening assistance tool force application surface 1775 and associated opening assistance tool grip enhancing feature 1776 are of a size and shape to compliment the respective resealable container cap grip element 1674, more specifically, the cap grip element force application surface 1675 and the cap grip element grip enhancing feature 1676 of the resealable container cap grip element 1674, as best shown in FIGS. 174, 176. The quantity and location of each of the at least one opening assistance tool cap grip receiving cavity 1774 are determined by the quantity and location of each of the at least one resealable container cap grip element 1674. The pliant material of the resealable container cap opening assistance tool 1760 enables the opening assistance tool cap grip receiving cavity 1774 to deform during an assembly step, compensating and allowing the enlarged cap grip element grip enhancing feature 1676 to pass through the slightly narrowed opening assistance tool force application surface 1775 of the opening assistance tool cap grip receiving cavity 1774, until the cap grip element grip enhancing feature 1676 is seated into the opening assistance tool grip enhancing feature 1776. Once the resealable container cap opening assistance tool 1760 is properly seated and engaging the resealable container cap 1660, the user grasps the grips 1784, 1785 and applies a rotational force thereto. The enlarged peripheral edge of the opening assistance tool upper cylindrical sidewall 1761, in conjunction with the pliant material aids the user in rotating the resealable container cap 1660 within the resealable container lid 510 during use. The engagement between the opening assistance tool grip enhancing feature 1776 and the cap grip element grip enhancing feature 1676 enables the user to remove the resealable container cap 1660 from the cap receiving socket of the resealable container lid 510 by simply lifting the resealable container cap opening assistance tool 1760 away from the resealable container lid 510. The engagement between the opening assistance tool grip enhancing feature 1776 and the cap grip element grip enhancing feature 1676 retains the assembly of the resealable container cap 1660 to the resealable container cap opening assistance tool 1760.

It is understood the resealable container cap opening assistance tool 1760 can be fabricated of a more rigid, molded material. When manufactured using the more rigid material, the opening assistance tool force application surface 1775 would be the same shape and size as the opening assistance tool grip enhancing feature 1776, enabling insertion of each resealable container cap grip element 1674 into the respective opening assistance tool cap grip receiving cavity 1774.

It is understood that the opening assistance tool cap grip receiving cavities 1774 of the resealable container cap opening assistance tool 1760 can be incorporated into any of the other cavity shaped container lid caps 160, 260, 360, 460, 560, 660, 1160, 1360, 1460.

The container lid caps 560, 660, 1160, 1260, 1360, 1460 can be replaced by other container lid caps having more specialized features and related functions, as shown in the various configurations presented in FIGS. 177 through 186. These specialized caps can be included with the container, sold separately, or both. The specialized caps give the consumer the ability to adapt any container into a specialized application.

A first exemplary specialized cap is a drinking straw socket accessory 1800, detailed in FIGS. 177 through 181. The drinking straw socket accessory 1800 introduces a mason jar-like cap assembly design. The assembly design employs two elements, a stationary/axially operable component 1810, which remains in a fixed rotational position, and a socket mating rotary actuator 1860, which rotates, assembling the drinking straw socket accessory 1800 to a respective container lid, such as the resealable container lid 510 or any other suitable container lid. The exemplary stationary/axially operable component 1810 includes a cylindrical vertical wall circumscribing a peripheral edge of a socket accessory traversing wall 1834. In an alternative version, the cylindrical vertical wall 1832 can extend downward from a bottom surface of the socket accessory traversing wall 1834. A socket mating rotary actuator helical groove track cam follower 1880 is incorporated into the exterior surface of the cylindrical vertical wall 1832 of the stationary/axially operable component 1810. A socket accessory sealing ring 1865 is carried about a bottom edge of the cylindrical vertical wall 1832. A socket accessory off-center tear panel plug 1838 extends downward from an underside of the socket accessory traversing wall 1834. The socket accessory off-center tear panel plug 1838 is adapted to engage with the dispensing aperture formed within the resealable container lid upper surface reinforcement formation 518 when the cap receiving socket bottom panel tear panel 538 is folded into an opened configuration. The socket accessory off-center tear panel plug 1838 would preferably be shaped and sized to substantially or completely seal the dispensing aperture formed within the resealable container lid upper surface reinforcement formation 518. This would avoid leakage of the contained beverage to an area between the socket accessory off-center tear panel plug 1838 and the socket accessory sealing ring 1865.

In the exemplary embodiment, the socket accessory off-center tear panel plug 1838 is adapted to receive and retain a drinking straw sealing gasket 1847. The drinking straw sealing gasket 1847 is designed to receive and retain a drinking straw 1820. The drinking straw sealing gasket 1847 is preferably fabricated of a pliant material, such as rubber, nylon, or any other material that would be suitable for insertion, retention, and sealing about the outer surface of the drinking straw 1820.

The drinking straw 1820 can be any known design, including a straight configuration, a formed configuration, include bending feature(s), and the like. The drinking straw 1820 can be referenced by a drinking straw exposed upper area 1822 extending from an exterior of the drinking straw socket accessory 1800 and terminating at a drinking straw upper end 1823, and a drinking straw unexposed lower area 1824 extending from an interior of the drinking straw socket accessory 1800 and terminating at a drinking straw lower end 1825. The drinking straw 1820 would have a tubular body providing a drinking straw dispensing aperture 1828 therethrough. It would be preferred that the drinking straw 1820 is of a length enabling the drinking straw lower end 1825 to be positioned proximate the container closed bottom wall 504 of the resealable container 500.

The socket mating rotary actuator 1860 is designed having socket accessory cylindrical exterior sidewall 1862 formed in a ring or open annular shape. The exemplary embodiment introduces a socket accessory container body and lid assembly seam cavity 1870 formed extending inward from a lower edge of the socket accessory cylindrical exterior sidewall 1862 and a lower edge of a socket accessory container overlapping sidewall 1871. The socket accessory cylindrical exterior sidewall 1862 includes at least one feature (such as cam followers 1881, 1882, 1883 (examples of container cap rotational and axial guide features) best shown in FIG. 178) designed to engage with the cam tracks 552, 554, 556 of the resealable container cap 560 or any other like feature of any respective container lid. A socket mating rotary actuator groove track 1850 is incorporated into the interior surface of the cylindrical vertical wall 1871 of the socket mating rotary actuator 1860. A plurality of gripping features, such as a socket accessory grip elements 1874 and respective socket accessory force application surfaces 1875 are formed about the radial, exterior surface of the exterior vertical wall 1871. It would be appreciated by those skilled in the art that the configuration of the socket mating rotary actuator 1860 can vary significantly, while accomplishing the same function. Therefore, the invention should not be limited by the exemplary configurations as illustrated and described herein.

The socket mating rotary actuator groove track 1850 and the socket mating rotary actuator helical groove track cam follower 1880 are designed to mate with one another enabling a rotational relationship with one another, while maintaining an axial relationship with one another.

During assembly of the drinking straw socket accessory 1800 onto the container lid resealable container lid 510, the consumer would align a bottom of the socket accessory off-center tear panel plug 1838 with the dispensing aperture of the resealable container lid 510. This will retain the stationary/axially operable component 1810 in a rotationally fixed position, as shown in FIG. 180. The socket mating rotary actuator 1860 is rotated clockwise, engaging the cam followers 1881, 1882, 1883 with the respective cam tracks 552, 554, 556, drawing the stationary/axially operable component 1810 toward the cap receiving socket bottom wall 534, wherein the socket accessory sealing ring 1865 is pressed against the cap receiving socket bottom wall 534 of the resealable container lid 510, creating a seal, as shown in FIG. 181. Additionally, the socket accessory off-center tear panel plug 1838 is seated into the dispensing aperture of the resealable container lid 510, providing another seal therebetween. Once the socket mating rotary actuator 1860 is tightened, the modified resealable container 500 is ready for use.

A second exemplary specialized cap is a baby bottle nipple socket accessory 1900, detailed in FIG. 182. The baby bottle nipple socket accessory 1900 includes features that are similar to those of the drinking straw socket accessory 1800. Like features of the baby bottle nipple socket accessory 1900 and the drinking straw socket accessory 1800 are numbered the same except preceded by the numeral '19'. The baby bottle nipple socket accessory 1900 can be configured having a unitary cap design, as shown, or having the mason jar-like cap assembly design of the drinking straw socket accessory 1800. In the exemplary embodiment of the baby bottle nipple socket accessory 1900, a baby bottle nipple feature 1920 is preferably fabricated of a latex, silicone, or any other suitable material. The baby bottle nipple feature 1920 is preferably shaped and includes features resembling and associated with a common bottle nipple. The illustration identifies a baby bottle nipple dispensing aperture 1928 cut through a distal end of a baby bottle nipple pliable projecting component 1922. The baby bottle nipple feature 1920 can be overmolded onto a flange of the socket mating baby bottle nipple rotational attachment element 1960, adhesively joined with the flange of the socket mating baby bottle nipple rotational attachment element 1960, or by any other suitable joining process.

A third exemplary specialized cap is a sipping cup socket accessory 2000, detailed in FIG. 183. The sipping cup socket accessory 2000 includes features that are similar to those of the baby bottle nipple socket accessory 1900. Like features of the sipping cup socket accessory 2000 and the baby bottle nipple socket accessory 1900 are numbered the same except preceded by the numeral '20'. The sipping cup socket accessory 2000 can be configured having a unitary cap design, as shown, or having the mason jar-like cap assembly design of the drinking straw socket accessory 1800. In the exemplary embodiment of the sipping cup socket accessory 2000, a sipping cup mouth piece feature 2020 is preferably unitarily integrated into a socket accessory traversing wall 2034 of the sipping cup socket accessory 2000. The sipping cup mouth piece feature 2020 is preferably shaped and includes features resembling and associated with a common children's sippy cup (sipping cup). The sipping cup mouth piece feature 2020 includes a sipping cup dispensing aperture 2028 formed passing through a top of a sipping cup mouth piece pliable surface 2022.

A fourth exemplary specialized cap is a sports bottle socket accessory 2100, detailed in FIG. 184. The sports bottle socket accessory 2100 includes features that are similar to those of the drinking straw socket accessory 1800. Like features of the sports bottle socket accessory 2100 and the drinking straw socket accessory 1800 are numbered the same except preceded by the numeral '21'. The sports bottle socket accessory 2100 can be configured having a unitary cap design or having the mason jar-like cap assembly design of the drinking straw socket accessory 1800, as shown. The sports bottle socket accessory 2100 includes a sports bottle mouth piece feature 2120. The sports bottle mouth piece feature 2120 can be similar to any known axial sealing and dispensing configuration, such as those commonly used in sports bottles. The sports bottle mouth piece feature 2120 includes a sports bottle mouth piece axially sealing component 2122 axially moveable along a sports bottle neck feature 2121. A sports bottle dispensing aperture 2128 is formed through the 2122, enabling passage of a drink therethrough when the sports bottle mouth piece axially sealing component 2122 is pulled into a dispensing position. Alternatively, the sports bottle mouth piece feature 2120 transitions into a sealed configuration when the sports bottle mouth piece axially sealing component 2122 is compressed rearward into the sports bottle neck feature 2121.

The process for opening and closing the sports bottle mouth piece feature 2120 is well known by those skilled in the art and is therefore not detailed herein.

A fifth exemplary specialized cap is a rotating resealable fluid dispensing spout socket accessory 2200, detailed in FIGS. 185, 186. The rotating resealable fluid dispensing spout socket accessory 2200 includes features that are similar to those of the sports bottle socket accessory 2100. Like features of the rotating resealable fluid dispensing spout socket accessory 2200 and the sports bottle socket accessory 2100 are numbered the same except preceded by the numeral '22'. The rotating resealable fluid dispensing spout socket accessory 2200 can be configured having a unitary cap design or having the mason jar-like cap assembly design of the drinking straw socket accessory 1800, as shown. The rotating resealable fluid dispensing spout socket accessory 2200 includes a rotating resealable fluid dispensing spout feature 2220. The rotating resealable fluid dispensing spout feature 2220 can be similar to any known radially sealing and dispensing configuration, such as those commonly used in condiment delivery containers. The rotating resealable fluid dispensing spout feature 2220 includes a rotating resealable fluid dispensing spout 2222 rotationally moveable by a rotating resealable fluid dispensing spout ball hinge 2226. A rotating resealable fluid dispensing spout dispensing aperture 2228 is formed through the rotating resealable fluid dispensing spout 2222, enabling passage of a product therethrough when the rotating resealable fluid dispensing spout feature 2220 is rotated into a dispensing position. Alternatively, the rotating resealable fluid dispensing spout feature 2220 transitions into a sealed configuration when the rotating resealable fluid dispensing spout 2222 is rotated into the rotating resealable fluid dispensing spout accepting cavity 2229. The rotating resealable fluid dispensing spout ball hinge 2226 includes a fluid passageway and a seal that toggle between registration with a respective fluid dispensing passageway within the non-rotary/axially operable component 2210 and a sealing surface within the non-rotary/axially operable component 2210. The process for opening and closing the rotating resealable fluid dispensing spout feature 2220 is well known by those skilled in the art and is therefore not detailed herein.

A resealable container lid 2310, illustrated in FIGS. 187 through 189, is another exemplary variant of the resealable container lid concepts previously described herein. The resealable container lid 2310 (detailed in FIGS. 187 through 189) and the resealable container cap 2360 (detailed in FIGS. 190 through 192) include a portion of features that are similar to the resealable container lid 510 and the resealable container cap 560, respectively. Like features of the resealable container lid 2310 and the resealable container lid 510 are numbered the same except preceded by the numeral '5'. Like features of the resealable container cap 2360 and the resealable container cap 560 are numbered the same except preceded by the numeral '23'.

The resealable container lid 510 employs the offset projecting incisor 568 to fracture the cap receiving socket bottom panel circular score line 536, opening the resealable container lid 510. The resealable container lid 2310 utilizes a tab 2390 to fracture a cap receiving socket bottom panel circular score line 2336, opening the resealable container lid 2310.

The resealable container lid 2310 can further include a tab stabilizing boss 2396, wherein the tab stabilizing boss 2396 is formed and shaped to support the tab 2390 when initially placed in a storage or returned to the storage position. Additionally, the tab stabilizing boss 2396 alleviates any stress on the cap receiving socket bottom panel circular score line 2336 during storage and/or transit of the container.

The resealable container lid 2310 is formed having a cap receiving socket cylindrical sidewall 2332 extending substantially perpendicularly to a cap receiving socket bottom wall 2334, where the cap receiving socket cylindrical sidewall 2332 is formed having a cylindrical shape. The earn feature in the exemplary resealable container lid 2310 includes a series of socket helical threads 2352 (examples of container lid rotational and axial guide features). Each socket helical thread 2352 is formed as a linear thread, or more specifically, an uninterrupted helically shaped formation extending between a socket helical thread locking end 2352A and socket helical thread leader end 2352E. Each of the socket helical threads 2352 is formed as a boss feature extending radially inward from a surface of a cap receiving socket cylindrical sidewall 2332.

A cap receiving socket bottom panel tear panel 2338 is formed by the cap receiving socket bottom panel circular score line 2336. The cap receiving socket bottom panel circular score line 2336 is shaped into an incomplete circumference, defining a tear panel hinge 2339. The cap receiving socket bottom panel tear panel 2338 can be reinforced by any suitable reinforcement, such as a tear panel reinforcing boss 2398 formed therein. A tear panel to tear panel reinforcing boss transition 2342 provides a transition between the cap receiving socket bottom wall 2334 and the tear panel reinforcing boss 2398.

A resealable container lid upper surface reinforcement formation 2318 is formed within the cap receiving socket bottom wall 2334. A socket bottom wall to surface reinforcement formation transition 2341 provides a transition between the cap receiving socket bottom wall 2334 and the resealable container lid upper surface reinforcement formation 2318.

The resealable container lid 2310 includes a stay on tab opening system, which is detailed herein. The tab 2390 is preferably formed out of an aluminum sheet using a stamping and folding process. The tab 2390 is formed to define a stiffened peripheral edge of a body. The tab 2390 includes a tab bracket 2391 contiguously formed with the body. A tab bracket hinge 2392 provides a living hinge between the body and the tab bracket 2391. The body can be additionally reinforced by forming a tab lightening hole 2393.

The tab 2390 is assembled to a resealable container lid upper surface reinforcement formation 2318 of the resealable container lid 2310 by a rivet 2397. The rivet 2397 is formed using a stamping and forming process when forming the cap receiving socket bottom wall 2334 of the resealable container lid 2310. An aperture is formed through the tab bracket 2391. The rivet 2397 is inserted through the aperture of the tab bracket 2391, then compressed to form a button on an exposed side, as best shown in FIG. 193.

An opening force application edge segment of the tab 2390 is located to contact the cap receiving socket bottom panel tear panel 2338 to provide an opening force to the cap receiving socket bottom panel tear panel 2338, initiating and subsequently propagating a fracture of the cap receiving socket bottom panel circular score line 2336 and applying a bending force to the cap receiving socket bottom panel tear panel 2338, causing the cap receiving socket bottom panel tear panel 2338 to bend about the tear panel hinge 2339.

In use, a consumer would lift a user force input region (a portion of the tab 2390 that is located opposite of the opening force application edge segment) of the tab 2390. A fulcrum is created between the opening force application edge segment of the tab 2390 and a contacted surface of the cap receiving socket bottom panel tear panel 2338. The load then initially generates a lifting force that is applied to the rivet 2397. During this process, the force applied by the opening force application edge segment of the tab 2390 onto the cap receiving socket bottom panel tear panel 2338 in combination with the lifting force applied to the rivet 2397 generates a shearing force between the resealable container lid upper surface reinforcement formation 2318 and the cap receiving socket bottom panel tear panel 2338, causing the cap receiving socket bottom panel circular score line 2336 to initiate a fracture. It is noted that the rivet 2397 and the opening force application edge segment of the tab 2390 are located on opposite sides of the cap receiving socket bottom panel circular score line 2336.

A finger access depression 2395 can be formed as a deboss within the resealable container lid upper surface reinforcement formation 2318 to provide a clearance for a user's finger or any other implement that would be used to apply the lifting force to the user force input region of the tab 2390. The finger access depression 2395 can be located and sized to approximately abut the distal edge of the user force input region of the tab 2390 or extend underneath the user force input region of the tab 2390.

Any suitable cap can be adapted for use with the resealable container lid 2310. The suitable cap would include a mating threaded feature formed within a sidewall of the cap. The suitable cap would not require an incisor for fracturing of the cap receiving socket bottom panel circular score line 2336 or any ramps as included in a portion of the previously described caps.

Another exemplary cap 2360, is illustrated in FIGS. 190 through 192. The interaction between the resealable container cap 2360 and the resealable container lid 2310 is illustrated in FIGS. 193 through 195.

The resealable container cap 2360 can be formed using any suitable forming process, including injection molding, vacuum molding, thermal forming, overmolded, transfer molded, machined, stamped, printed using additive manufacturing, turned, or any other suitable manufacturing process or combination(s) thereof. The resealable container cap 2360 can be fabricated of a plastic, a nylon, a polyvinyl chloride (PVC), Polyethylene terephthalate (PETE or PET), Thermoplastic elastomer (TPE), High-Density Polyethylene (HDPE), Polypropylene (PP), Polycarbonate, Polylactic acid (PLA), bioplasics, recycled plastics, rubber, cellulose, paper-pulp, wax impregnated paper, laminated paper, metal, aluminum alloy, steel alloy, tin, and the like and any combination thereof.

The resealable container cap 2360 includes a resealable container cap cylindrical exterior sidewall 2362 extending substantially perpendicularly to a resealable container cap planar transversing surface 2364. The resealable container cap cylindrical exterior sidewall 2362 can extend downward from a peripheral edge of the resealable container cap planar transversing surface 2364, upward from the peripheral edge of the resealable container cap planar transversing surface 2364, or the resealable container cap planar transversing surface 2364 can be centrally located along any point between a top edge and a bottom edge of the resealable container cap cylindrical exterior sidewall 2362. A series of cap helical threads 2381 (examples of a container cap rotational and axial guide features) are provided along the sidewall, where the cap helical threads 2381 are designed to rotationally engage with the mating socket helical thread 2352 of the resealable container lid 2310. In the exemplary embodiment, the cap helical threads 2381 are formed having a linear, helical shape, extending between a first end and a second end. The number of cap helical threads 2381 of the resealable container cap 2360 would be respective to the number of mating socket helical threads 2352 of the resealable container lid 2310. Each cap helical thread 2381 can be formed as a boss, as shown, or a deboss or groove (such as the cam groove surfaces 180 of the resealable container cap 160) to engage with the mating socket helical threads 2352 of the resealable container lid 2310.

A sealing feature can be incorporated into the resealable container cap 2360, wherein the sealing feature is designed to engage with a mating sealing surface of the resealable container lid 2310. In the exemplary illustration, a cap provided lid sidewall thread seal 2368 is formed along a lower surface and/or edge of a radially extending flange that circumscribes the top edge of the resealable container cap cylindrical exterior sidewall 2362, as shown in FIG. 191. The cap provided lid sidewall thread seal 2368 would engage with a seaming chuck shoulder 2324, as best shown in a magnified section view illustrated in FIG. 195.

A second sealing feature that is included in the resealable container cap 2360 employs a pair of flanges 2366, 2367 extending outward from a lower circumferential edge of the resealable container cap cylindrical exterior sidewall 2362. The cap axial sealing ring 2366 extends in a generally horizontal and radial direction, with a limited portion extending in an axial direction. The cap radial sealing ring 2367 extends a substantially axially direction. When the resealable container cap 2360 is assembled to the resealable container lid 2310, the cap axial sealing ring 2366 engages with the cap receiving socket bottom wall 2334 of the resealable container lid 2310 and is flexible in an axial direction, providing a seal between the cap axial sealing ring 2366 and the cap receiving socket bottom wall 2334. Further, the cap radial sealing ring 2367 engages with an inner wall of the peripheral countersink 2326 of the resealable container lid 2310 and is flexible in an radial direction, providing a seal between the cap radial sealing ring 2367 and the peripheral countersink 2326.

The cap axial sealing ring 2366 and the cap radial sealing ring 2367 and the balance of the resealable container cap 2360 can be formed of a same material or the cap axial sealing ring 2366 and the cap radial sealing ring 2367 can be formed of a more pliant material compared to the balance of the resealable container cap 2360 to optimize the seal.

A resealable container cap grip element base 2372 is provided as a feature to receive an opening force and a closing force that would be applied by a user. The resealable container cap grip element base 2372 can be of any suitable shape and sized respective to the resealable container cap 2360. The exemplary resealable container cap grip element base 2372 is a conically frustum shaped feature extending upward from an outer surface of the resealable container cap planar transversing surface 2364/ The resealable container cap grip element base 2372 is designed to be gripped along the resealable container cap grip element base sidewall 2371. The resealable container cap grip element base sidewall 2371 may or may not include addition features to enhance the transfer of a gripping and torsional applied force. In the exemplary illustration, a series resealable container cap grip elements 2374 are spatially arranged about the circumference of the resealable container cap grip element base sidewall 2371. It is preferred that the spacing between adjacently positioned resealable container cap grip elements 2374 are equal. Each resealable container cap grip element 2374 is shaped to include a cap grip element force application surface 2375, where each cap grip element force application surface 2375 is preferably oriented to be in a generally radial direction. Each resealable container cap grip element 2374 can include a pair of cap grip element force application surfaces 2375, where one of the cap grip element force application surfaces 2375 is to receive an opening force and the second cap grip element force application surfaces 2375 is to receive a closing force. In the exemplary illustration, the resealable container cap grip elements 2374 are a series of equally spaced axially oriented ribs that circumscribe the resealable container cap grip element base sidewall 2371.

The bottom side of the resealable container cap 2360 can be hollow, following a contour of the resealable container cap planar transversing surface 2364 and the interior of the resealable container cap grip element base 2372. The shape and dimensions of a hollowed volume within the interior side of the resealable container cap 2360 can be such to provide a clearance for the tab 2390 and any other raised features of the resealable container lid 2310.

A resealable container cap 2460, illustrated in FIGS. 196 through 198, is another exemplary variant of the resealable container cap respective to those previously described herein. Like features of the resealable container cap 2460 and the resealable container cap 2360 are numbered the same except preceded by the numeral '24'. The exemplary resealable container cap 2460 is designed to be used with the resealable container lid 2310, previously described.

The resealable container cap 2460 includes a resealable container cap planar transversing surface 2464 that is a solid panel extending across an area defined by a surface of a resealable container cap cylindrical interior sidewall 2363. The resealable container cap grip element base 2472 has a tubular cylindrical shape, extending axially upward from the upper or top surface of the resealable container cap planar transversing surface 2464. The resealable container cap grip element base 2472 can include gripping features 2474 that are similar to the resealable container cap grip elements 2374 of the resealable container cap 2360 previously described.

The design of the resealable container cap 2460 is conducive to a two-part or multi-part component. The multiple parts can be assembled during an injection molding process, an injection over-molding process, using an adhesive or other bonding agent, mechanical assemble to one another, ultrasonically welded, friction weld, thermally welded or bonded, or any other suitable fabricated process or combination thereof.

The resealable container cap 2460 introduces a variation to the sealing arrangement. The resealable container cap 2460 includes a cap elastomeric sealing ring 2465 that is provided as an annular ring circumscribing an annular lower interior surface; circumscribing the interior about the resealable container cap cylindrical exterior sidewall 2462, or can completely cover a lower or interior surface of the resealable container cap planar transversing surface 2464, as best shown in FIG. 200. The sealing material can be an elastomeric material, nylon, rubber, corking, wax, or any other suitable material to provide a seal between the resealable container cap 2460 and a respective lid.

A sealing material (such as a peripheral countersink elastomer seal 2527) can be introduced within a peripheral countersink 2526 of a resealable container lid 2510, as illustrated in FIGS. 201 through 209. The resealable container lid 2510 is another exemplary variant of the resealable container lid respective to those previously described herein. It is understood that the sealing feature 2527 of the resealable container lid 2510 can be utilized in any of the other lid embodiments where suitable. Like features of the resealable container lid 2510 and the resealable container lid 2310 are numbered the same except preceded by the numeral '25'. Similarly a resealable container cap 2560 is introduced in FIGS. 204 through 206. Like features of the resealable container cap 2560 and the resealable container cap 2360 are numbered the same except preceded by the numeral '25'. Interactions between the resealable container lid 2510 and the resealable container cap 2560 are illustrated in FIGS. 207 through 209.

The resealable container lid 2510 includes a modified layout of a cap receiving socket bottom panel circular score line 2536, where the cap receiving socket bottom panel circular score line 2536 circumscribes a peripheral edge of a cap receiving socket bottom wall 2534, enabling removal of the entire resealable container lid upper surface reinforcement formation 2518 (which functions as a tear panel for this embodiment), which is a majority of the cap receiving socket bottom wall 2534. In an opening process, the user would lift the user force input region, which would initiate a fracture of the cap receiving socket bottom panel circular score line 2536 proximate the user force input region, then the user would pull the tab 2590 using a tab lightening hole 2593 to continue to propagate the fracture of the cap receiving socket bottom panel circular score line 2536 until the entire section of the resealable container lid upper surface reinforcement formation 2518 is separated and removes from the cap receiving socket bottom wall 2534. This provides a large opening through the body of the resealable container lid 2510.

In the resealable container lid 2510, a sealing material is dispensed into the interior cavity formed by the peripheral countersink 2526, forming a peripheral countersink elastomer seal 2527, as shown in FIGS. 201 and 209. The peripheral countersink elastomer seal 2527 works in conjunction with a cap peripheral sealing edge 2567 formed about a circumference of a lower edge of a resealable container cap 2560, as best shown in FIGS. 205 and 209. The cap peripheral sealing edge 2567 is preferably shaped including a sharp annular edge. The sharp annular edge of the cap peripheral sealing edge 2567 is driven into the peripheral countersink elastomer seal 2527, creating the seal.

The resealable container cap 2560 includes additional distinctions compared to the resealable container cap 2360. The resealable container cap planar transversing surface 2564 is minimally sized and provided as a small flange circumscribing the lower edge of the resealable container cap grip element base sidewall 2571 to support an offset projecting incisor 2568. The resealable container cap grip element base sidewall 2571 is located proximate a peripheral edge of the resealable container cap cylindrical exterior sidewall 2562. Essentially, an outer diameter of the resealable container cap grip element base sidewall 2571 is substantially equal to or very slightly smaller than a like diameter of the resealable container cap cylindrical exterior sidewall 2562.

The resealable container cap 2560 is of a sufficient size in both interior diameter and interior depth (when inverted) to allow for use as a container. More specifically, the resealable container cap 2560 can be sized and adapted for use as a measure cup, by including a resealable container cap measurement scale 2573, as shown in an inverted illustration of the resealable container cap 2560 presented in FIG. 205.

Another distinction of the resealable container cap 2560 is that the resealable container cap grip element base 2572 extends above a chime of a seaming panel 2520 (alternatively referred to as a lid and container joining formation 2520) of the resealable container lid 2510. The resealable container cap grip element base 2572 of the resealable container cap 2560 is designed to provide sufficient clearance between the seaming chuck wall 2522 and the seaming chuck shoulder 2524 of the resealable container lid 2510 and the resealable container cap grip element base sidewall 2571 and resealable container cap planar transversing surface 2564 of the resealable container cap 2560 for a seaming chuck during a seaming process.

In previous embodiments, the earn features, such as cam features, helical threading, sidewall projections, sidewall grooves, and the like were formed of the same material as the respective lid and/or cap.

A resealable container lid 2610, illustrated in FIGS. 210 through 212, employs an elastomeric material dispensed along an interior surface of the cap receiving socket cylindrical sidewall 2632 for formation of an earn feature and sealing element. Like features of the resealable container lid 2610 and the resealable container lid 2510 are numbered the same except preceded by the numeral '26'. A resealable container cap 2660, illustrated in FIGS. 213 through 215, provides yet another cap design. Like features of the resealable container cap 2660 and the resealable container cap 2360 are numbered the same except preceded by the numeral '26'.

The resealable container lid 2610 includes an elastomeric material that is dispensed into the peripheral countersink 2626 and continues upwards along the interior surface of the cap receiving socket cylindrical sidewall 2632 for formation of the earn feature and sealing element. In the exemplary illustration, the earn feature includes a series of helically shaped threads 2652 (examples of container lid rotational and axial guide features). The threads can be formed during the process of curing the applied elastomeric material. The elastomeric material would be dispensed in the desired region. The resealable container cap 2660 would be rotationally inserted into a cavity of the resealable container lid 2610. The rotational insertion process would drive a series of cap helical threads 2681 (examples of a container cap rotational and axial guide features) into the dispensed socket elastomeric body 2657 forming a plurality of socket helical threads 2652. The plurality of socket helical threads 2652 is set during a curing process. The assembly comprising the resealable container cap 2660 inserted into the resealable container lid 2610 can be packaged and shipped as an assembly, allowing the socket elastomeric body 2657 to cure over time. The assembly comprising the resealable container cap 2660 inserted into the resealable container lid 2610 is also designed to enable seaming of the resealable container lid 2610 to a resealable container 100.

In an alternative process, the plurality of threads 2652 can be formed using a forming tool instead of the plurality of cap helical threads 2681 of the resealable container cap 2660. The use of a forming tool enables the designer to design a formation within the socket elastomeric body 2657 that is compatible with the cap helical thread 2681 of the resealable container cap 2660, but differs in shape. For example, the socket elastomeric body 2657 can be formed as a cam 552 for use with the cam follower 581, wherein the cam follower 581 would be compatible to follow the cam 552 during use.

The socket elastomeric body 2657 provides several advantages over currently known technologies. The socket elastomeric body 2657 reduces manufacturing costs by reducing a number of forming dies and stamping steps. Additionally, the process avoids maintenance and replacement of tooling and equipment. The process can also be adapted to existing lid designs, as in a resealable container lid 2710, illustrated in FIGS. 219 through 226. The process also enables adaptation to any of a variety of earn designs without any impact on tooling, design time, manufacturing changeover, and the like. This additionally allows for caps of a variety of different materials. The socket elastomeric body 2657 additionally provides a suitable sealing interface providing a seal between the resealable container cap 2660 and the resealable container lid 2610.

A pliancy of the socket elastomeric body 2657 can be adapted for use as a snap feature, enabling a design on the resealable container cap 2660 to snap into a receiving feature formed within the socket elastomeric body 2657 of the resealable container lid 2610. For example, the socket elastomeric body 2657 can be formed having a flange extending radially inward and the cap helical thread 2681 can be formed as a plurality of bosses, a like annular flange extending radially outward, or any other suitable feature that would overlap the radially inward extending flange of the socket elastomeric body 2657. The overlap would retain the resealable container cap 2660 and the resealable container lid 2610 assembled to one another. Engagement and a subsequent seal would be provided by the pliancy of the material used to form the socket elastomeric body 2657.

The resealable container cap 2660 is distinct from the resealable container cap 2360 in that a cap peripheral sealing edge 2367 provided on the resealable container cap 2660 is common to the cap peripheral sealing edge 2567 of the resealable container cap 2560. The cap helical threads 2681 used on the resealable container cap 2660 provides an additional function, as the cap helical threads 2681 of the resealable container cap 2660 are used to form the mating socket helical threads 2652 of the resealable container lid 2610. The socket helical threads 2652 are formed in the socket elastomeric body 2657 after the socket elastomeric body 2657 is applied to the cap receiving socket cylindrical sidewall 2632, but prior to the socket elastomeric body 2657 being cured. It is understood that the process can be reversed where the threads can be formed in the cap receiving socket cylindrical sidewall 2632 using the material of the cap receiving socket cylindrical sidewall 2632 and the elastomeric material can be applied to the resealable container cap cylindrical exterior sidewall 2662. The hard threads on the cap receiving socket cylindrical sidewall 2632 on the resealable container lid 2610 would then shape the threads in the elastomeric material applied to the resealable container cap cylindrical exterior sidewall 2662 of the resealable container cap 2660.

A resealable container cap grip element base 2672 is formed where a cap grip element force application surface 2675 is a sidewall of the resealable container cap grip element base 2672. The resealable container cap grip element base 2372 includes a circular shaped resealable container cap grip element base sidewall 2371. The circular shape requires an increased grip force or inclusion of a series a resealable container cap grip elements 2374, as illustrated to aid a user when applying a torsional force to the resealable container cap 2360. The resealable container cap grip element base 2672 is designed to enable a user to apply a normal force to the cap grip element force application surface 2675 to open the resealable container cap 2660. The cap grip element force application surface 2675 is oriented along a more radial direction, compared to the resealable container cap grip element base sidewall 2371, which would receive a tangential force. The bar shape of the resealable container cap grip element base 2672 eliminates a requirement of the resealable container cap grip elements 2374 of the resealable container cap grip element base 2372.

In summary, the resealable container cap 2660 employs three separate sealing features, including the socket elastomeric body 2657, a cap provided lid sidewall thread seal 2668, and the cap peripheral sealing edge 2367.

A resealable container lid 2710, illustrated in FIGS. 219 and 220 is another exemplary variant of the resealable container lid respective to those previously described herein. Like features of the resealable container lid 2710 and the resealable container lid 2610 are numbered the same except preceded by the numeral '27'. A resealable container cap 2760, illustrated in FIGS. 221 and 222 introduces a unique gripping design, while retaining the assembly features for assembly of the resealable container cap 2660 to the resealable container lid 2610. Like features of the resealable container cap 2760 and the resealable container cap 2660 are numbered the same except preceded by the numeral '27'. Interactions between the resealable container lid 2710 and the resealable container cap 2760 and use of the exemplary gripping feature are illustrated in FIGS. 223 through 226.

The exemplary resealable container lid 2710 illustrates an ability to apply a socket elastomeric body 2757 to a currently available version of a stay on tab lid design, adapting the currently available version of a stay on tab lid design for use with any sealing cap, as previously described. This further demonstrates benefits of the concept previously taught by the resealable container lid 2610. The application of the socket elastomeric body 2757 introduces versatility for a number of options. The application of the socket elastomeric body 2757 can be provided prior to seaming of the resealable container lid 2710 to the resealable container 100, subsequent to seaming of the resealable container lid 2710 to the resealable container 100 at a filler (commonly referred to as a bottler), or by the consumer, where the elastomeric material and the resealable container cap 2760 (or any other suitable cap) could be provided as a kit.

The resealable container cap grip element 2772, 2774 of the resealable container cap 2760 includes a number of unique features. The resealable container cap grip element 2772 includes a pair of resealable container cap grip elements 2774, each resealable container cap grip element 2774 having a cap grip element force application surface 2775. The cap grip element force application surface 2775 as formed as an aperture passing through the respective resealable container cap grip element 2774. The resealable container cap grip element 2774 as formed as foldable grip, being foldable about a cap grip element hinge 2779. The cap grip element hinge 2779 is designed as a living hinge. A central portion of the resealable container cap grip element 2772, 2774 is a resealable container cap grip element base 2772, which extends between the pair of cap grip element hinges 2779 attaches the resealable container cap grip element 2772 to a resealable container cap planar transversing surface 2764. Each resealable container cap grip element 2774 freely pivots about a respective cap grip element hinge 2779 between a transport orientation (lowered) and a gripping orientation (raised).

Functionality of the resealable container cap grip element 2772, 2774 is presented in FIGS. 225 and 226. The user would raise the resealable container cap grip element 2774 from a lowered, stored configuration, as illustrated in FIG. 225 to a raised configuration, as shown in FIG. 226. Once each resealable container cap grip element 2774 is raised, the user would insert their finger, shown in broken lines, through each cap grip element force application surface 2775. The user would then apply a torsional force to each resealable container cap grip element 2774, rotating the resealable container cap 2760 accordingly. It is noted that, in a lowered, stored configuration, the resealable container cap grip elements 2774 remain below chime of the seaming panel 2720 (alternatively referred to as a lid and container joining formation 2720), as shown in FIG. 225, and more importantly below a container body and lid assembly seam 2709 when the resealable container lid 2710 is seamed to the resealable container 100.

The combination of the resealable container cap 2760 assembled to the resealable container lid 2710 introduces an ability to seam the seaming panel 2720 to the container seaming flange 106 through the resealable container cap 2760, as illustrated in FIGS. 237 through 247. A chuck wall contacting cap exterior sidewall 2770 is a radial face of a resealable container cap cylindrical exterior sidewall 2762 of the resealable container cap 2760 designed to engage with a seaming chuck wall 2722 of the resealable container lid 2710 in a substantially radial direction. A socket bottom wall contacting annular surface 2766 of the resealable container cap 2760 is provided to engage with a cap receiving socket bottom wall 2734 of the resealable container lid 2710 in an axial direction.

The resealable container lid 2810, illustrated in FIGS. 227 and 228, is another exemplary variant of the resealable container lid respective to those previously described herein. The resealable container lid 2810 is similar to the resealable container lid 2310. Like features of the resealable container lid 2810 and the resealable container lid 2310 are numbered the same except preceded by the numeral '28'. Similarly a resealable container cap 2860 is introduced in FIGS. 229 and 230. Like features of the resealable container cap 2860 and the resealable container cap 2360 are numbered the same except preceded by the numeral '28'. Interactions between the resealable container lid 2810 and the resealable container cap 2860 are illustrated in FIGS. 231 through 235.

The distinction between the resealable container lid 2810 and the resealable container lid 2310 is that the resealable container lid 2810 excludes a peripheral countersink 2326, wherein a lower edge of a cap receiving socket cylindrical sidewall 2832 is connected to a peripheral edge of a cap receiving socket bottom wall 2834 by a frustum shaped cap seal engaging annular surface 2840. In the exemplary illustration, the frustum shaped cap seal engaging annular surface 2840 is a chamfered edge or having a frustum shaped surface. It is also understood that the frustum shaped cap seal engaging annular surface 2840 can be reduced in size approaching a configuration where the lower edge of a cap receiving socket cylindrical sidewall 2832 is essentially directly connected to a peripheral edge of a cap receiving socket bottom wall 2834.

The resealable container cap 2860 differs from the resealable container cap 2360 in the design and function of the resealable container cap grip element base 2872. Initially, a resealable container cap cylindrical exterior sidewall 2862 extends upward from a peripheral edge of a resealable container cap planar transversing surface 2864, placing the resealable container cap planar transversing surface 2864 proximate to or at a bottom of the resealable container cap 2860. The resealable container cap planar transversing surface 2864 can be located at any location along an internal surface of the resealable container cap cylindrical exterior sidewall 2862, more specifically, proximate a lower edge of the resealable container cap cylindrical exterior sidewall 2862, centrally or between the lower edge of the resealable container cap cylindrical exterior sidewall 2862 and a resealable container cap grip element transition upper surface 2876. It is preferred that the resealable container cap planar transversing surface 2864 is located between the lower edge of the resealable container cap cylindrical exterior sidewall 2862 and the resealable container cap grip element transition upper surface 2876 defining a resealable container cap cylindrical interior sidewall 2863, wherein the resealable container cap cylindrical interior sidewall 2863 extends between the resealable container cap planar transversing surface 2864 and the resealable container cap grip element transition upper surface 2876.

A cap axial sealing ring 2866 can be formed about a lower edge of the resealable container cap cylindrical exterior sidewall 2862. The cap axial sealing ring 2866 is an annular flange that circumscribes the lower edge of the resealable container cap cylindrical exterior sidewall 2862. The cap axial sealing ring 2866 can be integral or unitarily fabricated with the resealable container cap cylindrical exterior sidewall 2862, as illustrated.

The cap axial sealing ring 2866 extends in a substantially axial and a generally radial direction, with a limited portion extending in the radial direction.

The illustrated resealable container cap 2860 further includes a cap radial sealing rings 2867, which extends in a substantially axially direction. The cap radial sealing rings 2867 is formed comprising a series of flexible annular ridges that can be unidirectionally arranged. Each annular ridge or angled flange defining the cap radial sealing rings 2867 extends in a substantially radial and a generally axial direction, with a limited portion extending in the axial direction.

When the resealable container cap 2860 is assembled to the resealable container lid 2810, the cap axial sealing ring 2866 engages with the frustum shaped cap seal engaging annular surface 2840 of the resealable container lid 2810 and is flexible in an radial direction, providing a seal between the cap axial sealing ring 2866 and the frustum shaped cap seal engaging annular surface 2840. The cap axial sealing ring 2866 additionally compresses or deforms in an axial direction. Further, the cap radial sealing rings 2867 engages with an inner wall of the seaming chuck wall 2822 of the resealable container lid 2810 and is flexible in an radial direction, providing a seal between the cap radial sealing rings 2867 and the seaming chuck wall 2822 (subsequently becoming a container body and lid assembly seam 2809 after the seaming panel 2820 (alternatively referred to as a lid and container joining formation 2820) is seamed to the container seaming flange 106)(FIG. 241).

The cap axial sealing ring 2866 and the cap radial sealing rings 2867 and the balance of the resealable container cap 2860 can be formed of a same material or the cap axial sealing ring 2866 and the cap radial sealing rings 2867 can be formed of a more pliant material compared to the balance of the resealable container cap 2860 to optimize the seal.

The grip feature of the resealable container cap 2860 differs from the previously described grip features, where the resealable container cap grip element base 2872 is located radially outward of the resealable container cap cylindrical exterior sidewall 2862. The resealable container cap grip element base 2872 is cylindrically shaped having an exterior diameter that extends beyond the cap exterior sidewall 2862, defining a lower annular edge 2878. A plurality of spatially arranged resealable container cap grip elements 2874 can be provided about a resealable container cap grip element base sidewall 2871 of the resealable container cap grip element base 2872. A gap is provided between the resealable container cap grip element transition lower surface 2878 and the seaming panel 2820 to accommodate a process of seaming the seaming panel 2820 onto the container seaming flange 106. In the exemplary illustration, the resealable container cap grip element base 2872 is located and designed to remain above chime.

Applying the benefits of the resealable container cap 2760 and the resealable container lid 2710, the resealable container cap 2860 is designed where the resealable container cap 2860 can be assembled to the resealable container lid 2810 prior to and remain assembled during a process of seaming a seaming panel 2820 to the container seaming flange 106, where seaming forces are applied to the resealable container cap 2860 and transferred through the resealable container cap 2860 to the resealable container lid 2810.

The resealable container lid 2810 and the resealable container cap 2860 can be provided as a resealable lid and cap assembly height 2900. The resealable container lid 2810 and the resealable container cap 2860 can be designed to enable nesting of adjacent assemblies 2900, as illustrated in FIG. 236. Each resealable container cap 2860 is formed having a resealable container cap grip element base inner sidewall diameter 2371 spanning across an uppermost edge of the resealable container cap 2860. A resealable container cap cylindrical interior sidewall diameter 2963 is measured across a span of the resealable container cap cylindrical interior sidewall 2863. A cap receiving socket cylindrical sidewall diameter 2932 is measured across a span of the cap receiving socket cylindrical sidewall 2832. The cap receiving socket cylindrical sidewall diameter 2932 is less than the resealable container cap grip element base inner sidewall diameter 2371. The cap receiving socket cylindrical sidewall diameter 2932 can be larger than, equal to, or less than the resealable container cap cylindrical interior sidewall diameter 2963. This dimensional difference enables a lower portion of the resealable container lid 2810 of a first resealable lid and cap assembly height 2900 to be inserted into an upper portion of a resealable container cap 2860 of a different resealable lid and cap assembly height 2900, creating a nested resealable lid and cap assemblies 2902. The difference in dimensions between the cap receiving socket cylindrical sidewall diameter 2932 and the resealable container cap cylindrical interior sidewall diameter 2963, with considerations towards shaping, defines how far the resealable container lid 2810 seats into the adjacent resealable container cap 2860, thus defining a nested resealable lid and cap assembly overlap 2904.

As previously mentioned, the resealable container lid 2710, 2810 can be seamed onto the container cylindrical sidewall 102 while the resealable container cap 2760, 2860 is assembled to the resealable container lid 2710, 2810, by applying the seaming forces to the resealable container cap 2760, 2860. Details of the process are demonstrated in FIGS. 237 through 241, using the resealable container lid 2810 and the resealable container cap 2860.

The seaming process employs a seaming chuck tool 3000 in conjunction with a first operation roller 3004, then a second/final operation roller 3007, wherein the seaming chuck tool 3000 is similar to the seaming chuck tool 600, the first operation roller 3004 is similar to the first operation roller 604, and the second/final operation roller 3007 is similar to the second/final operation roller 607. Like elements or features of the seaming process 3000 are similar to the same like elements or features of the seaming process 600. Like features of the seaming chuck tool 3000 and the seaming chuck tool 600 are numbered the same except preceded by the numeral '30'.

The seaming chuck tool 3000 is axially seated into an interior of the resealable container cap 2860. A seaming chuck tool planar driving surface 3002 seats against resealable container cap grip element transition upper surface 2876, a seaming chuck tool upper conical driving wall 3001 seats against an interior surface of the resealable container cap grip element base sidewall 2871, and a seaming chuck tool lower conical driving wall 3003 seats against resealable container cap cylindrical interior sidewall 2863. The seaming chuck tool 3000 creates and applies an axially directed force to the resealable container cap 2860. Subsequently, the resealable container cap 2860 transfers the force and distributes the force to the resealable container lid 2810. This retains the resealable container lid 2810 in position respective to the container cylindrical sidewall 102 during the seaming process. More specifically, the chuck wall contacting cap exterior sidewall 2870 of the resealable container cap 2860 applies an axially downward and radially outward force onto the seaming chuck wall 2822 of the resealable container lid 2810, thus ensuring proper seating of the seaming panel 2820 onto the container seaming flange 106 of the container cylindrical sidewall 102. Additionally, the same transferred forces are used as an anvil when rolling the seaming panel 2820 and the respective container seaming flange 106 to create the container body and lid assembly seam 2809.

The rolling process is accomplished using a two stage roll forming operation using the first operation roller 3004, then using the second/final operation roller 3007.

The first operation roller 3004 is designed to rotate about a first operation roller rotational axis 3005. An annular cavity is defined on one edge by a first operation roller seaming chuck tool indexing surface 3020 and on an opposite edge by a first operation roller resealable container cap clearance control surface 3028. The annular cavity is concentrically shaped about the first operation roller rotational axis 3005, spanning between the first operation roller seaming chuck tool indexing surface 3020 and the first operation roller resealable container cap clearance control surface 3028. A first operation roller driving channel 3006 is a second annular recess formed in the first operation roller 3004. The first operation roller driving channel 3006 is sized and shaped to provide a first roll formation of the seaming panel 2820 and the inserted container seaming flange 106. The first operation roller driving channel 3006 is located at a predetermined distance from the first operation roller seaming chuck tool indexing surface 3020. The first operation roller seaming chuck tool indexing surface 3020 is designed to ride along a seaming chuck tool roller indexing surface 3010 of the seaming chuck tool 3000 to properly locate the first operation roller driving channel 3006. The first operation roller 3004 is rotated about the first operation roller rotational axis 3005, as the first operation roller 3004 rotationally rides about the edge of the resealable container cap 2860. As the first operation roller 3004 moves along the edge of the resealable container cap 2860, the first operation roller driving channel 3006 creates the first roll in the seaming panel 2820.

The first seam forming step using the first operation roller 3004 is repeated for a second seam forming step using the second/final operation roller 3007. The second/final operation roller 3007 is designed to rotate about a second/final operation roller rotational axis 3008. An annular cavity is defined on one edge by a second/final operation roller seaming chuck tool indexing surface 3030 and on an opposite edge by a second/final operation roller resealable container cap clearance control surface 3038. The annular cavity is concentrically shaped about the second/final operation roller rotational axis 3008, spanning between the second/final operation roller seaming chuck tool indexing surface 3030 and the second/final operation roller resealable container cap clearance control surface 3038. A second/final operation roller driving channel 3009 is a second annular recess formed in the second/final operation roller 3007. The second/final operation roller driving channel 3009 is sized and shaped to provide a second and final roll formation of the seaming panel 2820 and the inserted container seaming flange 106, creating the container body and lid assembly seam 2809. The second/final operation roller driving channel 3009 is located at a predetermined distance from the second/final operation roller seaming chuck tool indexing surface 3030. The second/final operation roller seaming chuck tool indexing surface 3030 is designed to ride along a seaming chuck tool roller indexing surface 3010 of the seaming chuck tool 3000 to properly locate the second/final operation roller driving channel 3009. The second/final operation roller 3007 is rotated about the second/final operation roller rotational axis 3008, as the second/final operation roller 3007 rotationally rides about the edge of the resealable container cap 2860. As the second/final operation roller 3007 moves along the edge of the resealable container cap 2860, the second/final operation roller driving channel 3009 creates the second and final roll in the seaming panel 2820.

Upon completion of the seaming process, the resealable container lid 2810 is permanently joined to the container cylindrical sidewall 102 (referred to as a container cylindrical sidewall 2802 in an assembled state), referenced as a resealable container 2800. A container closed bottom wall 2804 of the resealable container 2800 can be shaped and sized to be enable nesting of the container closed bottom wall 2804 into an interior of the resealable container cap 2860, as illustrated in FIG. 242.

A majority of the various cap designs, such as the resealable container cap 2360, can be used to assist in opening a stay on tab container lid, such as the resealable container lid 2310, as illustrated in FIGS. 243 and 244. The cap radial sealing ring 2367 is inserted between the user's end of the tab 2390 and the resealable container lid upper surface reinforcement formation 2318. Once the cap radial sealing ring 2367 is inserted between the user's end of the tab 2390 and the resealable container lid upper surface reinforcement formation 2318, the user would grip and rotate the resealable container cap 2360 in accordance with a cap pivot movement 2369. The movement of the resealable container cap 2360 positions the cap provided lid sidewall thread seal 2368 against the cap receiving socket cylindrical sidewall 2332 or the resealable container cap cylindrical exterior sidewall 2362 against the resealable container lid upper surface reinforcement formation 2318. As the resealable container cap 2360 continues to rotate, the cap radial sealing ring 2367 lifts the tab 2390 in accordance with a tab pivot movement 2399. The balance of the opening process would be as previously described, where the force is applied by the cap radial sealing ring 2367.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

For example, the cam tracks 552, 554, 556 (and other variants) (container lid rotational and axial guide features) and the respective cam followers 581, 582, 583 (and other variants) (container cap rotational and axial guide features) are exemplary and the features can be broadly described as a container lid rotational and axial guide feature integral with the vertical sidewall 532 (and other variants) of the container lid 510 (and other variants). The respective cam followers 581, 582, 583 (and other variants) are exemplary and the features can be broadly described as a sealing cap rotational and axial guide feature integral with the cap vertical sidewall 562 (and other variants) of the sealing cap 560 (and other variants).

In another example, the cam tracks 552, 554, 556 (and other variants) (examples of container lid rotational and axial guide features) and the respective cam followers 581, 582, 583 (and other variants) (examples of container cap rotational and axial guide features) can be exchanged. More specifically, the cam tracks 552, 554, 556 can be formed on the resealable container cap cylindrical exterior sidewall 562 and the cam followers 581, 582, 583 can be formed on the cap receiving socket cylindrical sidewall 532.

In yet another example, one sealing configuration can be adapted to another container lid assembly configuration, such as the frustum shaped sealing configuration 1365, 1465, 1565 can be used in place of an annular sealing configuration of a different variant.

In yet another example, the sealing element 365, 565, 665, 1165, 1365, 1465, 1565, can be carried by the container lid 310, 510, 610, 1110, 1310, 1410, 1510 instead of the cap 360, 560, 660, 1160, 1360, 1460, 1560.

Several examples of tamper indicators are taught above. Another method of providing a tamper indicator 528, 628, 1128, 1328, 1428, 1628, or a feature enabling a user to determine if there is any breach, such as the tear panel, has occurred on the container lid 310, 510, 610, 1110, 1310, 1410, 1510 is by fabricating the cap 360, 560, 660, 1160, 1360, 1460, 1560, 1660 of a transparent or translucent material.

Reference Element Descriptions

Ref. No. Description

100 resealable container
102 container cylindrical sidewall
104 container closed bottom wall
106 container seaming flange
108 container seaming wall
109 container body and lid assembly seam
110 resealable container lid
112 never used
114 resealable container lid upper surface
116 never used
118 resealable container lid upper surface reinforcement formation
119 resealable container lid planar base bottom
130 cap receiving socket
132 cap receiving socket cylindrical sidewall
134 cap receiving socket bottom wall
136 cap receiving socket bottom panel circular score line
138 cap receiving socket bottom panel tear panel
139 tear panel hinge
140 cap receiving socket bottom panel flat annular surface
142 cap receiving socket bottom panel centered "X" shaped score line
150 socket sidewall cam engaging projections

160 resealable container cap
162 resealable container cap cylindrical sidewall
164 resealable container cap bottom surface
166 cam shaped cap bottom surface
167 flat annular cap bottom sealing surface
168 offset projecting incisor
169 centered projecting incisor
170 radially extending cap skirt
172 radially extending cap skirt frangible score lines
174 resealable container cap grip element
180 cam groove surface
181 first cam groove surface
182 second cam groove surface
183 third cam groove surface
184 sloped cam groove surface segment
186 embossed cam surface lower detent
188 embossed cam surface upper detent
200 container
202 container cylindrical sidewall
204 container closed bottom wall
210 resealable container lid
214 resealable container lid upper surface
218 resealable container lid upper surface reinforcement formation
219 resealable container lid planar base bottom
230 cap receiving socket
232 cap receiving socket cylindrical sidewall
234 cap receiving socket bottom wall
236 cap receiving socket bottom panel circular score line
238 cap receiving socket bottom panel substantially closed loop tear panel
239 tear panel hinge
240 cap receiving socket bottom panel flat annular surface
242 cap receiving socket bottom panel centered score line
252 first socket sidewall cam engaging projection
254 second socket sidewall cam engaging projection
256 third socket sidewall cam engaging projection
260 resealable container cap
262 resealable container cap cylindrical sidewall
264 resealable container cap bottom surface
265 cap sealing ring
266 cam shaped cap bottom surface
267 flat annular cap bottom sealing surface
268 offset projecting incisor
269 centered incising projection
270 radially extending cap skirt
272 radially extending cap skirt frangible score lines
274 resealable container cap grip element
281 first embossed cam surface
282 second embossed cam surface
283 third embossed cam surface
290 first socket bottom panel ramp
291 second socket bottom panel ramp
292 third socket bottom panel ramp
294 first cap bottom surface projecting feature (ramp)
295 second cap bottom surface projecting feature (ramp)
296 third cap bottom surface projecting feature (ramp)
310 resealable container lid
314 resealable container lid upper surface
318 resealable container lid upper surface reinforcement formation
330 cap receiving socket
332 cap receiving socket cylindrical sidewall
334 cap receiving socket bottom wall
338 cap receiving socket bottom panel substantially closed loop tear panel
339 tear panel hinge
340 cap receiving socket bottom panel flat annular surface
344 cap receiving socket bottom panel “S” shaped score line
346 score line fracture thinned initiation region
352 first socket sidewall cam engaging projection
354 second socket sidewall cam engaging projection
356 third socket sidewall cam engaging projection
390 first socket bottom panel embossed ramp
391 second socket bottom panel embossed ramp
392 first socket bottom panel debossed ramp
393 second socket bottom panel debossed ramp
400 container
410 resealable container lid
414 resealable container lid upper surface
418 resealable container lid upper surface reinforcement formation
430 cap receiving socket
432 cap receiving socket cylindrical sidewall
434 cap receiving socket bottom wall
436 cap receiving socket bottom panel circular score line
438 cap receiving socket bottom panel tear panel
440 cap receiving socket bottom panel flat annular surface
442 cap receiving socket bottom panel centered score line
446 score line fracture thinned initiation region
452 first socket sidewall cam engaging projection
454 second socket sidewall cam engaging projection
460 resealable container cap
469 centered incising projection
474 resealable container cap grip element
476 resealable container cap grip element first cross member
478 resealable container cap grip element second cross member
479 grip enhancing implement
490 first socket bottom panel ramp
491 second socket bottom panel ramp
492 third socket bottom panel ramp
500 resealable container
502 container cylindrical sidewall
504 container closed bottom wall
506 container seaming panel
508 container seaming wall
509 container body and lid assembly seam
510 resealable container lid
517 incisor pathway channel
518 resealable container lid upper surface reinforcement formation
520 seaming panel
522 seaming chuck wall
524 seaming chuck shoulder
526 peripheral countersink
528 off-center tamper indicator feature
527 tamper indicator operation element and lid surface gap
529 off-center tamper indicator operation element
532 cap receiving socket cylindrical sidewall
534 cap receiving socket bottom wall
536 cap receiving socket bottom panel circular score line
538 cap receiving socket bottom panel tear panel
539 tear panel hinge
541 socket bottom wall to surface reinforcement formation transition
551 first intercam relief section
552 first socket cam track
552A cam track assembly/locking detent segment A
552B cam track initial/resealed segment B
552C cam track height transition segment C

552D cam track operating segment D
552E cam track cam follower leader section E
553 second intercam relief section
554 second socket cam track
555 third intercam relief section
556 third socket cam track
560 resealable container cap
562 resealable container cap cylindrical exterior sidewall
563 resealable container cap cylindrical interior sidewall
564 resealable container cap planar traversing wall
565 cap sealing ring
566 incisor deboss panel
568 offset projecting incisor
570 cylindrical sidewall inverted countersink
574 resealable container cap grip element
575 cap grip element force application surface
581 first formed cam follower
582 second formed cam follower
583 third formed cam follower
590 tear panel surface incisor pathway to tear panel fold boss transition
591 tear panel surface incisor pathway
592 incisor channel to tear panel surface transition
593 finishing score fracture propagation and tear panel fold urging boss
597 lead in supplemental score fracture propagation and tear panel support boss
598 tear panel reinforcing boss
600 seaming chuck tool
601 seaming chuck tool conical driving wall
602 seaming chuck tool planar driving surface
603 seaming chuck tool cap clearance cavity
604 first operation roller
605 first operation roller rotational axis
606 first operation roller driving channel
607 second/final operation roller
608 second/final operation roller spin axis
609 second/final operation roller driving channel
610 outer peripheral countersink wall pre-retort geometry
611 outer peripheral countersink wall pre-retort geometry angle delineator
612 inner peripheral countersink wall pre-retort geometry
613 inner peripheral countersink wall pre-retort geometry angle delineator
614 cap receiving socket bottom wall pre-retort geometry
615 cap receiving socket bottom wall pre-retort geometry angle delineator
620 outer peripheral countersink wall post-retort geometry
621 outer peripheral countersink wall post-retort geometry angle delineator
622 inner peripheral countersink wall post-retort geometry
623 inner peripheral countersink wall post-retort geometry angle delineator
624 cap receiving socket bottom wall post-retort geometry
625 cap receiving socket bottom wall post-retort geometry angle delineator
628 concentric tamper indicator feature
629 concentric tamper indicator operation element
660 resealable container cap
662 resealable container cap cylindrical exterior sidewall
663 resealable container cap cylindrical interior sidewall
664 resealable container cap planar traversing surface
665 cap sealing ring
666 incisor deboss panel
668 offset projecting incisor
670 cylindrical sidewall inverted countersink
674 resealable container cap grip element
675 cap grip element force application surface
681 first formed cam follower
682 second formed cam follower
683 third formed cam follower
710 resealable container lid
717 incisor pathway channel
718 resealable container lid upper surface reinforcement formation
720 seaming panel
722 seaming chuck wall
724 seaming chuck shoulder
726 peripheral countersink
732 cap receiving socket cylindrical sidewall
734 cap receiving socket bottom wall
736 cap receiving socket bottom panel circular score line
738 cap receiving socket bottom panel tear panel
739 tear panel hinge
741 socket bottom wall to surface reinforcement formation transition
746 score line fracture thinned initiation region
747 score line thinned region seal reinforcement
751 first intercam relief section
752 first socket cam track
753 second intercam relief section
754 second socket cam track
755 third intercam relief section
756 third socket cam track
790 tear panel surface incisor pathway to tear panel fold boss transition
791 tear panel surface incisor pathway
792 incisor channel to tear panel surface transition
793 finishing score fracture propagation and tear panel fold urging boss
797 lead in supplemental score fracture propagation and tear panel support boss
798 tear panel reinforcing boss
810 resealable container lid
817 incisor pathway channel
818 resealable container lid upper surface reinforcement formation
820 seaming panel
822 seaming chuck wall
824 seaming chuck shoulder
826 peripheral countersink
832 cap receiving socket cylindrical sidewall
833 first score line formation segments
834 cap receiving socket bottom wall
835 second score line formation segment
836 cap receiving socket bottom panel circular score line
838 cap receiving socket bottom panel tear panel
839 tear panel hinge
841 socket bottom wall to surface reinforcement formation transition
846 score line fracture thinned initiation region
847 score line segment overlapping regions
851 first intercam relief section
852 first socket cam track
853 second intercam relief section
854 second socket cam track
855 third intercam relief section
856 third socket cam track
890 tear panel surface incisor pathway to tear panel fold boss transition
891 tear panel surface incisor pathway

892 incisor channel to tear panel surface transition
893 finishing score fracture propagation and tear panel fold urging boss
894 first incisor pathway index formation
895 lid bottom score line thinned formation region
896 second incisor pathway index formation
897 lead in supplemental score fracture propagation and tear panel support boss
898 tear panel reinforcing boss
910A lid alignment feature anvil A
910B lid alignment feature with lid bottom score line thinned formation anvil B
917 incisor pathway channel anvil
918 resealable container lid upper surface reinforcement formation anvil
932 cap receiving socket cylindrical anvil body
933 first score line formation segment punches
934 cap receiving socket bottom wall anvil
935 second score line formation segment punch
936 cap receiving socket bottom panel circular score line punch
938 first score line formation segment punch ends ready for overlap
939 tear panel hinge formation punch area
941 socket bottom wall to surface reinforcement formation transition anvil
946 score line fracture thinned initiation region punch
947 score line segment overlapping region punches
960A lid alignment feature punch tool A
960B first score line segment punch tool B
960C second score line segment punch tool C
960D complete score line punch tool D
962 lid alignment feature punch tool body
964 lid alignment feature punch tool bottom surface
993 first incisor pathway index formation anvil
994 first incisor pathway index formation punch
995 lid bottom score line thinned formation region anvil
996 second incisor pathway index formation punch
997 second incisor pathway index formation anvil
1010 resealable container lid
1017 incisor pathway channel
1018 resealable container lid upper surface reinforcement formation
1020 seaming panel
1022 seaming chuck wall
1024 seaming chuck shoulder
1026 peripheral countersink
1032 cap receiving socket cylindrical sidewall
1033 first score line formation segments
1034 cap receiving socket bottom wall
1035 second score line formation segment
1036 cap receiving socket bottom panel circular score line
1038 cap receiving socket bottom panel tear panel
1039 tear panel hinge
1041 socket bottom wall to surface reinforcement formation transition
1046 score line fracture thinned initiation region
1047 score line segment overlapping region
1051 first intercam relief section
1052 first socket cam track
1053 second intercam relief section
1054 second socket cam track
1055 third intercam relief section
1056 third socket cam track
1090 tear panel surface incisor pathway to tear panel fold boss transition
1091 tear panel surface incisor pathway
1092 incisor channel to tear panel surface transition
1093 finishing score fracture propagation and tear panel fold urging boss
1094 first incisor pathway refined chamfer face
1095 lid bottom score line hinge crease
1096 second incisor pathway refined chamfer face
1097 lead in supplemental score fracture propagation and tear panel support boss
1098 tear panel reinforcing boss
1100 resealable container
1102 container cylindrical sidewall
1104 container closed bottom wall
1109 container body and lid assembly seam
1110 resealable container lid
1117 incisor pathway channel
1118 resealable container lid upper surface reinforcement formation
1120 seaming panel
1122 seaming chuck wall
1124 seaming chuck shoulder
1126 peripheral countersink
1128 off-center tamper indicator feature
1129 off-center tamper indicator operation element
1132 cap receiving socket cylindrical sidewall
1134 cap receiving socket bottom wall
1136 cap receiving socket bottom panel circular score line
1138 cap receiving socket bottom panel tear panel
1139 tear panel hinge
1141 socket bottom wall to surface reinforcement formation transition
1151 first intercam relief section
1152 first socket cap retaining cam track
1152A cam track assembly/locking detent A
1152B cam track initial/resealed section B
1152C cam track height transition section C
1152D cam track operating section D
1152E cam track cam follower locking section E
1153 second intercam relief section
1154 second socket cap retaining cam track
1155 third intercam relief section
1156 third socket cap retaining cam track
1160 resealable container cap
1161 resealable container cap dispensing aperture
1162 resealable container cap cylindrical exterior sidewall
1163 resealable container cap cylindrical interior sidewall
1164 resealable container cap planar traversing surface
1165 tear panel conforming sealing gasket
1166 incisor deboss panel
1168 offset projecting incisor
1170 cylindrical sidewall inverted countersink
1174 resealable container cap grip element
1175 cap grip element force application surface
1181 first formed cam follower
1182 second formed cam follower
1183 third formed cam follower
1190 tear panel surface incisor pathway to tear panel fold boss transition
1191 tear panel surface incisor pathway
1192 incisor channel to tear panel surface transition
1193 finishing score fracture propagation and tear panel fold urging boss
1197 lead in supplemental score fracture propagation and tear panel support boss
1198 tear panel reinforcing boss
1200 resealable container
1202 container cylindrical sidewall
1204 container closed bottom wall 1209 container body and lid assembly seam
1210 resealable container lid
1217 incisor pathway channel
1218 resealable container lid upper surface reinforcement formation
1220 seaming panel
1222 seaming chuck wall
1224 seaming chuck shoulder
1226 peripheral countersink
1232 cap receiving socket cylindrical sidewall
1234 cap receiving socket bottom wall
1236 cap receiving socket bottom panel clockwise opening circular score line
1238 clockwise opening tear panel
1239 clockwise opening tear panel hinge
1241 socket bottom wall to surface reinforcement formation transition
1251 first intercam relief section
1252 first socket cam track
1253 second intercam relief section
1254 second socket cam track
1255 third intercam relief section
1256 third socket cam track
1260 container lid socket engaging opening tool
1261 opening tool dispensing aperture
1262 opening tool exterior sidewall
1263 opening tool interior sidewall
1264 opening tool planar traversing surface
1265 opening tool sealing ring
1268 opening tool offset projecting incisor
1270 opening tool container body and lid assembly seam cavity
1271 opening tool container overlapping sidewall
1274 opening tool grip element
1275 opening tool grip element force application surface
1281 opening tool formed cam follower
1290 tear panel surface incisor pathway to tear panel fold boss transition
1291 tear panel surface incisor pathway
1292 incisor channel to tear panel surface transition
1293 finishing score fracture propagation and tear panel fold urging boss
1297 lead in supplemental score fracture propagation and tear panel support boss
1298 tear panel reinforcing boss
1310 resealable container lid
1317 incisor pathway channel
1318 resealable container lid upper surface reinforcement formation
1320 seaming panel
1322 seaming chuck wall
1324 seaming chuck shoulder
1326 peripheral countersink
1328 concentric tamper indicator feature
1329 concentric tamper indicator operation element
1332 cap receiving socket cylindrical sidewall
1334 cap receiving socket bottom wall
1336 cap receiving socket bottom panel circular score line
1338 cap receiving socket bottom panel tear panel
1339 tear panel hinge
1340 frustum shaped cap seal engaging annular surface
1341 socket bottom wall to surface reinforcement formation transition
1351 first intercam relief section
1352 first socket cam track
1353 second intercam relief section
1354 second socket cam track
1355 third intercam relief section
1356 third socket cam track
1360 resealable container cap
1362 resealable container cap cylindrical exterior sidewall
1363 resealable container cap cylindrical interior sidewall
1364 resealable container cap planar traversing surface
1365 frustum shaped cap sealing ring
1366 incisor deboss panel
1367 frustum shaped cap sealing ring surface
1368 offset projecting incisor
1370 cylindrical sidewall inverted countersink
1374 resealable container cap grip element
1375 cap grip element force application surface
1381 first formed cam follower
1382 second formed cam follower
1383 third formed cam follower
1390 tear panel surface incisor pathway to tear panel fold boss transition
1391 tear panel surface incisor pathway
1392 incisor channel to tear panel surface transition
1393 finishing score fracture propagation and tear panel fold urging boss
1397 lead in supplemental score fracture propagation and tear panel support boss
1398 tear panel reinforcing boss
1410 resealable container lid
1420 seaming panel
1422 seaming chuck wall
1424 seaming chuck shoulder
1426 peripheral bottom edge fold
1428 pneumatically operated concentric tamper indicator feature
1432 cap receiving socket cylindrical sidewall
1440 frustum shaped cap seal engaging annular surface
1451 first intercam relief section
1452 first socket cam track
1453 second intercam relief section
1454 second socket cam track
1455 third intercam relief section
1456 third socket cam track
1460 resealable container cap
1461 container lid dispensing aperture
1462 resealable container cap cylindrical exterior sidewall
1463 resealable container cap cylindrical interior sidewall
1464 resealable container cap planar traversing surface
1465 frustum shaped cap sealing ring
1467 frustum shaped cap sealing ring surface
1470 cylindrical sidewall inverted countersink
1474 resealable container cap grip element
1475 cap grip element force application surface
1481 first formed cam follower
1560 resealable container cap
1562 resealable container cap cylindrical lower exterior sidewall
1563 resealable container cap cylindrical upper exterior sidewall
1564 resealable container cap planar traversing surface
1565 frustum shaped cap sealing ring
1566 cap grip bottom wall incisor deboss panel
1567 frustum shaped cap sealing ring surface
1568 cap grip bottom wall projecting incisor
1574 resealable container cap grip element cavity
1575 cap grip element cavity force application surface
1581 first formed cam follower
1582 second formed cam follower

1583 third formed cam follower
1628 off-center tamper indicator feature
1629 off-center tamper indicator operation element
1660 resealable container cap
1662 resealable container cap cylindrical exterior sidewall
1663 resealable container cap cylindrical interior sidewall
1664 resealable container cap planar traversing surface
1665 cap sealing ring
1666 incisor deboss panel
1668 offset projecting incisor
1670 cylindrical sidewall inverted countersink
1674 resealable container cap grip element
1675 cap grip element force application surface
1676 cap grip element grip enhancing feature
1681 first formed cam follower
1682 second formed cam follower
1683 third formed cam follower
1760 resealable container cap opening assistance tool
1761 opening assistance tool upper cylindrical sidewall
1762 opening assistance tool top wall
1763 opening assistance tool lower cylindrical sidewall
1764 opening assistance tool bottom wall
1774 opening assistance tool cap grip receiving cavity
1775 opening assistance tool force application surface
1775 opening assistance tool grip enhancing feature
1784 opening assistance tool grip element
1785 opening assistance tool force application surface
1800 drinking straw socket accessory
1810 stationary, axially operable component
1820 drinking straw
1822 drinking straw exposed upper area
1823 drinking straw upper end
1824 drinking straw unexposed lower area
1825 drinking straw lower end
1828 drinking straw dispensing aperture
1832 socket accessory cylindrical interior sidewall
1834 socket accessory traversing wall
1838 socket accessory off-center tear panel plug
1847 drinking straw sealing gasket
1850 socket mating rotary actuator groove track
1860 socket mating rotary actuator
1862 socket accessory cylindrical exterior sidewall
1865 socket accessory sealing ring
1870 socket accessory container body and lid assembly seam cavity
1871 socket accessory container overlapping sidewall
1874 socket accessory grip element
1875 socket accessory force application surface
1880 socket mating rotary actuator helical groove track cam follower
1881 first cam follower
1882 second cam follower
1883 third cam follower
1900 baby bottle nipple socket accessory
1920 baby bottle nipple feature
1922 baby bottle nipple pliable projecting component
1928 baby bottle nipple dispensing aperture
1960 socket mating baby bottle nipple rotational attachment element
1974 socket accessory grip element
1975 socket accessory force application surface
2000 sipping cup socket accessory
2010 non-rotary/axially operable component
2020 sipping cup mouth piece feature
2022 sipping cup mouth piece pliable surface
2028 sipping cup dispensing aperture
2034 socket accessory traversing wall
2060 socket mating rotary actuator
2074 socket accessory grip element
2075 socket accessory force application surface
2100 sports bottle socket accessory
2110 non-rotary/axially operable component
2120 sports bottle mouth piece feature
2121 sports bottle neck feature
2122 sports bottle mouth piece axially sealing component
2128 sports bottle dispensing aperture
2134 socket accessory traversing wall
2160 socket mating rotary actuator
2174 socket accessory grip element
2175 socket accessory force application surface
2200 rotating resealable fluid dispensing spout socket accessory
2210 non-rotary/axially operable component
2220 rotating resealable fluid dispensing spout feature
2222 rotating resealable fluid dispensing spout
2226 rotating resealable fluid dispensing spout ball hinge
2228 rotating resealable fluid dispensing spout dispensing aperture
2229 rotating resealable fluid dispensing spout accepting cavity
2234 socket accessory traversing wall
2260 socket mating rotary actuator
2274 socket accessory grip element
2275 socket accessory force application surface
2300 resealable container
2302 container cylindrical sidewall
2304 container closed bottom wall
2309 container body and lid assembly seam
2310 resealable container lid
2318 resealable container lid upper surface reinforcement formation
2320 seaming panel
2322 seaming chuck wall
2324 seaming chuck shoulder
2326 peripheral countersink
2332 cap receiving socket cylindrical sidewall
2334 cap receiving socket bottom wall
2336 cap receiving socket bottom panel circular score line
2338 cap receiving socket bottom panel tear panel
2339 tear panel hinge
2341 socket bottom wall to surface reinforcement formation transition
2342 tear panel to tear panel reinforcing boss transition
2352 socket helical thread
2352A socket helical thread locking end A
2352E socket helical thread leader end E
2360 resealable container cap
2362 resealable container cap cylindrical exterior sidewall
2363 resealable container cap cylindrical interior sidewall
2364 resealable container cap planar transversing surface
2366 cap axial sealing ring
2367 cap radial sealing ring
2368 cap provided lid sidewall thread seal
2369 cap pivot movement
2371 resealable container cap grip element base sidewall
2372 resealable container cap grip element base
2374 resealable container cap grip element
2375 cap grip element force application surface
2381 cap helical thread
2390 tab
2391 tab bracket
2392 tab bracket hinge

2393 tab lightening hole
2395 finger access depression
2396 tab stabilizing boss
2397 rivet
2398 tear panel reinforcing boss
2399 tab pivot movement
2310 resealable container lid
2318 resealable container lid upper surface reinforcement formation
2320 seaming panel
2322 seaming chuck wall
2324 seaming chuck shoulder
2326 peripheral countersink
2332 cap receiving socket cylindrical sidewall
2334 cap receiving socket bottom wall
2352 socket helical thread
2352A socket helical thread locking end A
2352E socket helical thread leader end E
2460 resealable container cap
2462 resealable container cap cylindrical exterior sidewall
2463 resealable container cap cylindrical interior sidewall
2464 resealable container cap planar transversing surface
2465 cap elastomeric sealing ring
2468 cap provided lid sidewall thread seal
2471 resealable container cap grip element base sidewall
2472 resealable container cap grip element base
2474 resealable container cap grip element
2475 cap grip element force application surface
2481 cap helical thread
2390 tab
2391 tab bracket
2393 tab lightening hole
2397 rivet
2398 tear panel reinforcing boss
2510 resealable container lid
2518 resealable container lid upper surface reinforcement formation
2520 seaming panel
2522 seaming chuck wall
2524 seaming chuck shoulder
2526 peripheral countersink
2527 peripheral countersink elastomer seal
2532 cap receiving socket cylindrical sidewall
2534 cap receiving socket bottom wall
2536 cap receiving socket bottom panel circular score line
2541 socket bottom wall to surface reinforcement formation transition
2542 tear panel to tear panel reinforcing boss transition
2552 socket helical thread
2552A socket helical thread locking end
2552E socket helical thread leader end
2560 resealable container cap
2562 resealable container cap cylindrical exterior sidewall
2564 resealable container cap planar transversing surface
2567 cap peripheral sealing edge
2568 cap provided lid sidewall thread seal
2571 resealable container cap grip element base sidewall
2572 resealable container cap grip element base
2573 resealable container cap measurement scale
2574 resealable container cap grip element
2575 cap grip element force application surface
2581 cap helical thread
2590 tab
2591 tab bracket
2592 tab bracket hinge
2593 tab lightening hole
2597 rivet
2598 tear panel reinforcing boss
2610 resealable container lid
2618 resealable container lid upper surface reinforcement formation
2620 seaming panel
2622 seaming chuck wall
2624 seaming chuck shoulder
2626 peripheral countersink
2632 cap receiving socket cylindrical sidewall
2634 cap receiving socket bottom wall
2636 cap receiving socket bottom panel circular score line
2641 socket bottom wall to surface reinforcement formation transition
2642 tear panel to tear panel reinforcing boss transition
2652 socket helical thread
2657 socket elastomeric body
2660 resealable container cap
2662 resealable container cap cylindrical exterior sidewall
2663 resealable container cap cylindrical interior sidewall
2664 resealable container cap planar transversing surface
2667 cap peripheral sealing edge
2668 cap provided lid sidewall thread seal
2671 resealable container cap grip element base sidewall
2672 resealable container cap grip element base
2675 cap grip element force application surface
2681 cap helical thread
2690 tab
2691 tab bracket
2692 tab bracket hinge
2693 tab lightening hole
2697 rivet
2698 tear panel reinforcing boss
2700 resealable container
2702 container cylindrical sidewall
2709 container body and lid assembly seam
2710 resealable container lid
2718 resealable container lid upper surface reinforcement formation
2720 seaming panel
2722 seaming chuck wall
2726 peripheral countersink
2734 cap receiving socket bottom wall
2736 cap receiving socket bottom panel circular score line
2738 cap receiving socket bottom panel tear panel
2739 tear panel hinge
2741 socket bottom wall to surface reinforcement formation transition
2742 tear panel to tear panel reinforcing boss transition
2752 socket helical thread
2757 socket elastomeric body
2760 resealable container cap
2762 resealable container cap cylindrical exterior sidewall
2763 resealable container cap cylindrical interior sidewall
2764 resealable container cap planar transversing surface
2766 socket bottom wall contacting annular surface
2767 cap peripheral sealing edge
2770 chuck wall contacting cap exterior sidewall
2772 resealable container cap grip element base
2774 resealable container cap grip element
2775 cap grip element force application surface
2776 resealable container cap grip element transition upper surface
2779 cap grip element hinge

2781 cap helical thread
2790 tab
2791 tab bracket
2792 tab bracket hinge
2793 tab lightening hole
2795 finger access depression
2796 tab stabilizing boss
2797 rivet
2798 tear panel reinforcing boss
2800 resealable container
2802 container cylindrical sidewall
2804 container closed bottom wall
2806 container seaming panel
2808 container seaming wall
2809 container body and lid assembly seam
2810 resealable container lid
2818 resealable container lid upper surface reinforcement formation
2820 seaming panel (alternatively referred to as a lid and container joining formation)
2822 seaming chuck wall
2824 seaming chuck shoulder
2832 cap receiving socket cylindrical sidewall
2834 cap receiving socket bottom wall
2836 cap receiving socket bottom panel circular score line
2838 cap receiving socket bottom panel tear panel
2839 tear panel hinge
2840 frustum shaped cap seal engaging annular surface
2841 socket bottom wall to surface reinforcement formation transition
2842 tear panel to tear panel reinforcing boss transition
2852 socket helical thread (example of a container lid rotational and axial guide featurel
2852A socket helical thread locking end A
2852E socket helical thread leader end E
2860 resealable container cap
2862 resealable container cap cylindrical exterior sidewall
2863 resealable container cap cylindrical interior sidewall
2864 resealable container cap planar transversing surface
2866 cap axial sealing ring
2867 cap radial sealing rings
2870 chuck wall contacting cap exterior sidewall
2871 resealable container cap grip element base sidewall
2872 resealable container cap grip element base
2874 resealable container cap grip element
2875 cap grip element force application surface
2876 resealable container cap grip element transition upper surface
2878 resealable container cap grip element transition lower surface
2881 cap helical thread (example of a container cap rotational and axial guide feature)
2890 tab
2891 tab bracket
2892 tab bracket hinge
2893 tab lightening hole
2895 finger access depression
2896 tab stabilizing boss
2897 rivet
2898 tear panel reinforcing boss
2900 resealable lid and cap assembly height
2902 nested resealable lid and cap assemblies
2904 nested resealable lid and cap assembly overlap
2932 cap receiving socket cylindrical sidewall diameter
2963 resealable container cap cylindrical interior sidewall diameter
2971 resealable container cap grip element base inner sidewall diameter
3000 seaming chuck tool
3001 seaming chuck tool upper conical driving wall
3002 seaming chuck tool planar driving surface
3003 seaming chuck tool lower conical driving wall
3004 first operation roller
3005 first operation roller rotational axis
3006 first operation roller driving channel
3007 second/final operation roller
3008 second/final operation roller rotational axis
3009 second/final operation roller driving channel
3010 seaming chuck tool roller indexing surface
3020 first operation roller seaming chuck tool indexing surface
3028 first operation roller resealable container cap clearance control surface
3030 second/final operation roller seaming chuck tool indexing surface
3038 second/final operation roller resealable container cap clearance control surface

What is claimed is:

1. A container and accessory combination comprising:

a container body including:

a container body sidewall extending upward from and contiguous with a container body closed bottom wall, the container body defining a hollow interior volume, the container body sidewall terminating at a container body sidewall upper edge;

a container lid, including:

a container lid rotational and axial guide feature integral with a container lid sidewall, the container lid sidewall having a duct shape extending contiguously between an upper peripheral edge and a lower peripheral edge, a seaming panel peripherally formed about and extending upward and radially outward from the container lid sidewall upper peripheral edge, the seaming panel having a shape designed for joining the container lid to the container body, wherein the container lid rotational and axial guide feature extends radially from a radially interior surface of the container lid sidewall, wherein the container lid sidewall and the seaming panel are contiguous and unitarily formed of the same material; and an accessory including:

an accessory exterior sidewall having a size and shape enabling insertion within an interior defined by the container lid sidewall, and an accessory rotational and axial guide feature extending radially from a radially outward facing surface of a generally vertically oriented annular wall, wherein the accessory rotational and axial guide feature is designed to engage with the container lid rotational and axial guide feature, wherein the container lid and the container body are assembled to one another by joining the upper peripheral edge of the container body sidewall and the seaming panel, wherein when the accessory rotational and axial guide feature and the container lid rotational and axial guide feature engage with one another and when rotated respective to one another, the container lid and the accessory result in at least one of:

a) causing the container lid and the accessory to move axially respective to one another, b) a restriction of axial movement relative to one another, assembling the container lid and the accessory with one another, c) a limitation of axial movement relative to one another, assembling the container lid and the accessory with one another, and d) a removal of the restriction of axial movement relative to one another, allowing disassembly of the container lid and the accessory from one another, wherein the initially vended seal of the container is provided by an element other than the accessory;

wherein the accessory provides at least one feature unrelated to functions associated with at least one of (a) breaching an initially vended seal and (b) resealing of the container.

2. A container and accessory combination as recited in claim 1, the container lid further comprising a bottom lid wall extending in a substantially radial direction inward respective to the container lid sidewall.

3. A container and accessory combination as recited in claim 2, further comprising a tab, wherein the tab is assembled to the container lid by a rivet unitarily formed in the bottom lid wall.

4. A container and accessory combination as recited in claim 1, the accessory further comprising:

a first component, and a second component, wherein the first component and the second component are moveable relative to one another.

5. A container and accessory combination as recited in claim 1, wherein the accessory is one of:

a second container cap replacing a first container cap, wherein the first container cap provides functions associated with at least one of (a) breaching an initially vended seal and (b) resealing of the container, a device comprising a feature which aids in opening the container lid when the container lid is sealed prior to use, a cap and drinking straw assembly, a baby nipple, a spill-proof children's cap, an integral resealable dispensing mechanism, a resealable sports bottle dispensing mechanism, and a rotating resealable fluid dispensing spout.

6. A container and accessory combination as recited in claim 1, the container and the accessory having mating surfaces forming at least one of a gas impervious seal and a liquid impervious seal between the container and the accessory.

7. A container and accessory combination as recited in claim 1, the accessory further comprising an interior surface of the accessory exterior sidewall, wherein a seaming chuck tool engages with the accessory exterior sidewall interior surface during a seaming process.

8. A container and accessory combination as recited in claim 1, the accessory further comprising a grip feature designed to aid in rotating the accessory.

9. A container and accessory combination as recited in claim 1, wherein the container lid rotational and axial guide feature is shaped having at least one of:

a protrusion, a recession, a helical thread shape, a cam shape, a cam shape having at least a first segment and a second segment, wherein the first segment and the second segment are non-linear respective to one another, and a cam shape having at least a first segment and a second segment, wherein an angle of the first segment differs from an angle of the second segment, and a cam shape having at least a first segment and a second segment, wherein an angle of the first segment differs from an angle of the second segment, wherein a first segment comprises a detent.

10. A container and accessory combination as recited in claim 1, wherein the container lid rotational and axial guide feature is formed of an elastomeric material disposed upon the radially interior surface of the container lid sidewall.

11. A container and accessory combination as recited in claim 1, the container lid further comprising:

a countersink formed between the container lid sidewall and a bottom lid wall.

12. A container and accessory combination as recited in claim 1, the container lid further comprising:

a chuck shoulder formed between the seaming panel and the container lid sidewall.

13. A container and accessory combination comprising:

a container body including:

a container body sidewall extending upward from and contiguous with a container body closed bottom wall, the container body defining a hollow interior volume, the container body sidewall terminating at a container body sidewall upper edge;

a container lid, including:

a container lid rotational and axial guide feature integral with a container lid sidewall, the container lid sidewall having a duct shape extending contiguously between an upper peripheral edge and a lower peripheral edge, a seaming panel peripherally formed about and extending upward and radially outward from the container lid sidewall upper peripheral edge, the seaming panel having a shape designed for joining the container lid to the container body, wherein the container lid rotational and axial guide feature extends radially from a radially interior surface of the container lid sidewall, wherein the container lid sidewall and the seaming panel are contiguous and unitarily formed of the same material; and an accessory including:

an accessory exterior sidewall having a size and shape enabling insertion within an interior defined by the container lid sidewall, and an accessory rotational and axial guide feature extending radially from a radially outward facing surface of a generally vertically oriented annular wall, wherein the accessory rotational and axial guide feature is designed to engage with the container lid rotational and axial guide feature, wherein the container lid and the container body are assembled to one another by rolling and compressing the upper peripheral edge of the container body sidewall and the seaming panel with one another, wherein when the accessory rotational and axial guide feature and the container lid rotational and axial guide feature engage with one another and when rotated respective to one another, the container lid and the accessory result in at least one of:

a) causing the container lid and the accessory to move axially respective to one another, b) a restriction of axial movement relative to one another, assembling the container lid and the accessory with one another, c) a limitation of axial movement relative to one another, assembling the container lid and the accessory with one another, and d) a removal of the restriction of axial movement relative to one another, allowing disassembly of the container lid and the accessory from one another, wherein the initially vended seal of the container is provided by an element other than the accessory;

wherein the accessory provides at least one feature unrelated to functions associated with at least one of (a) breaching an initially vended seal and (b) resealing of the container.

14. A container and accessory combination as recited in claim 13, the container lid further comprising a bottom lid wall extending in a substantially radial direction inward respective to the container lid sidewall.

15. A container and accessory combination as recited in claim 14, further comprising a tab, wherein the tab is assembled to the container lid by a rivet unitarily formed in the bottom lid wall.

16. A container and accessory combination as recited in claim 13, the accessory further comprising:

a first component, and a second component, wherein the first component and the second component are moveable relative to one another.

17. A container and accessory combination as recited in claim 13, wherein the accessory is one of:

a second container cap replacing a first container cap, wherein the first container cap provides functions associated with at least one of (a) breaching an initially vended seal and (b) resealing of the container, a device comprising a feature which aids in opening the container lid when the container lid is sealed prior to use, a cap and drinking straw assembly, a baby nipple, a spill-proof children's cap, an integral resealable dispensing mechanism, a resealable sports bottle dispensing mechanism, and a rotating resealable fluid dispensing spout.

18. A container and accessory combination as recited in claim 13, the container and the accessory having mating surfaces forming at least one of a gas impervious seal and a liquid impervious seal between the container and the accessory.

19. A container and accessory combination as recited in claim 13, the accessory further comprising an interior surface of the accessory exterior sidewall, wherein a seaming chuck tool engages with the accessory exterior sidewall interior surface during a seaming process.

20. A container and accessory combination as recited in claim 13, the accessory further comprising a grip feature designed to aid in rotating the accessory.

21. A container and accessory combination as recited in claim 13, wherein the container lid rotational and axial guide feature is shaped having at least one of:

a protrusion, a recession, a helical thread shape, a cam shape, a cam shape having at least a first segment and a second segment, wherein the first segment and the second segment are non-linear respective to one another, and a cam shape having at least a first segment and a second segment, wherein an angle of the first segment differs from an angle of the second segment, and a cam shape having at least a first segment and a second segment, wherein an angle of the first segment differs from an angle of the second segment, wherein a first segment comprises a detent.

22. A container and accessory combination as recited in claim 13, wherein the container lid rotational and axial guide feature is formed of an elastomeric material disposed upon the radially interior surface of the container lid sidewall.

23. A container and accessory combination as recited in claim 13, the container lid further comprising:

a countersink formed between the container lid sidewall and a bottom lid wall.

24. A container and accessory combination as recited in claim 13, the container lid further comprising:

a chuck shoulder formed between the seaming panel and the container lid sidewall.

* * * * *